US011954445B2

(12) United States Patent
Nichols et al.

(10) Patent No.: US 11,954,445 B2
(45) Date of Patent: *Apr. 9, 2024

(54) APPLIED ARTIFICIAL INTELLIGENCE TECHNOLOGY FOR NARRATIVE GENERATION BASED ON EXPLANATION COMMUNICATION GOALS

(71) Applicant: Narrative Science LLC, Chicago, IL (US)

(72) Inventors: Nathan D. Nichols, Chicago, IL (US); Andrew R. Paley, Chicago, IL (US); Maia Lewis Meza, Chicago, IL (US); Santiago Santana, Lincolnwood, IL (US)

(73) Assignee: Narrative Science LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,193

(22) Filed: Dec. 22, 2022

(65) Prior Publication Data

US 2023/0206006 A1    Jun. 29, 2023

Related U.S. Application Data

(63) Continuation of application No. 16/183,270, filed on Nov. 7, 2018, now Pat. No. 11,568,148, and a
(Continued)

(51) Int. Cl.
*G06F 40/30* (2020.01)
*G06F 40/295* (2020.01)
(Continued)

(52) U.S. Cl.
CPC ............ *G06F 40/30* (2020.01); *G06F 40/295* (2020.01); *G06N 5/022* (2013.01); *G06N 20/00* (2019.01)

(58) Field of Classification Search
CPC .......... G06F 17/27; G06F 17/21; G06F 17/24; G06F 40/30; G06F 40/295; G06F 40/35;
(Continued)

(56) References Cited

U.S. PATENT DOCUMENTS

| 4,992,939 A | 2/1991 | Tyler |
|---|---|---|
| 5,619,631 A | 4/1997 | Schott |

(Continued)

FOREIGN PATENT DOCUMENTS

| WO | 9630844 A1 | 10/1996 |
|---|---|---|
| WO | 2006122329 A2 | 11/2006 |

(Continued)

OTHER PUBLICATIONS

Allen et al., "StatsMonkey: A Data-Driven Sports Narrative Writer", Computational Models of Narrative: Papers from the AAAI Fall Symposium, Nov. 2010, 2 pages.
(Continued)

*Primary Examiner* — Michael N Opsasnick
(74) *Attorney, Agent, or Firm* — Polygon IP, LLP

(57) ABSTRACT

Artificial intelligence (AI) technology can be used in combination with composable communication goal statements to facilitate a user's ability to quickly structure story outlines using "explanation" communication goals in a manner usable by an NLG narrative generation system without any need for the user to directly author computer code. This AI technology permits NLG systems to determine the appropriate content for inclusion in a narrative story about a data set in a manner that will satisfy a desired explanation communication goal such that the narratives will express various ideas that are deemed relevant to a given explanation communication goal.

20 Claims, 200 Drawing Sheets

Related U.S. Application Data continuation-in-part of application No. 16/047,800, filed on Jul. 27, 2018, now Pat. No. 10,699,079, and a continuation-in-part of application No. 15/897,331, filed on Feb. 15, 2018, now Pat. No. 10,762,304, said application No. 16/047,800 is a continuation-in-part of application No. 15/897,350, filed on Feb. 15, 2018, now Pat. No. 10,585,983, said application No. 16/047,800 is a continuation-in-part of application No. 15/897,359, filed on Feb. 15, 2018, now Pat. No. 10,755,053, said application No. 16/047,800 is a continuation-in-part of application No. 15/897,364, filed on Feb. 15, 2018, now Pat. No. 10,572,606, said application No. 16/047,800 is a continuation-in-part of application No. 15/897,373, filed on Feb. 15, 2018, now Pat. No. 10,719,542, said application No. 16/047,800 is a continuation-in-part of application No. 15/897,381, filed on Feb. 15, 2018, now Pat. No. 10,713,442, said application No. 16/183,270 is a continuation-in-part of application No. 16/047,837, filed on Jul. 27, 2018, now Pat. No. 10,973,069, and a continuation-in-part of application No. 15/897,331, filed on Feb. 15, 2018, now Pat. No. 10,762,304, said application No. 16/047,837 is a continuation-in-part of application No. 15/897,350, filed on Feb. 15, 2018, now Pat. No. 10,585,983, said application No. 16/047,837 is a continuation-in-part of application No. 15/897,359, filed on Feb. 15, 2018, now Pat. No. 10,755,053, said application No. 16/047,837 is a continuation-in-part of application No. 15/897,364, filed on Feb. 15, 2018, now Pat. No. 10,572,606, said application No. 16/047,837 is a continuation-in-part of application No. 15/897,373, filed on Feb. 15, 2018, now Pat. No. 10,719,542, said application No. 16/047,837 is a continuation-in-part of application No. 15/897,381, filed on Feb. 15, 2018, now Pat. No. 10,713,442.

(60) Provisional application No. 62/585,809, filed on Nov. 14, 2017, provisional application No. 62/539,732, filed on Aug. 1, 2017, provisional application No. 62/460,349, filed on Feb. 17, 2017, provisional application No. 62/539,831, filed on Aug. 1, 2017.

(51) Int. Cl.
  *G06N 5/022* (2023.01)
  *G06N 20/00* (2019.01)

(58) Field of Classification Search
  CPC ......... G06F 40/56; G06F 40/237; G06N 5/02; G06N 5/022; G06N 20/00; G06N 5/041
  See application file for complete search history.

(56) References Cited

U.S. PATENT DOCUMENTS

| | | |
|---|---|---|
| 5,734,916 A | 3/1998 | Greenfield et al. |
| 5,794,050 A | 8/1998 | Dahlgren et al. |
| 5,802,495 A | 9/1998 | Goltra |
| 6,006,175 A | 12/1999 | Holzrichter |
| 6,144,938 A | 11/2000 | Surace et al. |
| 6,278,967 B1 | 8/2001 | Akers et al. |
| 6,289,363 B1 | 9/2001 | Consolatti et al. |
| 6,651,218 B1 | 11/2003 | Adler et al. |
| 6,665,666 B1 | 12/2003 | Brown et al. |
| 6,757,362 B1 | 6/2004 | Cooper et al. |
| 6,771,290 B1 | 8/2004 | Hoyle |
| 6,968,316 B1 | 11/2005 | Hamilton |
| 6,976,031 B1 | 12/2005 | Toupal et al. |
| 7,027,974 B1 | 4/2006 | Busch et al. |
| 7,246,315 B1 | 7/2007 | Andrieu et al. |
| 7,333,967 B1 | 2/2008 | Bringsjord et al. |
| 7,496,621 B2 | 2/2009 | Pan et al. |
| 7,577,634 B2 | 8/2009 | Ryan et al. |
| 7,610,279 B2 | 10/2009 | Budzik et al. |
| 7,617,199 B2 | 11/2009 | Budzik et al. |
| 7,617,200 B2 | 11/2009 | Budzik et al. |
| 7,627,565 B2 | 12/2009 | Budzik et al. |
| 7,644,072 B2 | 1/2010 | Budzik et al. |
| 7,657,518 B2 | 2/2010 | Budzik et al. |
| 7,716,116 B2 | 5/2010 | Schiller |
| 7,778,895 B1 | 8/2010 | Baxter et al. |
| 7,818,329 B2 | 10/2010 | Campbell et al. |
| 7,825,929 B2 | 11/2010 | Kincaid |
| 7,836,010 B2 | 11/2010 | Hammond et al. |
| 7,840,448 B2 | 11/2010 | Musgrove et al. |
| 7,856,390 B2 | 12/2010 | Schiller |
| 7,865,496 B1 | 1/2011 | Schiller |
| 7,930,169 B2 | 4/2011 | Billerey-Mosier |
| 8,046,226 B2 | 10/2011 | Soble et al. |
| 8,311,863 B1 | 11/2012 | Kemp |
| 8,355,903 B1 | 1/2013 | Birnbaum et al. |
| 8,374,848 B1 | 2/2013 | Birnbaum et al. |
| 8,442,940 B1 | 5/2013 | Faletti et al. |
| 8,447,604 B1 | 5/2013 | Chang |
| 8,463,695 B2 | 6/2013 | Schiller |
| 8,494,944 B2 | 7/2013 | Schiller |
| 8,515,737 B2 | 8/2013 | Allen |
| 8,612,208 B2 | 12/2013 | Cooper et al. |
| 8,630,844 B1 | 1/2014 | Nichols et al. |
| 8,630,912 B2 | 1/2014 | Seki et al. |
| 8,630,919 B2 | 1/2014 | Baran et al. |
| 8,645,124 B2 | 2/2014 | Karov Zangvil |
| 8,645,825 B1 | 2/2014 | Cornea et al. |
| 8,676,691 B2 | 3/2014 | Schiller |
| 8,688,434 B1 | 4/2014 | Birnbaum et al. |
| 8,762,133 B2 | 6/2014 | Reiter |
| 8,762,134 B2 | 6/2014 | Reiter |
| 8,762,285 B2 | 6/2014 | Davis et al. |
| 8,775,161 B1 | 7/2014 | Nichols et al. |
| 8,812,311 B2 | 8/2014 | Weber |
| 8,843,363 B2 | 9/2014 | Birnbaum et al. |
| 8,886,520 B1 | 11/2014 | Nichols et al. |
| 8,892,417 B1 | 11/2014 | Nichols et al. |
| 8,892,419 B2 | 11/2014 | Lundberg et al. |
| 8,903,711 B2 | 12/2014 | Lundberg et al. |
| 8,977,953 B1 | 3/2015 | Pierre et al. |
| 9,135,244 B2 | 9/2015 | Reiter |
| 9,164,982 B1 | 10/2015 | Kaeser |
| 9,208,147 B1 | 12/2015 | Nichols et al. |
| 9,244,894 B1 | 1/2016 | Dale et al. |
| 9,251,134 B2 | 2/2016 | Birnbaum et al. |
| 9,323,743 B2 | 4/2016 | Reiter |
| 9,336,193 B2 | 5/2016 | Logan et al. |
| 9,348,815 B1 | 5/2016 | Estes et al. |
| 9,355,093 B2 | 5/2016 | Reiter |
| 9,396,168 B2 | 7/2016 | Birnbaum et al. |
| 9,396,181 B1 | 7/2016 | Sripada et al. |
| 9,396,758 B2 | 7/2016 | Oz et al. |
| 9,405,448 B2 | 8/2016 | Reiter |
| 9,424,254 B2 | 8/2016 | Howald et al. |
| 9,430,557 B2 | 8/2016 | Bhat et al. |
| 9,460,075 B2 | 10/2016 | Mungi et al. |
| 9,483,520 B1 | 11/2016 | Reiner et al. |
| 9,529,795 B2 | 12/2016 | Kondadadi et al. |
| 9,535,902 B1 | 1/2017 | Michalak et al. |
| 9,536,049 B2 | 1/2017 | Brown et al. |
| 9,569,729 B1 | 2/2017 | Oehrle et al. |
| 9,576,009 B1 | 2/2017 | Hammond et al. |
| 9,665,259 B2 | 5/2017 | Lee et al. |
| 9,697,178 B1 | 7/2017 | Nichols et al. |
| 9,697,192 B1 | 7/2017 | Estes et al. |
| 9,697,197 B1 | 7/2017 | Birnbaum et al. |
| 9,697,492 B1 | 7/2017 | Birnbaum et al. |
| 9,720,884 B2 | 8/2017 | Birnbaum et al. |
| 9,720,899 B1 | 8/2017 | Birnbaum et al. |
| 9,741,151 B2 | 8/2017 | Breedvelt-Schouten et al. |

(56) References Cited

U.S. PATENT DOCUMENTS

| | | |
|---|---|---|
| 9,767,145 B2 | 9/2017 | Prophete et al. |
| 9,870,362 B2 | 1/2018 | Lee et al. |
| 9,870,629 B2 | 1/2018 | Cardno et al. |
| 9,875,494 B2 | 1/2018 | Kalns et al. |
| 9,910,914 B1 | 3/2018 | Cowley et al. |
| 9,946,711 B2 | 4/2018 | Reiter et al. |
| 9,971,967 B2 | 5/2018 | Bufe, III et al. |
| 9,977,773 B1 | 5/2018 | Birnbaum et al. |
| 9,990,337 B2 | 6/2018 | Birnbaum et al. |
| 10,019,512 B2 | 7/2018 | Boyle et al. |
| 10,037,377 B2 | 7/2018 | Boyle et al. |
| 10,049,152 B2 | 8/2018 | Ajmera et al. |
| 10,073,840 B2 | 9/2018 | Hakkani-Tur et al. |
| 10,073,861 B2 | 9/2018 | Shamir et al. |
| 10,095,692 B2 | 10/2018 | Song et al. |
| 10,101,889 B2 | 10/2018 | Prophete et al. |
| 10,162,900 B1 | 12/2018 | Chatterjee et al. |
| 10,185,477 B1 | 1/2019 | Paley et al. |
| 10,332,297 B1 | 6/2019 | Vadodaria |
| 10,387,970 B1 | 8/2019 | Wang et al. |
| 10,482,381 B2 | 11/2019 | Nichols et al. |
| 10,489,488 B2 | 11/2019 | Birnbaum et al. |
| 10,565,308 B2 | 2/2020 | Reiter |
| 10,572,606 B1 | 2/2020 | Paley et al. |
| 10,579,835 B1 | 3/2020 | Phillips et al. |
| 10,585,983 B1 | 3/2020 | Paley et al. |
| 10,599,767 B1 | 3/2020 | Mattera et al. |
| 10,606,953 B2 | 3/2020 | Mulwad et al. |
| 10,621,183 B1 | 4/2020 | Chatterjee et al. |
| 10,657,201 B1 | 5/2020 | Nichols et al. |
| 10,679,011 B2 | 6/2020 | Galitsky |
| 10,698,585 B2 | 6/2020 | Kraljic et al. |
| 10,699,079 B1 | 6/2020 | Paley et al. |
| 10,706,236 B1 | 7/2020 | Platt et al. |
| 10,747,823 B1 | 8/2020 | Birnbaum et al. |
| 10,755,042 B2 | 8/2020 | Birnbaum et al. |
| 10,762,304 B1 | 9/2020 | Paley et al. |
| 10,853,583 B1 | 12/2020 | Platt et al. |
| 10,943,069 B1 | 3/2021 | Paley et al. |
| 10,956,656 B2 | 3/2021 | Birnbaum et al. |
| 10,963,649 B1 | 3/2021 | Sippel et al. |
| 10,990,767 B1 | 4/2021 | Smathers et al. |
| 11,003,866 B1 | 5/2021 | Sippel et al. |
| 11,023,689 B1 | 6/2021 | Sippel et al. |
| 11,030,408 B1 | 6/2021 | Lewis Meza et al. |
| 11,037,342 B1 | 6/2021 | Agnew et al. |
| 11,042,708 B1 | 6/2021 | Pham et al. |
| 11,042,709 B1 | 6/2021 | Pham et al. |
| 11,042,713 B1 | 6/2021 | Platt et al. |
| 11,055,497 B2 | 7/2021 | Noh et al. |
| 11,068,661 B1 | 7/2021 | Nichols et al. |
| 11,126,798 B1 | 9/2021 | Lewis Meza et al. |
| 11,144,838 B1 | 10/2021 | Platt et al. |
| 11,170,038 B1* | 11/2021 | Platt .................. G06T 11/206 |
| 11,182,556 B1 | 11/2021 | Lewis Meza et al. |
| 11,188,588 B1 | 11/2021 | Platt et al. |
| 11,222,184 B1* | 1/2022 | Platt .................. G06F 16/26 |
| 11,232,268 B1* | 1/2022 | Platt .................. G06F 16/248 |
| 11,232,270 B1* | 1/2022 | Platt .................. G06F 18/214 |
| 11,238,090 B1* | 2/2022 | Platt .................. G06F 16/51 |
| 11,270,211 B2 | 3/2022 | Ramos et al. |
| 11,288,328 B2 | 3/2022 | Birnbaum et al. |
| 11,334,726 B1 | 5/2022 | Platt et al. |
| 11,341,330 B1 | 5/2022 | Smathers et al. |
| 11,341,338 B1 | 5/2022 | Platt et al. |
| 11,561,684 B1 | 1/2023 | Paley et al. |
| 11,561,986 B1 | 1/2023 | Sippel et al. |
| 11,562,146 B2 | 1/2023 | Paley et al. |
| 11,568,148 B1 | 1/2023 | Nichols et al. |
| 2002/0046018 A1 | 4/2002 | Marcu et al. |
| 2002/0083025 A1 | 6/2002 | Robarts et al. |
| 2002/0107721 A1 | 8/2002 | Darwent et al. |
| 2003/0004706 A1 | 1/2003 | Yale et al. |
| 2003/0110186 A1 | 6/2003 | Markowski et al. |
| 2003/0182102 A1 | 9/2003 | Corston-Oliver et al. |
| 2004/0015342 A1 | 1/2004 | Garst |
| 2004/0083092 A1* | 4/2004 | Valles .................. G06F 40/30 704/9 |
| 2004/0103116 A1 | 5/2004 | Palanisamy et al. |
| 2004/0138899 A1 | 7/2004 | Birnbaum et al. |
| 2004/0174397 A1 | 9/2004 | Cereghini et al. |
| 2004/0225651 A1 | 11/2004 | Musgrove et al. |
| 2004/0230989 A1 | 11/2004 | Macey et al. |
| 2004/0255232 A1 | 12/2004 | Hammond et al. |
| 2005/0027704 A1 | 2/2005 | Hammond et al. |
| 2005/0028156 A1 | 2/2005 | Hammond et al. |
| 2005/0033582 A1 | 2/2005 | Gadd et al. |
| 2005/0125213 A1 | 6/2005 | Chen et al. |
| 2005/0273362 A1 | 12/2005 | Harris et al. |
| 2006/0031182 A1 | 2/2006 | Ryan et al. |
| 2006/0101335 A1 | 5/2006 | Pisciottano |
| 2006/0212446 A1 | 9/2006 | Hammond et al. |
| 2006/0218485 A1 | 9/2006 | Blumenthal |
| 2006/0224570 A1 | 10/2006 | Quiroga et al. |
| 2006/0253431 A1 | 11/2006 | Bobick et al. |
| 2006/0253783 A1 | 11/2006 | Vronay et al. |
| 2006/0271535 A1 | 11/2006 | Hammond et al. |
| 2006/0277168 A1 | 12/2006 | Hammond et al. |
| 2007/0132767 A1 | 6/2007 | Wright et al. |
| 2007/0136657 A1 | 6/2007 | Blumenthal et al. |
| 2007/0185846 A1 | 8/2007 | Budzik et al. |
| 2007/0185847 A1 | 8/2007 | Budzik et al. |
| 2007/0185861 A1 | 8/2007 | Budzik et al. |
| 2007/0185862 A1 | 8/2007 | Budzik et al. |
| 2007/0185863 A1 | 8/2007 | Budzik et al. |
| 2007/0185864 A1 | 8/2007 | Budzik et al. |
| 2007/0185865 A1 | 8/2007 | Budzik et al. |
| 2007/0250479 A1 | 10/2007 | Lunt et al. |
| 2007/0250826 A1 | 10/2007 | O'Brien |
| 2008/0005677 A1 | 1/2008 | Thompson |
| 2008/0140696 A1 | 6/2008 | Mathuria |
| 2008/0198156 A1 | 8/2008 | Jou et al. |
| 2008/0250070 A1 | 10/2008 | Abdulla et al. |
| 2008/0256066 A1 | 10/2008 | Zuckerman et al. |
| 2008/0304808 A1 | 12/2008 | Newell et al. |
| 2008/0306882 A1 | 12/2008 | Schiller |
| 2008/0313130 A1 | 12/2008 | Hammond et al. |
| 2009/0019013 A1 | 1/2009 | Tareen et al. |
| 2009/0030899 A1 | 1/2009 | Tareen et al. |
| 2009/0049041 A1 | 2/2009 | Tareen et al. |
| 2009/0055164 A1 | 2/2009 | Hu et al. |
| 2009/0083288 A1 | 3/2009 | LeDain et al. |
| 2009/0089100 A1 | 4/2009 | Nenov et al. |
| 2009/0144608 A1 | 6/2009 | Oisel et al. |
| 2009/0144609 A1 | 6/2009 | Liang et al. |
| 2009/0157664 A1 | 6/2009 | Wen |
| 2010/0146393 A1 | 6/2010 | Land et al. |
| 2010/0161541 A1 | 6/2010 | Covannon et al. |
| 2010/0185984 A1 | 7/2010 | Wright et al. |
| 2010/0241620 A1 | 9/2010 | Manister et al. |
| 2010/0325107 A1 | 12/2010 | Kenton et al. |
| 2011/0044447 A1 | 2/2011 | Morris et al. |
| 2011/0078105 A1 | 3/2011 | Wallace |
| 2011/0087486 A1 | 4/2011 | Schiller |
| 2011/0113315 A1 | 5/2011 | Datha et al. |
| 2011/0113334 A1 | 5/2011 | Joy et al. |
| 2011/0213642 A1 | 9/2011 | Makar et al. |
| 2011/0246182 A1 | 10/2011 | Allen |
| 2011/0249953 A1 | 10/2011 | Suri et al. |
| 2011/0261049 A1 | 10/2011 | Cardno et al. |
| 2011/0295903 A1 | 12/2011 | Chen |
| 2011/0307435 A1 | 12/2011 | Overell et al. |
| 2011/0311144 A1 | 12/2011 | Tardif |
| 2011/0314381 A1 | 12/2011 | Fuller et al. |
| 2012/0069131 A1 | 3/2012 | Abelow |
| 2012/0109637 A1 | 5/2012 | Merugu et al. |
| 2012/0143849 A1 | 6/2012 | Wong et al. |
| 2012/0158850 A1 | 6/2012 | Harrison et al. |
| 2012/0166180 A1 | 6/2012 | Au |
| 2012/0265531 A1 | 10/2012 | Bennett |
| 2012/0310699 A1 | 12/2012 | McKenna et al. |
| 2013/0041677 A1 | 2/2013 | Nusimow et al. |
| 2013/0091031 A1 | 4/2013 | Baran et al. |
| 2013/0096947 A1 | 4/2013 | Shah et al. |

(56) References Cited

U.S. PATENT DOCUMENTS

| | | |
|---|---|---|
| 2013/0144605 A1 | 6/2013 | Brager et al. |
| 2013/0144606 A1 | 6/2013 | Birnbaum et al. |
| 2013/0145242 A1 | 6/2013 | Birnbaum et al. |
| 2013/0173285 A1 | 7/2013 | Hyde et al. |
| 2013/0174026 A1 | 7/2013 | Locke |
| 2013/0185049 A1 | 7/2013 | Zhao et al. |
| 2013/0185051 A1 | 7/2013 | Buryak et al. |
| 2013/0187926 A1 | 7/2013 | Silverstein et al. |
| 2013/0211855 A1 | 8/2013 | Eberle et al. |
| 2013/0238316 A1 | 9/2013 | Shastri et al. |
| 2013/0238330 A1 | 9/2013 | Casella dos Santos |
| 2013/0246300 A1 | 9/2013 | Fischer et al. |
| 2013/0253910 A1 | 9/2013 | Turner et al. |
| 2013/0262086 A1 | 10/2013 | Kim et al. |
| 2013/0262092 A1 | 10/2013 | Wasick |
| 2013/0275121 A1 | 10/2013 | Tunstall-Pedoe |
| 2013/0304507 A1 | 11/2013 | Dail et al. |
| 2013/0316834 A1 | 11/2013 | Vogel et al. |
| 2014/0006012 A1 | 1/2014 | Zhou et al. |
| 2014/0040312 A1 | 2/2014 | Gorman et al. |
| 2014/0062712 A1 | 3/2014 | Reiter |
| 2014/0075004 A1 | 3/2014 | Van Dusen et al. |
| 2014/0129213 A1 | 5/2014 | Kimelfeld et al. |
| 2014/0129942 A1 | 5/2014 | Rathod |
| 2014/0134590 A1 | 5/2014 | Hiscock Jr. |
| 2014/0149107 A1 | 5/2014 | Schilder |
| 2014/0201202 A1 | 7/2014 | Jones et al. |
| 2014/0208215 A1 | 7/2014 | Deshpande |
| 2014/0314225 A1 | 10/2014 | Riahi et al. |
| 2014/0351281 A1 | 11/2014 | Tunstall-Pedoe |
| 2014/0356833 A1 | 12/2014 | Sabczynski et al. |
| 2014/0372850 A1 | 12/2014 | Campbell et al. |
| 2014/0375466 A1 | 12/2014 | Reiter |
| 2015/0032730 A1 | 1/2015 | Cialdea, Jr. et al. |
| 2015/0049951 A1 | 2/2015 | Chaturvedi et al. |
| 2015/0078232 A1 | 3/2015 | Djinki et al. |
| 2015/0088808 A1 | 3/2015 | Tyagi et al. |
| 2015/0134694 A1 | 5/2015 | Burke et al. |
| 2015/0142704 A1 | 5/2015 | London |
| 2015/0161997 A1 | 6/2015 | Wetsel et al. |
| 2015/0169548 A1 | 6/2015 | Reiter |
| 2015/0178386 A1 | 6/2015 | Oberkampf et al. |
| 2015/0186504 A1 | 7/2015 | Gorman et al. |
| 2015/0227508 A1 | 8/2015 | Howald et al. |
| 2015/0227588 A1 | 8/2015 | Shapira et al. |
| 2015/0242384 A1 | 8/2015 | Reiter |
| 2015/0249584 A1 | 9/2015 | Cherifi et al. |
| 2015/0261745 A1 | 9/2015 | Song et al. |
| 2015/0268930 A1 | 9/2015 | Lee et al. |
| 2015/0286747 A1 | 10/2015 | Anastasakos et al. |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0325000 A1 | 11/2015 | Sripada |
| 2015/0331846 A1 | 11/2015 | Guggilla et al. |
| 2015/0331850 A1 | 11/2015 | Ramish |
| 2015/0332665 A1 | 11/2015 | Mishra et al. |
| 2015/0347400 A1 | 12/2015 | Sripada |
| 2015/0347901 A1 | 12/2015 | Cama et al. |
| 2015/0356463 A1* | 12/2015 | Overell ............... G06F 40/295 706/12 |
| 2015/0356967 A1 | 12/2015 | Byron et al. |
| 2015/0363364 A1 | 12/2015 | Sripada |
| 2016/0019200 A1 | 1/2016 | Allen |
| 2016/0026253 A1 | 1/2016 | Bradski et al. |
| 2016/0027125 A1 | 1/2016 | Bryce |
| 2016/0054889 A1 | 2/2016 | Hadley et al. |
| 2016/0062604 A1 | 3/2016 | Kraljic et al. |
| 2016/0103559 A1 | 4/2016 | Maheshwari et al. |
| 2016/0132489 A1 | 5/2016 | Reiter |
| 2016/0140090 A1 | 5/2016 | Dale et al. |
| 2016/0162582 A1 | 6/2016 | Chatterjee et al. |
| 2016/0196491 A1 | 7/2016 | Chandrasekaran et al. |
| 2016/0217133 A1 | 7/2016 | Reiter et al. |
| 2016/0232152 A1 | 8/2016 | Mahamood |
| 2016/0232221 A1 | 8/2016 | McCloskey et al. |
| 2016/0314121 A1* | 10/2016 | Arroyo ............... G06F 16/3344 |
| 2016/0314123 A1 | 10/2016 | Ramachandran et al. |
| 2017/0006135 A1 | 1/2017 | Siebel et al. |
| 2017/0017897 A1 | 1/2017 | Bugay et al. |
| 2017/0024465 A1 | 1/2017 | Yeh et al. |
| 2017/0026705 A1 | 1/2017 | Yeh et al. |
| 2017/0060857 A1 | 3/2017 | Imbruce et al. |
| 2017/0061093 A1 | 3/2017 | Amarasingham et al. |
| 2017/0068551 A1 | 3/2017 | Vadodaria |
| 2017/0083484 A1 | 3/2017 | Patil et al. |
| 2017/0091291 A1 | 3/2017 | Bostick et al. |
| 2017/0116327 A1 | 4/2017 | Gorelick et al. |
| 2017/0124062 A1 | 5/2017 | Bhaowal et al. |
| 2017/0140405 A1 | 5/2017 | Gottemukkala et al. |
| 2017/0177715 A1 | 6/2017 | Chang et al. |
| 2017/0185674 A1 | 6/2017 | Tonkin et al. |
| 2017/0212671 A1 | 7/2017 | Sathish et al. |
| 2017/0213157 A1 | 7/2017 | Bugay et al. |
| 2017/0228372 A1 | 8/2017 | Moreno et al. |
| 2017/0270105 A1 | 9/2017 | Ninan et al. |
| 2017/0293864 A1 | 10/2017 | Oh et al. |
| 2017/0329842 A1 | 11/2017 | Ng Tari et al. |
| 2017/0358295 A1 | 12/2017 | Roux et al. |
| 2017/0371856 A1 | 12/2017 | Can et al. |
| 2018/0025726 A1 | 1/2018 | Gatti de Bayser et al. |
| 2018/0089177 A1 | 3/2018 | Cho |
| 2018/0189284 A1 | 7/2018 | Hosabettu |
| 2018/0232443 A1 | 8/2018 | Delgo et al. |
| 2018/0260380 A1 | 9/2018 | Birnbaum et al. |
| 2018/0261203 A1 | 9/2018 | Zoller et al. |
| 2018/0285324 A1 | 10/2018 | Birnbaum et al. |
| 2018/0293483 A1 | 10/2018 | Abramson et al. |
| 2018/0300311 A1 | 10/2018 | Krishnamurthy |
| 2018/0314689 A1 | 11/2018 | Wang et al. |
| 2019/0042559 A1 | 2/2019 | Allen et al. |
| 2019/0102614 A1 | 4/2019 | Winder et al. |
| 2019/0138615 A1 | 5/2019 | Huh et al. |
| 2019/0147849 A1 | 5/2019 | Talwar et al. |
| 2019/0179893 A1 | 6/2019 | Mulwad et al. |
| 2019/0236140 A1 | 8/2019 | Canim et al. |
| 2020/0074310 A1 | 3/2020 | Li et al. |
| 2020/0089735 A1 | 3/2020 | Birnbaum et al. |
| 2020/0202846 A1 | 6/2020 | Bapna et al. |
| 2021/0192132 A1 | 6/2021 | Birnbaum et al. |
| 2021/0192144 A1 | 6/2021 | Paley et al. |
| 2022/0114206 A1 | 4/2022 | Platt et al. |
| 2023/0027421 A1 | 1/2023 | Birnbaum et al. |
| 2023/0053724 A1 | 2/2023 | Birnbaum et al. |
| 2023/0109572 A1 | 4/2023 | Nichols et al. |

FOREIGN PATENT DOCUMENTS

| | | | |
|---|---|---|---|
| WO | 2014035400 A1 | 3/2014 | |
| WO | 2014035402 A1 | 3/2014 | |
| WO | 2014035403 A1 | 3/2014 | |
| WO | 2014035406 A1 | 3/2014 | |
| WO | 2014035407 A1 | 3/2014 | |
| WO | 2014035447 A1 | 3/2014 | |
| WO | 2014070197 A1 | 5/2014 | |
| WO | 2014076524 A1 | 5/2014 | |
| WO | 2014076525 A1 | 5/2014 | |
| WO | 2014102568 A1 | 7/2014 | |
| WO | 2014102569 A1 | 7/2014 | |
| WO | 2014111753 A1 | 7/2014 | |
| WO | 2015028844 A1 | 3/2015 | |
| WO | 2015159133 A1 | 10/2015 | |

OTHER PUBLICATIONS

Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.

Andre, E., Herzog, G., & Rist, T. (1988). On the simultaneous interpretation of real world image sequences and their natural

(56) References Cited

OTHER PUBLICATIONS language description: the system SOCCER. Paper presented at Proceedings of the 8th. European Conference on Artificial Intelligence (ECAI), Munich.
Asset Economics, Inc. (Feb. 11, 2011).
Bailey, P. (1999). Searching for Storiness: Story-Generation from a Reader's Perspective. AAAI Technical Report FS-99-01.
Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS-2005), San Diego, California.
Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.
Boyd, S. (1998). TREND: a system for generating intelligent descriptions of time series data. Paper presented at Proceedings of the IEEE international conference on intelligent processing systems (ICIPS-1998).
Character Writer Version 3.1, Typing Chimp Software LLC, 2012, screenshots from working program, pp. 1-19.
Cyganiak et al., "RDF 1.1 Concepts and Abstract Syntax", W3C Recommendation, 2014, vol. 25, No. 2.
Dehn, N. (1981). Story generation after TALE-SPIN. In Proceedings of the Seventh International Joint Conference on Artificial Intelligence. (Vancouver, Canada).
Dramatica Pro version 4, Write Brothers, 1993-2006, user manual.
Gatt, A., and Portet, F. (2009). Text content and task performance in the evaluation of a Natural Language Generation System. Proceedings of the Conference on Recent Advances in Natural Language Processing (RANLP-09).
Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.
Glahn, H. (1970). Computer-produced worded forecasts. Bulletin of the American Meteorological Society, 51(12), 1126-1131.
Goldberg, E., Driedger, N., & Kittredge, R. (1994). Using Natural-Language Processing to Produce Weather Forecasts. IEEE Expert, 9 (2), 45.
Hargood, C., Millard, D. and Weal, M. (2009) Exploring the Importance of Themes in Narrative Systems.
Hargood, C., Millard, D. and Weal, M. (2009). Investigating a Thematic Approach to Narrative Generation, 2009.
Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.
Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.
Kittredge, R., and Lavoie, B. (1998). MeteoCogent: A Knowledge-Based Tool For Generating Weather Forecast Texts. In Proceedings of the American Meteorological Society AI Conference (AMS-98), Phoenix, Arizona.
Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.
Kukich, K. (1983). Design of a Knowledge-Based Report Generator. Proceedings of the 21st Conference of the Association for Computational Linguistics, Cambridge, MA, pp. 145-150.
Kukich, K. (1983). Knowledge-Based Report Generation: A Technique for Automatically Generating Natural Language Reports from Databases. Paper presented at Proceedings of the Sixth International ACM SIGIR Conference, Washington, DC.
Mack et al., "A Framework for Metrics in Large Complex Systems", IEEE Aerospace Conference Proceedings, 2004, pp. 3217-3228, vol. 5, doi: 10.1109/AERO .2004.1368127.
Mahamood et al., "Generating Annotated Graphs Using the NLG Pipeline Architecture", Proceedings of the 8th International Natural Language Generation Conference (INLG), 2014.
McKeown, K., Kukich, K., & Shaw, J. (1994). Practical issues in automatic documentation generation. 4th Conference on Applied Natural Language Processing, Stuttgart, Germany, pp. 7-14.
Meehan, James R., TALE-SPIN. (1977). An Interactive Program that Writes Stories. In Proceedings of the Fifth International Joint Conference on Artificial Intelligence.
Memorandum Opinion and Order for *O2 Media, LLC* v. *Narrative Science Inc.,* Case 1:15-cv-05129 (N.D. IL), Feb. 25, 2016, 25 pages (invalidating claims of U.S. Pat. No. 7,856,390, U.S. Pat. No. 8,494,944, and U.S. Pat. No. 8,676,691 owned by O2 Media, LLC.
Moncur, W., and Reiter, E. (2007). How Much to Tell? Disseminating Affective Information across a Social Network. Proceedings of Second International Workshop on Personalisation for e-Health.
Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.
Movie Magic Screenwriter, Write Brothers, 2009, user manual.
Office Action for U.S. Appl. No. 16/183,270 dated Apr. 13, 2021.
Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.
Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.
Reiter et al., "Building Applied Natural Generation Systems", Cambridge University Press, 1995, pp. 1-32.
Reiter, E. (2007). An architecture for Data-To-Text systems. In: Busemann, Stephan (Ed.), Proceedings of the 11th European Workshop on Natural Language Generation, pp. 97-104.
Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.
Reiter, E., Sripada, S., Hunter, J., Yu, J., and Davy, I. (2005). Choosing words in computer-generated weather forecasts. Artificial Intelligence, 167:137-169.
Riedl et al., "From Linear Story Generation to Branching Story Graphs", IEEE Computer Graphics and Applications, 2006, pp. 23-31.
Riedl et al., "Narrative Planning: Balancing Plot and Character", Journal of Artificial Intelligence Research, 2010, pp. 217-268, vol. 39.
Roberts et al., "Lessons on Using Computationally Generated Influence for Shaping Narrative Experiences", IEEE Transactions on Computational Intelligence and AI in Games, Jun. 2014, pp. 188-202, vol. 6, No. 2, doi: 10.1109/TCIAIG .2013.2287154.
Robin, J. (1996). Evaluating the portability of revision rules for incremental summary generation. Paper presented at Proceedings of the 34th. Annual Meeting of the Association for Computational Linguistics (ACL'96), Santa Cruz, CA.
Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New York, NY 105-115.
Segel et al., "Narrative Visualization: Telling Stories with Data", Stanford University, Oct. 2010, 10 pgs.
Smari et al., "An Integrated Approach to Collaborative Decision Making Using Computer-Supported Conflict Management Methodology", IEEE International Conference on Information Reuse and Integration, 2005, pp. 182-191.
Smith, "The Multivariable Method in Singular Perturbation Analysis", SIAM Review, 1975, pp. 221-273, vol. 17, No. 2.

(56) References Cited

OTHER PUBLICATIONS

Sripada, S., Reiter, E., and Davy, I. (2003). SumTime-Mousam: Configurable Marine Weather Forecast Generator. Expert Update 6(3):4-10.

Storyview, Screenplay Systems, 2000, user manual.

Theune, M., Klabbers, E., Odijk, J., dePijper, J., and Krahmer, E. (2001) "From Data to Speech: A General Approach", Natural Language Engineering 7(1): 47-86.

Weston et al., "A Framework for Constructing Semantically Composable Feature Models from Natural Language Requirements", SPLC '09: Proceedings of the 13th International Software Product Line Conference, Aug. 2009, p. 211-220.

Prosecution History for U.S. Appl. No. 16/183,270, filed Nov. 7, 2018, now U.S. Pat. No. 11,568,148, granted Jan. 31, 2023.

Thomas, K., and Sripada, S. (2007). Atlas.txt: Linking Geo-referenced Data to Text for NLG. Paper presented at Proceedings of the 2007 European Natural Language Generation Workshop (ENLG07).

Thomas, K., and Sripada, S. (2008). What's in a message? Interpreting Geo-referenced Data for the Visually-impaired. Proceedings of the Int. conference on NLG.

Thomas, K., Sumegi, L., Ferres, L., and Sripada, S. (2008). Enabling Access to Geo-referenced Information: Atlas.txt. Proceedings of the Cross-disciplinary Conference on Web Accessibility.

Van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.

Yu, J., Reiter, E., Hunter, J., and Mellish, C. (2007). Choosing the content of textual summaries of large time-series data sets. Natural Language Engineering, 13:25-49.

Yu, J., Reiter, E., Hunter, J., and Sripada, S. (2003). SUMTIME-TURBINE: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).

\* cited by examiner

Analysis

Process Outline    Resolve Predicates    Create Computed Outline

NLG

Process Computed Outline      Write Story

Model Generation

Model Muting

Node 1

Node 2

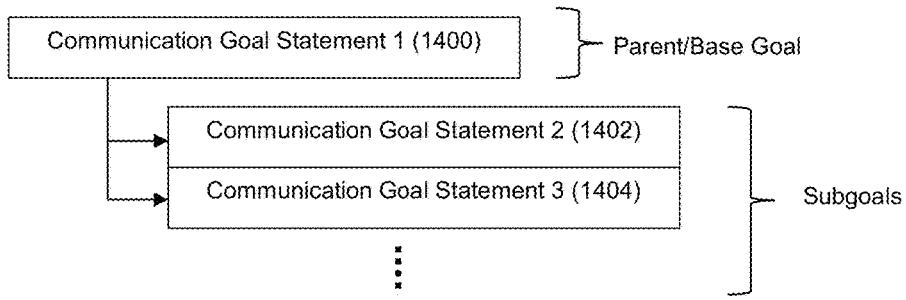
Figure 14A
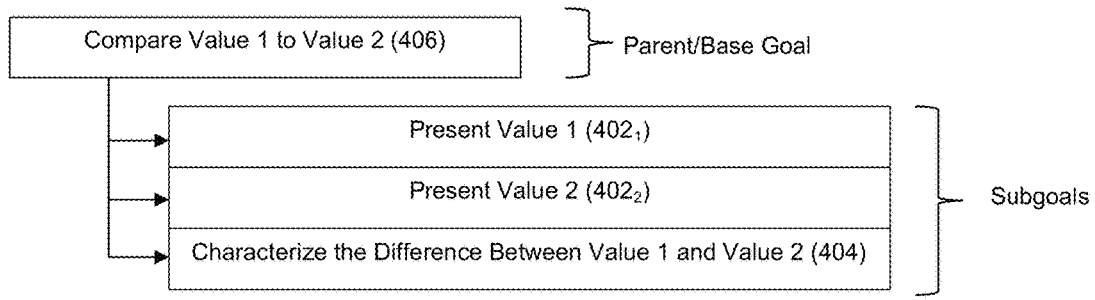
Figure 14B
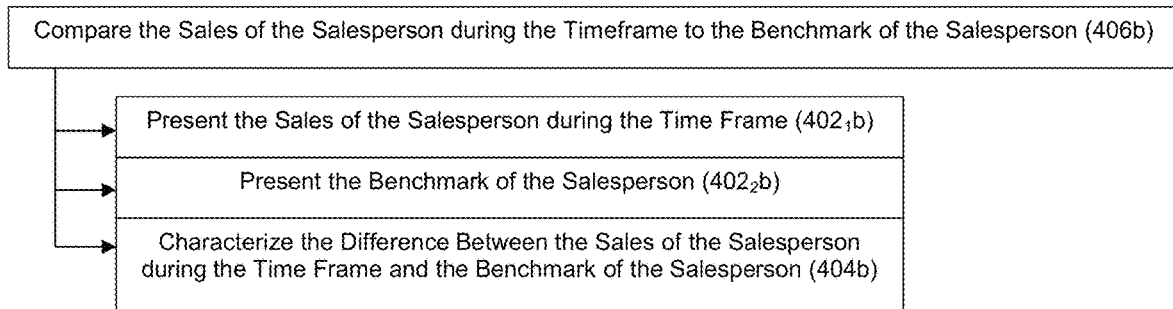
Figure 14C
"The sales in October 2014 of the salesperson was $14.5M, and the sales benchmark of the salesperson was $9.7M. The salesperson outperformed the sales benchmark of the salesperson by $4.8M."
Figure 14D

User checks "Present the mean"

User unchecks "Present the mean"

Non-Exhaustive List of Example Facts that a Narrative Generation System can Learn via Smart Attribute Models for "Explain a Change in Value"

- There continued to be 5 drivers of profit between TF1 and TF2
- They were not the same 5 drivers (one dropped, one added)
- Profit of the store was $82 in TF1 and grew to $148 in TF2 (an increase of $66 or roughly 80%)
- The average profit of the product categories was...(in TF1, TF2, absolute and percent deltas) (Plus a sense of which categories drove more/less profit of the store than average in either TF or as delta)
- The range of values was...(in TF1, TF2, absolute and percent deltas)
- D rose the most, from $30 to $60, accounting for -39% of the rise in profit of the store
- D became the largest driver of profit in TF2, but it used to be tied with C in TF1
- D used to account for 36.5% of the store's profit, now it accounts for 40.5%
- B continues to be the lowest-ranking driver of profit, accounting for 2%, but at least not detracting
- B went down by $5, holding back the rise in profit from TF1 to TF2 (but entirely offset by gains)
- There are no negative drivers/detractors from profit in either time period
- E left from the group from TF1 to TF2, representing a loss of $4 from the store's profit
- F joined the group from TF1 to TF2, driving an additional $10 towards the store's profit
- Fluctuations in product categories between TFs therefore accounted for a net gain of $6 towards the store's profit, an -8% of the overall rise

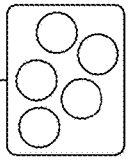

|   | Timeframe 1 | Delta | Timeframe 2 |
|---|---|---|---|
| A | 10 | 10 | 20 |
| B | 8 | -5 | 3 |
| C | 30 | 25 | 55 |
| D | 30 | 30 | 60 |
| E | 4 | - | - |
| F | - | - | 10 |

| | | |
|---|---|---|
| City Expense Report Project: Draft ▼ | | 👤 Admin User ▼ |
| Authoring | | ⓘ ⊕ |
| OUTLINE  ENTITIES  DATA REQUIREMENTS (4/4)  LIVE STORY | | |
| City | | |
| Where do I find the name? | | FUND TYPE ☑ |
| In the Department Line Items data model, which column is the identifier of a city in? | | FUND TYPE |
| Department | | |
| Where do I find the budget? | | Budget ☑ |
| What should I do if there are multiple values? | | constant |
| Where do I find the expenses? | | Expenses ☑ |
| What should I do if there are multiple values? | | constant |
| Where do I find the name? | | Department ☑ |
| What column is the identifier for city? | | FUND TYPE |

Figure 46

City Expense Report Project: *Draft* ▼   Admin User ▼

Authoring

OUTLINE   ENTITIES   DATA REQUIREMENTS (4/4)   LIVE STORY

Review ⬤ Edit                                                rewrite

The total value for expenses among the departments within the city was $625.2M. Of departments within the city, Fleet And Facility Management, Finance and Department Of Law had the highest ranking expenses.

The expenses of the highest ranking department by expenses within the city was $329.5M The highest ranking department by expenses within the city slightly exceeded the budget of the highest ranking department by expenses within the city by $9.5M. The highest ranking line item by amount recorded by the highest ranking department by expenses within the city was Salaries And Wages. Of line items recorded by the highest ranking department by expenses within the city, Drugs Medicine And Chemical Materials had the lowest ranking amount.

Department Budgets departmentexpense.csv ▼

Department Line Items cityexpense.csv ▼

Monthly Performance Update Project: *Draft* ▼   Admin User ▼

Authoring

OUTLINE   ENTITIES   DATA REQUIREMENTS (4/4)   LIVE STORY

Review ⬤ Edit                                                rewrite

The Salesperson Outperformed the Sales Benchmark of the Salesperson by $4.8M

The sales in October 2014 of the salesperson was $14.5M and the sales benchmark of the salesperson was $9.7M. The salesperson outperformed the sales benchmark of the salesperson by $4.8M.

In October 2014, Engineering Services had the highest ranking sales of sectors managed by the salesperson. The sales of the highest ranking sector by sales managed by the salesperson was $7.3M. The highest ranking sector by sales managed by the salesperson contributed 50.67% to the salesperson's sales. The highest ranking customer by sales within the highest ranking sector by sales managed by the salesperson was Magna Phasellus Dolor Incorporated. The 2nd highest ranking sector by sales managed by the salesperson was Transaction, Credit & Collections. The 2nd highest ranking sector by sales managed by the salesperson had sales of $3.4M. The 2nd highest ranking customer within the 2nd highest ranking sector by sales managed by the salesperson was Suspendisse Incorporated. Australia, Chile and Brazil had the highest ranking sales of regions managed by the salesperson. The sales of the 3 highest ranking regions by sales managed by the salesperson were $7.3M, $3.4M and $779K.

Story Variables

Month 2014-10 ▼

Salesperson Name

Jason Butler ▼

PerformanceData data_real_timeframes.csv ▼

Figure 48

City Expense Report Project: *Draft* ▾      👤 Admin User ▾

Authoring

OUTLINE  ENTITIES  DAT...   ...IVE STORY

Start on June 17, 2016
Draft Admin
Publish this Draft
Save as Blueprint
Delete Project

Review ⚪━ Edit     [ rewrite ]

The total value for expenses among the departments within the city was $625.2M. Of departments within the city, Fleet And Facility Management, Finance and Department Of Law had the highest ranking expenses.

The expenses of the highest ranking department by expenses within the city was $329.5M The highest ranking department by expenses within the city slightly exceeded the budget of the highest ranking department by expenses within the city by $9.5M. The highest ranking line item by amount recorded by the highest ranking department by expenses within the city was Salaries And Wages. Of line items recorded by the highest ranking department by expenses within the city, Drugs Medicine And Chemical Materials had the lowest ranking amount.

Department Budgets
departmentexpense.csv ▾

Department Line Items
cityexpense.csv ▾

| | Sales Performance Report Project: *Draft* ▾ | ● Admin User ▾ |
|---|---|---|

Authoring

OUTLINE  ENTITIES  DATA REQUIREMENTS (0/6)  LIVE STORY

- ▶ Compare the sales in the month of the salesperson to the benchmark in the month of the salesperson
- Search for a new goal ▼ Drivers
- ▶ Call out the highest ranking sector by sales in the month managed by the salesperson
- ▶ Present the contribution of sales in the month of the highest ranking sector by sales in the month managed by the salesperson to the salesperson
- ▶ Call out the highest ranking customer by sales in the month within the highest ranking sector by sales in the month managed by salesperson
- ▶ Call out the second highest ranking sector by sales in the month managed by the salesperson
- ▶ Present the contribution of sales in the month of the second highest ranking sector by sales in the month managed by the salesperson to the salesperson
- ▶ Call out the highest ranking customer by sales in the month within the second highest ranking sector by sales in the month managed by the salesperson
- ▶ Call out the 3 highest ranking regions by sales in the month managed by the salesperson
- Search for a new goal

Sales Performance Report Project: *Draft* ▾       ● Admin User ▾

Data Manager

VIEWS  CONNECTIONS

Add Data View

Start from Connection or

Upload a file

Figure 111

Sales Performance Report Project: *Draft* ▼     😀 Admin User ▼

Authoring

OUTLINE   ENTITIES   DATA REQUIREMENTS (0/6)   LIVE STORY

Customer

| | |
|---|---|
| Where do I find the name? | select view and column |
| Where do I find the sales? | select view and column |
| To relate a customer and a sector, where do I find the unique identifier of a sector? | select view and column |

Region

| | |
|---|---|
| Where do I find the name? | select view and column |
| Where do I find the sales? | select view and column |
| To relate a region and a salesperson, where do I find the unique identifier of a salesperson? | select view and column |

Salesperson

| | |
|---|---|
| Where do I find the benchmark? | select view and column |
| Where do I find the gender? | select view and column |

Sales Performance Report Project: *Draft* ▼     😀 Admin User ▼

Authoring

OUTLINE   ENTITIES   DATA REQUIREMENTS (6/6)   LIVE STORY

Customer

| | |
|---|---|
| Where do I find the name? | Account Name ☑ |
| Where do I find the sales? | Opportunity Licenses ☑ |
| What column is the date in? | Quarter ☑ |
| What should I do if there are multiple values? | sum |
| To relate a customer and a sector, where do I find the unique identifier of a sector? | Account Industry |
| In the Sales Performance Data data model, which column is the identifier of a customer in? | Account Name |

Region

| | |
|---|---|
| Where do I find the name? | Country Name ☑ |
| Where do I find the sales? | Opportunity Max Amount ☑ |
| What column is the date in? | Quarter ☑ |
| What should I do if there are multiple values? | sum |

Figure 115

Sales Performance Report Project: Draft ▼    👤 Admin User ▼

Authoring    Ⓐ ⊕
OUTLINE   ENTITIES   DATA REQUIREMENTS (6/6)   LIVE STORY

Region

| Where do I find the name? | Country Name ☑ |
| Where do I find the sales? | Opportunity Max Amount ☑ |
| What column is the date in? | Quarter ☑ |
| What should I do if there are multiple values? | sum |
| To relate a region and a salesperson, where do I find the unique identifier of a salesperson? | Salesperson |
| In the Sales Performance Data data model, which column is the identifier of a region in? | Country Name |

Salesperson

| Where do I find the benchmark? | Target Benchmark ☑ |
| What column is the date in? | Quarter ☑ |
| What should I do if there are multiple values? | sum |
| Where do I find the gender? | Gender ☑ |

Sales Performance Report Project: Draft ▼    👤 Admin User ▼

Authoring    Ⓐ ⊕
OUTLINE   ENTITIES   DATA REQUIREMENTS (6/6)   LIVE STORY

Salesperson

| Where do I find the benchmark? | Target Benchmark ☑ |
| What column is the date in? | Quarter ☑ |
| What should I do if there are multiple values? | Sum |
| Where do I find the gender? | Gender ☑ |
| Where do I find the name? | Salesperson ☑ |
| Where do I find the sales? | Opportunity Max Amount ☑ |
| What column is the date in? | Quarter ☑ |
| What should I do if there are multiple values? | sum |
| In the Sales Performance Data data model, which column is the identifier of a salesperson in? | Salesperson |

Sector

| Where do I find the name? | Account Industry ☑ |

Figure 117

Sales Performance Report Project: Draft ▼      👤 Admin User ▼

Authoring

OUTLINE   ENTITIES   DATA REQUIREMENTS (6/6)   LIVE STORY

---

Region

| | |
|---|---|
| Where do I find the name? | Account Industry ☑ |
| Where do I find the sales? | Opportunity Max Amount ☑ |
| What column is the date in? | Quarter ☑ |
| What should I do if there are multiple values? | sum |
| To relate a sector and a salesperson, where do I find the unique identifier of a salesperson? | Salesperson |
| In the Sales Performance Data data model, which column is the identifier of a sector in? | Account Industry |

I need the month this story is about

| | |
|---|---|
| Where do I find the month? | Story Variable |

I need the salesperson this story is about

| | |
|---|---|
| Where do I find the salesperson? | Story Variable |

Monthly Performance Update Project: Draft ▼     👤 Admin User ▼

Authoring

OUTLINE   ENTITIES   DATA REQUIREMENTS (6/6)   LIVE STORY

Review ⬤ Edit     [ rewrite ]

There was a $4.8M difference between the sales in October 2014 of the salesperson and the benchmark of the salesperson.

The sales in October 2014 of the salesperson was $14.5M and the benchmark of the salesperson was $9.7M. There was a $4.8M difference between the sales of the salesperson and the benchmark of the salesperson.

In October 2014, of sectors managed by the salesperson, Engineering Services had the highest ranking sales. The highest ranking sector by sales managed by the salesperson contributed 50.67% to the salesperson's sales. The highest ranking customer by sales within the highest ranking sector by sales managed by the salesperson was Magna Phasellus Dolor Incorporated. The 2nd highest ranking sector by sales managed by the salesperson was Transaction, Credit & Collections. The 2nd highest ranking sector by sales managed by the salesperson contributed 23.64% to the salesperson's sales. The highest ranking customer by sales within the 2nd highest ranking sector by sales managed by the salesperson was Suspendissse Incorporated. Of regions managed by the salesperson, Australia, Chile and Brazil had the highest ranking sales.

Story Variables

Month
[ 2014-10 ▼ ]

Salesperson Identifier
[ Jason Butler ▼ ]

Sales Performance Data
[ Sales Performance Data.csv ▼ ]

Sales Performance Report Project: *Draft* ▼     👤 Admin User ▼

Authoring

OUTLINE  ENTITIES  DATA REQUIREMENTS (0/3)  LIVE STORY

Timeframes month

--- salesperson  PERSON     x

| Specific | Generic Singular | Generic Plural |
|---|---|---|
| ✓ [name] | ✓ salesperson | ✓ salespeople |
| + add expression | + add expression | + add expression |

Characterizations

Performance

| ▼ star | the salesperson was outstanding, it was a(n) star, they were stars |
|---|---|
| the sales is greater than 10000 | |
| + Qualification | |

+ Outcome

| default | the salesperson was adequate, it was a(n) average performer, they were average performers |

Sales Performance Report Project: *Draft* ▼     👤 Admin User ▼

Authoring

OUTLINE  ENTITIES  DATA REQUIREMENTS (0/3)  LIVE STORY

Timeframes month

+ add expression     + add expression

Characterizations

Performance

| ▶ star | the salesperson was outstanding, it was a(n) star, they were stars |
|---|---|
| ▶ laggard | the salesperson was disappointing, it was a(n) laggard, they were laggards |

+ Outcome

| default | the salesperson was adequate, it was a(n) average performer, they were average performers |

+ Characterization

Attributes

| benchmark | currency |
|---|---|
| gender | string |

| | |
|---|---|
| | ACME Budget Report Project: *Draft* ▼     🙂 Admin User ▼ |
| ✎ | Authoring    ⊕Ⓐ⊕⊕ |
| Authoring | OUTLINE   ENTITIES   DATA REQUIREMENTS (0/6)   LIVE STORY |
| ▦ Data Manager | ▼ The City |
| | ▶ Call out the 3 highest ranking departments by expenses in the month within the city |
| ⚙ Admin | ▶ Call out the people employed by the department |
| | Search for a new goal |
| | ▼ The highest ranking department |
| | ▶Compare the expenses of the highest ranking department by expenses within the city to the budget of the highest ranking department by expenses within the city   Txt ▼ 🗑 ▦ |
| | Search for a new goal |
| | + Section |

| | ACME Budget Report Project: *Draft* ▼ | 🟢 Admin User ▼ |
|---|---|---|
| ✏️ Authoring | Authoring | 🅣🅐🅐⊕ |
| | OUTLINE  ENTITIES  DATA REQUIREMENTS (0/6)  LIVE STORY | |

| City | |
|---|---|
| Where do I find the expenses? | select view and column |
| Where do I find the name? | select view and column |
| In the Chicago Expenses data model, which column is the identifier of a city in? | select view and column |

| Department | |
|---|---|
| Where do I find the budget? | select view and column |
| Where do I find the expenses? | select view and column |
| Where do I find the name? | select view and column |
| What column is the identifier for city? | select view and column |
| In the Chicago Expenses data model, which column is the identifier of a department in? | select view and column |

| ACME Budget Report Project: Draft ▼ | | Admin User ▼ |
|---|---|---|
| Authoring | | ⓘⒶⒶ⊕ |
| OUTLINE  ENTITIES  DATA REQUIREMENTS (3/4)  LIVE STORY | | |

| City | |
|---|---|
| Where do I find the name? | FUND TYPE ☑ |
| In the Chicago Expenses data model, which column is the identifier of a city in? | FUND TYPE |

| Department | |
|---|---|
| Where do I find the budget? | Budget ☑ |
| What should I do if there are multiple values? | constant |
| Where do I find the expenses? | Expenses ☑ |
| What column is the date in? | Year ☑ |
| What should I do if there are multiple values? | constant |
| Where do I find the name? | Department ☑ |
| What column is the identifier for city? | FUND TYPE |

Select format
- 01-31-2015
- 01/31/15
- 01/31/2015
- 31-Jan-2015
- Jan 31, 2015
- Tuesday, January 31, 2015
- Tuesday, January 31, 2015, 01:30 AM
- 2015-01-31T01:30:00-0600
- 20150131
- 2015-01-31 13:30:00
- 01-31-2015 01:30:45
- 31-01-2015 01:30:45
- 1/31/2015 1:30:45
- 01/31/2015 1:30:45 AM
- 31/01/2015 01:30:4

Figure 235

| ACME Budget Report Project: Draft ▼ | | Admin User ▼ |
|---|---|---|
| Authoring | | ⓘⒶⒶ⊕ |
| OUTLINE  ENTITIES  DATA REQUIREMENTS (3/4)  LIVE STORY | | |

| City | |
|---|---|
| Where do I find the name? | FUND TYPE ☑ |
| In the Chicago Expenses data model, which column is the identifier of a city in? | FUND TYPE |

Department

Monthly Performance Update Project: *Draft* ▼     ⊙ Admin User ▼

Authoring    Ⓐ Ⓣ ⊕

OUTLINE   ENTITIES   DATA REQUIREMENTS (6/6)   <u>LIVE STORY</u>

Review ⬤ Edit     [rewrite]

The Salesperson Outperformed the Sales Benchmark of the Salesperson by $4.8M The sales in October 2014 of the salesperson was $14.5M and the sales benchmark of the salesperson was $9.7M. The salesperson outperformed the sales benchmark of the salesperson by $4.8M.

In October 2014, Engineering Services had the highest ranking sales of sectors managed by the salesperson. The sales of the highest ranking sector by sales managed by the salesperson was $7.3M. The highest ranking sector by sales managed by the salesperson contributed 50.67% to the salesperson's sales. The highest ranking customer by sales within the highest ranking sector by sales managed by the salesperson was Magna Phasellus Dolor Incorporated. The 2nd highest ranking sector by sales managed by the salesperson was Transaction, Credit & Collections. The 2nd highest ranking sector by sales managed by the salesperson had sales of $3.4M. The 2nd highest ranking sector by sales managed by the salesperson contributed 23.64% to the salesperson's sales. The highest ranking customer by sales within the 2nd highest ranking sector by sales managed by the salesperson was Suspendisse Incorporated. Australia, Chile and Brazil had the highest ranking sales of regions managed by the salesperson. The sales of the 3 highest ranking regions by sales managed by the salesperson were $7.3M, $3.4M and $779K.

Story Variables

Month

[ 2014-10 ▼ ]

Salesperson Name

[ Jason Butler ▼ ]

PerformanceData

[ data_real_timeframe.csv ▼ ]

| | Monthly Performance Update Project: *Draft* ▼ | | | | | 👤 Admin User ▼ |
|---|---|---|---|---|---|---|

Authoring

OUTLINE  ENTITIES  DATA REQUIREMENTS (6/6)  LIVE STORY

Review ⚫🔘 Edit                                                    [ rewrite ]

---

The Salesperson Outperformed the Sales Benchmark of the Salesperson by $4.8M The sales in October 2014 of the salesperson was $14.5M and the sales benchmark of the salesperson was $9.7M. The salesperson (outperformed) the sales benchmark of the salesperson by $4.8M.

In October 2014, Engineering Services had the highest ranking sales of sectors managed by the salesperson. The sales of the highest ranking sector by sales managed by the salesperson was $7.3M. The highest ranking sector by sales managed by the salesperson contributed 50.67% to the salesperson's sales. The highest ranking customer by sales within the highest ranking sector by sales managed by the salesperson was Magna Phasellus Dolor Incorporated. The 2nd highest ranking sector by sales managed by the salesperson was Transaction, Credit & Collections. The 2nd highest ranking sector by sales managed by the salesperson had sales of $3.4M. The 2nd highest ranking sector by sales managed by the salesperson contributed 23.64% to the salesperson's sales. The highest ranking customer by sales within the 2nd highest ranking sector by sales managed by the salesperson was Suspendisse Incorporated. Australia, Chile and Brazil had the highest ranking sales of regions managed by the salesperson. The sales of the 3 highest ranking regions by sales managed by the salesperson were $7.3M, $3.4M and $779K.

Story Variables

Month
[ 2014-10 ▼ ]

Salesperson Name
[ Jason Butler ▼ ]

PerformanceData
[ data_real_timeframe.csv ▼ ]

Figure 263

| Monthly Performance Update Project: *Draft* ▼ | | 👤 Admin User ▼ |

Authoring

OUTLINE  ENTITIES  DATA REQUIREMENTS (6/6)  LIVE STORY

Review ●○ Edit  [rewrite]

Edit expressions ✕

The Salesperson Outperformed the Sales Benchmark of the Salesperson by $4.8M

The sales in October 2014 of the salesperson was $14.5M and the sales benchmark of the salesperson was $9.7M. The salesperson outperformed the sales benchmark of the salesperson by $4.8M.

In October 2014, Engineering Services had the highest ranking sales of sectors managed by the salesperson. The sales of the highest ranking sector by sales managed by the salesperson was $7.3M. The highest ranking sector by sales managed by the salesperson contributed 50.67% to the salesperson's sales. The highest ranking customer by sales within the highest ranking sector by sales managed by the salesperson was Magna Phasellus Dolor Incorporated. The 2nd highest ranking sector by sales managed by the salesperson was Transaction, Credit & Collections. The 2nd highest ranking sector by sales managed by the salesperson had sales of $3.4M. The 2nd highest ranking sector by sales managed by the salesperson contributed 23.64% to the salesperson's sales. The highest ranking customer by sales within the 2nd highest ranking sector by sales managed by the salesperson was Suspendisse Incorporated. Australia, Chile and Brazil had the highest ranking sales of regions managed by the salesperson. The sales of the 3 highest ranking regions by sales managed by the salesperson were $7.3M, $3.4M and $779K.

- outperformed
- primary
- ✓ outperformed
- + add expression

| | |
|---|---|
| | Monthly Performance Update Project: *Draft* ▼     👤 Admin User ▼ |
| ✎ Authoring | Authoring    Ⓐ Ⓣ ⊕ |
| | OUTLINE   ENTITIES   DATA REQUIREMENTS (6/6)   <u>LIVE STORY</u> |
| ▦ Data Manager | (Review ⬤━━ Edit)     [rewrite] |
| ⚙ Admin | |

The Salesperson Outperformed the Sales Benchmark of the Salesperson by $4.8M

The sales in October 2014 of the salesperson was $14.5M and the sales benchmark of the salesperson was $9.7M. The salesperson outperformed the sales benchmark of the salesperson by $4.8M.

In October 2014, Engineering Services had the highest ranking sales of sectors managed by the salesperson. The sales of the highest ranking sector by sales managed by the salesperson was $7.3M. The highest ranking sector by sales managed by the salesperson contributed 50.67% to the salesperson's sales. The highest ranking customer by sales within the highest ranking sector by sales managed by the salesperson was Magna Phasellus Dolor Incorporated. The 2nd highest ranking sector by sales managed by the salesperson was Transaction, Credit & Collections. The 2nd highest ranking sector by sales managed by the salesperson had sales of $3.4M. The 2nd highest ranking sector by sales managed by the salesperson contributed 23.64% to the salesperson's sales. The highest ranking customer by sales within the 2nd highest ranking sector by sales managed by the salesperson was Suspendisse Incorporated. Australia, Chile and Brazil had the highest ranking sales of regions managed by the salesperson. The sales of the 3 highest ranking regions by sales managed by the salesperson were $7.3M, $3.4M and $779K.

Story Variables

Month
2014-10 ▼

Salesperson Name
Jason Butler ▼

PerformanceData
data_real_timeframe.csv ▼

APPLIED ARTIFICIAL INTELLIGENCE TECHNOLOGY FOR NARRATIVE GENERATION BASED ON EXPLANATION COMMUNICATION GOALS

CROSS-REFERENCE AND PRIORITY CLAIM TO RELATED PATENT APPLICATIONS

This patent application is a continuation of U.S. Pat. No. 11,568,148, filed Nov. 7, 2018, and entitled "Applied Artificial Intelligence Technology for Narrative Generation Based on Explanation Communication Goals", where the '270 application (a) claims priority to U.S. provisional patent application Ser. No. 62/585,809, filed Nov. 14, 2017, and entitled "Applied Artificial Intelligence Technology for Narrative Generation Based on Smart Attributes and Explanation Communication Goals", (b) is also a continuation-in-part of U.S. Pat. No. 10,699,079, filed Jul. 27, 2018, and entitled "Applied Artificial Intelligence Technology for Narrative Generation Based on Analysis Communication Goals", where the '800 application (1) claims priority to U.S. provisional patent application Ser. No. 62/539,832, filed Aug. 1, 2017, and entitled "Applied Artificial Intelligence Technology for Narrative Generation Based on Analysis Communication Goals", and (2) is a continuation-in-part of (i) U.S. patent Ser. No. 15/897,331 U.S. Pat. No. 10,762,304, filed Feb. 15, 2018, and entitled "Applied Artificial Intelligence Technology for Performing Natural Language Generation (NLG) Using Composable Communication Goals and Ontologies to Generate Narrative Stories", (ii) U.S. patent Ser. No. 15/897,350 U.S. Pat. No. 10,585,983, filed Feb. 15, 2018, and entitled "Applied Artificial Intelligence Technology for Determining and Mapping Data Requirements for Narrative Stories to Support Natural Language Generation (NLG) Using Composable Communication Goals", (iii) U.S. Pat. No. 10,755,053, filed Feb. 15, 2018, and entitled "Applied Artificial Intelligence Technology for Story Outline Formation Using Composable Communication Goals to Support Natural Language Generation (NLG)", (iv) U.S. Pat. No. 10,572,606, filed Feb. 15, 2018, and entitled "Applied Artificial Intelligence Technology for Runtime Computation of Story Outlines to Support Natural Language Generation (NLG)", (v) U.S. Pat. No. 10,719,542, filed Feb. 15, 2018, and entitled "Applied Artificial Intelligence Technology for Ontology Building to Support Natural Language Generation (NLG) Using Composable Communication Goals", and (vi) U.S. Pat. No. 10,713,442, filed Feb. 15, 2018, and entitled "Applied Artificial Intelligence Technology for Interactive Story Editing to Support Natural Language Generation (NLG)", each of which claims priority to U.S. provisional patent application Ser. No. 62/460,349, filed Feb. 17, 2017, and entitled "Applied Artificial Intelligence Technology for Performing Natural Language Generation (NLG) Using Composable Communication Goals and Ontologies to Generate Narrative Stories", and (c) is also a continuation-in-part of U.S. Pat. No. 10,943,069, filed Jul. 27, 2018, and entitled "Applied Artificial Intelligence Technology for Narrative Generation Based on a Conditional Outcome Framework", where the '837 application (1) claims priority to U.S. provisional patent application Ser. No. 62/539,832, filed Aug. 1, 2017, and entitled "Applied Artificial Intelligence Technology for Narrative Generation Based on Analysis Communication Goals", and (2) is a continuation-in-part of (i) U.S. Pat. No. 10,762,304, filed Feb. 15, 2018, and entitled "Applied Artificial Intelligence Technology for Performing Natural Language Generation (NLG) Using Composable Communication Goals and Ontologies to Generate Narrative Stories", (ii) U.S. Pat. No. 10,585,983, filed Feb. 15, 2018, and entitled "Applied Artificial Intelligence Technology for Determining and Mapping Data Requirements for Narrative Stories to Support Natural Language Generation (NLG) Using Composable Communication Goals", (iii) U.S. Pat. No. 10,755,053, filed Feb. 15, 2018, and entitled "Applied Artificial Intelligence Technology for Story Outline Formation Using Composable Communication Goals to Support Natural Language Generation (NLG)", (iv) U.S. Pat. No. 10,572,606, filed Feb. 15, 2018, and entitled "Applied Artificial Intelligence Technology for Runtime Computation of Story Outlines to Support Natural Language Generation (NLG)", (v) U.S. Pat. No. 10,719,542, filed Feb. 15, 2018, and entitled "Applied Artificial Intelligence Technology for Ontology Building to Support Natural Language Generation (NLG) Using Composable Communication Goals", and (vi) U.S. Pat. No. 10,713,442, filed Feb. 15, 2018, and entitled "Applied Artificial Intelligence Technology for Interactive Story Editing to Support Natural Language Generation (NLG)", each of which claims priority to U.S. provisional patent application Ser. No. 62/460,349, filed Feb. 17, 2017, and entitled "Applied Artificial Intelligence Technology for Performing Natural Language Generation (NLG) Using Composable Communication Goals and Ontologies to Generate Narrative Stories", the entire disclosures of each of which are incorporated herein by reference.

This patent application is related to U.S. patent Ser. No. 16/183,230 U.S. Pat. No. 11,068,661, filed Nov. 7, 2018, and entitled "Applied Artificial Intelligence Technology for Narrative Generation Based on Smart Attributes", the entire disclosure of which is incorporated herein by reference.

INTRODUCTION

There is an ever-growing need in the art for improved natural language generation (NLG) technology that harnesses computers to process data sets and automatically generate narrative stories about those data sets. NLG is a subfield of artificial intelligence (AI) concerned with technology that produces language as output on the basis of some input information or structure, in the cases of most interest here, where that input constitutes data about some situation to be analyzed and expressed in natural language. Many NLG systems are known in the art that use template approaches to translate data into text. However, such conventional designs typically suffer from a variety of shortcomings such as constraints on how many data-driven ideas can be communicated per sentence, constraints on variability in word choice, and limited capabilities of analyzing data sets to determine the content that should be presented to a reader.

As technical solutions to these technical problems in the NLG arts, the inventors note that the assignee of the subject patent application has previously developed and commercialized pioneering technology that robustly generates narrative stories from data, of which a commercial embodiment is the QUILL™ narrative generation platform from Narrative Science Inc. of Chicago, IL. Aspects of this technology are described in the following patents and patent applications: U.S. Pat. Nos. 8,374,848, 8,355,903, 8,630,844, 8,688,434, 8,775,161, 8,843,363, 8,886,520, 8,892,417, 9,208,147, 9,251,134, 9,396,168, 9,576,009, 9,697,197, 9, 697,492, 9,720,890, 9,977,773, 10,185,477, 10,853,583, 11,144,838, 11,238,090, and 11,341,338; the entire disclosures of each of which are incorporated herein by reference.

The inventors have further extended on this pioneering work with improvements in AI technology as described herein.

For example, the inventors disclose how AI technology can be used in combination with composable communication goal statements and an ontology to facilitate a user's ability to quickly structure story outlines in a manner usable by a narrative generation system without any need to directly author computer code.

Moreover, the inventors also disclose that the ontology used by the narrative generation system can be built concurrently with the user composing communication goal statements.

Further still, expressions can be attached to objects within the ontology for use by the narrative generation process when expressing concepts from the ontology as text in a narrative story. As such, the ontology becomes a re-usable and shareable knowledge-base for a domain that can be used to generate a wide array of stories in the domain by a wide array of users/authors.

The inventors further disclose techniques for editing narrative stories whereby a user's editing of text in the narrative story that has been automatically generated can in turn automatically result in modifications to the ontology and/or a story outline from which the narrative story was generated. Through this feature, the ontology and/or story outline is able to learn from the user's edits and the user is alleviated from the burden of making further corresponding edits of the ontology and/or story outline.

The inventors further disclose how the narrative analytics that are linked to communication goal statements can employ a conditional outcome framework that allows the content and structure of resulting narratives to intelligently adapt as a function of the nature of the data under consideration.

Further still, the inventors also disclose how "analyze" communication goals can be supported by the system, including various examples of communication goal statements that drive the generation of narratives that express various ideas that are deemed relevant to a given analysis communication goal.

The inventors also disclose how the attribute structures within the ontology can include an explicit model for the subject attribute, regardless of whether that model is used to compute the value of the subject attribute itself. This explicit model can then be leveraged to support an investigation of drivers of the value for the subject attribute. Narrative analytics that perform such driver analysis can then be used to support narrative generation for communication goals relating to explanations, predictions, recommendations, and the like.

Furthermore, the inventors also disclose how "explain" communication goals can be supported by the system in combination with driver analysis supported by the explicit attribute models, including various examples of communication goal statements that drive the generation of narratives that express various ideas that are deemed relevant to a given explanation communication goal.

Through these and other features, example embodiments of the invention provide significant technical advances in the NLG arts by harnessing AI computing to improve how narrative stories are generated from data sets while alleviating users from a need to directly code and re-code the narrative generation system, thereby opening up use of the AI-based narrative generation system to a much wider base of users (e.g., including users who do not have specialized programming knowledge).

BRIEF DESCRIPTION OF THE DRAWINGS

FIGS. 14A-D illustrate an example of how a communication goal statement can include subgoals that drive the narrative generation process.

FIG. 25A shows an example list of facts that can be learned about a data set by a narrative generation system using smart attributes in connection with a communication goal statement for "Explain a Change in Value of an Attribute

DETAILED DESCRIPTION OF EXAMPLE EMBODIMENTS

The example embodiments described herein further extend and innovate on the pioneering work described in the above-referenced and incorporated patent application serial numbers U.S. Pat. Nos. 9,576,009, 9,697,197, 9,697,492, 9,720,890, and 9,977,773, where explicit representations of communication goals are used by AI technology to improve how NLG technology generates narratives from data. With example embodiments described herein, AI technology is able to process a communication goal statement in relation to a data set in order to automatically generate narrative text about that data set such that the narrative text satisfies a communication goal corresponding to the communication goal statement. Furthermore, innovative techniques are disclosed that allow users to compose such communication goal statements in a manner where the composed communication goal statements exhibit a structure that promotes re-usability and robust story generation.

Figure 1A:
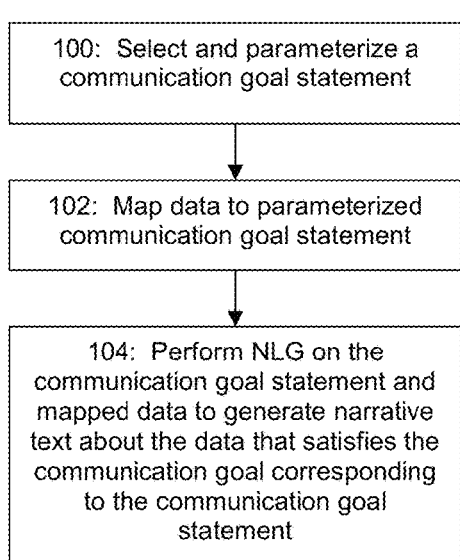
FIGS. 1A-B and 2 depict various process flows for example embodiments.

FIG. 1A depicts a process flow for an example embodiment. At step 100, a processor selects and parameterizes a communication goal statement. The processor can perform this step in response to user input as discussed below with respect to example embodiments. The communication goal statement can be expressed as natural language text, preferably as an operator in combination with one or more parameters, as elaborated upon below.

At step 102, a processor maps data within the data set to the parameters of the communication goal statement. The processor can also perform this step in response to user input as discussed below with respect to example embodiments.

At step 104, a processor performs NLG on the parameterized communication goal statement and the mapped data. The end result of step 104 is the generation of narrative text based on the data set, where the content and structure of the narrative text satisfies a communication goal corresponding to the parameterized communication goal statement.

Figure 1B:
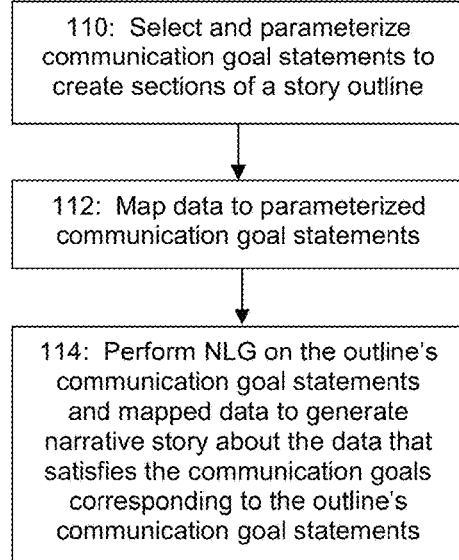

While FIG. 1A describes a process flow that operates on a communication goal statement, it should be understood that multiple communication goal statements can be composed and arranged to create sections of an outline for a story that is meant to satisfy multiple communication goals. FIG. 1B depicts an example process flow for narrative generation based on multiple communication goal statements. At step 110, multiple communication goal statements are selected and parameterized to create sections of a story outline. At step 112, a processor maps data within a data set to these communication goal statements as with step 102 (but for multiple communication goal statements). Step 114 is likewise performed in a manner similar to that of step 104 but on the multiple communication goal statements and the mapped data associated therewith. The end result of step 114 is a narrative story about the data set that conveys information about the data set in a manner that satisfies the story outline and associated communication goals.

It should be understood that steps 102 and 104, as well as steps 112 and 114, need not be performed in lockstep order with each other where step 102 (or 112) maps all of the data before the system progresses to step 104 (or step 114). These steps can be performed in a more iterative manner if desired, where a portion of the data is mapped at step 102 (or step 112), followed by execution of step 104 (or step 114) on that mapped data, whereupon the system returns to step 102/112 to map more data for subsequent execution of step 104/114, and so on.

Furthermore, it should be understood that a system that executes the process flows of FIGS. 1A and/or 1B may involve multiple levels of parameterization. For example, not only is there parameterization in the communication goals to build story outlines, but there can also be parameterization of the resulting story outline with the actual data used to generate a story, as explained hereinafter with respect to example embodiments.

Figure 2:
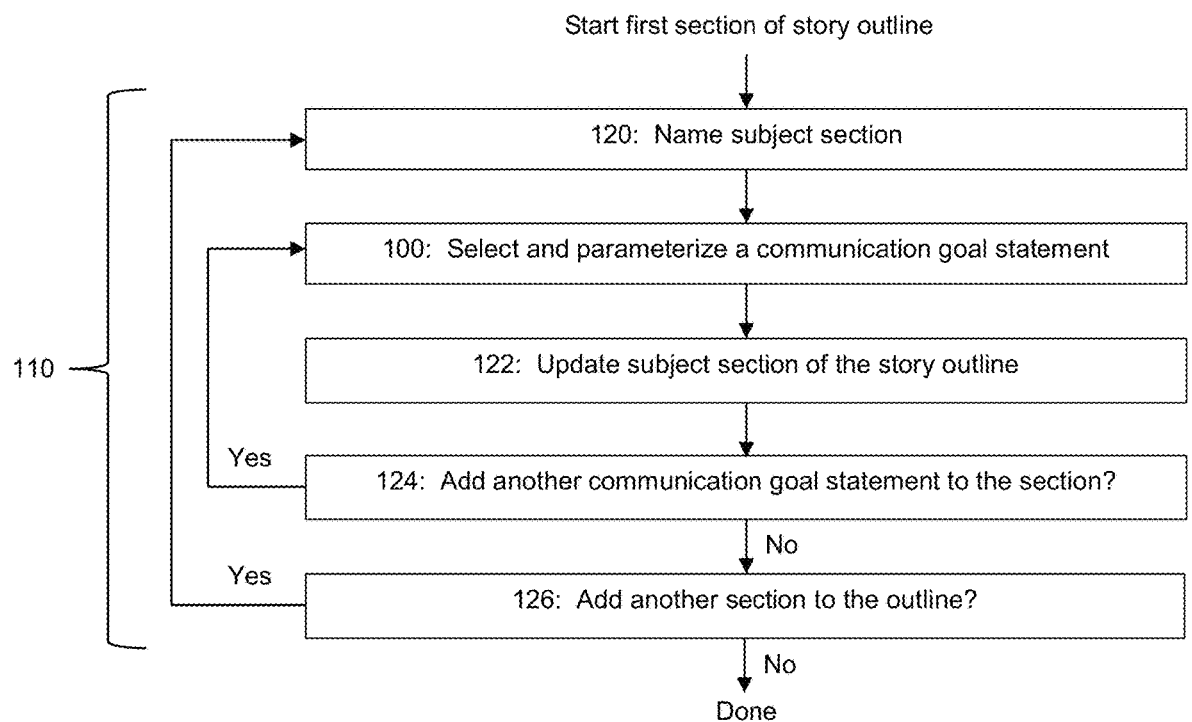

FIG. 2 depicts an example process flow that shows how a story outline can be composed as part of step 110. The process flow of FIG. 2 can be performed by a processor in response to user input through a user interface. To begin the process, a name is provided for a section (step 120). Within this section, step 100 is performed to define a communication goal statement for the subject section. At step 122, the section is updated to include this communication goal statement. The process flow then determines whether another communication goal statement is to be added to the subject section (step 124). If so, the process flow returns to steps 100 and 122. If not, the process flow proceeds to step 126. At step 126, the process flow determines whether another section is to be added to the story outline. If so, the process flow returns to step 120. Otherwise, the process flow concludes and the story outline is completed. Thus, through execution of the process flow of FIG. 2, a processor can generate a story outline comprising a plurality of different sections, where each section comprises one or more communication goal statements. This story outline in turn defines the organization and structure of a narrative story generated from a data set and determines the processes required to generate such a story.

The previous example shows how an outline can be built by adding sections and parameterizing goals completely from scratch. The user is generally not expected to start from scratch, however. A narrative generation system instance will generally include a library of prebuilt components that users can utilize to more easily and quickly build out their outline. The narrative generation system's library provides access to previously parameterized and composed goals, subsections, sections, and even fully defined outlines. These re-usable components come fully parameterized, but can be updated or adjusted for the specific project. These changes are initially isolated from the shared library of components.

Components from the system's shared library can be used in two ways. First, a new project can be created from an entire project blueprint providing all aspects of a project already defined. This includes sample data, data views, the ontology, outline, sections, parameterized goals, and data mappings. Second, a user can pull in predefined components from the system's library ad hoc while building a new project. For example, when adding a section to an outline, the user can either start from scratch with an empty section or use a predefined section that includes a set of fully parameterized goals.

The system's library of components can be expanded by users of the platform through a mechanism that enables users to share components they have built. Once a component (outline, ontology, section, etc.) is shared, other users can then use them from the system's library in their own projects.

Figure 3A:
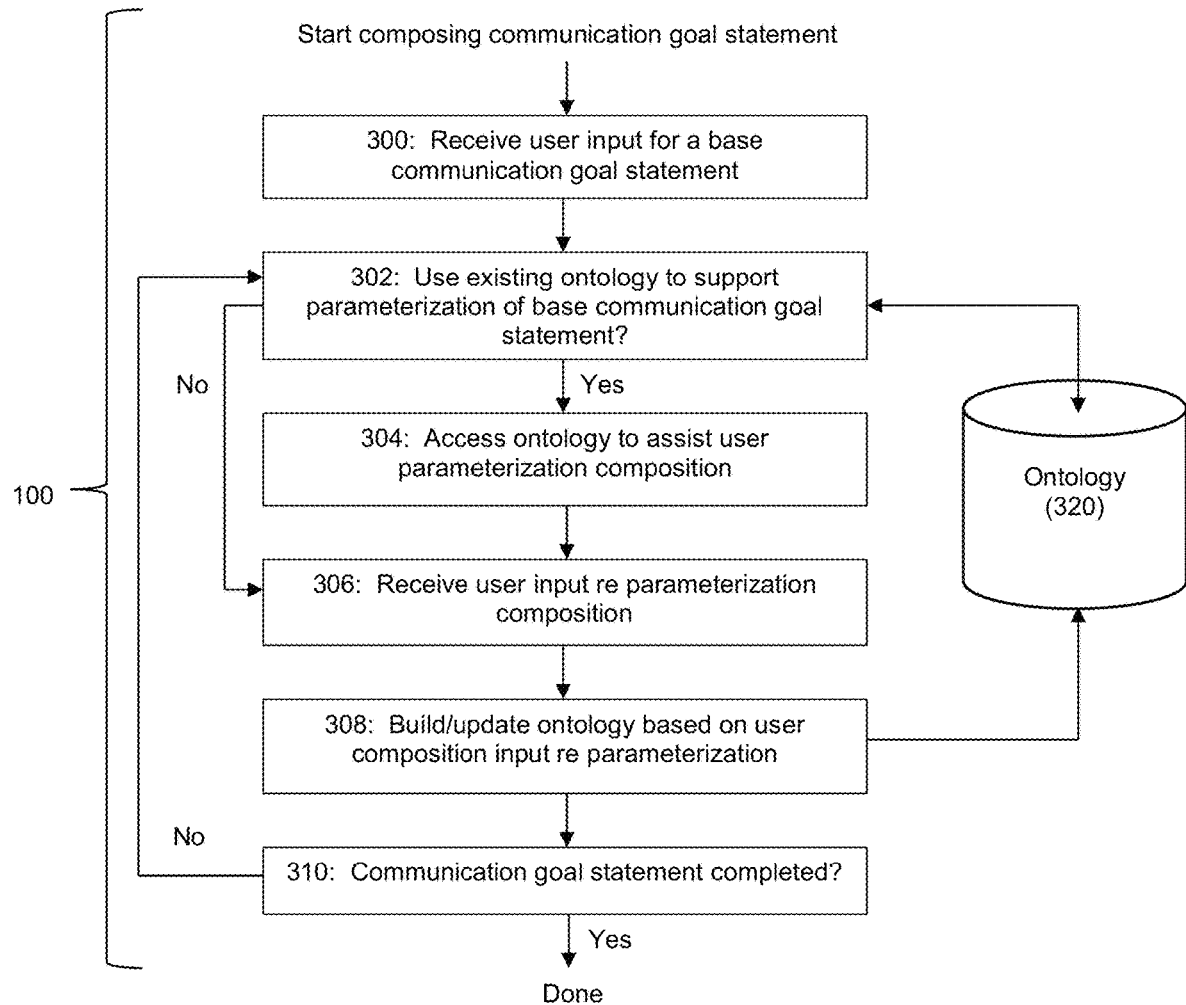
FIG. 3A depicts an example process flow for composing a communication goal statement.
Figure 4A:
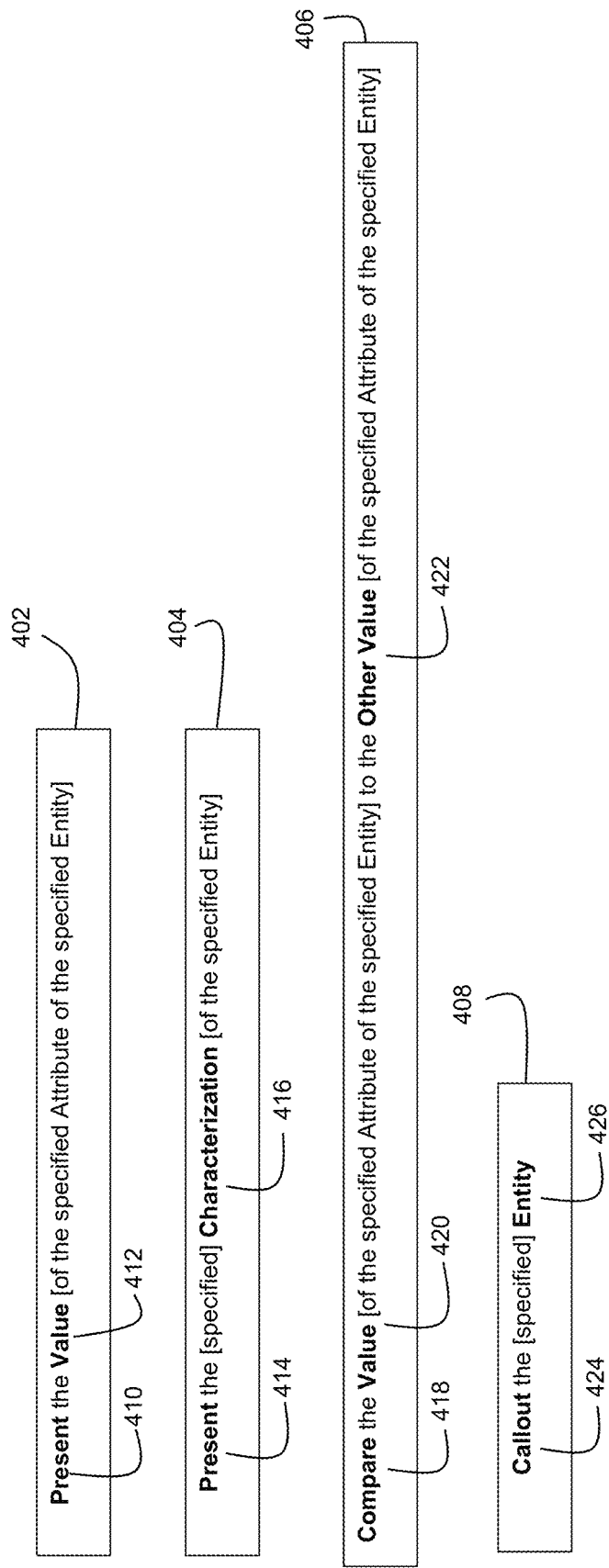
FIG. 4A depicts examples of base communication goal statements.

Composable Communication Goal Statements:

FIG. 3A depicts an example process flow for composing a communication goal statement, where the process flow of FIG. 3A can be used to perform step 100 of FIGS. 1A and 2 (see also step 110 of FIG. 1B). The process flow of FIG. 3A can be performed by a processor in response to user input through a user interface. The process flow begins at step 300 when the processor receives user input that indicates a base communication goal statement. The base communication goal statement serves as a skeleton for a parameterized and composed communication goal and may comprise one or more base goal elements that serve to comprise the parameterized and composed communication goal statement. Base goal elements are the smallest composable building blocks of the system out of which fully parameterized communication goal statements are constructed. Internal to the system, they are structured objects carrying necessary information to serve as the placeholders for parameters that are to be determined during the composition process. Communication goal statements are displayed to the user in plain language describing the goal's operation and bound parameters. In an example embodiment, the base communication goal statement is represented to a user as an operator and one or more words, both expressed in natural language, and where operator serves to identify a communication goal associated with the base communication goal statement and where the one or more words stand for the base goal elements that constitute parameters of the parameterized communication goal statement. FIG. 4A depicts examples of base communication goal statements as presented to a user that can be supported by an example embodiment.

As shown by FIG. 4A, base communication goal statement 402 is "Present the Value" where the word "Present" serves as the operator 410 and "Value" serves as the parameter placeholder 412. The operator 410 can be associated with a set of narrative analytics (discussed below) that define how the AI will analyze a data set to determine the content that is to be addressed by a narrative story that satisfies the "Present the Value" communication goal. The parameter placeholder 412 is a field through which a user specifies an attribute of an entity type to thereby define a parameter to be used as part of the communication goal statement and subsequent story generation process. As explained below, the process of parameterizing the parameter placeholders in the base communication goal statements can build and/or leverage an ontology that represents a knowledge base for the domain of the story generation process.

Figure 4B:
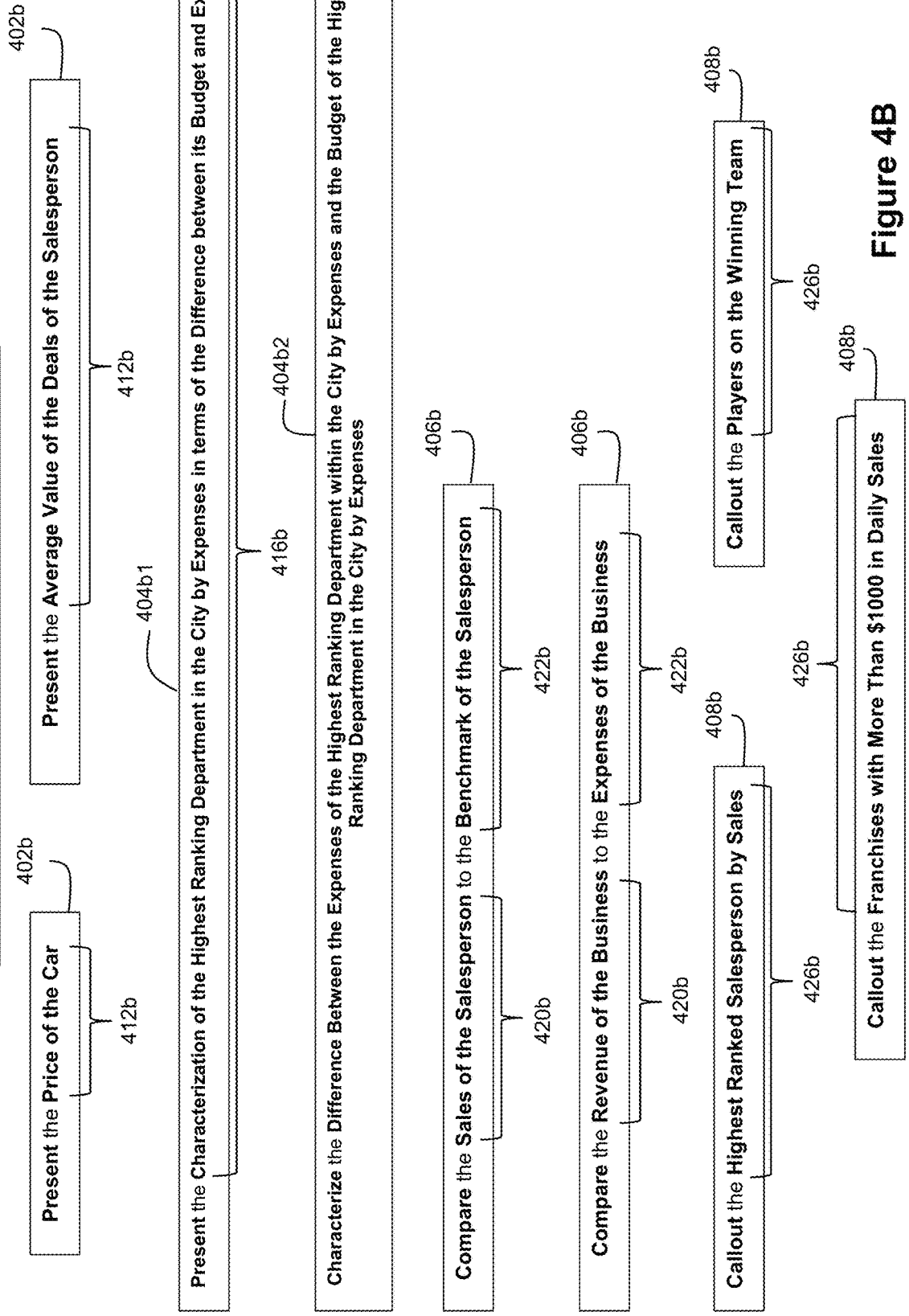
FIG. 4B depicts examples of parameterized communication goal statements corresponding to the base communication goal statements of FIG. 4A.

As shown by FIG. 4B, another example of a base communication goal statement is base communication goal statement 404, which is expressed as "Present the Characterization", but could also be expressed as "Characterize the Entity". In these examples, "Present" (or "Characterize") can serve as operator 414 can "Characterization" (or Entity") can serve as a parameter placeholder 416. This base communication goal statement can be used to formulate a communication goal statement geared toward analyzing a data set in order to express an editorial judgment about data within the data set.

As shown by FIG. 4B, another example of a base communication goal statement is base communication goal statement 406, which is expressed as "Compare the Value to the Other Value", where "Compare" serves as operator 418, "Value" serves as a parameter placeholder 420, and "Other Value" serves as parameter placeholder 422. The "Compare" operator 418 can be associated with a set of narrative analytics that are configured to compute various metrics indicative of a comparison between the values corresponding to specified attributes of specified entities to support the generation of a narrative that expresses how the two values compare with each other.

Another example of a base communication goal statement is "Callout the Entity" 408 as shown by FIG. 4A. In this example, "Callout" is operator 424 and "Entity" is the parameter placeholder 426. The "Callout" operator 424 can be associated with a set of narrative analytics that are configured to compute various metrics by which to identify one or more entities that meet a set of conditions to support the generation of a narrative that identifies such an entity or entities in the context of these conditions.

It should be understood that the base communication goal statements shown by FIG. 4A are just examples, and a practitioner may choose to employ more, fewer, or different base communication goal statements in a narrative generation system. For example, additional base communication goal statements could be employed that include operators such as "Review", "Analyze", "Explain", "Predict" etc. to support communication goal statements associated with communication goals targeted toward such operators. An example structure for a base "Review" communication goal statement could be "Review the [timeframe interval] [attribute] of [the entity] over [timeframe]". An example structure for a base "Explain" communication goal statement could be "Explain the [computed attribute] of [the entity] in [a timeframe]". Also, example embodiments describing how communication goal statements with an "Analyze" operator can be used to support the generation of narratives that satisfy an "analysis" communication goal are discussed below.

The system can store data representative of a set of available base communication goal statements in a memory for use as a library. A user can then select from among this set of base communication goal statements in any of a number of ways. For example, the set of available base communication goal statements can be presented as a menu (e.g., a drop down menu) from which the user makes a selection. As another example, a user can be permitted to enter text in a text entry box. Software can detect the words being entered by the user and attempt to match those words with one of the base communication goal statements as would be done with auto-suggestion text editing programs. Thus, as a user begins typing the character string "Compa . . . ", the software can match this text entry with the base communication goal statement of "Compare the Value to the Other Value" and select this base communication goal statement at step 300.

Returning to FIG. 3A, the process flow at steps 302-306 operates to parameterize the base communication goal statement by specifying parameters to be used in place of the parameter placeholders in the base communication goal statement. One of the technical innovations disclosed by the inventors is the use of an ontology 320 to aid this part of composing the communication goal statement. The ontology 320 is a data structure that identifies the types of entities that exist within the knowledge domain used by the narrative generation system to generate narrative stories in coordination with communication goal statements. The ontology also identifies additional characteristics relating to the entity types such as various attributes of the different entity types, relationships between entity types, and the like.

Step 302 allows a user to use the existing ontology to support parameterization of a base communication goal statement. For example, if the ontology 320 includes an entity type of "Salesperson" that has an attribute of "Sales", a user who is parameterizing base communication goal statement 402 can cause the processor to access the existing ontology 320 at step 304 to select "Sales of the Salesperson" from the ontology 320 at step 306 to thereby specify the parameter to be used in place of parameter placeholder 412 and thereby create a communication goal statement of "Present the Sales of the Salesperson".

Also, if the existing ontology 320 does not include the parameters desired by a user, step 306 can operate by a user providing user input that defines the parameter(s) to be used for parameterizing the communication goal statement. In this situation, the processor in turn builds/updates the ontology 320 to add the parameter(s) provided by the user. For example, if the ontology 320 did not already include "Sales" as an attribute of the entity type "Salesperson", steps 306-308 can operate to add a Sales attribute to the Salesperson entity type, thereby adapting the ontology 320 at the same time that the user is composing the communication goal statement. This is a powerful innovation in the art that provides significant improvement with respect to how artificial intelligence can learn and adapt to the knowledge base desired by the user for use by the narrative generation system.

At step 310, the processor checks whether the communication goal statement has been completed. If so, the process flow ends, and the user has composed a complete communication goal statement. However, if other parameters still need to be specified, the process flow can return to step 302. For example, to compose a communication goal statement from the base communication goal statement 406 of "Compare the Value to the Other Value", two passes through steps 302-308 may be needed for the user to specify the parameters for use as the Value and the Other Value.

FIG. 4B shows examples of parameterized communication goal statements that can be created as a result of the FIG. 3A process flow. For example, the base communication goal statement 402 of FIG. 4A can be parameterized as communication goal statement 402 ("Present the Price of the Car", where the parameter placeholder 412 has been parameterized as parameter 412b, namely "Price of the Car" in this instance, with "Price" being the specified attribute of a "Car" entity type). Similarly, the base communication goal statement 402 of FIG. 4A could also be parameterized as "Present the Average Value of the Deals of the Salesperson", where the parameter placeholder 412 has been parameterized as parameter 412b, namely "Average Value of the Deals of the Salesperson" in this instance).

FIG. 4B also shows examples of how base communication goal statement 404 can be parameterized (see relatively lengthy "Present the Characterization of the Highest Ranking Department in the City by Expenses in terms of the Difference Between its Budget and Expenses" statement 404b1 where the specified parameter 404b1 is the "Characterization of the Highest Ranking Department in the City by Expenses in terms of the Difference Between its Budget and Expenses"; see also its substantially equivalent in the form of statement 404b2).

Also shown by FIG. 4B are examples of parameterization of base communication goal statement 406. A first example is the communication goal statement 406b of "Compare the Sales of the Salesperson to the Benchmark of the Salesperson" where the specified parameter for "Value" 420 is "Sales of the Salesperson" 420b and the specified parameter for "Other Value" 422 is "Benchmark of the Salesperson" 422b. A second example is the communication goal statement 406b of "Compare the Revenue of the Business to the Expenses of the Business" where the specified parameter for "Value" 420 is "Revenue of the Business" 420b and the specified parameter for "Other Value" 422 is "Expenses of the Business" 422b.

Also shown by FIG. 4B are examples of parameterization of base communication goal statement 408. A first example is the communication goal statement 408b of "Callout the Highest Ranked Salesperson by Sales" where the specified parameter for "Entity" 426 is the "Highest Ranked Salesperson by Sales" 426b. A second example is the communication goal statement 408b of "Callout the Players on the Winning Team" where the specified parameter for "Entity" 426 is "Players on the Winning Team" 426b. A third example is the communication goal statement 408b of "Callout the Franchises with More than $1000 in Daily Sales" where the specified parameter for "Entity" 426 is "Franchises with More than $1000 in Daily Sales" 426b.

As with the base communication goal statements, it should be understood that a practitioner may choose to employ more, fewer, or different parameterized communication goal statements in a narrative generation system. For example, a parameterized Review communication goal statement could be "Review the weekly cash balance of the company over the year", and a parameterized Explain communication goal statement could be "Explain the profit of the store in the month".

Figure 3B:
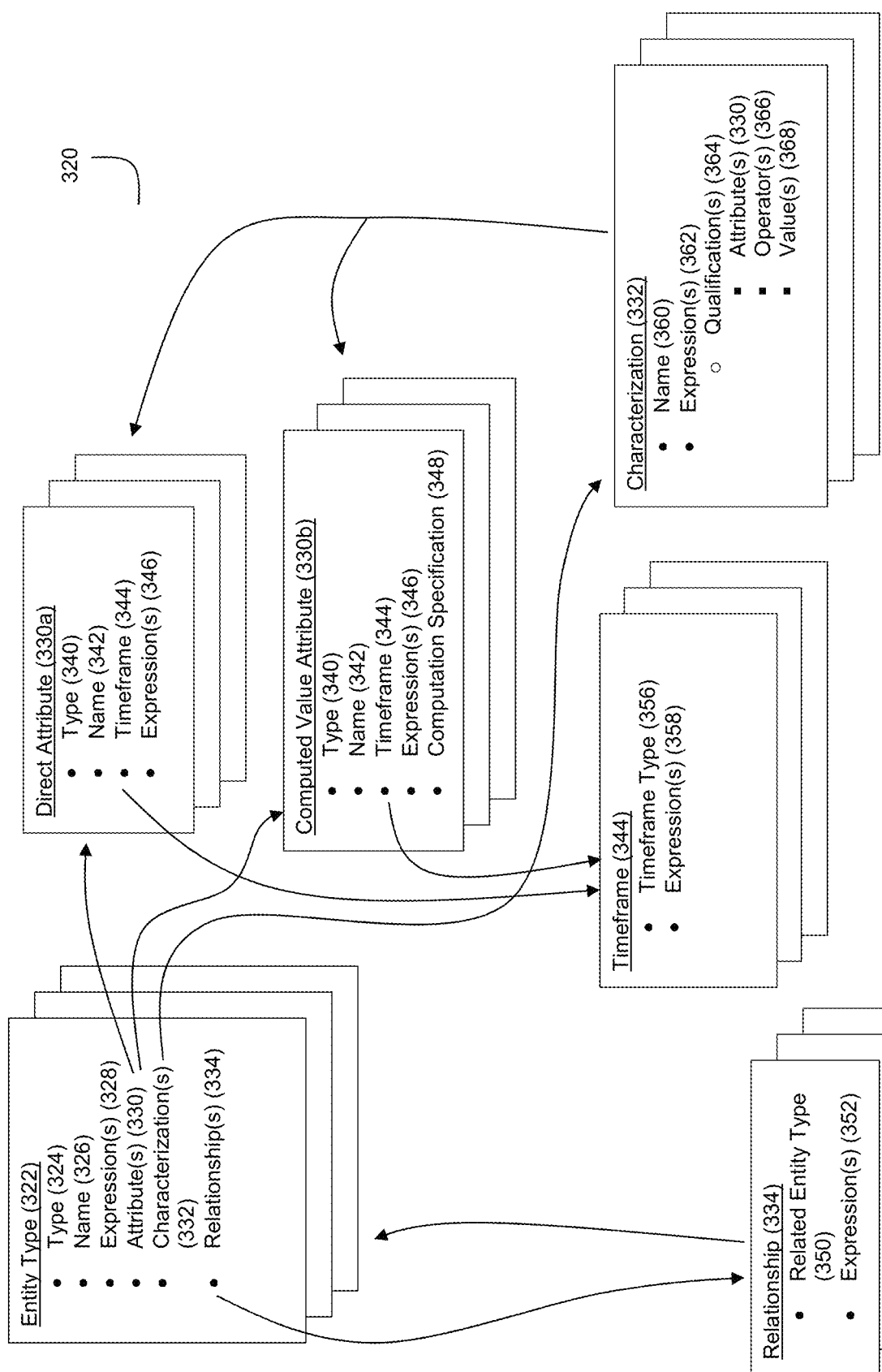
FIG. 3B depicts an example ontology.

Ontology Data Structure:

FIG. 3B depicts an example structure for ontology 320. The ontology 320 may comprise one or more entity types 322. Each entity type 322 is a data structure associated with an entity type and comprises data that describes the associated entity type. An example of an entity type 322 would be a "salesperson" or a "city". Each entity type 322 comprises metadata that describes the subject entity type such as a type 324 (to identify whether the subject entity type is, e.g., a person, place or thing) and a name 326 (e.g., "salesperson", "city", etc.). Each entity type 322 also comprises one or more attributes 330. For example, an attribute 330 of a "salesperson" might be the "sales" achieved by a salesperson. Additional attributes of a salesperson might be the salesperson's gender and sales territory.

Attributes 330 can be represented by their own data structures within the ontology and can take the form of a direct attribute 330a and a computed value attribute 330b. A direct attribute 330a is an attribute of an entity type that can be found directly within a data set (e.g., for a data set that comprises a table of salespeople within a company where the salespeople are identified in rows and where the columns comprise data values for information such as the sales and sales territory for each salesperson, the attribute "sales" would be a direct attribute of the salesperson entity type because sales data values can be found directly within the data set). A computed value attribute 330b is an attribute of an entity type that must be derived in some fashion from the data set. Continuing with the example above, a direct attribute for the salesperson entity type might be a percentage of the company's overall sales that were made by the salesperson. This information is not directly present in the data set but instead must be computed from data within the data set (e.g., by summing the sales for all salespeople in the table and computing the percentage of the overall sales made by an individual salesperson).

Both the direct attributes 330a and computed value attributes 330b can be associated with metadata such as a type 340 (e.g., currency, date, decimal, integer, percentage, string, etc.), and a name 342. However, computed value attributes 330b can also include metadata that specifies how the computed value attribute is computed (a computation specification 348). For example, if a computed value attribute 330b is an average value, the computation specification 348 can be a specification of the formula and parameters needed to compute this average value.

Each entity type 322 may also comprise one or more characterizations 332. For example, a characterization 332 of a "salesperson" might be a characterization of how well the salesperson has performed in terms of sales (e.g., a good performer, an average performer, a poor performer). Characterizations can be represented by their own data structures 332 within the ontology. A characterization 332 can include metadata such as a name 360 (e.g., sales performance). Also, each characterization 332 can include a specification of the qualifications 364 corresponding to the characterization. These qualifications 364 can specify one or more of the following: (1) one or more attributes 330 by which the characterization will be determined, (2) one or more operators 366 by which the characterization will be determined, and (3) one or more value(s) 368 by which the characterization will be determined. For example, a "good performer" characterization for a salesperson can be associated with a qualification that requires the sales for the salesperson to exceed a defined threshold. With such an example, the qualifications 364 can take the form of a specified attribute 330 of "sales", an operator 366 of "greater than", and a value 368 that equals the defined threshold (e.g., $100,000).

Each entity type 322 may also comprise one or more relationships 334. Relationships 334 are a way of identifying that a relationship exists between different entity types and defining how those different entity types relate to each other. Relationships can be represented by their own data structures 334 within the ontology. A relationship 334 can include metadata such as the related entity type 350 with respect to the subject entity type 322. For example, a "salesperson" entity type can have a relationship with a "company" entity type to reflect that the salesperson entity type belongs to a company entity type. The ontological objects (e.g., entity types 322, direct attributes 330a, computed value attributes 330b, characterizations 332, and relationships 334) may also comprise data that represents one or more expressions that can be used to control how the corresponding ontological objects are described in narrative text produced by the narrative generation system.

For example, the entity type 322 can be tied to one or more expressions 328. When the narrative generation process determines that the subject entity type needs to be described in narrative text, the system can access the expression(s) 328 associated with the subject entity type to determine how that entity type will be expressed in the narrative text. The expression(s) 328 can be a generic expression for the entity type 322 (e.g., the name 326 for the entity type, such as the name "salesperson" for a salesperson entity type), but it should be understood that the expression(s) 32 may also or alternatively include alternate generic names (e.g., "sales associate") and specific expressions. By way of example, a specific expression for the salesperson entity type might be the name of a salesperson. Thus, a narrative text that describes how well a specific salesperson performed can identify the salesperson by his or her name rather than the more general "salesperson". To accomplish this, the expression 328 for the salesperson can be specified indirectly via a reference to a data field in a data set (e.g., if the data set comprises a table that lists sales data for various sales people, the expression 328 can identify a column in the table that identifies each salesperson's name). The expression(s) 328 can also define how the subject entity type will be expressed when referring to the subject entity type as a singular noun, as a plural noun, and as a pronoun.

The expression(s) 346 for the direct attributes 330a and computed value attributes 330b can take a similar form as and operate in a manner similar to the expression(s) for the entity types 322; likewise for the expression(s) 362 tied to characterizations 332 (although it is expected that the expressions 362 will often include adjectives and/or adverbs in order to better express the characterization 332 corresponding to the subject entity type 322). The expression(s) 352 for relationships 334 can describe the nature of the relationship between the related entity types so that this relationship can be accurately expressed in narrative text if necessary. The expressions 352 can typically take forms such as "within" (e.g., a "city" entity type within a "state" entity type, "belongs to" (e.g., a "house" entity type that belongs to a "person" entity type, "is employed by" (a "salesperson" entity type who is employed by a "company" entity type), etc.

Figure 3C:
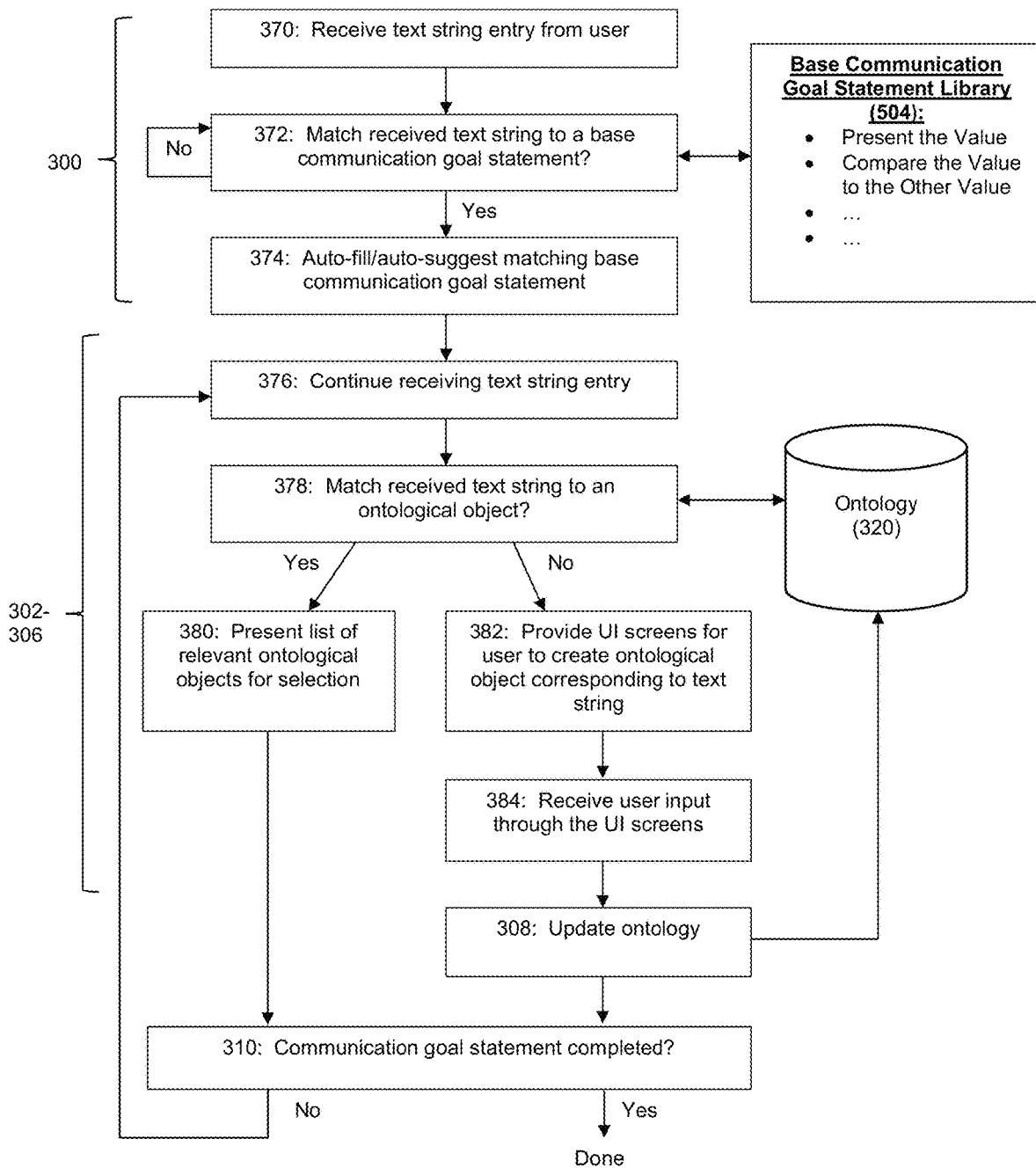
FIG. 3C depicts an example process flow for composing a communication goal statement while also building an ontology.

Another ontological object can be a timeframe 344. In the example of FIG. 3B, timeframes 344 can be tied to direct attributes 330a and/or computed value attributes 330b. A direct attribute 330a and/or a computed value attribute 330b can either be time-independent or time-dependent. A timeframe 344 can define the time-dependent nature of a time-dependent attribute. An example of a time-dependent attribute would be sales by a salesperson with respect to a data set that identifies each salesperson's sales during each month of the year. The timeframe 344 may comprise a timeframe type 356 (e.g., year, month, quarter, hour, etc.) and one or more expressions(s) 358 that control how the subject timeframe would be described in resultant narrative text. Thus, via the timeframe 344, a user can specify a timeframe parameter in a communication goal statement that can be used, in combination with the ontology 320, to define a specific subset of data within a data set for consideration. While the example of FIG. 3B shows timeframes 344 being tied to direct attributes 330*a* and computed value attributes 330*b*, it should be understood that a practitioner might choose to make timeframes 344 only attachable to direct attributes 330*a*. Also, a practitioner might choose to make timeframes 344 also applicable to other ontological objects, such as characterizations 332, entity types 322, and/or even relationships 334. As indicated in connection with FIG. 3A, users can create and update the ontology 320 while composing communication goal statements. An example embodiment for such an ability to simultaneously compose communication goal statements and build/update an ontology is shown by FIG. 3C. At step 370, the system receives a text string entry from a user (e.g., through a text entry box in a user interface (UI)). As indicated, this text entry can be a natural language text entry to facilitate ease of use by users. Alternative user interface models such as drag and drop graphical user interfaces or structured fill in the blank templates could also be used for this purpose.

At step 372, the processor attempts to match the received text string to a base communication goal statement that is a member of a base communication goal statement library 504 (see FIG. 4A). This matching process can be a character-based matching process where the processor seeks to find a match on an ongoing basis as the user types the text string. Thus, as a user types the string "Comp", the processor may be able to match the text entry to the "Compare the Value to the Other Value" base communication goal statement. Based on this matching, the system can auto-fill or auto-suggest a base communication goal statement that matches up with the received text entry (step 374). At this point, the system can use the base communication goal statement as a framework for guiding the user to complete the parameterization of the communication goal statement.

At step 376, the system continues to receive text string entry from the user. At step 378, the processor attempts to match the text string entry to an object in ontology 320. Is there is a match (or multiple matches), the system can present a list of matching ontological objects for user selection (step 380). In this fashion, the system can guide the user to define parameters for the communication goal statement in terms of objects known within ontology 320. However, if the text string does not match any ontological objects, the system can provide the user with an ability to create a new object for inclusion in the ontology (steps 382-384). At step 382, the system provides the user with one or more UIs through which the user creates object(s) for inclusion in ontology 320 (e.g., defining an entity type, attribute, characterization, relationship, and/or timeframe). At step 384, the system receives the user input through the UI(s) that define the ontological objects. The ontology can thus be updated at step 308 in view of the text string entered by a user that defines a parameter for the communication goal statement.

If step 310 results in a determination that the communication goal statement has not been completed, the process flow returns to step 376 as the user continues entering text. Otherwise, the process flow concludes after step 310 if the communication goal statement has been fully parameterized (see FIG. 4B for examples of parameterized communication goal statements).

Figure 3D:
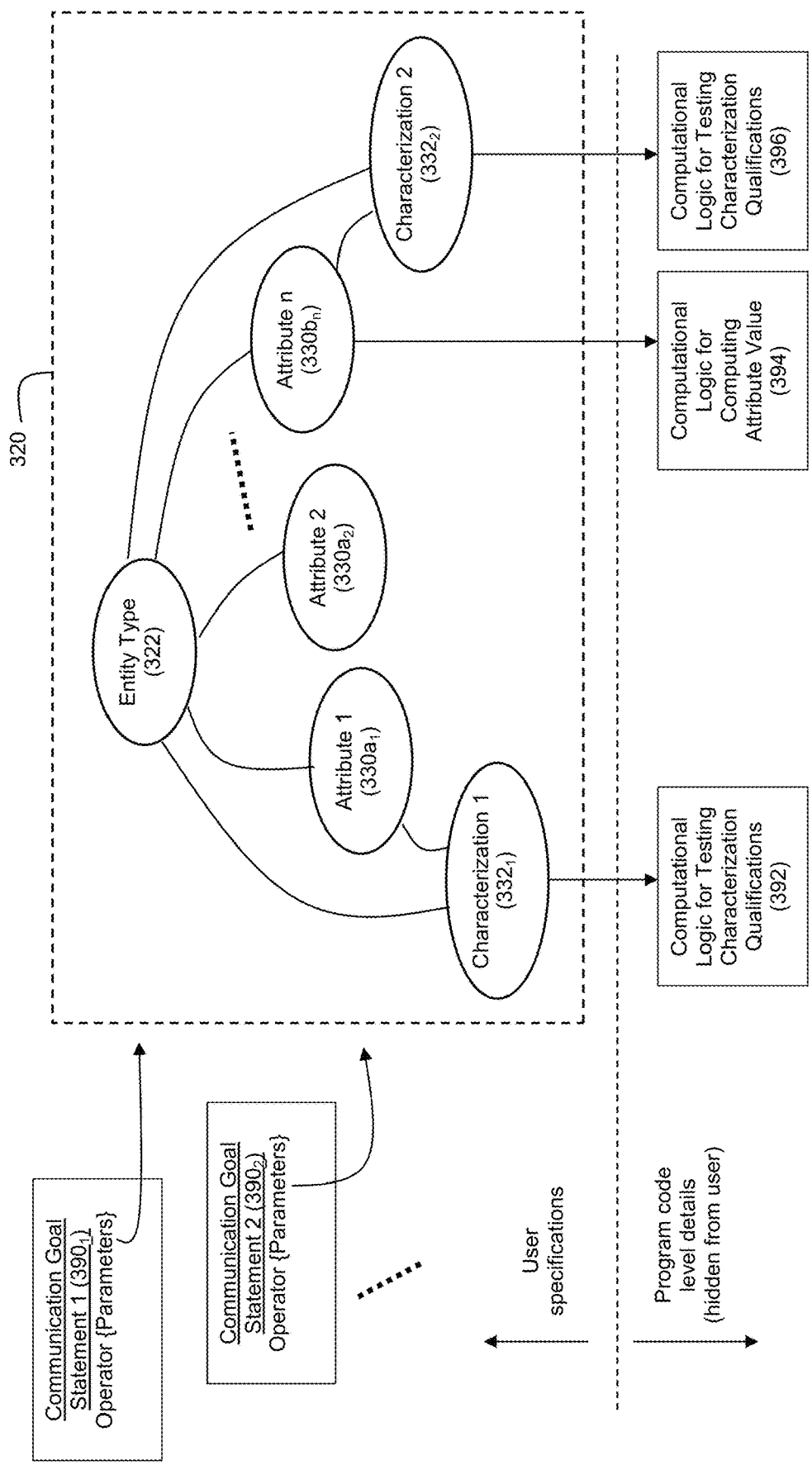
FIG. 3D depict an example of how communication goal statements can relate to an ontology and program code for execution by a process as part of a narrative generation process.

Through the use of composable communication goal statements and ontology 320, example embodiments are capable of generating a robust array of narrative stories about data sets that satisfy flexibly-defined communication goals without requiring a user to directly author any program code. That is, a user need not have any knowledge of programming languages and does not need to write any executable code (such as source code) in order to control how the narrative generation platform automatically generates narrative stories about data sets. To the extent that any program code is manipulated as a result of the user's actions, such manipulation is done indirectly as a result of the user's higher level compositions and selections through a front end presentation layer that are distinct from authoring or directly editing program code. Communication goal statements can be composed via an interface that presents them in natural language as disclosed herein, and ontologies can similarly be created using intuitive user interfaces that do not require direct code writing. FIG. 3D illustrates this aspect of the innovative design. In an example embodiment, communication goal statements 390 (e.g., $390_1$ and $390_2$) are composed by a user using an interface that presents the base goal elements as natural language text where one or more words represent the goal operators and one or more words serve to represent the parameters as discussed above. These parameters, in turn, map into ontology 320 and thus provide the constraints necessary for the narrative generation platform to appropriately determine how to analyze a data set and generate the desired narrative text about the data set (described in greater detail below). Hidden from the user are code-level details. For example, a computed value attribute (such as $330b_n$) is associated with parameterized computational logic 394 that will be executed to compute its corresponding computed value attribute. Thus, if the computed value attribute $330b_n$ is an average value of a set of data values, the computational logic 394 can be configured to (1) receive a specification of the data values as input parameters, (2) apply these data values to a programmed formula that computes an average value, and (3) return the computed average value as the average value attribute for use by the narrative generation platform. As another example, computational logic 392 and 396 can be configured to test qualifications for corresponding characterizations $332_1$ and $332_2$ respectively. The data needed to test the defined qualifications can be passed into the computational logic as input parameters, and the computational logic can perform the defined qualification tests and return an identification of the determined characterization for use by the narrative generation platform. Similar computational logic structures can leverage parameterization and the ontology 320 to perform other computations that are needed by the narrative generation platform.

The inventors also disclose that the ontology 320 can be re-used and shared to generate narrative stories for a wide array of users. For example, an ontology 320 can be built that supports generation of narrative stories about the performance of retail businesses. This ontology can be re-used and shared with multiple users (e.g., users who may have a need to generate performance reports for different retail businesses). Accordingly, as ontologies 320 are created for different domains, the inventors envision that technical value exists in maintaining a library of ontologies 320 that can be selectively used, re-used, and shared by multiple parties across several domains to support robust narrative story generation in accordance with user-defined communication goals.

Figure 5:
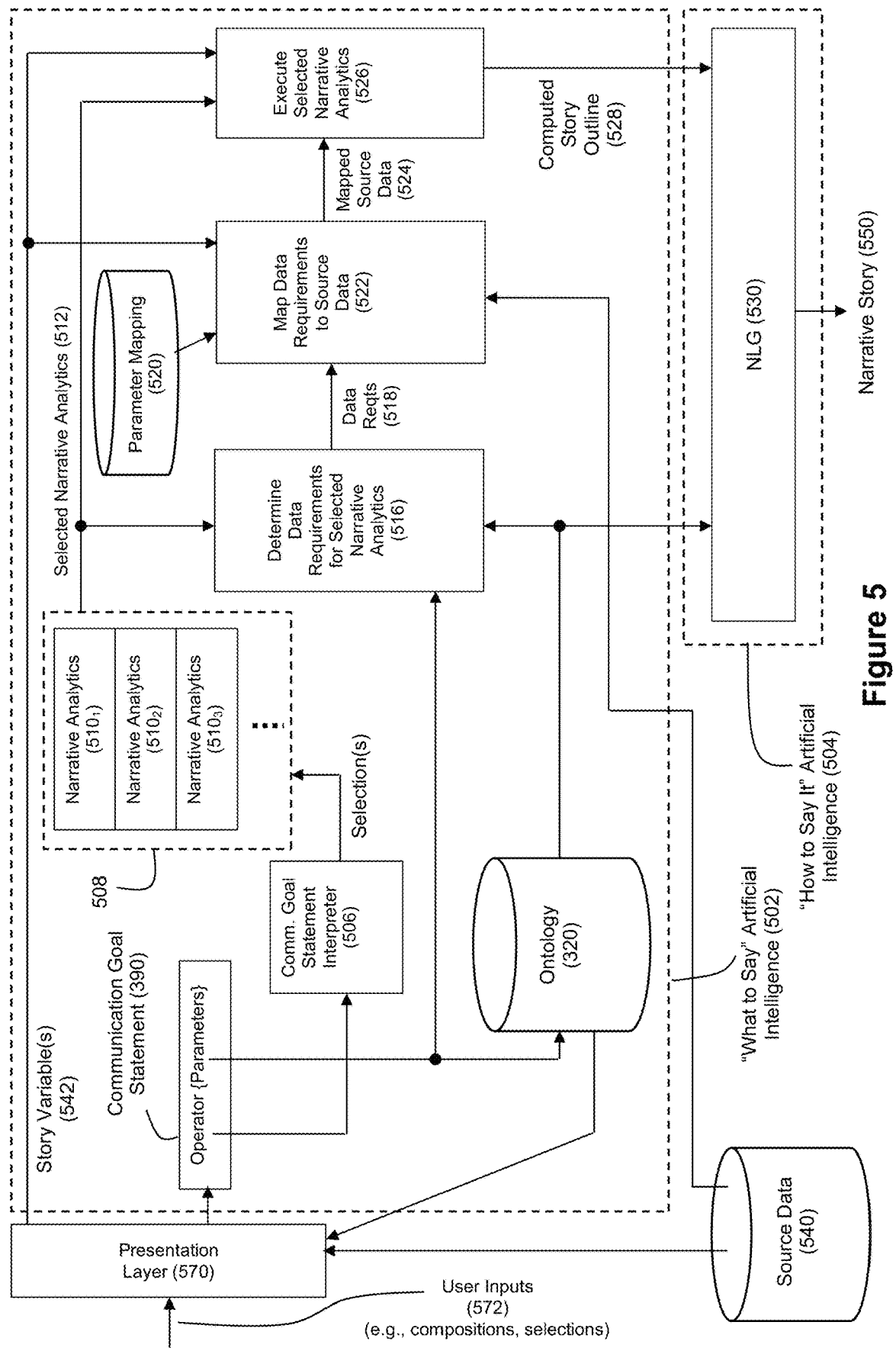
FIG. 5 depicts a narrative generation platform in accordance with an example embodiment.

Example Narrative Generation Architecture Using Composed Communication Goal Statements:

FIG. 5 depicts a narrative generation platform in accordance with an example embodiment. An example embodiment of the narrative generation platform can include two artificial intelligence (AI) components. A first AI component 502 can be configured to determine the content that should be expressed in a narrative story based on a communication goal statement (which can be referred to as "what to say" AI 502). A second AI component 504 can be configured to perform natural language generation (NLG) on the output of the first AI component 502 to produce the narrative story that satisfies the communication goal statement (where the AI component 504 can be referred to as "how to say it" AI 504).

The platform can also include a front end presentation layer 570 through which user inputs 572 are received to define the composed communication goal statement 390. This presentation layer 570 can be configured to allow user composition of the communication goal statement 390 using natural language inputs. As mentioned herein, it can also employ structured menus and/or drag/drop features for selecting elements of a communication goal statement. Examples of various user interfaces that can be used by the presentation layer 570 are shown in Appendix A. As can be seen from these sample UIs, the presentation layer 570 can also leverage the ontology 320 and source data 540 to facilitate its user interactions.

The "what to say" AI 502 can be comprised of computer-executable code resident on a non-transitory computer-readable storage medium such as computer memory. The computer memory may be distributed across multiple memory devices. One or more processors execute the computer code in cooperation with the computer memory. AI 502 operates on a composed communication goal statement 390 and ontology 320 to generate a computed story outline 528.

AI 502 includes a communication goal statement interpreter 506, which is configured to process and interpret the communication goal statement 390 to select a set of narrative analytics that are to be used to analyze a data set about which the narrative story will be generated. The computer memory may include a library 508 of narrative analytics 510 (e.g., $510_1$, $510_2$, $510_3$, ... ). The narrative analytics 510 may take the form of parameterized computer code that performs analytical operations on the data set in order to facilitate a determination as to what content should be included in the narrative story so that the communication goal(s) corresponding to the communication goal statement 390 are satisfied. Examples of narrative analytics 510 can be the computational logic 392, 394, and 396 shown in FIG. 3D.

AI 502 can maintain a mapping that associates the various operators that may be present in communication goal statements (e.g., "Present", "Compare", etc.) to a sequence or set of narrative analytics that are to be performed on data in order to support the data analysis needed by the platform to generate narrative stories that satisfy the communication goal statement 390. Thus, the "Compare" operator can be associated with a set of narrative analytics that do simple difference (a−b), absolute difference (abs(a−b)), or percent difference ((b−a)/b). In an example embodiment, the mapping can also be based on the parameters that are included in the communication goal statement 390. The mapping can take the form of a data structure (such as a table) that associates operators (and possibly also parameters) with sets of narrative analytics 510 from library 508. Interpreter 506 can then read and interpret the communication goal statement 390 to identify the operator included in the communication goal statement, access the mapping data structure to map the identified operator to its corresponding set of narrative analytics 510, and select the mapped narrative analytics. These selected narrative analytics 512 in turn drive downstream operations in AI 502.

AI 502 can also include computer code 516 that is configured to determine the data requirements that are needed by system to generate a narrative story in view of the selected narrative analytics 512 and the parameters that are included in the communication goal statement 390. This code 516 can walk through the selected narrative analytics 512, the communication goal statement 390, and ontology 320 to identify any parameters and data values that are needed during execution of the selected narrative analytics 512. For example, the communication goal statement 390 may include parameters that recite a characterization of an entity. Computer code 390 can identify this characterization in the communication goal statement and access the ontology 320 to identify the data needed to evaluate the characterization of the subject entity such as the attribute(s) 330 and value(s) 368 needed for the subject characterization 332 in ontology 320. The ontology 320 can then be further parsed to determine the data requirements for the subject attribute(s) needed by the subject characterization 332, and so on until all data requirements for the communication goal statement 390 and selected narrative analytics 512 are determined. This ultimately yields a set of data requirements 518 that define the data needed by AI 502 in order to support the data analysis used to determine the content to be expressed in the narrative story. In situations where the input to AI 502 comprises multiple communication goal statements 390 in a story outline, code 516 can be configured to walk through the outline to assemble a list of the data requirements for all of the communication goal statements in the outline.

Once the data requirements 518 have been determined, the AI 502 can execute computer code 522 that maps those data requirements 522 to source data 540. (This can be done either in a "batch" model wherein all the data requirements are determined first, and the code to map those to source data is executed; or it can be done individually for each data requirement either as needed or as the other information necessary to make the determination becomes available.) The source data 540 serves as the data set from which the narrative story will be generated. Source data 540 can take the form of data in a database, data in spreadsheet files, or other structured data accessible to AI 502. Computer code 522 can use a data structure 520 (such as a table) that associates parameters from the data requirements to parameters in the source data to perform this mapping. For example, consider a scenario where the communication goal statement is "Present the Sales of the Salesperson". The data requirements 518 for this communication goal statement may include a parameter that corresponds to the "sales" attribute of a salesperson. The source data 540 may include a data table where a column labeled as "Amount Sold ($)" identifies the sales amount for each salesperson in a company. The parameter mapping data structure 520 can associate the "Sales" parameter from the data requirements 518 to the "Amount Sold ($)" column in the source data 540 so that AI 502 accesses the proper data. This parameter mapping data structure 520 can be defined by an author when setting up the system, as discussed hereinafter. The output of computer code 522 can be a set of mapped source data 524 for use by the selected narrative analytics 512.

Computer code 522 can also map data requirements to source data using story variable(s) 542. For example, the communication goal statement 390 might be "Compare the Sales of Salesperson "John Smith" to the Benchmark of the Salesperson". The mapped source data 524 can identify where in the source data the sales and benchmark for salespeople can be found. If the source data 540 includes sales data for multiple salespeople (e.g., rows in a data table correspond to different sales people while columns in the data table correspond to sales amounts and benchmarks for salespeople), the selection of a particular salesperson can be left as a story variable 542 such that the parameter mapping data structure 520 does not identify which specific row to use as the salesperson and instead identifies the salesperson data requirement as a story variable. When a user composes the communication goal statement such that "John Smith" is expressed in the statement where the salesperson parameter is located, the computer code 522 can use "John Smith" in the communication goal statement 390 as the story variable 542 that governs the selection of which row of source data 540 should be used. Similarly, the benchmark parameter might be expressed as a story variable 542. For example, the source data 540 may not include a benchmark field, but the composed communication goal statement might express a number to be used as the benchmark. In such a situation, this number could be a story variable 542 used by the system.

FIGS. 46 and 225-237, described below with reference to Appendix A, depict example GUIs through which a user can map the determined data requirements for a story outline to source data and story variables. These GUIs can be configured to list each data requirement in association with a user input mechanism through which the user can identify where in the source data a data requirement can be found (and whether a data requirement is to be parameterized as a story variable). As explained in Appendix A with respect to an example embodiment, the source data can take a number of forms, such as tabular data and document-based data, and the data requirements GUIs can be configured to accommodate both types. FIGS. 238-255 and their supporting description in Appendix A further describe how source data can be managed in an example embodiment of the system.

AI 502 can also include computer code 526 that executes the selected narrative analytics 512 using the mapped source data 524 (and potentially any story variable(s) 542) to produce a computed story outline 528. The narrative analytics 512 specifies at least four components: the input parameters (e.g., an entity to be ranked, a metric it is to be ranked by, and a group in which it is to be ranked); the code that will execute the narrative analytics (i.e., that will determine the rank of the entity in the group according to the metric); the output parameters (i.e., the rank of the entity); and a statement form containing the appropriate input and output parameters that will form the appropriate statement for inclusion in the computed outline (in this case, rank (entity, metric, group, rankvalue)). The communication goal statement 390 can be associated with a general story outline that provides the basic structure for the narrative story to be generated. However, this general story outline will not be populated with any specific data—only general identifications of parameters. Through execution of the selected narrative analytics by computer code 526, this general story outline can be populated with specific data in the form of the computed story outline 528. For example, continuing with an example from above where the communication goal statement 390 is "Compare the Sales of Salesperson "John Smith" to the Benchmark of the Salesperson", the selected narrative analytics may include parameterized code that computes data indicative of the difference between John Smith's sales amount and the benchmark in both absolute terms (e.g., performing a subtraction between the sales amount and the benchmark) and as a percentage (e.g., dividing the subtracted difference by the benchmark and multiplying by 100). Code 526 executes these narrative analytics to compute data values for use in the story outline. These data values are then embedded as values for the parameters in the appropriate statement forms associated with the narrative analytics to produce statements for inclusion in the computed outline. The statement will be included in the computed outline as a new element of the section containing the communication goal for which it was computed, under the node representing that communication goal. Code 526 will progress through the execution of the selected narrative analytics using mapped source data 524 and story variable(s) 542 (if any) until all elements of the story outline have been populated with statements. Also associated with communication goals are characterizations that serve to express a characterization or editorialization of the facts reported in the statements in a manner that may have more narrative impact that just a reporting of the facts themselves. For example, rather than saying that an entity is ranked first, we might say that it is the best. (In another approach, these might be associated with sections rather than communication goals.) The characterizations associated with each communication goal are assessed with respect to the statements generated by the narrative analytics in response to that goal. This results in generating additional propositions or statements corresponding to those characterizations for inclusion in the computed outline in those cases when the conditions for those characterizations are met by the input statements. The characterizations are also linked to the statements which they characterize. The result of this process is a computed story outline 528 that serves to identify the content that is to be expressed in the narrative story.

The "how to say it" AI 504 can be comprised of computer-executable code resident on a non-transitory computer-readable storage medium such as computer memory. The computer memory may be distributed across multiple memory devices. One or more processors execute the computer code in cooperation with the computer memory. AI 504 employs NLG logic 530 to generate a narrative story 550 from the computed story outline 528 and ontology 320. As indicated above, objects in ontology 320 can be associated with expressions (e.g., expressions 328, 346, 352, 358, and 362) that can be used by NLG 530 to facilitate decision-making regarding the appropriate manner of expressing the content in the computed story outline 528. Thus, NLG 530 can access the ontology 320 when forming sentences from the computed story outline 528 for use in the narrative story 550. Example embodiments of NLG 530 are discussed below with reference to FIGS. 6D and 8A-H.

Once again, by leveraging predefined sets of parameterized narrative analytics 510, AI 502 is able to shield the low level program coding from users so that a user need only focus on composing communication goal statements 390 in a natural language in order to determine the content that is to be included in a narrative story. Further still, AI 504 also operates transparently to users so that a narrative story 550 can be generated from a composed communication goal statement 390 without requiring the user to directly write or edit program code.

Figure 6A:
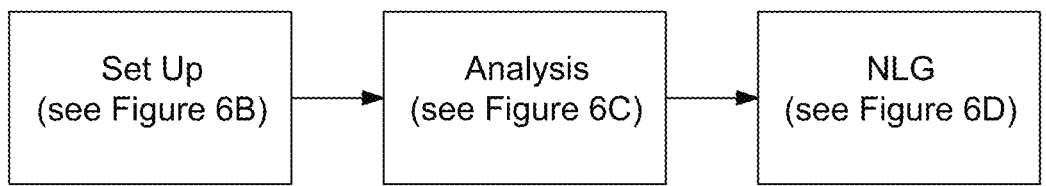
FIGS. 6A-D depict a high level view of an example embodiment of a platform in accordance with the design of FIG. 5.
Figure 6B:
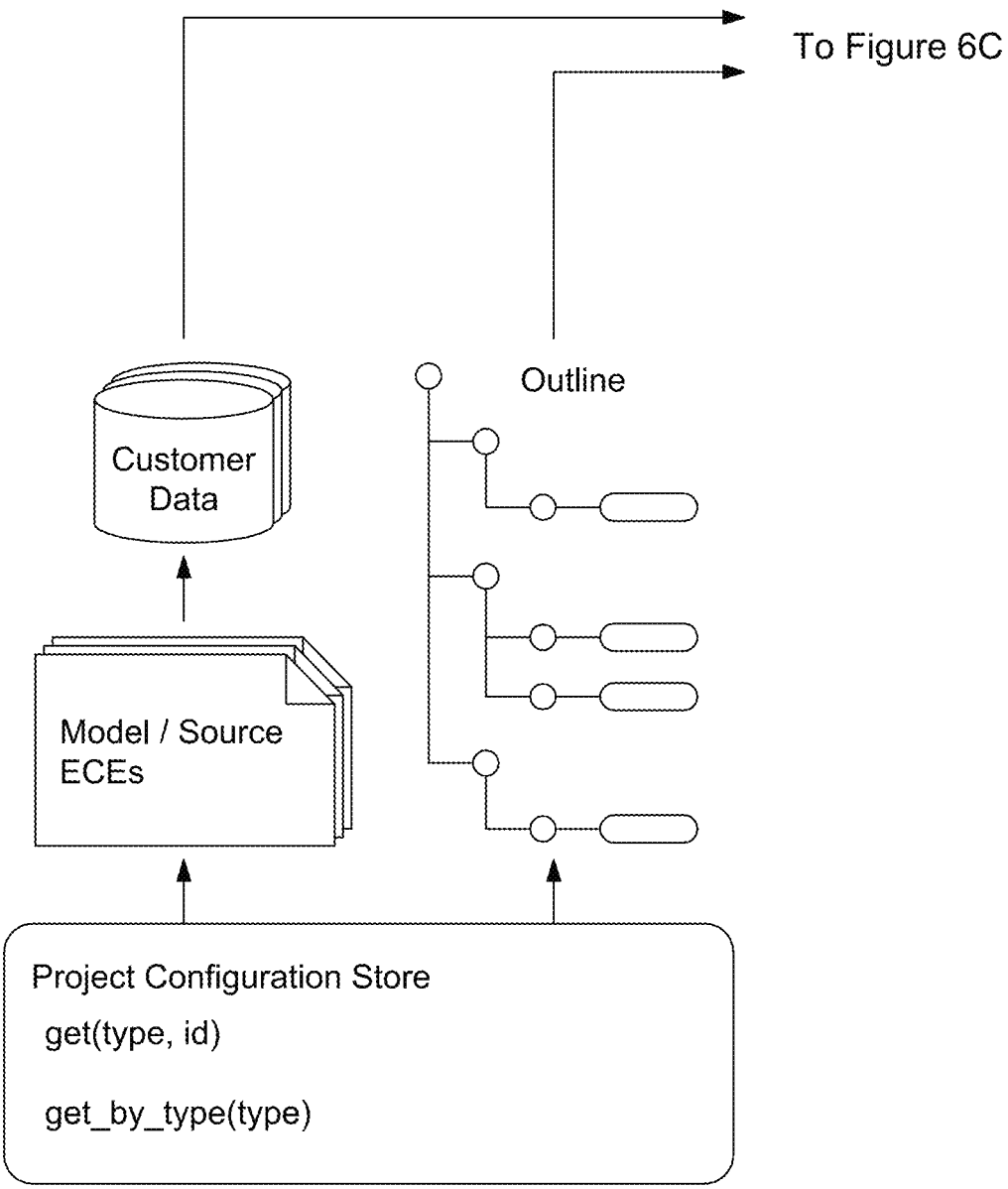
Figure 6C:
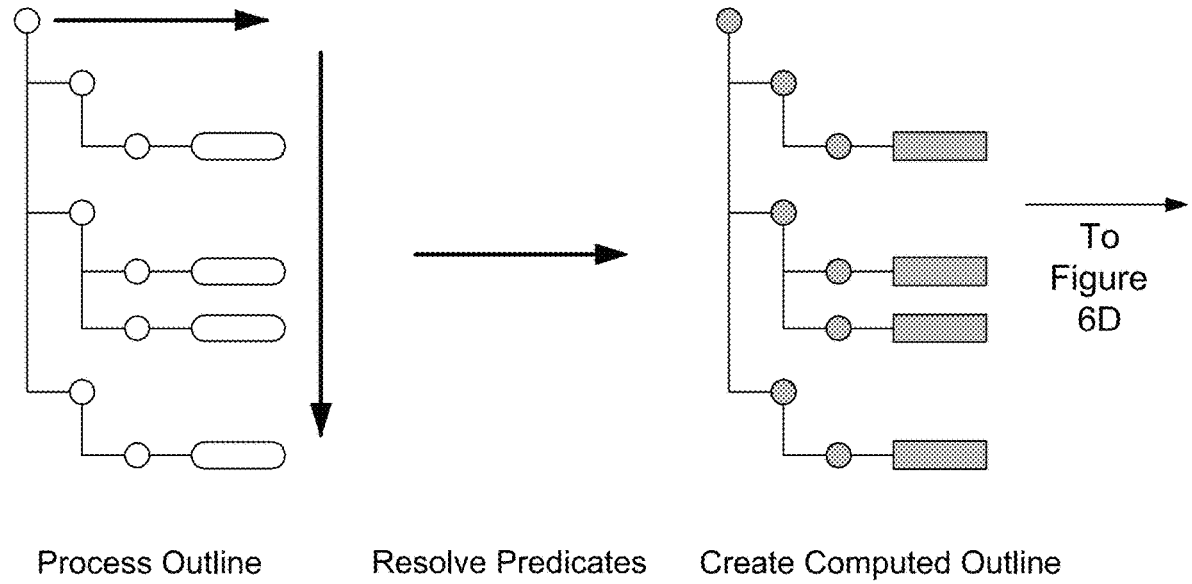
Figure 6D:
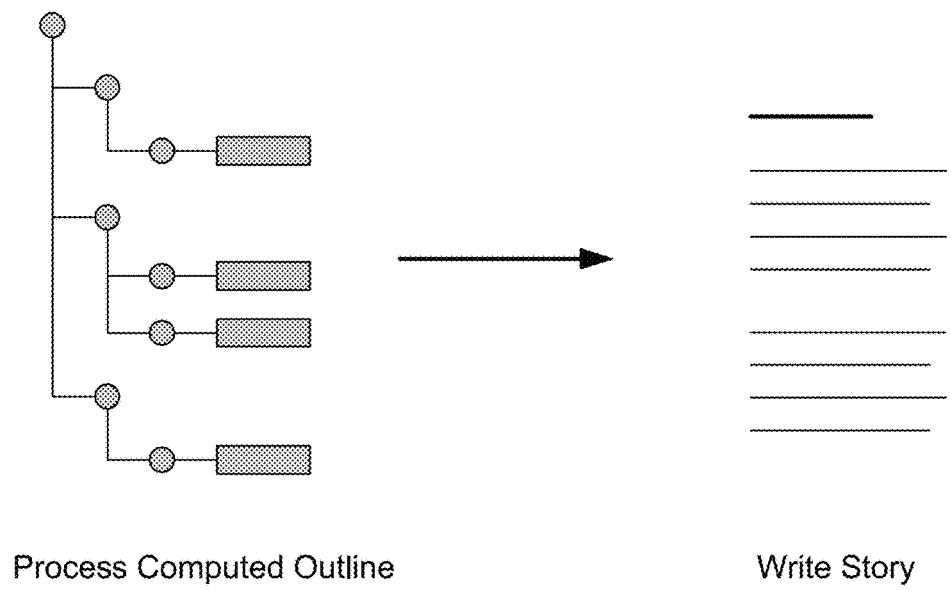

Example Platform Operation:

FIG. 6A depicts a high level view of an example embodiment of a platform in accordance with the design of FIG. 5. The narrative generation can proceed through three basic stages: setup (an example of which is shown by FIG. 6B), analysis (an example of which is shown by FIG. 6C), and NLG (an example of which is shown by FIG. 6D). The operation of the FIG. 6A embodiment can be described in the context of a simple example where the project has an outline with a single section and a single communication goal statement in that section. The communication goal statement can be "Present the sales of the salesperson". In this example, "salesperson" is an entity type in the ontology and it has an attribute of "sales". Also, the project has a single data view backed by a static file that contains the names and sales data for the salespeople.

During setup, the system loads the story configuration from a configuration store. The configuration store is a database where configurations are maintained in persistent form, managed, and versioned. The configuration for a story includes items representing the outline (sections, communication goals, and their components), the ontology (entity types, relationships, timeframe types), and data connectors (sources, data mappings). Once the configuration for the story is loaded into memory, the story outline is constructed, as shown in FIG. 6B. The story outline is a hierarchical organization of sections and communication goals (see FIG. 2). At this time, along with constructing the story outline, the connectors to the data sources are initialized. These will be used as needed during the story generation process to access the necessary data required by the narrative analytics specified in the outline. Specifically how this is accomplished can depend on whether the data is passed in via an API, in a static file managed by the system, or via a connection to a database.

Once the setup phase is complete, the outline can be used to govern the generation of a story. This is accomplished by traversing the outline and executing the analytics associated with each communication goal statement; and the results serve to parameterize the associated statement forms of the communication goal in order to generate the facts of the story (see FIG. 6C). These facts are then organized into the computed outline as described above.

When this generation process is invoked by a client, e.g., via an API request, the client provides certain values for parameters of the configuration. In this instance, for example, the story is about the sales of some particular salesperson. So the client may need to provide a unique identifier for the specific salesperson which can be interpreted via the mapping provided between parameters of the story outline and the data source to be used.

Figure 7:
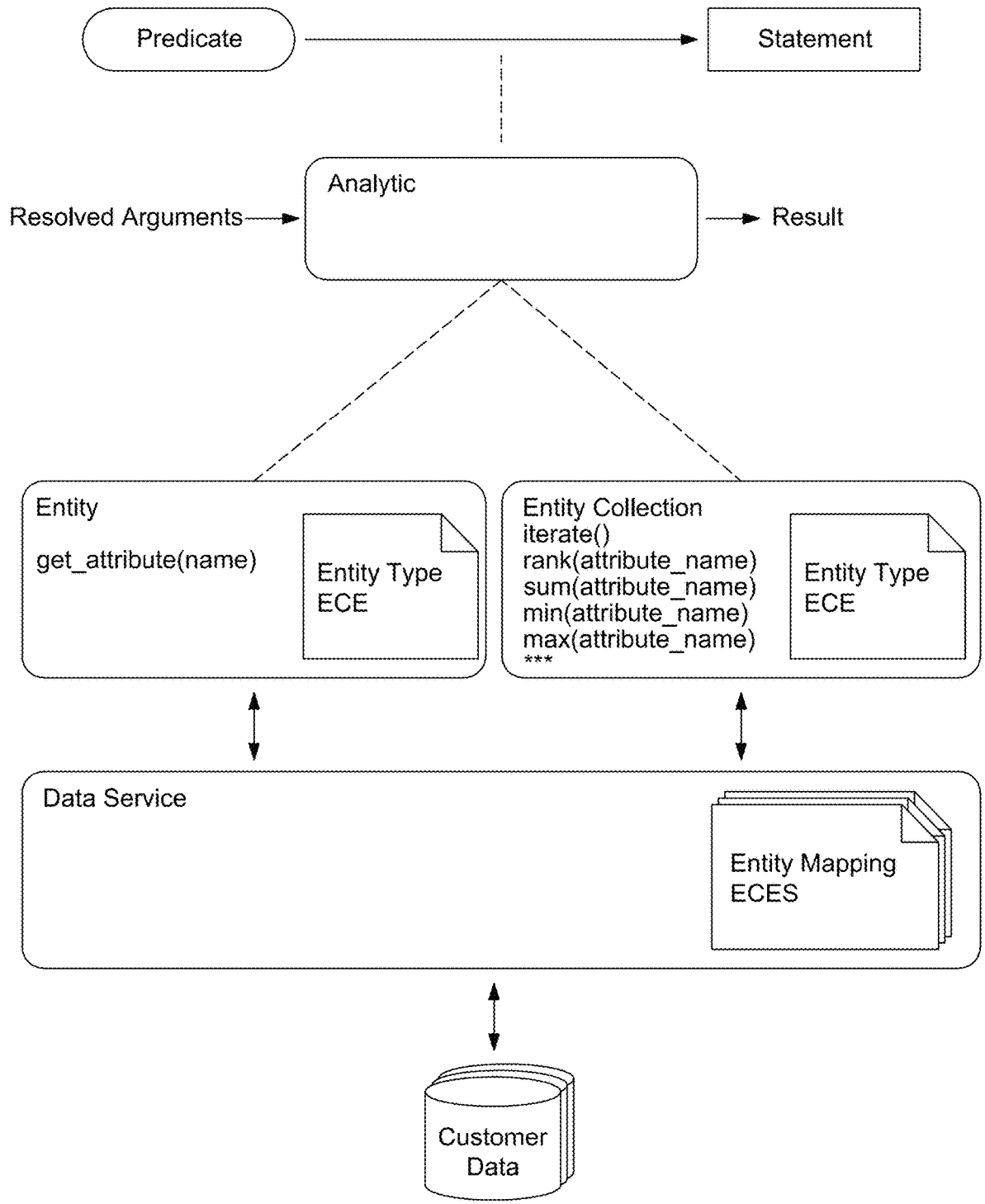
FIG. 7 depicts an example embodiment of an analysis component of FIG. 6C.

As shown by FIG. 7, the narrative analytics can access source/customer data through Entity and Entity Collection objects. These objects provide an interface based on the project ontology 320 and hide the source of the data from other components. These objects can use Entity Types, mappings from relevant Attributes of the Entity Types to data sources and specifiers (e.g., columns or column names in tables or databases, or keypaths in documents, etc.) as previously specified by the user during configuration, and data interfaces to access the actual relevant data. Some computations that comprise aspects of the narrative analytics, such as sorting and certain aggregations, can be handled by the data stores themselves (e.g., as database operations). The specific Entity objects provide methods to invoke these external operations, such as parameterizable database queries.

Continuing with the example, the single communication goal statement in this case, "Present the Sales of the Salesperson", is made up of two base communication goal statements, composed together by embedding one inside the other. The top level statement is AttributeOfEntity(AttributeName, <Entity>), and its Entity parameter is satisfied by the embedded statement EntityById(Id). EntityById is resolved first. This is computed by retrieving the entity's ID as provided by the client when invoking the generation process, e.g., via an API request. EntityById creates an (internal) Entity object corresponding to the (external) ID and returns that Entity object as its result. This internal Entity object is a new Entity of the appropriate Entity Type as specified in the configuration and with appropriate attributes as determined by the entity data mapping, in this instance, since we are talking about a Salesperson, relevant attributes of the Salesperson in question such as his or her name, gender, sales, office—whatever in fact the configuration specifies be retrieved or computed. This result is in the form of the embedded communication goal statement, namely, EntityById(Id, <Entity>); it is then, in turn, passed into the top-level AttributeOfJEntity statement along with the attribute name "sales". The AttributeOfJEntity analytic comprises code that takes the entity object and returns the corresponding value for that attribute of the entity as its result. The analytic looks up where to get the attribute data based on the entity data mappings provided during configuration, and retrieves the specific relevant attribute data from the client's data. The results for both of these are wrapped up in statement forms to produce statements as described above, and these statements are then added to the Computed Outline. In this specific case, as mentioned above, the statements are composed by one being embedded inside the other. The resulting compound statement added to the Computed Outline in this instance, fully parameterized, would look something as follows: AttributeOfEntity('Sales', EntityByID('1234', Salesperson]234), 15000).

FIG. 6D shows a high level view of NLG being performed on a computed outline in order to generate a narrative story. FIGS. 8A-8H elaborate on this NLG process.

Figure 8A:
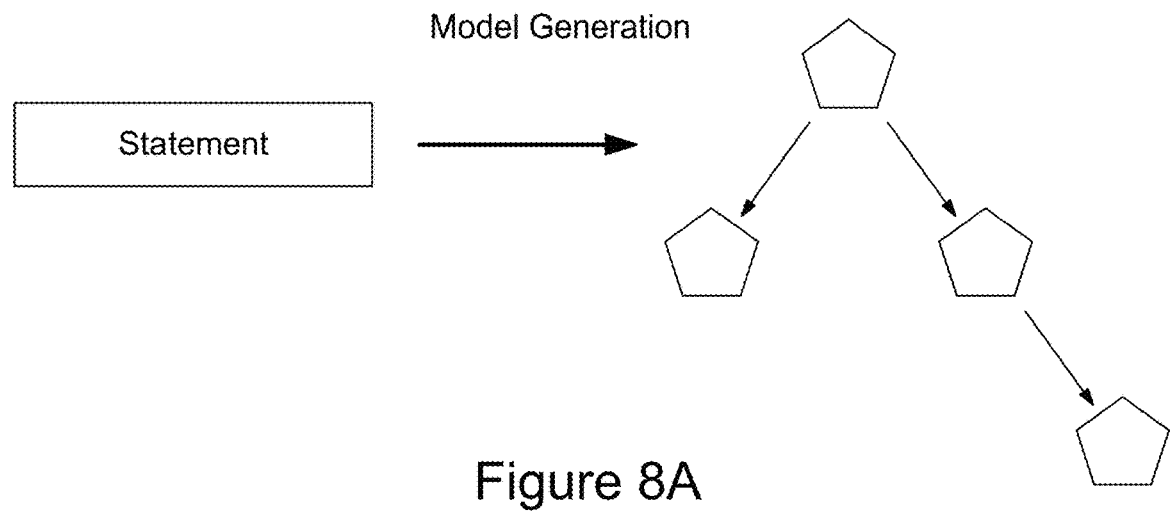
FIGS. 8A-H depict example embodiments for use in an NLG component of FIG. 6D.

As shown by FIG. 8A, the NLG process starts with the Computed Outline. Each phase of the NLG process walks through the Computed Outline and processes each computed statement form individually. Some stages look across multiple statements at once (such as Model Muting (see FIG. 8B) and Entity Referencing (see FIG. 8F), described below.

The first phase, Model Generation, converts the compound statements in the computed outline into NLGModel graphs, as shown by FIG. 8A. Model graphs are similar to the compound statement structures, but are structured specifically for constructing sentences. For example, dependencies between nodes in the model graph will represent where dependent clauses should be placed on the sentence. An NLGModel provides a mechanism for generating sentences, phrases, and words needed to produce a story. There is model type for each concept that needs to be expressed from authoring mapping to each individual type of statement included in the computed outline. Examples include attributes, values, units, entities, relationships, rankings, filters, and comparisons. The models produced from the statements in the computed outline are organized into a graph based on how the ideas are related to each other. The shape of the graph provides a method for the NLG system to handle phrase muting, clause placement, anaphora, and connectives.

For example, the statement for AttributeOfEntity('Sales', EntityByID('1234', Salesperson1234), 15000) is converted into a model graph where the root is an EntityModel representing the Salesperson1234. The EntityModel has a dependent AttributeModel representing the Sales attribute since Sales is an attribute of that entity. The attribute Sales has a value of 15000 so a ValueModel representing 15000 is added as a dependent to the AttributeModel. Finally, the ValueModel has a UnitModel representing the type of value. In this case it is 'dollars'. This model graph now provides the structure needed for the NLG system to construct a sentence for this statement. This was a simple example. The more complicated the statement, the more complicated the model graph will be. The system can also combine multiple statements into a single big model graph assuming they are related somehow, for example each of them are about the same entity. This then allows the system to then express multiple sets of ideas in a single sentence. If the model graph is too big, i.e. there are too many ideas to express in one sentence, it is split up into reasonably sized subgraphs that make up individual sentences.

Figure 8B:
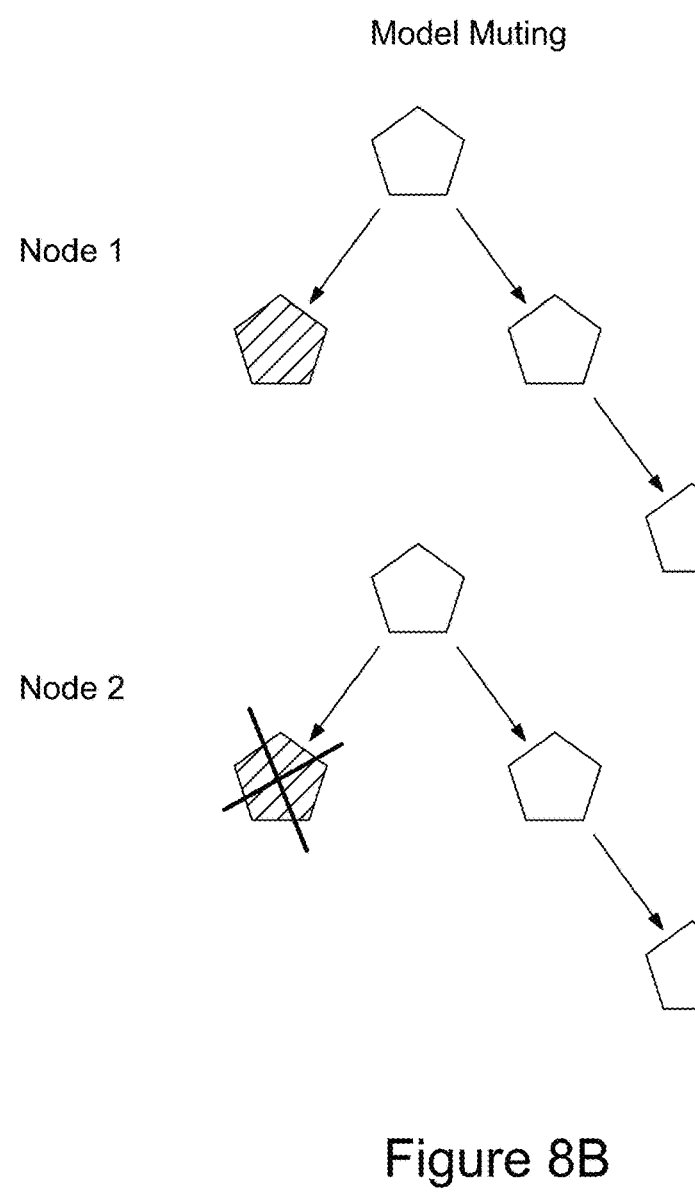

After a model graph has been generated for each node, adjacent nodes are compared with each other to mute redundant facts. This can be referred to as Model Muting, as shown by FIG. 8B. Model Muting reduces redundant information from being expressed across sentences. Since the working example has only a single goal, there is only one node involved, and there will be nothing to mute in this phase with respect to the example. Say though, the goal also had a timeframe associated with it so instead it was "Present the sales in the month of the Sales Person" and an adjacent goal was "Present the sales in the month of the top ranking Sales Person by sales". Without muting these goals would express as, "In August of 1993, Joe had sales of $15000. In August of 1993, Bob, the best seller, had sales of $430000". The timeframe "In August of 1993" is redundant between these two sentences and will be dropped in the second sentence resulting in language of "In August of 1993, Joe had sales of $15000. Bob, the best seller, had sales of $430000".

Figure 8C:
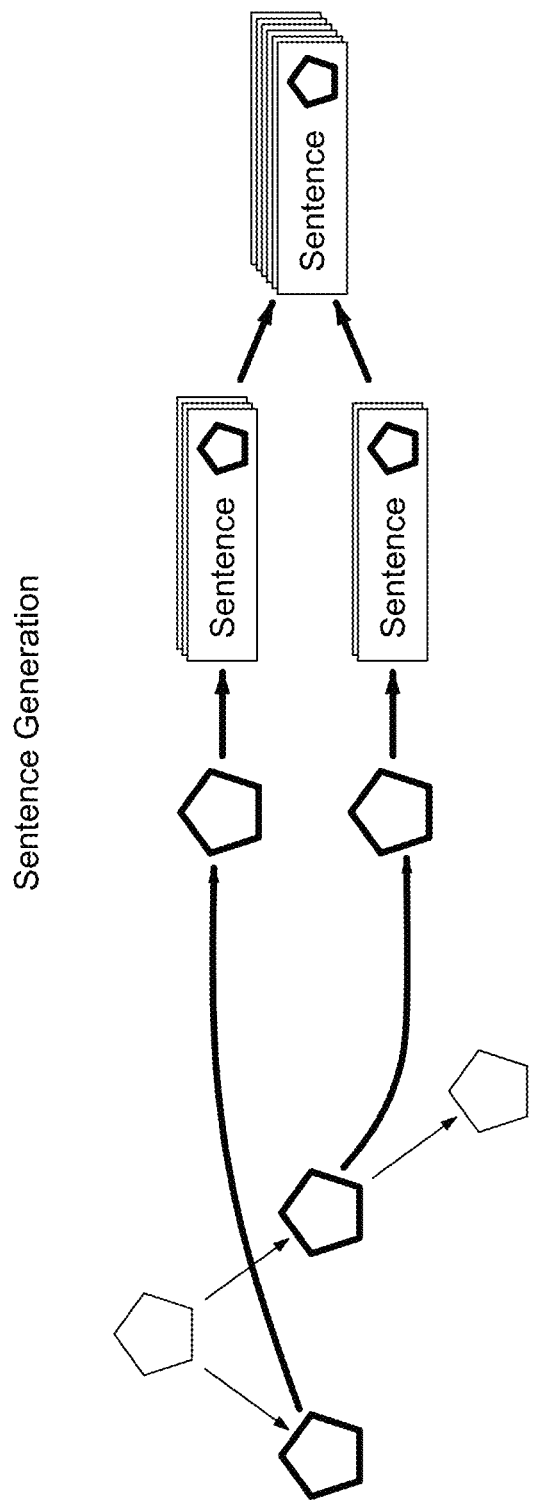
Figure 8D:
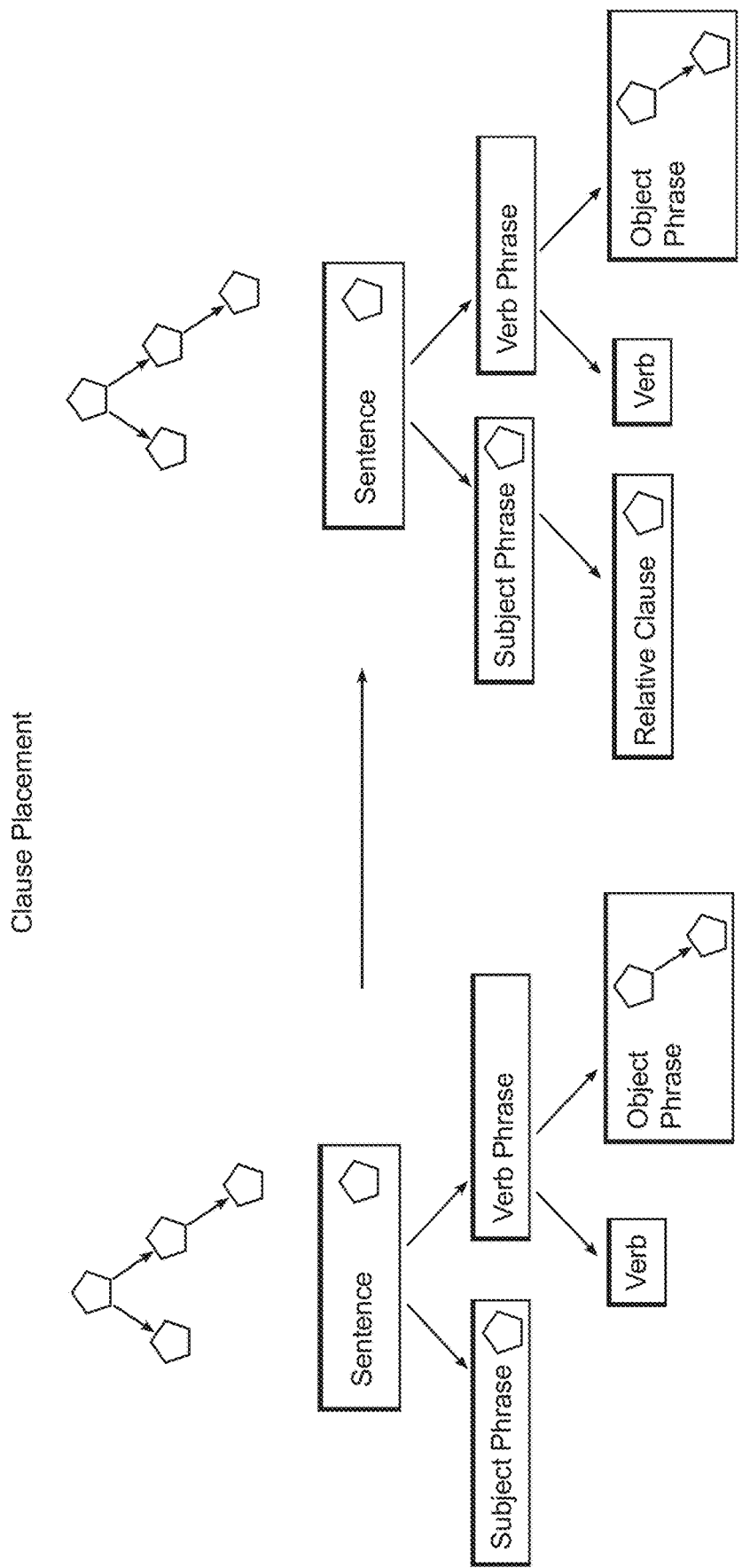

Next, sentences are generated based on each model graph during Sentence Generation as shown by FIG. 8C. The base of the sentence is generated first. It is the core subject/verb/object constituents of a sentence. Initially this will not have expressed all of the models in the graph (those will be added later as clauses). Not all models in the graph can generate base sentences, but multiple models can add to the set of possible sentences for a node. Sentences almost always come from preferences set by the user in the ontology 320 through things like attribute expressions, rank expressions, and/or relationship expressions. The sentences generated in this phase will be built upon, and later one of these sentences will be picked to be used in the narrative story.

Continuing with the working example, only the Attribute model can generate sentences for this model graph. It will generate them based on the attribute expressions configured by the user for "sales". Let's suppose the user configured three options: "the salesperson had sales of $100", "the salesperson sells $100", and "the salesperson's sales are $100". The Attribute model would generate three sentences, one for each of these options.

After the base sentences have been generated, the models not expressed in that base sentence must then be expressed as clauses on the sentence. This can be referred to as Clause Placement (see FIG. 8D). Depending on where the unexpressed models are in the model graph, they will be placed as phrases on the sentence attached to the noun representing the model in the graph they are dependents of. This is done for each sentence from the list of sentences produced by the sentence generation phase. Clauses are generated similarly to how sentences were generated in the previous phase based on the user's expression preferences within the ontology.

In our example, there are no extra models that need to be added as clauses. However, to illustrate how the clause placement phase would work, let's say that the goal was actually "Present the sales of the salesperson working in the city." A sentence from the Relationship model would be "Sally sells in Chicago." This leaves the Attribute/Value/Unit models still needing to be expressed. The Attribute model can produce clauses for these. Based on the attribute expression configuration, it would generate clauses of "who has sales of $1000" or "who has sold $1000". These would be added as a relative clause to "Sally" giving a complete sentence of "Sally, who has sales of $1000, sells in Chicago" (as one of the sentences among the several available permutations).

Figure 8E:
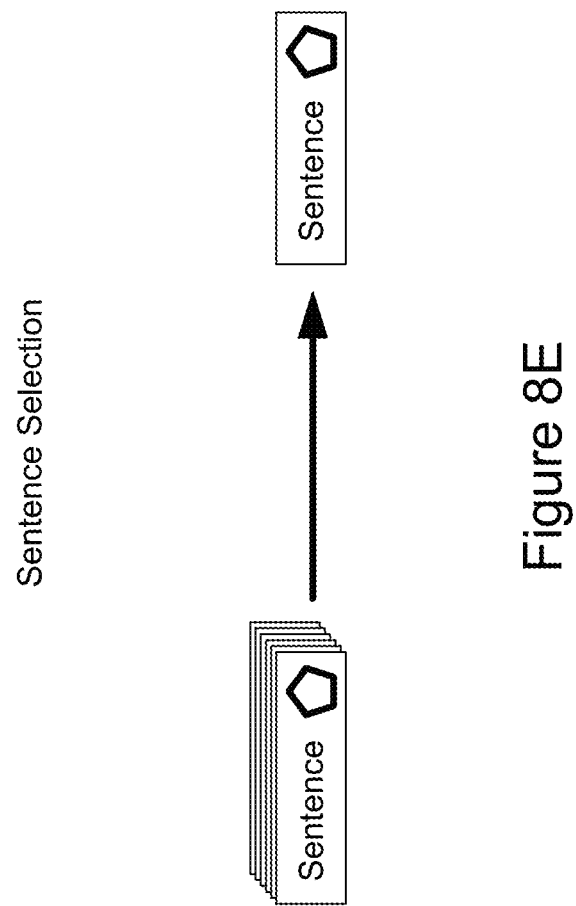
Figure 8F:
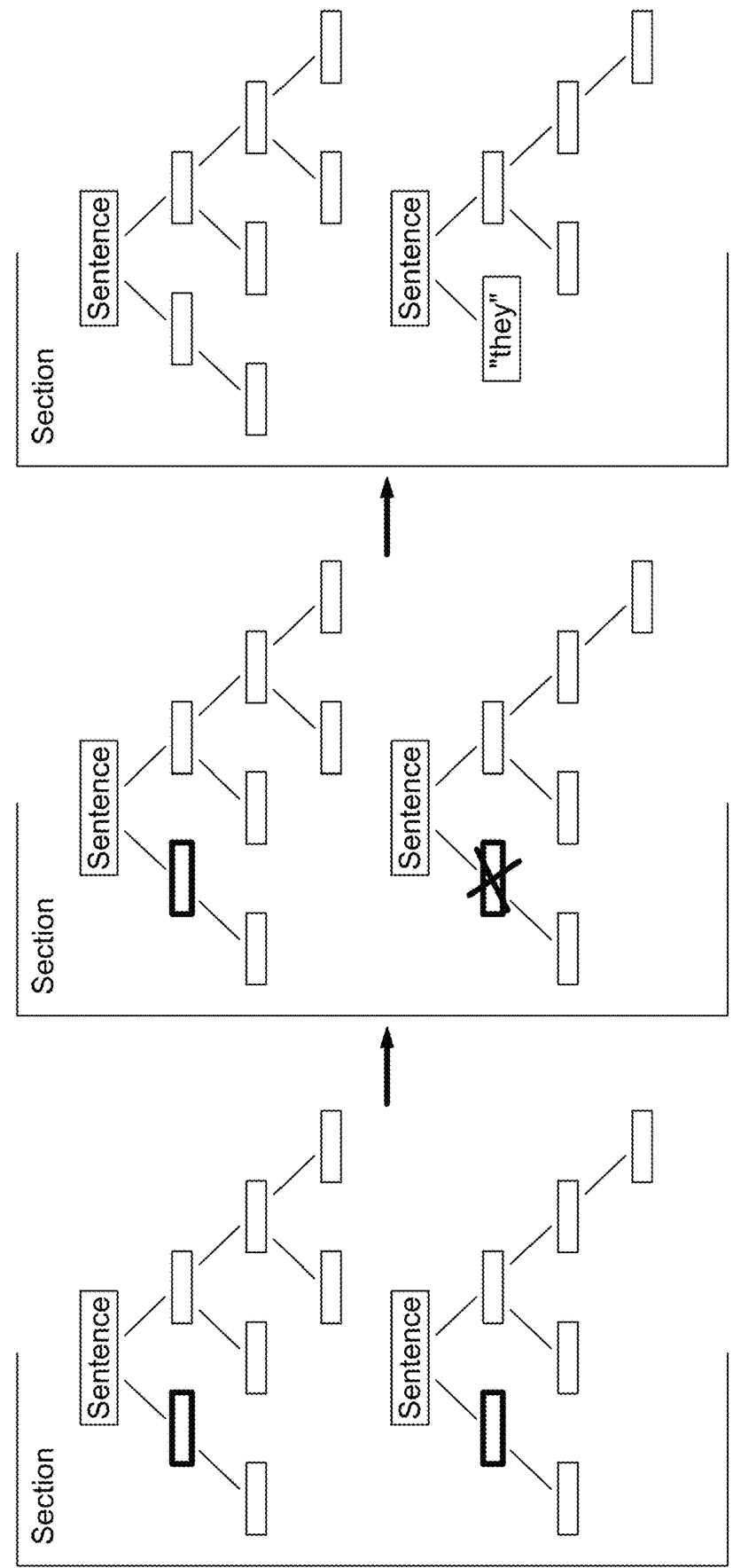
Figure 8G:
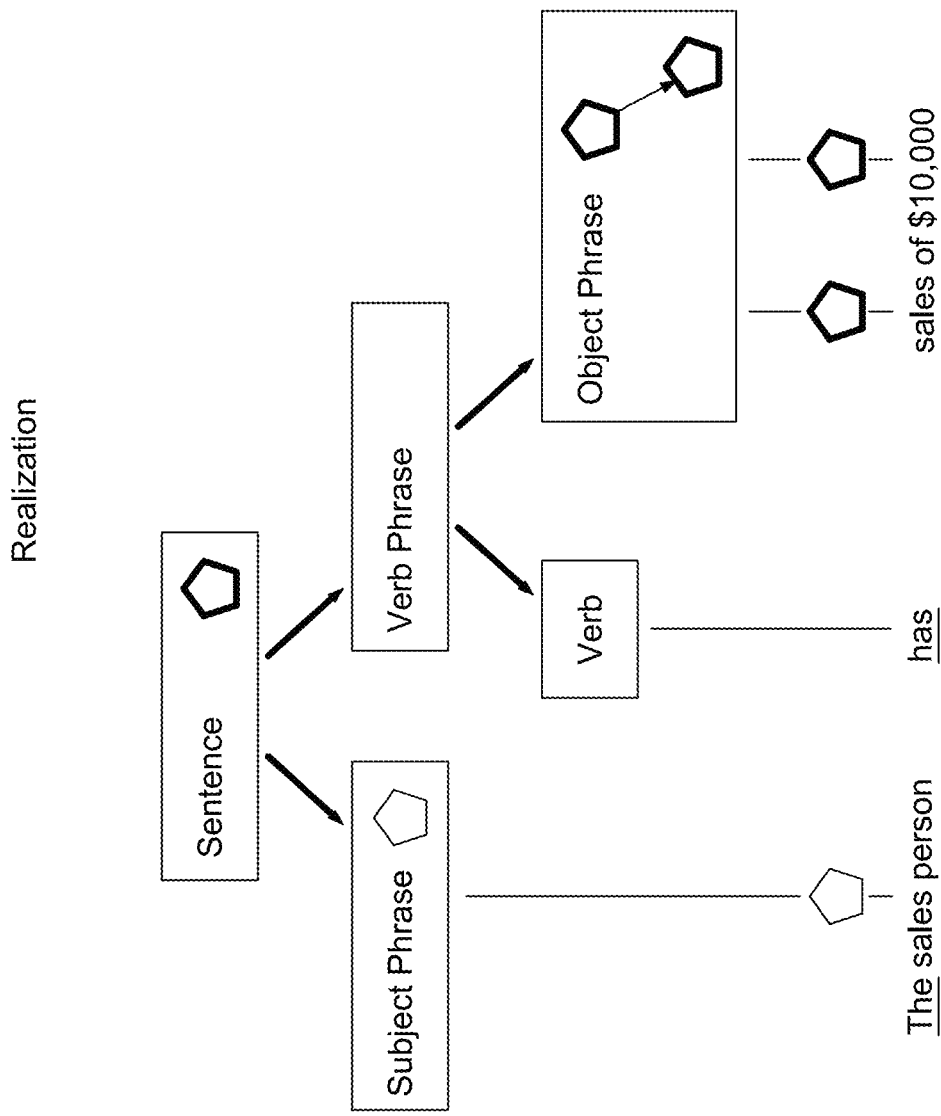
Figure 8H:
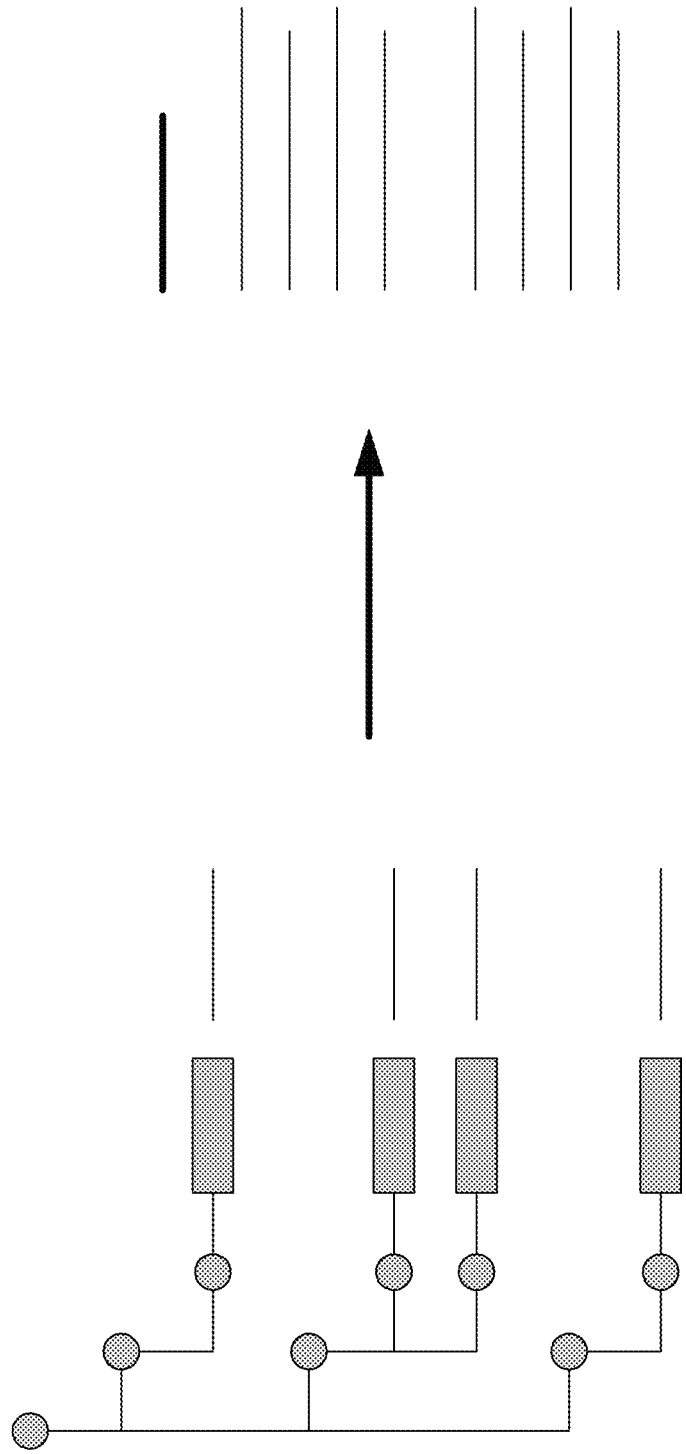

The next phase is Sentence Selection (see FIG. 8E). At this point, complete sentences have been built, and the system needs to pick one for use in the narrative story. The Sentence Selection phase can take into consideration several factors when selecting sentences. For example, the selected sentence should (1) correctly convey the intent of the goal, (2) only express what is necessary, and (3) prefer patterns that generally sound better. With these criteria, the system will likely be still left with more than one valid sentence. At this point, the system can choose from the remaining sentences that provide the best variability of expression. In an example embodiment, with all factors being equal, the system can randomly select a sentence from among the qualifying sentences. In our example, based on the goal, all three sentences are equally valid, so the system will randomly choose one to include in the final story. At the conclusion of the Sentence Selection phase, a sentence will have been selected for each node in the outline.

At this point, the system seeks to improve fluidity by looking across the nodes in the outline. At this stage, referred to as Entity Referencing (see FIG. 8F), nodes in the same section that repeat entities will be replaced with pronouns. The pronoun used will depend on the type of entity being replaced. If the base entity type is a Person and gender is available, the system will use gendered pronouns (e.g., he/she), otherwise it will use a non-gendered pronoun (e.g., they).

In our example, since there is only a single goal there would be no pronoun replacement. If instead there were two adjacent goals in the same section (e.g., "Present the sales of the salesperson" and "Present the title of the salesperson", a pronoun would be used for the second sentence, resulting in the language "Sally had sales of $10000. She had the title VP of Sales." At this point, the sentences have been finalized. The next thing to do is ensure that the sentences are grammatically correct. This phase can be referred to as Realization (see FIG. 8G). To perform realization, the system adds articles (definite—"the"- and indefinite—"a/an"), conjugates verbs, and adds punctuation. After realization, the system has the final language for use in the story.

Wrapping up the example, the realized sentence ends up being "Sally has sales of $10,000." To get to that, the verb "has" was conjugated into present tense because the lack of a timeframe. The system can be configured to assume the timeframe is "now" in cases where no timeframe is specified in the communication goal statement. Also, the Realization phase inspects "sales" and determines that it was plural so an indefinite article was not needed. Finally, "Sally" is determined to be a name proper noun, which accordingly means that a definite article is not needed before "Sally".

As a last step, which can be referred to as Document Generation (see FIG. 8H), the system puts the realized language into a formatted document. Examples of suitable formats can include HTML, Microsoft Word documents, and JSON. The system returns the formatted document to the client.

Ontology Building:

FIGS. 9-13 depict example process flows that show how the ontology 320 can be built in response to user input, including user input during the process of composing communication goal statements. Appendix A included herewith is a user guide for an example narrative generation platform, where the user guide shows examples of GUI screens that demonstrate how the ontology 320 can be built in response to user input.

Figure 9:
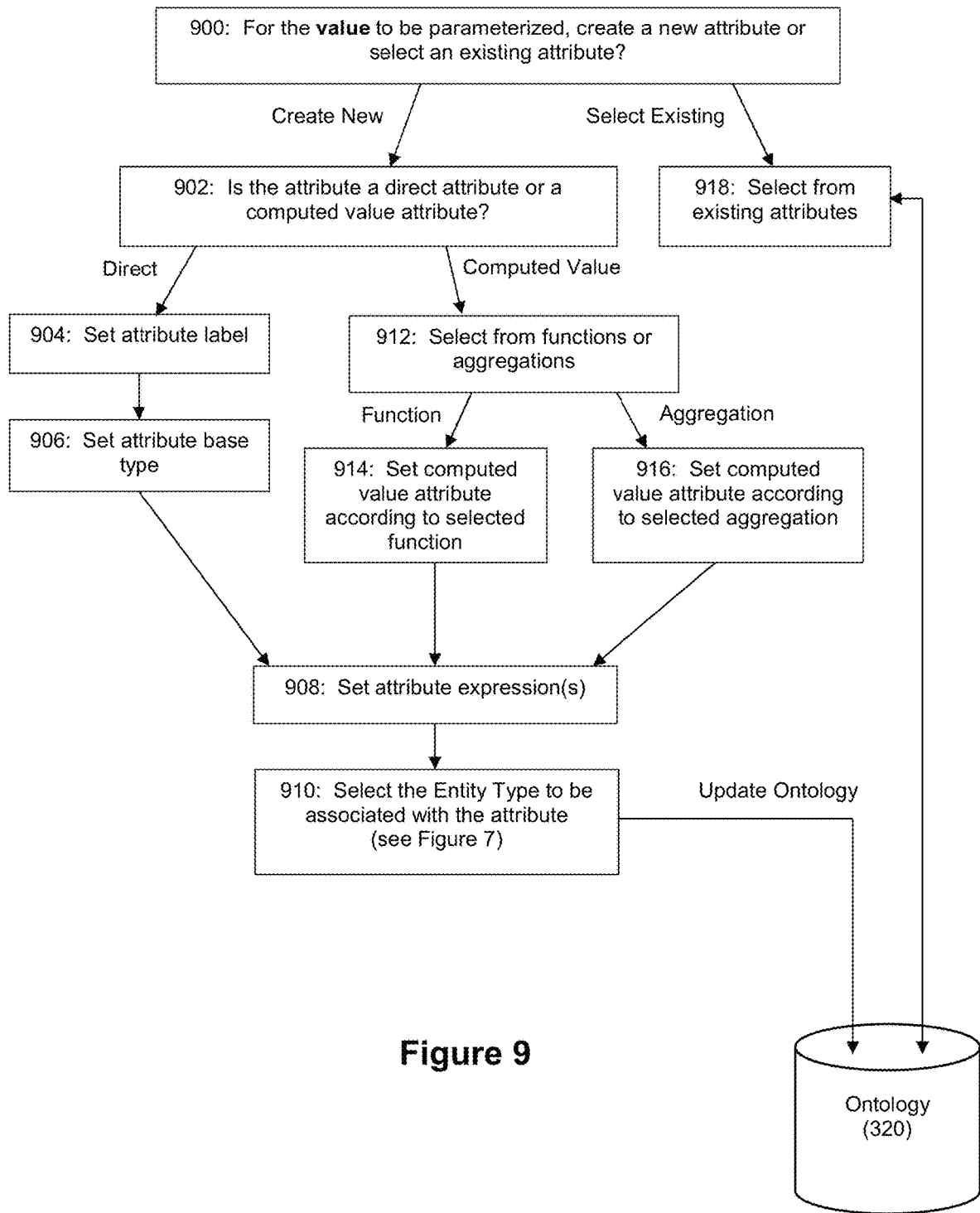
FIG. 9 depicts an example process flow for parameterizing an attribute.

FIG. 9 depicts an example process flow for parameterizing a value in a communication goal statement, which relates to the attribute objects in the ontology 320. It should be understood that the order of many of the steps in this process flow could be changed if desired by a practitioner. At step 900, the processor determines in response to user input whether a new attribute should be created for the value to be parameterized or whether an existing attribute should be used. Appendix A depicts example GUI screens that can assist the user as part of this process (see, e.g., FIG. 164 et seq.). If an existing attribute is to be used, the system can access the ontology 320 to provide the user with a list of attributes available for selection by the user. The user can select an existing attribute from this list (step 918). The system can also use string matching technology to match any characters entered by a user through the GUI to existing attributes in the ontology 320. Upon detecting a match or partial match, the system can then suggest an existing attribute for selection.

If a new attribute is to be created for the value, the process flow proceeds to step 902. At step 902, the process flow makes a decision as to whether the new attribute should be a direct attribute or a computed value attribute.

If a direct attribute is to be created, the process flow proceeds to step 904. At step 904, the processor defines a label for the attribute in response to user input. This label can serve as the name for the attribute (e.g., "sales"—see FIG. 59). Next, at step 906, the processor defines a base type for the attribute in response to use input. Examples of base types for attributes can include currency, date, decimal, integer, percentage, and string. FIG. 60 shows an example GUI screen through which a user can set the type for the subject attribute.

Next, at step 908, the processor defines the expression(s) that are to be associated with the subject attribute. Through specification of one or more expressions for the subject attribute, the user can provide the system with a number of options for expressing the attribute in words when rendering a narrative story.

At step 910, the processor selects the entity type for the subject attribute in response to user input. FIGS. 61-66 show example GUI screens for step 910. Step 910 is further elaborated upon with reference to FIG. 11 discussed below.

Figure 171:
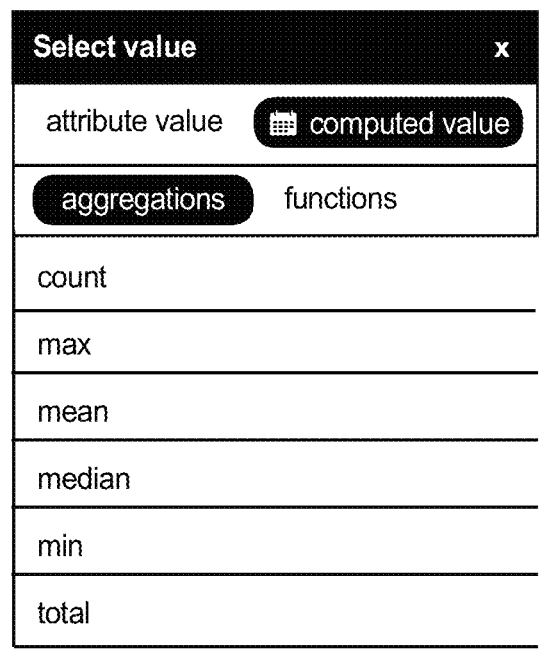
Figure 172:
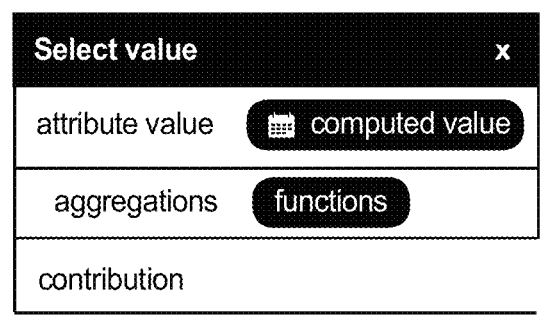

If step 902 results in a determination that a computed value attribute is to be created, the process flow proceeds to step 912 from step 902. At step 912, the system presents the user with a choice of making the computed value attribute a function or an aggregation (step 912). If a function is selected at step 912, the process flow proceeds to step 914 where the processor sets the computed value attribute according to the user-selected function. If an aggregation is selected at step 912, the process flow proceeds to step 916 where the processor sets the computed value attribute according to the user-selected aggregation. Examples of available aggregations can include count, max, mean, median, min, range, and total. These aggregations can be associated with corresponding parameterized computational logic (see FIG. 3D) that is programmed to compute the desired aggregation. An example of an available function is a contribution function, which evaluates how much a component contributes to an aggregate. However, it should be understood that other functions can be available through the system. For example, additional functions could include a multiplication, a division, a subtraction, standard deviation, a first derivative, and a second derivative. FIGS. 171-172, described in greater detail below in Appendix A, illustrate some example GUI screens through which a user can define computed value attributes.

After the attribute has been defined via the process flow of FIG. 9, the ontology 320 can be updated by adding the details for attribute 330 to ontology 320.

It should be understood that additional operations can be included in the attribute definition process flow if desired by a practitioner. For example, if a practitioner wishes to attach timeframe details to attributes, a timeframe definition process flow can be added to the FIG. 9 process flow.

Figure 10:
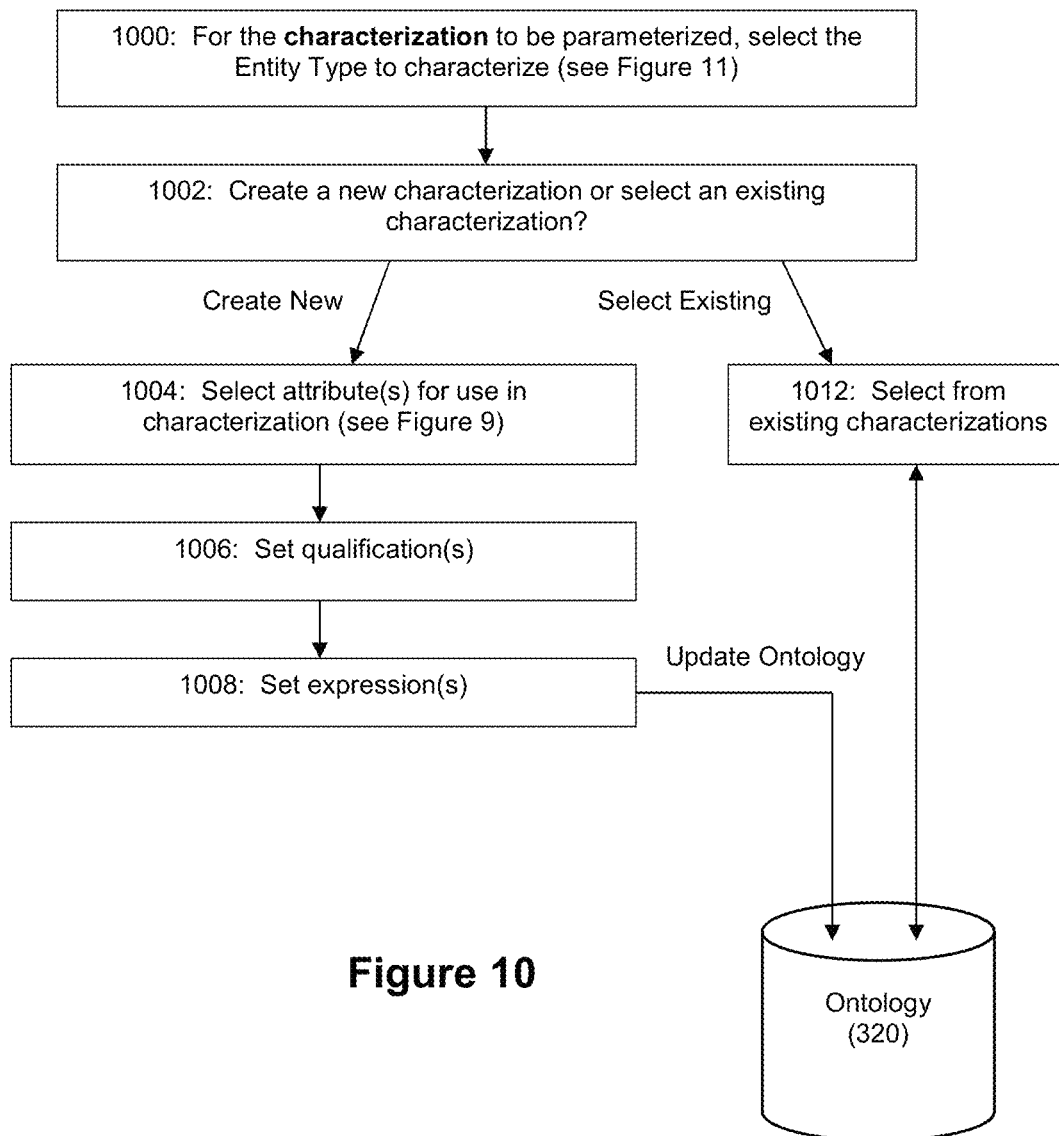
FIG. 10 depicts an example process flow for parameterizing a characterization.
Figure 11:
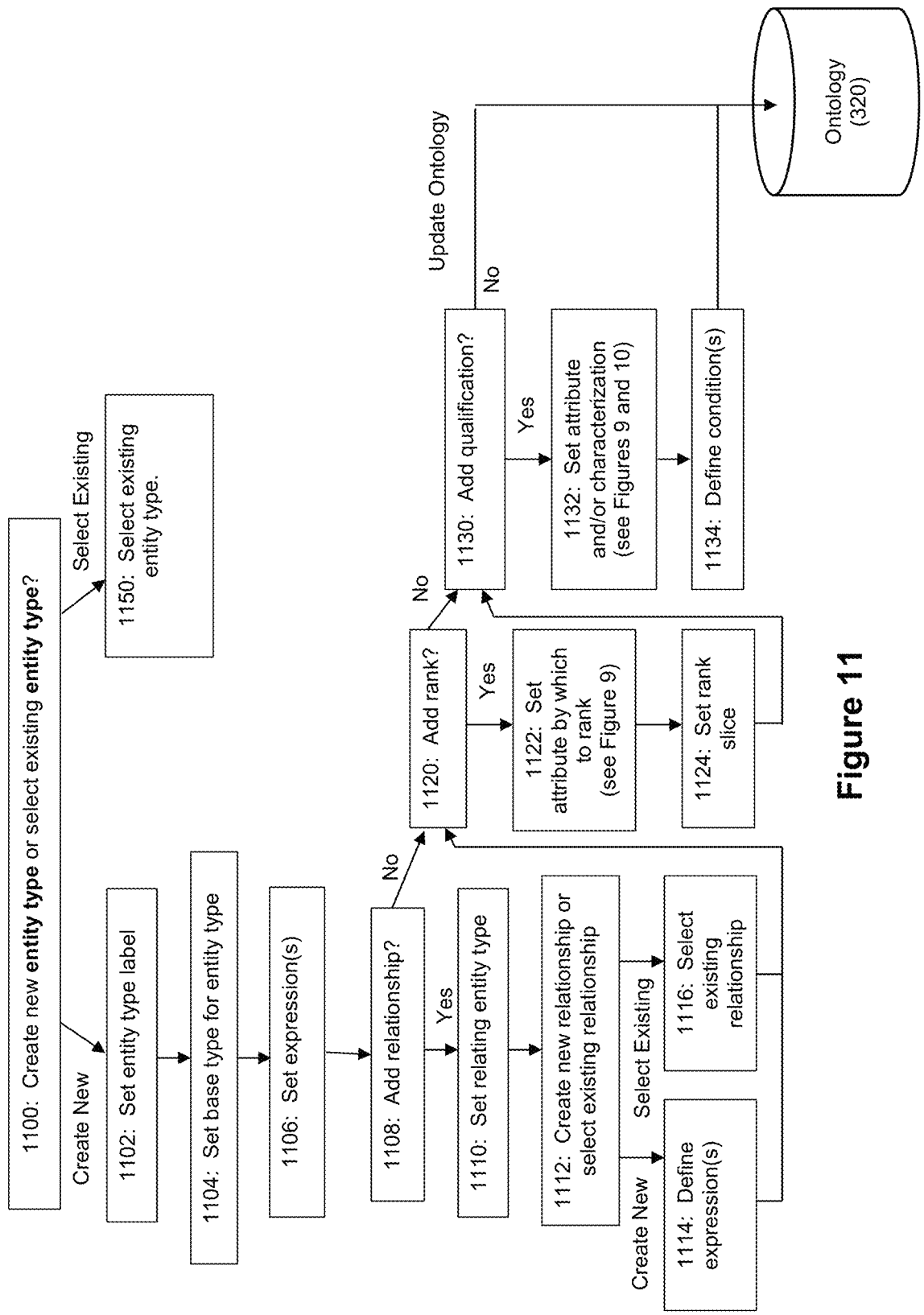
FIG. 11 depicts an example process flow for parameterizing an entity type.

FIG. 10 depicts an example process flow for parameterizing a characterization object in a communication goal statement and ontology. Characterizations 332 are editorial judgments based on defined qualifications that determine the language used when certain conditions are met. Through a characterization 332, a user is able to associate descriptive language with an entity type based on the nature of one or more attributes of that entity type. At step 1000, the processor selects the entity type to be characterized in response to user input. FIG. 11 provides an example process flow that elaborates on how the entity type can be defined.

At step 1002, the system determines whether the user wants to create a new characterization or select an existing characterization. This step can be performed in a manner similarly to step 900 in FIG. 9, but for characterizations rather than attributes. If an existing characterization is desired, the system can make a selection of an existing characterization in response to user input at step 1012. However, if a new characterization is desired, the process flow proceeds to step 1004.

At step 1004, the user selects the attribute(s) for use in the characterization. If the attribute needs to be defined, the process flow of FIG. 9 can be followed. For example, if the characterization 332 is meant to characterize the performance of a salesperson in terms of sales by the salesperson, step 1004 can result in the user selecting the attribute "sales" as the attribute by which the characterization will be determined.

At step 1006, the user sets the qualification(s) by which to evaluate the characterization. For example, these qualifications can be a series of thresholds by which the values of the sales attribute are judged (e.g., the characterization changes based on whether the sales amount are above or below a threshold of $10,000). Multiple thresholds can be defined for a characterization, which would then yield more than two potential outcomes of a characterization (e.g., three or more tiers of characterization outcomes). Also, the qualifications need not be defined in terms of fixed thresholds. The thresholds can also be flexibly defined in terms of direct attributes and/or computed value attributes (for example, a salesperson can be characterized as a satisfactory salesperson if the sales attribute for the subject salesperson has a value that exceeds the value of the benchmark attribute for the subject salesperson; as another example, a salesperson can be characterized as an above-average salesperson if the sales attribute for the subject salesperson has a value that exceeds the average value of the sales attributes for the all of the salespeople within a company). As part of defining the qualifications, step 1006 can also involve the user specifying the operators by which to judge qualifications. Examples of operators may include "greater than", "less than", "greater than or equal to", "equals", etc.

At step 1008, the user sets the expression(s) for the subject characterization. These expressions can then be used by the NLG process when articulating the subject characterization in a narrative story. For example, in a characterization relating to the performance of a salesperson in terms of sales, expressions such as "star performer", "outperformed", "high performer" etc. can be used in situations where the sales exceeded the highest threshold, while expressions such as "laggard", "poor performer", "struggled", etc. can be used in situations where the sales were below the lowest threshold.

FIGS. 77-80, 146-161, and 204-209 depict example GUIs through which a user can provide inputs for the process flow of FIG. 10. Upon the completion of the FIG. 10 process flow, the system can update the ontology 320 to add the details for the defined characterization 332. It should be understood that additional operations can be included in the characterization definition process flow if desired by a practitioner. For example, if a practitioner wishes to attach timeframe details to characterization, a timeframe definition process flow can be added to the FIG. 10 process flow.

FIG. 11 depicts an example process flow for parameterizing an entity type in a communication goal statement and ontology. Entity types are how the system knows what to talk about with respect to a communication goal statement. An entity type is a primary object in the ontology which has particular attributes (e.g., a department (entity type) has expenses (attribute). An entity is a specific instance of an entity type, with data-driven values for each attribute (e.g., John Smith is a specific instance of a salesperson entity type, and this entity has a specific data value for the sales attribute of a salesperson entity type). Ontology 320 may include more than one entity type.

At step 1100, the processor decides, in response to user input, whether to create a new entity type or select an existing entity type. This step can be performed while a user is composing a communication goal statement. If step 1100 results in a determination that an existing entity type is to be used, the process flow can proceed to step 1150 where an existing entity type is selected.

If step 1100 results in a determination that a new entity type is to be created, the process flow proceeds to step 1102. At step 1102, the user provides a label for the entity type. This label can be used as the entity type's name (e.g., a "salesperson" entity type). Next, at step 1104, the user sets a base type for the subject entity type. Examples of available base types to choose from can include person, place, thing, and event. However, it should be understood that more, fewer, and/or different base types can be used. The specified base type can be used by the AI logic to inform decision-making about the types of pronouns that can be used to express the subject entity type, among other expressive qualities for the entity type.

At step 1106, the user sets one or more expressions in relation to the subject entity type. These expressions provide the NLG process with a variety of options for expressing the entity type in a story.

The FIG. 11 process flow can also include options for attaching a number of additional features to entity types.

For example, a relationship can be added to the subject entity type at steps 1108-1116. At step 1110, the user identifies the entity type to which the subject entity type is to be related. If the relating entity type does not exist, the process flow of FIG. 11 can be recursively invoked to create the relating entity type. An example of a relating entity type might be a "company" entity type with respect to a subject entity type of "salesperson". Steps 1112-1116 operate to define the nature of the relationship between the subject entity type and the relating entity type. At step 1112, the process flow determines whether the user wants to create a new relationship or select an existing relationship. If create new is selected at step 1112, the process flow proceeds to step 1114 where the user provides an expression for the new relationship (e.g., the relating expression can be "employed by" to relate the subject entity type of "salesperson" to the relating entity type of "company" (thus, the "salesperson" is "employed by" the "company"). Multiple expressions may be provided at step 1114 to provide variability during story rendering. For example, the expressions "works for", "is a member of", "belongs to" might be used as alternative expressions for the relationship between the "salesperson" entity type and the "company" entity type. If select existing is selected at step 1112, the process flow proceeds to step 1116 where a user can be presents with a list of existing relationship expressions known to the system or within the ontology. The user can then select one or more of these expressions to define the nature of the relationship between the subject entity type and the relating entity type.

Another example of a feature that can be added to an entity type is a rank. Steps 1120-1124 describe how a rank can be attached to an entity type. The rank feature provides the AI with a mechanism for notionally identifying entities to be discussed in a narrative story even if the user does not know in advance which specific entities are to be discussed. For example, a user may want the system to generate a story about the 3 top ranked salespeople in terms of sales, but does not know a priori who these salespeople are. The rank feature attached to the salesperson entity type allows for a user to easily compose a communication goal statement that can be used by the AI to generate an appropriate narrative story. At step 1122, the user sets the attribute by which the subject entity type is to be ranked. For example, if salespeople are to be ranked by sales, the user can specify the sales attribute at step 1122. The FIG. 9 process flow can be followed to specify the subject attribute for ranking. At step 1124, the user sets a rank slice for the rank feature. The rank slice defines a depth for the rank feature with respect to the subject entity type. If the rank slice is set to 1, only the top ranked entity would be applicable. If the rank slice is set to n, the n highest rank entities would be returned.

Another example of a feature that can be added to an entity type is a qualification. Steps 1130-1134 describe how a qualification can be attached to an entity type. Similarly to the rank feature, the qualification feature provides the AI with a mechanism for notionally identifying entities to be discussed in a narrative story even if the user does not know in advance which specific entities are to be discussed. For example, a user may want the system to generate a story about the salespeople who have 10 years of more of experience or who have been characterized as star performers in terms of sales, but does not know a priori who these salespeople are. The qualification feature attached to the salesperson entity type allows for a user to easily compose a communication goal statement that can be used by the AI to generate an appropriate narrative story. At step 1132, the user sets the attribute 330 and/or characterization 332 that will be used to filter/qualify the subject entity type. For example, if the user wants the story to focus on salespeople with at least 10 years of experience, the user can specify a "years worked" or "start date" attribute at step 1132. The FIG. 9 process flow can be followed to specify the subject attribute for qualification. If a user wants to specify a characterization at step 1132, the FIG. 10 process flow can be followed in order to specify a characterization of qualification. At step 1134, the user defines condition(s) for the qualification. For example, if a "years worked" attribute is set as the qualification and the user wants to qualify salespeople based on 10 years of experience, the user can define the condition on the attribute as 10 years.

FIGS. 121-161 depict example GUIs through which a user can provide inputs for the process flow of FIG. 11. Upon the completion of the FIG. 11 process flow, the system can update the ontology 320 to add the details for the defined entity type 322. It should be understood that additional operations can be included in the entity type definition process flow if desired by a practitioner. For example, if a practitioner wishes to attach timeframe details to characterization, a timeframe definition process flow can be added to the FIG. 11 process flow. As another example, the FIG. 11 process flow can include branching options for adding an attribute to an entity type directly from the FIG. 11 process flow if desired. Similarly, the FIG. 11 process flow can also include branching options for adding a characterization to an entity type directly from the FIG. 11 process flow if desired.

Figure 12:
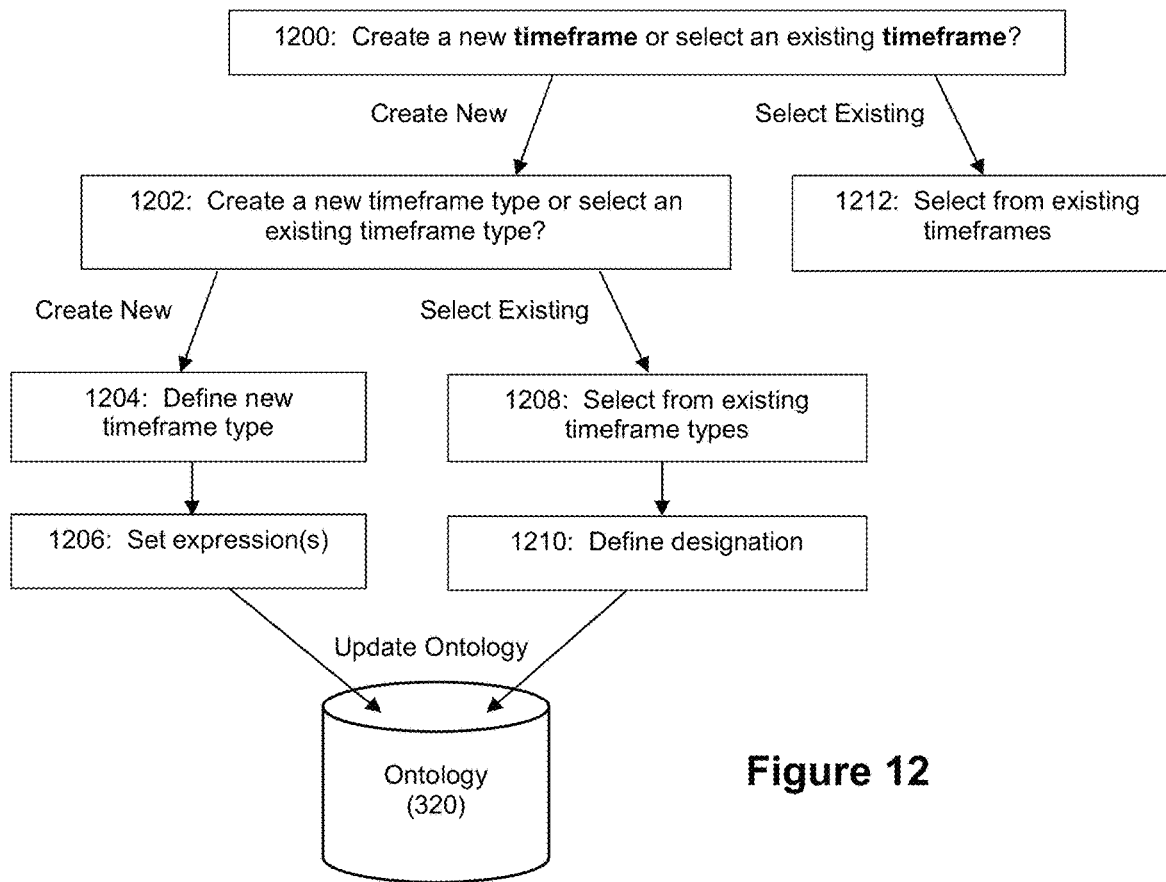
FIG. 12 depicts an example process flow for parameterizing a timeframe.

FIG. 12 depicts an example process flow for parameterizing a timeframe in a communication goal statement and ontology. A timeframe is a unit of time used as a parameter to constrain the values included in the expression of a communication goal statement or narrative story. Ontology 320 may include more than one timeframe.

At step 1200, the processor decides, in response to user input, whether to create a new timeframe or select an existing timeframe. This step can be performed while a user is composing a communication goal statement. If step 1200 results in a determination that an existing timeframe is to be used, the process flow can proceed to step 1212 where an existing timeframe is selected.

If step 1200 results in a determination that a new timeframe is to be created, the process flow proceeds to step 1202. At step 1202, the system determines whether the user wants to create a new timeframe type or select from among existing timeframe types. Examples of timeframe types include years, months, days, hours, etc.

If a new timeframe type is desired, the process flow proceeds to step 1204 where the user defines the timeframe type and step 1206 where the user sets the expression(s) for the timeframe type. The expression(s) provide the NLG process with a variety of options for expressing the timeframe in a story.

If an existing timeframe type is desired, the process flow proceeds to step 1208 where the user makes a selection from among existing timeframe types and step 1210 where the user defines a designation for the selected timeframe type. Through this designation, the user can define qualifications via a "when" statement or the like that defines time-based conditions (e.g., "the month of the year when the sales of the store were highest").

FIGS. 67-69, 92-93, 101, 107, 167-170, 192, and 201-203 depict example GUIs through which a user can provide inputs for the process flow of FIG. 12. Upon the completion of the FIG. 12 process flow, the system can update the ontology 320 to add the details for the defined timeframe 344.

Figure 13:
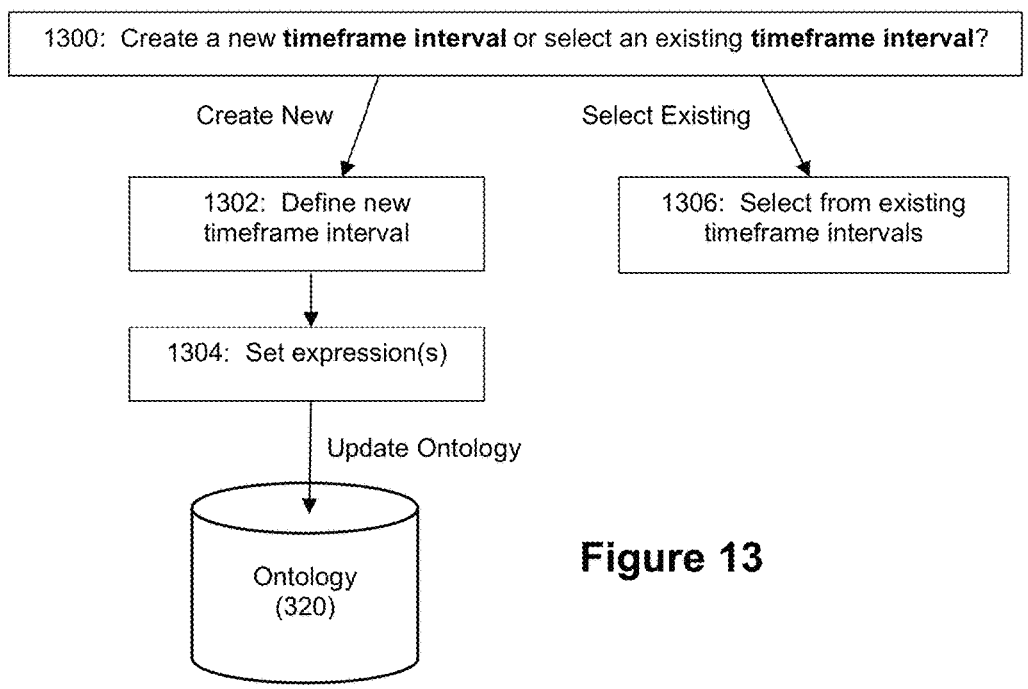
FIG. 13 depicts an example process flow for parameterizing a timeframe interval.

FIG. 13 depicts an example process flow for parameterizing a timeframe interval for use with a timeframe. The timeframe interval defines how the system should consider intervals of time within a timeframe (e.g., days of the month, weeks of the month, months of the year, quarters of the year, hours of the day, etc.). At step 1300, the processor decides, in response to user input, whether to create a new timeframe interval or select an existing timeframe interval. If step 1300 results in a determination that an existing timeframe interval is to be used, the process flow can proceed to step 1306 where an existing timeframe interval is selected. If step 1300 results in a determination that a new timeframe interval is to be created, the process flow proceeds to step 1302. At step 1302, the user defines the timeframe interval, and at step 1204 the user sets one or more expression(s) for the timeframe interval. The expression(s) provide the NLG process with a variety of options for expressing the timeframe interval in a story. Upon the completion of the FIG. 13 process flow, the system can update the ontology 320 to add the details for the defined timeframe interval.

As explained above, the ontology 320 defined via the process flows of FIGS. 9-13 can be leveraged by the AI in coordination with the composed communication goal statements to not only determine the content to be expressed in the narrative story but also to determine how that content should be expressed in the narrative story.

Subgoals within Communication Goal Statements:

The communication goal statements may be interpreted by the system to include a plurality of subgoals or related goals. Thus, in order for a narrative story to satisfy the communication goal associated with a communication goal statement, it may be desirable to the narrative story to first satisfy one or more subgoals related to the communication goal of the communication goal statement. An example of this is shown by FIGS. 14A-D. As shown by FIG. 14A, a communication goal statement 1400 may be associated with a parent or base communication goal. The interpreter 506 may be configured to interpret communication goal statement 1400 as being comprised of two or more communication goal statements 1402 and 1404, where these communication goal statements 1402 and 1404 are associated with subgoals relating to the parent/base goal. When the AI 502 seeks to determine the content for inclusion in the story, the interpreter 506 will process the communication goal statements 1402 and 1404 when generating the computed outline.

FIG. 14B shows an example of this. In this example, the base communication goal statement corresponding to the parent/base goal is "Compare Value 1 to Value 2" (see base communication goal statement 406). This base communication goal statement 406 can be comprised of a series of three base communication goal statements, each relating to subgoals of the parent/base goal. In this example, these three base communication goal statements are: (1) "Present Value 1" 402$_1$, (2) "Present Value 2" 402$_2$, and (3) "Characterize the Difference Between Value 1 and Value 2" 404. Thus, for the narrative story to accomplish the overall parent/base goal of comparing Value 1 to Value 2, it will be helpful for the narrative story to first present Values 1 and 2 and then provide a characterization of the difference between Values 1 and 2.

During the composition process, a user may parameterize the base communication goal statement 406 of FIG. 14B as shown by FIG. 14C. As shown by FIG. 14C, the parameterized communication goal statement 406b can read "Compare the Sales of the Salesperson during the Timeframe to the Benchmark of the Salesperson", where Value 1 is the "Sales of the Salesperson during the Timeframe" and Value 2 is the "Benchmark of the Salesperson". The interpreter 506 can be configured to interpret parameterized communication goal statement 406b for the purposes of story generation as the following three parameterized communication goal statements: (1) "Present the Sales of the Salesperson during the Timeframe" $402_1b$, (2) "Present the Benchmark of the Salesperson" $402_2b$, and (3) "Characterize the Difference Between the Sales of the Salesperson during the Timeframe and the Benchmark of the Salesperson" 404b. The system can then interact with ontology 320 to generate a narrative story as shown by FIG. 14D from these three parameterized communication goal statements. As can be seen by FIG. 14D, the NLG process created the first sentence of the narrative story in a compound form to satisfy the subgoals associated with the first two parameterized communication goal statements $402_1b$ and $402_2b$. The final sentence of the narrative story satisfies the subgoal associated with the third parameterized communication goal statement 404b. Overall, the narrative story satisfies the parent/base goal associated with parameterized communication goal statement 406b.

Figure 75:
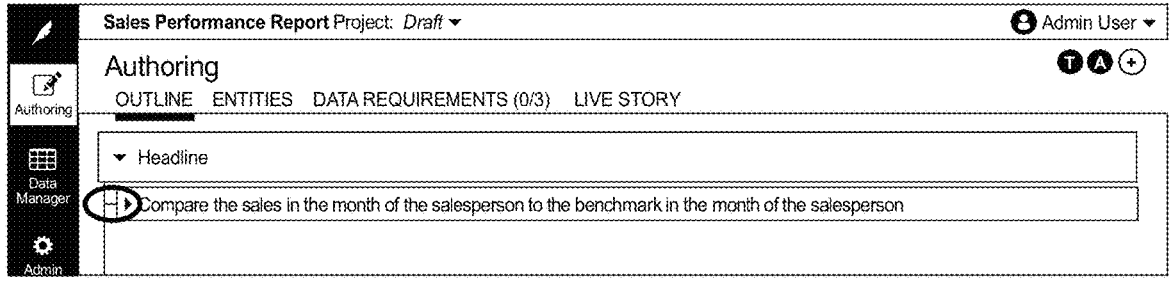
Figure 76:
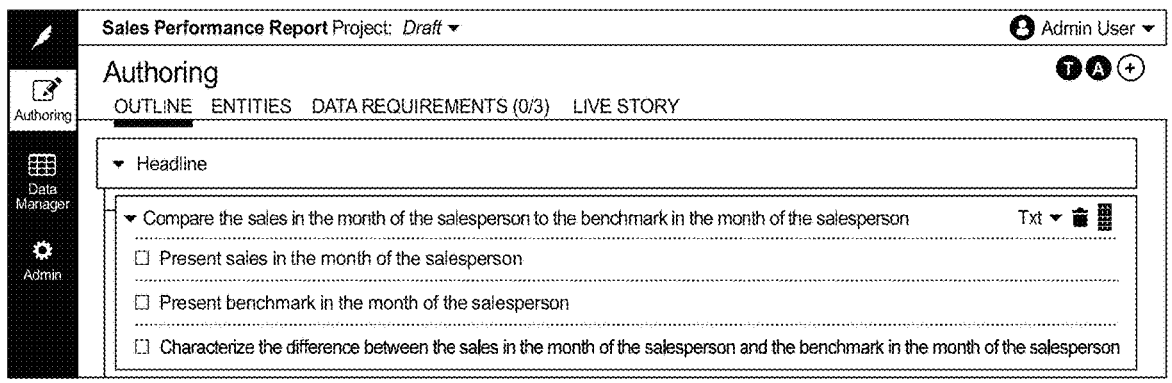
Figure 215:
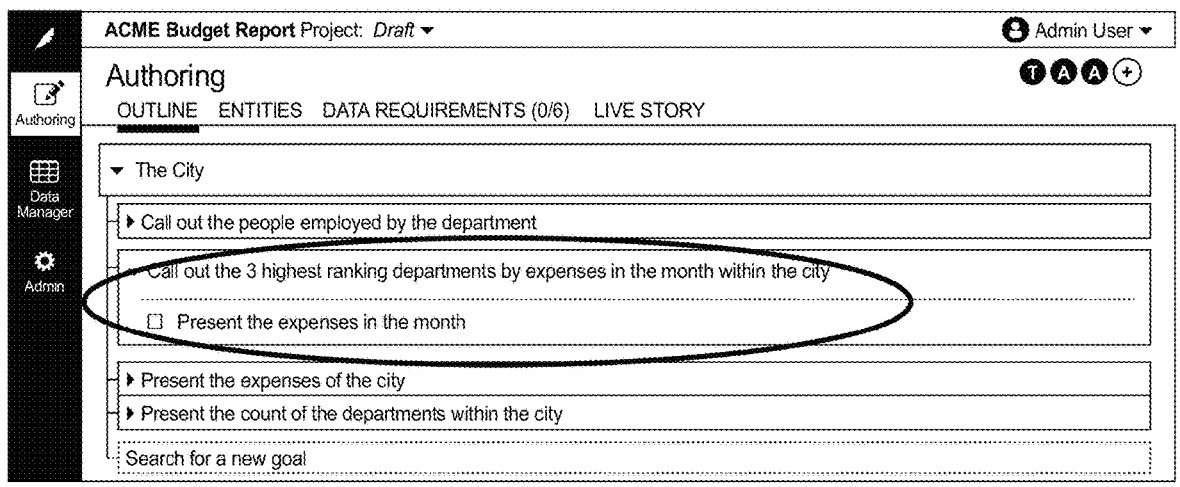

During the process of composing communication goal statements for use in the narrative generation process, the system can provide GUI screens to a user that allows the user to expand a communication goal statement to show communication goal statements associated with subgoals. Furthermore, the GUI can be configured to respond to user input to selectively opt in and opt out of which subgoals are to be included in the narrative generation process for a section of the story outline. Thus, if a user wants the story to include a headline or a title that is drawn from the "Compare" communication goal statement, a user can use a GUI to expand the "Compare" communication goal statement into statements for its constituent subgoals. For the headline/title, a user can choose to selectively opt out of the first two "Present" statements but retain the "Characterize" statement so that the headline/title is focused on a desired main point. Then, in the body of the narrative story, the user can selectively retain all of the constituent subgoals for the "Compare" statement so that the body of the narrative story provides the context for the comparison. FIGS. 75-76 and 215 depict example GUIs through which a user can expand a communication goal statement to view its related subgoals and selectively choose which of the subgoals will be used during the narrative generation process.

Figure 15A:
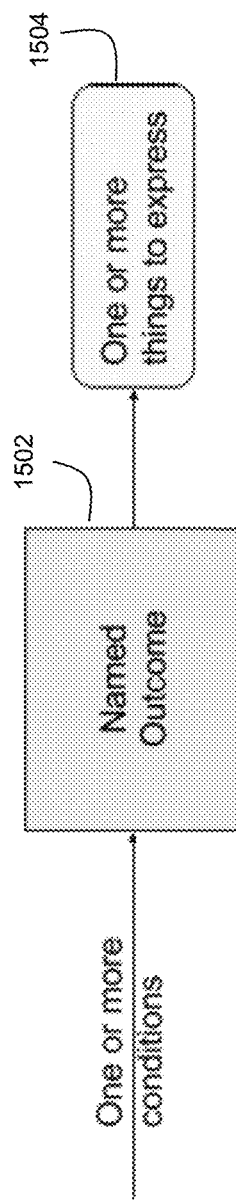
FIG. 15A depicts an example conditional outcome data structure linked with one or more idea data structures.

Example Embodiments for a Conditional Outcome Framework to Determine Narrative Content:

In another example embodiment, the system can employ a conditional outcome framework to support narrative generation. For example, AI 502 can employ a conditional outcome framework to determine content for inclusion in a narrative. FIG. 15A illustrates a simplified example where a conditional outcome data structure 1502 is linked with one or more idea data structures 1504, where each idea data structure 1504 represents an idea that is to be expressed in a narrative. The conditional outcome structure 1502 can comprise (1) a name corresponding to the conditional outcome, (2) one or more conditions that define when the conditional outcome is defined as true, and (3) one or more links to one or more content or idea structures 1502/1504. Thus, the conditional outcome data structure provides a mechanism for analyzing data to intelligently determine what ideas should be expressed in a narrative about that data. This can serve as a powerful building block for constructing the AI 502 in a manner so that the content expressed in a narrative will intelligently respond to the underlying data being considered.

Figure 15B:
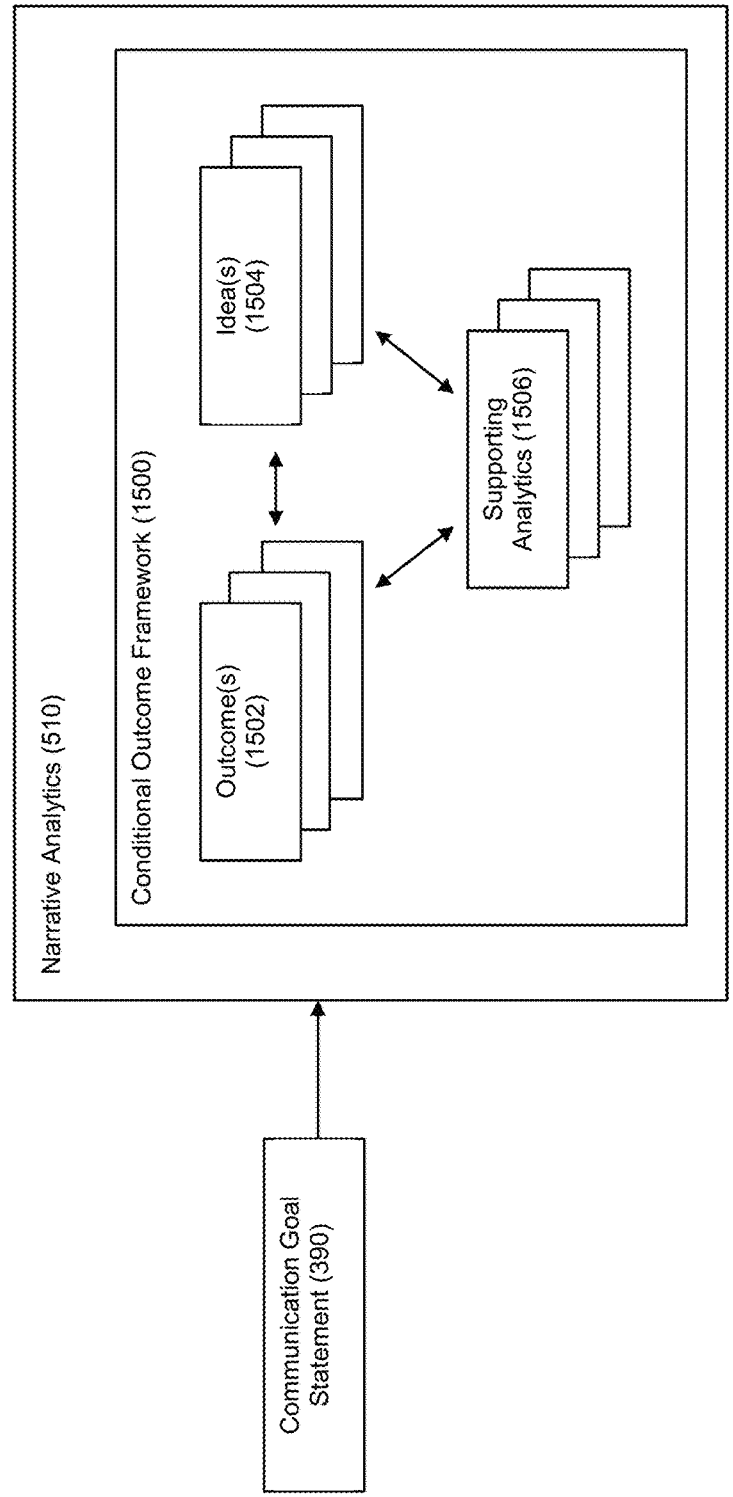
FIG. 15B depicts an example of narrative analytics that employ a conditional outcome framework to determine ideas to be expressed in a narrative.

FIG. 15B depicts an example that shows how the conditional outcome framework can be used in combination with a communication goal statement to intelligently adapt narratives to their underlying data in a manner that satisfies a desired communication goal. In FIG. 15B, narrative analytics 510 employ a conditional outcome framework 1500. As explained in connection with FIG. 5, the narrative analytics 510 can be associated with a communication goal statement 390. Thus, as the system processes a communication goal statement 390, an appropriate set of narrative analytics 510 tailored toward satisfying that communication goal statement can be selected. The conditional outcome framework 1500 can include one or more outcome data structures 1502 linked with one or more idea data structure 1504 as discussed above in connection with FIG. 15A. Furthermore, any of the outcome data structures 1502 and/or idea data structures 1504 can be associated with supporting analytics 1506. The supporting analytics provide logic that can be used by the system to compute information used for navigating the conditional outcome framework 1500 and identifying ideas during execution at 526 (see FIG. 5).

It should be understood that the outcome data structures 1502 can be tied together in numerous arrangements to define branching logic for the conditional outcome framework 1500. For example, there can be multiple layers of outcome data structures 1502 (each with associated conditions) to provide branching operations at multiple levels. Such branching structures allow for the conditional outcome framework 1500 to accommodate highly complex and intelligent decision-making as to what ideas should be expressed in a narrative in view of the nature of the data under consideration. Moreover, the outcome data structures 1502, idea data structures 1504, and supporting analytics 1506 can be parameterized to allow their re-use in a wide variety of contexts.

It should also be understood that the same idea data structure 1504 might be linked to multiple different outcome data structures 1502. Furthermore, a given outcome data structure 1502 might be linked to multiple idea data structures 1504. Examples of such arrangements are discussed below with reference to FIG. 16 et seq.

Example Embodiments for "Analyze" Communication Goal Statements:

As mentioned above, an operator such as "Analyze" can be used to identify a communication goal statement corresponding to an analysis communication goal. An example of a base communication goal statement for an analysis communication goal that could be supported by the system is "Analyze Entity Group by Attribute", where "Entity Group" serves as a parameter for a group of entities in the ontology 320 and "Attribute" serves as a parameter for an attribute of the specified entity group in the ontology 320. Such a base communication goal statement could be parameterized into a communication goal statement as "Analyze the Salespeople by Sales", where the Entity Group is specified as "Salespeople" (which can be a group of entities in the ontology 320 that have the entity type of "Salesperson"), and where the Attribute is specified as "Sales" (which can be an attribute of a "Salesperson" in the ontology 320). However, it should be understood that such a base communication goal statement could be parameterized in any of a number of different ways. Further still, it should be understood that different base communication goal statements could be used to satisfy other analysis-related communication goals, some examples of which are discussed below.

The system can link a base communication goal statement of "Analyze Entity Group by Attribute" with narrative analytics 510 that are linked to a story structure that aims to provide the reader with an understanding of the distribution of a particular value across a group of entities. Accomplishing this may involve expressing a variety of quantitative ideas (the number of entities in the group, the average value within a group, the median value within a group, the entities with the highest and lowest values, etc.) and more qualitative ideas (the values are distributed normally, the values are distributed exponentially, the values demonstrate a "long-tail" distribution, one entity in particular had a much higher value than the other entities, etc.). Accordingly, if desired by a practitioner, the system can directly map such a communication goal statement to parameterized narrative analytics and a parameterized story configuration that will express these concepts. However, the use of a conditional outcome framework 1500 by the relevant narrative analytics can provide additional flexibility where the resulting narrative story structure will adapt as a function of not only the specified communication goal but also as a function of the underlying data.

Figure 16:
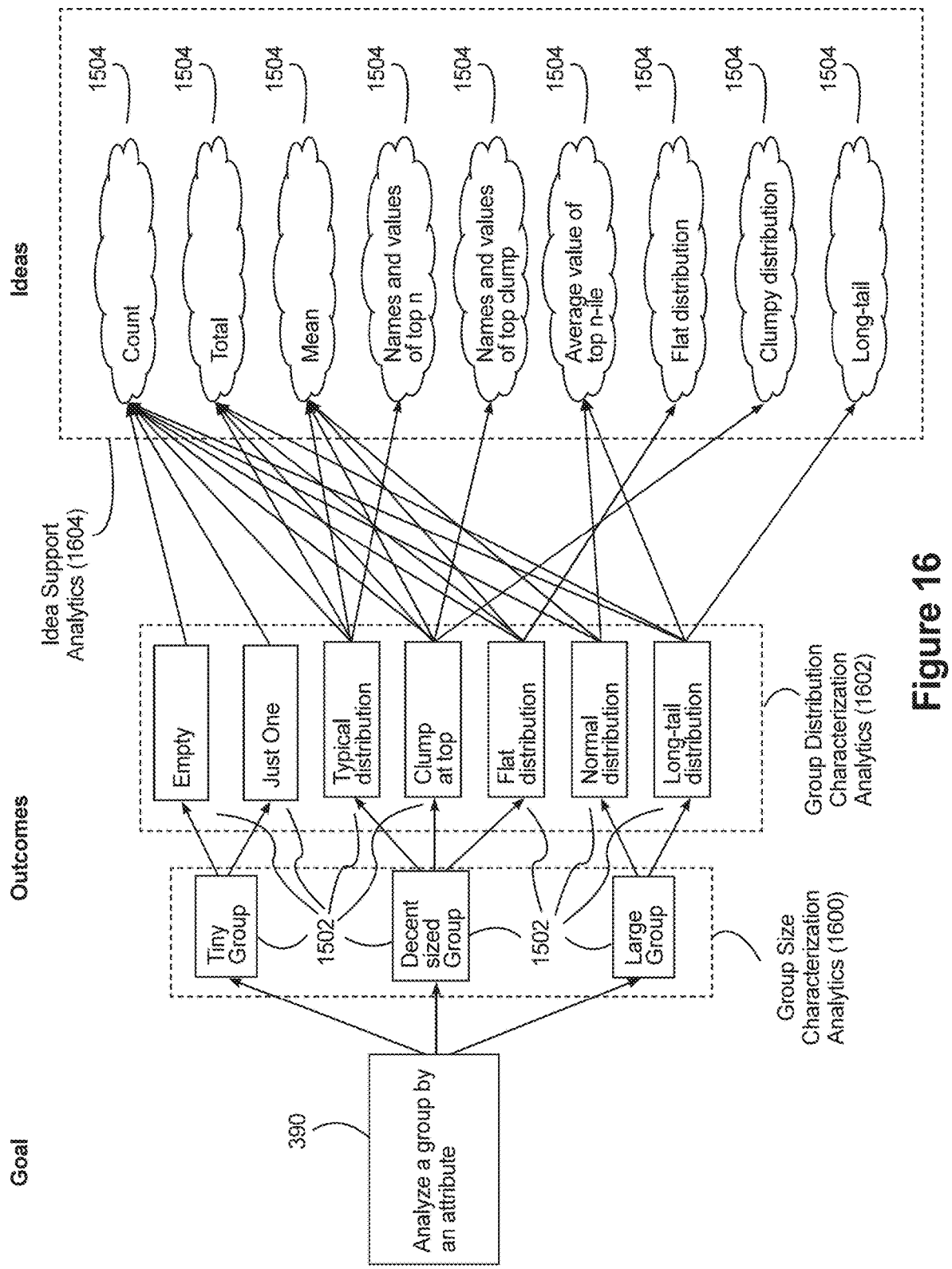
FIG. 16 depicts an example embodiment for a conditional outcome framework that can be used by the narrative analytics associated with a communication goal statement for "Analyze Entity Group by Attribute".

FIG. 16 discloses an example embodiment for a conditional outcome framework that can be used by the narrative analytics 510 associated with a communication goal statement 390 for "Analyze Entity Group by Attribute". In this example, the conditional outcome framework can employ multiple levels or layers of outcomes 1502. For example, a first layer of outcomes 1502 can correspond to different conditional outcomes that characterize the size of the group specified in the communication goal statement 390. The second layer of outcomes 1502 can correspond to different conditional outcomes that characterize the distribution of group members within the group based on the attribute specified by the communication goal statement 390. The first layer conditional outcomes 1502 can include a "tiny group" outcome 1502, a "decent sized group" outcome 1502, and a "large group" outcome 1502. Each of these different conditional outcomes 1502 can be tied to the conditions that are evaluated by the system to assess whether that conditional outcome 1502 fits the underlying data.

To drive the assessments regarding group size, the supporting analytics 1506 for the conditional outcome framework can include group size characterization analytics 1600 for the various group size outcomes 1502. For example, the "tiny group" outcome 1502 can be associated with parameterized logic that determines whether the number of members of the group specified by the communication goal statement 390 is less than or equal to 1 (it should be understood that other thresholds could be used to define the boundary conditions for a "tiny group"). If so, the "tiny group" outcome 1502 would evaluate as true. As another example, the "decent sized group" outcome 1502 can be associated with parameterized logic that determines whether the number of members of the group specified by the communication goal statement 390 is between 2 and 50 (it should be understood that other thresholds could be used to define the boundary conditions for a "decent sized group"). If so, the "decent sized group" outcome 1502 would evaluate as true. As another example, the "large group" outcome 1502 can be associated with parameterized logic that determines whether the number of members of the group specified by the communication goal statement 390 exceeds 50 (it should be understood that other thresholds could be used to define the boundary conditions for a "large group"). If so, the "large group" outcome 1502 would evaluate as true.

To drive the assessments regarding distribution within the group, the supporting analytics 1506 for the conditional outcome framework can include group distribution characterization analytics 1602 for the various group distribution outcomes 1502. In this example, the system seeks to characterize (1) a "tiny group" as being an empty group (see the "empty" outcome 1502) or a single member group (see the "just one" outcome 1502), (2) a "decent sized group" as being a typical distribution (see "typical distribution" outcome 1502), a distribution that is clumpy at the top (see "clump at top" outcome 1502), or a flat distribution (see the "flat distribution" outcome 1502), and (3) a "large group" as being a normal distribution (see "normal distribution" outcome 1502) or a long-tail distribution (see the "long-tail distribution" outcome 1502). Each of these second level outcomes 1502 can be associated with parameterized analytics 1602 that specify the computations used for characterizing the nature of the distributions within the group. For example, the "clump at top" outcome 1502 can be associated with parameterized analytics 1602 that are configured to sort entities by a particular value, group entities with similar values, and then determine if the highest ranked entities constitute a subgroup of similar values. Any thresholds or parameters used in determining such subgroups may be built into the system, specified directly by users, or tuned automatically by the system. As another example, the "long-tail distribution" outcome 1502 can be associated with parameterized analytics 1602 that are configured to perform distribution analysis and then determine if a significant proportion of the entities contributed values well below the mean contribution. Again, any thresholds or parameters used could be built into the system, specified directly by users, or tuned automatically by the system.

In FIG. 16, each second layer/level outcome 1502 is linked to one or more idea data structures 1504. Thus, the resolution of which ideas should be expressed in a given narrative that is generated to satisfy the communication goal statement 390 will depend on which outcomes 1502 were deemed true in view of the underlying data. The relationships between ideas for expression in a narrative to the nature of the underlying data in this example can be seen in the table below:

| Outcome of Characterizing the Underlying Data | Ideas to be Expressed in the Narrative About the Underlying Data |
| --- | --- |
| Tiny Group (Empty Set) | Narrative should express the following idea: A count of the group members |
| Tiny Group (Single Member) | Narrative should express the following idea: A count of the group members |
| Decent Sized Group (Typical Distribution) | Narrative should express the following ideas: A count of the group members The total of the attribute values for the group The mean of the attribute values for the group The names and values of the top N group members as ranked according to the group members' associated attribute values. |

| Outcome of Characterizing the Underlying Data | Ideas to be Expressed in the Narrative About the Underlying Data |
| --- | --- |
| Decent Sized Group (Clump at Top Distribution) | Narrative should express the following ideas: A count of the group members The total of the attribute values for the group The mean of the attribute values for the group A discussion of the clumpy nature of the distribution of members within the group with respect to the attribute values. The names and values of the group members in the top clump (as ranked according to the group members' associated attribute values). |
| Decent Sized Group (Flat Distribution) | Narrative should express the following ideas: A count of the group members The total of the attribute values for the group The mean of the attribute values for the group A discussion of the flat nature of the distribution of members within the group with respect to the attribute values. |
| Large Group (Normal Distribution) | Narrative should express the following ideas: A count of the group members The mean of the attribute values for the group The names and values of the group members in the top n percentile (as ranked according to the group members' associated attribute values). |
| Large Group (Long Tail Distribution) | Narrative should express the following ideas: A count of the group members The total of the attribute values for the group A discussion of the long tail nature of the distribution of members within the group with respect to the attribute values. The names and values of the group members in the top n percentile (as ranked according to the group members' associated attribute values). |

Any ideas 1504 that are resolved based on the conditional outcome framework could then be inserted into the computed story outline 528 for use by AI 504 (together with their associated specifications in view of the underlying data) when rendering the desired narrative.

To the extent that any of the ideas 1504 need additional computed values in order to be expressed (where such values were not previously computed by analytics 1600 or 1602), the supporting analytics 1506 can further include idea support analytics 1604. For example, if the analytics 1600 and 1602 do not compute a mean value for the attribute values within the group, the idea support analytics 1604 can include parameterized logic that computes such a mean value for the underlying data.

Thus, it can be seen that the example conditional outcome framework for a communication goal statement can define a hierarchical relationship among linked outcomes and ideas together with associated supporting analytics to drive a determination as to which ideas should be expressed in a narrative about a data set, where the selection of ideas for expression in the narrative can vary as a function of the nature of the data set.

In example embodiments, the conditional outcome framework can be designed so that it does not need any input or configuration from a user other than what is used to compose the communication goal statement 390 (e.g., for the "Analyze Entity Group by Attribute" communication goal statement, the system would only need to know the specified entity group and the specified attribute). However, for other example embodiments, a practitioner might want to expose some of the parameters of the conditional outcome framework to users to allow further configurations or adjustments of the conditional outcome framework.

For example, a practitioner might want to implement the thresholds used within the conditional outcome framework as user-defined values. In the context of FIG. 16, this could involve exposing the thresholds used for characterizing the size of the group to users so that a user can adjust the group size boundaries in a desired manner (e.g., in some contexts, a large group might have a minimum of 100 members, while in other contexts a large group might have a minimum of 1000 members). Similarly, the values for "n" used by the conditional outcome framework of FIG. 16 (e.g., the top "n" group members or the "nth percentile") could be exposed to users to allow adjustments of the value used for n.

Figure 17A:
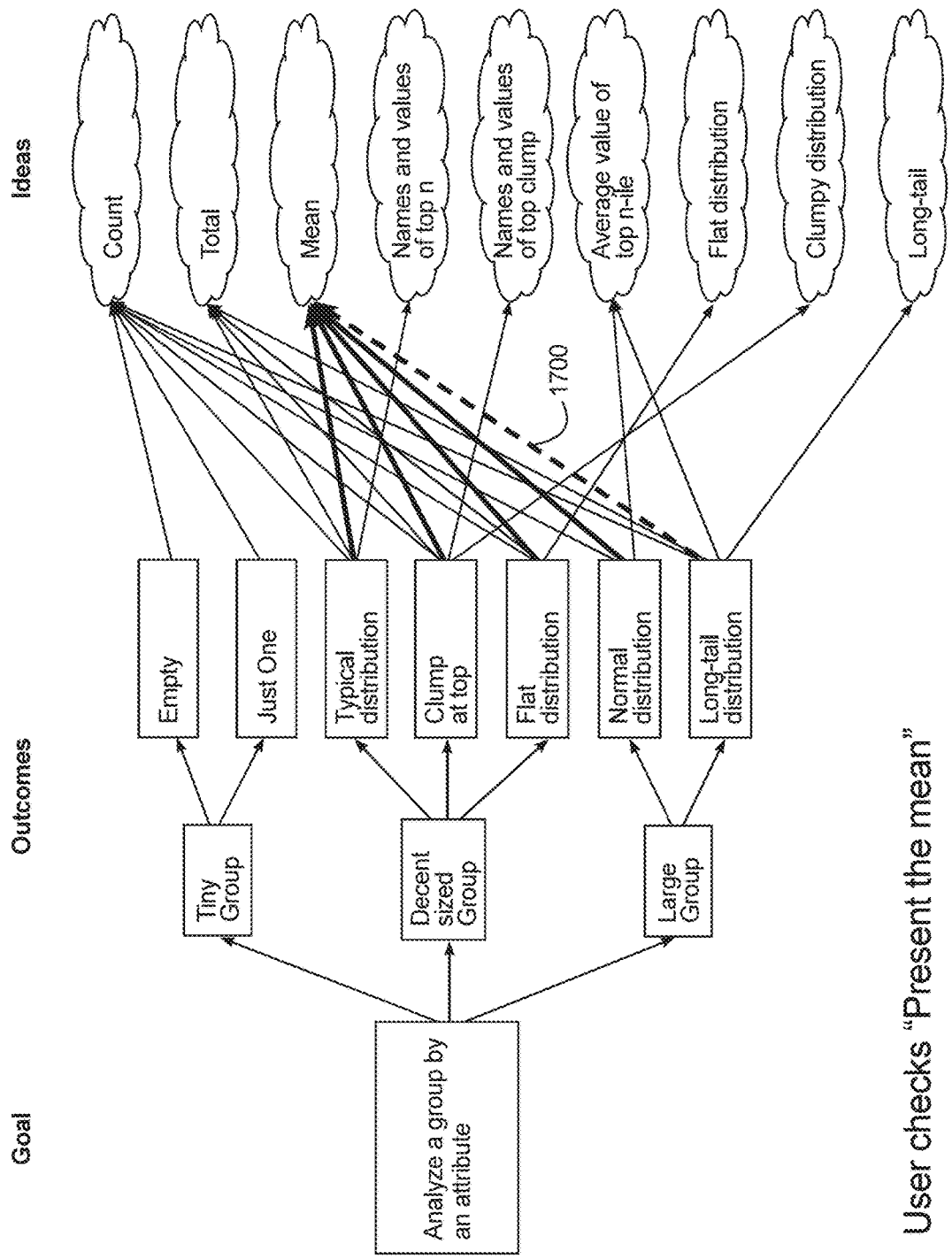
FIGS. 17A and 17B depict examples of how ideas can be linked to and delinked from outcomes within a conditional outcome framework in response to user input.
Figure 17B:
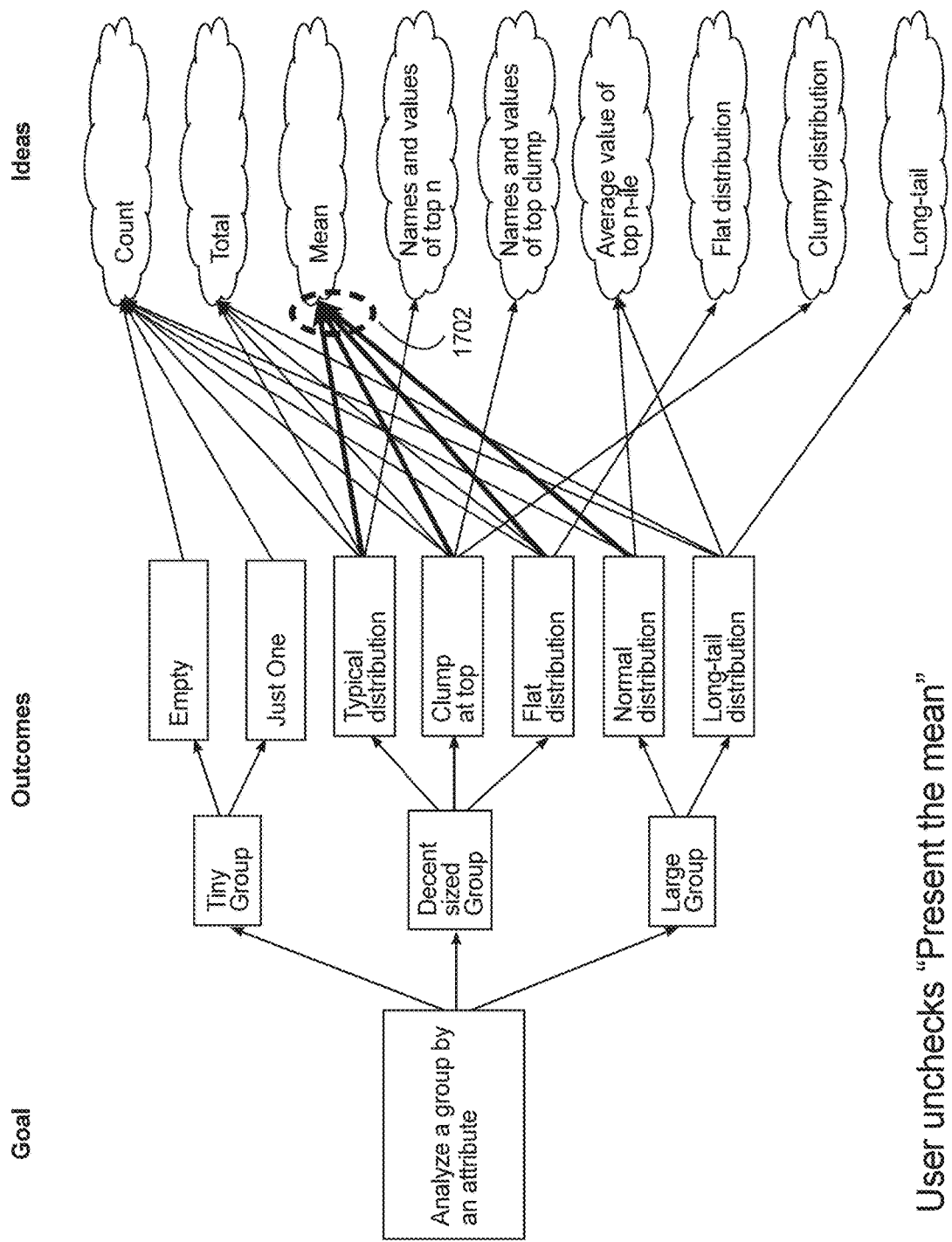

As another example, a practitioner might want to provide users with a capability to enable/disable the links between outcomes 1502 and ideas 1504 in a conditional outcome framework. For example, a GUI could present a user with lists of all of the outcomes 1502 and ideas 1504 that can be tied to a communication goal statement within a conditional outcome framework. The user could then individually select which ideas 1504 are to be linked to which outcomes 1502. If desired by a practitioner, that conditional outcome framework can include default linkages that are presented in the GUI, and the user could make adjustments from there. FIG. 17A shows an example where a user has adjusted the conditional outcome framework to add a linkage 1700 between the "present the mean" idea 1504 and the "long tail distribution" outcome 1502. FIG. 17B shows an example where a user has removed the linkages 1702 that had previously existed between the "present the mean" idea 1504 and the "typical distribution", "clump at top", "flat distribution", and "normal distribution" outcomes 1502.

Figure 18A:
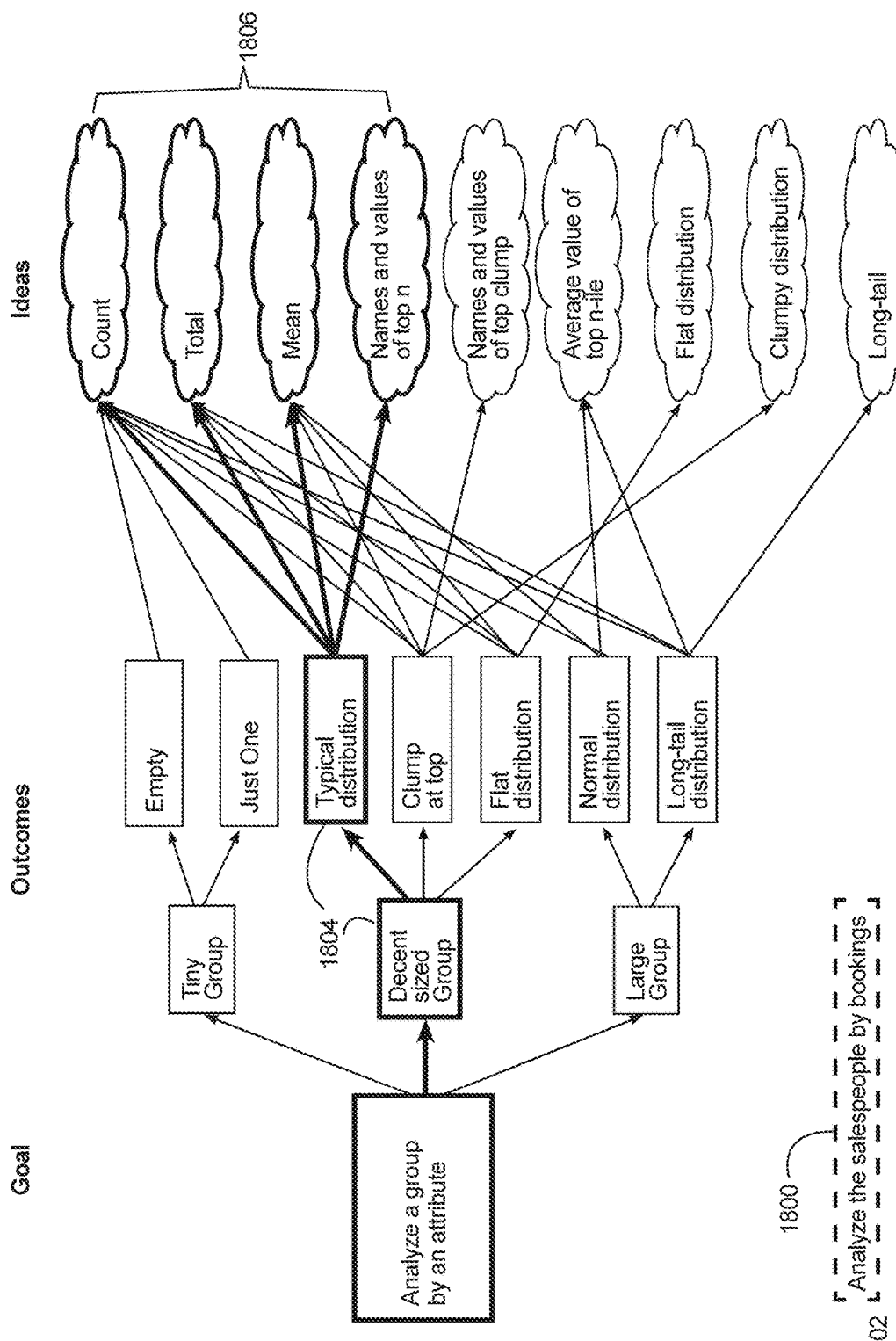
FIGS. 18A and 18B depict examples of narratives that can be generated using the conditional outcome framework of FIG. 16.

FIG. 18A shows an example of a narrative 1802 that can be generated using the conditional outcome framework of FIG. 16 as applied to a communication goal statement 1800 of "Analyze the salespeople by bookings" with respect to a data set that includes various salespeople and their associated bookings (e.g., the dollar values of their bookings). In this example, the narrative 1802 would be generated after an analysis of the data set arrived at a determination that the outcomes 1804 were true (the salespeople group was "decently sized" and has a "typical distribution" of salespeople with respect to their bookings). As can be seen in FIG. 18A, the narrative text 1802 expresses the following ideas 1806 that are tied to the outcomes 1804: (1) a count of the number of salespeople in the group, (2) the total amount of bookings for the salespeople in the group, (3) the mean value of bookings for the salespeople in the group, and (4) the names of the top 3 salespeople in the group (by the booking values) and the booking values for each of the top 3.

Figure 18B:
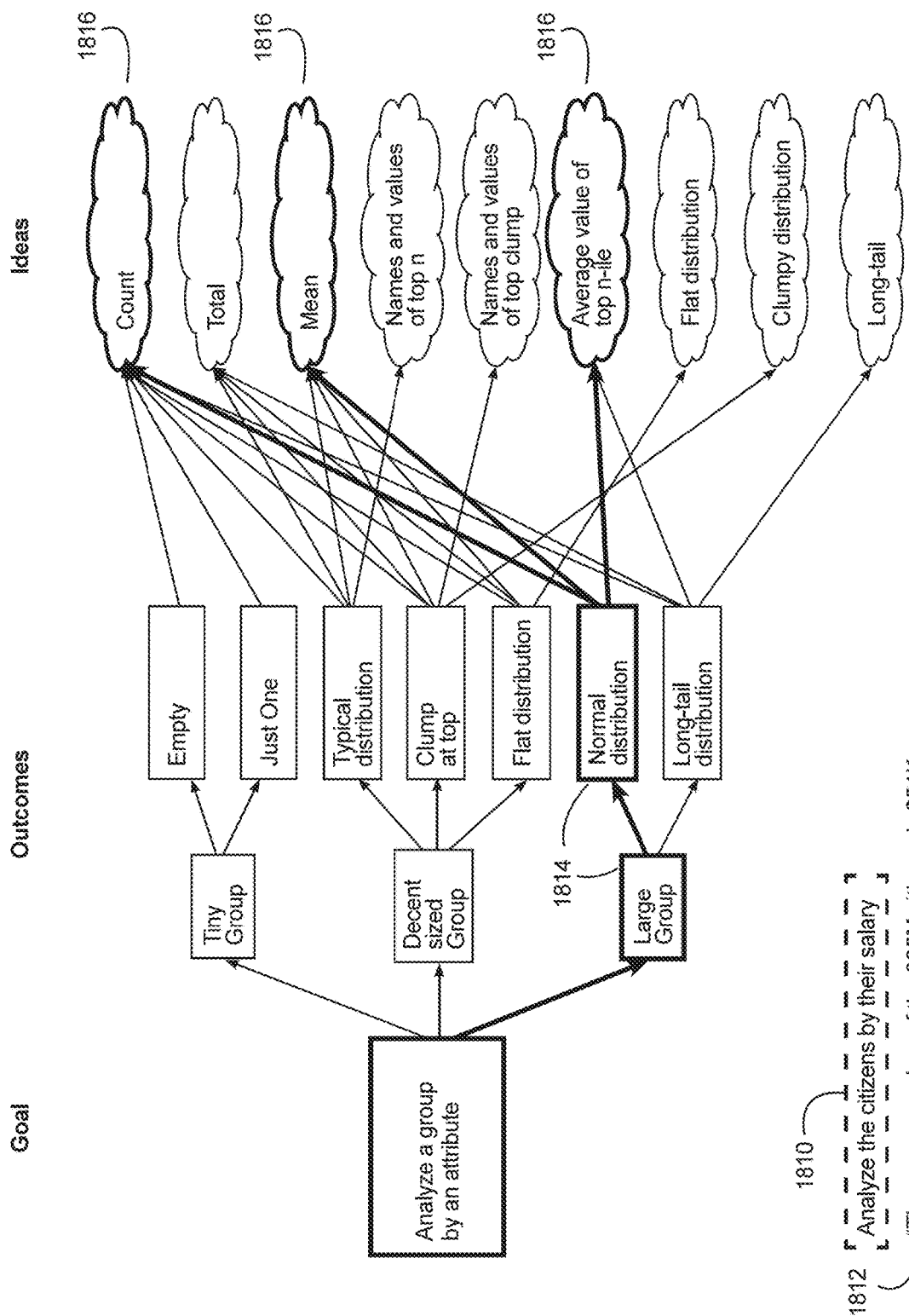

FIG. 18B shows an example of a narrative 1812 that can be generated using the conditional outcome framework of FIG. 16 as applied to a communication goal statement 1810 of "Analyze the citizens by their salary" with respect to a data set that includes various citizens and their associated salaries. In this example, the narrative 1812 would be generated after an analysis of the data set arrived at a determination that the outcomes 1814 were true (the citizens group was a "large group" and has a "normal distribution" of citizens with respect to their salaries). As can be seen in FIG. 18B, the narrative text 1812 expresses the following ideas 1816 that are tied to the outcomes 1814: (1) a count of the number of citizens in the group, (2) the mean value of the salaries for the citizens in the group, and (3) the average salary of the top decile of citizens (with respect to their salaries).

FIGS. 18A and 18B thus show how the same parameterized conditional outcome framework can be used to generate narrative stories across different content verticals (e.g., a story about salespeople and their bookings as in FIG. 18A versus a story about citizens and their salaries as in FIG. 18B), which demonstrates how the parameterized conditional outcome framework provides an effective technical solution to the technical problem of horizontal scalability in the NLG arts.

It should be understood that the system can also be designed to support other "analyze" communication goals. For example, another base communication goal statement that can be used by the system can be "Analyze Entity Group by Attribute 1 and Attribute 2". Such a multi-attribute analysis goal can trigger the performance of tradeoff analysis as between the two attributes (and the expression of ideas that result from this analysis). For example, this goal may trigger analysis that results in quantitative ideas like the average values for Attribute 1, the average values for Attribute 2, the entity with the largest value for Attribute 1, etc. Assuming the system has an understanding of the relationship between Attribute 1 and Attribute 2 (for instance that "Attribute 1 is a driver of Attribute 2" or that higher values for Attribute 1 represent a positive outcome while higher values for Attribute 2 represent a negative outcome), the goal may also result in more qualitative ideas that capture intuitive understandings like "Entities that score have high values for Attribute 1 also have high values for Attribute 2", "The entity with the highest value for Attribute 1 actually has a really low value for Attribute 2", or "There's no correlation between values for Attribute 1 and Attribute 2 in the group". Accordingly, it should be understood that it may be desirable for the narratives produced in response to the "Analyze Entity Group by Attribute 1 and Attribute 2" communication goal statement to express different ideas than the narratives produced in response to the "Analyze Entity Group by Attribute" communication goal statement.

Figure 19A:
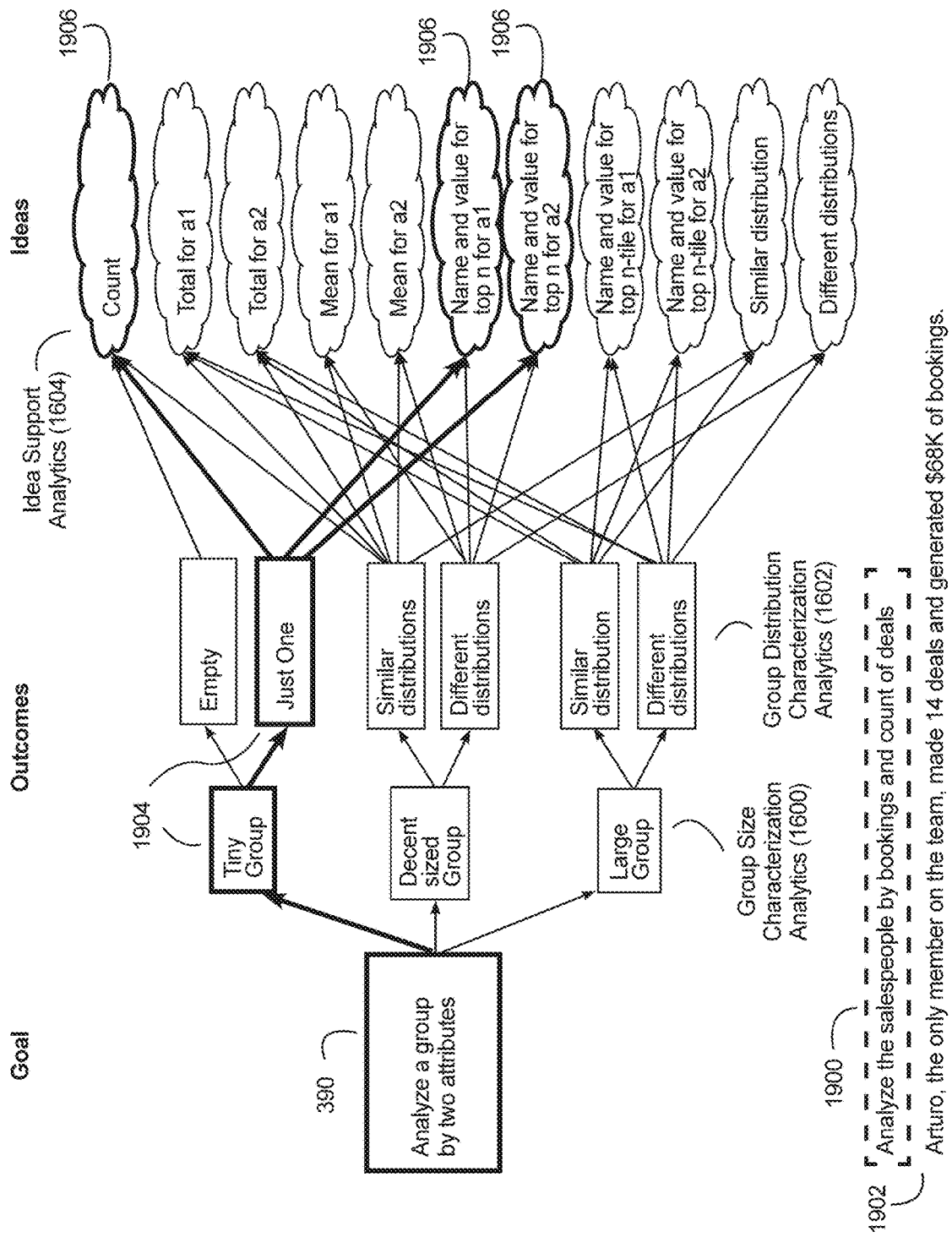
FIGS. 19A and 19B depict an example embodiment for a conditional outcome framework that can be used by the narrative analytics associated with a communication goal statement for "Analyze Entity Group by Attribute 1 and Attribute 2" and examples of narrative stories that can be generated thereby.

FIGS. 19A and B disclose an example embodiment for a conditional outcome framework that can be used by the narrative analytics 510 associated with a communication goal statement 390 for "Analyze Entity Group by Attribute 1 and Attribute 2". In these examples, the outcomes can be associated with group size characterization analytics 1600 and group distribution characterization analytics 1602 as discussed above in connection with FIG. 16. However, these outcomes can be linked to different ideas (and associated idea support analytics 1604) as indicated by FIGS. 19A and B. For example, the ideas of FIGS. 19A and B can include totals, means, and names/values for the top n with respect to each attribute of the communication goal statement 390. The ideas can also express whether the distributions of salespeople with respect to the two attributes are similar to each other or different than each other.

Figure 19B:
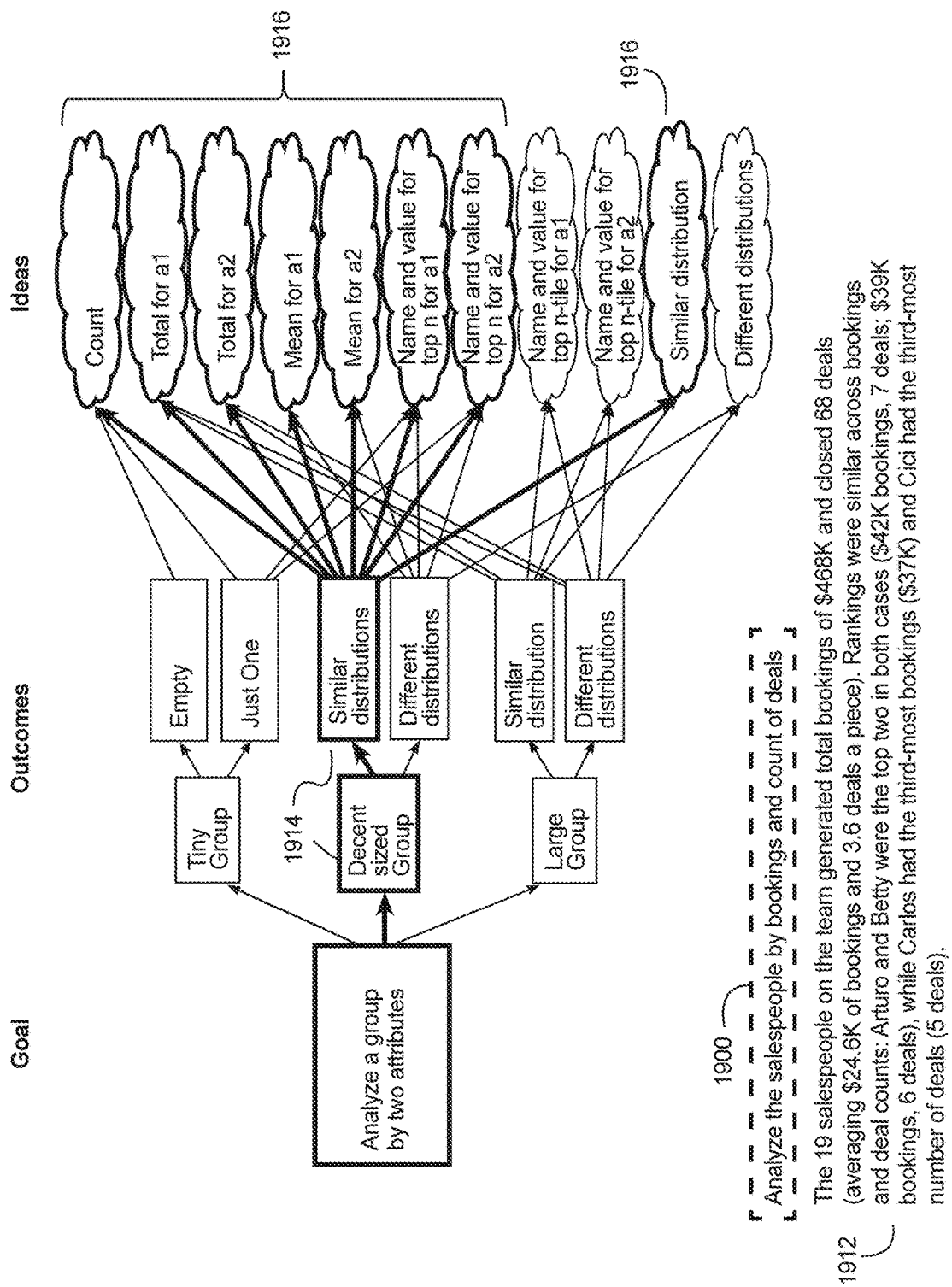

FIG. 19A shows an example of a narrative 1902 that can be generated using the conditional outcome framework shown by the upper portions of FIG. 19A-B as applied to a communication goal statement 1900 of "Analyze the salespeople by bookings and count of deals" with respect to a data set that includes various salespeople and their associated bookings (e.g., the dollar values of their bookings) and counts of their sales deals. In this example, the narrative 1902 would be generated after an analysis of the data set arrived at a determination that the outcomes 1904 were true (the salespeople group was a "tiny group" with only a single member). As can be seen in FIG. 19A, the narrative text 1902 expresses the following ideas 1906 that are tied to the outcomes 1904: (1) a count of the number of salespeople in the group, (2) the names of the top n salespeople in the group (by the first attribute, bookings value) and the booking values for each of the top n salespeople (which in this example is a single person's bookings), and (3) the names of the top n salespeople in the group (by the second attribute, deal count) and the count of deals for each of the top n salespeople (which in this example is a single person's deals).

FIG. 19B shows an example of a narrative 1912 that can be generated using the conditional outcome framework shown by the upper portions of FIGS. 19A-B as applied to the same communication goal statement 1900 shown by FIG. 19A ("Analyze the salespeople by bookings and count of deals") but with respect to a different data set that includes various salespeople and their associated bookings (e.g., the dollar values of their bookings) and counts of their sales deals. In this example, the narrative 1912 would be generated after an analysis of the data set arrived at a determination that the outcomes 1914 were true (the salespeople group was a "decent sized group" and has similar distributions of values among the salespeople with respect to the two attributes, bookings and deal counts). As can be seen in FIG. 19B, the narrative text 1912 expresses the following ideas 1916 that are tied to the outcomes 1914: (1) a count of the number of salespeople in the group, (2) the total value of the first attribute (bookings) for the salespeople group, (3) the total value of the second attribute (deal counts) for the salespeople group, (4) the mean value of the first attribute (bookings) for the salespeople group, (5) the mean value of the second attribute (deal counts) for the salespeople group, (6) the names and attribute values for the top n of the salespeople group with respect to the first attribute (bookings), (7) the names and attribute values for the top n of the salespeople group with respect to the second attribute (deal counts), and (8) a statement that the distributions of salespeople with respect to the two attributes were similar to each other. FIGS. 19A and B thus show how the same conditional outcome framework and same communication goal statement can produce dramatically different stories based on the content of the data set under consideration.

Another example of a base communication goal statement for an "analyze" communication goal that can be used by the system can be "Analyze Entity Group by a Change in Attribute (Over Time)". Such communication goal statement can trigger analysis that eventually results in quantitative ideas representing the total change in value, average change in value, the median change in value, which entity had the biggest change in values, the number of entities that had positive changes, etc. Such a goal might also produce more qualitative ideas that capture intuitive understandings such as "All members of the group had positive changes", "About half of the group had positive changes and about half had negative changes", or "The group as a whole had a positive change, but it was really a small group of entities that had large positive changes while the rest had smaller negative changes. A practitioner may desire that narratives produced from this communication goal statement express different ideas than those generated from the other "analyze" communication goals discussed above.

Figure 20A:
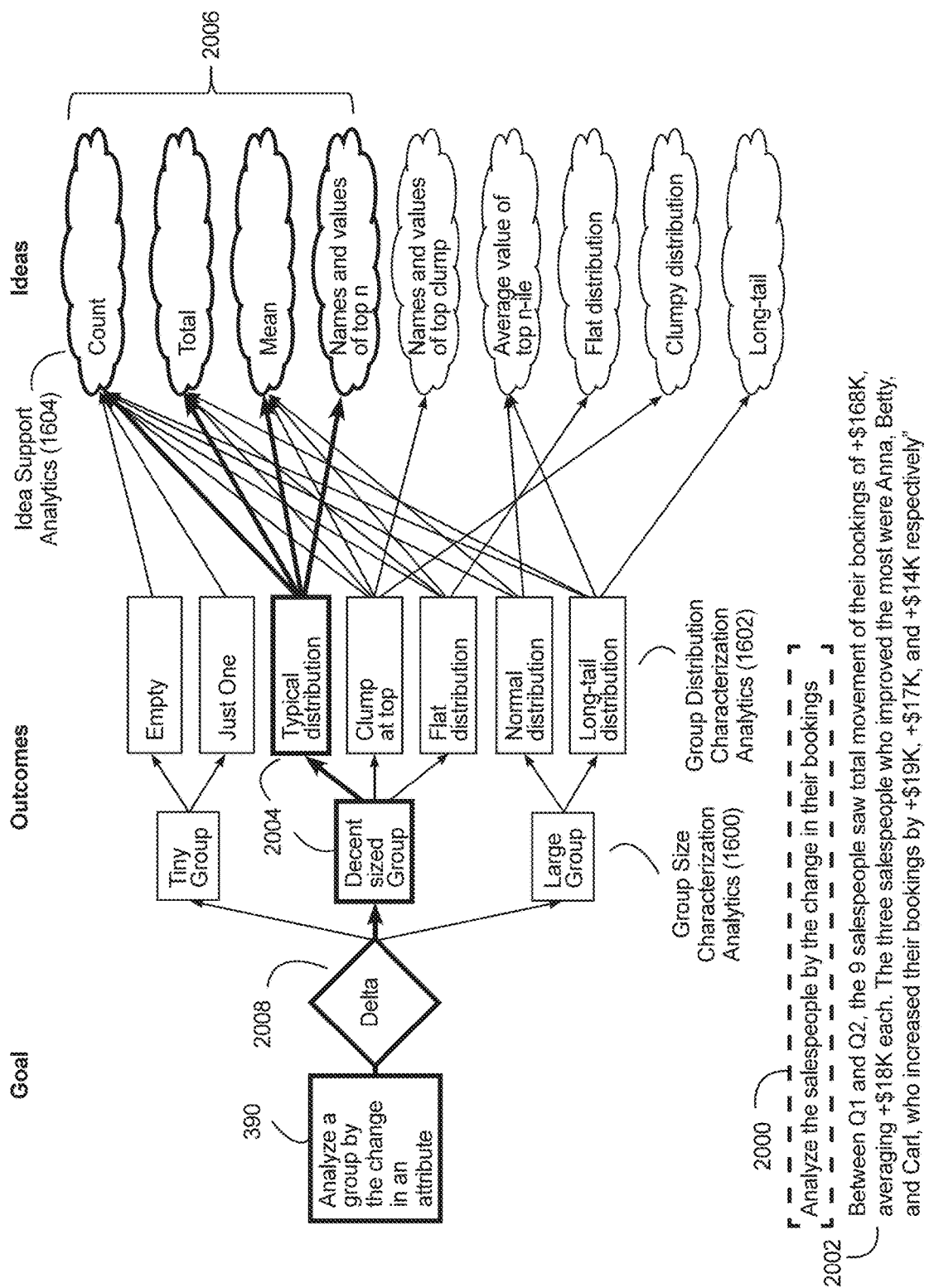
FIG. 20A depicts an example embodiment for a conditional outcome framework that can be used by the narrative analytics associated with a communication goal statement for "Analyze Entity Group by a Change in Attribute (Over Time)" and an example of a narrative story that can be generated thereby.

FIG. 20A discloses an example embodiment for a conditional outcome framework that can be used by the narrative analytics 510 associated with a communication goal statement 390 for "Analyze Entity Group by a Change in Attribute (Over Time)". In this example, the framework includes attribute change analytics 2008 that computes the changes/deltas in the specified attribute values for each member of the entity group over the relevant time period. These deltas can then be used as the attribute values for the conditional outcome framework that can otherwise function as shown by FIG. 16.

FIG. 20A shows an example of a narrative 2002 that can be generated using the conditional outcome framework shown by the upper portion of FIG. 20A as applied to a communication goal statement 2000 of "Analyze the salespeople by the change in their bookings" (where the relevant time frame can be either a default timeframe, system-determined time frame, or user-determined time frame, in this case corresponds to a time frame of Q1 to Q2) with respect to a data set that includes various salespeople and their associated bookings (e.g., the dollar values of their bookings) over time. In this example, the narrative 2002 would be generated after an analysis of the data set arrived at a determination that the outcomes 2004 were true (the salespeople group was a "decent sized group" with a typical distribution of attribute delta values for the salespeople). As can be seen in FIG. 20A, the narrative text 2002 expresses the following ideas 2006 that are tied to the outcomes 2004: (1) a count of the number of salespeople in the group, (2) the total number of salespeople in the group, (3) the mean value of changed bookings from Q1 to Q2 for the salespeople group, and (4) the names of the top n salespeople in the group (by their associated booking value deltas) and the booking value deltas for each of the top n salespeople.

Figure 20B:
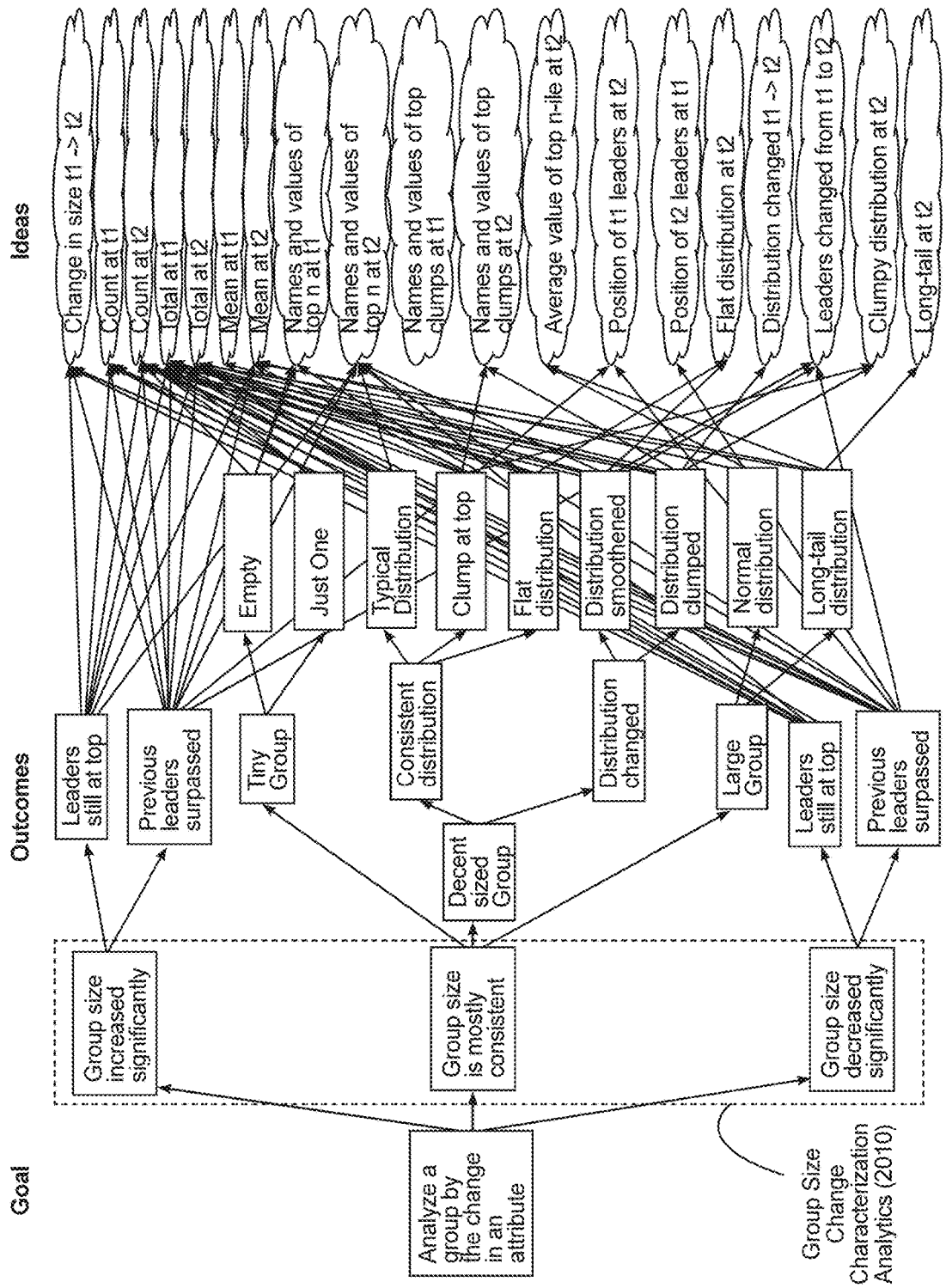
FIGS. 20B-D depict another example embodiment for a conditional outcome framework that can be used by the narrative analytics associated with a communication goal statement for "Analyze Entity Group by a Change in Attribute (Over Time)" and examples of narrative stories that can be generated thereby.

FIG. 20B discloses another example embodiment for a conditional outcome framework that can be used by the narrative analytics 510 associated with a communication goal statement 390 for "Analyze Entity Group by a Change in Attribute (Over Time)". In this example, the framework includes group size change characterization analytics 2010, where these analytics 2010 are configured to analyzed the specified entity group to assess how its size changed over the relevant time period. In the example of FIG. 20B, there are three outcomes associated with these analytics 2010—a conclusion that the group size increased significantly, a conclusion that the group size stayed mostly consistent, and a conclusion that the group sized decreased significantly. To reach these outcomes, the analytics 2010 can tie each outcome to thresholds that are applied to computed changes in group size for the relevant time frame. For example, a group size change of +25% or more can be characterized as a significant increase, a group size change of –25% or more can be characterized as a significant decrease, and group sizes changes between these bounds can be characterized as consistent. Other outcomes within the conditional outcome framework can assess the nature of any change with respect to how the group members are ranked by the attribute over the relevant time frame. The analytics for these outcomes can also be parameterized to test whether their corresponding outcomes are applicable to the subject data. Furthermore, FIG. 20B shows how the various ideas tied to the outcomes can include various informational items tied to the starting and ending times for the subject time frame, as well as ideas that express how certain group members rankings changed over the time frame.

Figure 20C:
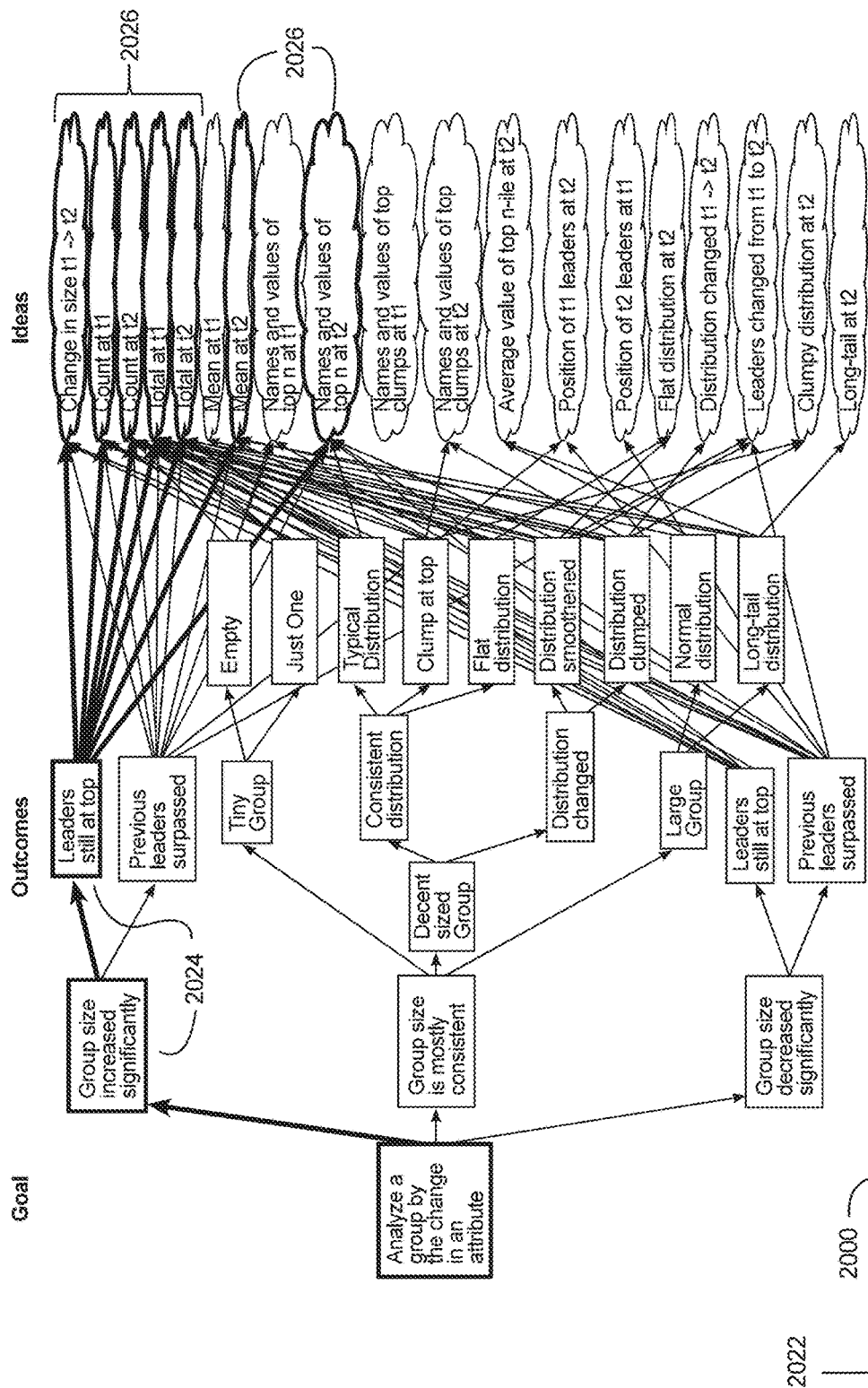

FIG. 20C shows an example of a narrative 2022 that can be generated using the conditional outcome framework shown by FIG. 20B as applied to the communication goal statement 2000 of "Analyze the salespeople by the change in their bookings (over Q1 and Q2)" with respect to a data set that includes various salespeople and their associated bookings (e.g., the dollar values of their bookings) over time. In this example, the narrative 2022 would be generated after an analysis of the data set arrived at a determination that the outcomes 2024 were true (the size of the salespeople group increased significantly over Q1 to Q2, with the leaders among the salespeople with respect to bookings being largely unchanged over Q1 to Q2). As can be seen in FIG. 20C, the narrative text 2022 expresses the following ideas 2026 that are tied to the outcomes 2024: (1) an identification of the change in size for the salespeople group from Q1 to Q2, (2) a count of the members of the salespeople group at Q1, (3) a count of the members of the salespeople group at Q2, (4) the total amount of bookings for the salespeople group at Q1, (5) the total amount of bookings for the salespeople group at Q2, (6) the mean value of bookings for the salespeople group at Q2, and (7) the names and booking values for the top n salespeople at Q2 (in terms of bookings value).

Figure 20D:
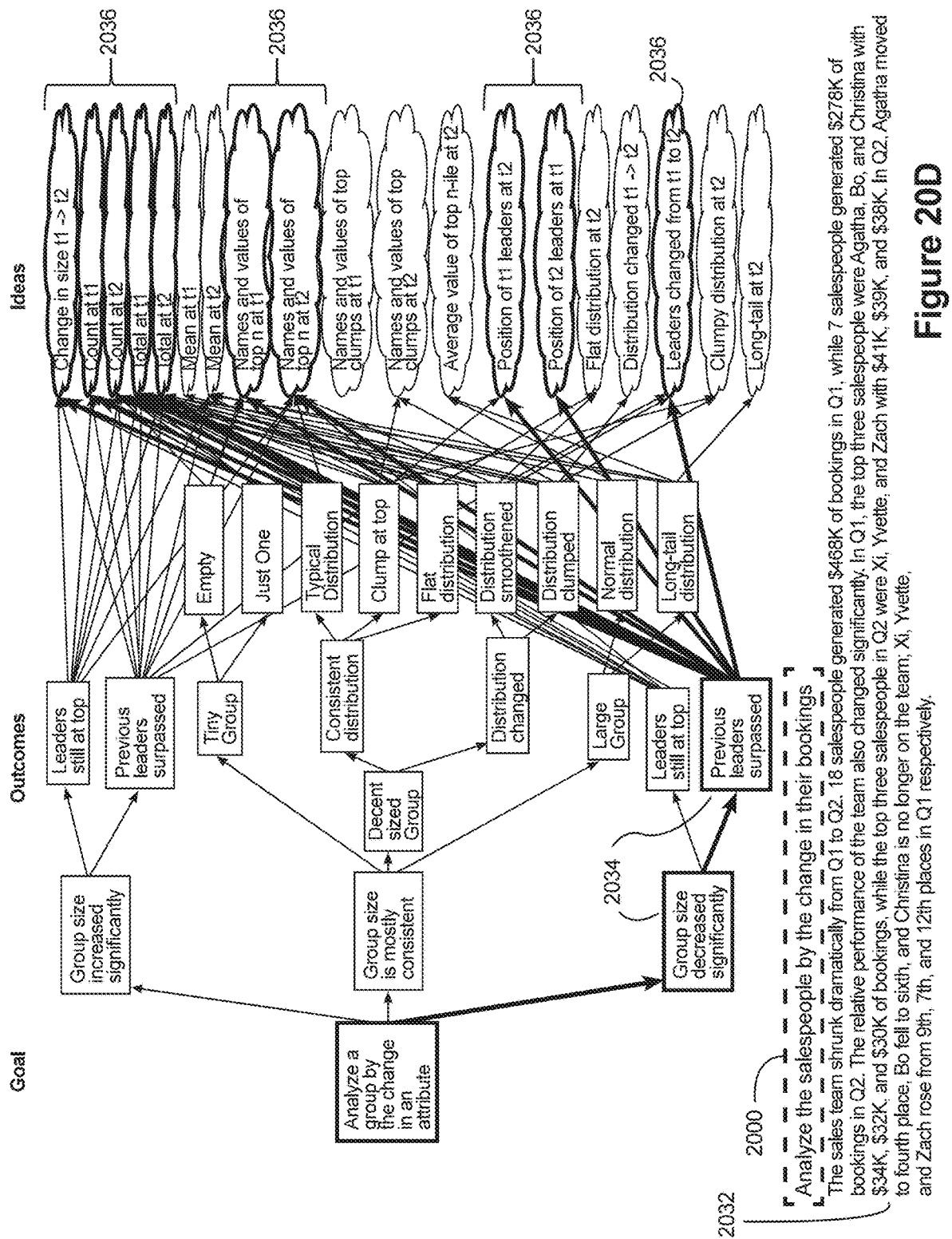

FIG. 20D shows an example of a narrative 2032 that can be generated using the conditional outcome framework shown by FIG. 20B as applied to the same communication goal statement 2000 shown by FIG. 20C ("Analyze the salespeople by the change in their bookings (over Q1 and Q2)") but with respect to a different data set that includes various salespeople and their associated bookings (e.g., the dollar values of their bookings) over time. In this example, the narrative 2032 would be generated after an analysis of the data set arrived at a determination that the outcomes 2034 were true (the size of the salespeople group decreased significantly over Q1 to Q2, with the salespeople who were leaders at Q1 with respect to bookings having been surpassed in Q2). As can be seen in FIG. 20D, the narrative text 2032 expresses the following ideas 2036 that are tied to the outcomes 2034: (1) an identification of the change in size for the salespeople group from Q1 to Q2, (2) a count of the members of the salespeople group at Q1, (3) a count of the members of the salespeople group at Q2, (4) the total amount of bookings for the salespeople group at Q1, (5) the total amount of bookings for the salespeople group at Q2, (6)

the names and booking values for the top n salespeople at Q1 (in terms of bookings value), (7) the names and booking values for the top n salespeople at Q2 (in terms of bookings value), (8) the positions at Q2 of the salespeople who were in the top n at Q1, (9) the positions at Q1 of the sales people who were in the top n at Q2, and (10) a statement that notes the change in leadership for salespeople as between Q1 and Q2. FIGS. 20C and 20D thus show another example of how the same conditional outcome framework and same communication goal statement can produce dramatically different stories based on the content of the data set under consideration.

Yet another example of a base communication goal statement for an "analyze" communication goal that can be used by the system can be "Analyze Entity Group by Characterization". Such communication goal statement can trigger analysis that eventually results in quantitative ideas representing the count and percentage of entities with each characterization, the most common characterization, etc. Such a goal might also produce more qualitative ideas that capture intuitive understandings such as "There was a roughly even distribution of characterizations across the group", "Every entity in the group had the same characterization", "Almost all of the entities in the group had the same characterization", etc. A practitioner may desire that narratives produced from this communication goal statement express different ideas than those generated from the other "analyze" communication goals discussed above.

Figure 21A:
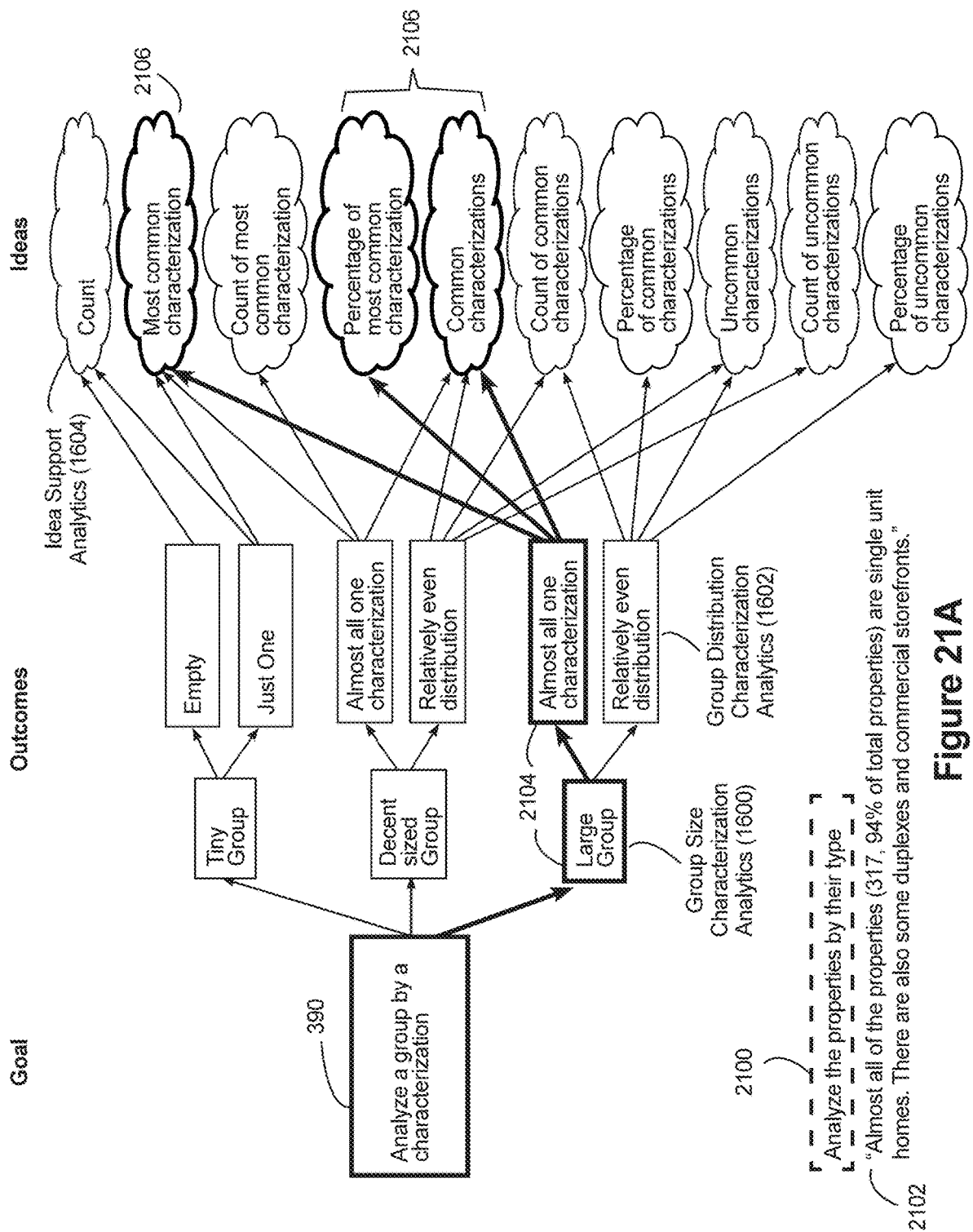
FIGS. 21A and 21B depict an example embodiment for a conditional outcome framework that can be used by the narrative analytics associated with a communication goal statement for "Analyze Entity Group by Characterization" and examples of narrative stories that can be generated thereby.

FIGS. 21A and B disclose an example embodiment for a conditional outcome framework that can be used by the narrative analytics 510 associated with a communication goal statement 390 for "Analyze Entity Group by Characterization". In these examples, the outcomes can be associated with group size characterization analytics 1600 and group distribution characterization analytics 1602 as discussed above in connection with FIG. 16. However, these outcomes can be linked to different ideas (and associated idea support analytics 1604) as indicated by FIGS. 21A and B. For example, the ideas of FIGS. 21A and B can express concepts such as which characterizations are most common among members of the entity group, and corresponding counts and percentages for various characterizations within the entity group.

Figure 21B:
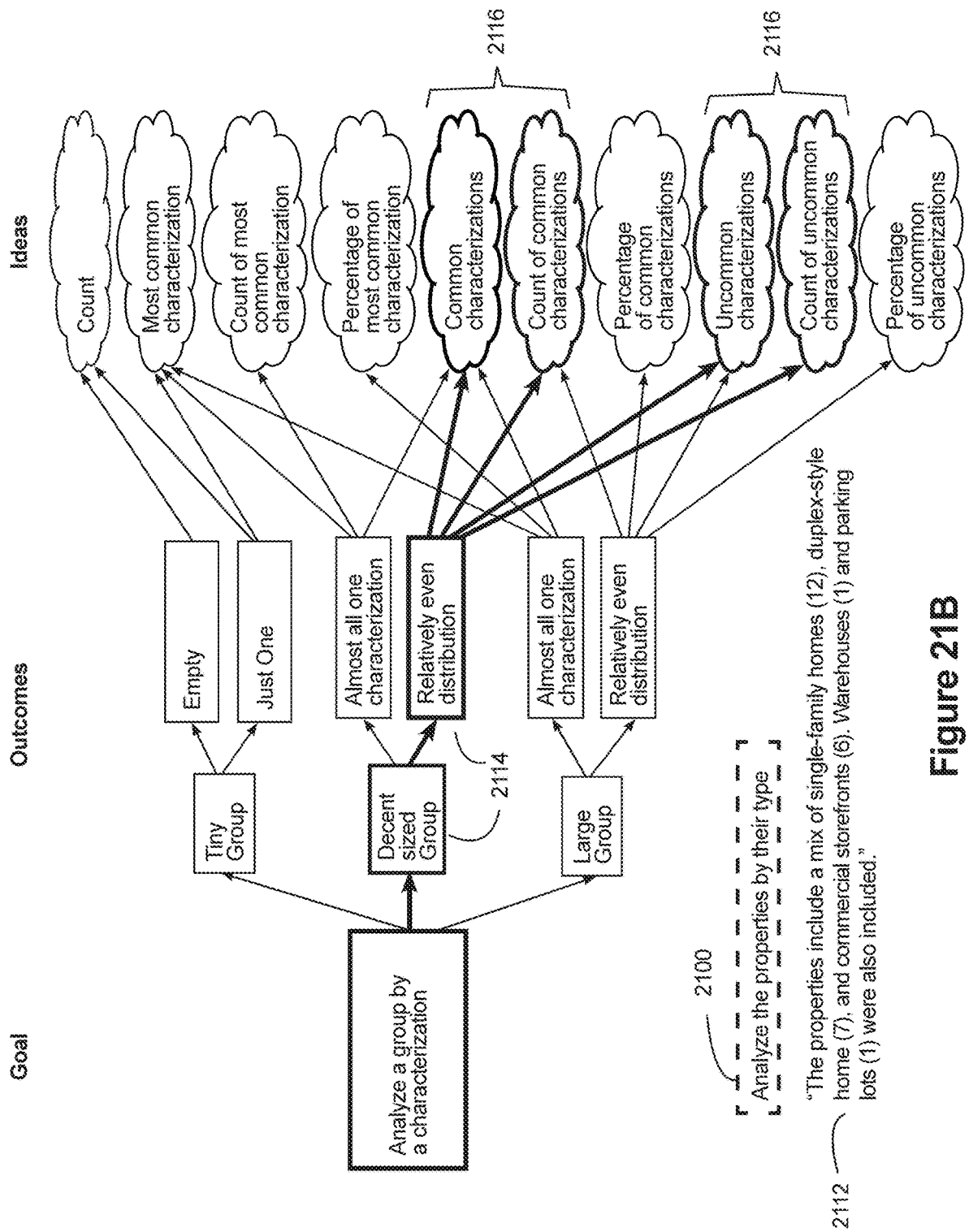

FIG. 21A shows an example of a narrative 2102 that can be generated using the conditional outcome framework shown by the upper portions of FIG. 21A-B as applied to a communication goal statement 2100 of "Analyze the properties by their type" with respect to a data set that includes various properties and associated types for those properties (e.g., single unit homes, duplexes, commercial storefronts, etc.). In this example, the narrative 2102 would be generated after an analysis of the data set arrived at a determination that the outcomes 2104 were true (the size of the group of properties was a "large group" where almost all of the properties in that group shared the same characterization). As can be seen in FIG. 21A, the narrative text 2102 expresses the following ideas 2106 that are tied to the outcomes 2104: (1) an identification of the most common type characterization for the properties in the group (single unit homes in this case), (2) the percentage of properties in the group that have this type characterization, and (3) other common type characterizations that exist in the property group.

FIG. 21B shows an example of a narrative 2112 that can be generated using the conditional outcome framework shown by the upper portions of FIGS. 21A-B as applied to the same communication goal statement 2100 shown by FIG. 21A ("Analyze the properties by their type") but with respect to a different data set that includes various properties and their associated type characterizations. In this example, the narrative 2112 would be generated after an analysis of the data set arrived at a determination that the outcomes 2114 were true (the size of the group of properties was a "decent sized group" where there was a relatively even distribution of properties in that group with respect to their type characterizations). As can be seen in FIG. 21B, the narrative text 2112 expresses the following ideas 2116 that are tied to the outcomes 2114: (1) an identification of the common type characterizations for the properties in the group (single family homes, duplex-style homes, and commercial storefronts in this case), (2) the count of properties in the group with each of these common type characterizations, (3) an identification of the uncommon type characterizations for the properties in the group (warehouses and parking lots in this case), and (4) the count of properties in the group with each of these uncommon type characterizations. Thus, FIGS. 21A and B show yet another example of how the same conditional outcome framework and same communication goal statement can produce dramatically different stories based on the content of the data set under consideration.

"Smart" Attributes:

In another example embodiment, the system can employ "smart" attributes to support narrative generation. For example, the attributes included in the ontology 320 can specify a model that identifies one or more drivers of the metrical values for the subject attribute and a functional relationship between the metrical values for the subject attribute and its drivers, even if the values for that attribute are directly referenced in the source data 540. Such a configuration for attributes provides an explicit model through which the system can readily discover and assess the drivers for the subject attribute. Accordingly, this explicit model for an attribute supports narrative generation relating to drivers (e.g., narratives that explain why an attribute may have a certain value, such as explaining whether increased revenue and/or decreased expenses may be the drivers for increased profit). Moreover, by incorporating the explicit model in the ontology's attribute data structure, narrative generation system supports configurability and scalability such that the analytics for driver analysis need not be separately coded for each different use case.

Figure 22A:
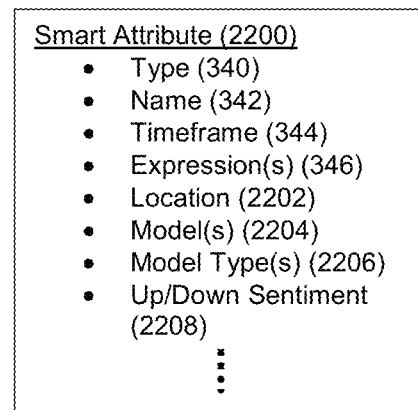
FIG. 22A depicts an example structure for a smart attribute.

FIG. 22A depicts an example structure for a smart attribute 2200. The smart attribute 2200 may specify a type 340, name 342, timeframe 344, and expression(s) 346 as discussed above with respect to direct and computed value attributes 330*a* and 330*b*. If the smart attribute 2200 corresponds to a direct attribute 330*a*, then the smart attribute 2200 can also include a location 2202 that identifies where the values for the subject attribute can be found in the source data 540. However, this location 2202 can be omitted if the smart attribute 2200 corresponds to a computed value attribute 330*b*.

Smart attribute 2200 can also specify a directional sentiment 2208, which flags whether larger values for the subject attribute are seen as good/positive outcomes or bad/negative outcomes. For example, with respect to an attribute such as "profit", larger and/or increasing values (up) can be associated with a good sentiment, while smaller and/or decreasing values can be associated with a bad sentiment. Bounds and targets may also be used when defining directional sentiment. For instance, when considering a person's body temperature, 98.6 degrees Fahrenheit is better than 103.4 degrees Fahrenheit, but a temperature of 94.2 degrees Fahrenheit is definitely not better than 98.6 degrees Fahrenheit. To model directional sentiment in instances such as these, ranges can be used to define good/positive values (or bad/negative values as the case may be), with sentiment changing as the values diverge from the defined range (in either direction).

Smart attribute 2200 also specifies one or more models 2204 and one or more model types 2206 corresponding to the model(s) 2204. Through the model(s) 2204 and model type(s) 2206, the smart attribute structure 2200 identifies one or more associated drivers for the subject attribute and the nature of the functional relationship between the driver(s) and the subject attribute. Examples of model types 2206 that can be used include quantitative models and qualitative models.

With a quantitative model, the model 2204 uses a formulaic and/or computational structure for expressing the model (e.g., Profit=Revenue−Expenses). If desired, a practitioner can also define different types of qualitative models (e.g., complex formulas (such as a quadratic equation), pure linear sum/difference formulas, pure linear product/quotient formulas, etc.). The functional relationship defined by a quantitative model can even be a "black box", such as specifically in the case of deltas, as long as it is possible to relate changes in the values of the output. For example, a simple stock movement model can be represented as the formula Stock Movement=Closing Price−Opening Price. This stock movement model would allow the movement of a stock to be represented and discussed in a narrative story even if the closing and opening prices are not be present in the data so long as the stock movement data is received in the form of the delta values (where the actual stock movement values are present in the data).

With a qualitative model, the model 2204 identifies of one or more drivers and the nature of their influence on the subject attribute (e.g, a positive influencer or negative influencer), but there is not a precise computational measure that functionally relates the driver(s) to the attribute. As an example, the number of customer visits to a store can be a positive influencer of revenue for that store. With qualitative influencers, some examples of narrative characterizations that can be developed include whether the outcome was expected and whether the outcome was unexpected, particularly when the subject attribute is analyzed over the course of a timeframe. For example, if a store foot traffic attribute is expected to be positively influenced by temperate weather and in-store promotions, but store foot traffic goes down despite increases in temperate weather and in-store promotions, this unexpected result can be an useful insight to capture and expose via automated narrative generation. Similarly, when outcomes go as expected, that can also be an interesting idea to capture and expose via automated narrative generation.

Model 2204 can be configured to specify the drivers in terms of other attributes known within ontology 320. Thus, the system is able to use model 2204 to readily identify the drivers for attributes and then locate and interpret data for such drivers.

Also, it should be understood that smart attributes 2200 can specify multiple models and model types. For example, a smart attribute 2200 for an attribute can specify both a quantitative model and a qualitative model. Accordingly, such a smart attribute 2200 can be queried to assess both quantitative drivers and qualitative drivers with respect to the subject attribute (e.g., evaluating a store's revenue in terms of not only quantitative drivers such the sum of revenues for individual products sold by the store but also a qualitative driver such as the number of customer visits).

Figure 22B:
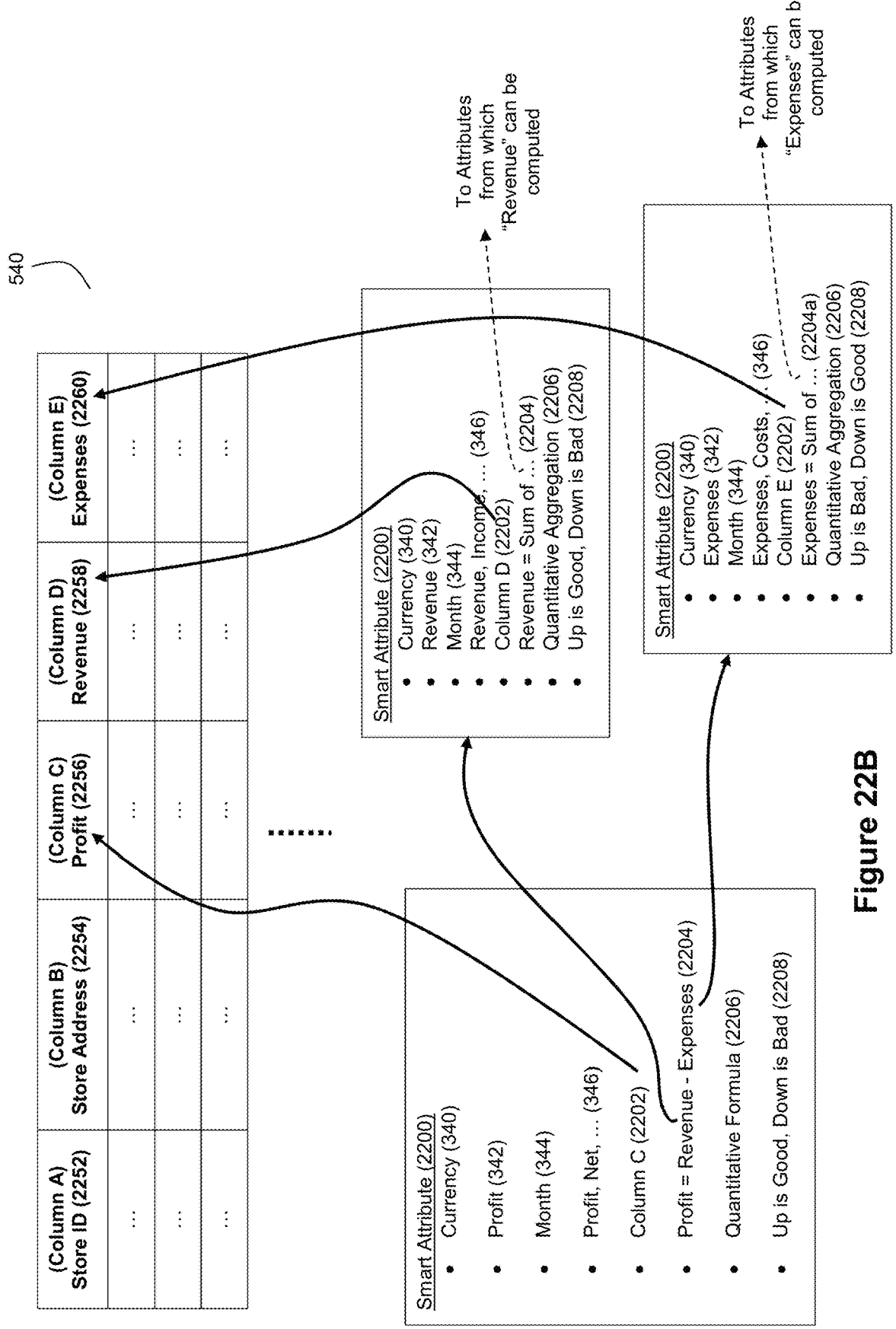
FIGS. 22B and 22C depict examples that show how smart attributes can have attribute models that are linked to other attributes and field within source data.

FIG. 22B shows an example of how a smart attribute 2200 can be used in combination with source data 540 to support driver analysis. In this example, there is a smart attribute 2200 for "profit", which has an attribute type 340 of "currency", an attribute name 342 of "profit", a timeframe 344 of "month", and expressions 346 of "profit", "net" (and possibly others). The location 2202 for "profit" is identified as Column C within the source data 540. In this example, source data 540 can be a table or spreadsheet that provides monthly financial information for various store locations (e.g., Column A that provides a store identifier 2252, Column B that provides a store address 2254, Column C that provides a store profit 2256, Column D that provides store revenue 2258, and Column E that provides store expenses 2260). Also, in this example, the smart attribute for profit has a quantitative formula model, via 2204 and 2206, that expresses profit as the difference between revenue and expenses. Because the values of profit are directly specified in Column C of source data 540, the system need not use the model 2204 to compute store profits. However, as indicated above and further elaborated upon below, this profit model does allow the system to readily identify and investigate the drivers of a store's profits. Furthermore, sentiment 2208 is identified to label up as good and down as bad for profit values.

The terms of the specified profit model point to smart attributes 2200 for "revenue" and "expenses" as also shown in FIG. 22B. Thus, if the system wants to assess the drivers of store profit, it can read the profit model 2204 to locate information about the revenue attribute 2200 and expenses attribute 2200, and use this information to locate data values for these attributes to be analyzed as part of the driver investigation.

The smart attribute 2200 for "revenue", which has an attribute type 340 of "currency", an attribute name 342 of "revenue", a timeframe 344 of "month", and expressions 346 of "revenue", "income" (and possibly others). The location 2202 for "revenue" is identified as Column D within the source data 540. Also, in this example, the smart attribute for revenue has a quantitative aggregation model, via 2204 and 2206, that expresses revenue as a sum of component parts (e.g., an aggregation of the revenues attributable to the various products sold by the store). The sentiment 2208 for revenue is that up is good and down is bad.

The smart attribute 2200 for "expenses", which has an attribute type 340 of "currency", an attribute name 342 of "expenses", a timeframe 344 of "month", and expressions 346 of "expenses", "costs" (and possibly others). The location 2202 for "expenses" is identified as Column E within the source data 540. Also, in this example, the smart attribute for expenses has a quantitative aggregation model, via 2204 and 2206, that expresses expenses as a sum of component parts (e.g., an aggregation of the costs attributable to various aspects of store operations (e.g., employee costs, rent, insurance costs, etc.)). The sentiment 2208 for expenses is that up is bad and down is good.

Using these structures, the narrative analytics that support driver analysis can dive into the values for the revenues and expenses of one or more stores within the source data 540 to assess how revenues and expenses have impacted store profits. As a result of such analysis, the system can then draw conclusions such as whether and/or the extent to which increased profits were due to increased revenues and/or decreased expenses.

Furthermore, it should be understood that the use of attribute models for attributes 2200 within ontology 320 provides opportunities for the narrative analytics to perform deep analyses of data sets. For example, the narrative analytics can conduct not only driver analysis but also a recursive multi-level driver analysis to gain ever deeper insights into the data. For example, the narrative analytics can perform an analysis of the drivers of the drivers (e.g., by using the specified revenue model to assess the drivers of revenue). For example, the driver analysis shown in FIG. 22B can reveal that increased revenues may have been the driver for increased profits, and a further second level analysis into the drivers of revenue might reveal that the driver of increased revenues might have been increased sales for Products X and Y. By leveraging the structure of ontology 320 and the explicit quantitive and/or qualitative models within the attributes 2200, the system would be able to generate a narrative that explains to a reader that increases in sales of Products X and Y were the drivers of an increase store profits.

Figure 22C:
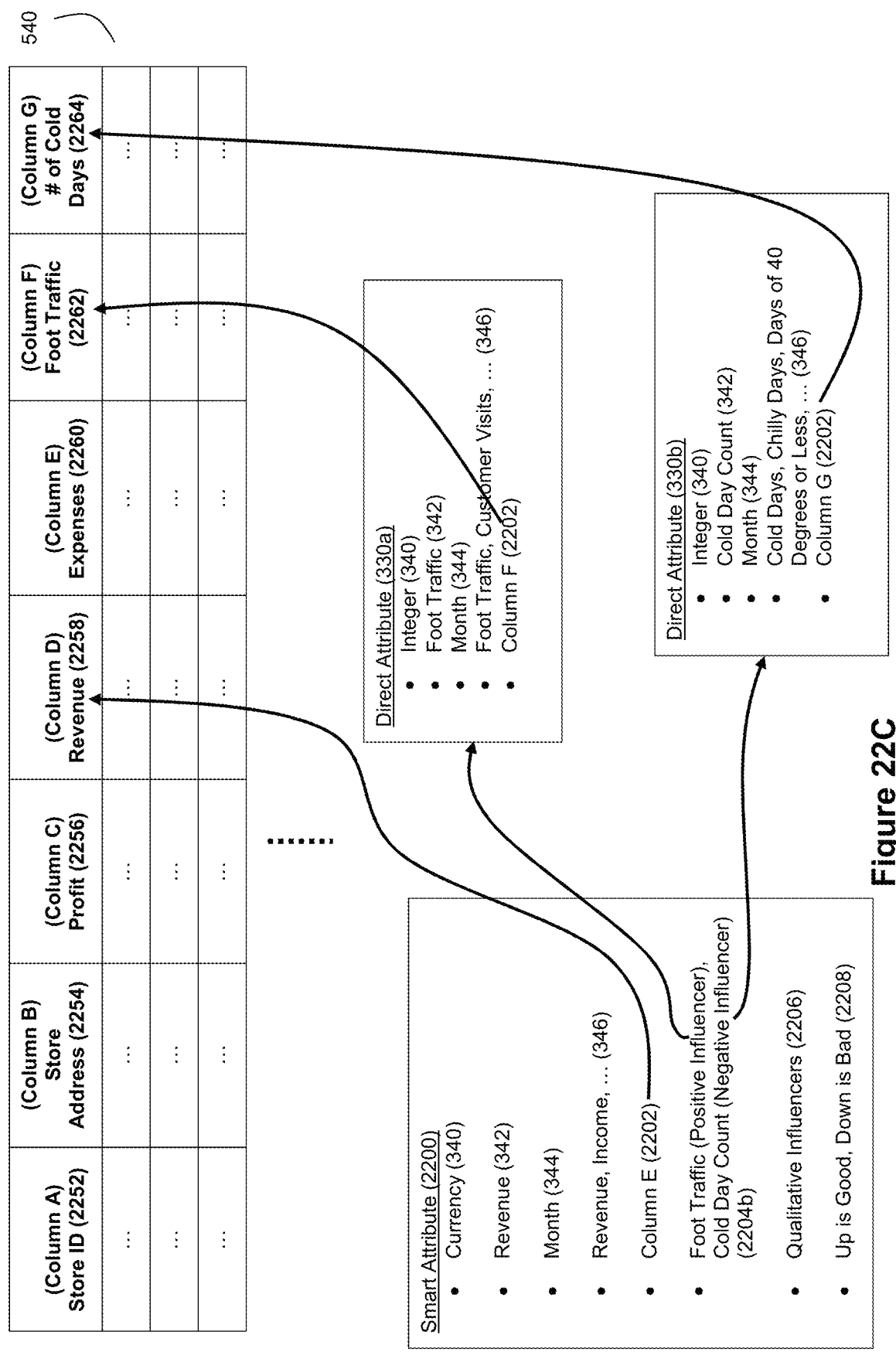

FIG. 22C shows another example of how a smart attribute 2200 can be used in combination with source data 540 to support driver analysis. In this example, the smart attribute 2200 for revenue has a qualitative formula model, via 2204 and 2206, that expresses revenue as being positively influenced by foot traffic and negatively influenced by the number of cold days (e.g., for a store that sells popsicles). In this example, the source data also includes data that identifies the foot traffic 2262 for each store (see Column F) as well as the number of cold days 2264 for each store (see Column G). Because the values of revenue are directly specified in Column D of source data 540, the system need not use the model 2204 to derive values for store revenue. However, as indicated above and further elaborated upon below, this revenue model does allow the system to readily identify and investigate the drivers of a store's revenue.

The terms of the specified revenue model point to direct attributes 330b for "foot traffic" and "cold day count" as also shown in FIG. 22C. Thus, if the system wants to assess the drivers of store revenue, it can read the revenue model 2204 to locate information about the foot traffic attribute 330b and cold day count attribute 330b, and use this information to locate data values for these attributes to be analyzed as part of the driver investigation.

The direct attribute 330b for "foot traffic", which has an attribute type 340 of "integer", an attribute name 342 of "foot traffic", a timeframe 344 of "month", and expressions 346 of "foot traffic", "customer visits" (and possibly others). The location 2202 for "foot traffic" is identified as Column F within the source data 540. The foot traffic attribute may also include a sentiment (not shown) to indicate that up is good and down is bad.

The direct attribute 330b for "cold day count", which has an attribute type 340 of "integer", an attribute name 342 of "cold day count", a timeframe 344 of "month", and expressions 346 of "cold days", "chilly days", "days of 40 degrees or less" (and possibly others). The location 2202 for "cold day count" is identified as Column G within the source data 540. The cold day count attribute may also include a sentiment (not shown) to indicate that up is bad and down is good.

Using these structures, the narrative analytics that support driver analysis can dive into the values for the foot traffic and cold days with respect to one or more stores within the source data 540 to draw insights such as whether an increase in foot traffic may have led to increased revenue, whether revenue increased despite a drop in foot traffic, whether a cold wave may have contributed to decreased revenues, etc.

It should be understood that FIGS. 22B and 22C show examples only, and that other models can be used, including more complicated models such as complex equations.

To support an understanding of how drivers impact the subject attribute, the smart attribute 2200 can also be associated with analytics that are executed to determine the nature of the relationship between the driver and the attribute. If the model 2204 is a simple quantitative model such as a linear sum or difference or linear product/quotient, then the analytics rules can be relatively simple (larger numbers have larger impacts in linear sums/differences, in both the positive and negative directions; larger numbers in a numerator drive a value up while larger numbers in a denominator drive a value down, etc.).

However, in some instances, particularly with complex formulas, it is not necessarily straightforward how a change in value for a driver will impact a change in value for the subject attribute. To gain such understandings, the system can perform multivariable calculus to draw conclusions about how drivers impact their subject attributes. For example, the narrative analytics can perform a perturbation or sensitivity analysis where the value of the input/driver under consideration is shifted while holding the other input(s)/driver(s) in the model constant to see how these shifts affect the value of the output. In general, the perturbation analysis can shift the input with small changes around the current value.

In scenarios where the model involves understanding what drove the change in a value, another approach is available. In these scenarios, the system may be designed to iteratively zero out the change in each input and determine how fixing each input value alters the calculated output value.

Another technique can be using multivariable calculus to compute the rate of change of the output with respect to different inputs using a symbolic or numeric equation solver such as Mathematica, to directly compute the relevant derivatives. These derivatives can then be used to compute and explain how the values of the drivers affect the values of the attribute.

Further still, the functional relationship identified by model 2204 need not necessarily be of an input/output nature. The functional relationship specified by model 2204 may also be a correlation or anti-correlation relationship. With respect to anti-correlation, the driver and the attribute can be involved in a trade-off. In such a case, the system can also be configured to compute Pareto optimal frontiers to describe this trade-off. To assess correlations and/or anti-correlations, the system can receive inputs from a user regarding two or more attributes to be compared with each other to assess degrees of correlation/anti-correlation. Thresholds can be used to govern the levels of correlation or anti-correlation that are needed for two attributes to be judged correlated or anti-correlated (e.g., correlation coefficients above or below a specified value). However, it should be understood that the system can also be configured to automatically detect attributes that are correlated and/or anti-correlated by systematically cycling through multiple permutations of attributes within ontology 320 and computing correlation/anti-correlation scores for each. Then, the smart attribute structure 2200 for an attribute can be updated to identify other attributes within the ontology 320 with which it is correlated/anti-correlated. With such an approach, it may be desirable to employ a secondary classification with such assignments to allow users to remove correlation/anticorrelation assignments that may not be helpful with respect to narrative generation (such as flagging the revenue attribute 2200 as correlated with the profits attribute, which might be misinterpreted to mean that profits are a driver of revenue when it is the reverse that is true).

User interfaces (for example, structured GUIs) can be used to permit users to control the content of smart attribute data structures 2200. For example, through such a user interface, a user can define the models 2204 and model types 2206 used by smart attributes 2200. Furthermore, the user can also define the sentiment data 2208. However, as indicated above, the models/model types 2204/2206 could also be learned automatically via statistical and other techniques.

Figure 23:
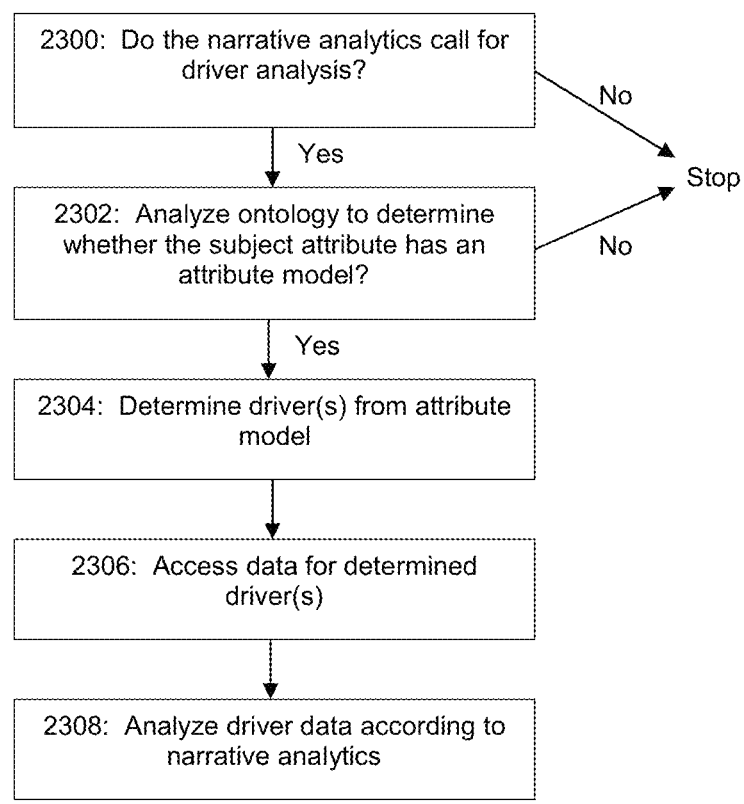
FIG. 23 depicts an example process flow that shows how the smart attributes can be leveraged to support driver analysis.

FIG. 23 depicts an example process flow that shows how the smart attributes 2200 can be leveraged to support driver analysis. At step 2300, a processor determines whether the narrative analytics to be executed call for some level of driver analysis with respect to an attribute. If so, the process flow proceeds to step 2302. An example of narrative analytics that may call for driver analysis can be the narrative analytics associated with an "explain" communication goal. However, it should be understood that other communication goals may find driver analysis helpful. For example, the models 2204 could also be used to support communication goals relating to prediction and/or recommendation. For example, models 2204 based on perturbation or sensitivity analysis can be used to come up with recommendations in response to an inquiry such as "How can I increase the value of Attribute X?" or with predictions such as "What would likely happen to my revenue if there are 6 cold days next month?". As such, communication goals relating to predictions and recommendations may also call for driver analysis.

At step 2302, a processor analyzes the ontology 320 to determine with the subject attribute has an attribute model 2204. If so, the process flow proceeds to step 2304, where a processor determines one or more drivers from the attribute model 2204. Upon determination of the driver(s), the processor can access the ontology mappings to identify and access the data for the driver(s) (step 2306) (see, for example, the linkages into source data 540 shown by FIGS. 22B and 22C). Thereafter, at step 2308, the processor can perform a variety of analytics on the accessed driver data. These analytics can be analytics that support communication goals such as "explain", "predict", and/or "recommend", etc.
Example Embodiments for "Explain" Communication Goal Statements:

As mentioned above, an operator such as "Explain" can be used to identify a communication goal statement corresponding to an explanation communication goal. An example of a base communication goal statement for an explanation communication goal that could be supported by the system is "Explain (a Value of) an Attribute (of an Entity or Entity Group) (in a Timeframe)" (which can be labeled in shorthand as "Explain a Value"), where "Attribute" serves as a parameter for an attribute of the specified (or understood) "Entity" in the ontology 320 within a specified (or understood) "Timeframe" in the ontology 320. Such a base communication goal statement could be parameterized into a communication goal statement as "Explain the Profit of the Store in the Month", where the Attribute is specified as "Profit" and where the entity or entity group is specified as "Store". However, it should be understood that such a base communication goal statement could be parameterized in any of a number of different ways. Further still, it should be understood that different base communication goal statements could be used to satisfy other explanation-related communication goals, some examples of which are discussed below.

The system can link a base communication goal statement of "Explain an Attribute of an Entity" with narrative analytics 510 that are linked to a story structure that aims to provide the reader with an understanding of why an attribute has a value that it does. As discussed above, these narrative analytics 510 can perform driver analysis to gain an understanding of what the contributing and/or inhibiting factors with respect to the attribute's value are. Accomplishing this may involve expressing a variety of ideas that are characterizations of the data including the drivers, such as which drivers are the "biggest contributor(s)", whether there was a "great team effort" (e.g., lot of drivers making similar positive contributions), whether there was a "wash" situation (e.g., Driver 1 went up but Driver 2 went down and they largely canceled each other out), whether there was a "held back" situation (e.g., there was a big contribution by a positive driver, but lost of small contributions by negative drivers held the subject value down), etc. Accordingly, if desired by a practitioner, the system can directly map such a communication goal statement to parameterized narrative analytics and a parameterized story configuration that will express these concepts. However, the use of a conditional outcome framework 1500 by the relevant narrative analytics can provide additional flexibility where the resulting narrative story structure will adapt as a function of not only the specified communication goal but also as a function of the underlying data.

Figure 24A:
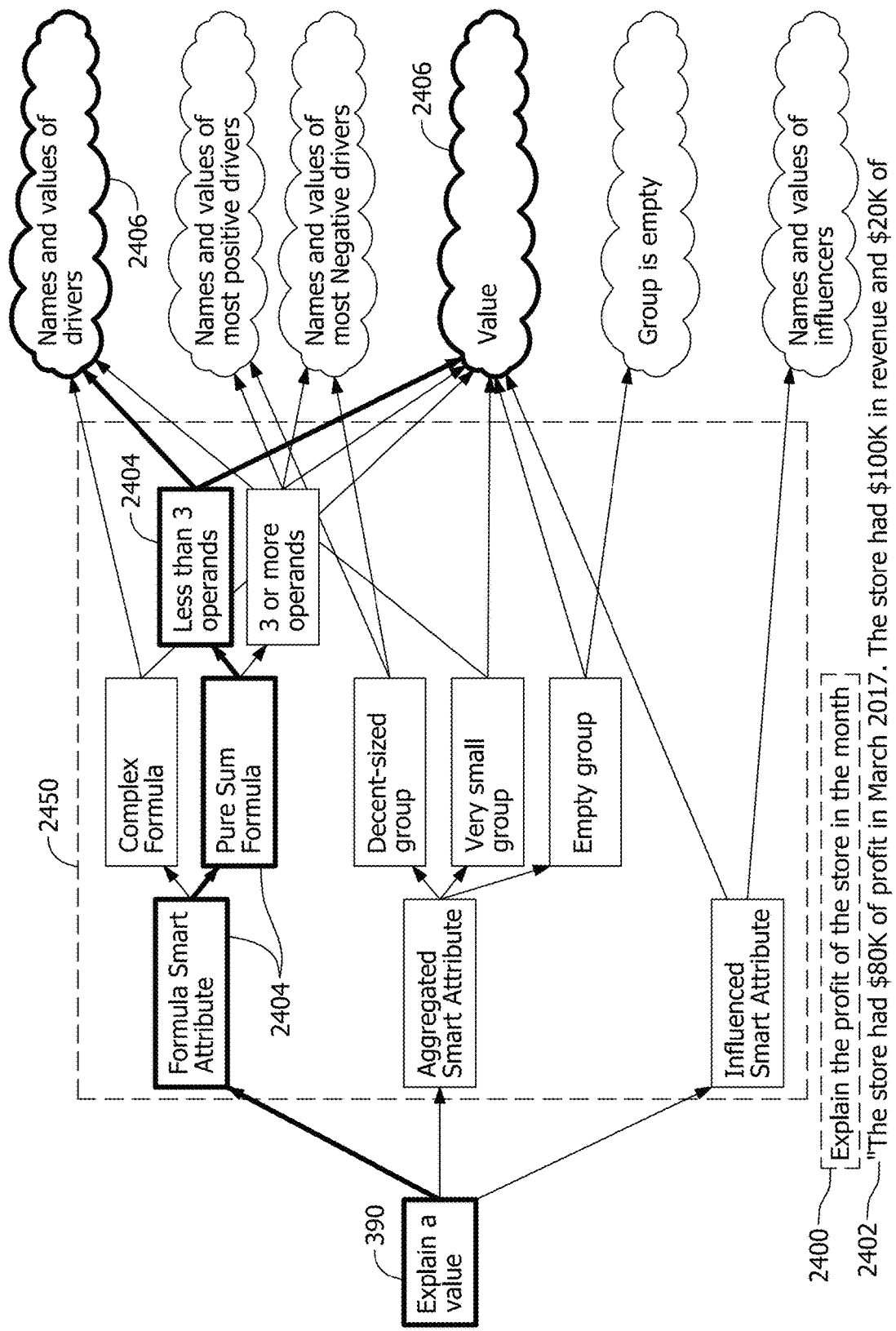
FIGS. 24A-E depict an example embodiment for a conditional outcome framework that can be used by the narrative analytics associated with a communication goal statement for "Explain a Value of an Attribute" as used to generate various narratives.

FIG. 24A discloses an example embodiment for a conditional outcome framework that can be used by the narrative analytics 510 associated with a communication goal statement 390 for "Explain a Value". In this example, the conditional outcome framework can employ multiple levels or layers of outcomes 1502 that serve as driver type characterization logic 2450 used by supporting analytics 1506. The driver type characterization logic 2450 can be configured to precisely categorize the model type data 2406 associated with the subject attribute, whereupon this categorization will control the type of ideas 1504 that will be considered and/or presented with respect to the narrative generation process for "Explain a Value". For example, the logic 2450 can be configured to assess whether the model type 2406 corresponds to a formula, aggregation, or influencer(s). If the model type 2406 is a formula, the logic 2450 can also determine whether the formula is a complex formula or a pure sum formula (as governed by various predefined parameters applied to the formula in question or by metadata within the smart attribute structure 2200). If the formula is a pure sum formula, the logic 2450 can further categorize the pure sum formula based on how many operands are included in the pure sum formula. If the model type 2406 is an aggregation, the logic 2450 can also determine the size of the aggregated group (e.g., how many members are parts of the aggregation) and classify the aggregation accordingly. An aggregation can be distinguished from a pure sum because an aggregation works over a group. For example, an aggregation can be "the total bookings of all salespeople", which can be modeled by summing the bookings of each member of the group "salespeople". Another example of an aggregation can be "the average salary of people in the neighborhood", which can be modeled as the average of the salary values for each member of the group "people in the neighborhood". Accordingly, it should also be understood that aggregations can be values other than sums; for example, averages, medians, standard deviations, maximums, and minimums can be aggregations. By contrast, a pure sum has fixed operands with no group involved. An example of a pure sum can be "total costs=operating costs+ cost of goods+salaries", where that calculation will always have three operands. The model type 2206 can identify whether a corresponding model 2204 is an aggregation or pure sum, and this model type can be specified in response to user input when an smart attribute is created, or it could be determined via an automated process that classifies models based on their content (e.g., determining whether a group is present in the model 2204).

In FIG. 24A, various outcomes 1502 are linked to one or more idea data structures 1504. Thus, the resolution of which ideas should be expressed in a given narrative that is generated to satisfy the communication goal statement 390 will depend on which outcomes 1502 were deemed true in view of the underlying data. The relationships between ideas for expression in a narrative to the nature of the underlying data in this example can be seen in the table below:

| Outcome of Characterizing the Underlying Data | Ideas to be Expressed in the Narrative About the Underlying Data |
| --- | --- |
| Complex Formula | Narrative should express the following ideas: The value for the attribute The names and values of the drivers for the attribute. |
| Pure Sum Formula (Less than 3 Operands) | Narrative should express the following ideas: The value for the attribute The names and values of the drivers for the attribute. |
| Pure Sum Formula (3 or More Operands) | Narrative should express the following ideas: The value for the attribute The names and values of the most positive drivers for the attribute. The names and values for the most negative drivers of the attribute. |
| Aggregation (Decent-Sized Group) | Narrative should express the following ideas: The value for the attribute The names and values of the most positive drivers for the attribute. The names and values for the most negative drivers of the attribute. |
| Aggregation (Very Small Group) | Narrative should express the following ideas: The value for the attribute The names and values of the drivers for the attribute. |
| Aggregation (Empty Group) | Narrative should express the following idea: That the group is empty |
| Influencers | Narrative should express the following ideas: The value for the attribute The names and values of the influencers for the attribute. |

Any ideas 1504 that are resolved based on the conditional outcome framework could then be inserted into the computed story outline 528 for use by AI 504 (together with their associated specifications in view of the underlying data) when rendering the desired narrative.

To the extent that any of the ideas 1504 need additional computed values in order to be expressed (where such values were not previously computed by analytics 2450), the supporting analytics 1506 can further include idea support analytics 2452. For example, if the analytics 2450 do not compute or retrieve the names and/or values for the drivers, the idea support analytics 2452 can include parameterized logic that computes retrieves or computes such information.

Thus, it can be seen that the example conditional outcome framework for a communication goal statement can define a hierarchical relationship among linked outcomes and ideas together with associated supporting analytics to drive a determination as to which ideas should be expressed in a narrative about a data set, where the selection of ideas for expression in the narrative can vary as a function of the nature of the data set.

In example embodiments, the conditional outcome framework can be designed so that it does not need any input or configuration from a user other than what is used to compose the communication goal statement 390 (e.g., for the "Explain a Value" communication goal statement, the system would only need to know the specified attribute and the entity for that attribute plus any applicable timeframe). However, for other example embodiments, a practitioner might want to expose some of the parameters of the conditional outcome framework to users to allow further configurations or adjustments of the conditional outcome framework.

For example, a practitioner might want to implement the thresholds used within the conditional outcome framework as user-defined values. In the context of FIG. 24A, this could involve exposing the thresholds used for characterizing the size of the aggregation group to users so that a user can adjust the group size boundaries in a desired manner (e.g., in some contexts, a large group might have a minimum of 100 members, while in other contexts a large group might have a minimum of 1000 members). Similarly, the thresholds for how many drivers are included in the groups "the most positive drivers" and "the most negative drivers" could be exposed to users to allow adjustments.

As another example, a practitioner might want to provide users with a capability to enable/disable the links between outcomes 1502 and ideas 1504 in a conditional outcome framework. For example, a GUI could present a user with lists of all of the outcomes 1502 and ideas 1504 that can be tied to a communication goal statement within a conditional outcome framework. The user could then individually select which ideas 1504 are to be linked to which outcomes 1502. If desired by a practitioner, that conditional outcome framework can include default linkages that are presented in the GUI, and the user could make adjustments from there.

FIG. 24A shows an example of a narrative 2402 that can be generated using the conditional outcome framework of FIG. 24A as applied to a communication goal statement 2400 of "Explain the Profit of the Store in the Month" with respect to a data set such as the ones shown in FIGS. 22B and 22C, and where the attribute model/model type 2204/2206 is a pure sum formula where "Profit=Revenue—Expenses". In this example, the narrative 2402 would be generated after an analysis of the data set arrived at a determination that the outcomes 2404 were true (the model/model type 2204/2206 for "profit" is a pure sum formula with less than 3 operands). As can be seen in FIG. 24A, the narrative text 2402 expresses the following ideas 2406 that are tied to the outcomes 2404: (1) an identification of the value for the store's profit, and (2) the names and values for the store's profit drivers (revenue and expenses).

Figure 24B:
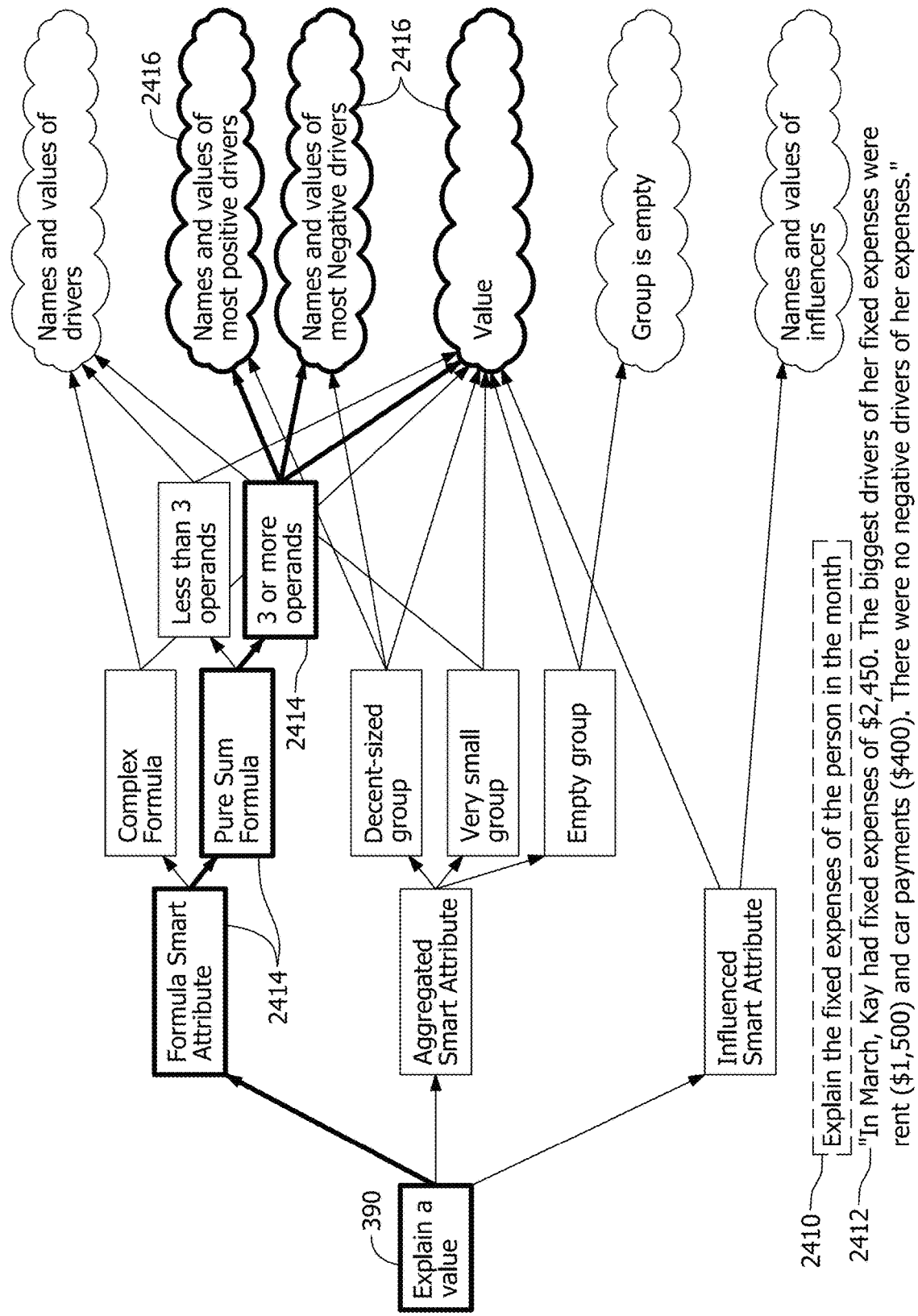

FIG. 24B shows an example of a narrative 2412 that can be generated using the conditional outcome framework of FIGS. 24A and 24B as applied to a communication goal statement 1810 of "Explain the fixed expenses of the person in the month" with respect to a data set that includes various people and data about their various expenses, and where the attribute model/model type 2204/2206 for the "fixed expenses" is a pure sum formula where "fixed expenses=rent+car payment+gas+electricity+internet+cell phone". In this example, the narrative 2412 would be generated after an analysis of the data set arrived at a determination that the outcomes 2414 were true (the model/ model type 2204/2206 for "profit" is a pure sum formula with more than 3 operands). As can be seen in FIG. 24B, the narrative text 2412 expresses the following ideas 2416 that are tied to the outcomes 2414: (1) an identification of the value for the person's fixed expenses, (2) the names and values for the person's two largest expense drivers (rent and car payments), and (3) the names and values for the person's most negative drivers (which in this case is an empty set).

Figure 24C:
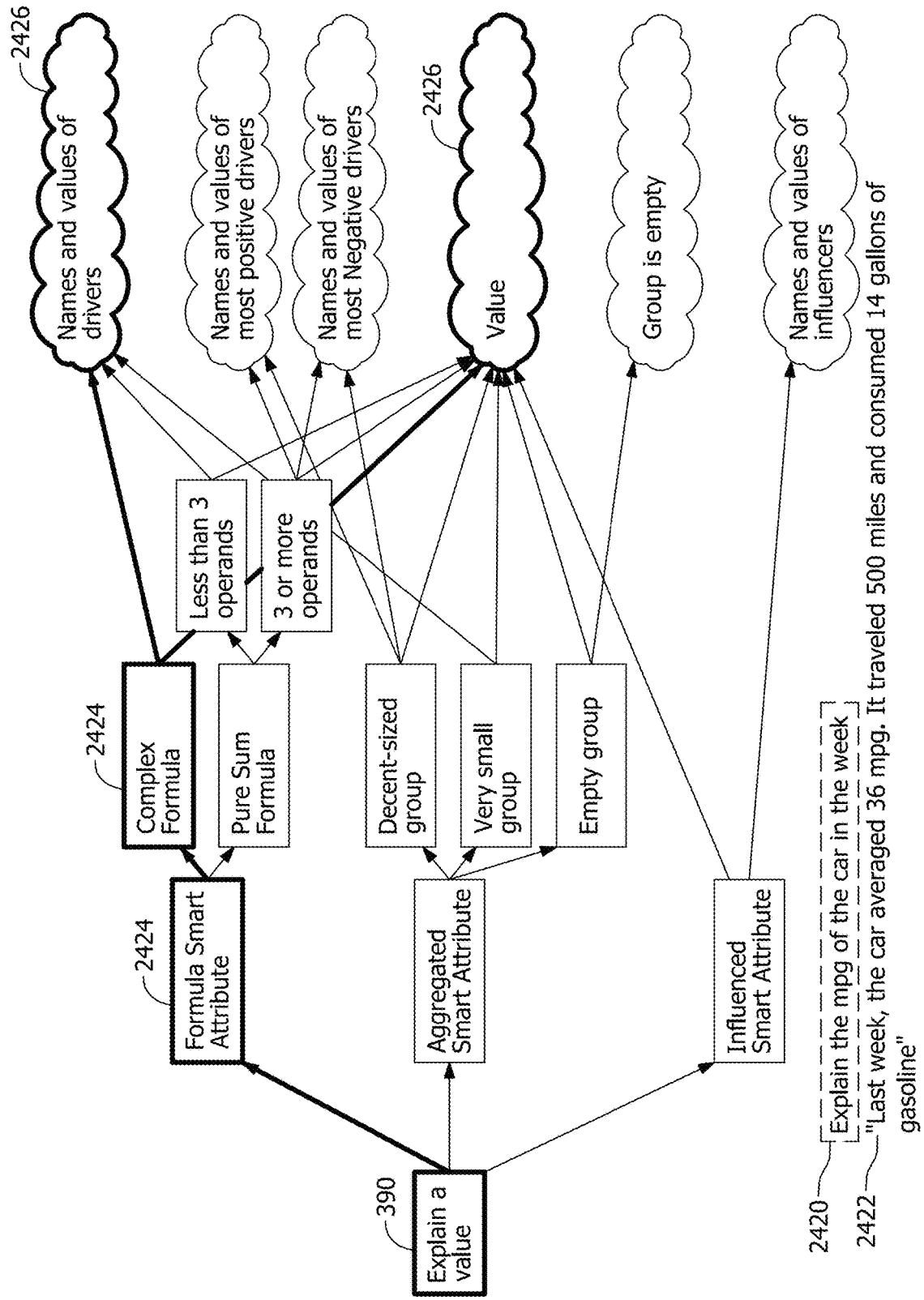

FIG. 24C shows an example of a narrative 2422 that can be generated using the conditional outcome framework of FIGS. 24A-C as applied to a communication goal statement 1810 of "Explain the mpg of the car in the week" with respect to a data set that includes weekly data values miles traveled and gallons consumed by a car, and where the attribute model/model type 2204/2206 for the "mpg" is a complex formula where "mpg=miles traveled/gallons consumed". In this example, the narrative 2422 would be generated after an analysis of the data set arrived at a determination that the outcomes 2424 were true (the model/model type 2204/2206 for "mpg" is a complex formula). As can be seen in FIG. 24C, the narrative text 2422 expresses the following ideas 2426 that are tied to the outcomes 2424: (1) an identification of the value for the car's miles per gallon, and (2) the names and values for the car's mpg drivers (miles traveled and gallons consumed).

Figure 24D:
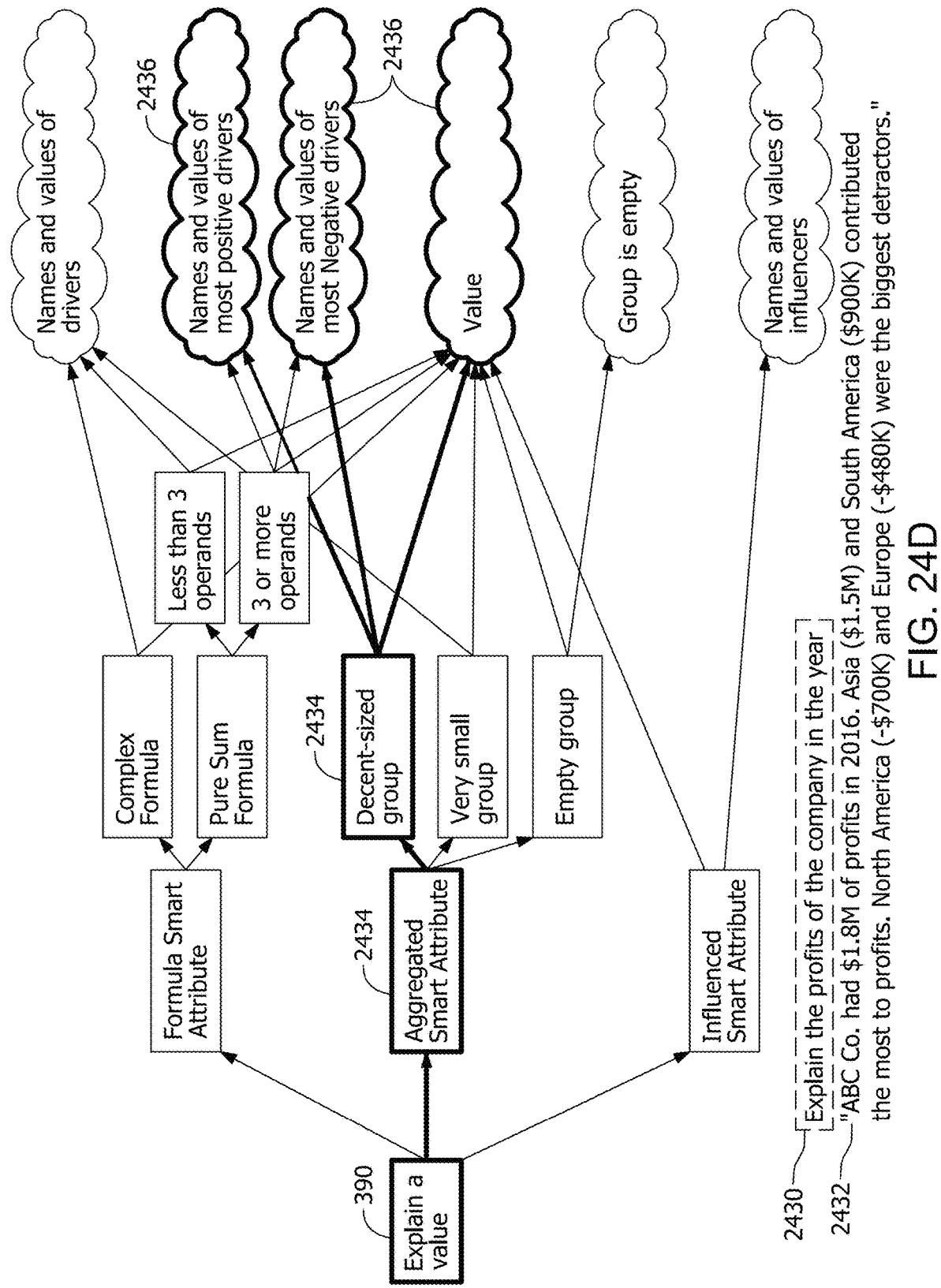

FIG. 24D shows an example of a narrative 2432 that can be generated using the conditional outcome framework of FIGS. 24A-D as applied to a communication goal statement 1810 of "Explain the profits of the company in the year" with respect to a data set that includes data that describes the company's profits in various regions, and where the attribute model/model type 2204/2206 for "profits" is an aggregation where "profits=sum(profits in each region)". In this example, the narrative 2432 would be generated after an analysis of the data set arrived at a determination that the outcomes 2434 were true (the model/model type 2204/2206 for "profits" is an aggregation with a decent-sized group). As can be seen in FIG. 24D, the narrative text 2432 expresses the following ideas 2436 that are tied to the outcomes 2434: (1) an identification of the value for the company's profits, (2) the names and values for the regions which were the most positive drivers of profit, and (3) regions which were the most negative drivers of profit. In this example, there are two regions in each group (most positive and most negative). As indicated above, this size can be pre-set within the analytics or it can be derived as a function of the data.

Figure 24E:
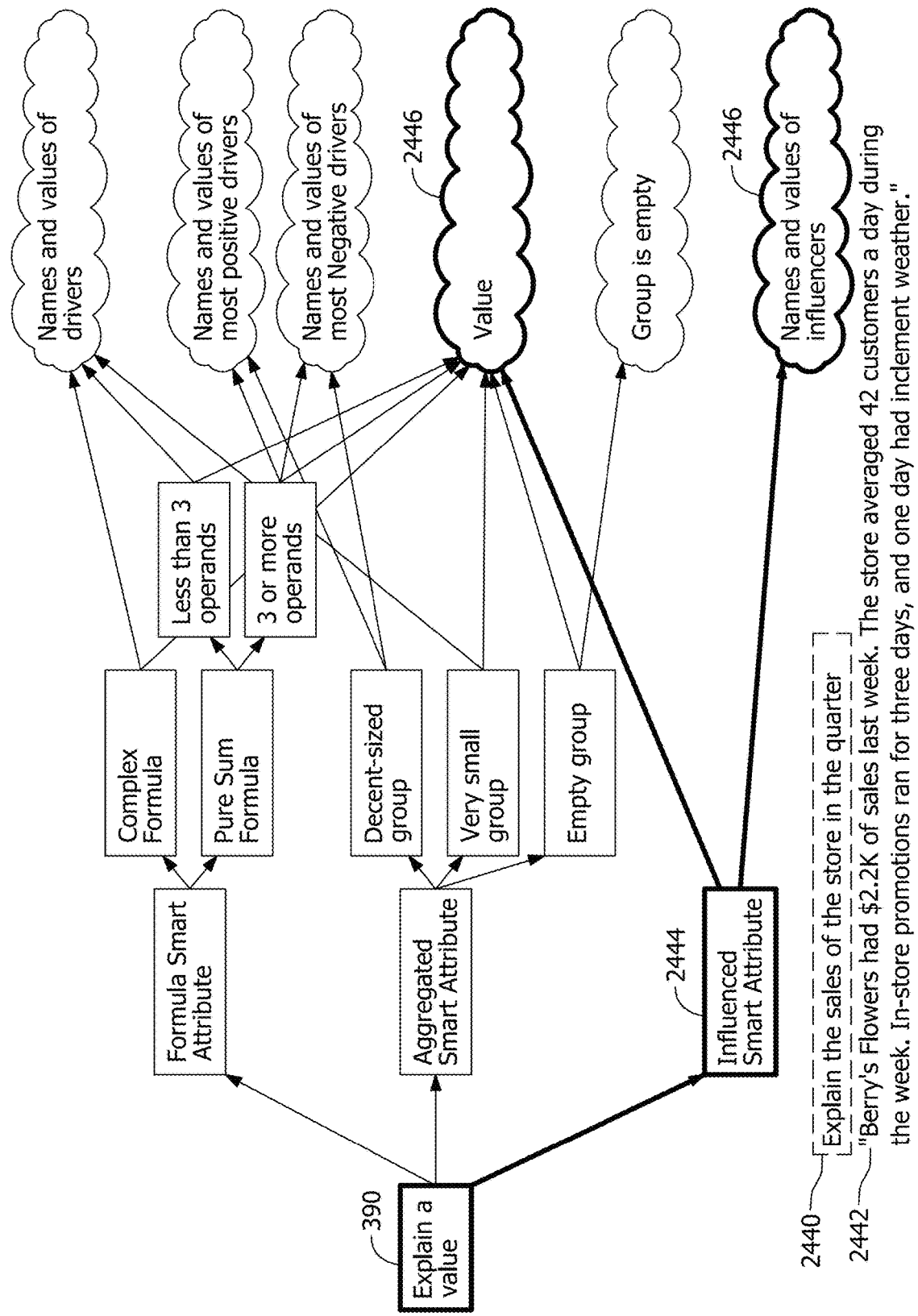

FIG. 24E shows an example of a narrative 2442 that can be generated using the conditional outcome framework of FIGS. 24A-E as applied to a communication goal statement 1810 of "Explain the sales of the store in the quarter" with respect to a data set that includes data that describes various forms of store data, and where the attribute model/model type 2204/2206 for "sales" is an influencer model where foot traffic and in-store promotions are a positive influencer of sales and where days with inclement weather is a negative influencer for sales. In this example, the narrative 2442 would be generated after an analysis of the data set arrived at a determination that the outcomes 2444 were true (the model/model type 2204/2206 for "sales" is an influencer model). As can be seen in FIG. 24E, the narrative text 2442 expresses the following ideas 2446 that are tied to the outcomes 2444: (1) an identification of the value for the store's sales, and (2) the names and values for the store's sales influencers (foot traffic, in-store promotions, and days of inclement weather).

FIGS. 24A-E thus show how the same parameterized conditional outcome framework can be used to generate narrative stories across different content verticals (e.g., a story about store profits as in FIG. 24A versus a story about car mileage efficiency as in FIG. 24C), which demonstrates how the parameterized conditional outcome framework provides an effective technical solution to the technical problem of horizontal scalability in the NLG arts.

It should be understood that the system can also be designed to support other "explain" communication goals. For example, another base communication goal statement that can be used by the system can be "Explain the Change in (a Value of) an Attribute (of an Entity or Entity Group) (over a Timeframe)" (which can be labeled in shorthand as "Explain a Change in a Value")". Such a goal can produce ideas that capture a variety of understandings such as which drivers gained or lost significantly (even if not necessarily the biggest magnitude driver), how main drivers may have changed over time, how the group size of the main drivers may have changed over time, etc. FIG. 25A depicts an example of various ideas that can be learned and presented by a narrative generation system with respect to a communication goal of "Explain a Change in Value" with respect to an example data set for store profits and drivers A-F. Accordingly, it should be understood that it may be desirable for the narratives produced in response to the "Explain a Change in a Value" communication goal statement to express different ideas than the narratives produced in response to the "Explain a Value" communication goal statement.

Figure 25B:
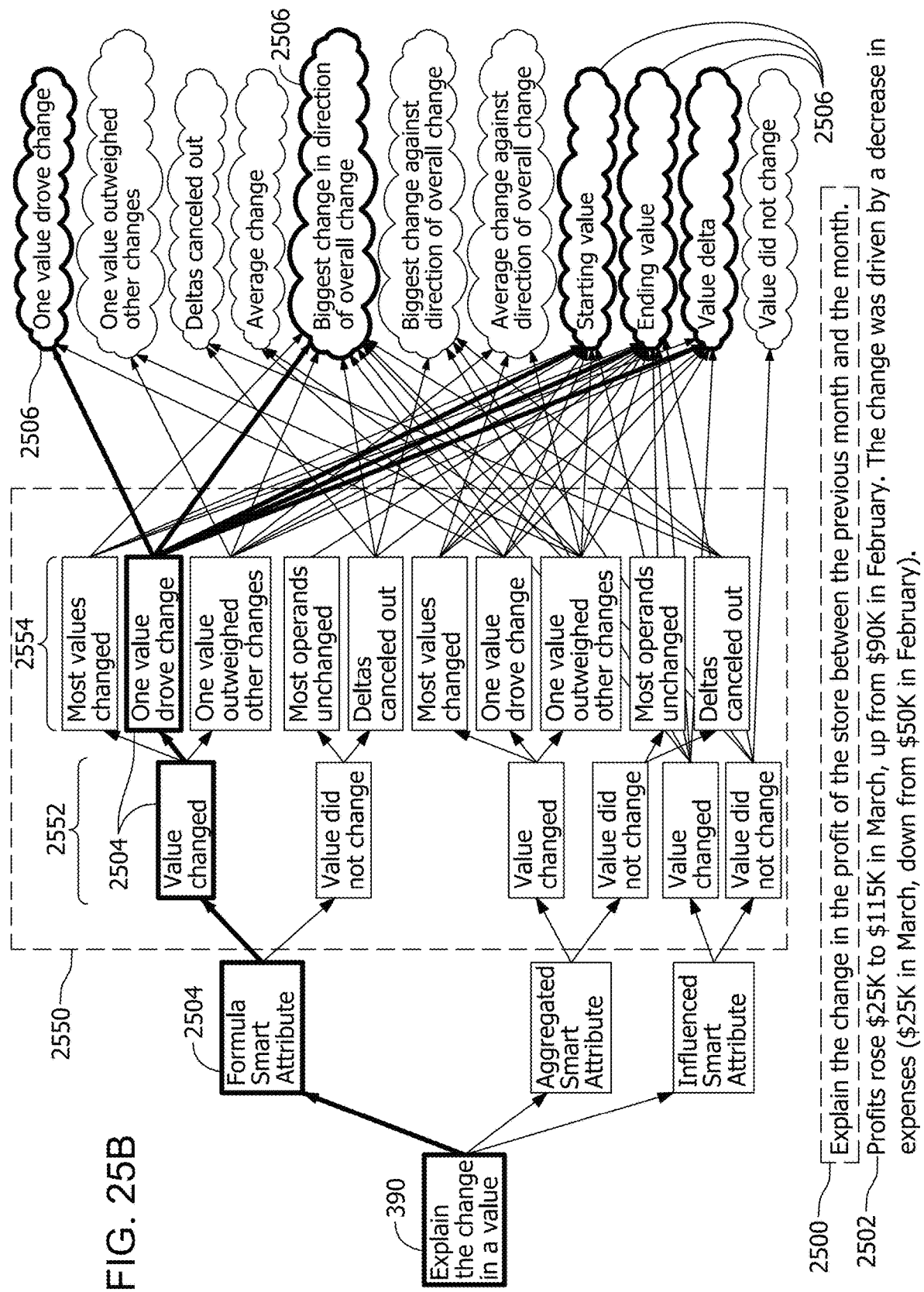
" FIGS. 25B-D depict an example embodiment for a conditional outcome framework that can be used by the narrative analytics associated with a communication goal statement for "Explain a Change in Value of an Attribute" as used to generate various narratives.

FIG. 25B discloses an example embodiment for a conditional outcome framework that can be used by the narrative analytics 510 associated with a communication goal statement 390 for "Explain the change in value" (where the relevant time frame can be either a default timeframe, system-determined time frame, or user-determined time frame. In this example, the framework includes attribute change analytics 2550 that compute the changes/deltas in the specified attribute values (including the driver attributes) over the relevant time period. These deltas can then be used by the conditional outcome framework to identify ideas for possible expression in a narrative story. In this example, the attribute change analytics 2550 include a first level 2552 of conditional outcomes 1502 relating to changes in value for the subject attribute (store profits) and a second level 2554 of conditional outcomes relating to changes in value for the drivers of the subject attribute. For example, the first level 2552 can include analytics that determine whether the value of the subject attribute change over the relevant time frame (which may include some thresholding to eliminate insignificant changes in value (e.g., changes of 2% or less could be deemed "no change"). Examples of analytics in the second level 2554 can include analytics that are configured to (1) determine which driver values changed the most over the relevant time frame, (2) whether any of the drivers were the main drivers of change for the subject attribute and/or drowned out the other drivers, (3) whether the changes in driver values effectively canceled each other out, and (4) whether the mix of significant drivers changed over the relevant time frame.

FIG. 25B shows an example of a narrative 2502 that can be generated using the conditional outcome framework shown by the upper portion of FIG. 25A as applied to a communication goal statement 390 of "Explain the change in the profit of the store between the previous month and the month" (where the relevant time frame is user-defined as previous month-to-current month) with respect to a data set that includes profits, revenues, and expenses for a store over time, and where the attribute model/model type 2204/2206 is a pure sum formula where "Profit=Revenue−Expenses". In this example, the narrative 2502 would be generated after an analysis of the data set arrived at a determination that the outcomes 2504 were true (the model/model type 2204/2206 for "profit" is a pure sum formula, where the store profit changed over the timeframe, and where one driver was the main driver for this change in store profits). As can be seen in FIG. 25B, the narrative text 2502 expresses the following ideas 2506 that are tied to the outcomes 2504: (1) an identification of the value for the store's profit for the first month of the time frame, (2) an identification of the value for the store's profit for the last month of the time frame, (3) an identification of the value of the change in the store profits from the previous month to the current month, (4) an identification of the driver that drove the change in store profits, and (5) a description of the change and change direction for this driver over the timeframe.

Figure 25C:
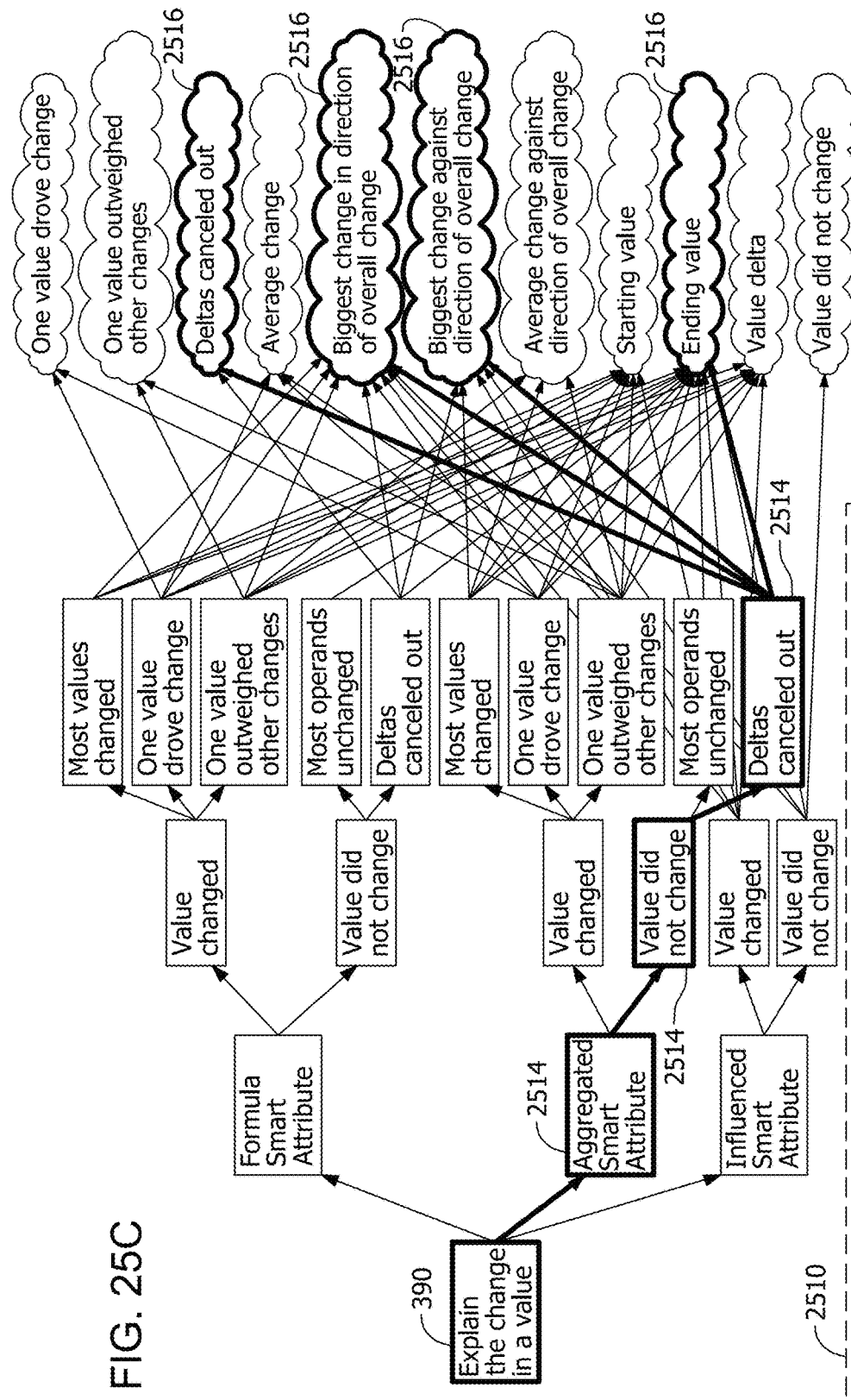

FIG. 25C shows an example of a narrative 2512 that can be generated using the conditional outcome framework shown by the upper portion of FIGS. 25A and 25B as applied to a communication goal statement 390 of "Explain the change in profits of the company between last year and this year" (where the relevant time frame is user-defined as previous year-to-current year) with respect to a data set that includes data that describes the company's profits in various regions, and where the attribute model/model type 2204/2206 for "profits" is an aggregation where "profits=sum (profits in each region)". In this example, the narrative 2512 would be generated after an analysis of the data set arrived at a determination that the outcomes 2514 were true (the model/model type 2204/2206 for "profit" is an aggregation, where the company profits did not change over the timeframe, and where the changes in various drivers of company profits canceled each other out). As can be seen in FIG. 25C, the narrative text 2512 expresses the following ideas 2516 that are tied to the outcomes 2514: (1) an identification of the value for the company's profits at the end of the timeframe, (2) an identification that the changes in the drivers canceled each other so as to result in no change in profits over the timeframe, (3) an identification of the driver with the biggest positive change in direction (and the values for this change), and (4) an identification of the driver with the biggest negative change in direction (and the values for this change).

Figure 25D:
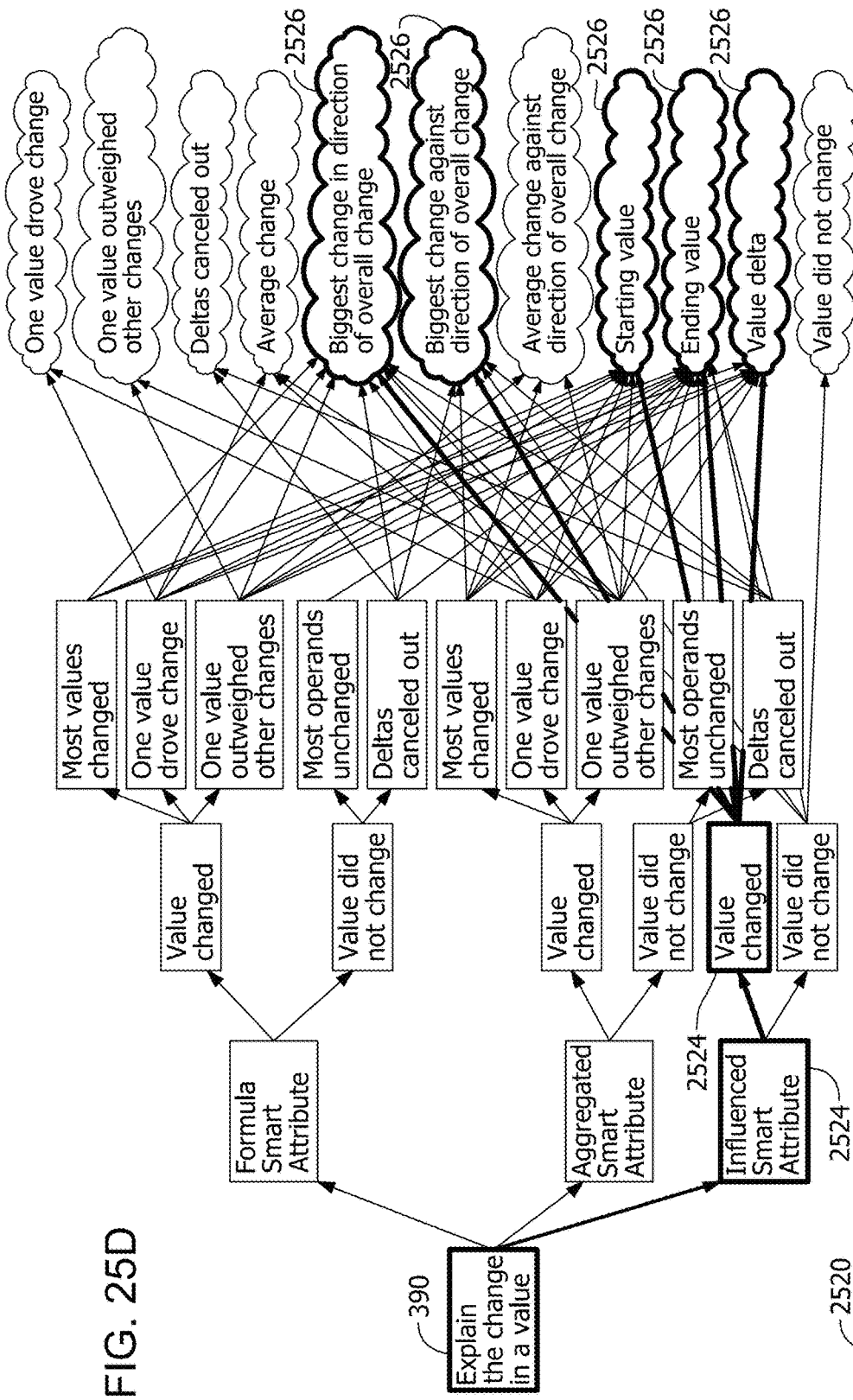

FIG. 25D shows an example of a narrative 2522 that can be generated using the conditional outcome framework shown by the upper portion of FIGS. 25A-C as applied to a communication goal statement 390 of "Explain the change in sales of the store between last week and this week" (where the relevant time frame is user-defined as previous week-to-current week) with respect to a data set that includes data that describes various forms of store data, and where the attribute model/model type 2204/2206 for "sales" is an influencer model where foot traffic and in-store promotions are a positive influencer of sales and where days with inclement weather is a negative influencer for sales. In this example, the narrative 2522 would be generated after an analysis of the data set arrived at a determination that the outcomes 2524 were true (the model/model type 2204/2206 for "sales" is an influencer model, and where the store sales changed over the timeframe. As can be seen in FIG. 25D, the narrative text 2522 expresses the following ideas 2526 that are tied to the outcomes 2524: (1) an identification of the value for the store's sales for the first week of the time frame, (2) an identification of the value for the store's profit for the last week of the time frame, (3) an identification of the value of the change in the store sales from the previous week to the current week, (4) an identification of the influencer driver with the biggest change in direction in the same direction as the change in store sales (and the values for this change), and (4) an identification of the influencer driver with the biggest change in the opposite direction of the change in store sales (and the values for this change).

Figure 26A:
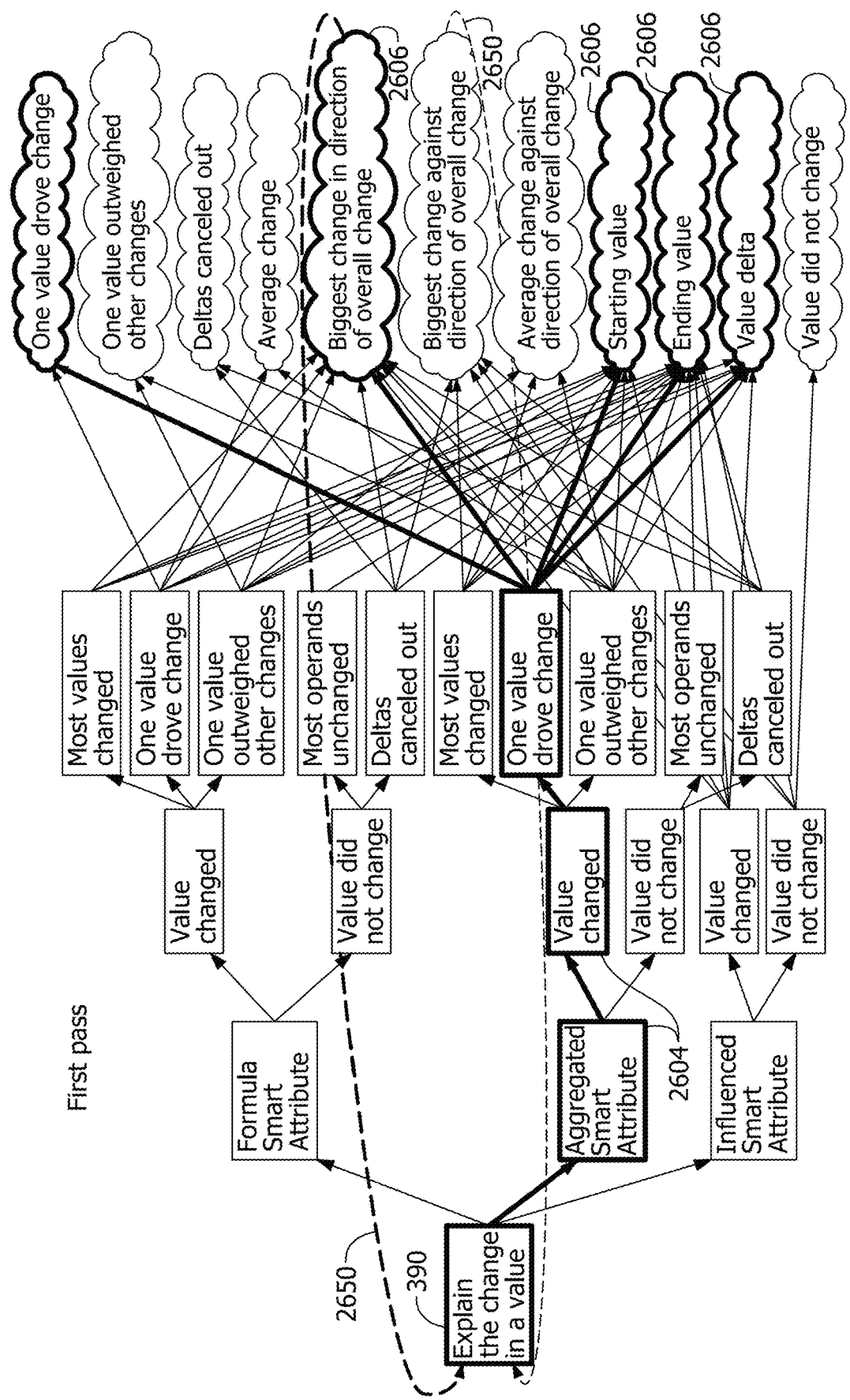
FIGS. 26A and 26B depict an example embodiment for a recursive conditional outcome framework that can be recursively invoked by the narrative analytics associated with a communication goal statement for "Explain a Change in Value of an Attribute".
Figure 26B:
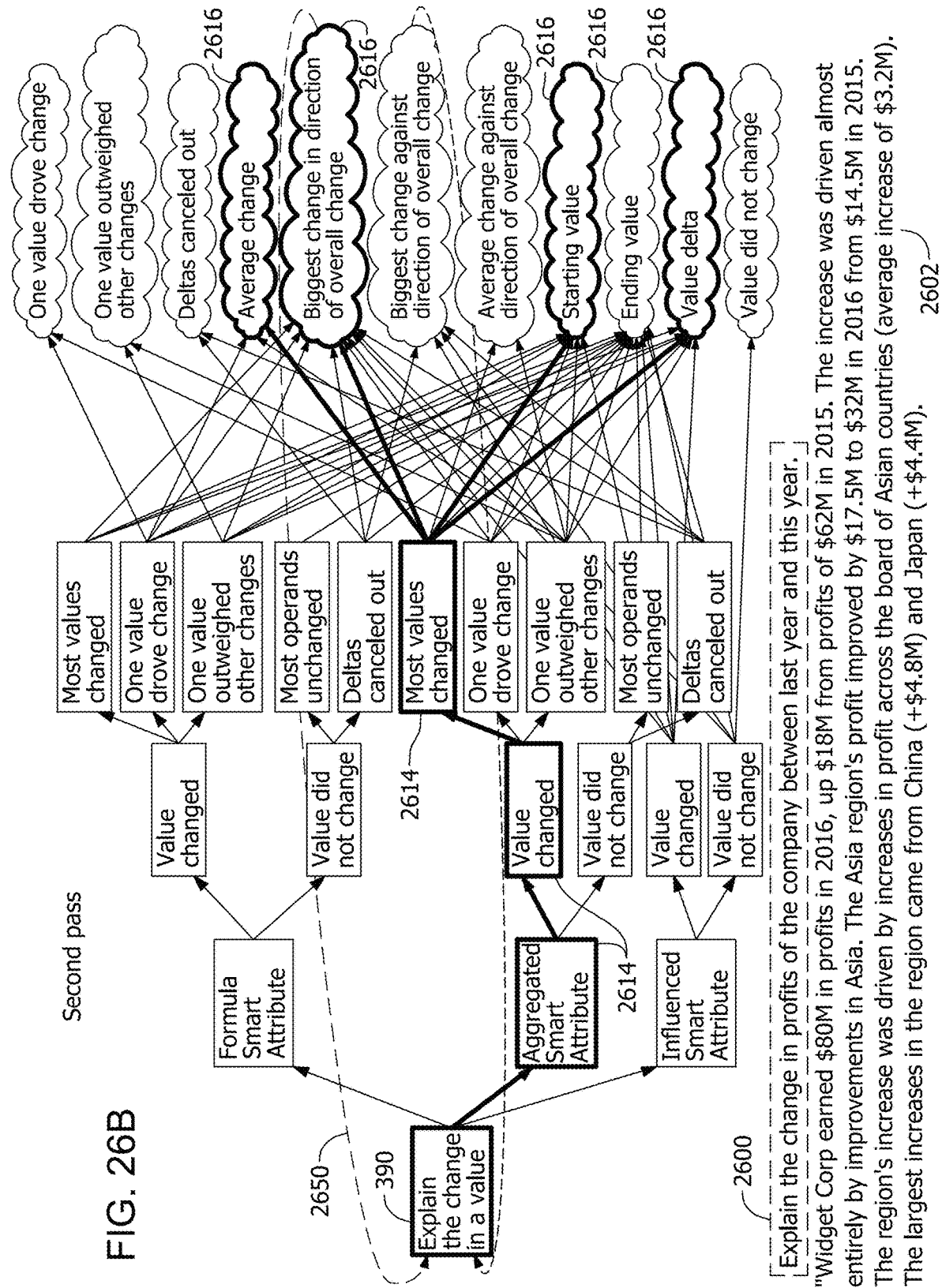

Furthermore, it should be understood that the narrative analytics tied to "Explain" communication goals can be executed recursively to analyze and assess thing such as drivers of drivers. For example, as shown in FIGS. 26A and 26B, one or more of the ideas 1506 in the conditional outcome framework associated with an "explain" communication goal can include a feedback path 2650 for a recursive traversal of the conditional outcome framework using a new communication goal statement that includes one or more attributes from the subject idea 1506 in place of the attribute from the prior pass. FIGS. 26A and 26B show an example where the system employs two passes through the conditional outcome framework to perform not only driver analysis with respect to the subject attribute, but also a drivers of drivers analysis.

FIG. 26A shows an example first pass through such a conditional outcome framework with respect to a communication goal statement 390 of "Explain the change in profits of the company between last year and this year" (where the relevant time frame is user-defined as previous year-to-current year) with respect to a data set that includes data that describes the company's profits in various regions, and where the attribute model/model type 2204/2206 for "profits" is an aggregation where "profits=sum(profits in each region)". In this example, analysis of the data set arrives at a determination that the outcomes 2604 are true (the model/model type 2204/2206 for "profit" is an aggregation, where the company profits changed over the timeframe, and where one driver drove this change in company profits). As can be seen in FIG. 26A, one of the ideas 2606 that results from such analysis is an idea that includes a feedback path 2650 (the idea for "biggest change in direction of overall change").

Thus, via feedback path 2650, the system performs a second pass through the conditional outcome framework, as shown in FIG. 26B. With this second pass, the communication goal statement that is used is "Explain the change in value of the profit for the Asia region between last year and this year" (where the Asia region's profits serves as the driver of company profits that had the biggest change in the same direction as the overall change for the company's profits). The attribute model/model type 2204/2206 for regional profits is an aggregation of profits for each country in the subject region. In this example, after the second pass, the system would conclude that outcomes 2614 were true (the model/model type 2204/2206 for "regional profit" is an aggregation, where the regional profits changed over the timeframe, and where most of the drivers of regional profits changed during the time frame). As can be seen in FIG. 26B, the narrative text 2602 expresses the following ideas 2606 and 2616 that are tied to the outcomes from the first pass and the second pass: (1) an identification of the value for the company's profits at the end of the timeframe, (2) an identification of the value for the company's profits at the start of the timeframe, (3) an identification of the change in the company's profits over the time frame, (4) an identification of the driver with the biggest change in the same direction as the overall change in company's profits (the Asia region profits), (5) an identification of the value for the Asia region's profits at the end of the timeframe, (6) an identification of the Asia region's profits at the start of the timeframe, (7) an identification of the change in the Asia region's profits over the time frame, (8) the average change in profits for the countries in the Asia region over the time frame, and (9) an identification of the countries in the Asia region with the biggest change in profits in the same direction as the overall change in profits for the Asia region (and their corresponding change values).

It should be understood that FIGS. 26A and 26B are examples only, and that the recursive nature of the narrative analytics tied to "Explain" communication goals need not be limited to only two passes. For example, the analytics could be configured to recursively analyze drivers so long as further drill downs are available for drivers. As another example, a user-defined input can control the depth of recursiveness. Moreover, the system could define a default level of recursiveness of multiple levels of recursion are available. Also, while FIGS. 26A and B show a recursive conditional outcome framework with respect to an "Explain the Change in Value" communication goal, it should be understood that the conditional outcome frameworks for other "explain" communication goals could also be made recursive (such as the frameworks shown in FIGS. 24A-E with respect to the "Explain a Value" communication goal.

Live Story Editing:

Another innovative feature that may be included in a narrative generation platform is an editing feature whereby a user can use a story outline comprising one or more composed communication goal statements and an ontology to generate a narrative story from source data, where the narrative story can be reviewed and edited in a manner that results in automated adjustments to the narrative generation AI. For example, an author using the system in an editing mode can cause the system to generate a test narrative story from the source data using one or more composed communication goal statements and a related ontology. The author can then review the resulting test narrative story to assess whether the story was rendered correctly and whether any edits should be made. As an example, the author may decide that a different expression for an entity would work better in the story than the expression that was chosen by the system (e.g., the author may decide that a characterization expressed as "slow growth" in the narrative story would be better expressed as "sluggish growth"). The user can directly edit the text of the narrative story using text editing techniques (e.g., selecting and deleting the word "slow" and typing in the word "sluggish" in its place). Upon detecting this edit, the system can automatically update the ontology 320 to modify the subject characterization object 332 by adding "sluggish growth" to the expression(s) 364 for that characterization (and optionally removing the "slow growth" expression).

To accomplish this, words in the resultant test narrative story can be linked with the objects from ontology 320 that these words express. Further still, sentences and clauses can be associated with the communication goal statements that they serve. In this fashion, direct edits on words, clauses, and sentences by an author on the test narrative story can be traced back to their source ontological objects and communication goal statements.

Another example of an innovative editing capability is when an author chooses to re-order the sentences or paragraphs in the test narrative story. Given that sentences and paragraphs in the test narrative story can be traced back to communication goal statements in the story outline, the act of re-ordering sentences and/or paragraphs can cause the system to automatically re-order the communication goal statements in the story outline in accordance with the editing. Thus, consider a story outline that comprises Communication Goal Statement 1 followed by Communication Goal Statement 2 followed by Communication Goal Statement 3 that produces a narrative story comprising Sentence 1 (which is linked to Communication Goal Statement 1), followed by Sentence 2 (which is linked to Communication Goal Statement 2), followed by Sentence 3 (which is linked to Communication Goal Statement 3). If the user decides that the story would read better if Sentence 2 came before Sentence 1, the user can perform this edit in the live story editing mode of the system, and this edit can cause the system to automatically adjust the story outline to comprise Communication Goal Statement 2 followed by Communication Goal Statement 1 followed by Communication Goal Statement 3.

Similarly, if a user edits the narrative story by deleting a sentence, the system can automatically adjust the story outline by deleting the communication goal statement linked to that sentence.

Through the automated changes to the ontology 320 and/or story outline, the system can be able to quickly adjust its story generation capabilities to reflect the desires of the author. Thus, during a subsequent execution of the story generation process, the system can use the updated ontology 320 and/or story outline to control the narrative generation process.

FIGS. 256-278 and their supporting description in Appendix A describe aspects of such editing and other review features that can be included in an example embodiment of a narrative generation platform. Appendix A also describes a number of other aspects that may be included in example embodiments of a narrative generation platform.

While the invention has been described above in relation to its example embodiments, various modifications may be made thereto that still fall within the invention's scope. Such modifications to the invention will be recognizable upon review of the teachings herein.

APPENDIX A

Figure 27:
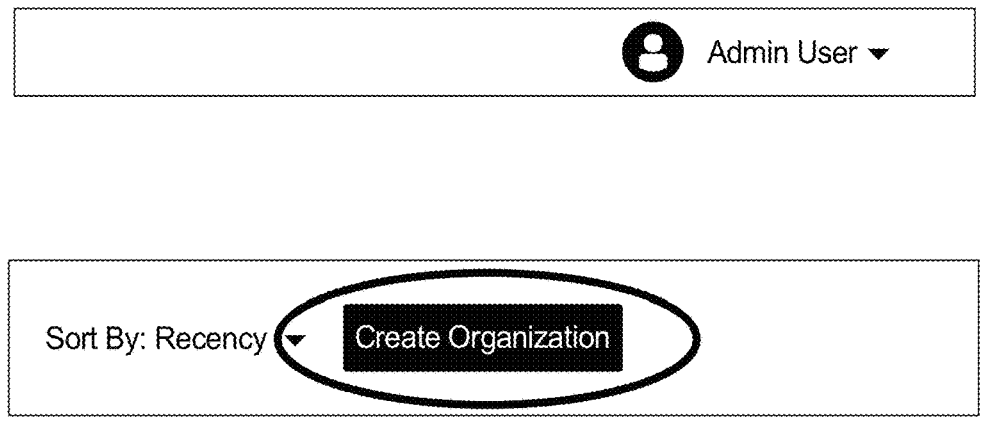
FIGS. 27-298 illustrate example user interfaces for using an example embodiment to support narrative generation through composable communication goal statements and ontologies.
Figure 298:
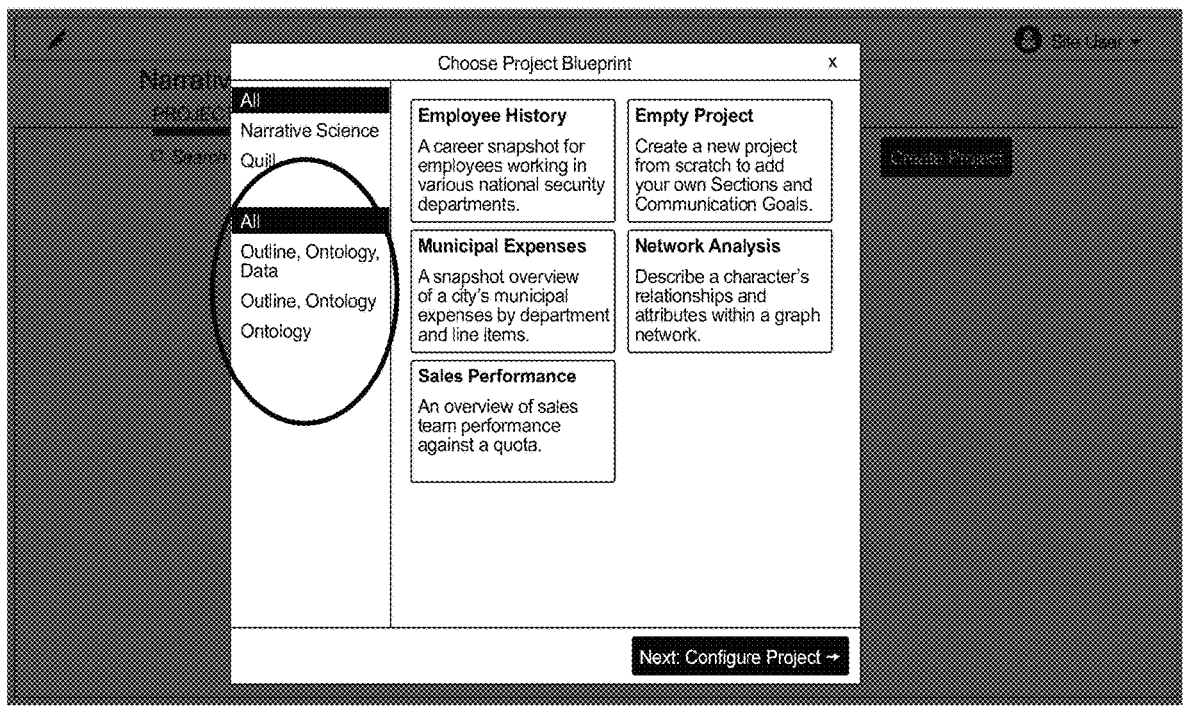

This appendix describes a user guide for an example embodiment referred to as Quill, and it is organized into the following sections:
   A1: Introduction
      A1(i): What is Quill?
      A1(ii): What is NLG?
      A1(iii): How to use this Guide
   A2: Getting Started
      A2(i): Logging in
         A2(i)(a): Supported Browsers
         A2(i)(b): Hosted on-premises
      A2(ii): General Structure
         A2(ii)(a): Creating an Organization
         A2(ii)(b): Creating Users
      A2(iii): Creating Projects
         A2(iii)(a): Authoring
         A2(iii)(b): Data Manager
         A2(iii)(c): Project Administration
   A3: Configure a Story from a Blueprint
      A3(i): Configure a Sales Performance Report
         A3(i)(a): Headline
         A3(ii)(b): Overview
         A3(iii)(c): Drivers
         A3(iv)(d): Adding Data
         A3(v)(e): Data Requirements A4: Ontology Management
  A4(i): Entity Types and Expressions
    A4(i)(a): Entities Tab
    A4(i)(b): Creating an Entity Type
  A4(ii): Relationships
    A4(ii)(a): Creating a Relationship
  A4(iii): Characterizations
    A4(iii)(a): Entity Characterizations
    A4(iii)(b): Assessment Characterizations
  A4(iv): Attributes
    A4(iv)(a): Attribute Values
    A4(iv)(b): Computed Attributes
A5: Configure a Story from Scratch
  A5(i): The Outline
    A5(i)(a): Sections
      A5(i)(a)(1): Renaming a Section
      A5(i)(a)(2): Deleting a Section
      A5(i)(a)(3): Moving a Section
    A5(i)(b): Communication Goals
      A5(i)(b)(1): Creating a Communication Goal
        A5(i)(b)(1)(A): Entity Types
        A5(i)(b)(1)(B): Creating an Entity Type
        A5(i)(b)(1)(C): Creating a Relationship
        A5(i)(b)(1)(D): Characterizations
      A5(i)(b)(2): Deleting a Communication Goal
      A5(i)(b)(3): Moving a Communication Goal
      A5(i)(b)(4): Linked Goals
      A5(i)(b)(5): Related Goals (Subgoals)
      A5(i)(b)(6): Styling Communication Goals
      A5(i)(b)(7): Charts
    A5(i)(c): Data Requirements
      A5(i)(c)(1): Tabular Data
      A5(i)(c)(2): Document-Based Data
    A5(i)(d): Data Formatting
    A5(i)(e): Data Validation
A6: Data Management
  A6(i): Getting Data Into Quill
    A6(i)(a): Uploading a File
    A6(i)(b): Adding a Connection
A7: Reviewing Your Story
  A7(i): Live Story
    A7(i)(a): Edit Mode
      A7(i)(a)(1): Entity Expressions
      A7(i)(a)(2): Characterization Expressions
      A7(i)(a)(3): Language Guidance
    A7(i)(b): Review Mode
  A7(ii): Logic Trace
  A7(iii): Monitoring
A8: Managing Story Versions
  A8(i): Drafts and Publishing
  A8(ii): Change Log
A9: Writing Stories in Production
  A9(i): API
  A9(ii): Scheduling
A10: Sharing and Reuse
A11: Terminology
A12: Communication Goal Families
A13: Miscellaneous
  A13(i): Supported Chart Types
  A13(ii): Supported Document Structures
    A13(ii)(a): Single Document
    A13(ii)(b): Nested Documents
    A13(ii)(c): Unsupported Structures
  A13(iii): Styling Rules
  A13(iv): Using Multiple Data Views
  A13(v): Permission Structure The following sections can be read in combination with FIGS. 27-298 for an understanding of how the example embodiment of Appendix A can be used by users.

A1: Introduction

A1(i): What is Quill?

Quill is an advanced natural language generation (Advanced NLG) platform that transforms structured data into narratives. It is an intelligent system that starts by understanding what the user wants to communicate and then performs the relevant analysis to highlight what is most interesting and important, identifies and accesses the required data necessary to tell the story, and then delivers the analysis in the most intuitive, personalized, easy-to-consume way possible a narrative.

Quill is used to automate manual processes related to data analysis and reporting. Its authoring capabilities can be easily integrated into existing platforms, generating narratives to explain insights not obvious in data or visualizations alone.

A1(ii): What is NLG?

Natural Language Generation (NLG) is a subfield of artificial intelligence (AI) which produces language as output on the basis of data input. Many NLG systems are basic in that they simply translate data into text, with templated approaches that are constrained to communicate one idea per sentence, have limited variability in word choice, and are unable to perform the analytics necessary to identify what is relevant to the individual reader.

Quill is an Advanced NLG platform that does not start with the data but by the user's intent of what they want to communicate. Unlike templated approaches that simply map language onto data, Quill performs complex assessments to characterize events and identify relationships, understands what information is especially relevant, learns about certain domains and utilizes specific analytics and language patterns accordingly, and generates language with the consideration of appropriate sentence length, structure, and word variability. The result is an intelligent narrative that can be produced at significant scale and customized to an audience of one.

A1(iii): How to use this Guide

Getting Started walks through how to log in to Quill and set up Organizations, Users, and Projects. It also provides an overview of the components of Quill.

Ontology Management is a high-level description of the conceptual elements stories in Quill are based on. This section will help you understand the building blocks of writing a story.

Configuring a Story from Scratch and Configuring a Story from a Blueprint talk through the steps of configuring a story in Quill. Jump to one of these sections if you want to learn the basics of using Quill.

Data Management contains the necessary information for setting up data in Quill, discussing the accepted formats and connections.

Reviewing Your Story discusses the tools available to review, edit, and monitor the stories you configure in Quill.

Managing Story Versions covers publishing stories and tracking changes made to projects.

Writing Stories in Production addresses administrative aspects of story generation, including setting up an API endpoint and scheduling story runs.

Sharing and Reuse goes through how to make components of a particular project available across projects.

Common Troubleshooting offers simple, easy-to-follow steps for dealing with common questions that arise when working in Quill.

The Terminology will help you understand the terminology used in this manual and throughout Quill, while the Communication Goal Families describes the available communication goals and how they relate to each other.

The Miscellaneous section presents an example of a state of Quill functionality.

A2: Getting Started

A2(i): Logging in

A2(i)(a): Supported Browsers

Quill is a web-based application that supports Firefox, versions 32 ESR and up, and all versions of Chrome. Logging in will depend on whether Narrative Science is hosting the application or Quill has been installed on-premises.

A2(i)(b): Hosted On-Premises

For on-premises installations of Quill, if you are an authenticated user, go to your custom URL to access Quill. You will be taken directly to your project dashboard. If you see an authentication error, contact your site administrator to be set up with access to Quill.

A2(ii): General Structure

Quill is made up of Organizations and Projects. An Organization is the base level of access in Quill. It includes Administrators and Members and is how Projects are grouped together. Projects are where narratives are built and edited. They exist within Organizations. Users exist at all levels of Quill, at the Site, Organization, and Project levels. Access privileges can be set on a per User basis and apply differently at the Site, Organization, and Project levels. (For more detail, refer to the Permissions Structure section of the Miscellaneous section.)

A2(ii)(a): Creating an Organization

Creating an Organization is a Site Administrative privilege. At the time that Quill is installed, whether hosted by Narrative Science or on-premises, a Site Administrator is designated. Only a Site Administrator has the ability to create an Organization (see FIG. 27).

Figure 28:
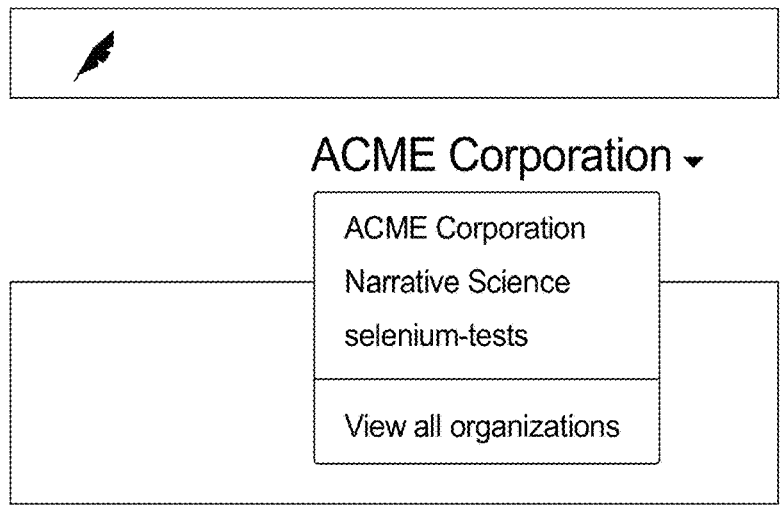

Site Administrators can add users, and users can only see the Organizations of which they are members. Site Administrators have access to all Organizations with the View All Dashboards option (see FIG. 28), but Organization Members do not.

Figure 29:
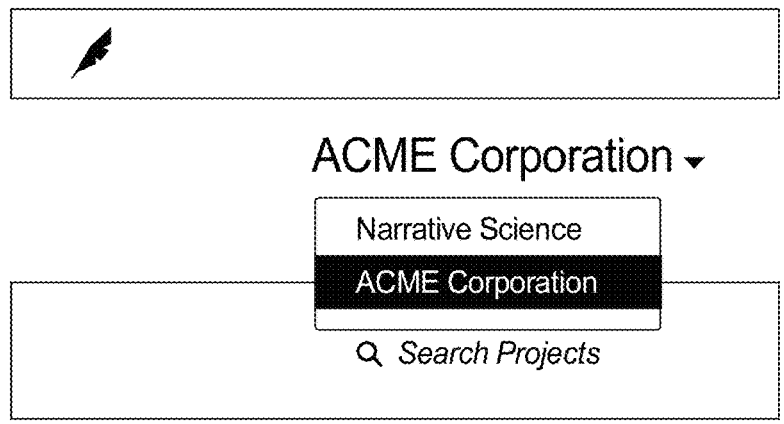

Members only see the Organizations they have access to in the Organization dropdown and can toggle between them there (see FIG. 29).

Site Administrators can use the Organization dropdown to switch between Organizations or from the Organizations page. Each Organization will have a dashboard listing Projects and People.

Figure 30:
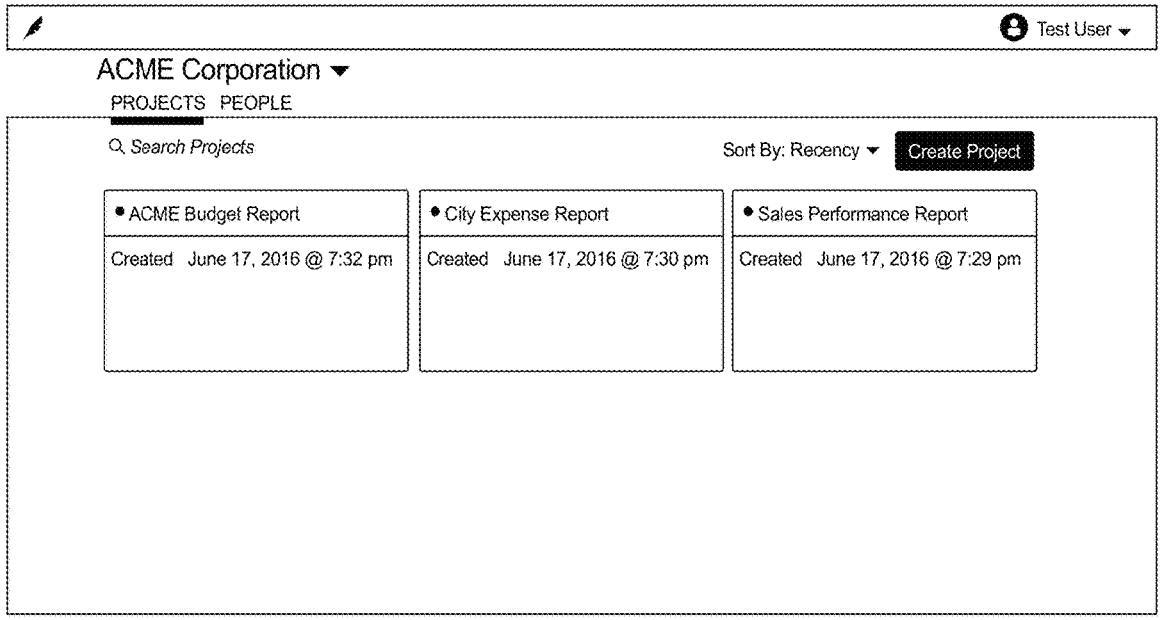

FIG. 30 shows where Organization Administrators and Members may create Projects, but only Organization Administrators may create Users. Both Organization Administrators and Members may add Users to Projects and set their permissions. For both Administrators and Members, Quill will show the most recent Organization when first opened.

A2(ii)(b): Creating Users

Figure 31:
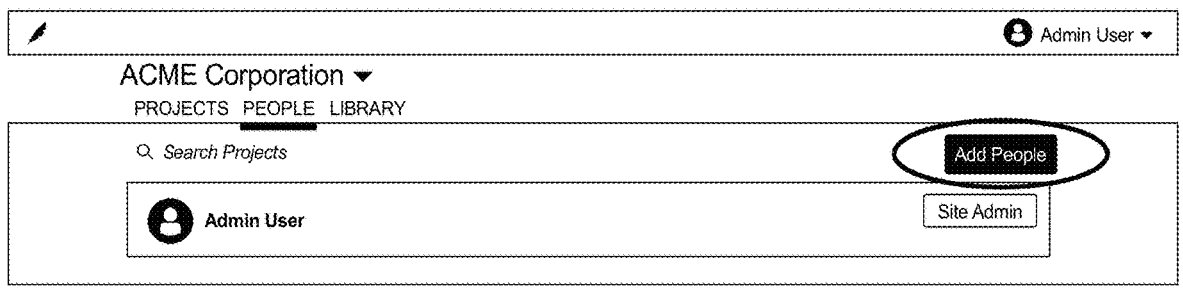
Figure 32:
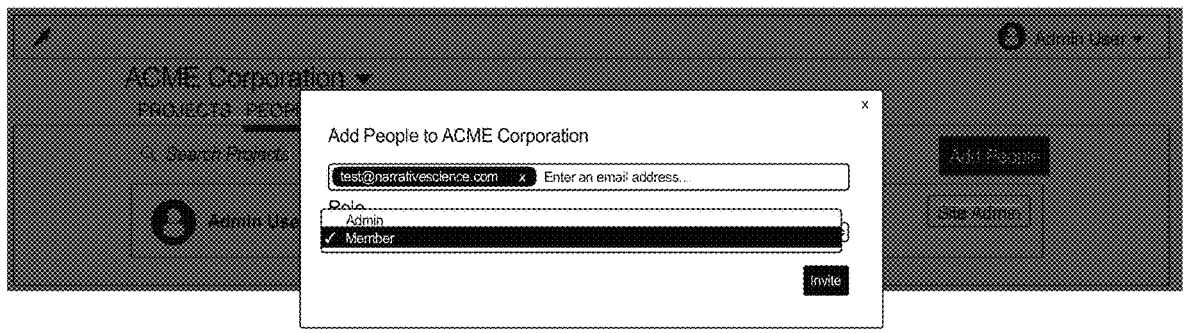

Only an Administrator (both Site or Organization) may create a User (see FIG. 31). Users can be added to Organizations as Administrators or Members (see FIG. 32).

Administrative privileges cascade through the structure of Quill. (See Permission Structure in the Miscellaneous section for more information.) That is to say, an Administrator at the Organization level has Administrative privileges at the Project level as well. The Project permissions of Members are set at the Project level.

Figure 33:
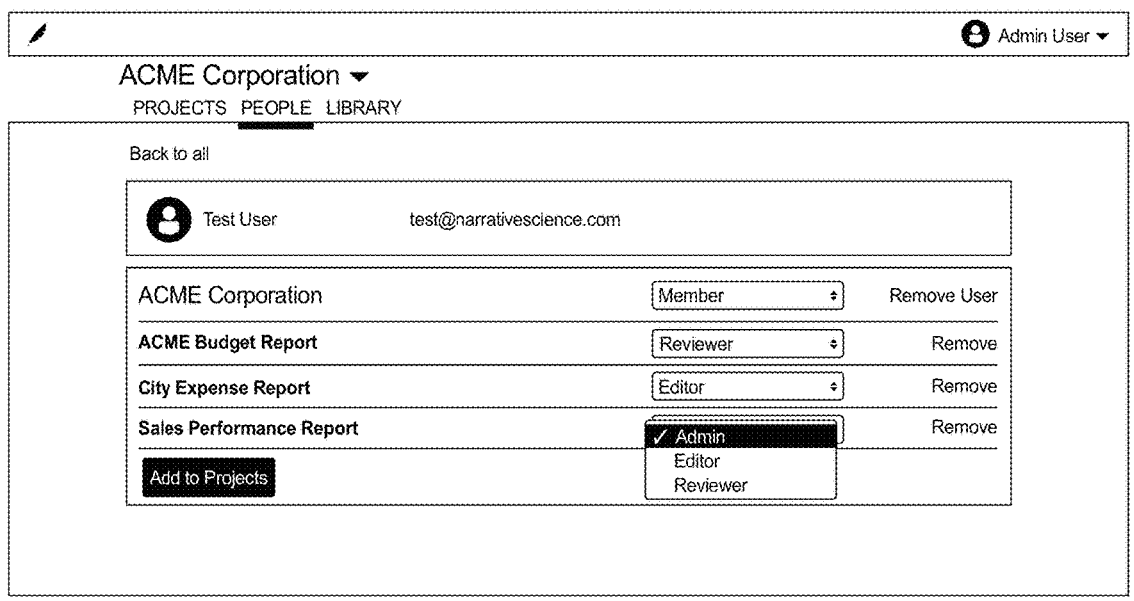

At the Project level, a user can be an Administrator, an Editor, or a Reviewer (see FIG. 33).

An Administrator on a Project has full access, including all aspects of Authoring, sharing, drafts and publishing, and the ability to delete the Project. An Editor has access to Authoring but cannot share, publish and create a new draft, or delete the Project. A Reviewer only has access to Live Story in Review Mode. A user's access to a Project can be edited on the People tab of the Organization dashboard.

A2(iii): Creating Projects

Figure 34:
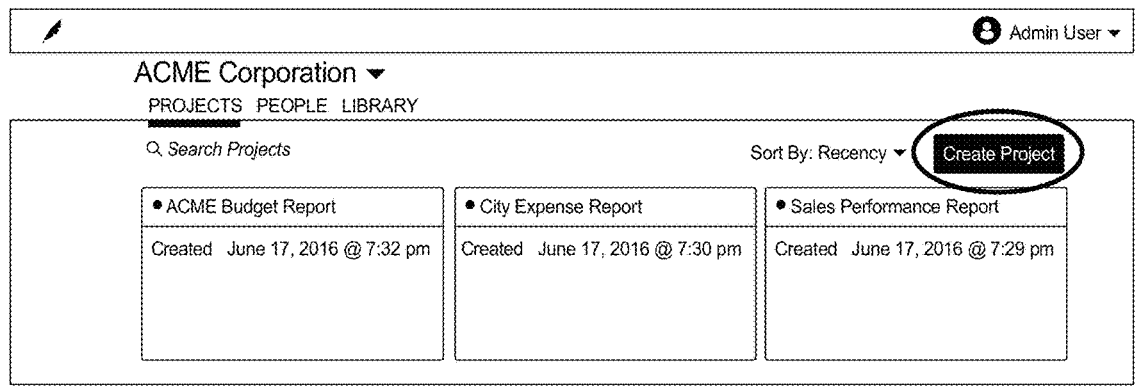

Both Administrators and Members can create Projects from the Organization dashboard (see FIG. 34).

Figure 35:
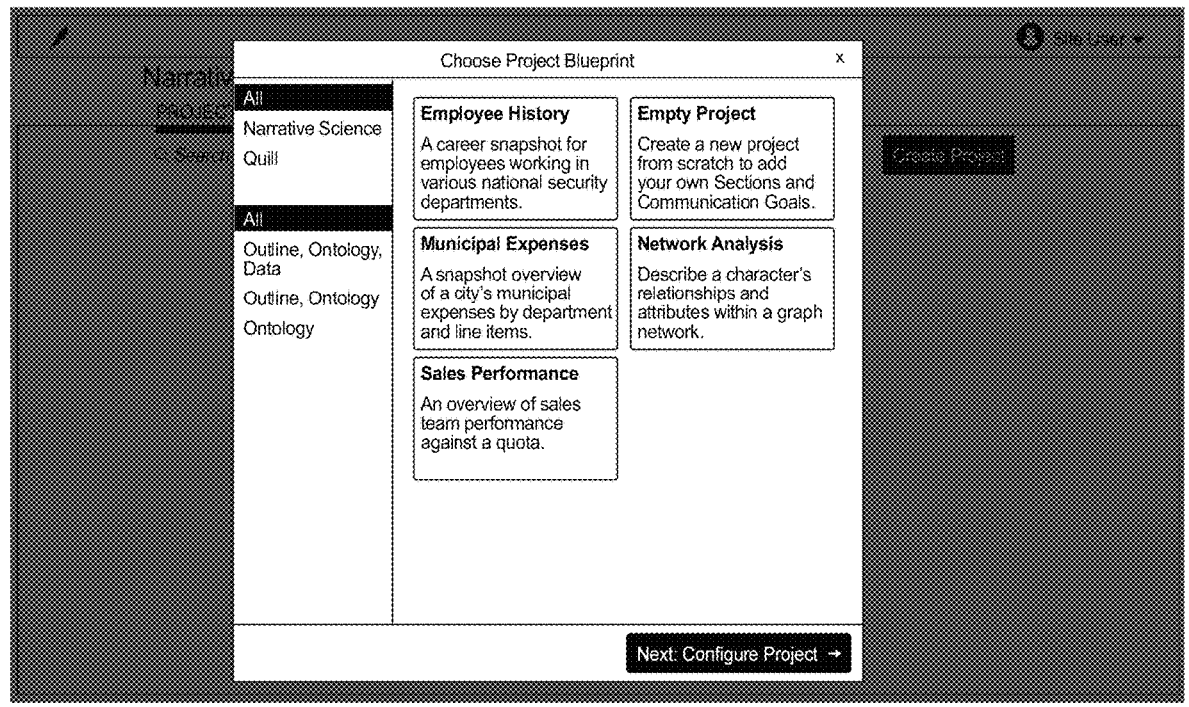

The creator of a Project is by default an Administrator. When creating a new Project, select from the list of blueprint options whether it will be an Employee History, Empty Project, Municipal Expenses, Network Analysis, or a Sales Performance report (see FIG. 35).

Figure 36:
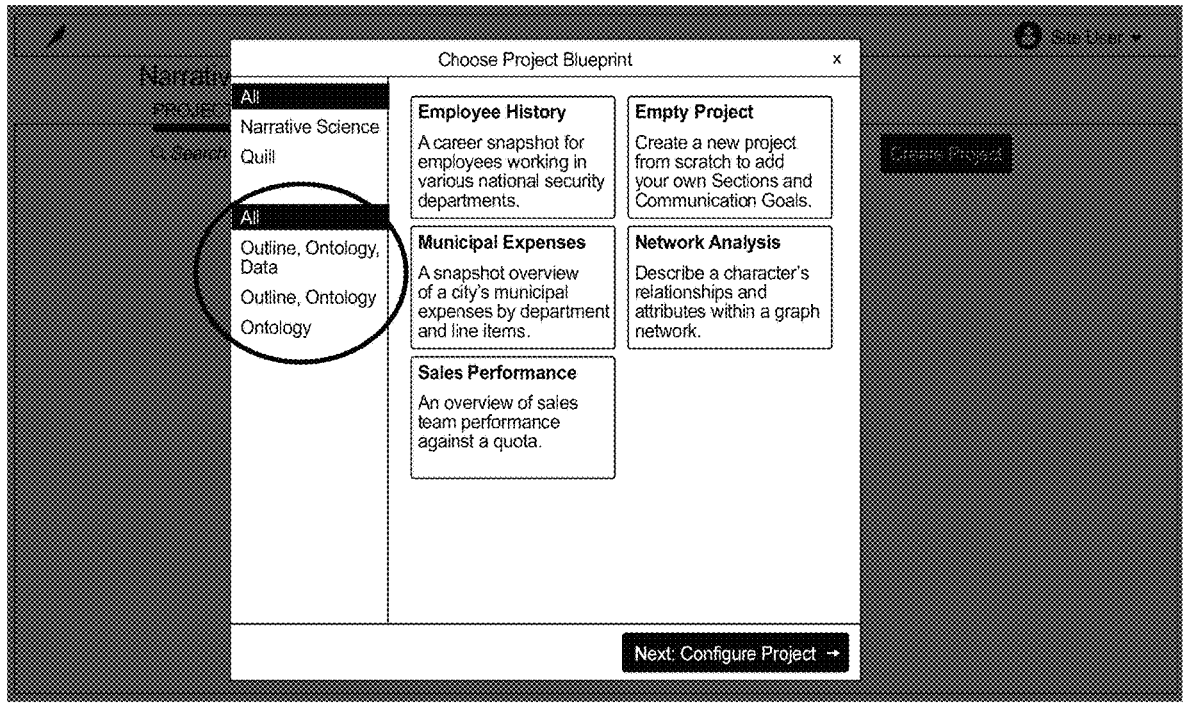

This is also where you can access shared components of existing projects which members of an Organization have elected to share for reuse by other Organization members. As shown by FIG. 36, you can filter them based on what parts of them have been shared: Outline, Ontology, and Data Sources; Outline and Ontology; and Outline. (Refer to the Sharing and Reuse section for additional information.)

Figure 37:
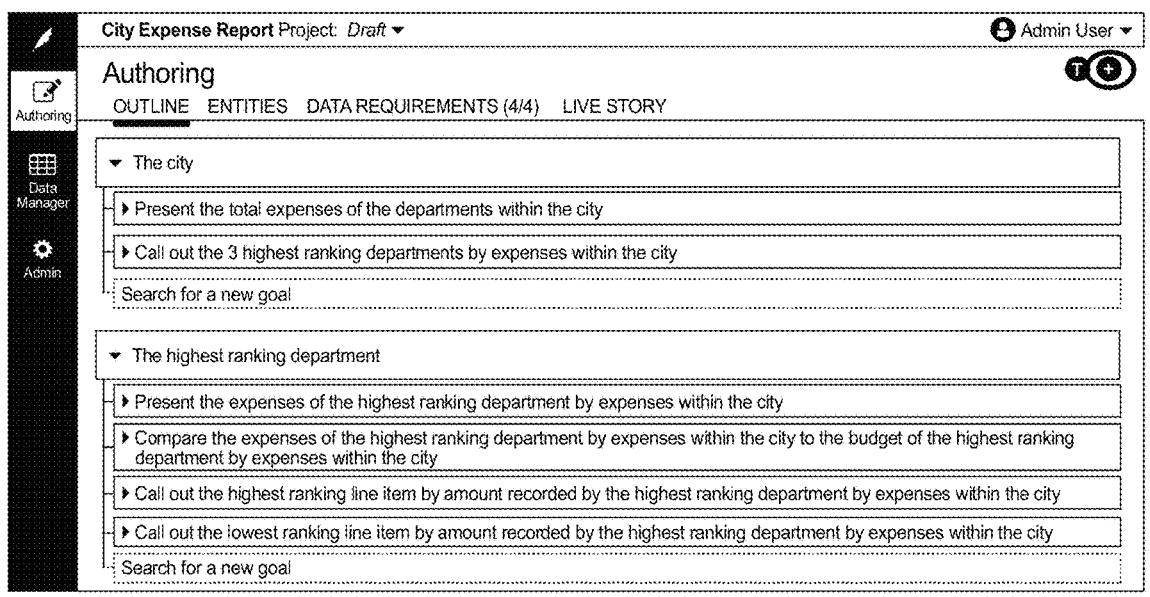

An Empty Project allows the user to configure a Project from the ground up, and a Sales Performance Report provides the framework to configuring a basic version of a sales performance report. A user can be added to a project by clicking the plus symbol within a project (see FIG. 37) and adding them by user name. To add a user to a Project, the user should be a member of the Organization.

Figure 38:
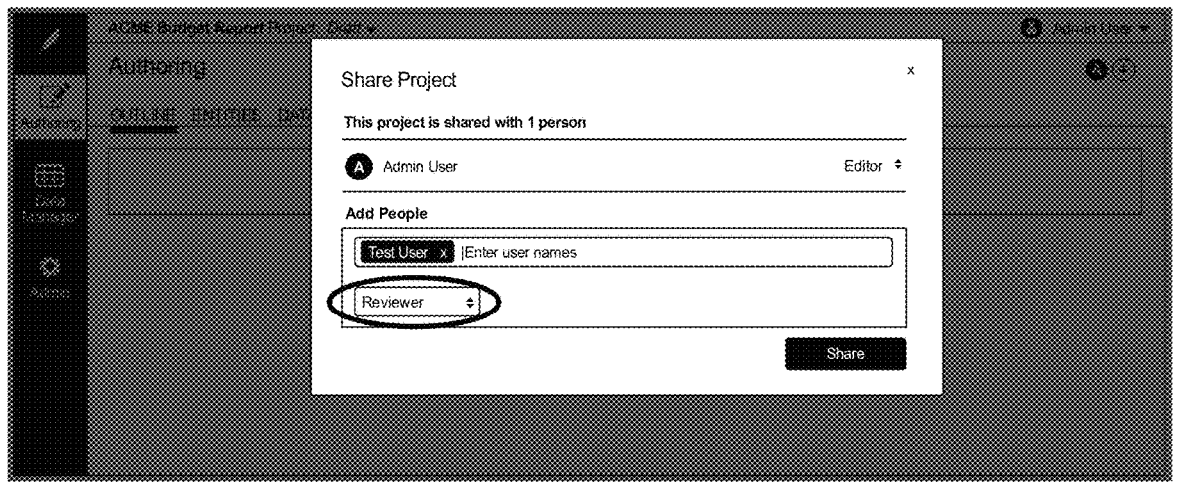

You can set Project level permissions using the dropdown menu (see FIG. 38).

Figure 39:
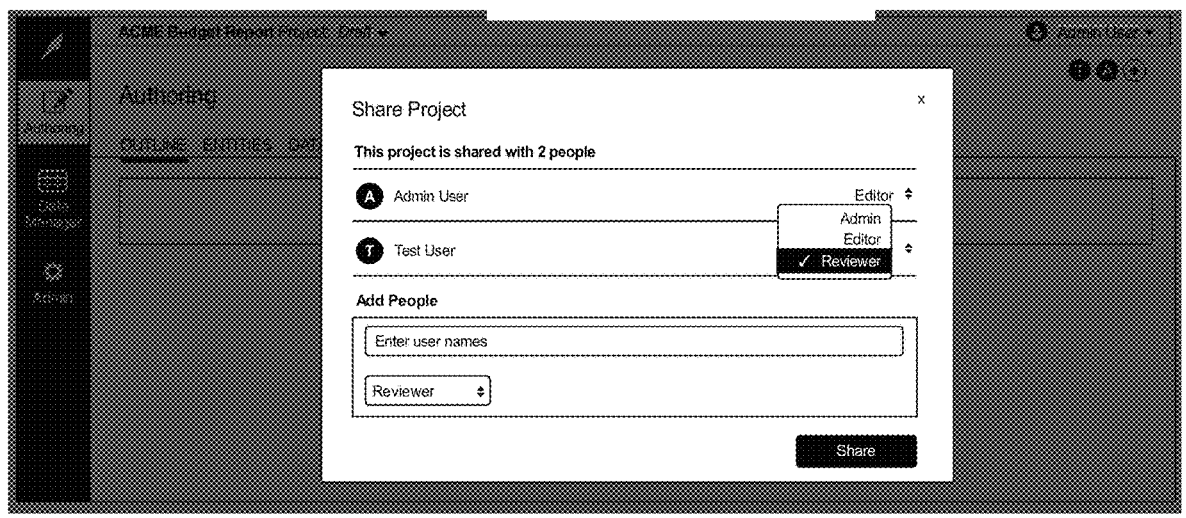

You can edit permissions and remove users here as well (see FIG. 39).

Figure 40:
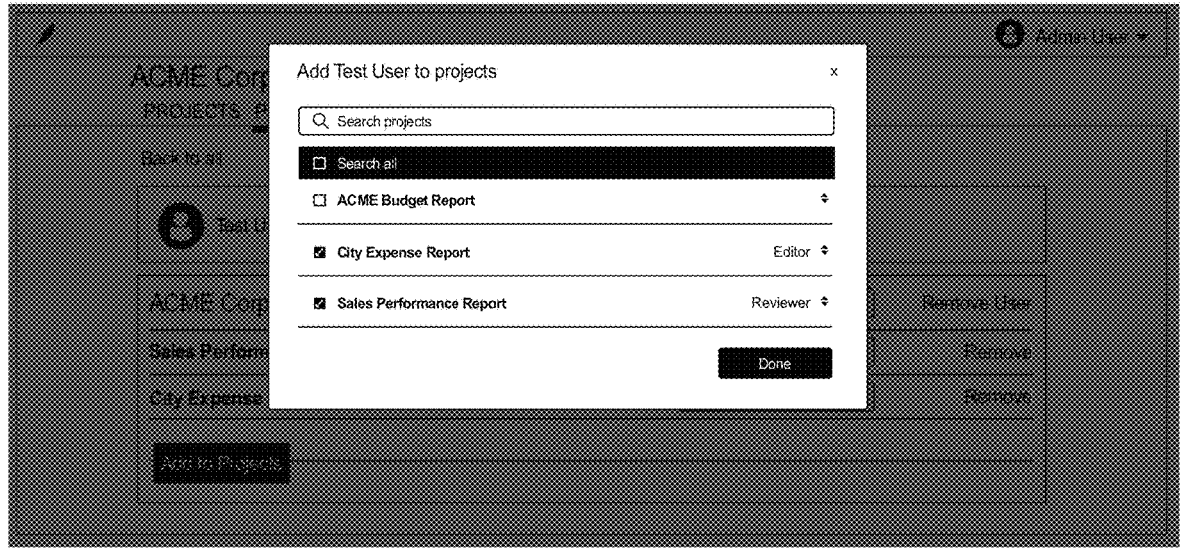

Users can also be added to Projects from the People tab of the Organization dashboard (see FIG. 40).

Figure 41:
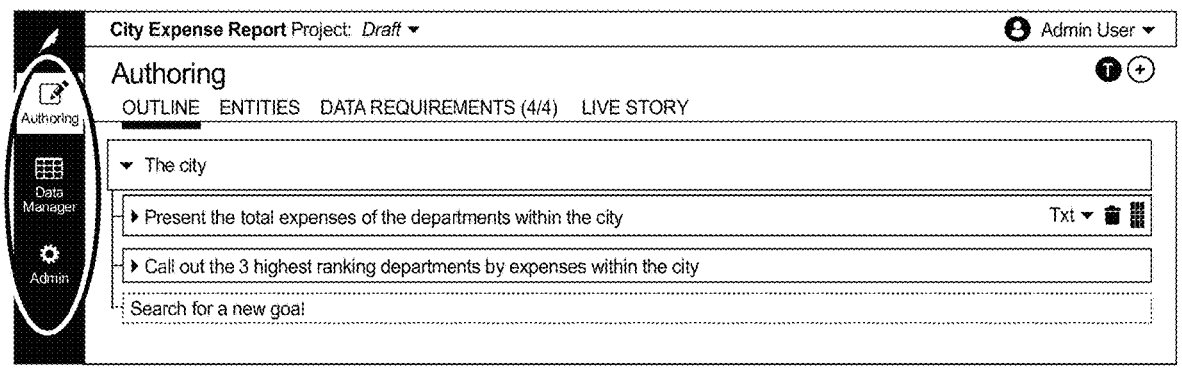

Each Project includes Authoring, a Data Manager, and Admin (see FIG. 41).

Authoring is where the narrative gets built and refined; the Data Manager is where the data for the story is configured; and Project Administration is where Monitoring, the Change Log, API documentation, Project Settings, and Scheduling are located.

A2(iii)(a): Authoring

Figures 42, 43:
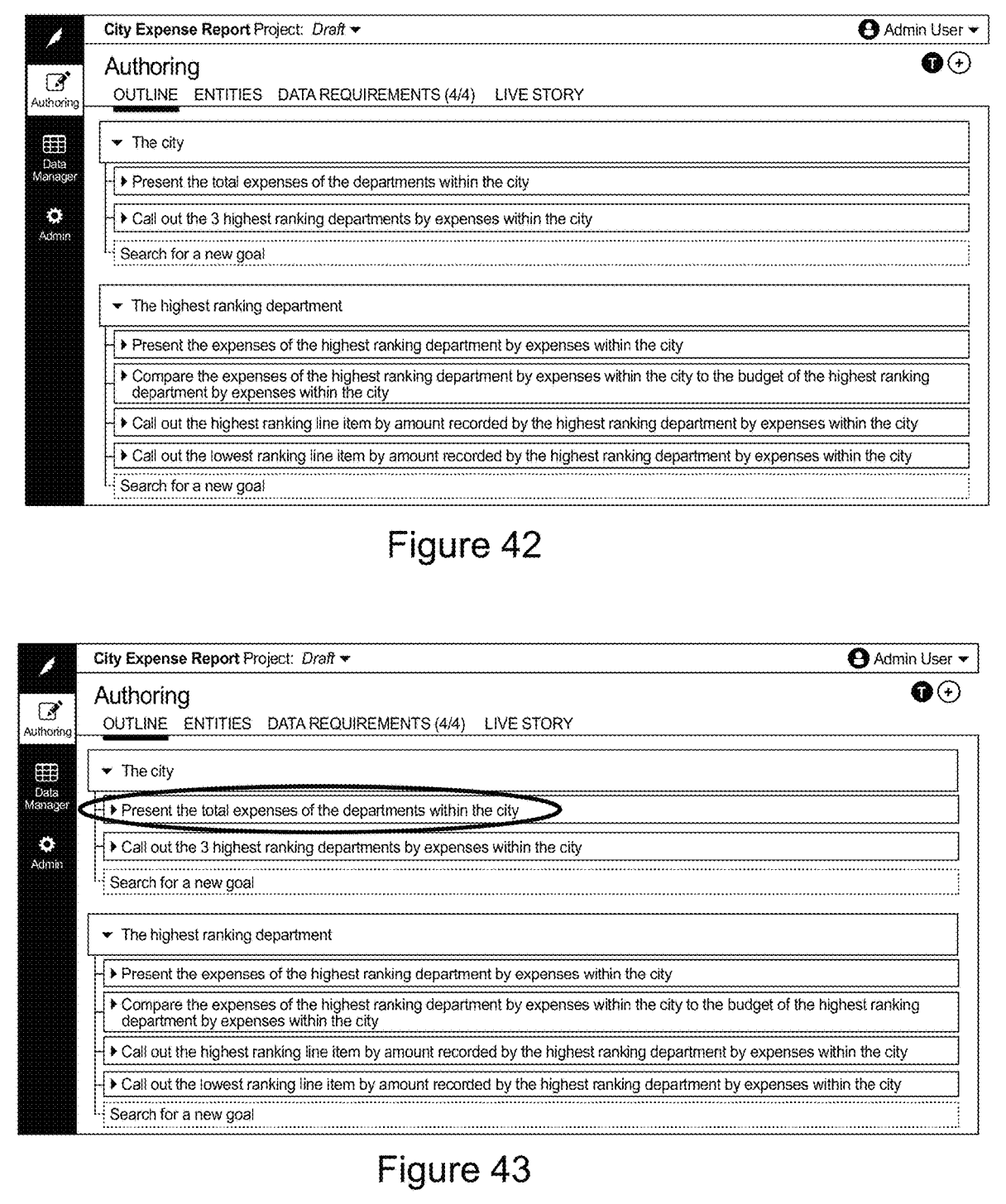

The main view in Authoring is the Outline, as shown by FIG. 42.

The Outline is where the narrative is built. Sections can be added to provide structure and organization to the story (see FIG. 43).

Figure 44:
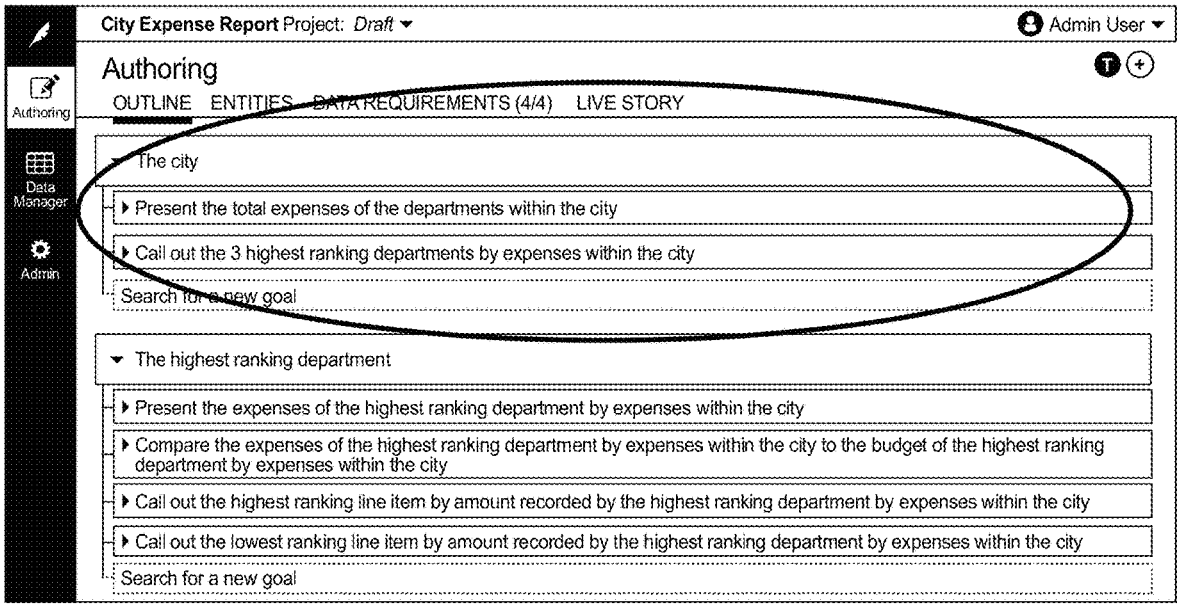

Communication Goals are then added to a Section (see FIG. 44).

Communication Goals are one of the main underpinnings of Quill. They are the primary building blocks a user interacts with to compose a story.

Figure 45:
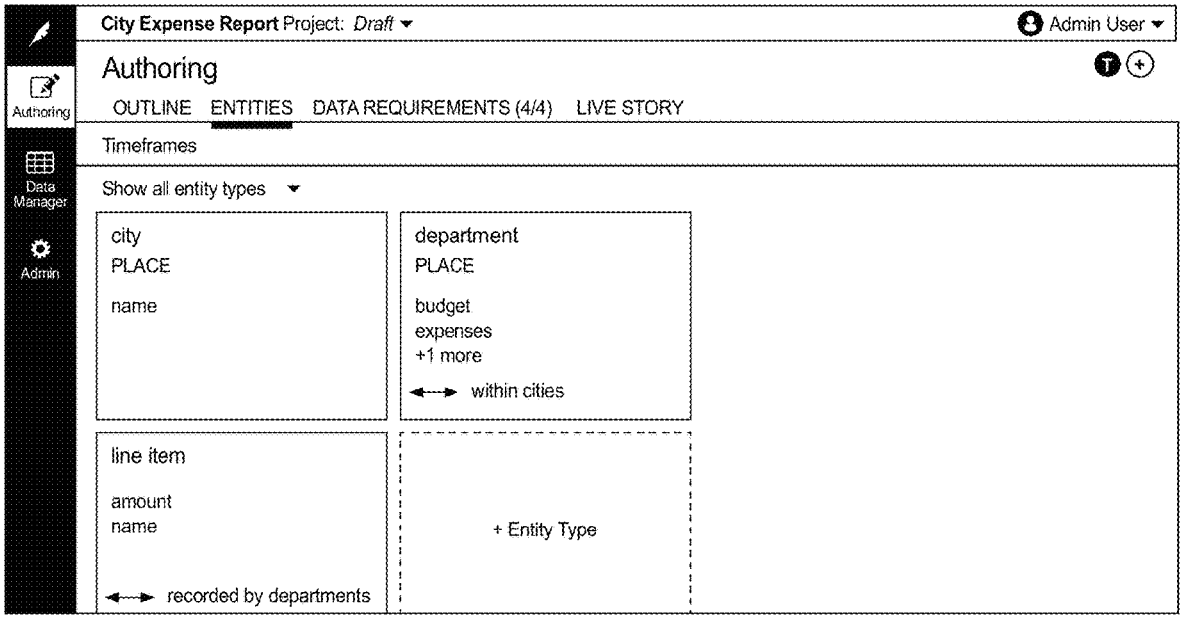

Authoring is also where Entities are managed (see FIG. 45).

An Entity is any primary "object" which has particular Attributes. It can be set to have multiple expressions for language variation within the narrative or have Relationships to other Entities for more complex representations. All of these things comprise an Ontology.

Data Requirements are how the data that supports a story is mapped to the various story elements.

Based on the Communication Goals in the Outline, the Data Requirements tab will specify what data points it needs in order to generate a complete story (see FIG. 46).

Live Story is a means of reviewing and editing a story generated from the Outline.

It has two modes, Review mode and Edit mode. Review mode allows the user to see a complete narrative based on specific data parameters (see FIG. 47). Edit mode allows the user to make changes to the story (see FIG. 48).

Drafts and Publishing are Quill's system of managing versions of your story (see FIG. 49).

This is how you publish your story configurations and keep a published version as read-only in order to request stories through the API or via the Scheduler. Each Project can only have one draft and one published version at a time.

A2(iii)(b): Data Manager

Figure 50:
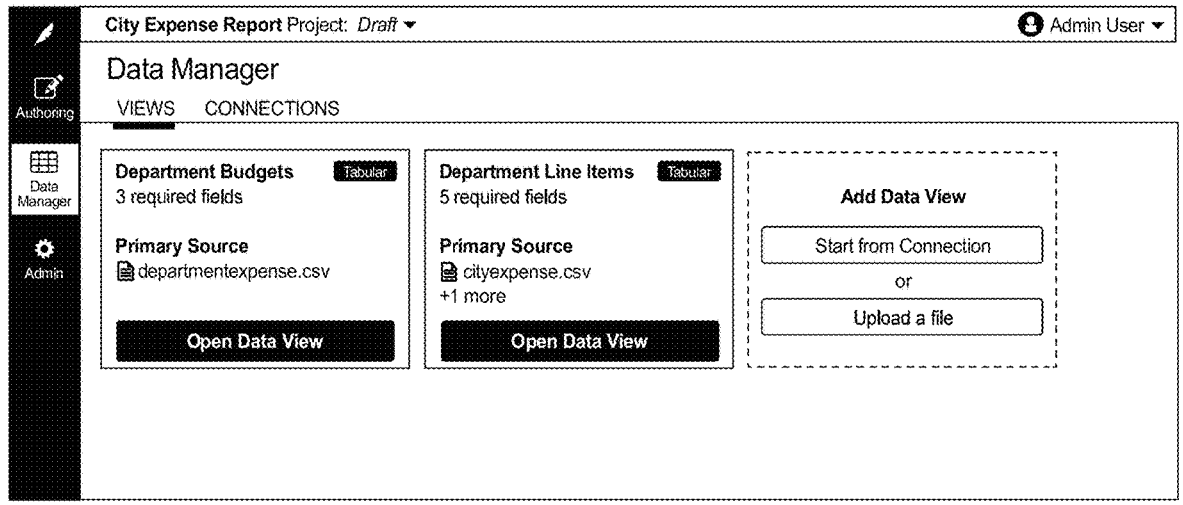
Figure 51:
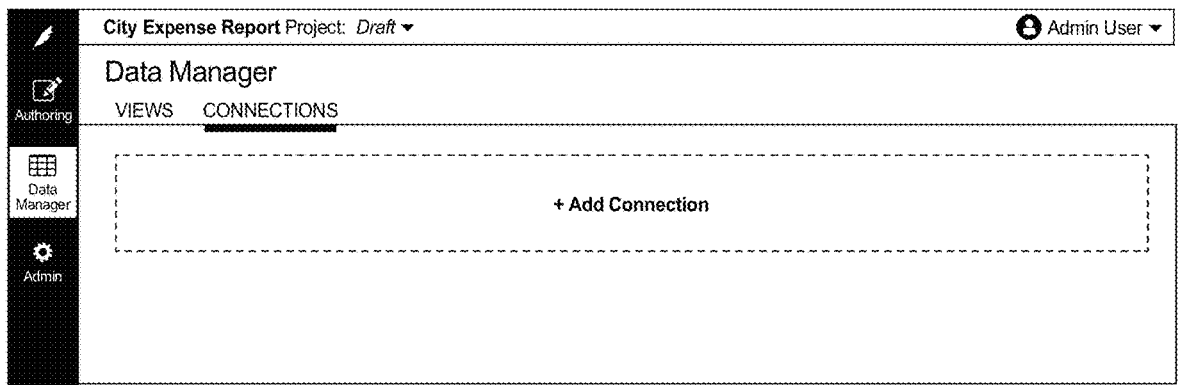

The Data Manager is the interface for adding the database connections or uploading the files that drive the story (see FIGS. 50 and 51).

A2(iii)(c): Project Administration

The Project Administration features of Quill are Monitoring, the Change Log, API documentation, Project Settings, and Scheduling. They are located in the Admin section of the Project.

Figures 52, 53:
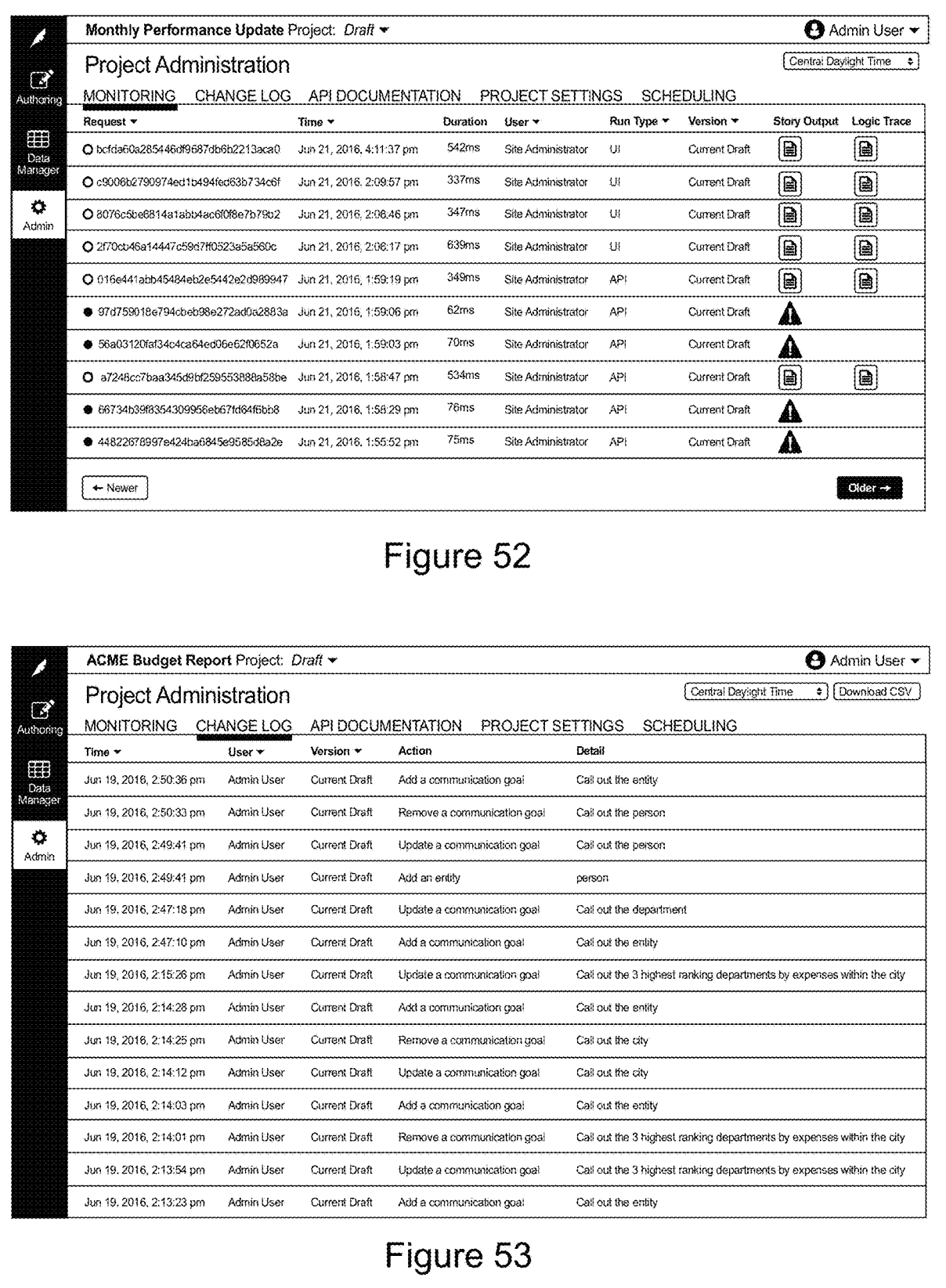

Monitoring allows the user to see the status (success or failure) of generated stories (see FIG. 52). Stories run through the synchronous API or generated in Live Story will be listed here and can be filtered based on certain criteria (e.g. date, user).

The Change Log tracks changes made to the project (see FIG. 53).

Figures 54, 55:
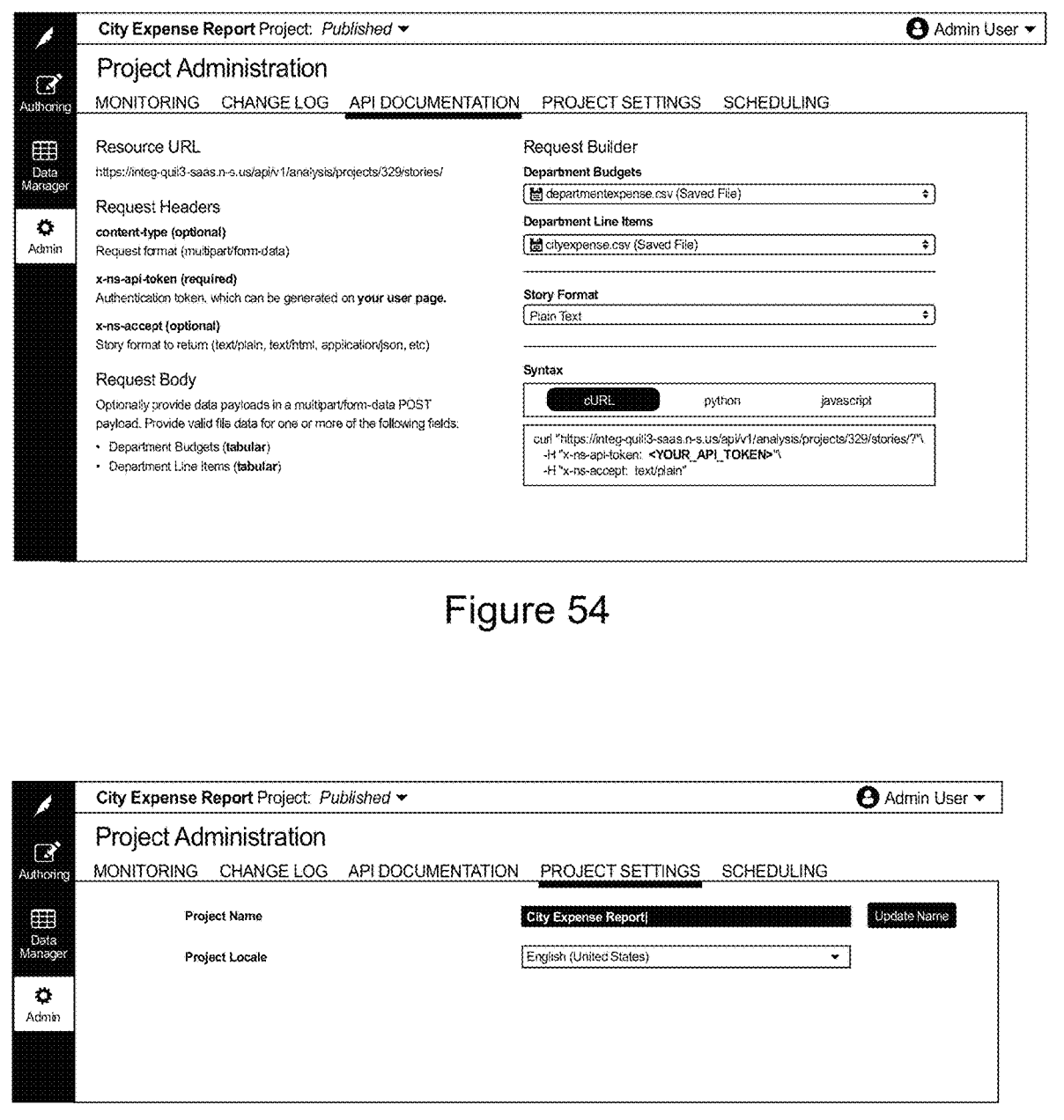

Quill supports on-demand story generation through synchronous API access (see FIG. 54).

Project Settings are where you can change the name of the Project and set the project locale (see FIG. 55). This styles any currencies in your Project to the relevant locale (e.g. Japanese Yen).

Figure 56:
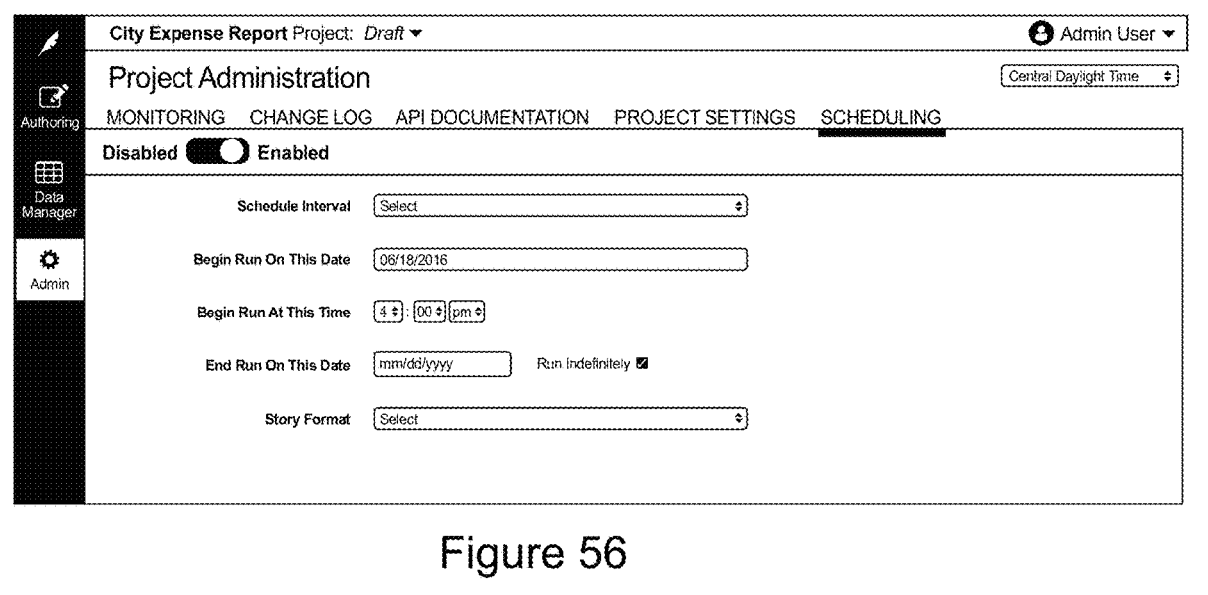

You can set your story to run at regular intervals in Scheduling (see FIG. 56).

A3: Configure a Story from a Blueprint

The benefit of configuring a story from a project blueprint is the ability to reuse Sections, Communication Goals, Data Views, and Ontology as a starting point. These blueprints are available in the Create Project screen as discussed in the Getting Started section.

A3(i): Configure a Sales Performance Report

Figure 57:
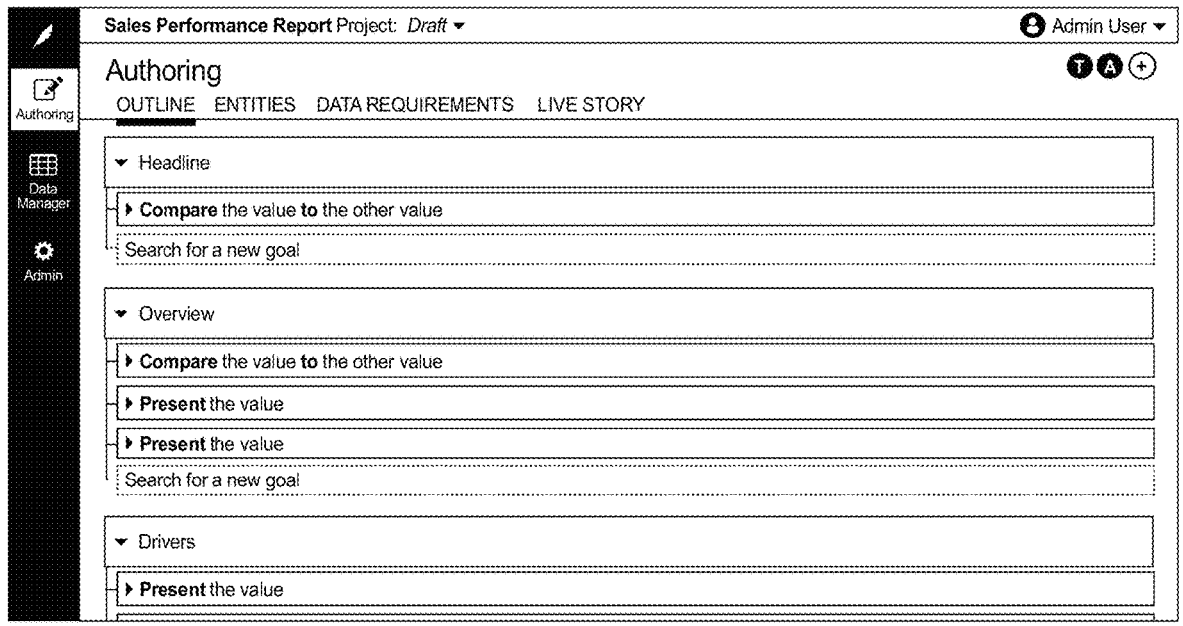

Select the Performance Project Blueprint and give your project a name. You can always change this later by going to Admin>Project Settings. After the project is created, you'll be taken to Authoring and presented with an Outline that has a "Headline", "Overview", and "Drivers" sections with associated Communication Goals within them (see FIG. 57).

A3(i)(a): Headline

Figure 58:
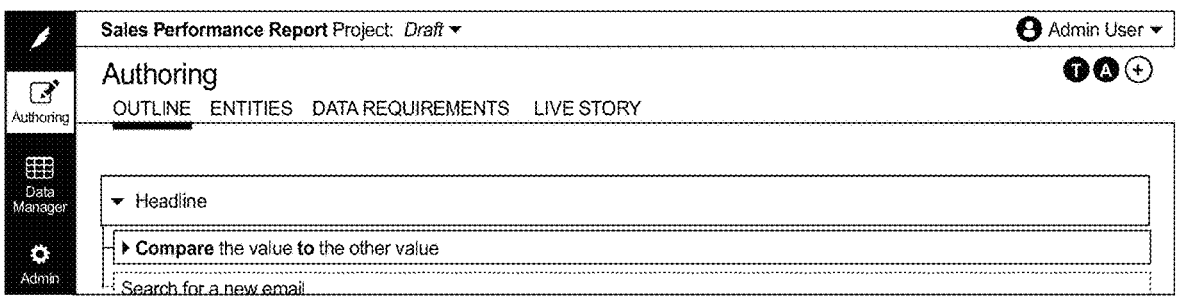

To begin, set the Attributes in the Communication Goal in the Headline. Select "the value" (see FIG. 58) to open a sidebar on the right side of the screen.

Figure 59:
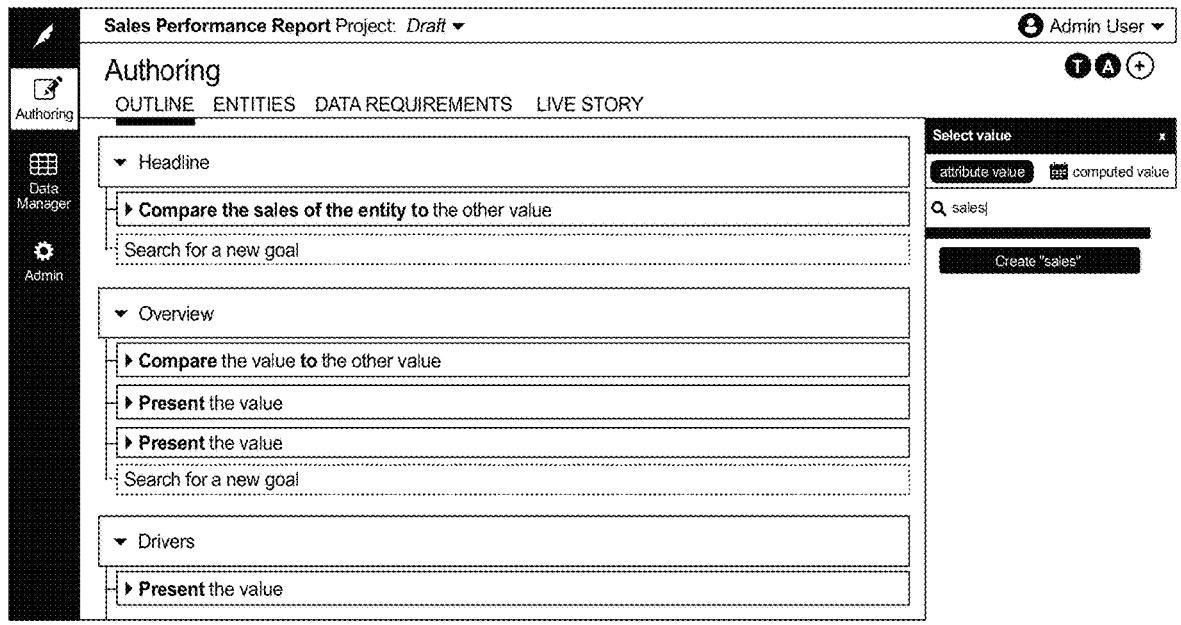
Figure 60:
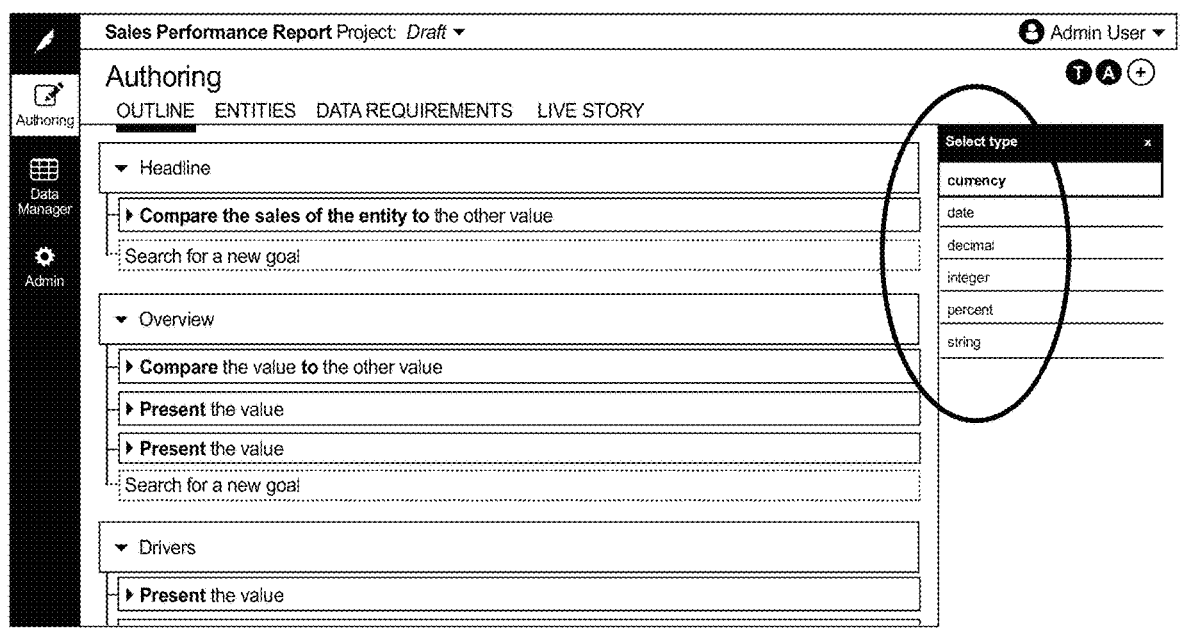
Figure 61:
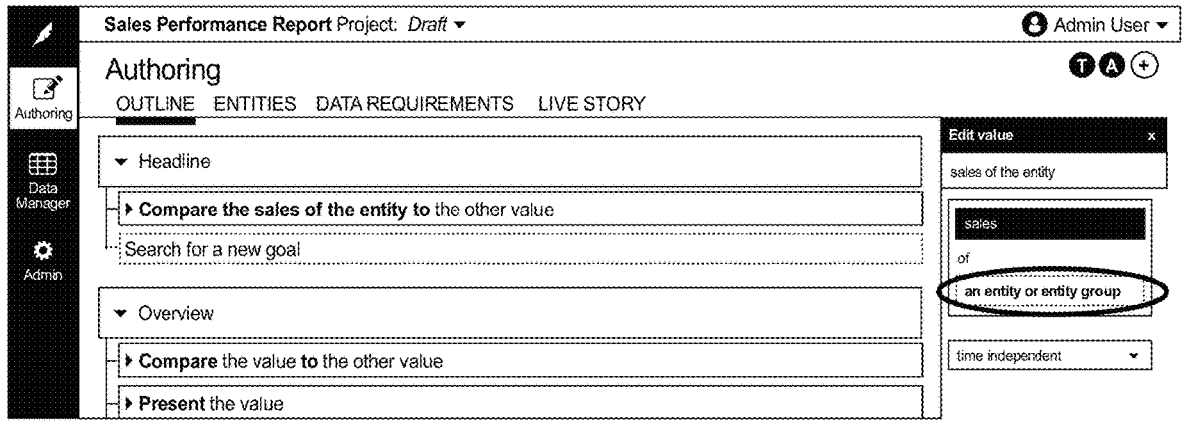

Create an Attribute by entering "sales" and clicking "Create "sales" (see FIG. 59).

Then specify "currency" from the list of Attribute types (see FIG. 60).

The next step in Attribute creation is to associate the Attribute with an Entity type. Since there are no existing Entity types in this blank Project, you'll have to create one (see FIG. 61).

Figure 62:
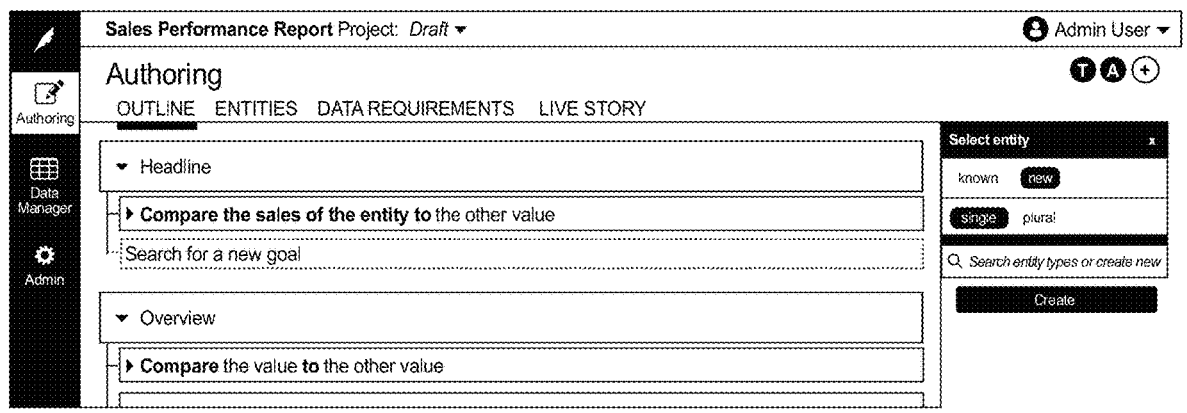

Click "an entity or entity group" to bring out the Entity type creation sidebar (see FIG. 62).

Figure 63:
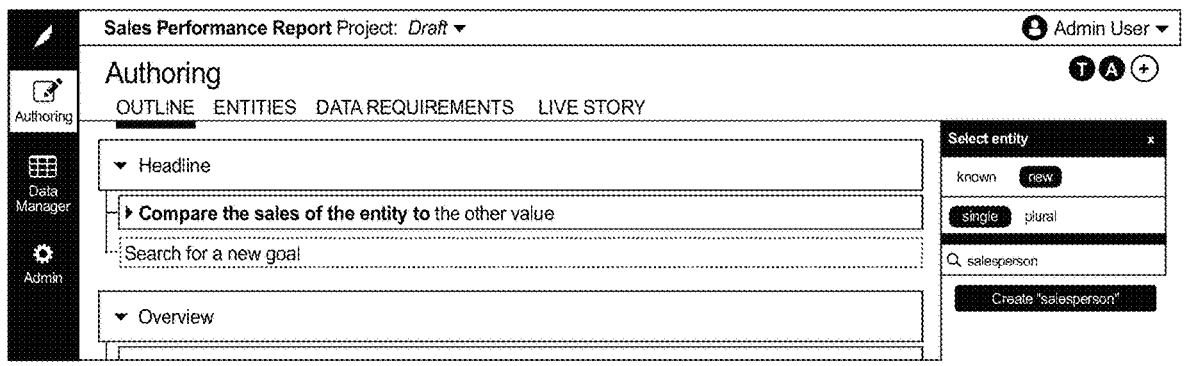

Name the Entity type "salesperson" and click to create "salesperson" (see FIG. 63).

Figure 64:
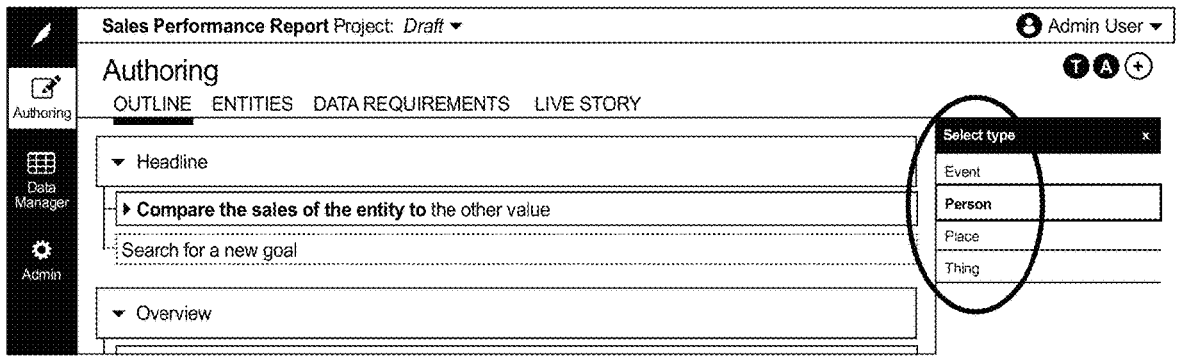
Figure 65:
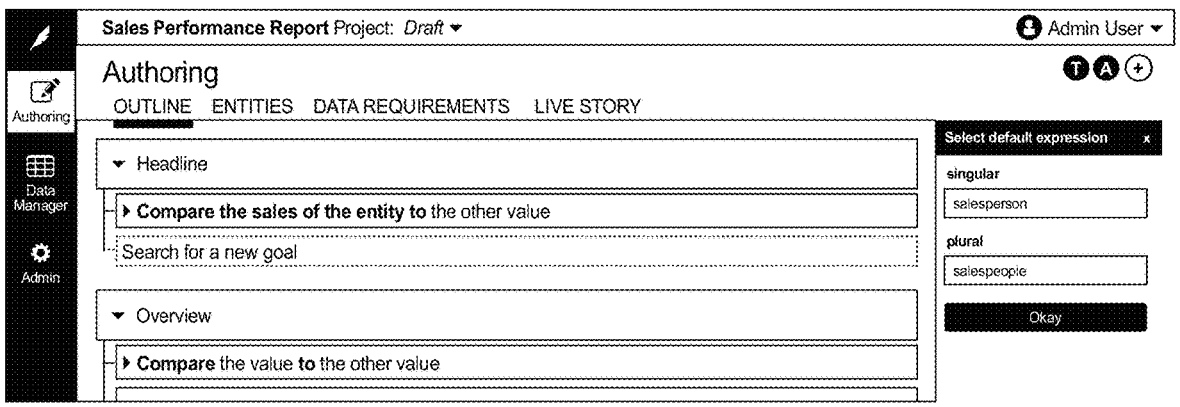

Set the base Entity type to Person (see FIG. 64).

Quill will make a guess at the singular and plural expressions of the Entity type. Make corrections as necessary and click "Okay" (see FIG. 65).

Figure 66:
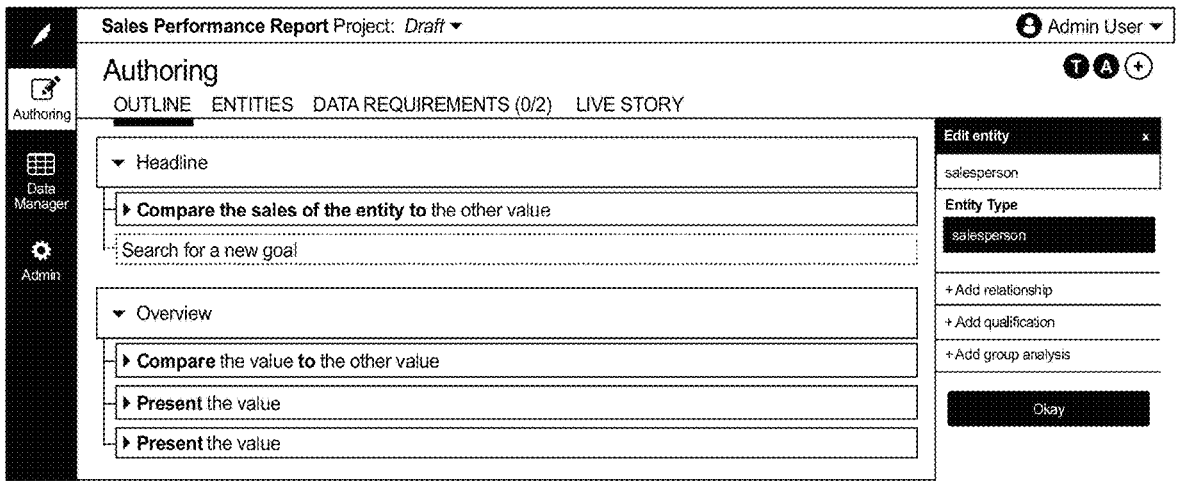

There are no designations on the Entity type you created, so click "Okay" to return to the Attribute editing sidebar (see FIG. 66). A designation modifies the Entity type to specify additional context such as relationships to other Entity types or group analysis.

Once an Entity type is created, it will be available for selection throughout the project. Additional Entity expressions can be added in the Entities tab (see Ontology Management).

Figure 67:
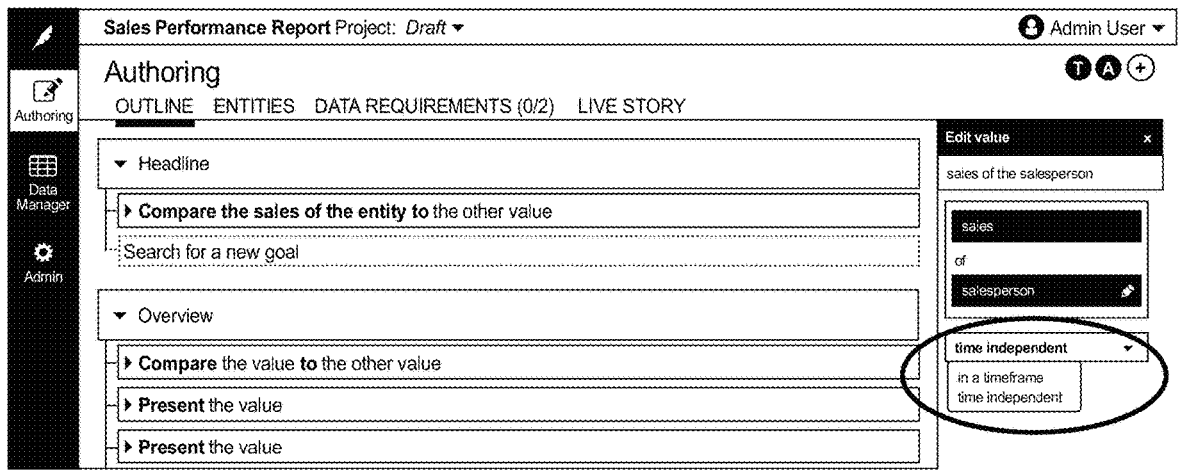

Next, you'll specify a Timeframe for the Attribute (see FIG. 67).

Figure 68:
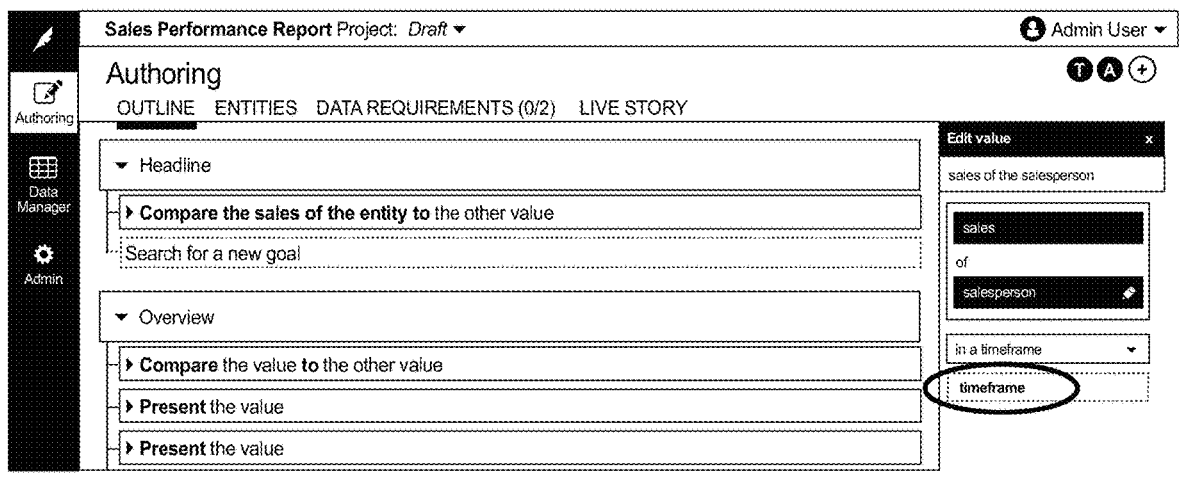
Figure 69:
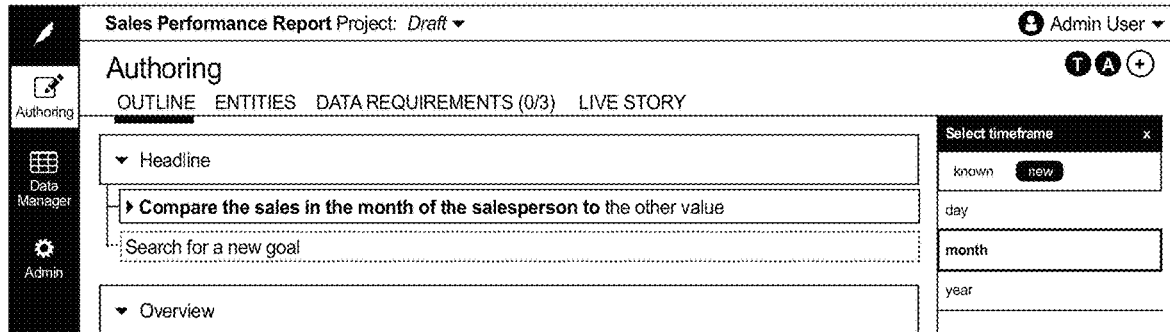

Click "Timeframe" to create a new Timeframe (see FIG. 68).

Figure 70:
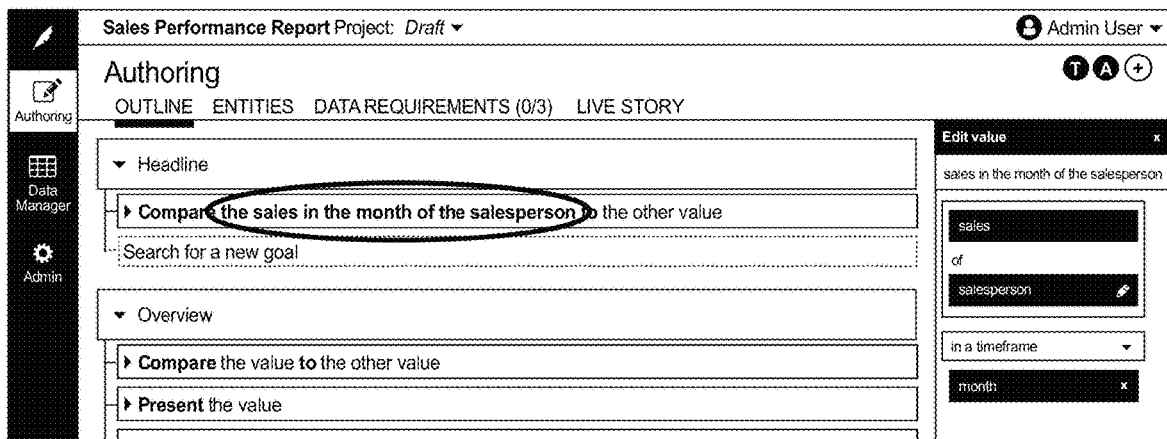

Choose Month (see FIG. 69) to complete the creation of the Attribute (see FIG. 70).

Figure 71:
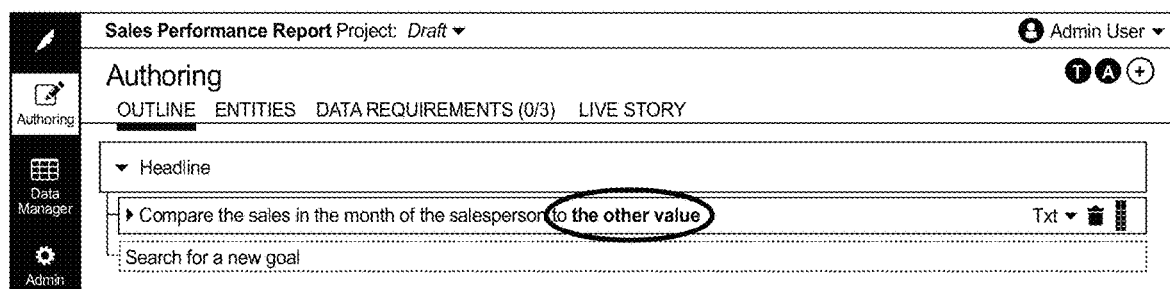

Click "the other value" to set another Attribute (see FIG. 71).

Figure 72:
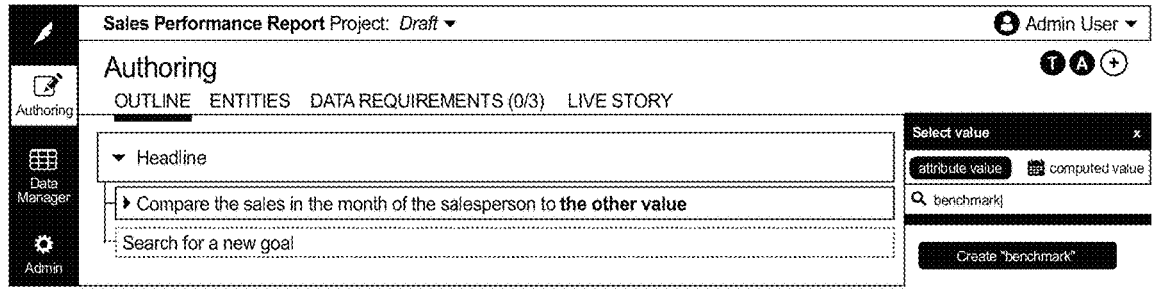
Figure 73:
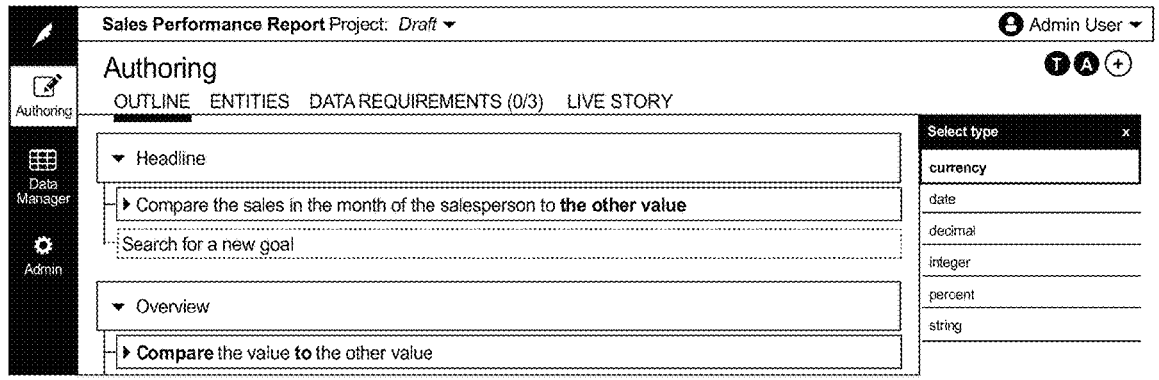

Name it "benchmark" (see FIG. 72) and set its type to "currency" (see FIG. 73).

Figure 74:
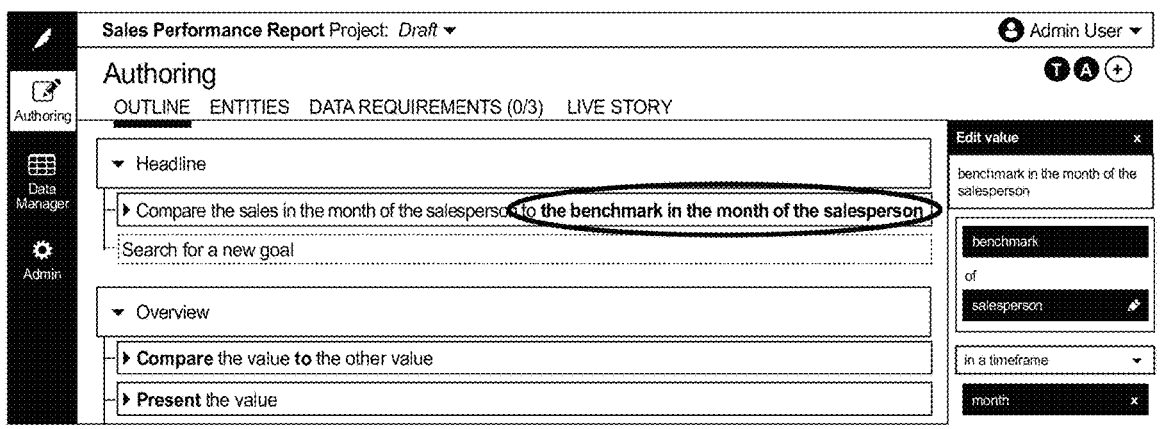

Associate it with the Entity type "salesperson" and set it to be in the "month" Timeframe (see FIG. 74).

Click on the arrow to the left of the Communication Goal in the headline section (see FIG. 75) to expose the list of related goals.

The bottom related goal is the Characterization (see FIG. 76).

Figure 77:
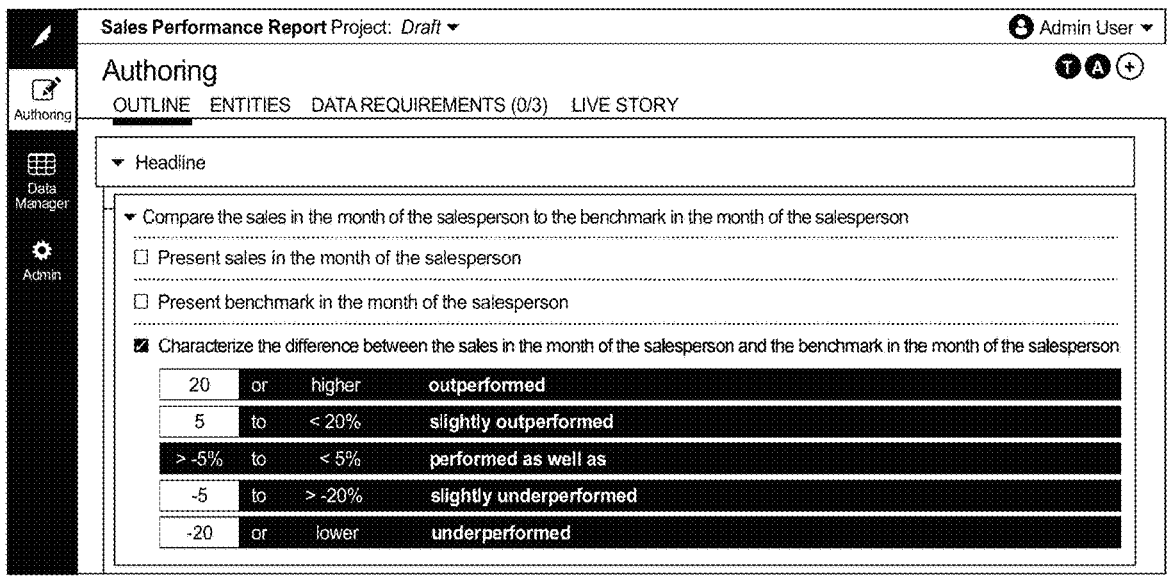

Check the box to opt in to the Characterization (see FIG. 77).

Quill has default thresholds to determine the comparative language for each outcome.

Figures 78, 79:
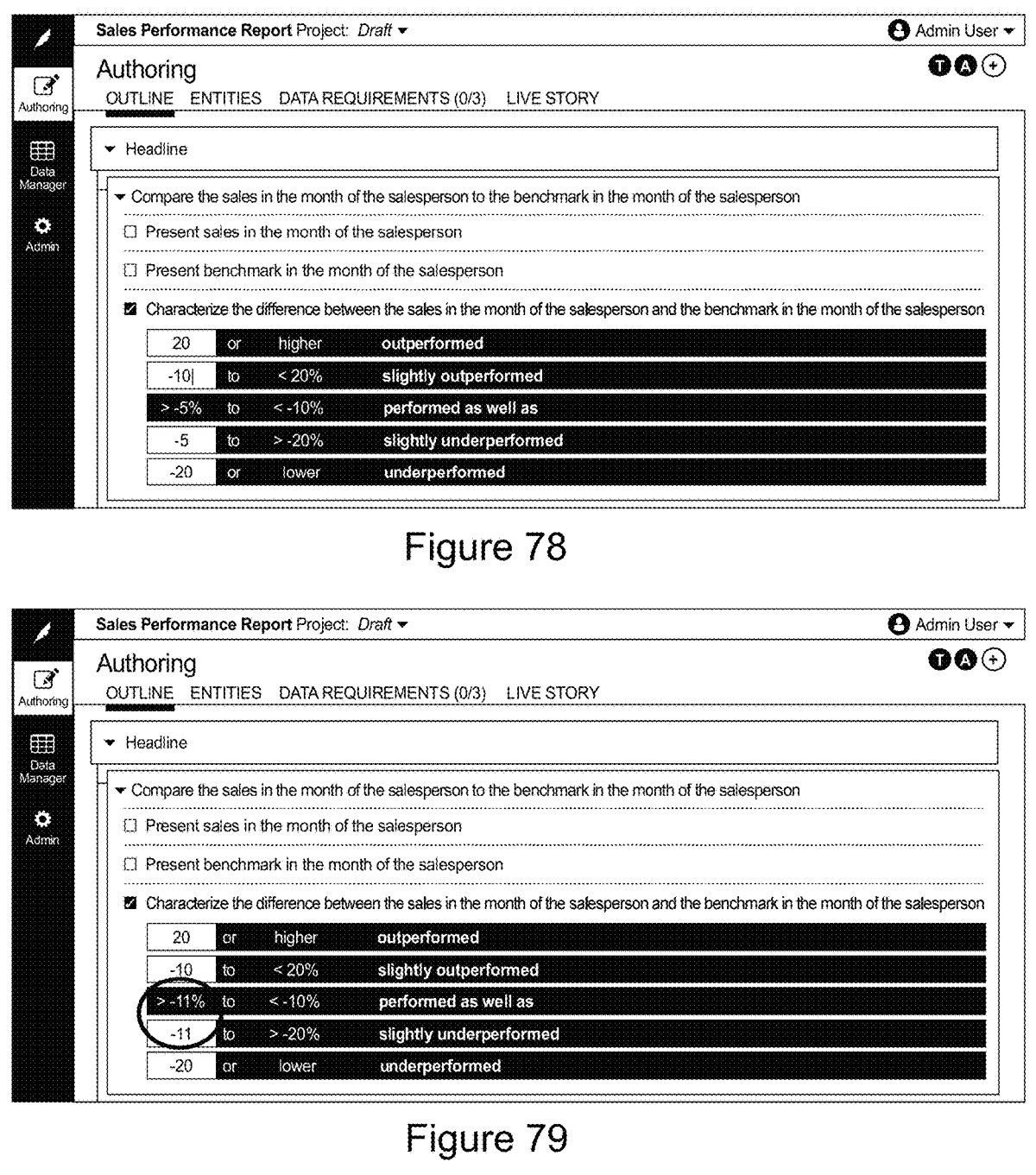

Entering different values into the boxes (see FIG. 78), with each value being percentage comparisons calculated against your data view, can change these thresholds (see FIG. 79). As such, these comparisons are done against numerical Attribute Values. If a value is changed to be less than the upper bound or greater than the lower bound of a different outcome, Quill will adjust the values so that there is no overlap.

A3(ii)(b): Overview

Configure the first Communication Goal in the Overview section (see FIG. 80) using the same steps as for the Communication Goal in the Headline section.

Figures 80, 81:
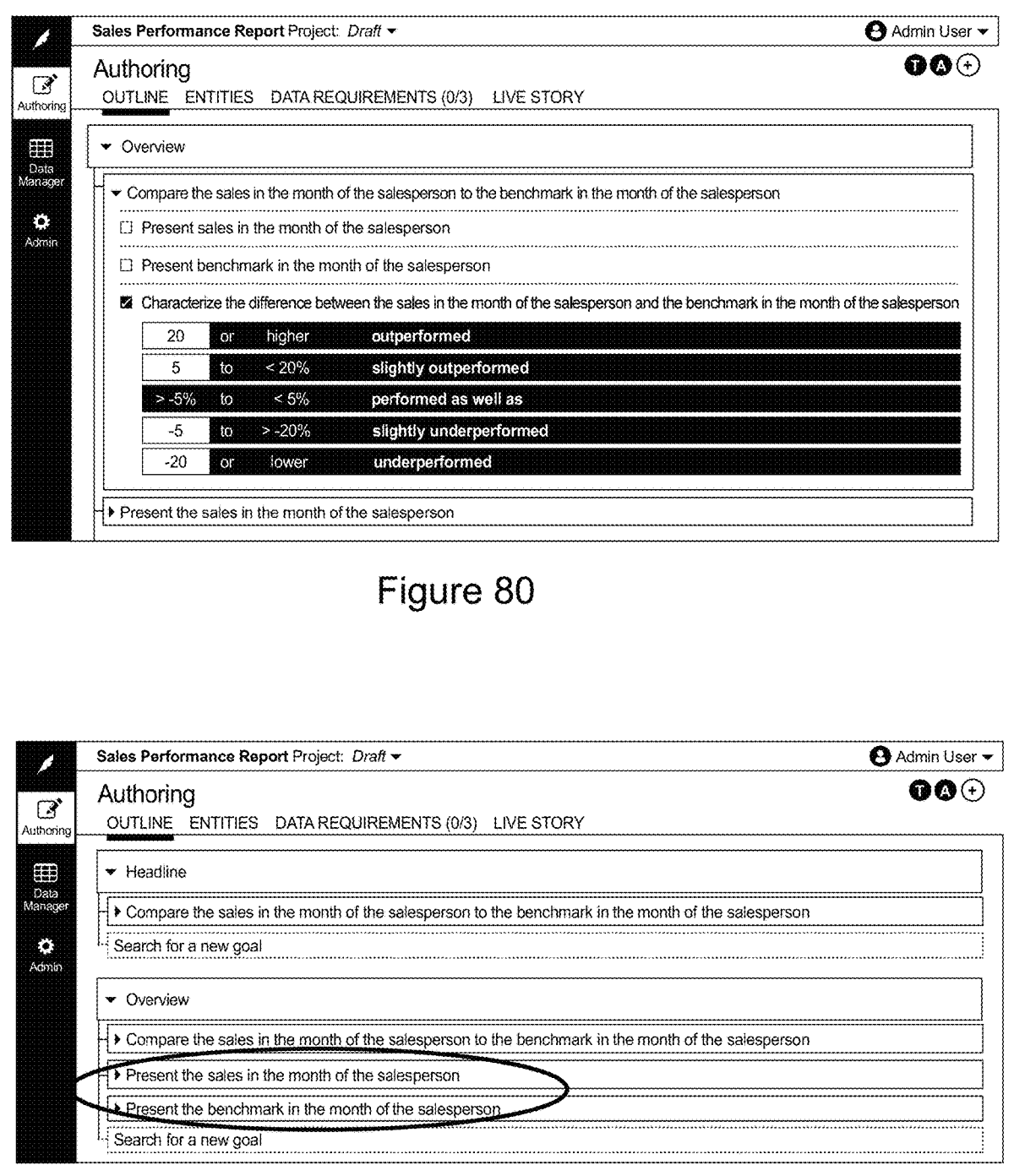

Set the Attribute of the first "Present the value" Communication Goal to be "sales in the month of the salesperson," and the Attribute of the second "Present the value" Communication Goal to be "benchmark in the month of the salesperson" (see FIG. 81).

Figure 82:
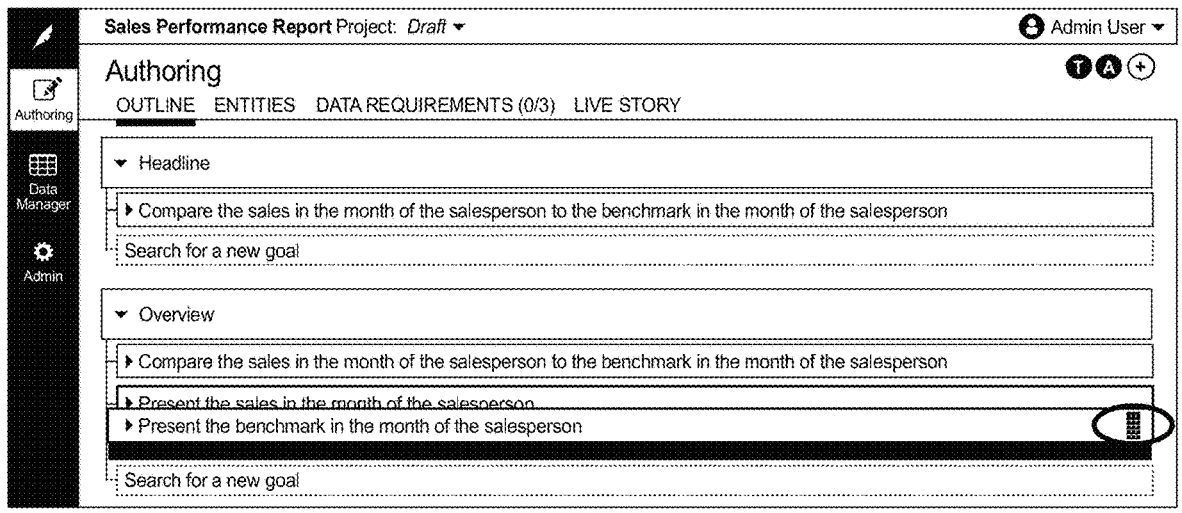
Figure 83:
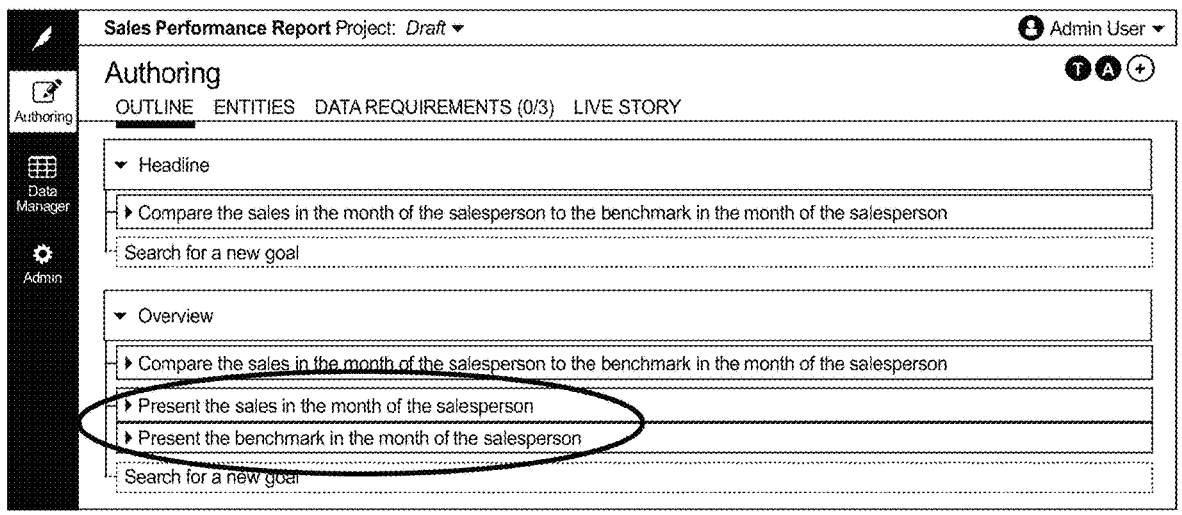

Link the two Present Communication Goals by dragging (using the gripper icon on the right side of the Communication Goal that is revealed when you hover your cursor over the Goal—see FIG. 82) "Present the benchmark in the month of the salesperson" to overlap "Present the sales in the month of the salesperson" (see FIG. 83).

A3(iii)(c): Drivers

Step One: Click "the value" in the first Communication Goal in the Drivers section to set the Attribute. Choose computed value in the Attribute creation sidebar and go into the functions tab in order to select "contribution" (see FIG. 84).

Figures 84, 85:
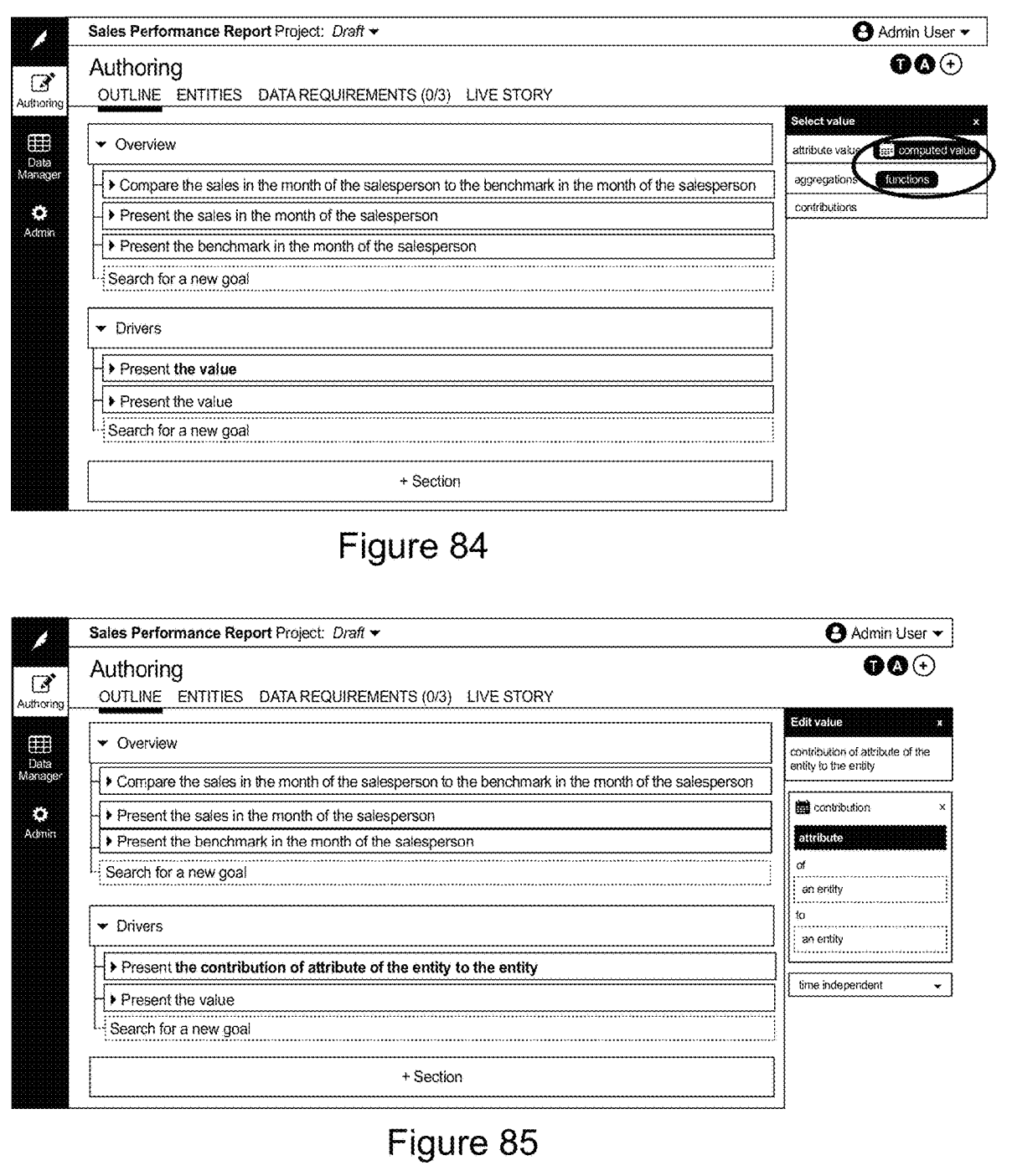
Figures 86, 87:
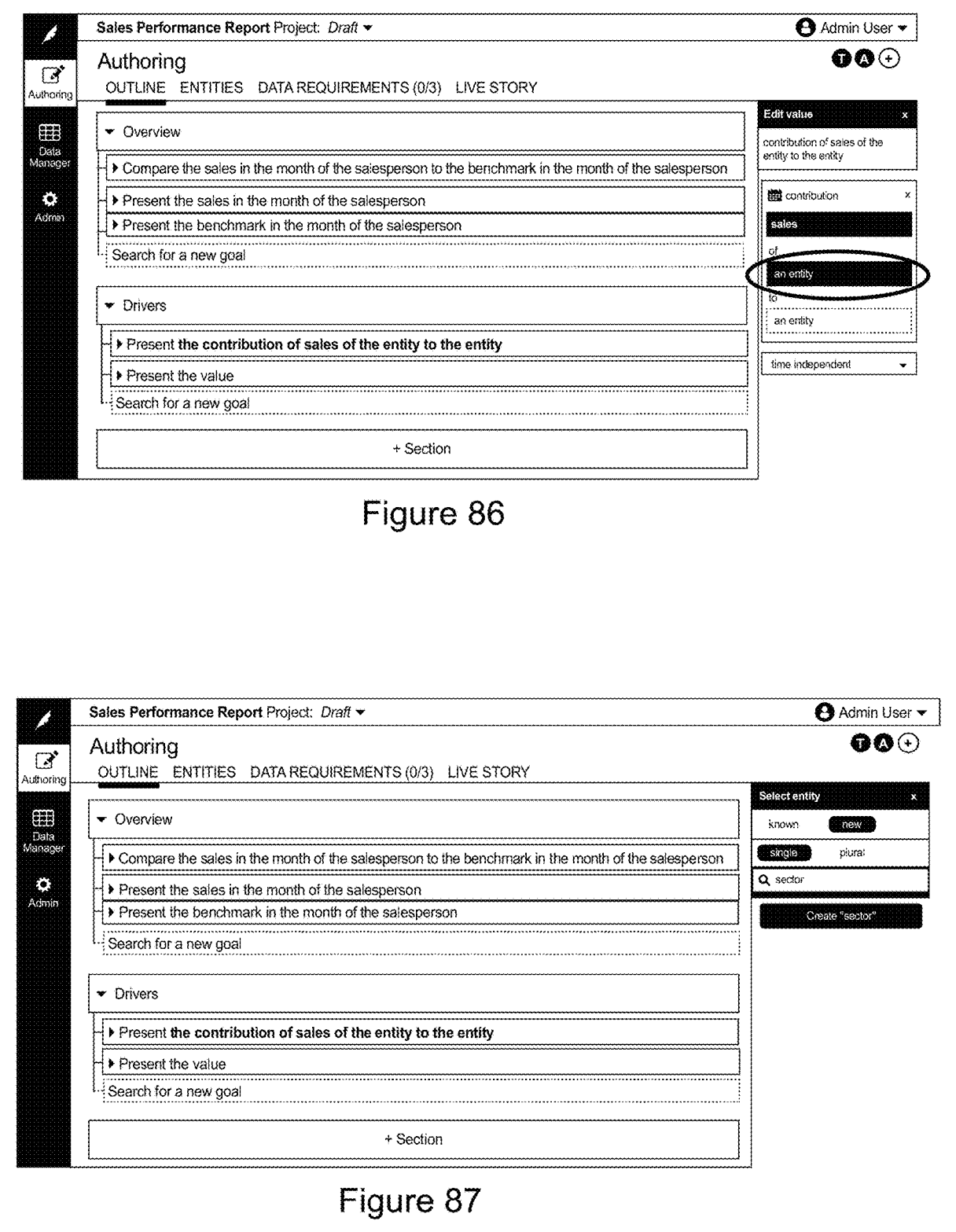

Set the Attribute to be "sales" (see FIGS. 85 and 86).

Click the first entity and create the new Entity type "sector" of type "Thing" (see FIG. 87).

Figure 88:
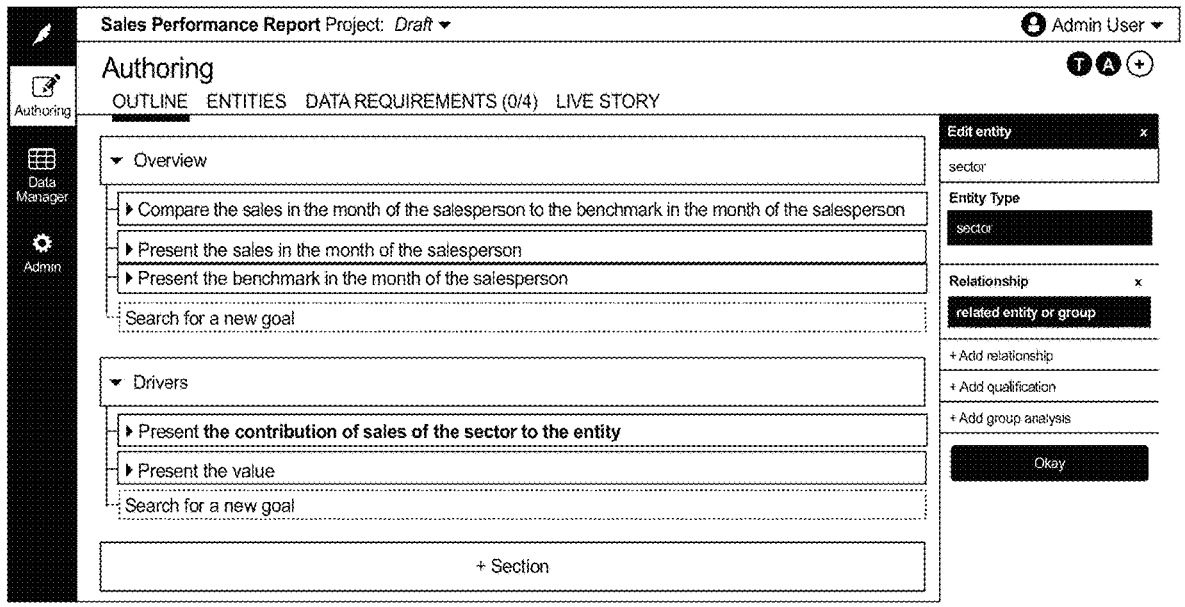
Figure 89:
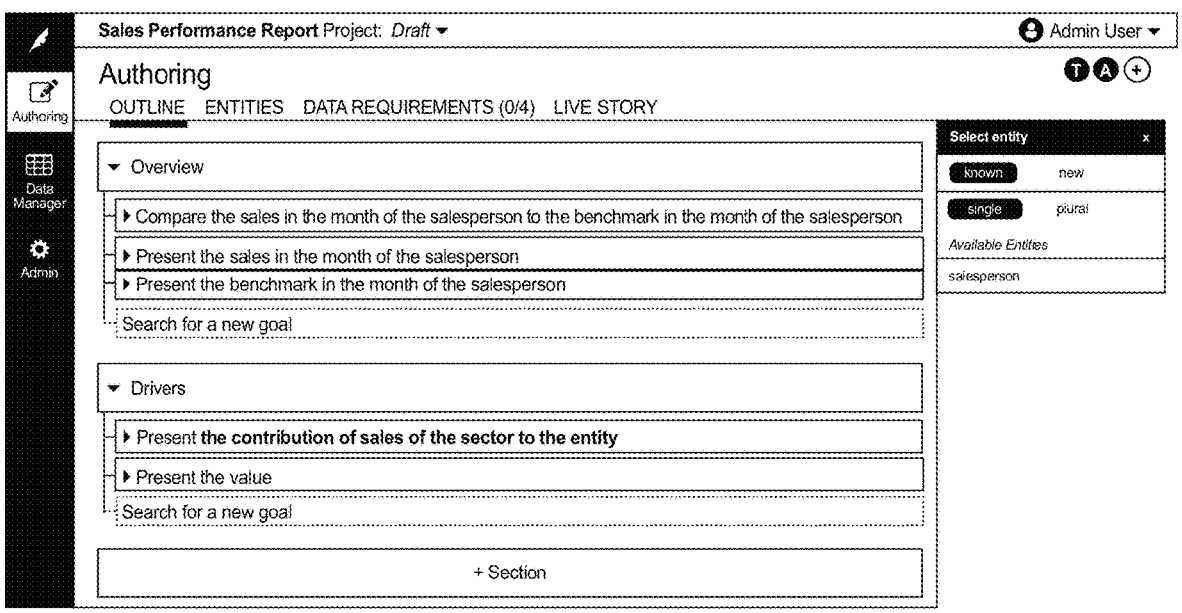

Add a relationship (see FIG. 88) and set the related entity as "salesperson" (see FIG. 89).

Figure 90:
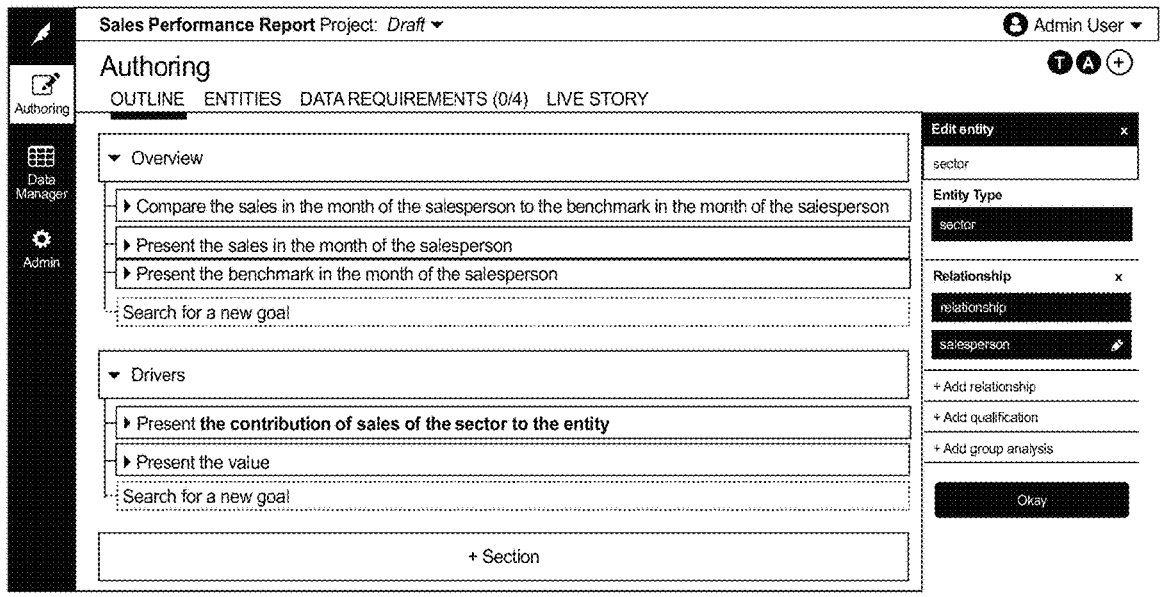
Figure 91:
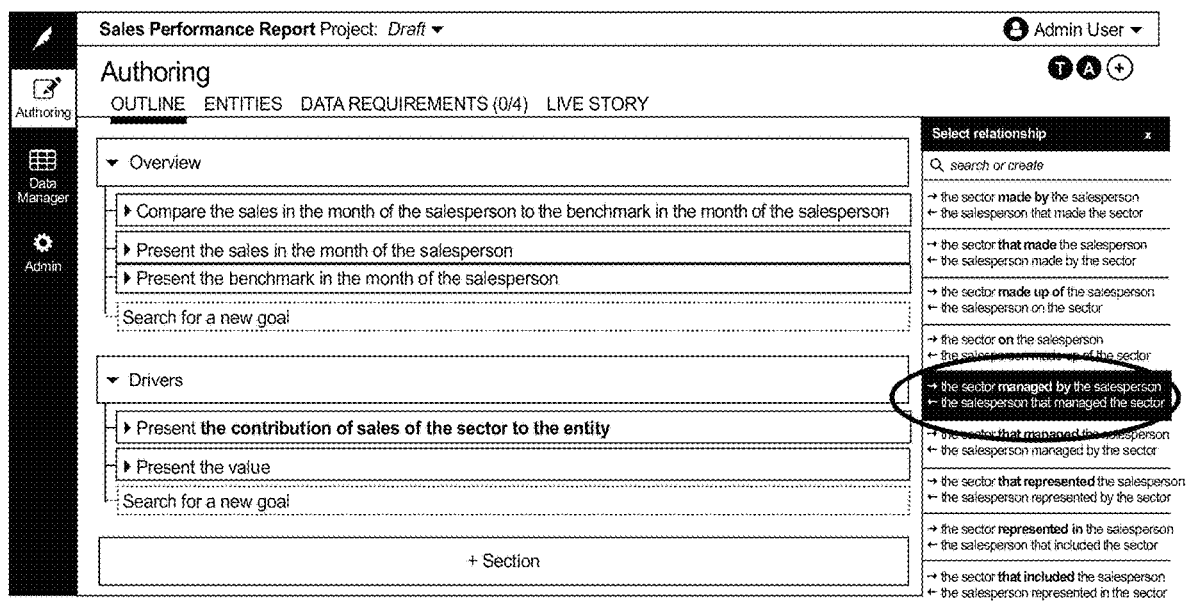

Set the relationship as "managed by" (see FIGS. 90 and 91).

Figures 92, 93:
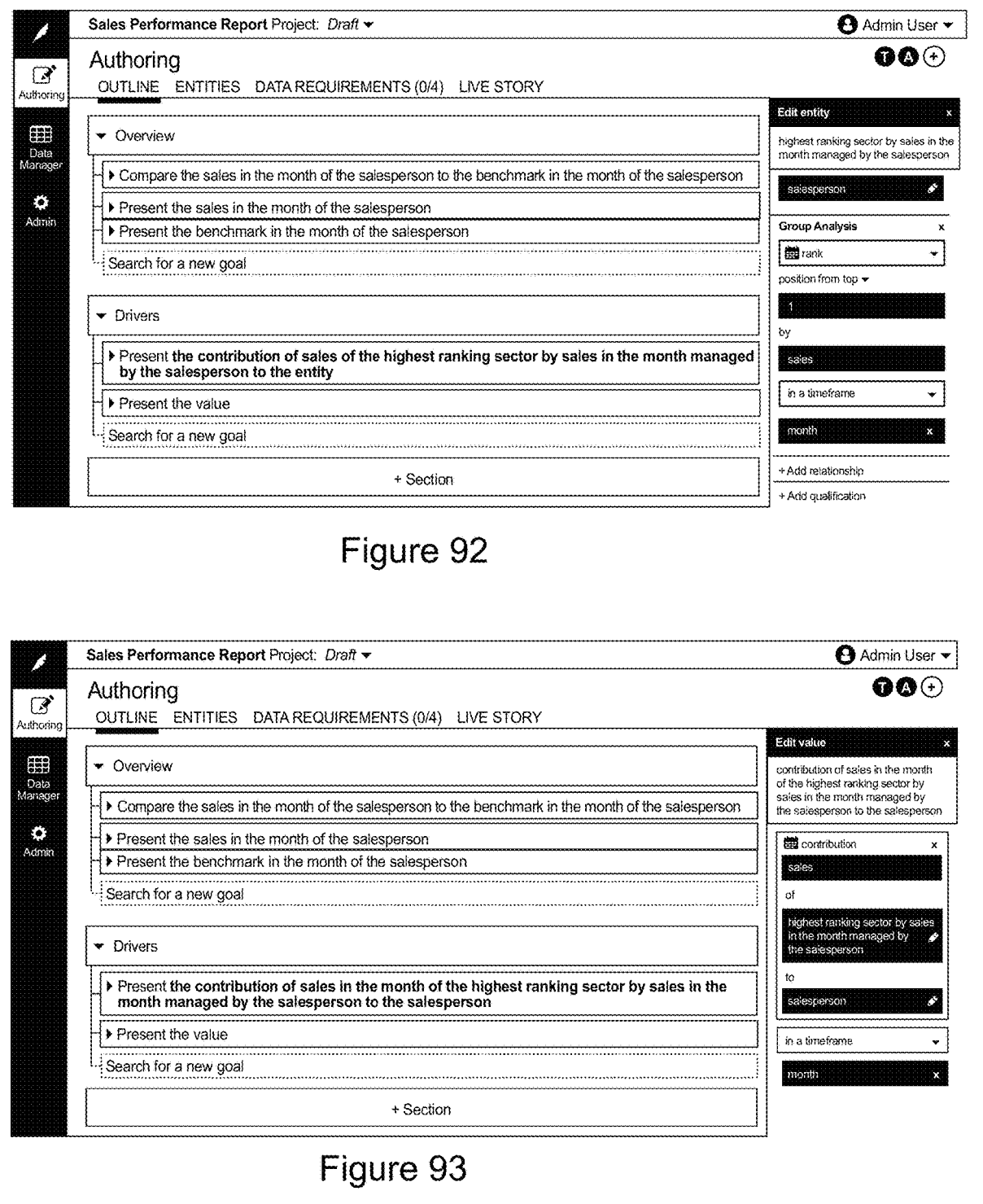

Add a group analysis and set the Attribute as "sales" and the Timeframe to "month" (see FIG. 92).

Set the second entity to "salesperson" and the timeframe to "month" (see FIG. 93).

Figures 94, 95:
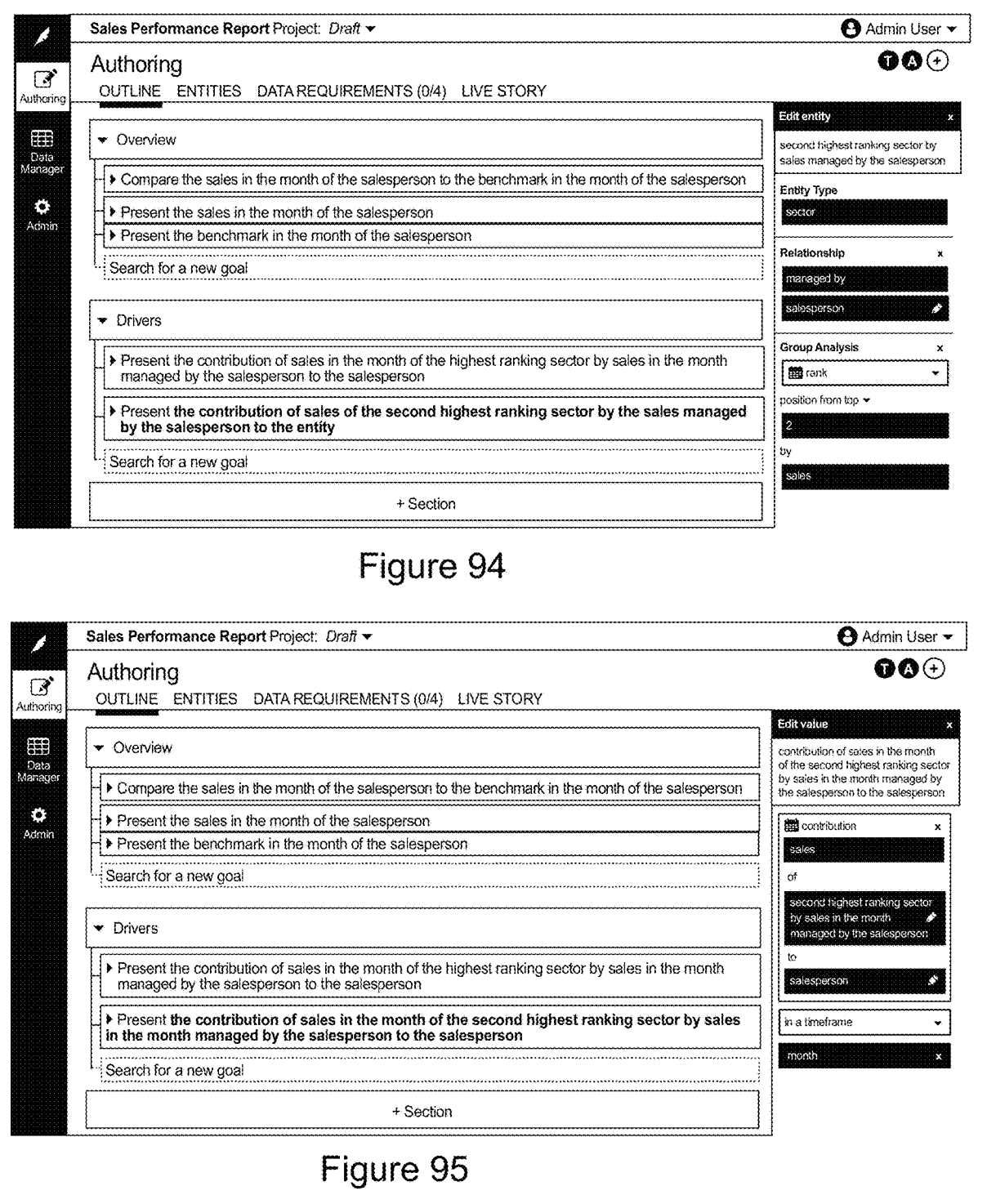

Step Two: Follow the steps as above to complete the second Communication Goal in the Drivers section but set the position from top to be 2 in the group analysis (see FIGS. 94-95).

Figure 96:
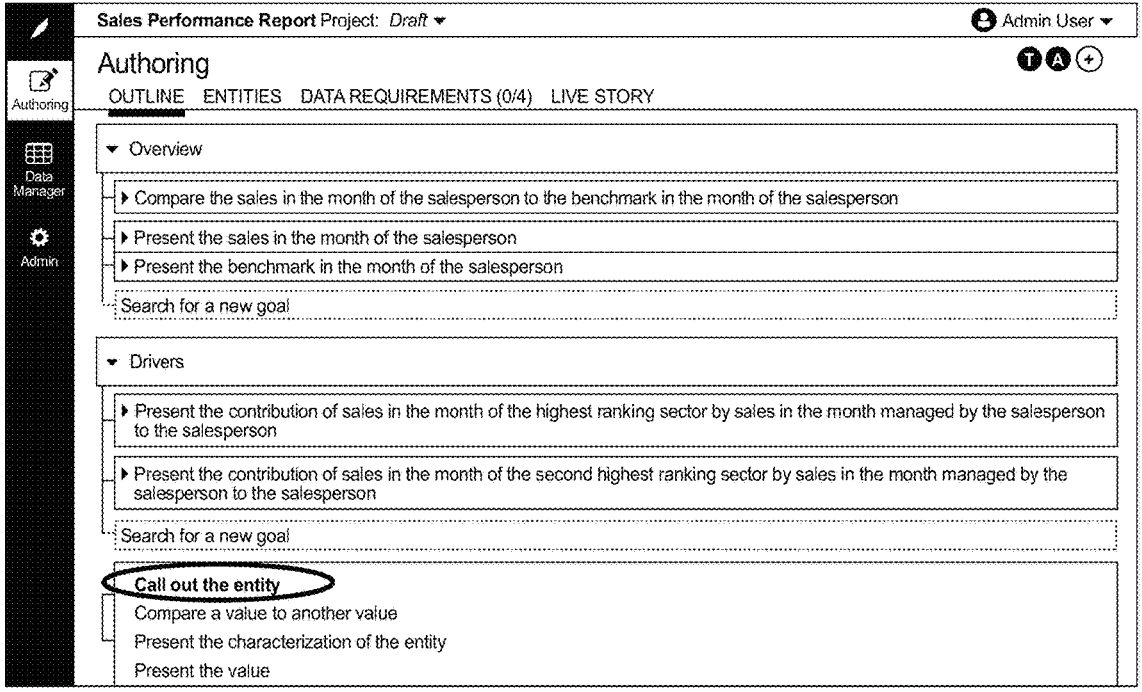

Step Three: Click into the "Search for a new goal" box and select "Call out the entity" (see FIG. 96).

Figure 97:
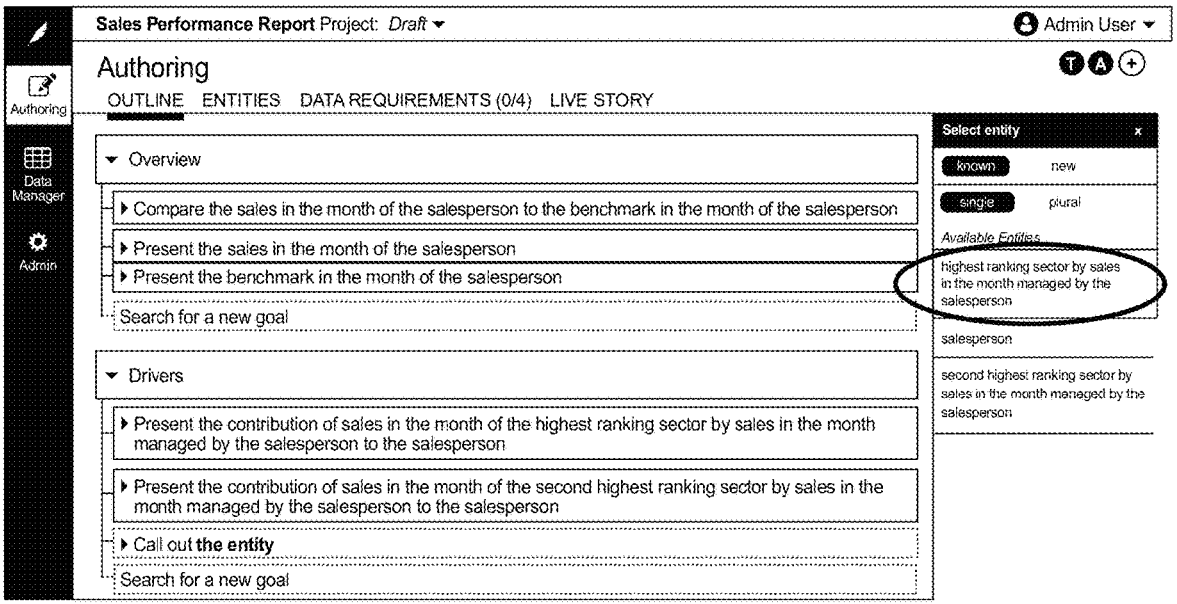

Set the entity to be "highest ranking sector by sales in the month managed by the "salesperson" (see FIG. 97).

Figure 98:
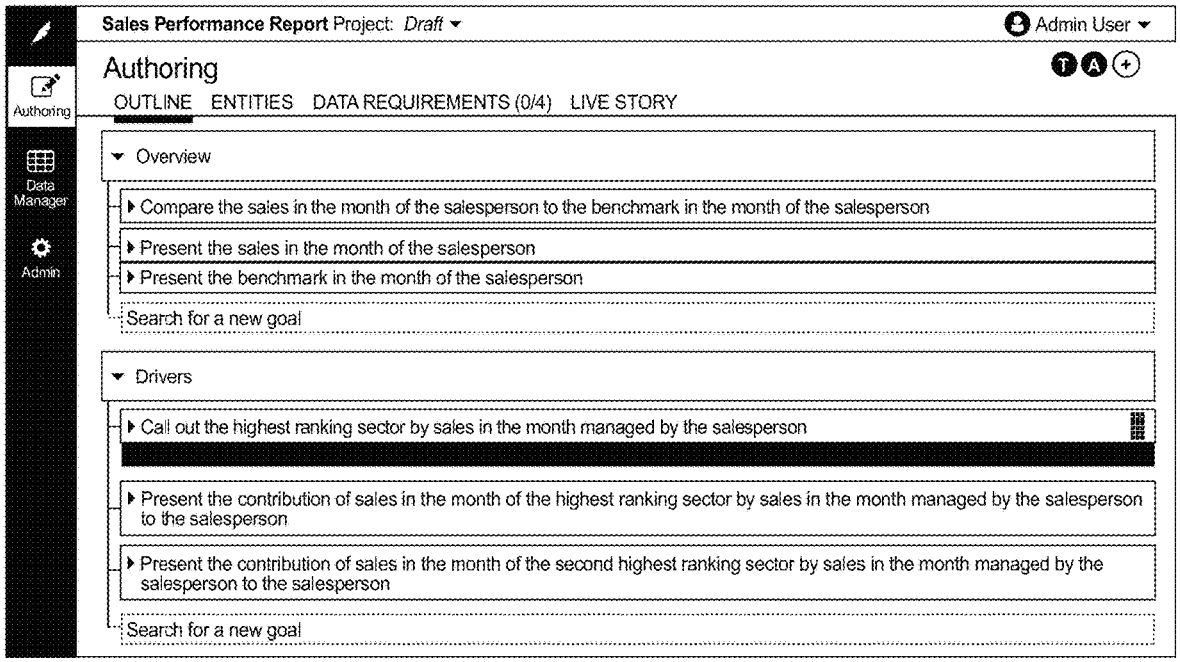

Then move the goal by grabbing the gripper icon on the right side to the first position in the section (see FIG. 98).

Figure 99:
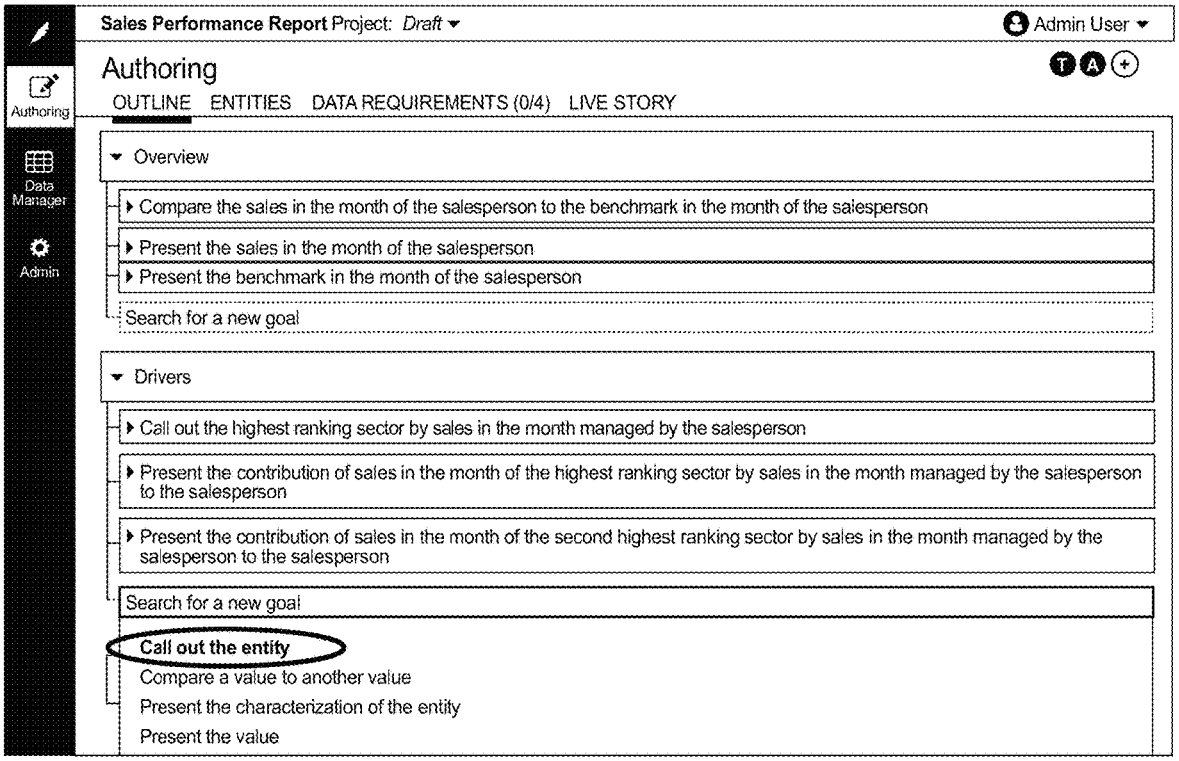

Step Four: Create another Call out the entity Communication Goal (see FIG. 99).

Figure 100:
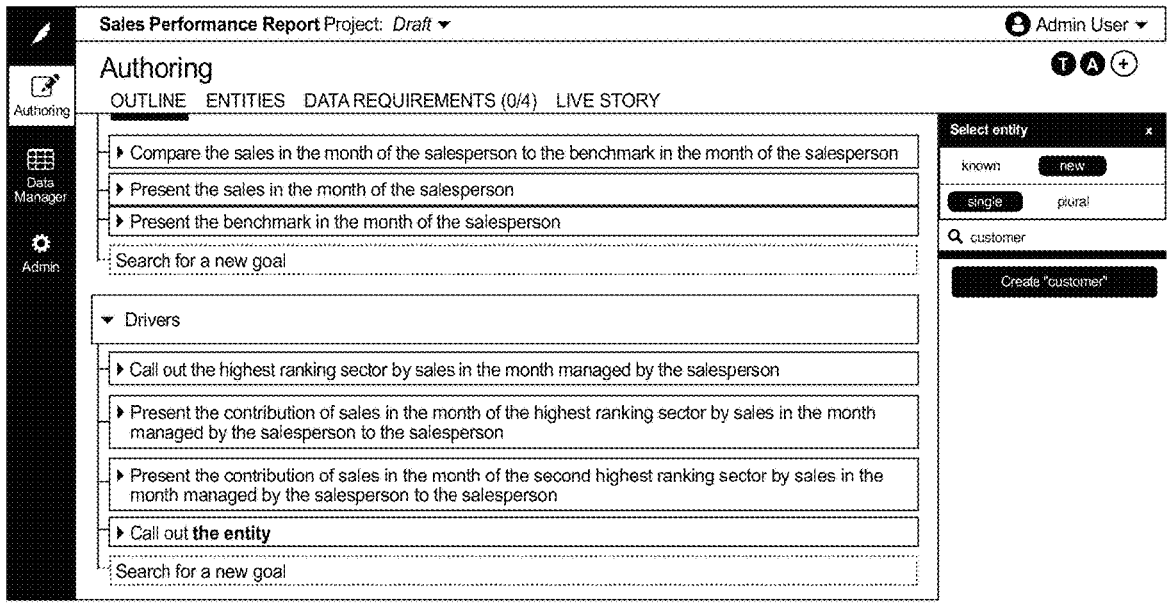

Create a new Entity type of "customer" and set the base entity type to "thing" (see FIG. 100).

Figure 101:
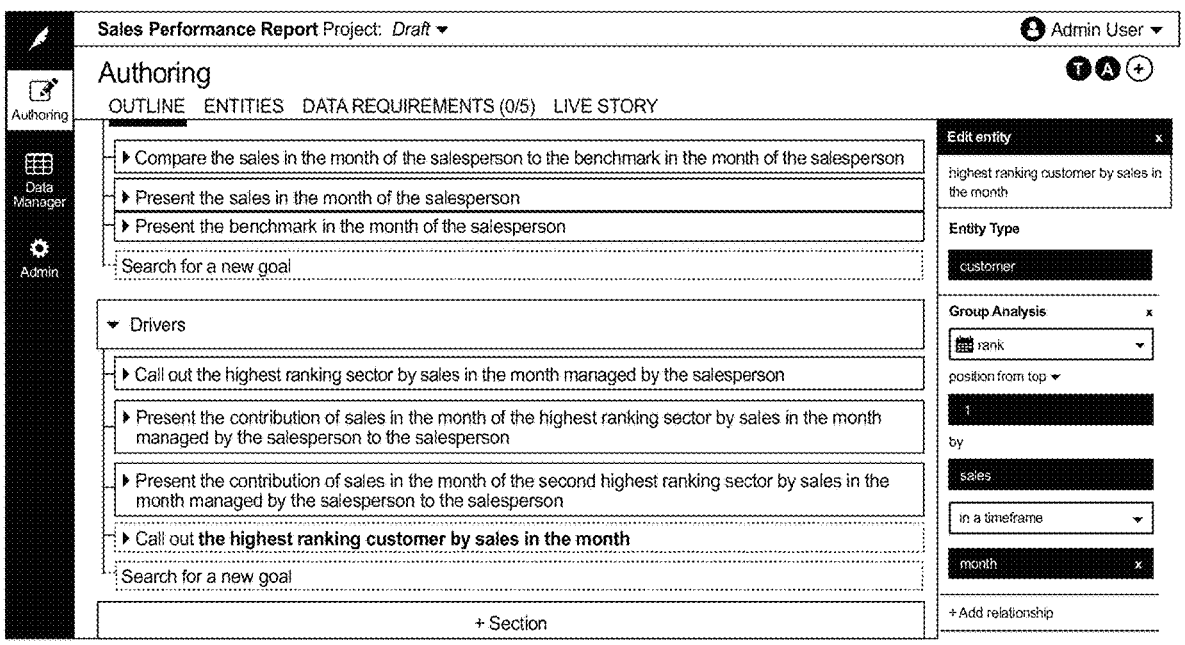

Add a group analysis and set the Attribute to "sales" and the Timeframe to "month" (see FIG. 101).

Figures 102, 103:
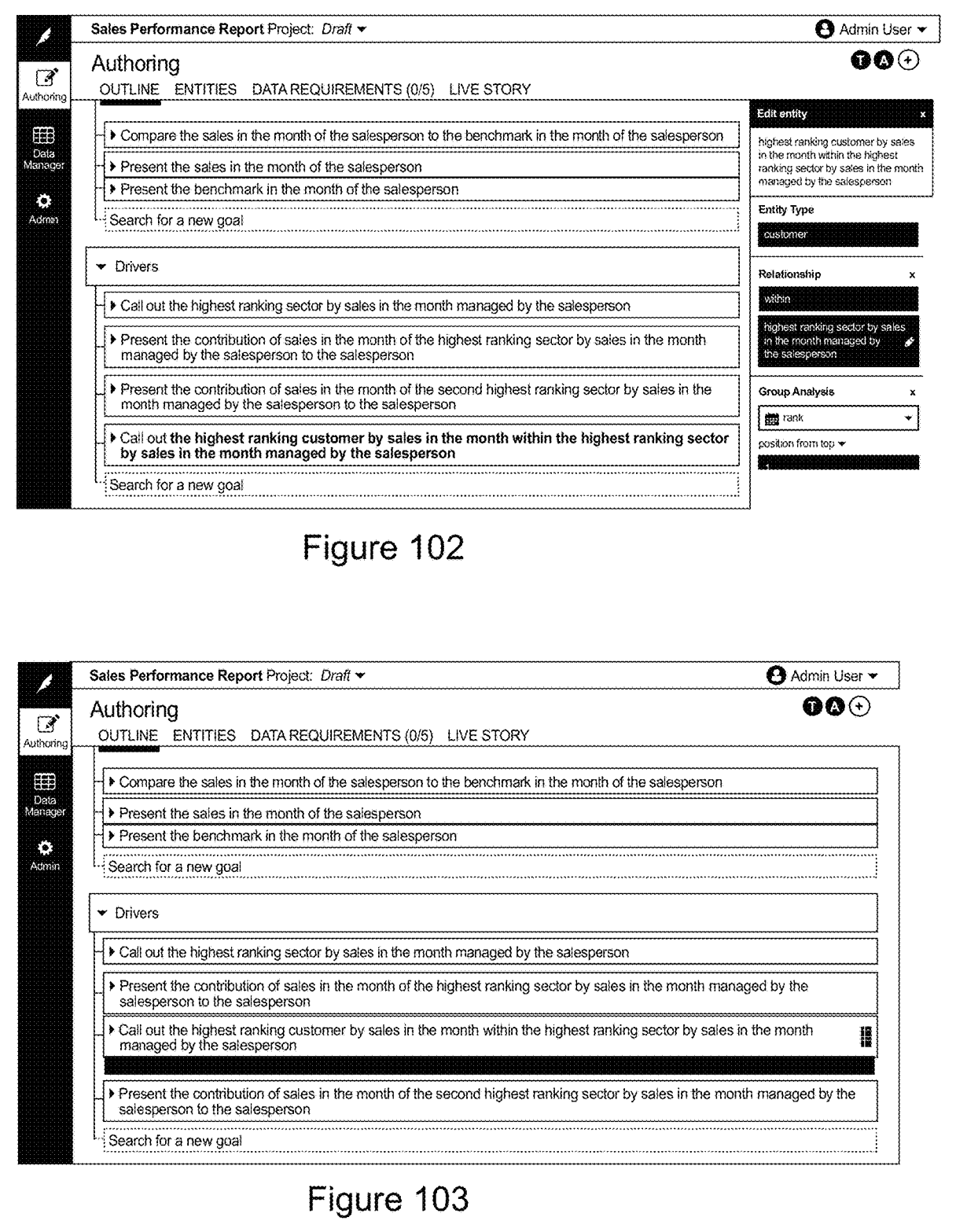

Then add a relationship and set the related entity to be "highest ranking sector by sales in the month managed by the salesperson" and choose the relationship "within" (see FIG. 102).

Then move it to the third position in the Drivers section, after the first Present goal (see FIG. 103).

Figure 104:
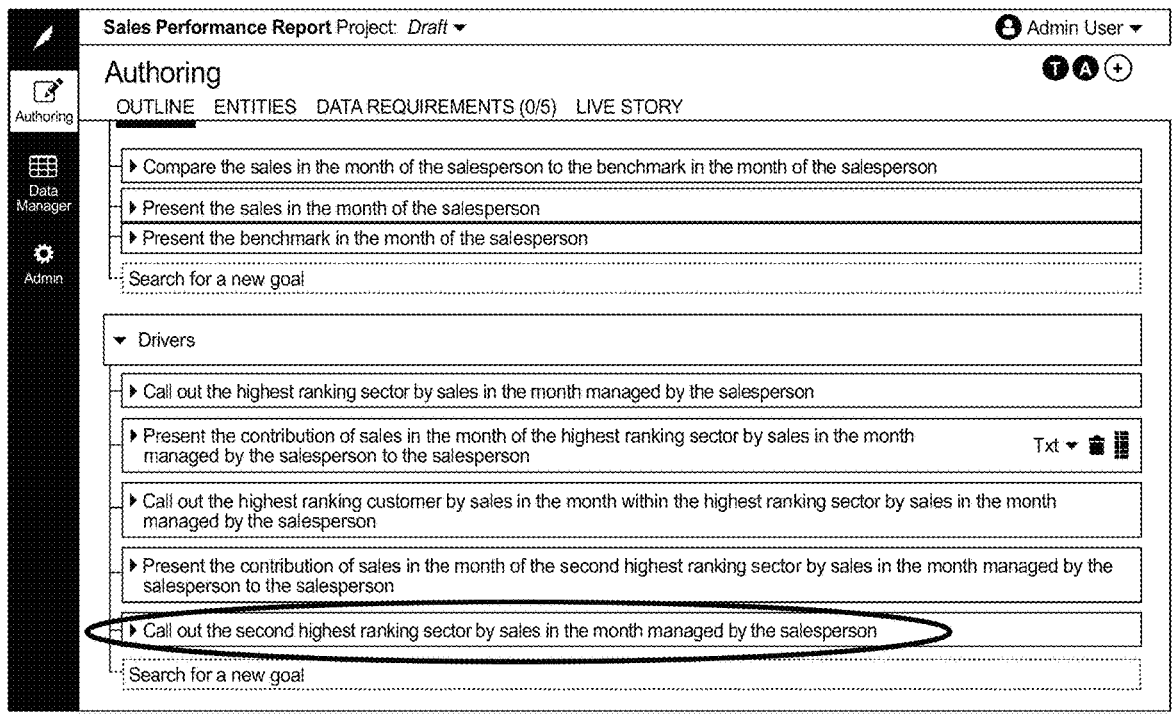

Step Five: Create another Call out the entity Communication Goal and set the entity to "second highest ranking sector by sales in the month managed by the salesperson" (see FIG. 104).

Figure 105:

And move it to the fourth position in the Drivers section, before the second Present goal (see FIG. 105).

Step Six: Create another Call out the entity Communication Goal. Create a new entity type of customer following Step Four, but set the related entity to be "second highest ranking sector by sales in the month managed by the salesperson" (see FIG. 106).

Step Seven: Finally, create another Call out the entity Goal. Create a new plural Entity type of "regions" and set its type to be "place." Add a group analysis and set the number from top to "3," the Attribute to "sales," and the Timeframe to "month" (see FIG. 107).

Figures 108, 109:
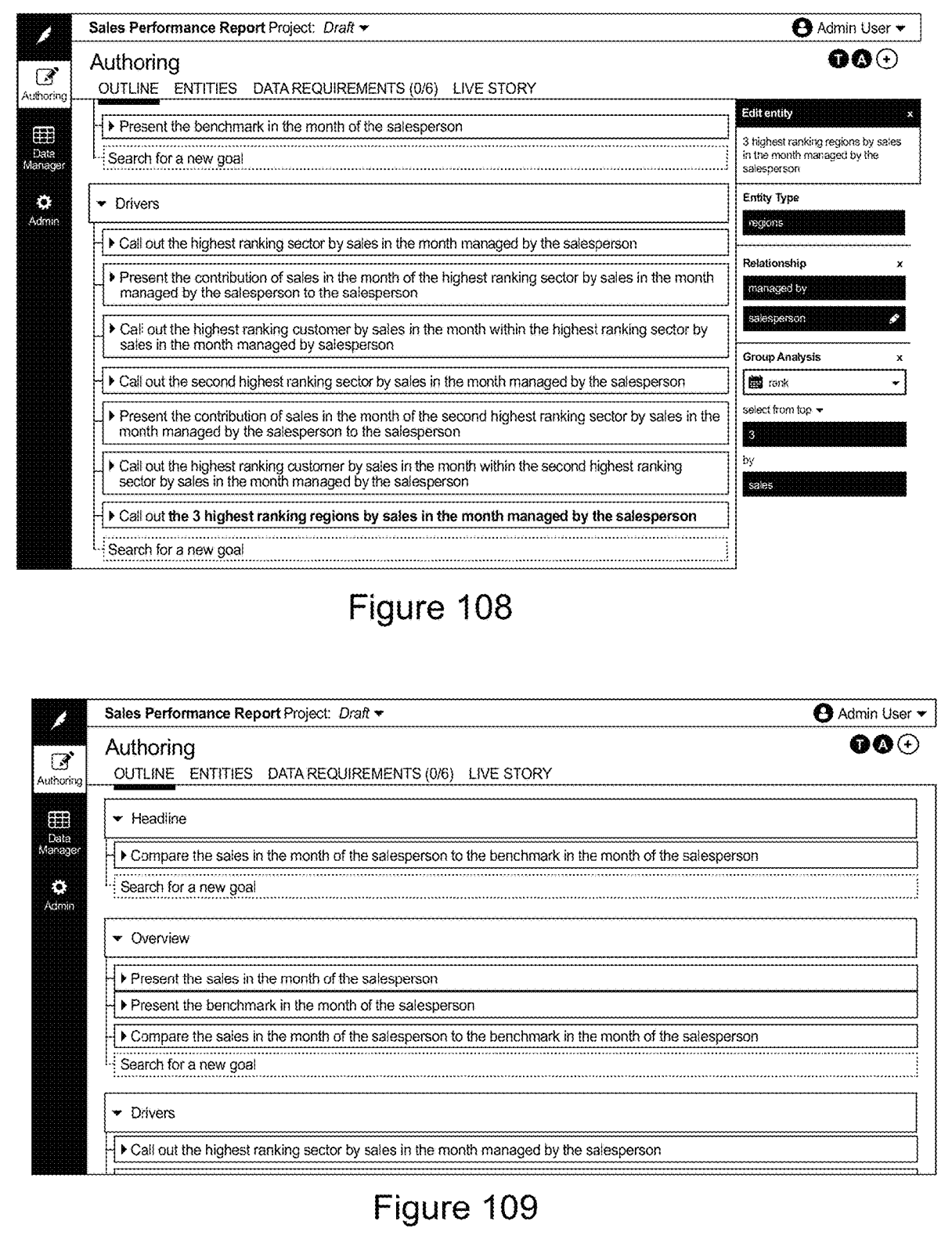

Then add a relationship, setting the related Entity type as "salesperson" and the relationship as "managed by" (see FIG. 108).

The completed outline should match FIGS. 109 and 110. Quill will update the "Data Requirements" tab with prompts asking for the information necessary to generate the story from that configuration.

A3(iv)(d): Adding Data

In order to complete the Data Requirements for the story, you add a Data Source to the Project. Go the Data Manager section of the Project to add a Data View (see FIG. 111).

Figures 112, 113:
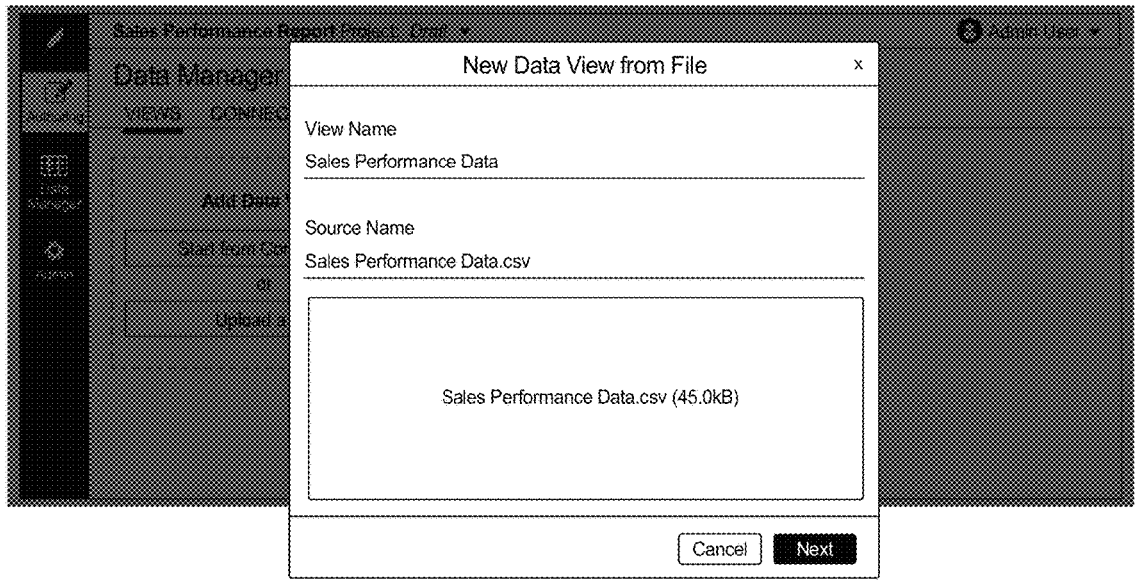

Choose to Upload a file and name the Data View (see FIG. 112). Upload the Sales Performance Data csv file that you were provided.

Once Quill has saved the Data View to the Project, you will be presented with the first few rows of the data (see FIG. 113).

A3(v)(e): Data Requirements

The Data Requirements will guide you through a series of questions to fill out the necessary parameters for Narrative Analytics and Communication Goals (see FIG. 114). Go to the Data Requirements tab in Authoring.

See the Data Requirements section of Configure a Story from Scratch for more detail. The completed Data Requirements can appear as shown by FIGS. 115-118.

Go to Live Story to see the story (see FIG. 119).

Figure 120:
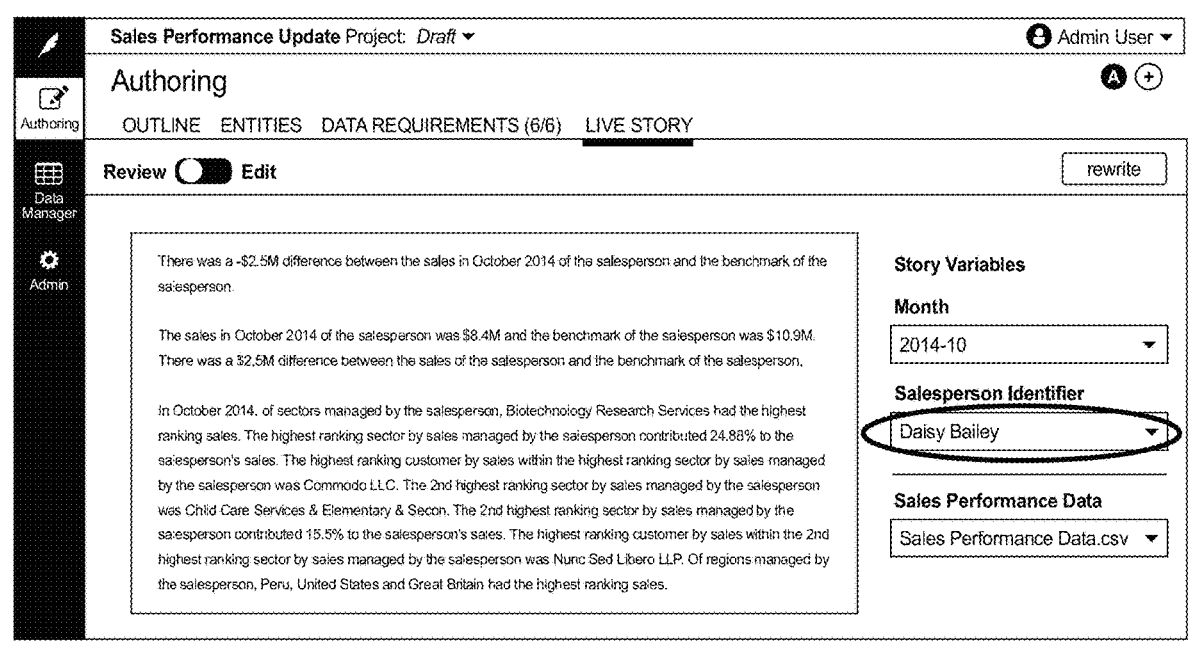

Toggles for "salesperson" (see FIG. 120) and "month" will show you different stories on the performance of an individual Sales Person for a given quarter.

A4: Ontology Management

A4(i): Entity Types and Expressions

Entity types are how Quill knows what to talk about in a Communication Goal. An Entity type is any primary "object" which has particular Attributes. An example is that a Department (entity type) has Expenses (Attribute)—see FIG. 121. An Entity is a specific instance of an Entity type, with data-driven values for each Attribute.

In other words, if you have an Entity type of Department, Quill will express a specific instance of a Department from your data, such as Transportation. Likewise, Expenses will be replaced with the numerical value in your data. Quill also allows you to create Entity and Attribute designations, such as departments managed by the top salesperson or total expenses for the department of transportation (see FIG. 122).

When you generate a story with such designations, Quill replaces them with the appropriate calculated values.

A4(i)(a): Entities Tab

Figure 123:
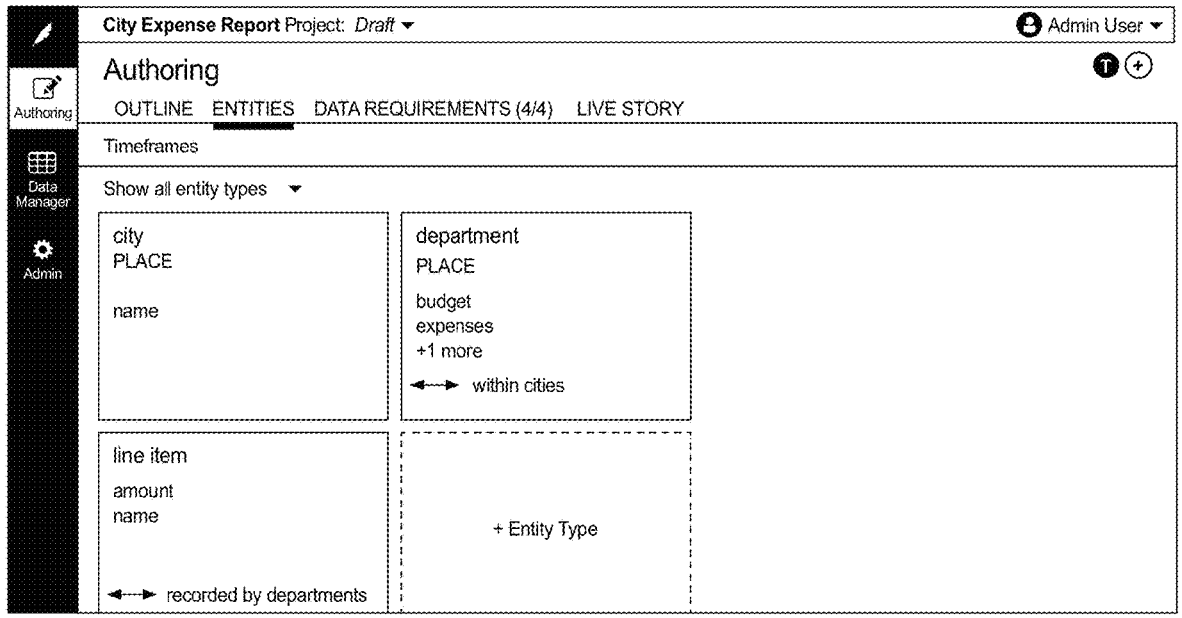

Entity types are managed in the Entities tab (see FIG. 123).

Figure 124:
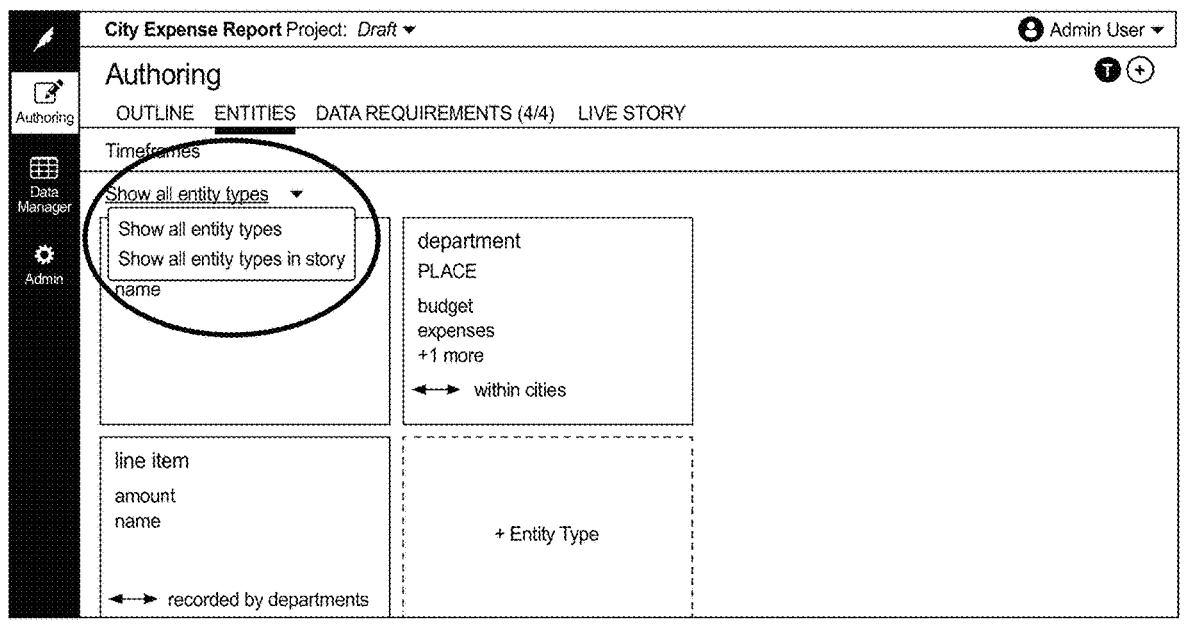
Figure 125:
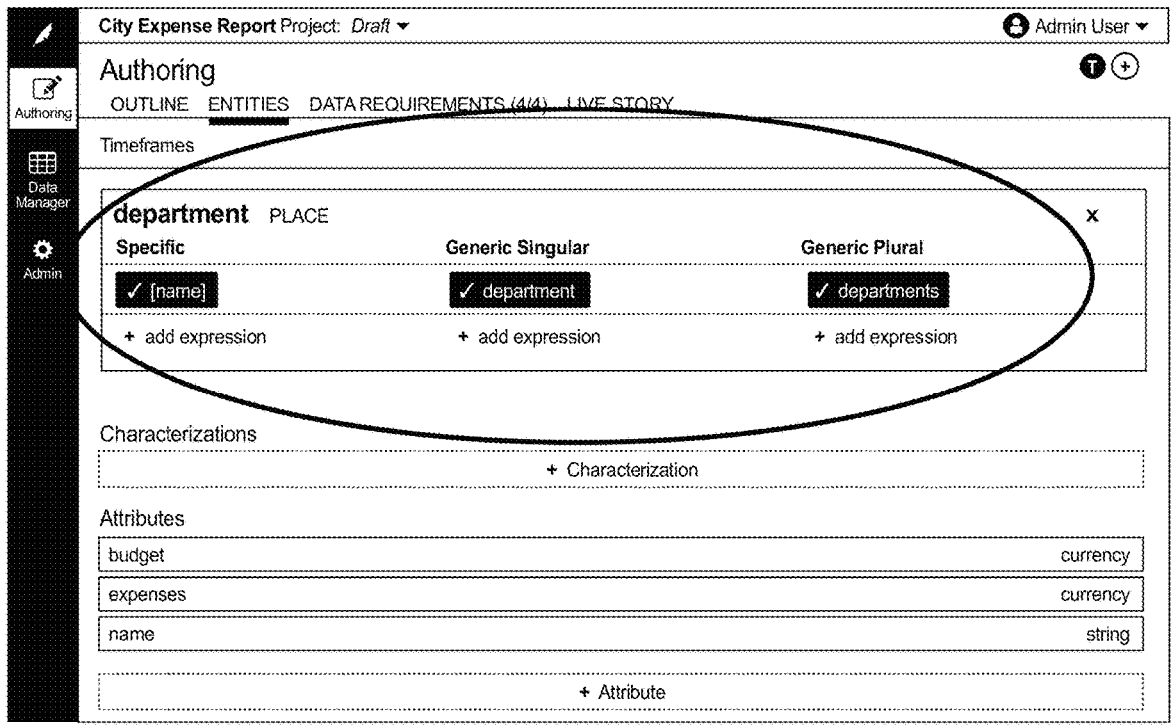
Figure 126:
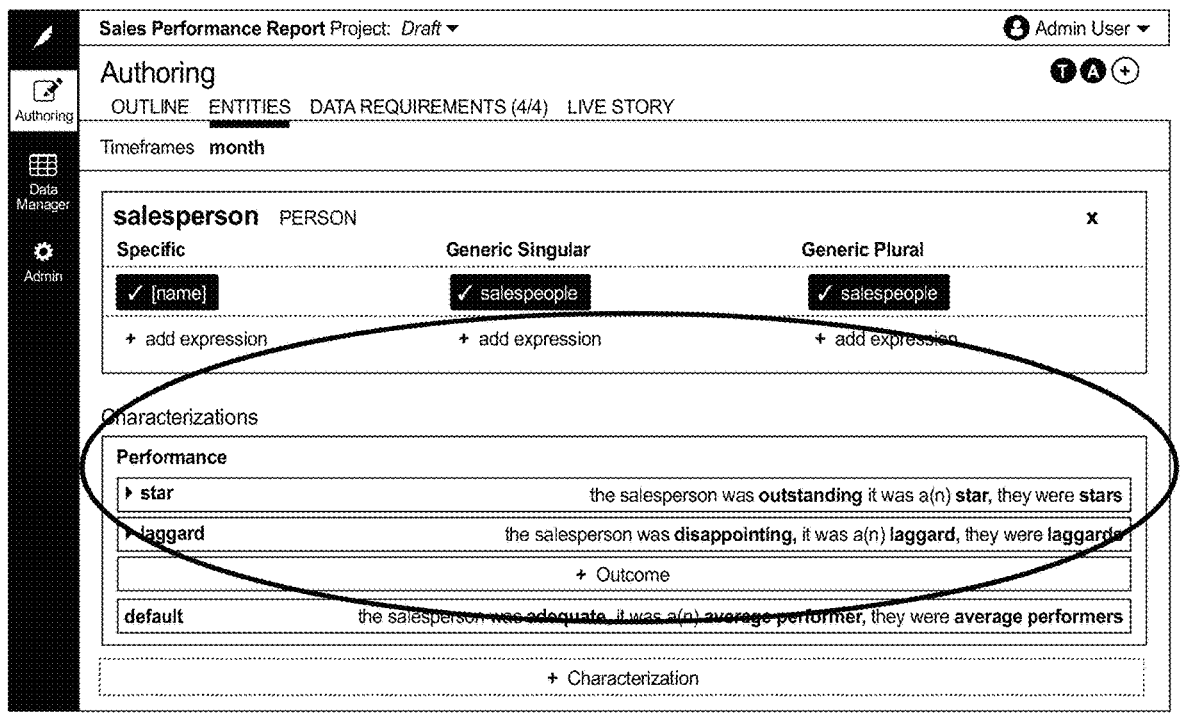
Figure 127:
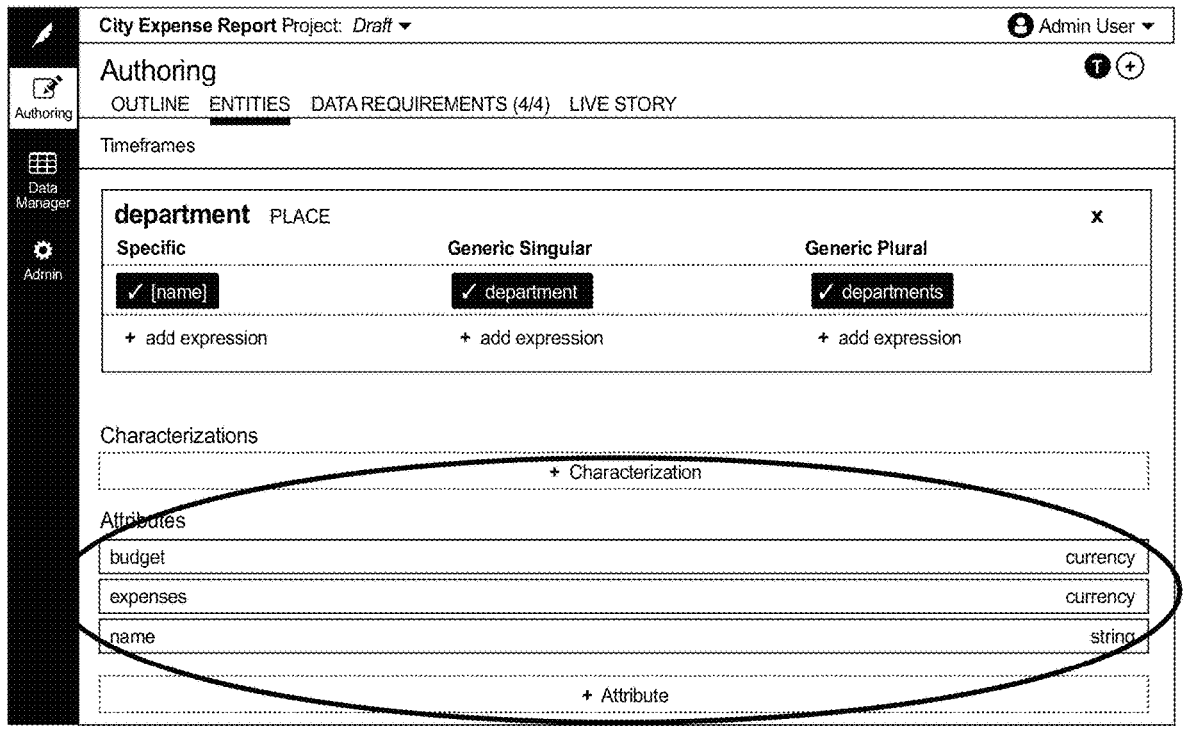
Figure 128:
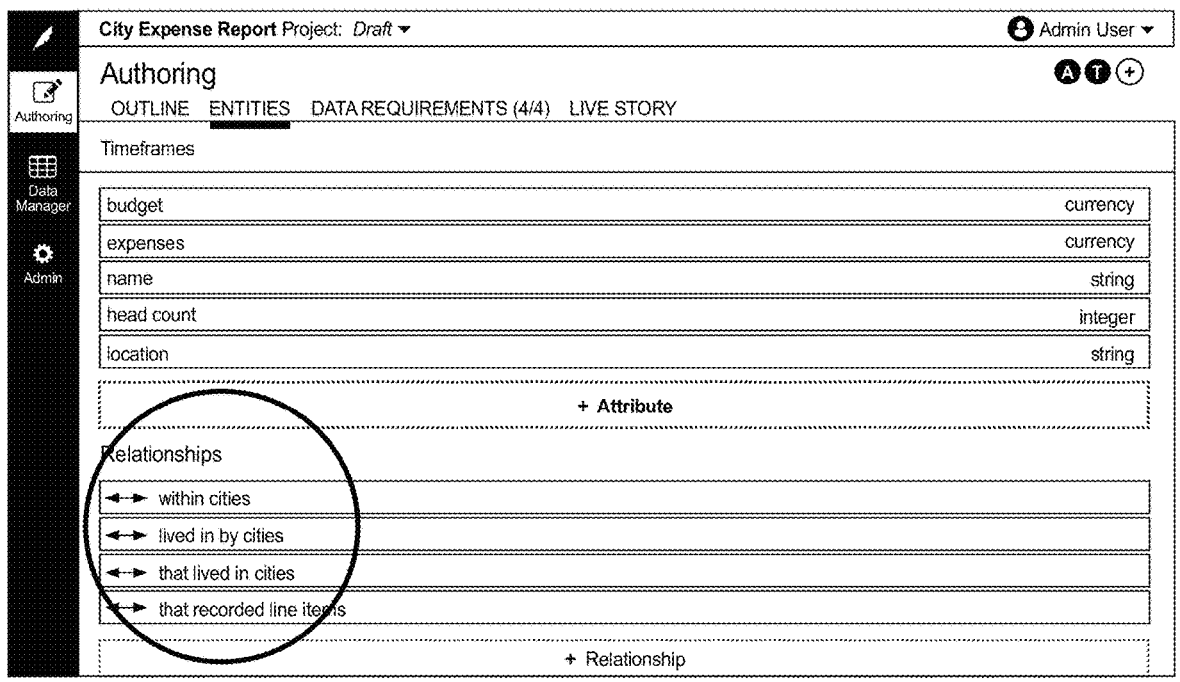
Figure 129:
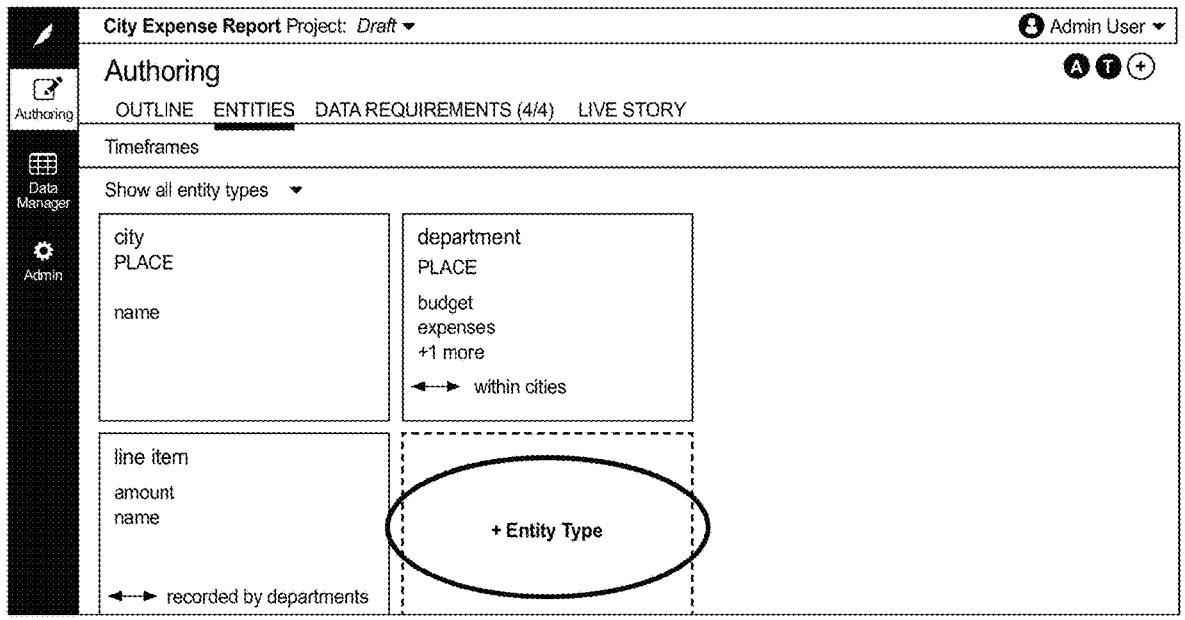

Quill defaults to showing all Entity types, but you can filter to only those that are in the story (see FIG. 124).

Clicking an Entity type tile allows you to view its details and edit it. Here, you can modify or add Entity expressions (see FIG. 125), edit or add Entity characterizations (see FIG. 126), add or edit Attributes associated with the Entity (see FIG. 127), and add Relationships (see FIG. 128).

A4(i)(b): Creating an Entity Type

Figure 130:
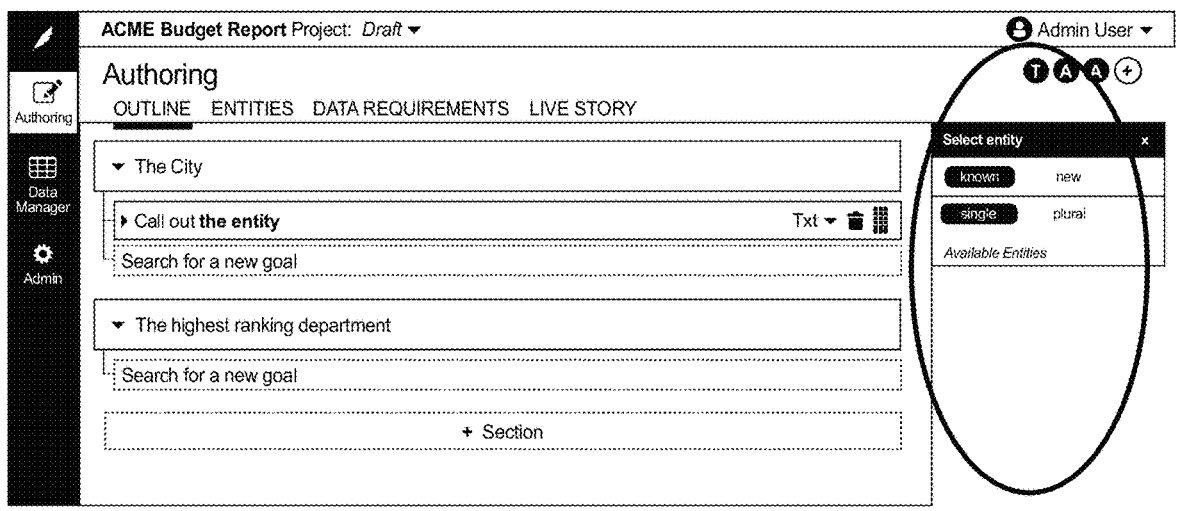

Entity types can be created from the Entities tab (see FIG. 129) or from the Outline (see FIG. 130).

Figure 131:
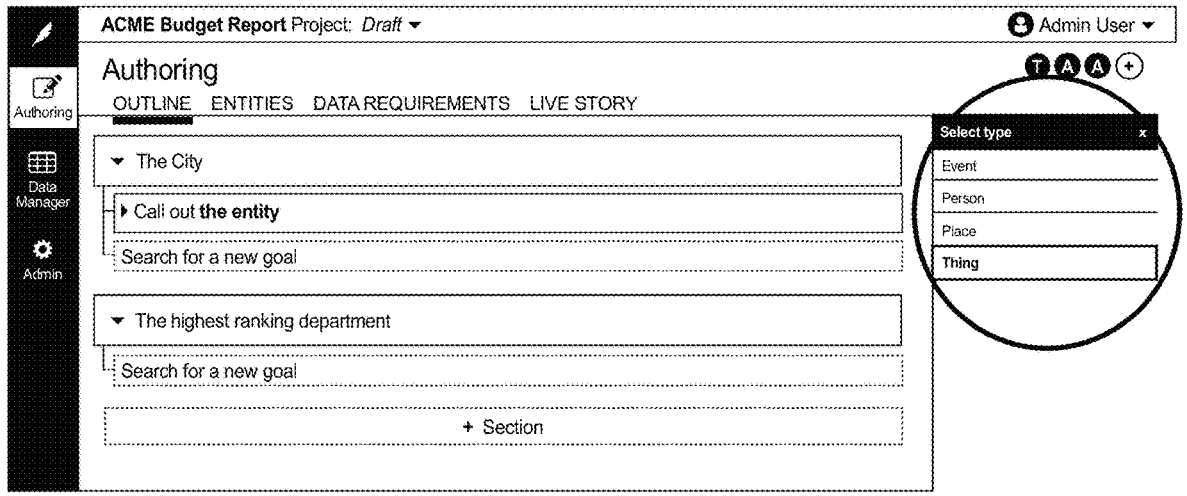
Figure 132:
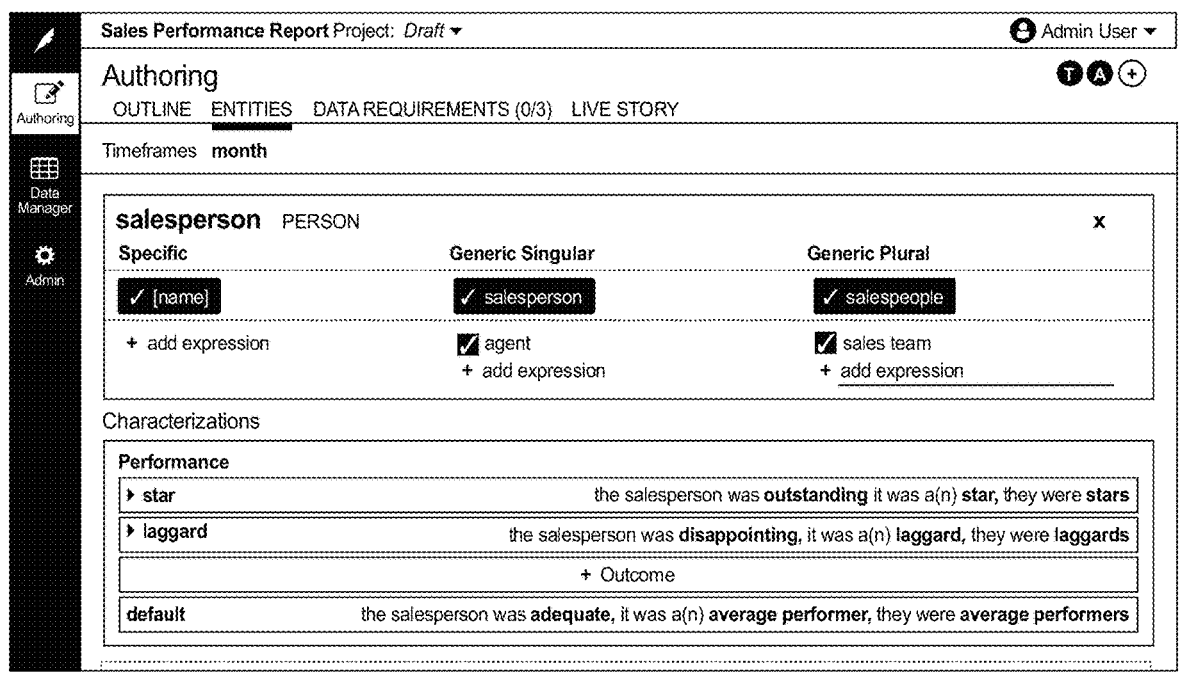

When you create an Entity type, you select its base Entity type from the options of Person, Place, Thing, or Event (see FIG. 131).

This gives Quill context for how to treat the Entity. In the case of the Person base Entity type, Quill knows to determine gender and supply an appropriate pronoun.

Entity types can have multiple expressions. These are managed in the Entities tab of a project (see FIG. 132).

Figures 133, 134:
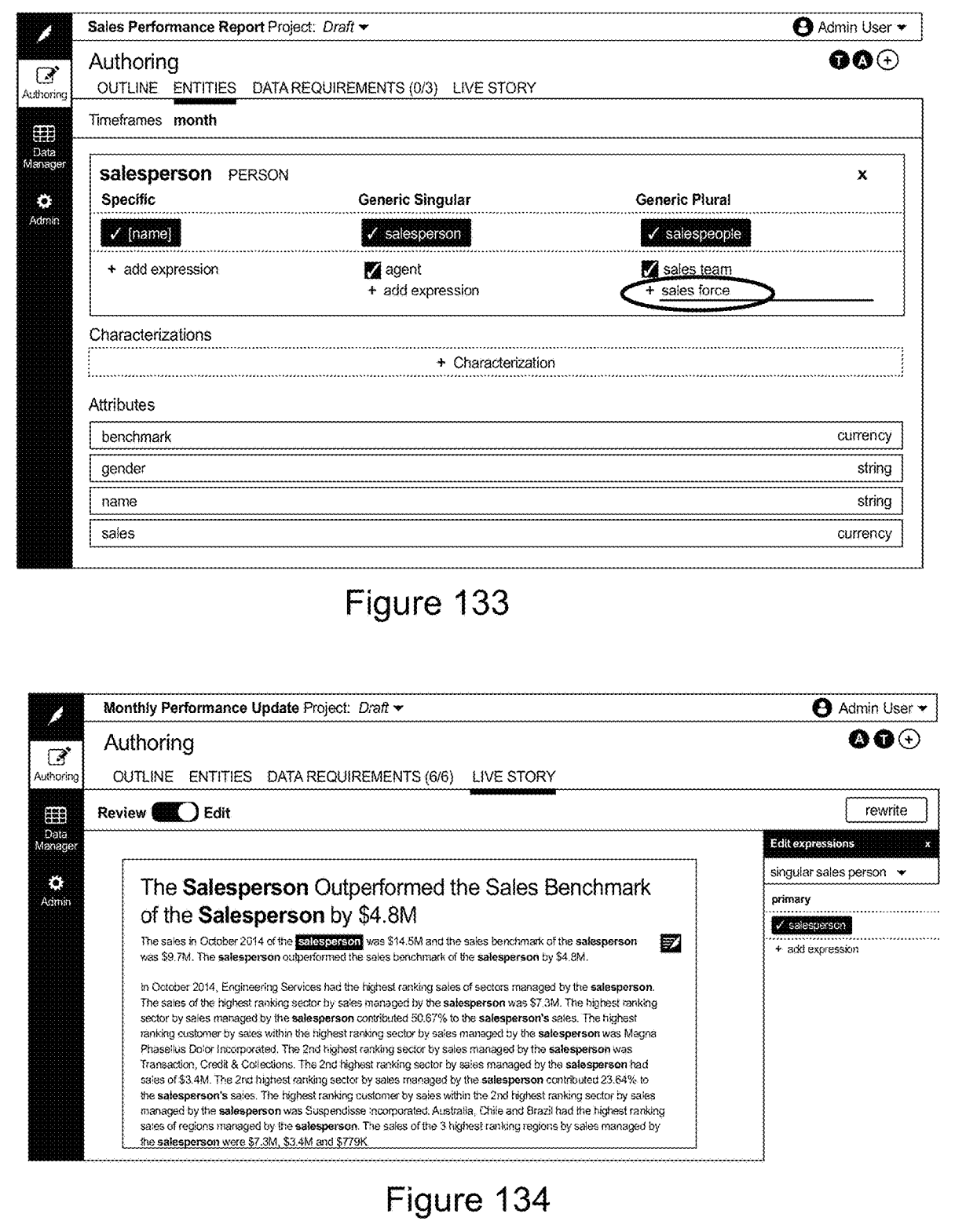

They can be added either from the Entities tab (see FIG. 133) or from Live Story (see FIG. 134).

To add expressions, open the details for an Entity type (by clicking on "salesperson," as shown above) and click in the text area next to the plus icon in the sidebar. Type in the expression you want associated with the Entity. You can add expressions for the Specific, Generic Singular, and Generic Plural instances of the Entity by clicking on the arrow dropdown in the sidebar to toggle between the expressions (see FIG. 135).

Figures 135, 136:
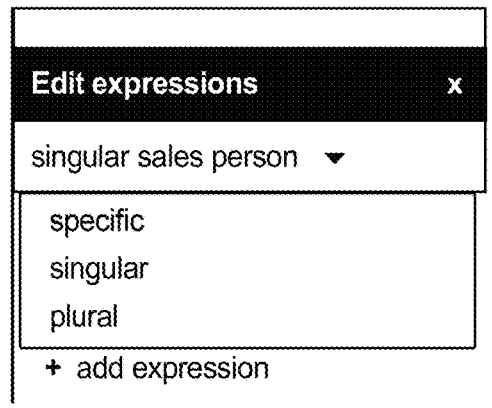
Figure 138:
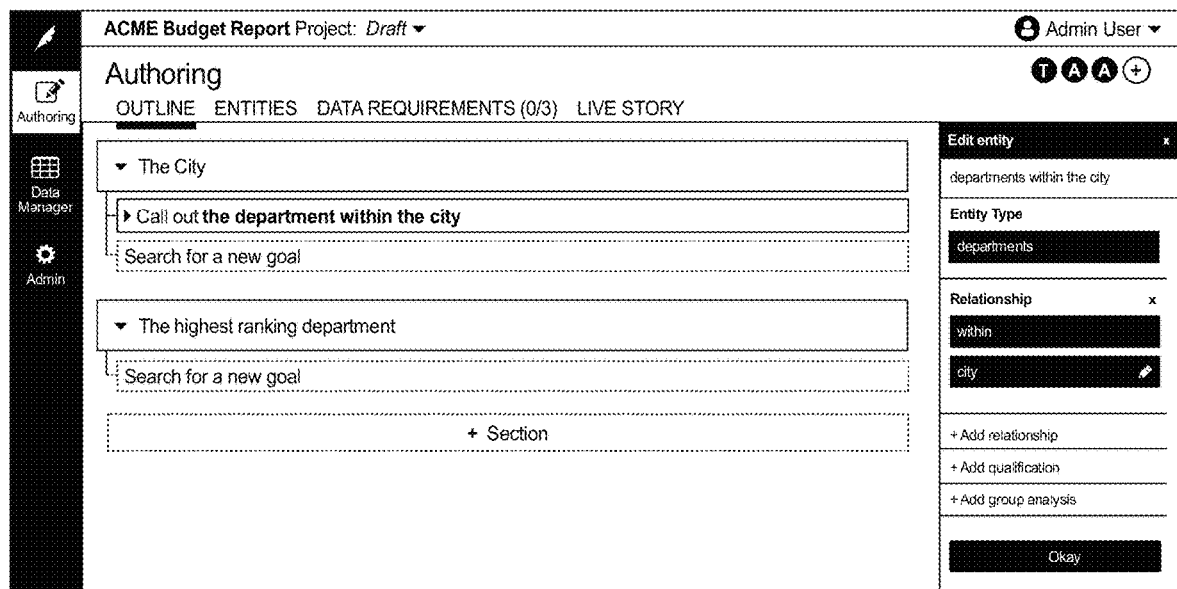
Figure 143:
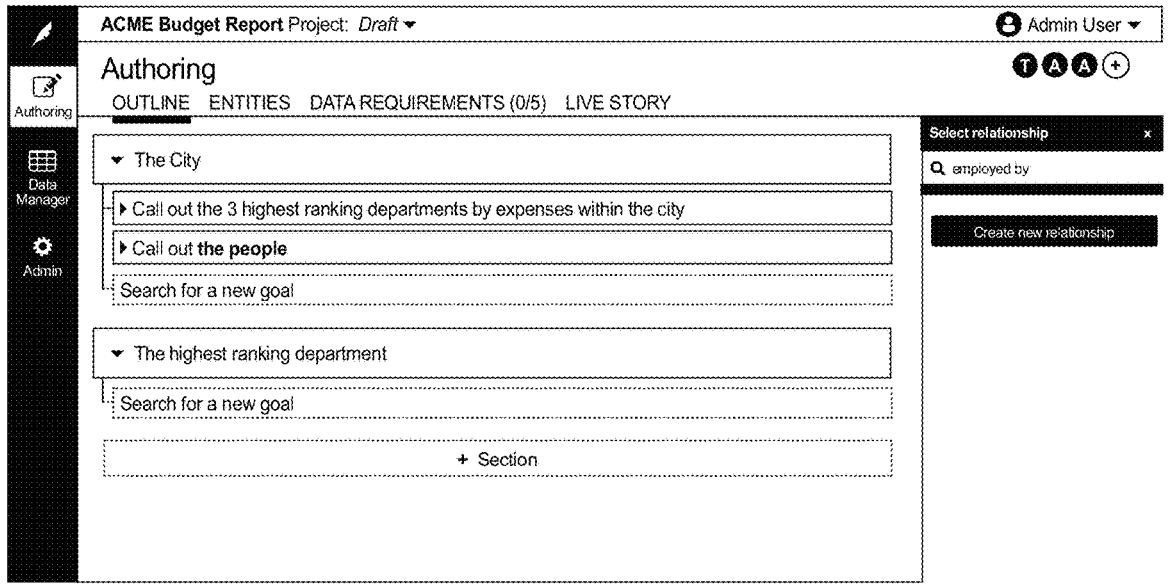
Figure 144:
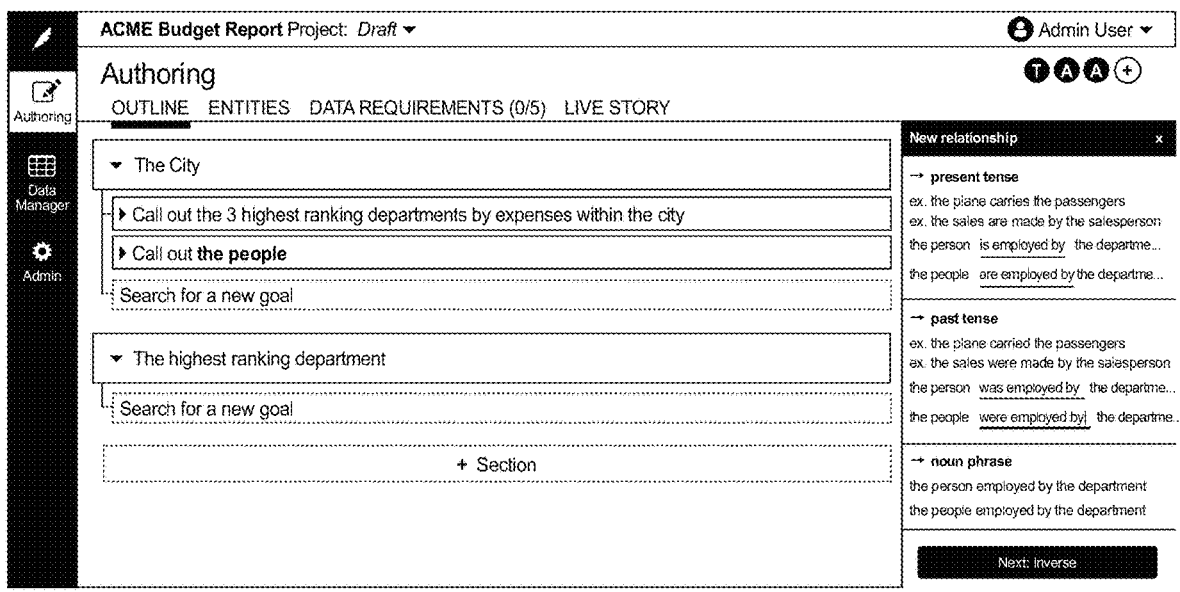
Figure 145:
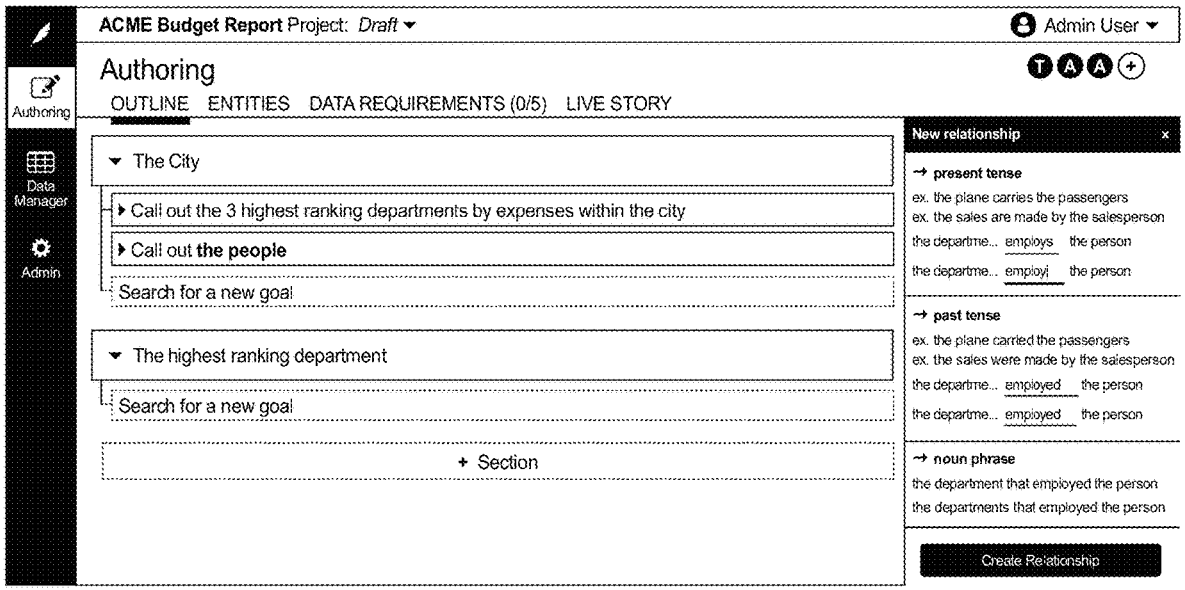
Figure 148:
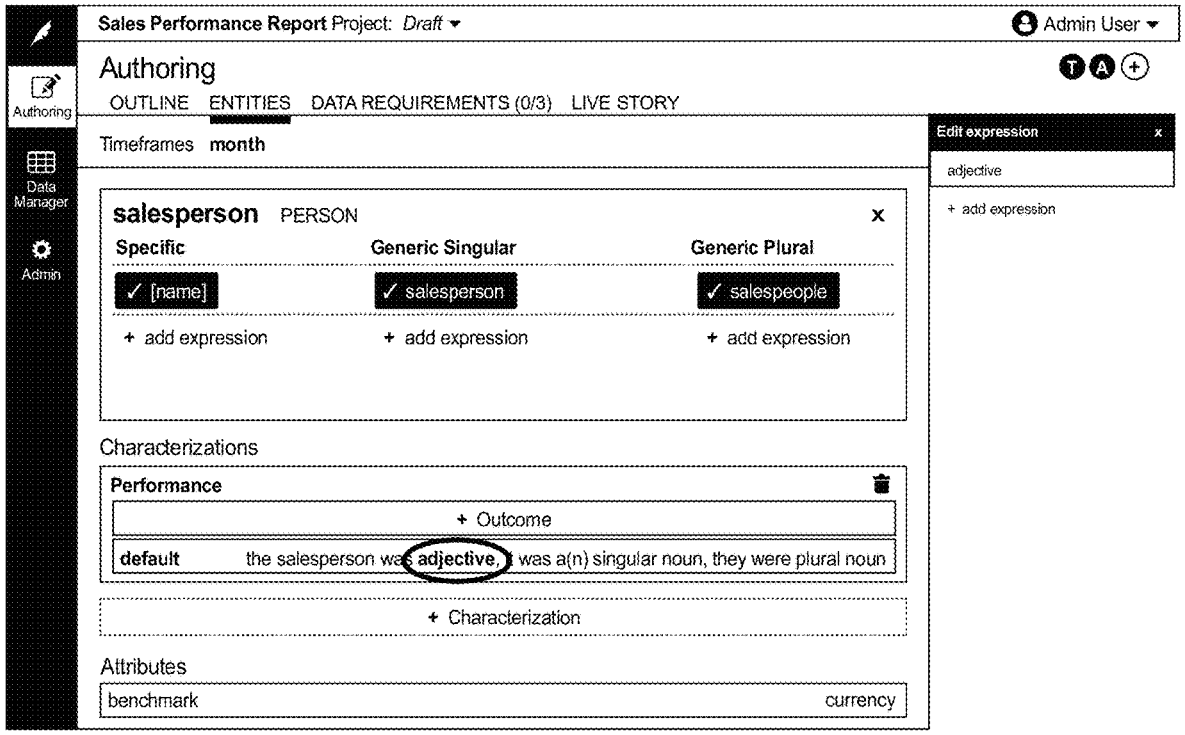

Attributes can be referenced in Specific entity expressions by setting the attribute name off in brackets. For example, if you would like the last name of the salesperson as an expression, set "last name" off in brackets as shown in FIG. 136.

You can also opt into and out of particular expressions. If you have multiple expressions associated with the Entity, Quill will alternate between them at random to add Variability to the language, but you can always uncheck the box to turn the expression off (see FIG. 137) or click on the x icon to remove it completely. You cannot opt out of whichever expression is set as the primary expression, but if you want to make one you've added the primary expression simply click and drag the expression to the top of the list.

A4(ii): Relationships

Entity types can be tied to each other through Relationships. For example, a City contains Departments, and Departments are within a City (see FIG. 138). Relationships are defined and created during Entity type creation in Authoring.

Figures 139, 140:
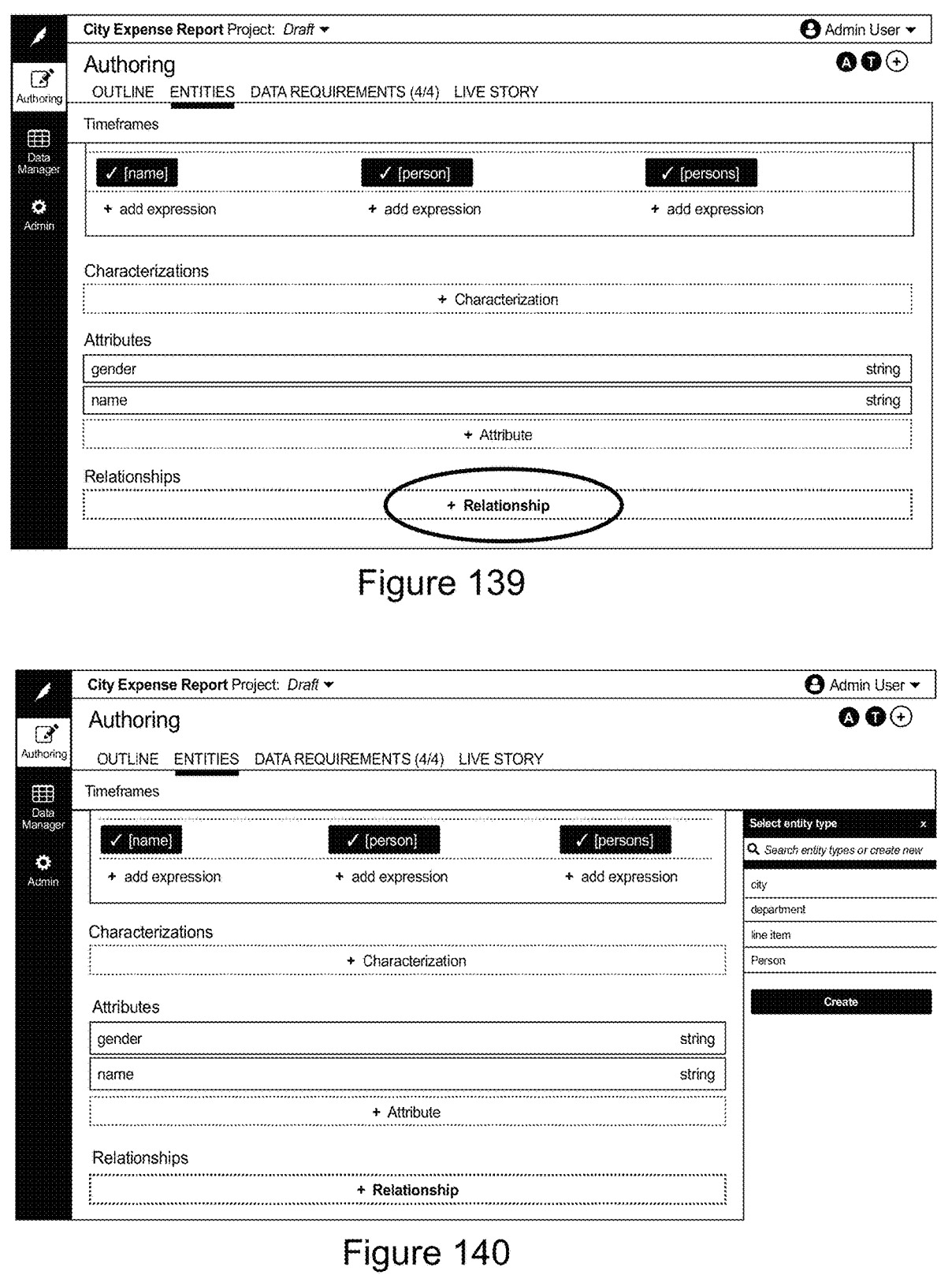
Figures 141, 142:
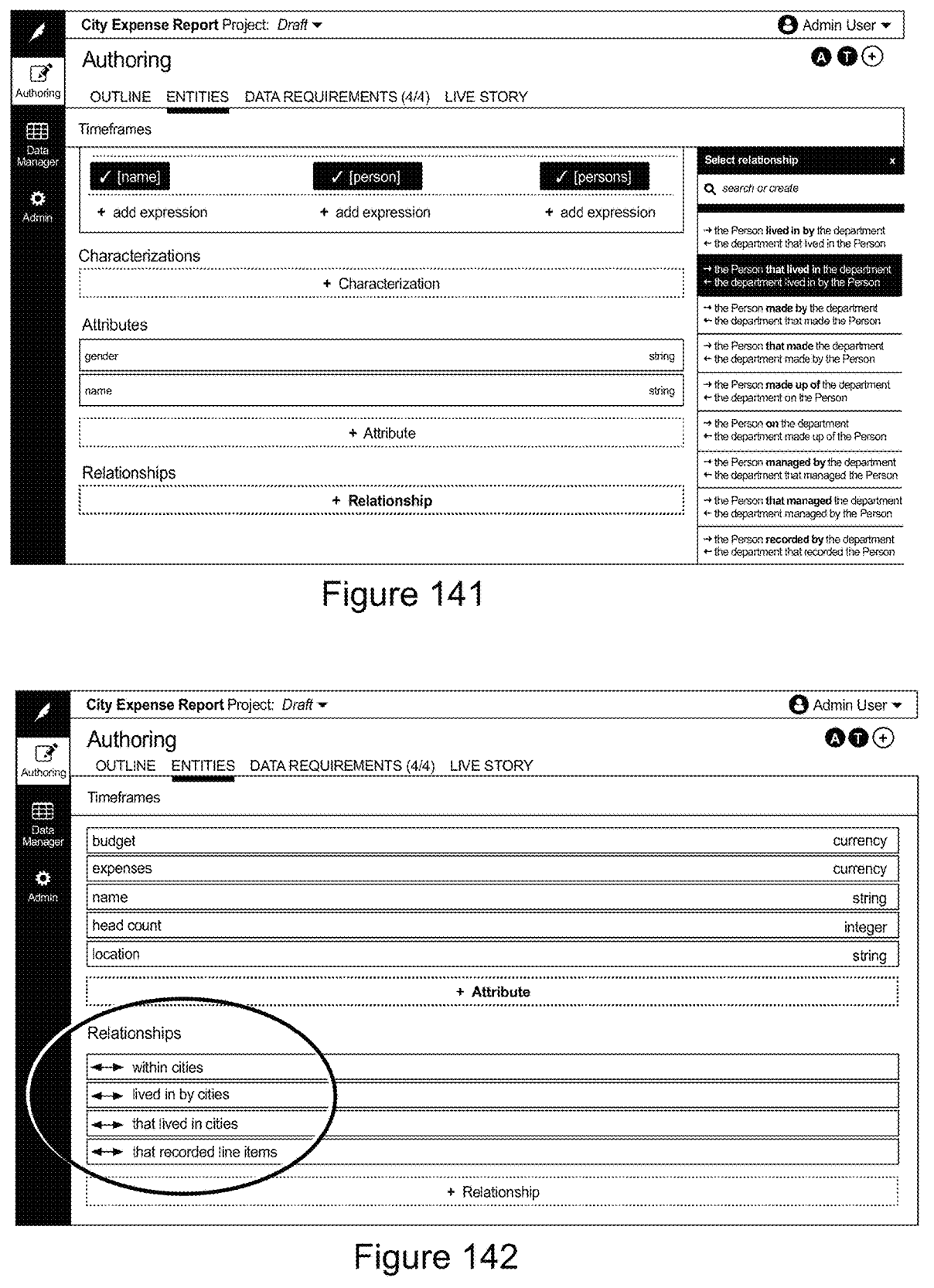

They can also be added to an existing Entity type by editing the Entity type in Authoring. FIG. 139 shows how a relationship can be added from the Entity type tile. FIG. 140 shows setting the related Entity type, and FIG. 141 shows choosing the relationships.

An Entity type can support multiple relationships. For example, Department has a relationship to City: "within cities"; and a relationship to Line Items: "that recorded line items" (see FIG. 142).

A4(ii)(a): Creating a Relationship

If the Relationships already set in Quill do not meet your needs, you can create your own. Type the relationship you want to create in the "search or create" textbox and click "Create new relationship" at the bottom of the sidebar (see FIG. 143).

After that, you will be taken through some steps that tell Quill how the new Relationship is expressed. Enter in the present tense and past tense forms of the Relationship, and Quill automatically populates the noun phrase that describes the relationship between the Entities (see FIG. 144).

Once you complete the steps for both directions of the relationship (see FIG. 145), Quill will apply the relationship to your Entity types and add the relationship to its library. You can use the Relationship again anywhere else in the project.

A4(iii): Characterizations

Characterizations are editorial judgments based on thresholds that determine the language used when certain conditions are met. Characterizations can be set on Entity types directly or when comparing Attributes on an Entity in a Communication Goal.

A4(iii)(a): Entity Characterizations

An Entity characterization allows you to associate descriptive language with an Entity type based on the performance of a particular Attribute. For example, you might want to characterize a Sales Person by her total sales (see FIG. 146).

Figures 146, 147:
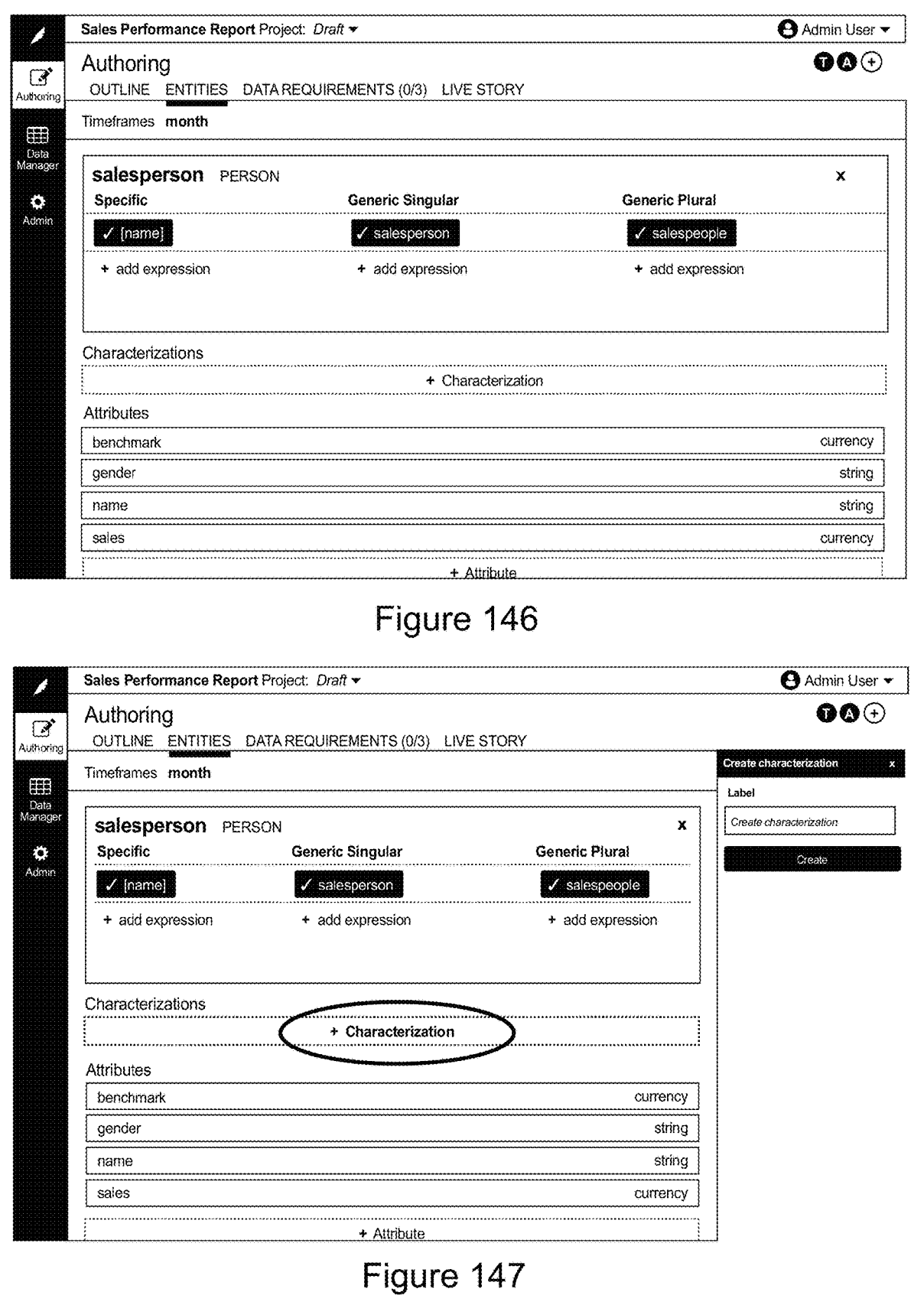

Click "+Characterization" to create a Characterization (see FIG. 147).

Once you've named and created the Characterization, you'll have to set the expressions for the Default outcome. Click the grey parts of speech to edit the expression in the sidebar (see FIG. 148).

Figure 149:
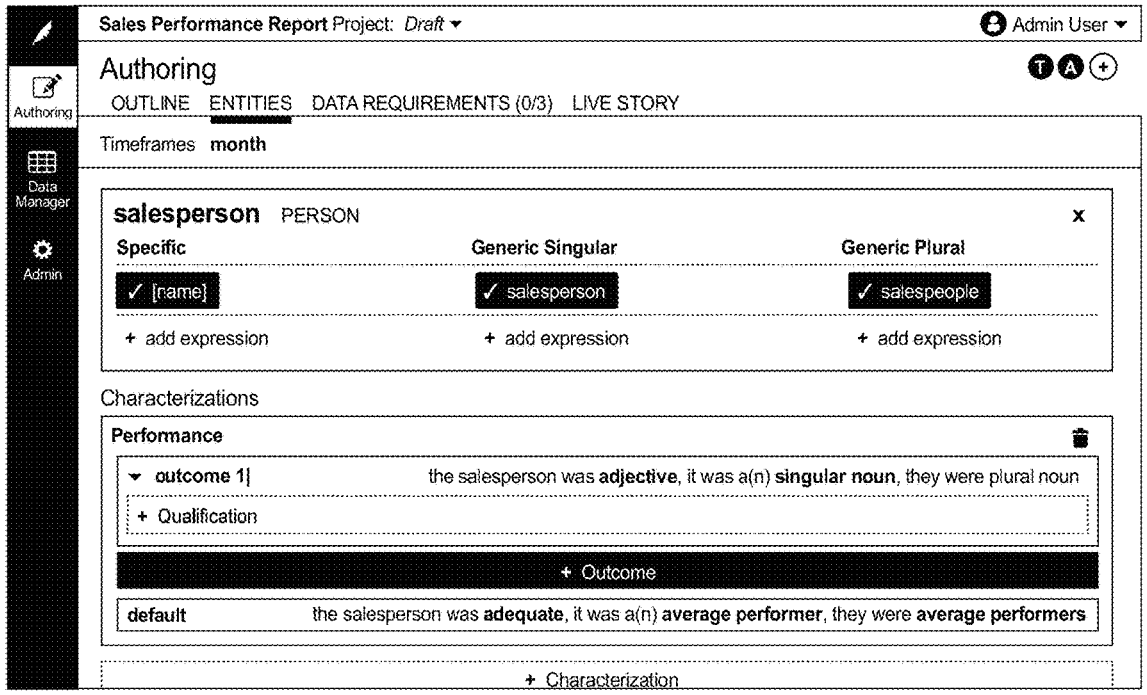
Figure 150:
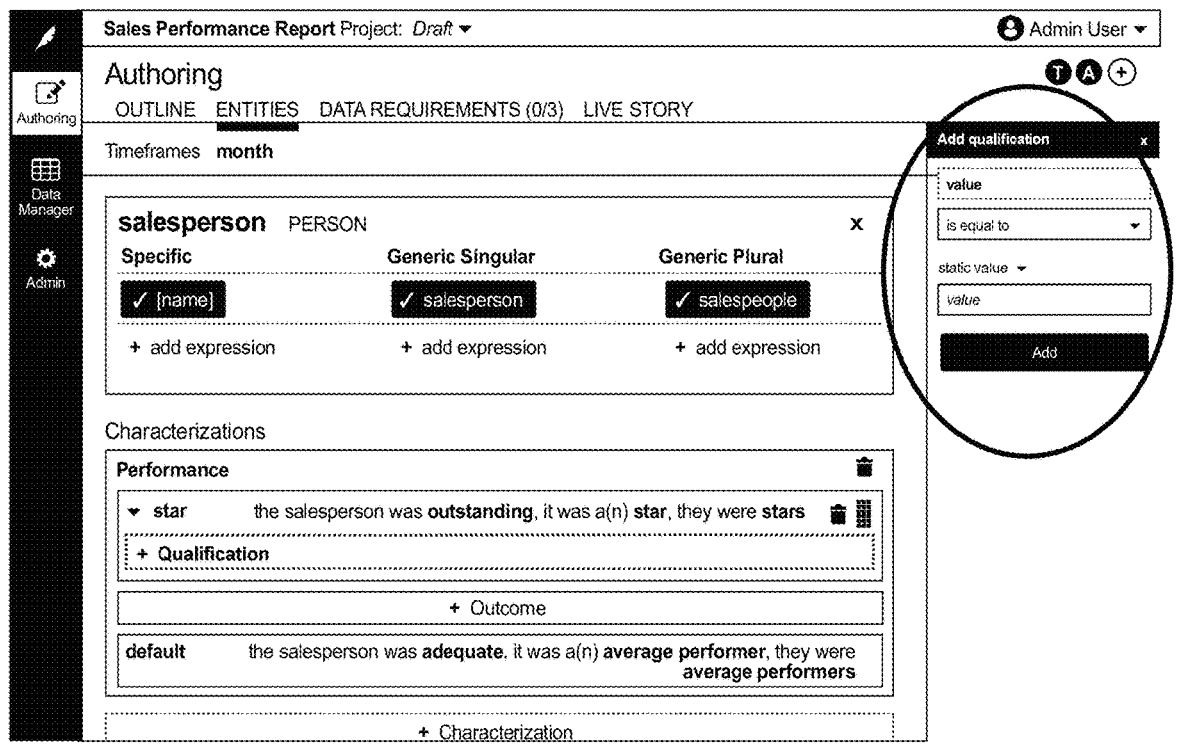
Figure 151:
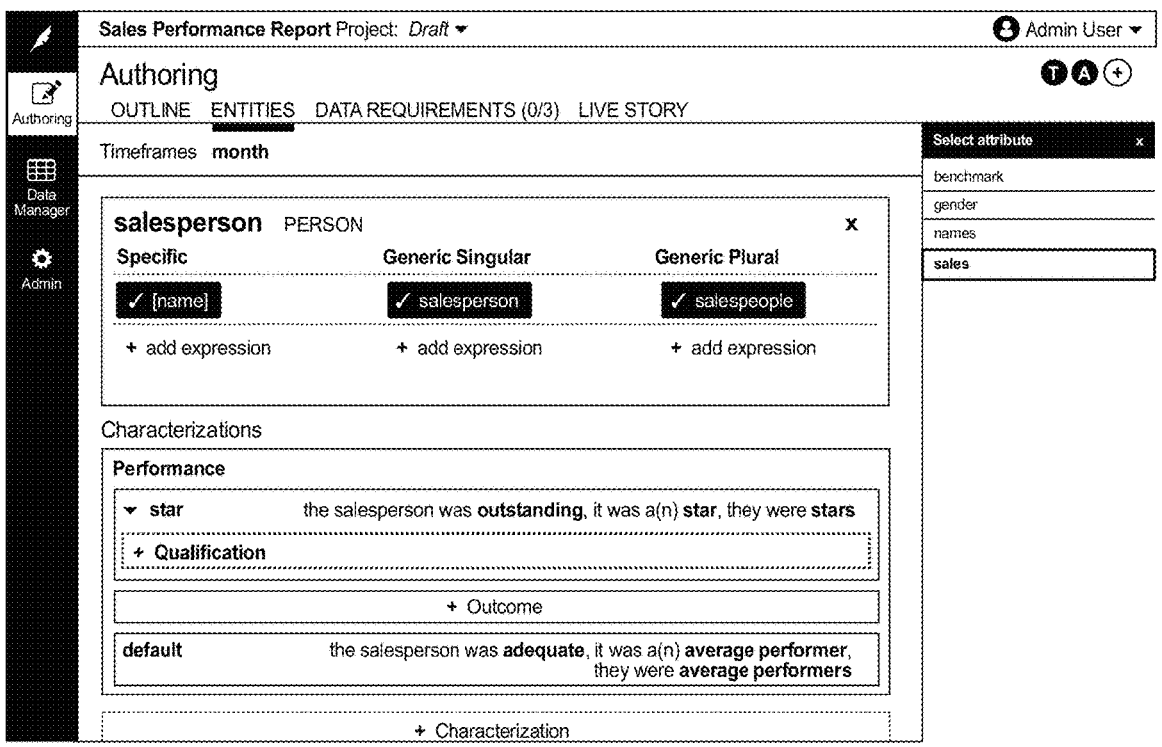

To add an Outcome, click "+Outcome" (see FIG. 149).

Change the Outcome label to describe the outcome. For this example, the Outcome label will be "Star" to reflect an exceptional sales performance. Again, edit the expressions by clicking on the grey parts of speech. In order for the outcome to be triggered under specific conditions, you need to add a Qualification (see FIG. 150).

Figures 152, 153:
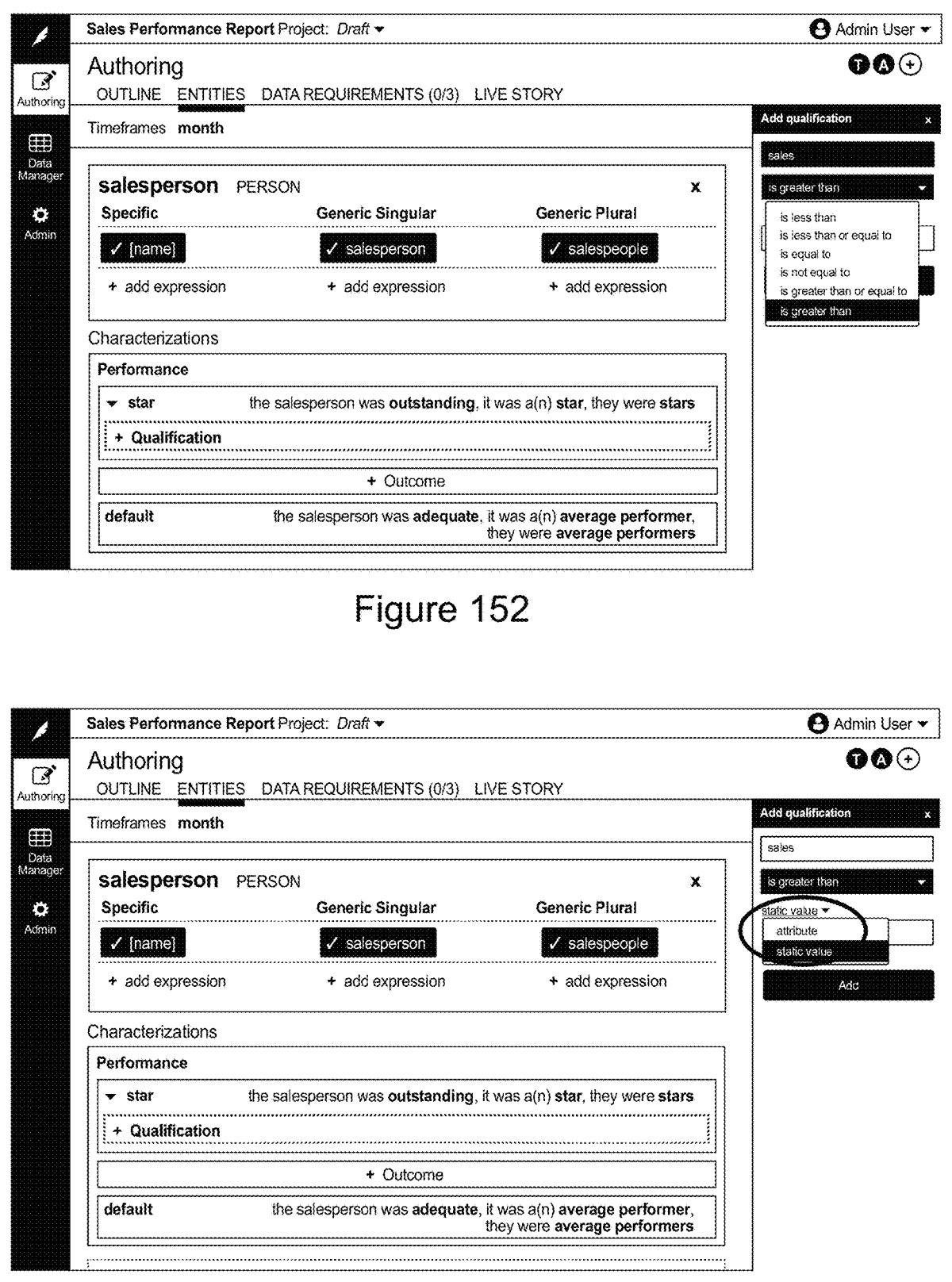

Click "+Qualification" to set the value to Sales (see FIG. 151) and the comparison as "greater than" (see FIG. 152).

You have a choice for comparing the value to an Attribute or a static value (see FIG. 153).

In this case, choose to keep it a static value and set the value to $10,000 (see FIG. 154).

Follow the same steps to create the lower bound outcome, setting the label as "laggard" and the static value to $1,000 (see FIG. 155).

Figure 156:
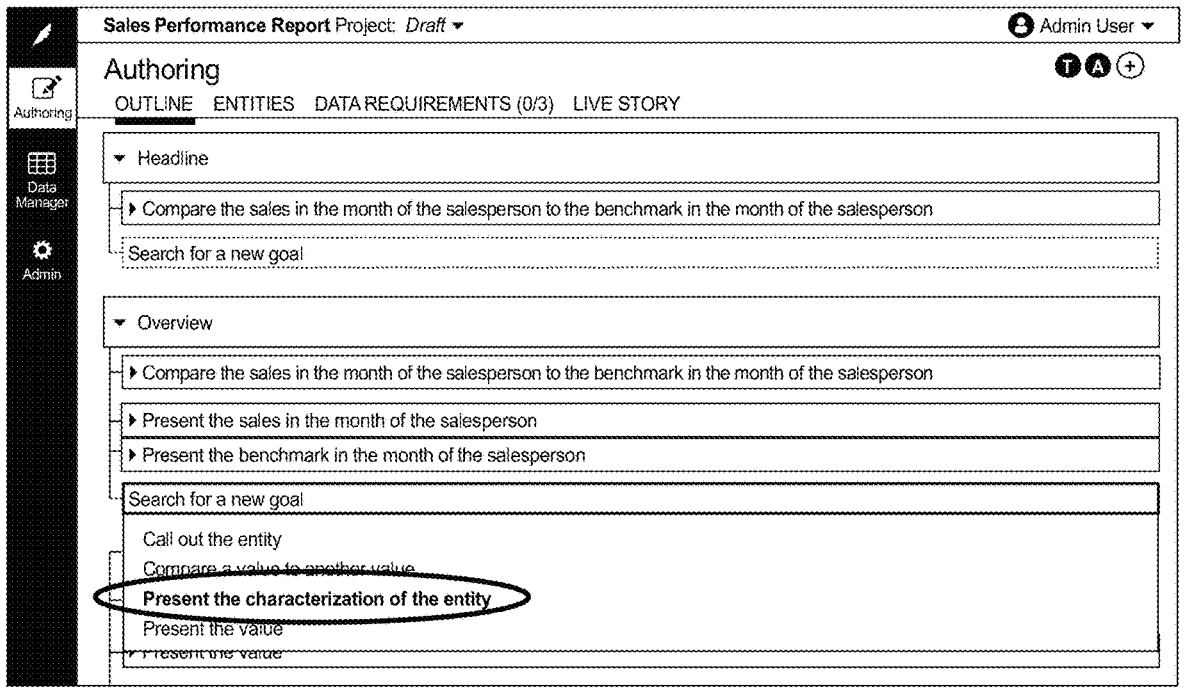

Once you have defined Characterizations on an Entity, you can include them in your story by using the Present the Characterization of the entity Communication Goal (see FIG. 156).

A4(iii)(b): Assessment Characterizations

Figure 157:
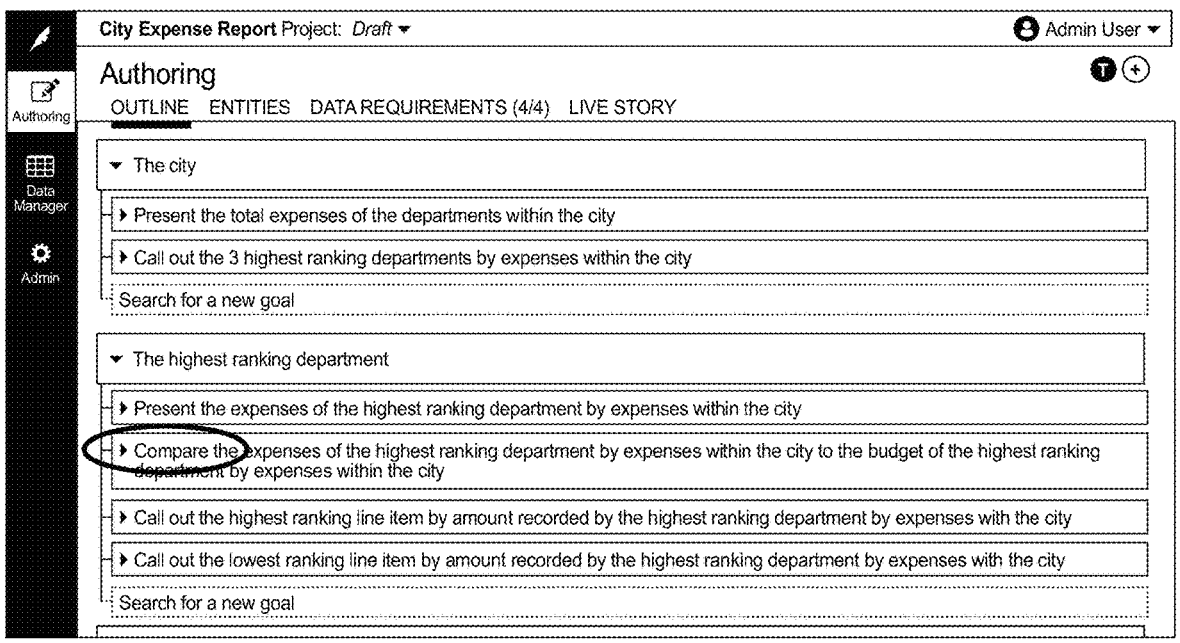

To set the characterizations on a comparative Communication Goal, expand the arrow to the left of the Communication Goal (see FIG. 157).

This exposes the list of available subgoals (see section below). At the bottom of this list is a goal to assess the difference between the attributes. Check the box to expose the thresholds applied to the comparison (see FIG. 158).

Quill has default thresholds to determine the comparative language for each outcome. These thresholds can be changed by entering different values into the boxes. If a value is changed to be less than the upper bound or greater than the lower bound of a different outcome, Quill will adjust the values so that there is no overlap (see FIG. 159).

There is also default language to correspond with each of the possible outcomes. This can also be changed to suit your particular needs and the tone of your story. Click on the green, underlined text to open a sidebar to the right where you can add additional expressions and set which expression you would like to be the primary characterization (see FIG. 160).

You can also opt into and out of particular expressions. However, in the example of Appendix A, you cannot opt out of whichever expression is set as the primary characterization. If you have multiple expressions associated with the outcome (see FIG. 161), Quill will alternate between them at random to add Variability to the language. These additional expressions will be tied to the specific Communication Goal where you added them and will not appear for others. You can also opt into and out of particular expressions, as well as delete them using the x. However, in the example of Appendix A, you cannot opt out of whichever expression is set as the primary expression.

Figure 162:
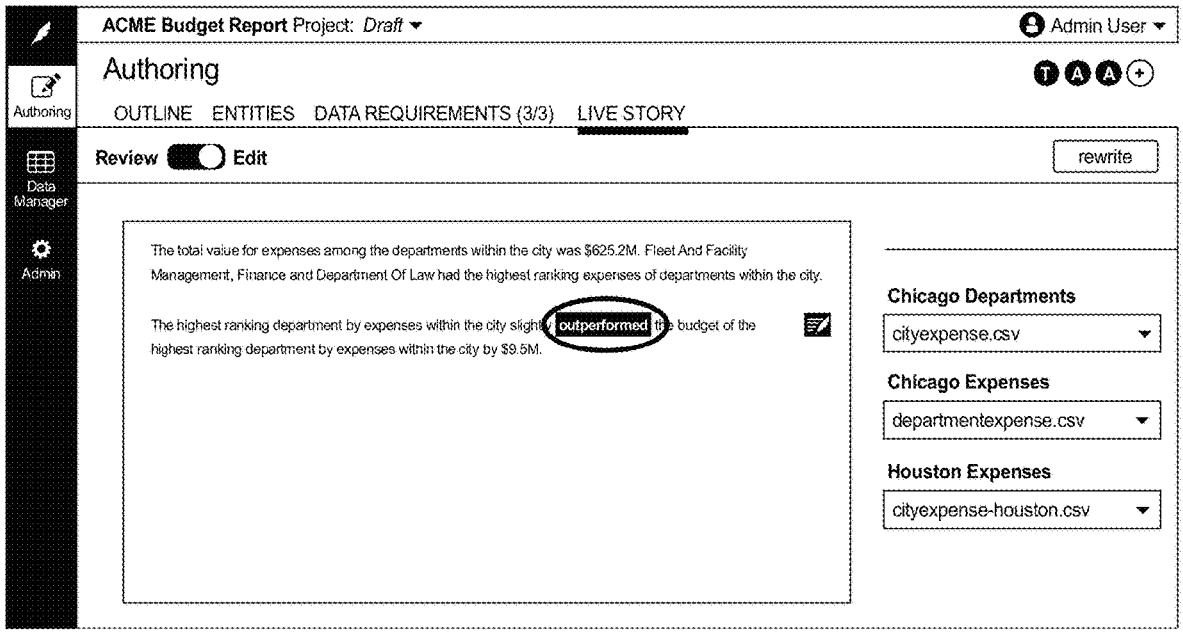
Figure 163:
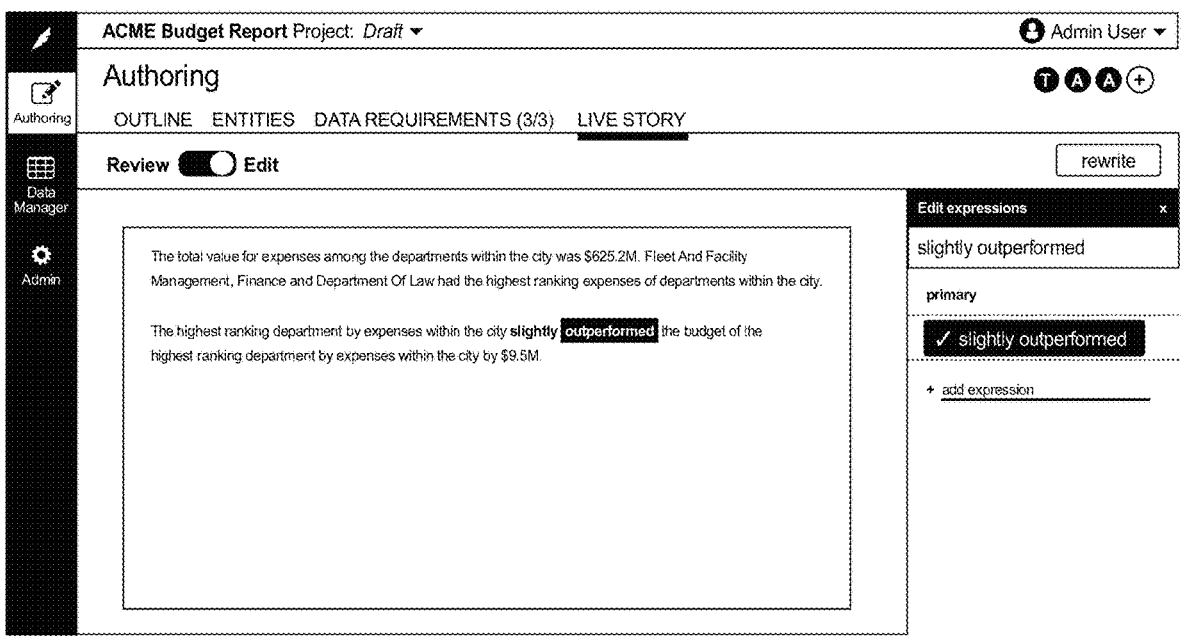

These expressions can also be edited in Edit mode in Live Story (see FIGS. 162 and 163).

A4(iv): Attributes

An Attribute is a data-driven feature on an Entity type. As described above, Quill will express a specified Attribute with the corresponding value in the data based on your Communication Goal. Quill also supports adding modifiers to attributes in order to perform calculations on the raw value in the data.

A4(iv)(a): Attribute Values

Figure 164:
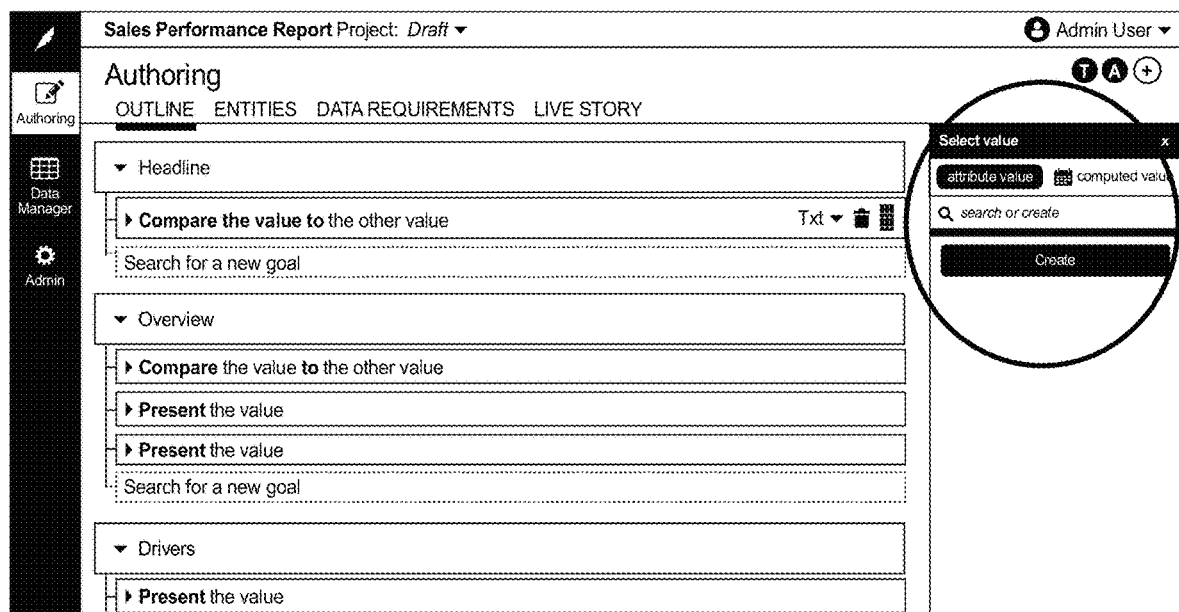
Figure 165:
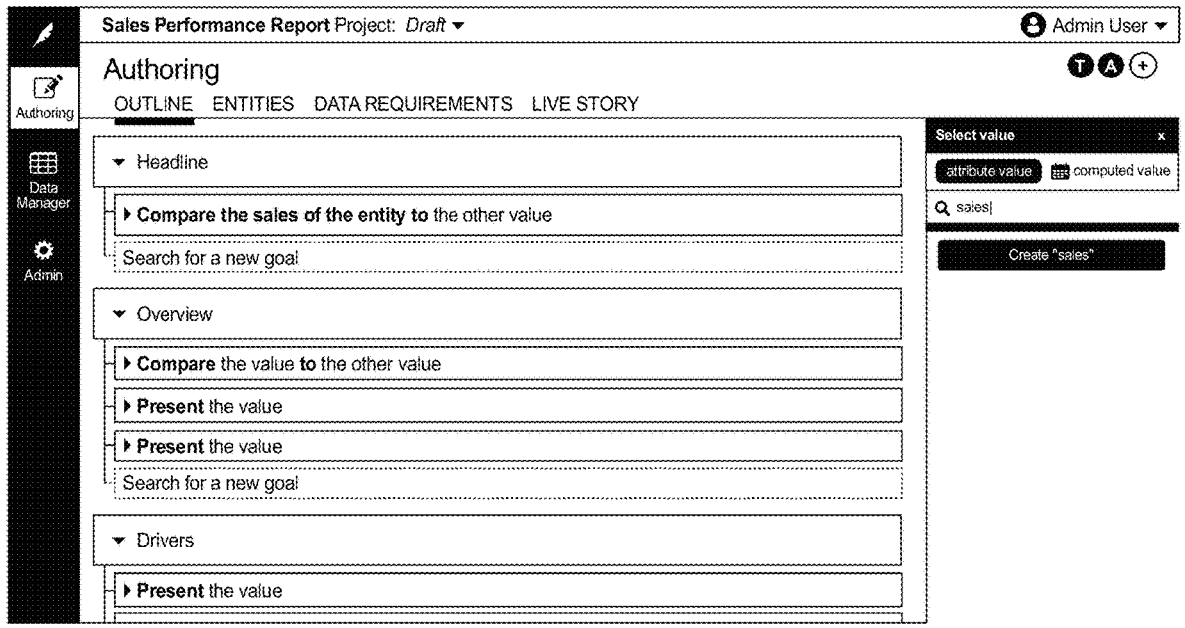
Figure 166:
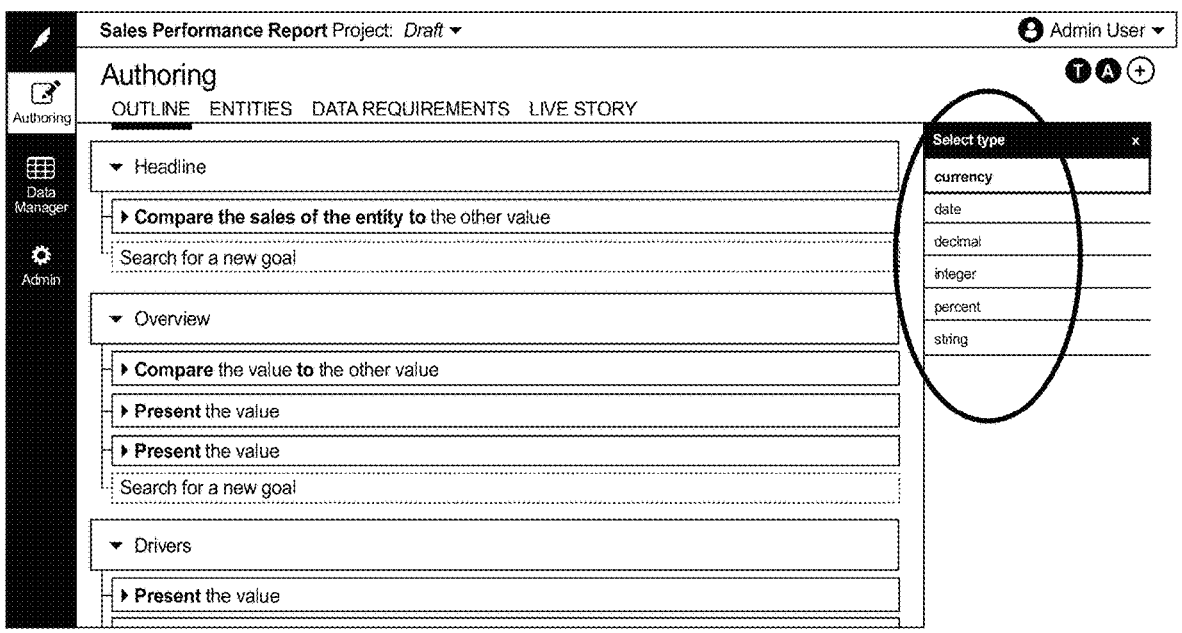
Figure 167:
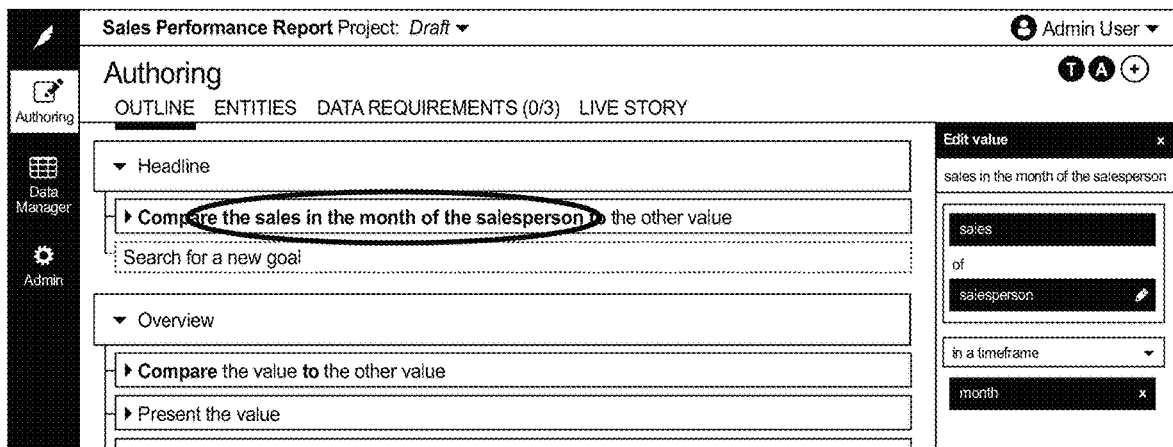

Attribute Values are those values that are taken directly from your data. In other words, no computations are performed on them. An example is the Name of the City. If there is a value in the data for the total expenses of the city, Quill pulls this value directly and performs no computations, unless a data validation rule is applied e.g. "If null, replace with Static Value." which is set in the Data Requirements when mapping the Outline's information needs to your Data View. FIG. 164 shows an attribute creation sidebar. FIG. 165 shows creating an attribute value in the attribute creation sidebar. FIG. 166 shows setting the type of an attribute in the attribute creation sidebar. FIG. 167 shows a completed attribute in a communication goal.

Figure 168:
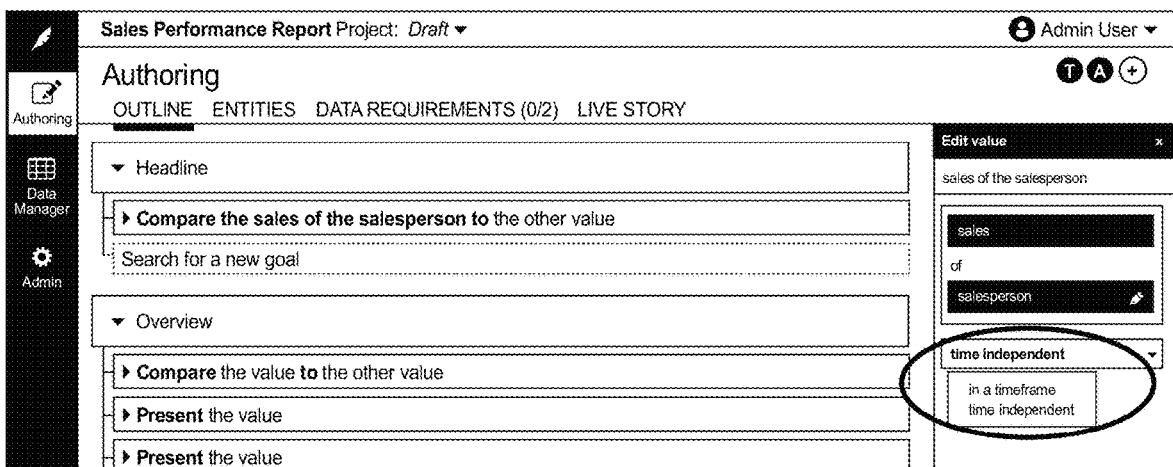
Figure 169:
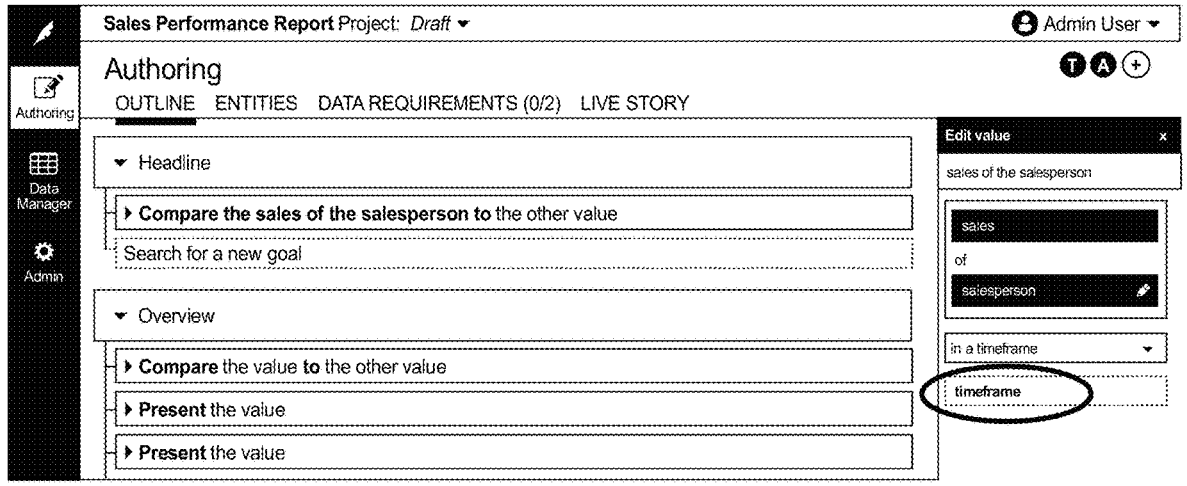
Figure 170:
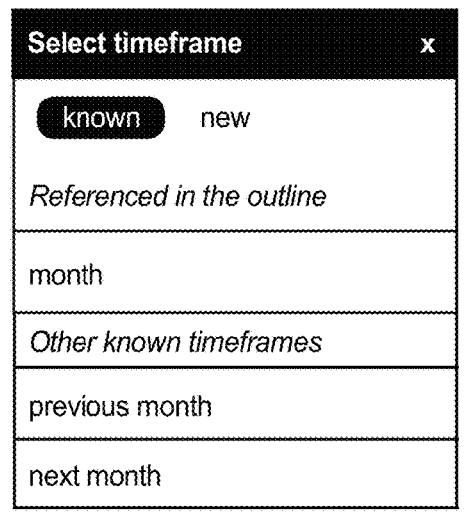

You also have the option of specifying a Timeframe (see FIGS. 168 and 169).

This allows you to restrict the window of analysis to a particular day, month, or year.

Create a new Timeframe by selecting one of those three options. Once you've done this, Quill also recognizes the "previous" and "next" instances of that Timeframe (see FIG. 170). In other words, if you create a day Timeframe, Quill will populate the list of known Timeframes with day, along with previous day and next day.

A4(iv)(b): Computed Attributes

On the other hand, if the total expenses of the city are calculated by taking the sum of the expenses for each department, Quill allows you to create a Computed Value. Computed Values allow you to compute new values from values in your data and use them for group analysis.

Computed Values can be aggregations or functions. Aggregations include count, max, mean, median, min, range, total (see FIG. 171).

In the example of Appendix A, current functions are limited to contribution, which evaluates how much of an aggregate a component contributed (see FIG. 172).

Computed Values can be created from Present or Callout Communication Goals. When you create the attribute you are presenting or using to filter the group of Entities, click into the Computed Value tab to access the list of aggregations and functions.

A5: Configure a Story from Scratch

Quill allows you to build a story based on an existing blueprint or entirely from the ground up. To build a story specific to your needs, choose to create a Blank Project Blueprint and name it.

A5(i): The Outline

Figure 173:
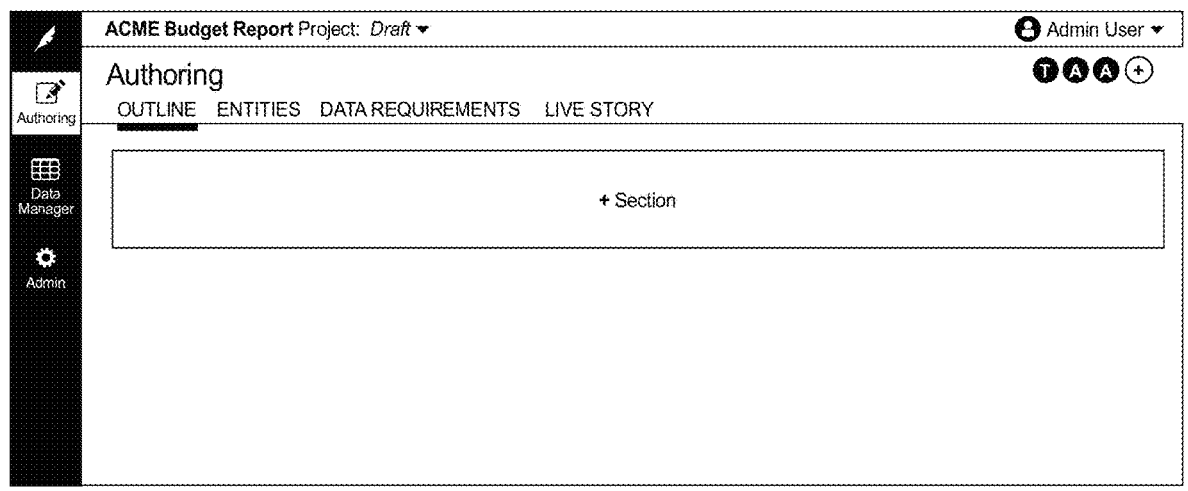

Once you've created your project, you'll be taken to the Outline (see FIG. 173).

The Outline is a collection of building blocks that define an overall Story. This is where you do the work of building your story.

A5(i)(a): Sections

Figure 174:
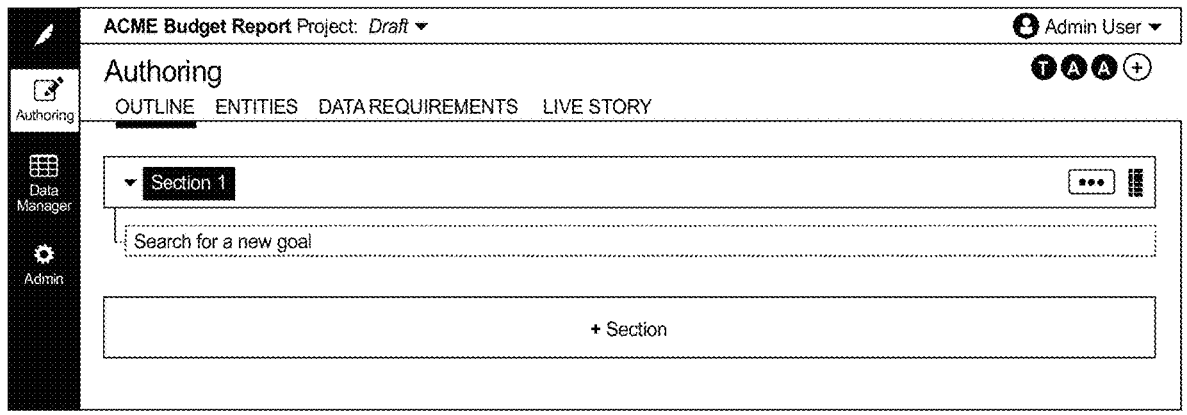

Create and name Sections to organize your story (see FIG. 174).

Once created, a Section can be renamed, deleted, or moved around within the outline. Sections are how Communication Goals are grouped together.

A5(i)(a)(1): Renaming a Section

Click the name of the Section and type in the new name.

A5(i)(a)(2): Deleting a Section

Figure 175:
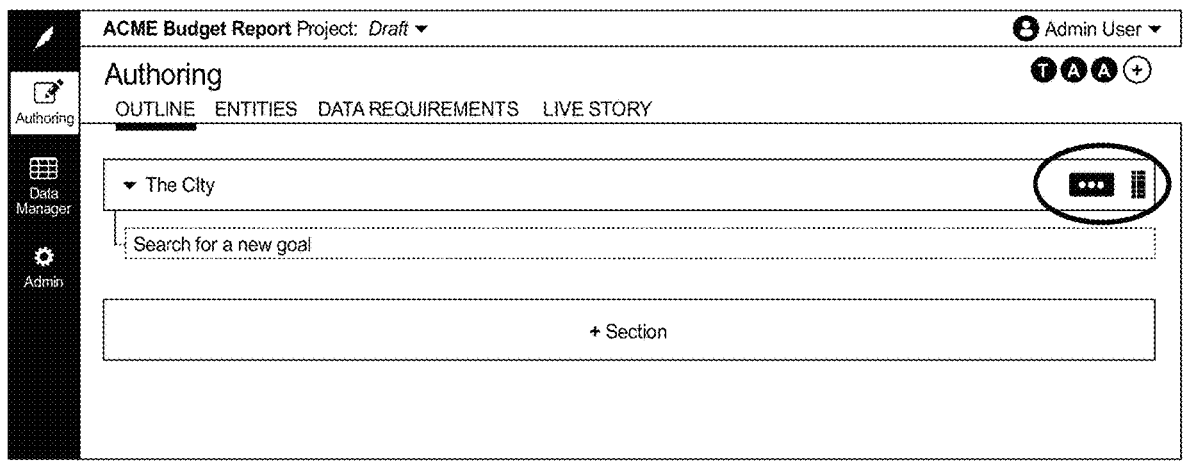

Hover your cursor over the Section you want to delete. On the right side, two icons will appear: an ellipses and a gripper icon (see FIG. 175).

Figure 176:
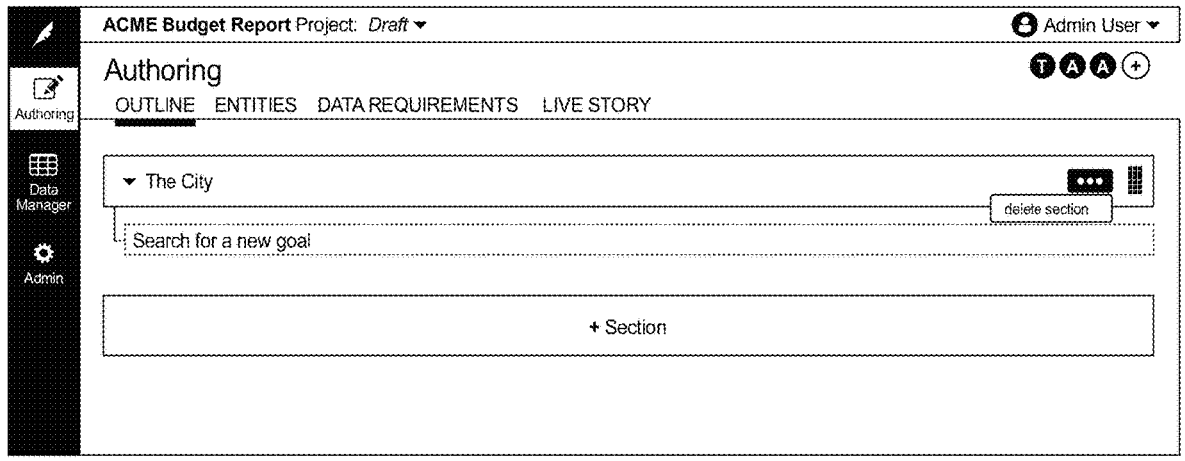

Click the ellipses to reveal the option to delete the Section (see FIG. 176).

If deleted the Section will disappear from the outline along with any Communication Goals it contains.

A5(i)(a)(3): Moving a Section

Figure 177:
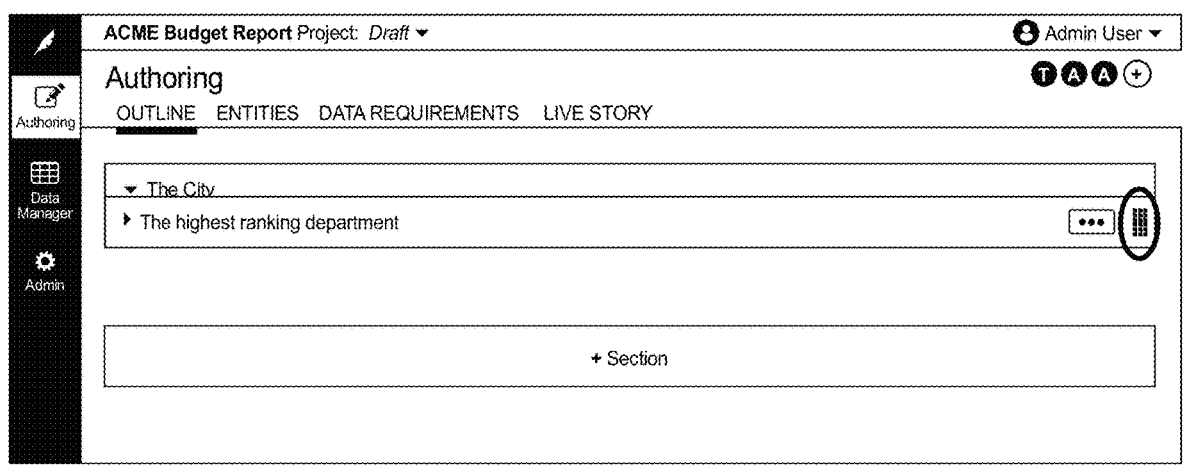

As above for deleting a Section, hover your cursor over the Section you want to move. Click and hold the gripper icon (see FIG. 177) to drag the Section where you want to move it and let go.

A5(i)(b): Communication Goals

Communication Goals provide a bridge between analysis of data and the production of concepts expressed as text. In other words, they are the means of expressing your data in language.

A5(i)(b)(1): Creating a Communication Goal

Figure 178:
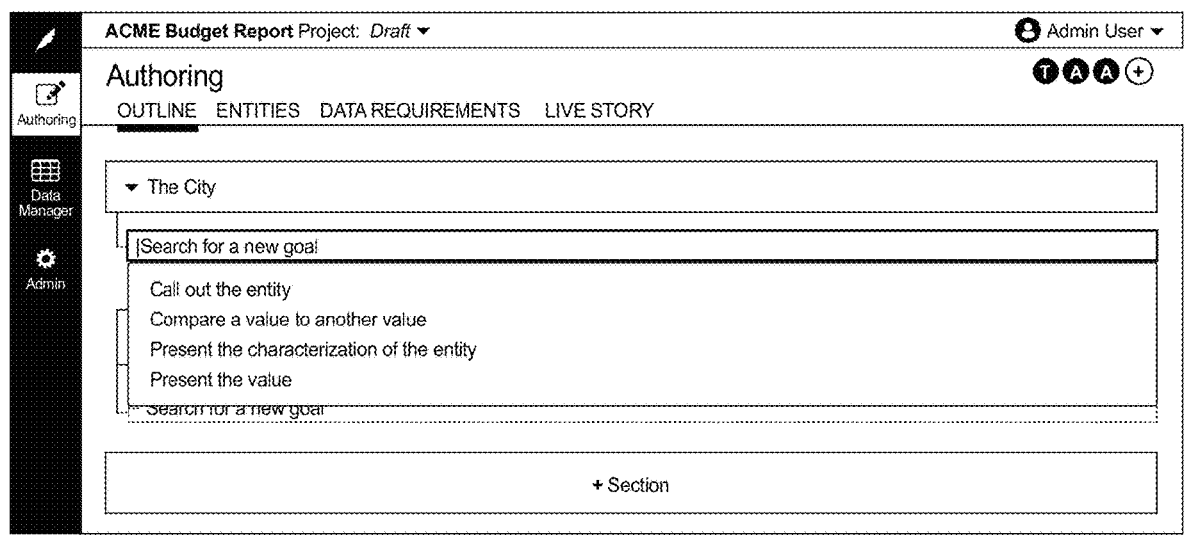

Click the text box where it says to Search for a new goal. Choose the Communication Goal you'd like to use (see FIG. 178).

A5(i)(b)(1)(A): Entity Types

Depending on the Communication Goal you choose, you will have to set the Entity type or types it is talking about. An Entity type is any primary "object" which has particular Attributes. An example is that a Department (Entity type) has Expenses (Attribute). An Entity is a specific instance of an Entity type, with data-driven values for each Attribute.

Figure 179:
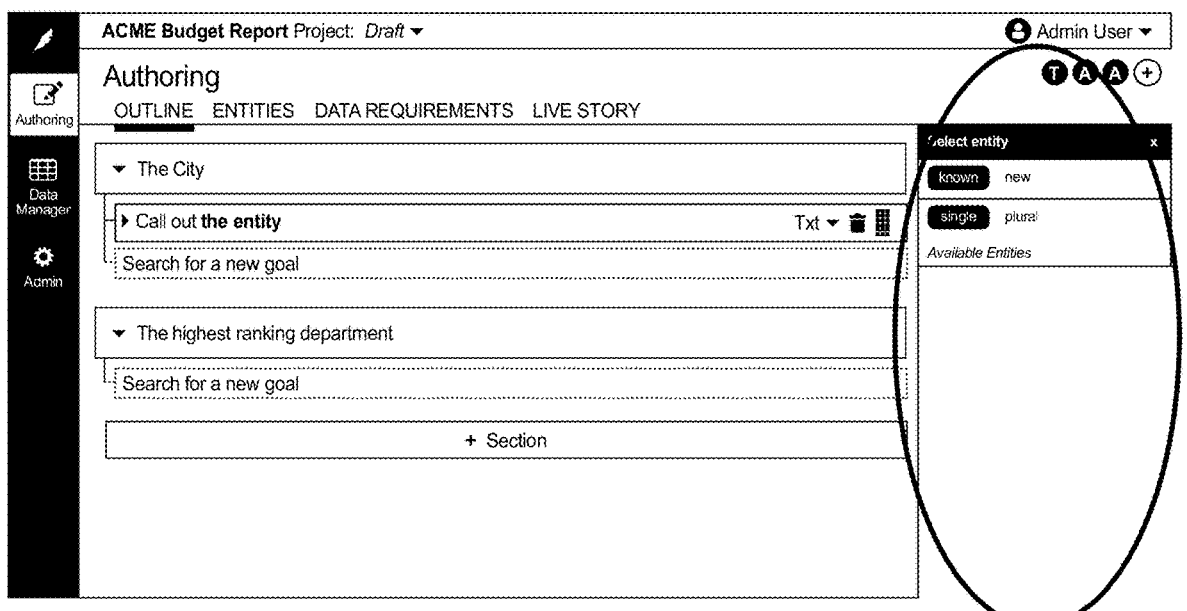

In the example of the Communication Goal "Call out the entity", the example embodiment for Quill of Appendix A requires that an Entity type be specified. What, in your data, would you like to call out? Click "the entity" in the Communication Goal to open a sidebar to the right (see FIG. 179).

Here you can select among Entity types that already exist or create a new one. Available entities include entities created from the outline or the entities tab (including any characterizations).

A5(i)(b)(1)(B): Creating an Entity Type

Figure 180:
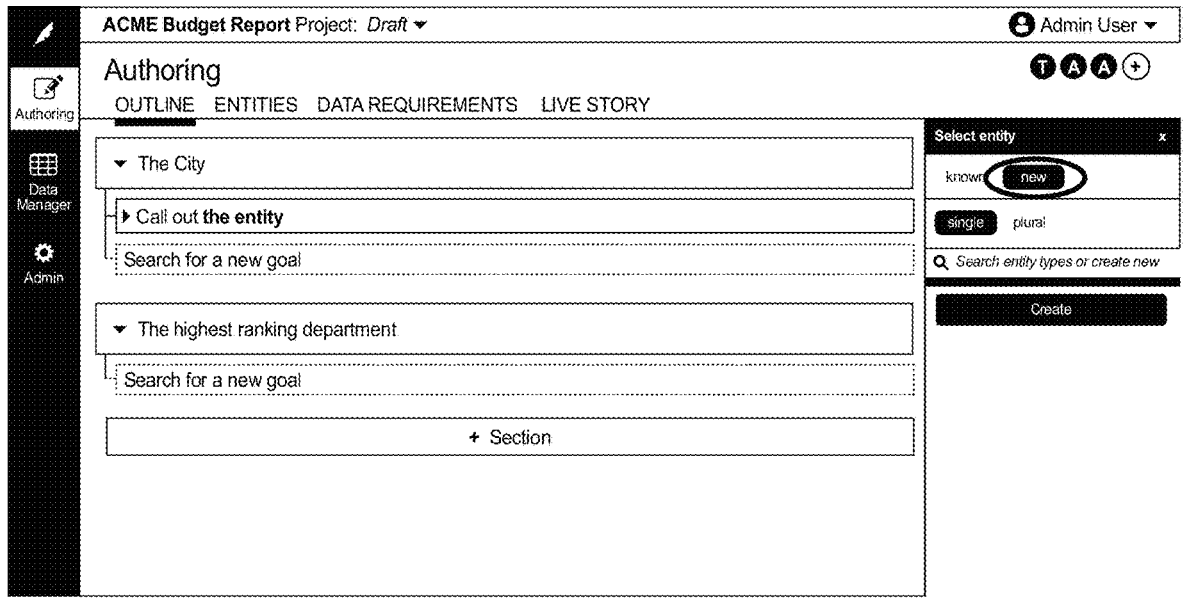
Figure 181:
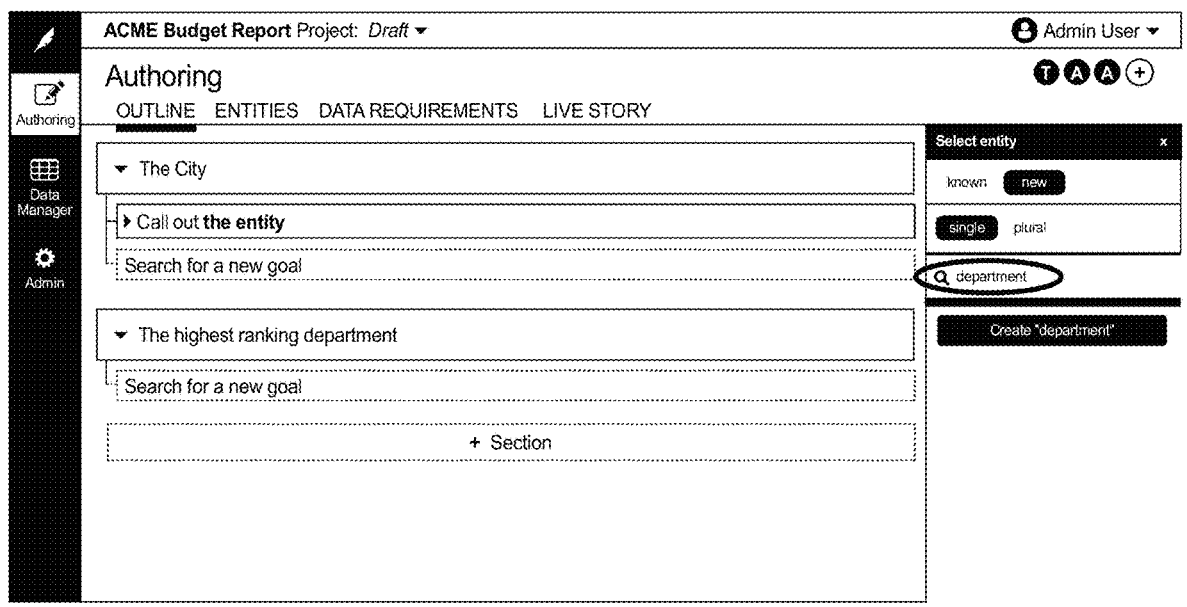
Figure 182:
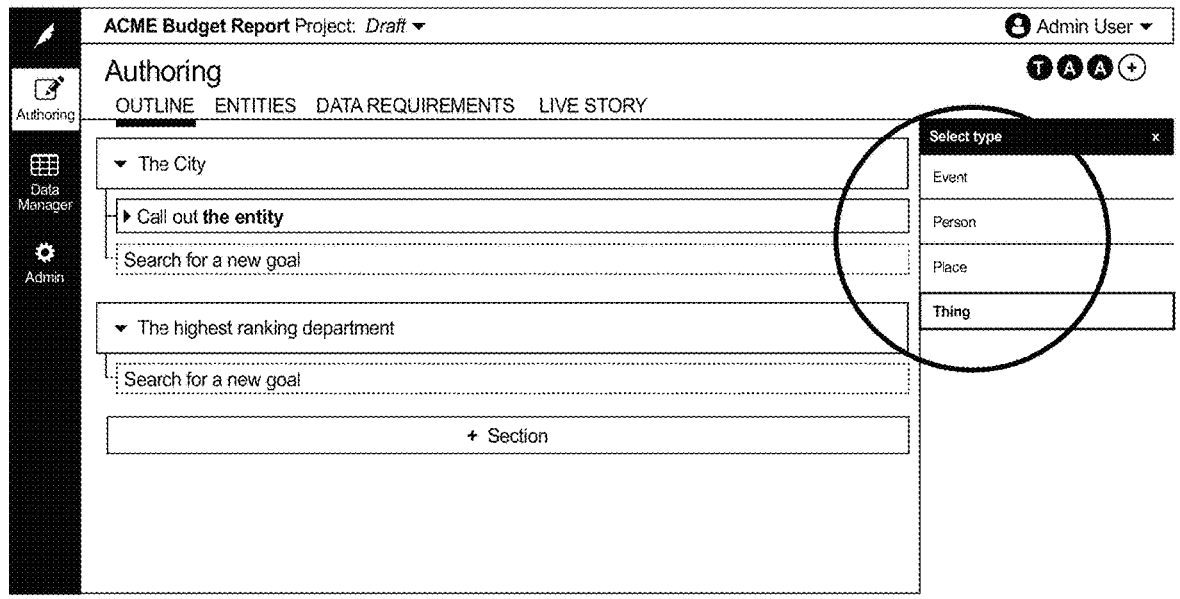
Figure 183:
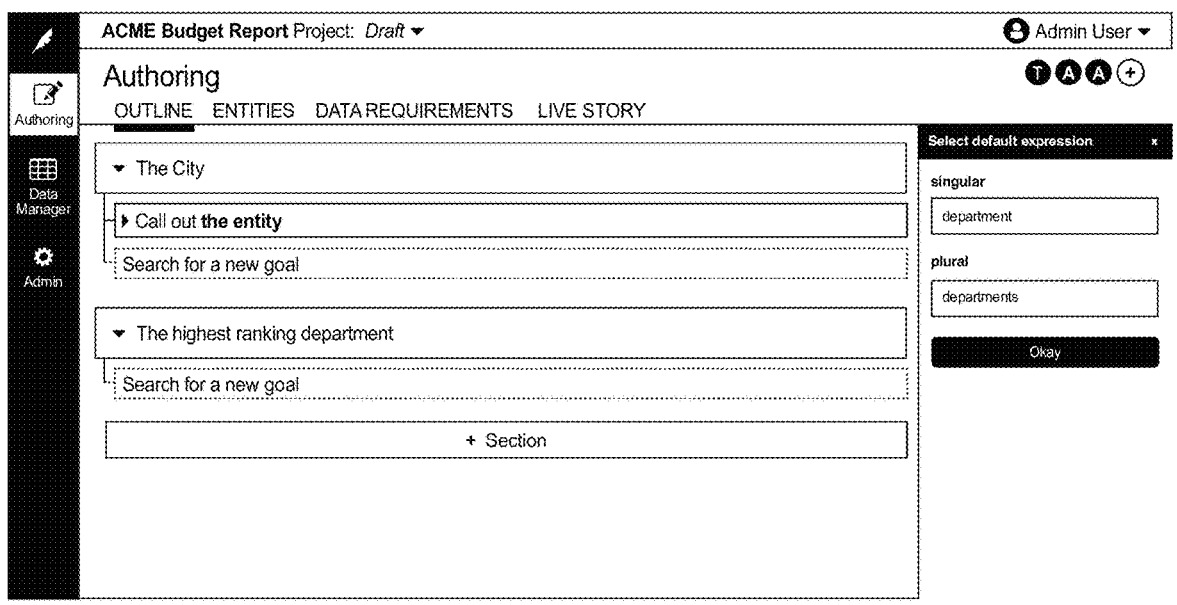
Figure 184:
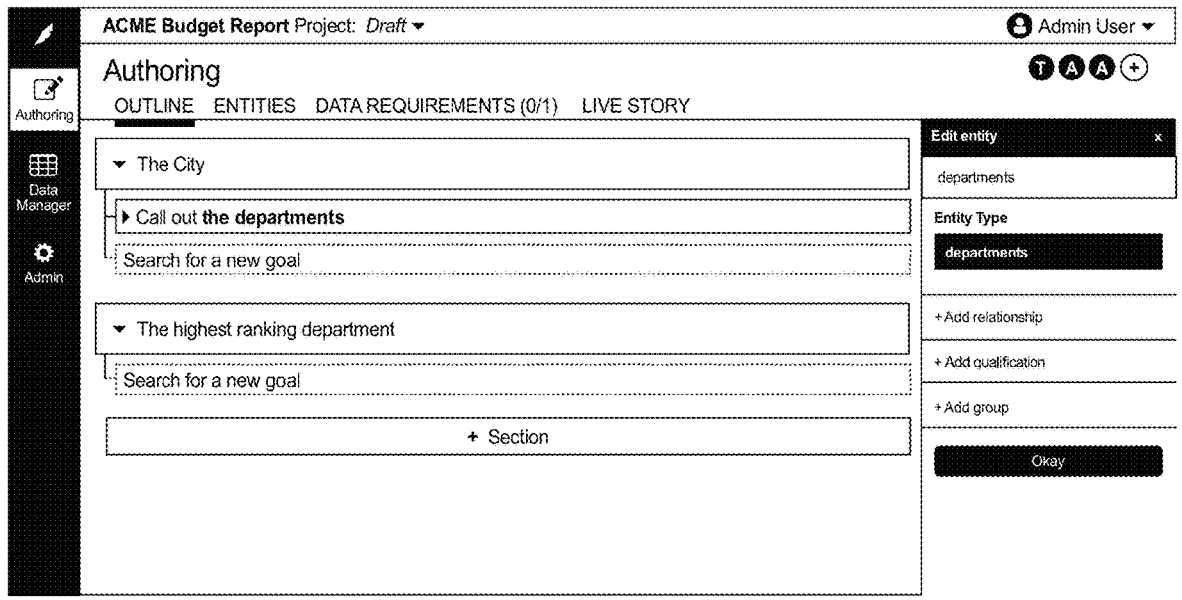

Click "new" in the Entity sidebar (see FIG. 180). Then choose from existing Entity types or create a new one. Set whether the Entity type is singular or plural (see FIG. 181). Once you have created the Entity type, you will be asked to set its base Entity type: Event, Person, Place, or Thing (see FIG. 182). Next, set the plural and singular expressions of the Entity type (see FIG. 183). Quill takes an educated guess at this, but you have the opportunity to make changes. Next you will designate any relationships, group analysis, or qualification pertaining to the Entity type (see FIG. 184).

Figure 185:
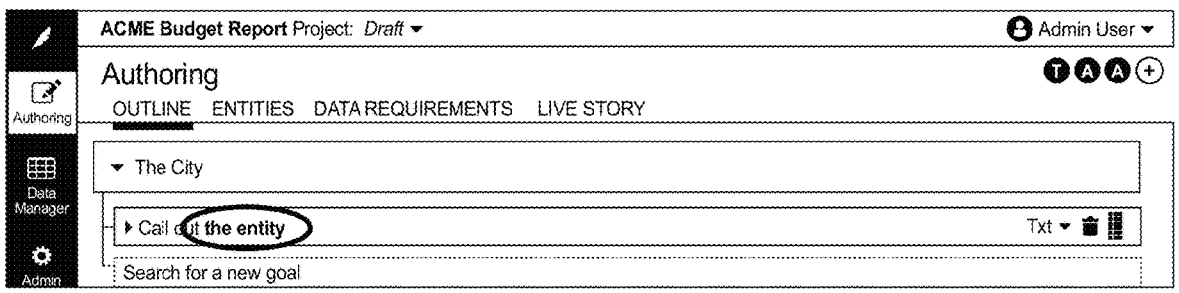
Figure 186:
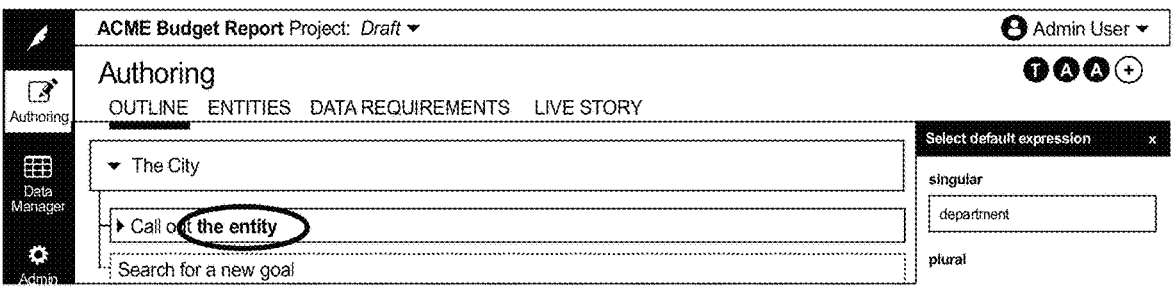
Figure 187:
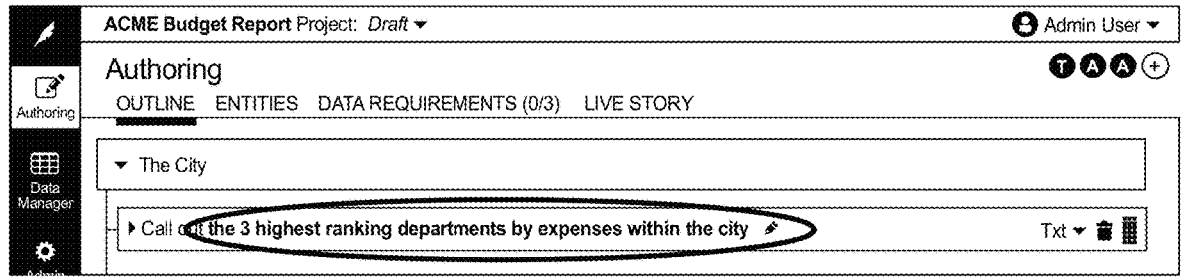

Quill lets you know the state of an Entity type, whether it is unset, in progress, or valid based on the appearance of the Entity type in the Communication Goal. The Entity type appears grey when unset (see FIG. 185), blue when being worked on (see FIG. 186), and green when valid (see FIG. 187).

Figure 188:
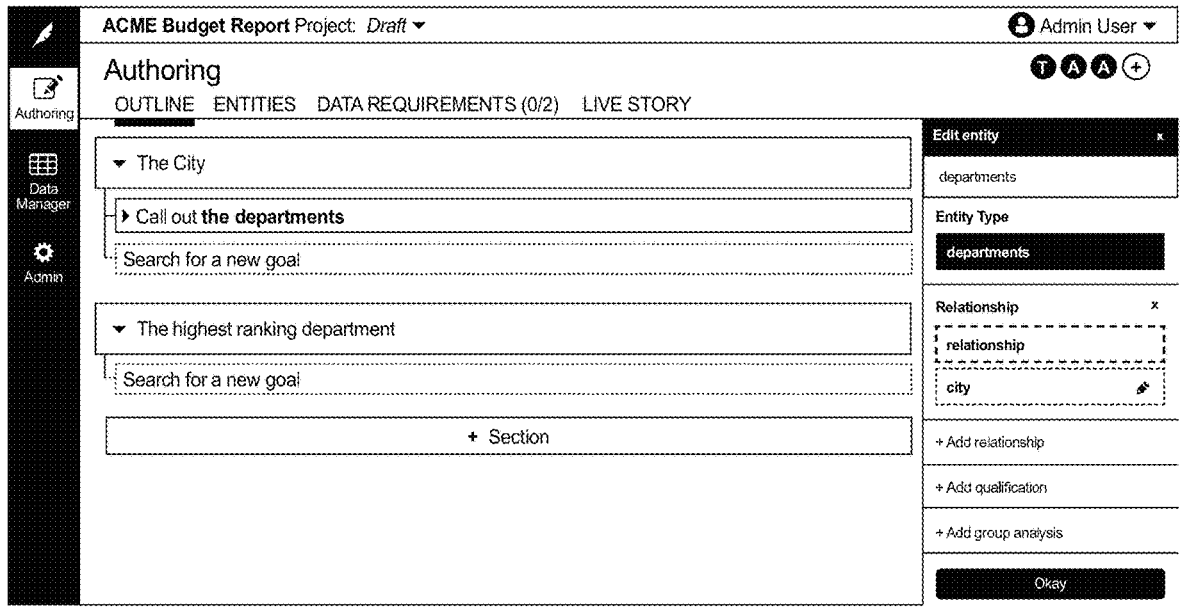
Figure 189:
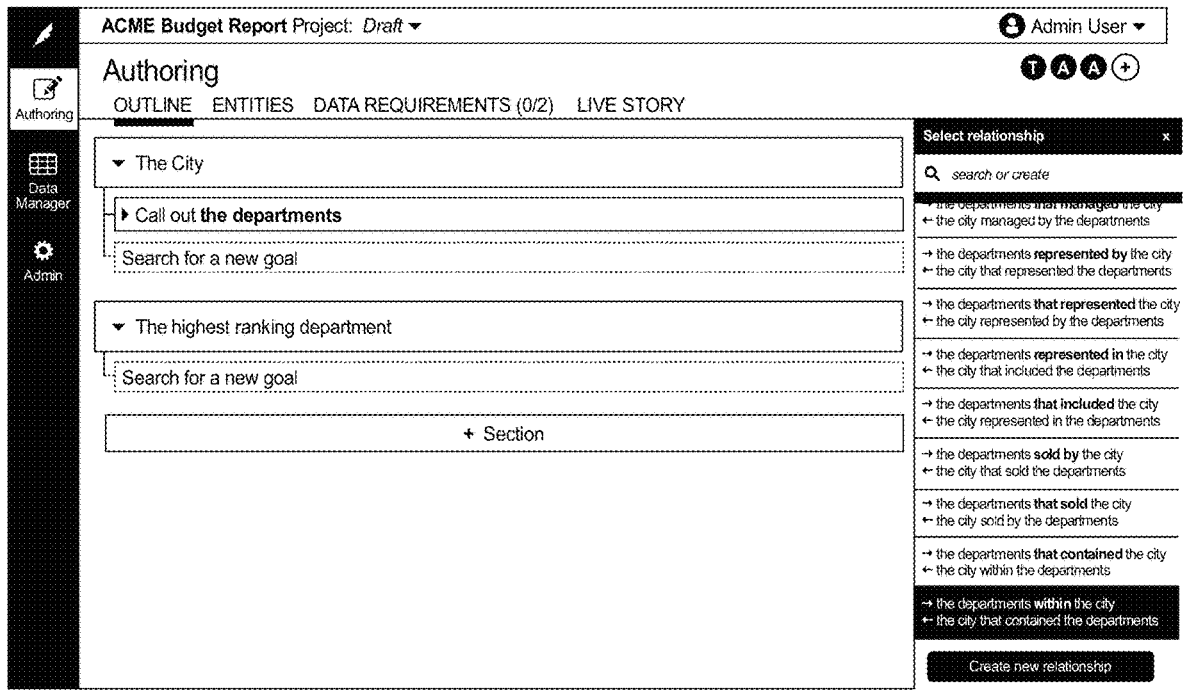
Figure 190:
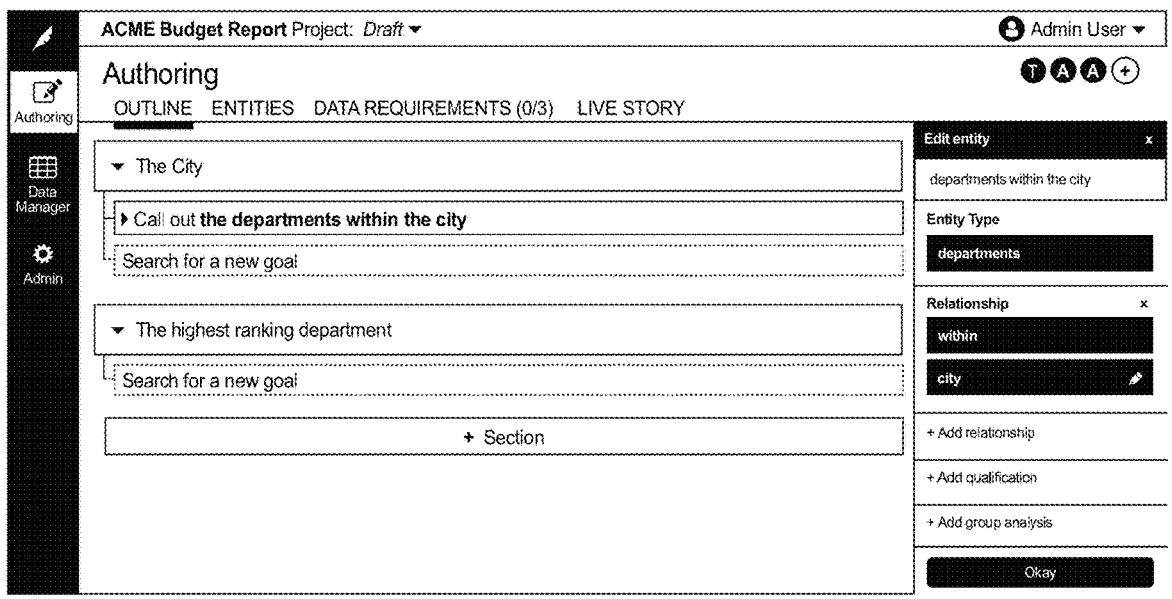

Adding a relationship allows you to tell Quill that an Entity is related to another Entity. To do so, choose to Add Relationship as you create your Entity type. Then set or create the Entity type that this Entity has a relationship to (see FIG. 188). Quill suggests a number of relationships from which you can choose, including "lives in", "managed by", "within", and more. FIG. 189 shows a list of available relationships between two entities (department and city). FIG. 190 shows an entity with a designated relationship. You can also create Relationships that will be added to the library.

Figure 191:
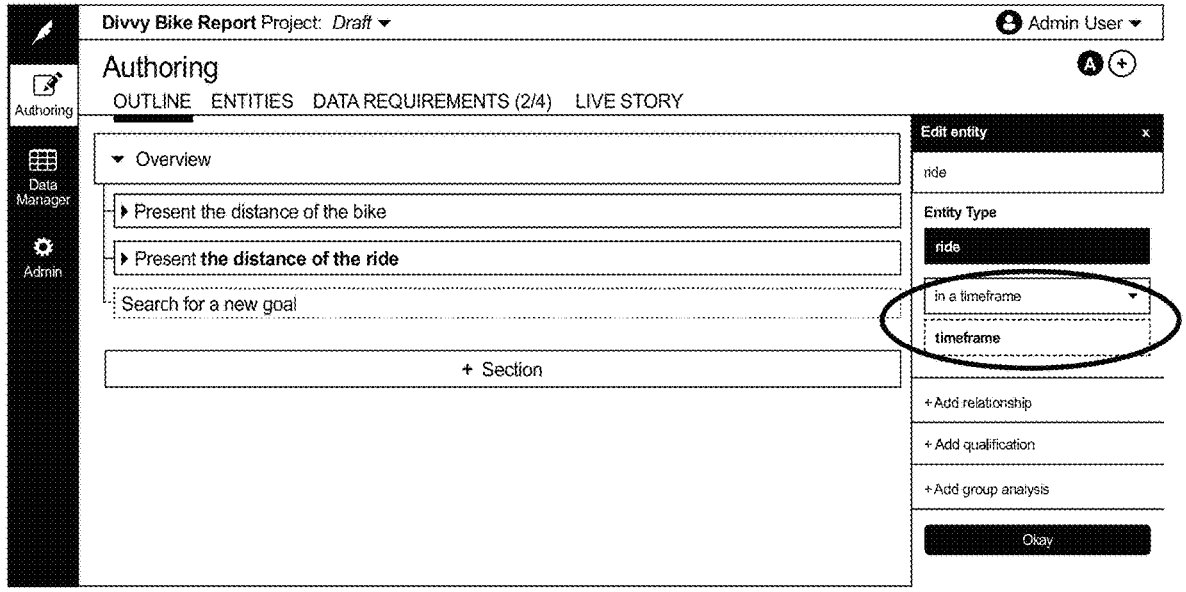
Figure 192:
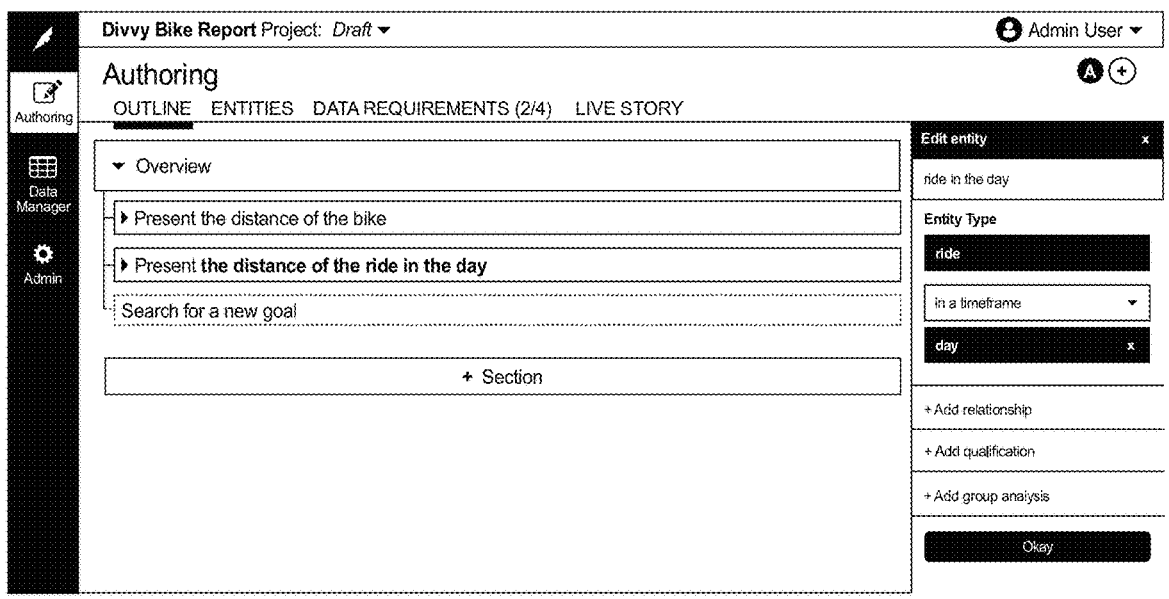

When creating an Entity type of the base type event (see FIG. 191), Quill will prompt you to set a timeframe for it to associate the event with (see FIG. 192).

A5(i)(b)(1)(C): Creating a Relationship

Figure 193:
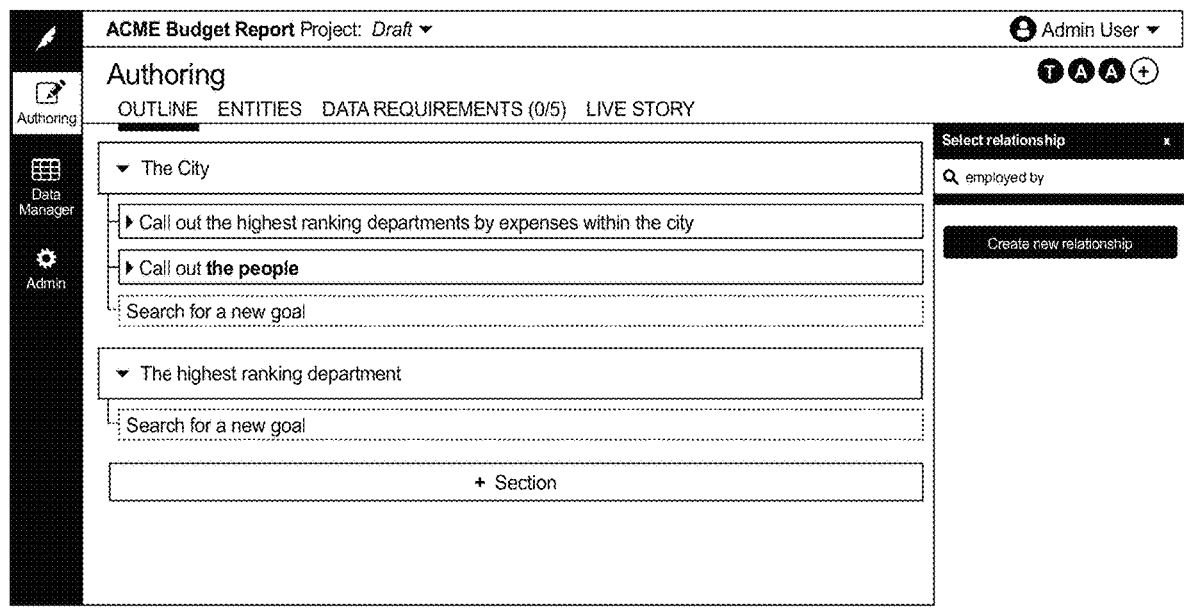

If the Relationships already set in Quill do not meet your needs, you can create your own. Type the relationship you want to create in the "search or create" textbox and click "Create new relationship" at the bottom of the sidebar (see FIG. 193).

Figure 194:
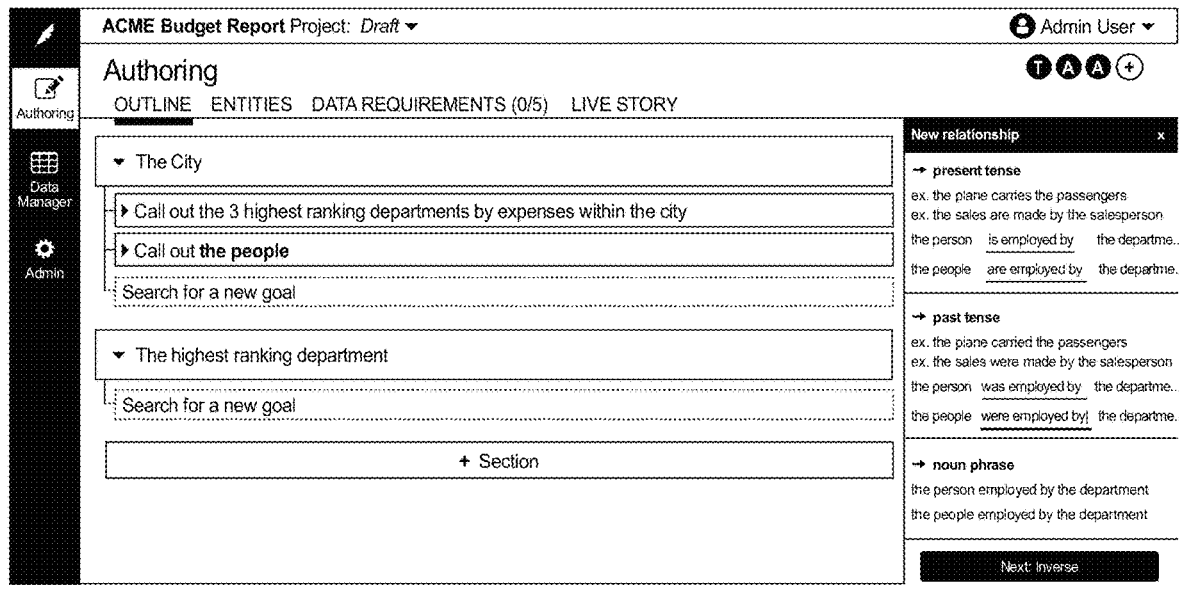

After that, you will be taken through some steps that tell Quill how the new Relationship is expressed. Enter in the present tense and past tense forms of the Relationship, and Quill automatically populates the noun phrase that describes the relationship between the Entities (see FIG. 194).

Figure 195:
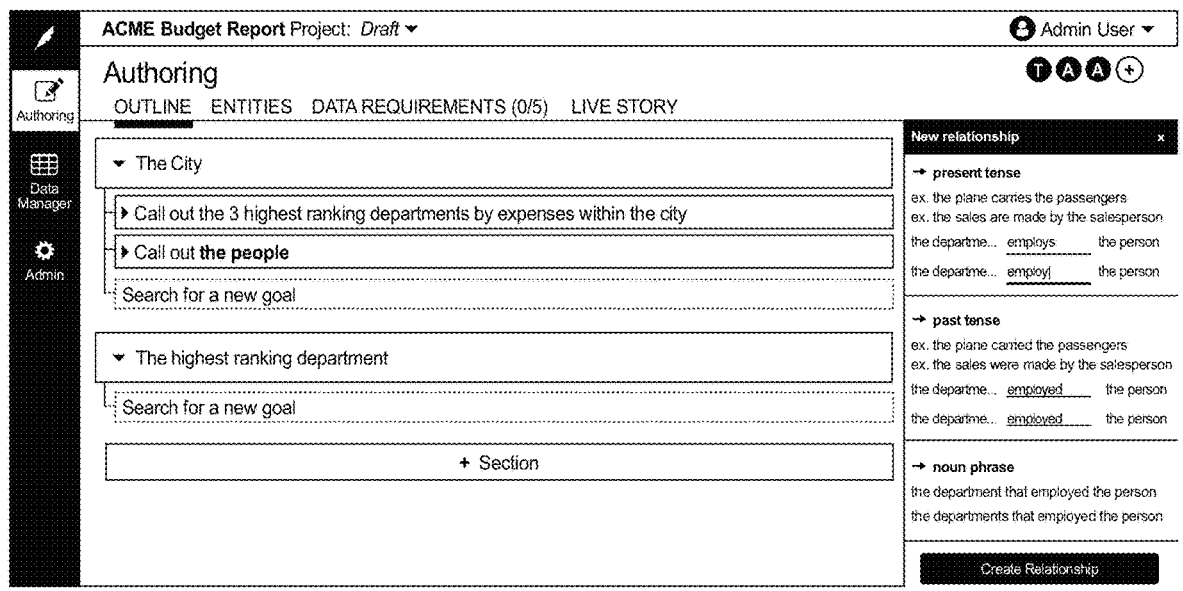
Figure 196:
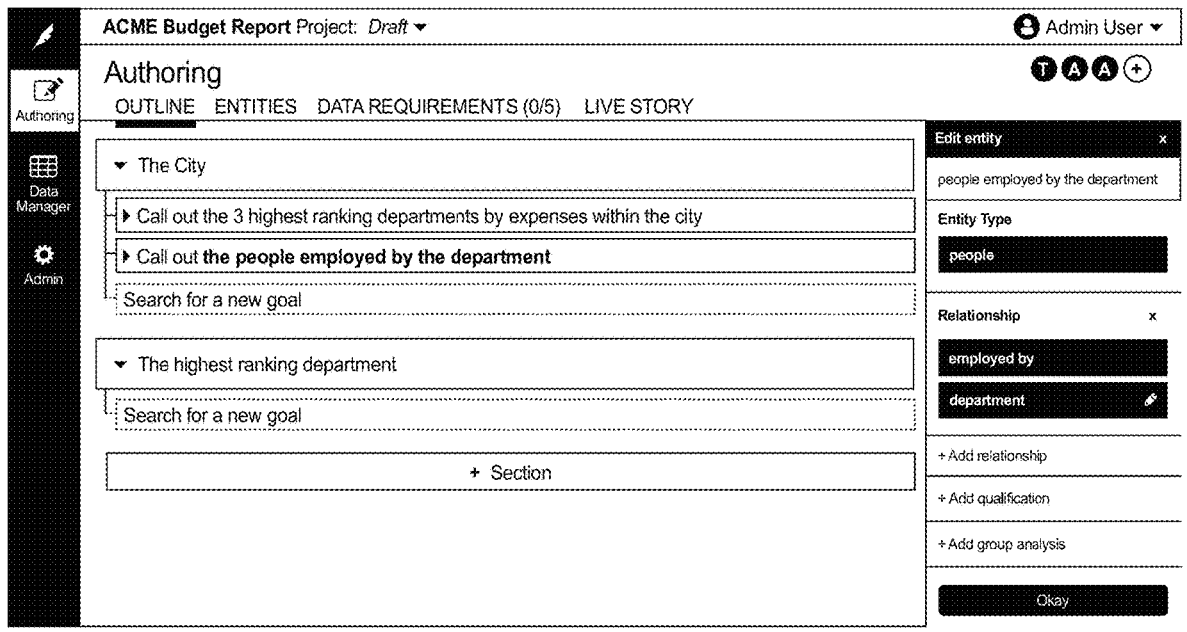

Once you complete the steps for both directions of the relationship (see FIG. 195), Quill will apply the relationship to your Entity types and add the relationship to its library (see FIG. 196). You can use the Relationship again anywhere else in the project.

Figure 197:
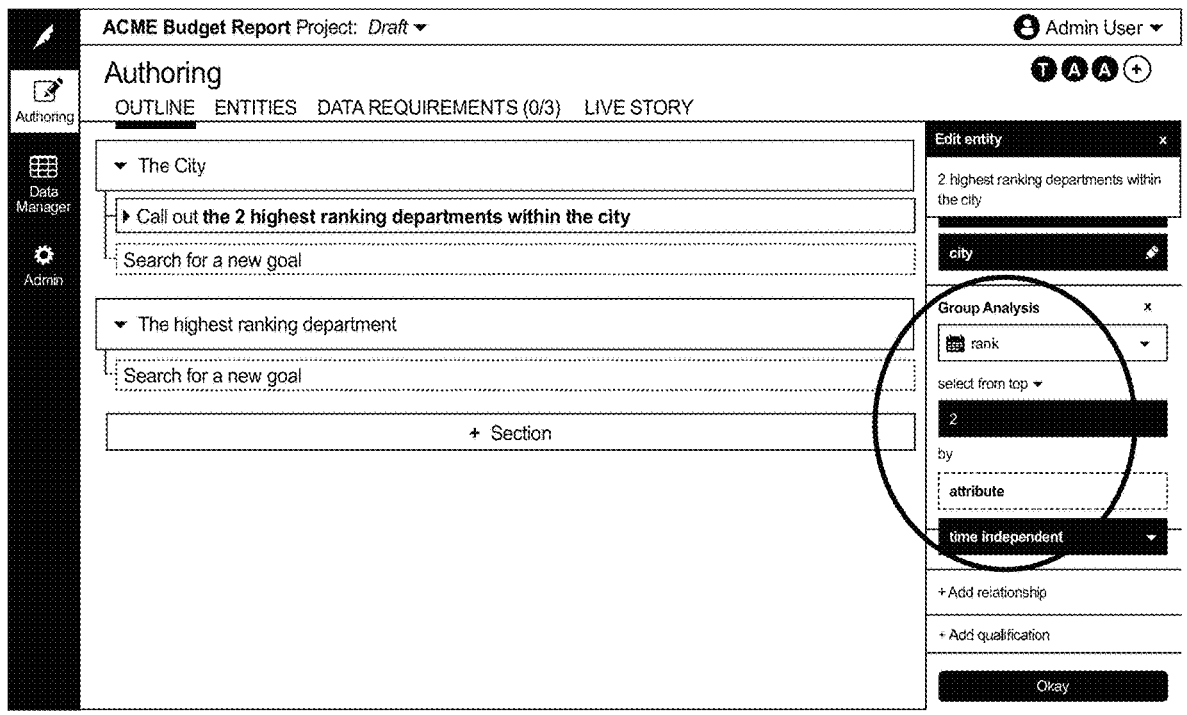

You can also apply Group Analysis to an Entity type (see FIG. 197).

Figure 198:
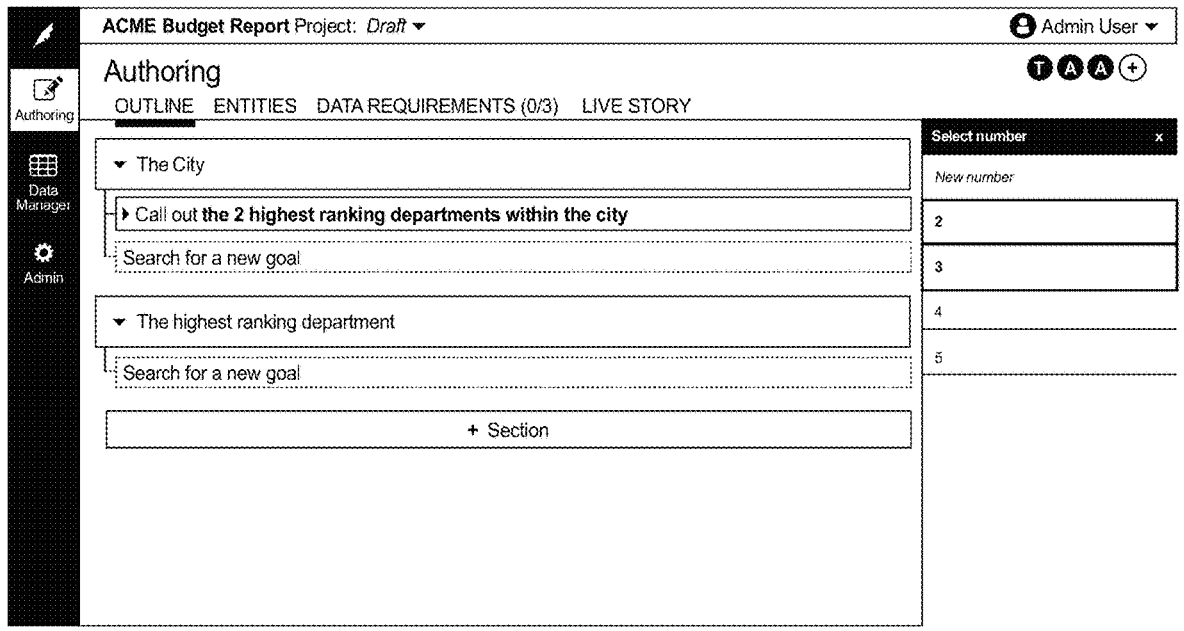
Figure 199:
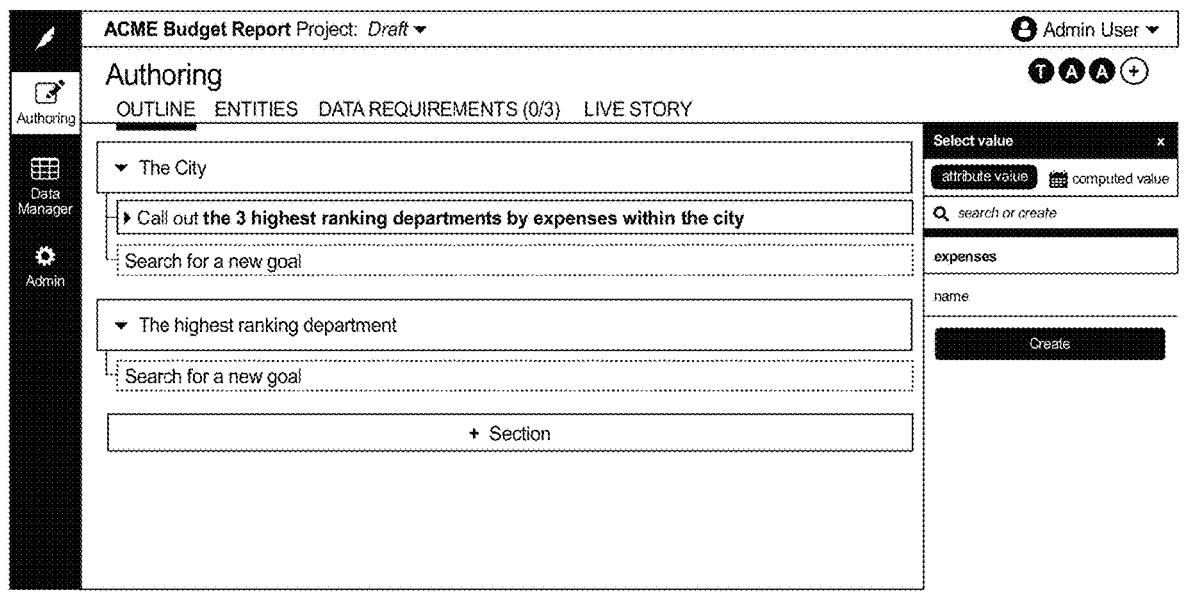
Figure 200:
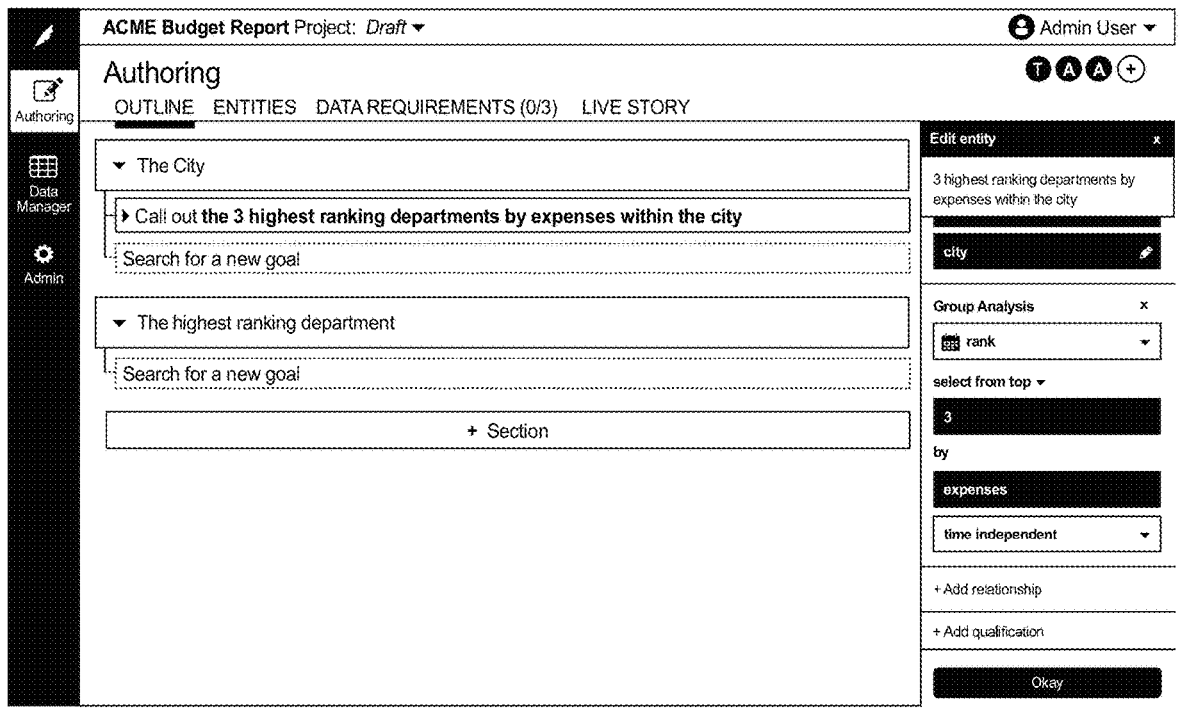

In the example of Appendix A, rank is supported. This allows you to specify which Entity in a list of Entities to use in a Communication Goal. Select whether you are asking for the position from the top or the position from the bottom and the ranking of the Entity you want (see FIG. 198). FIG. 199 shows setting the attribute to perform the group analysis by. FIG. 200 shows an Entity type with group analysis applied.

Figure 201:
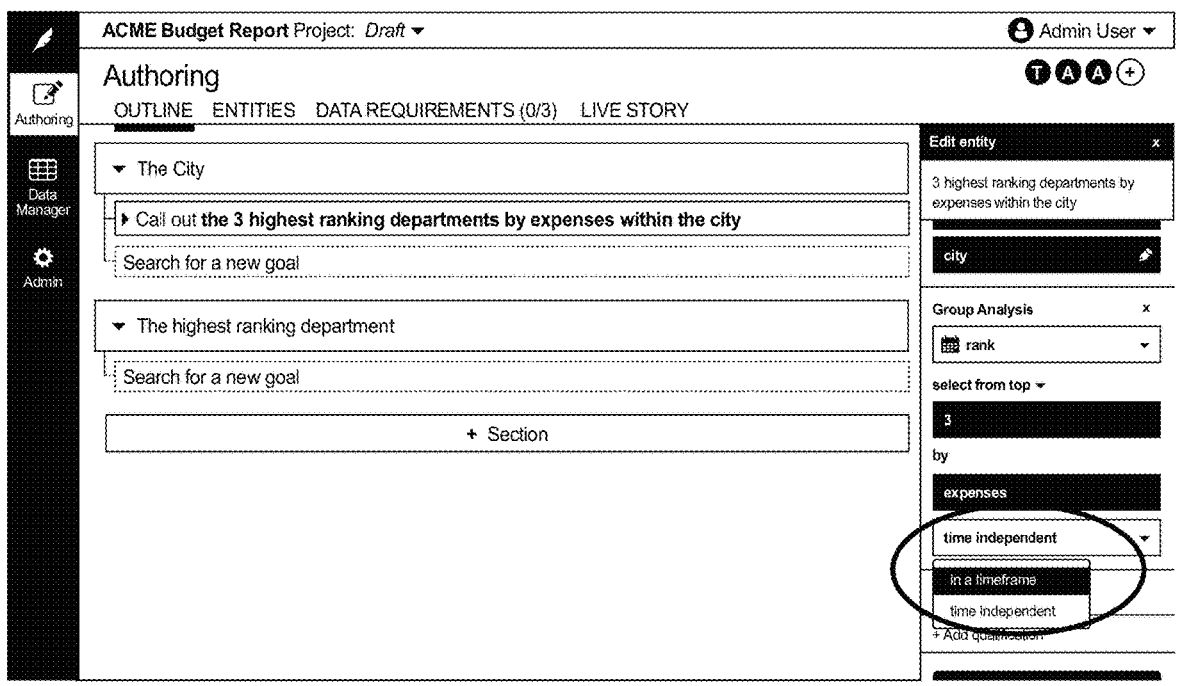

You also have the option of specifying a Timeframe (see FIG. 201).

Figure 202:
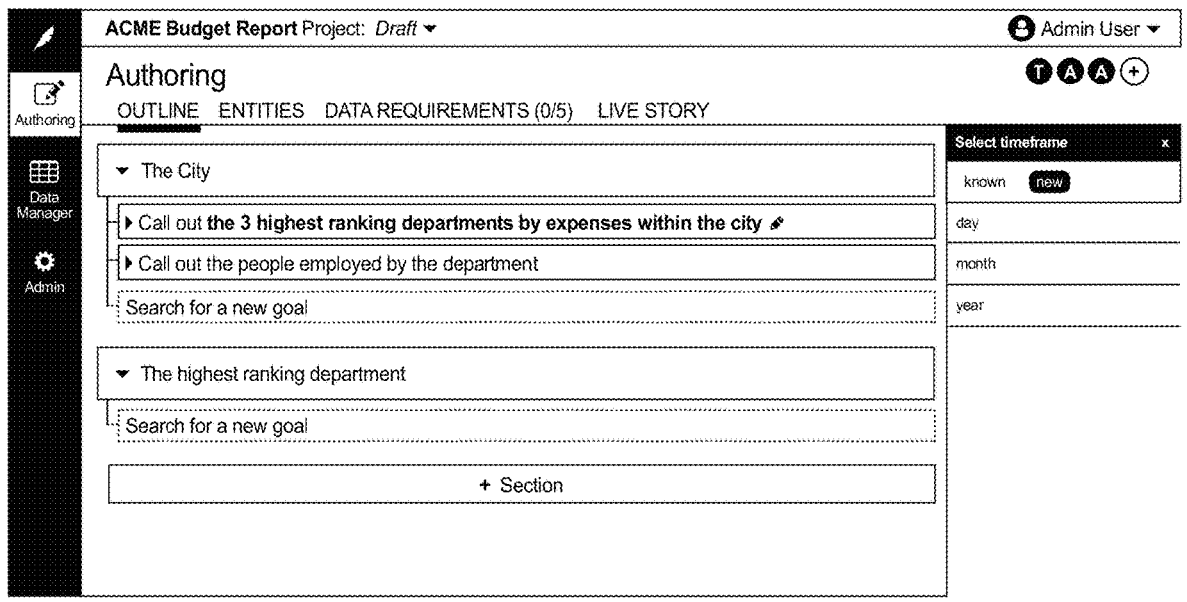
Figure 203:
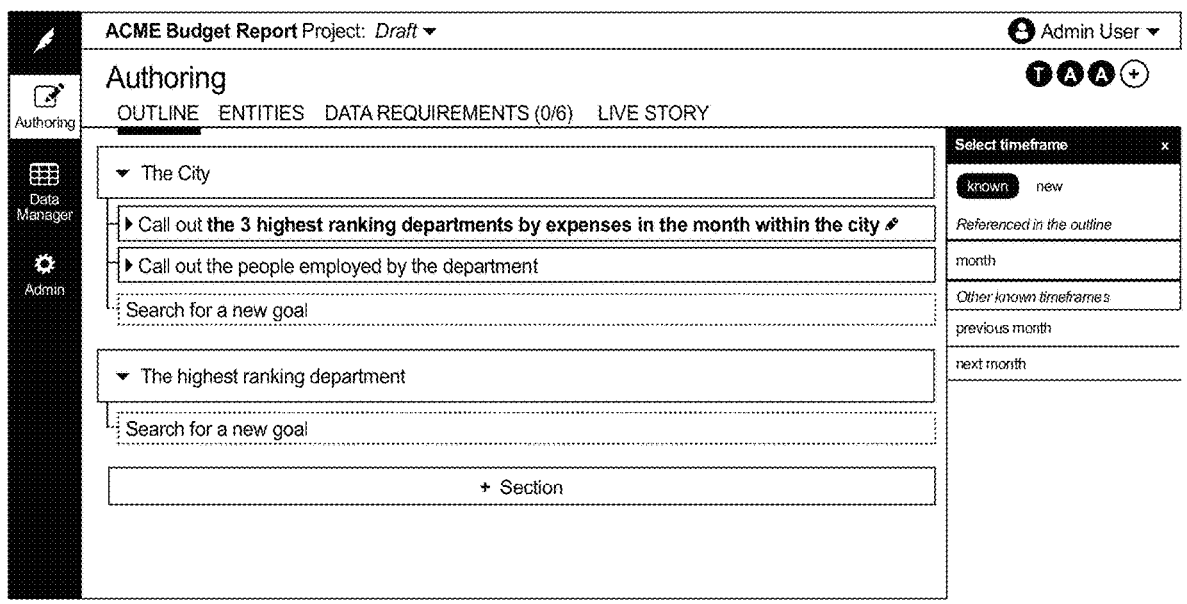
Figure 205:
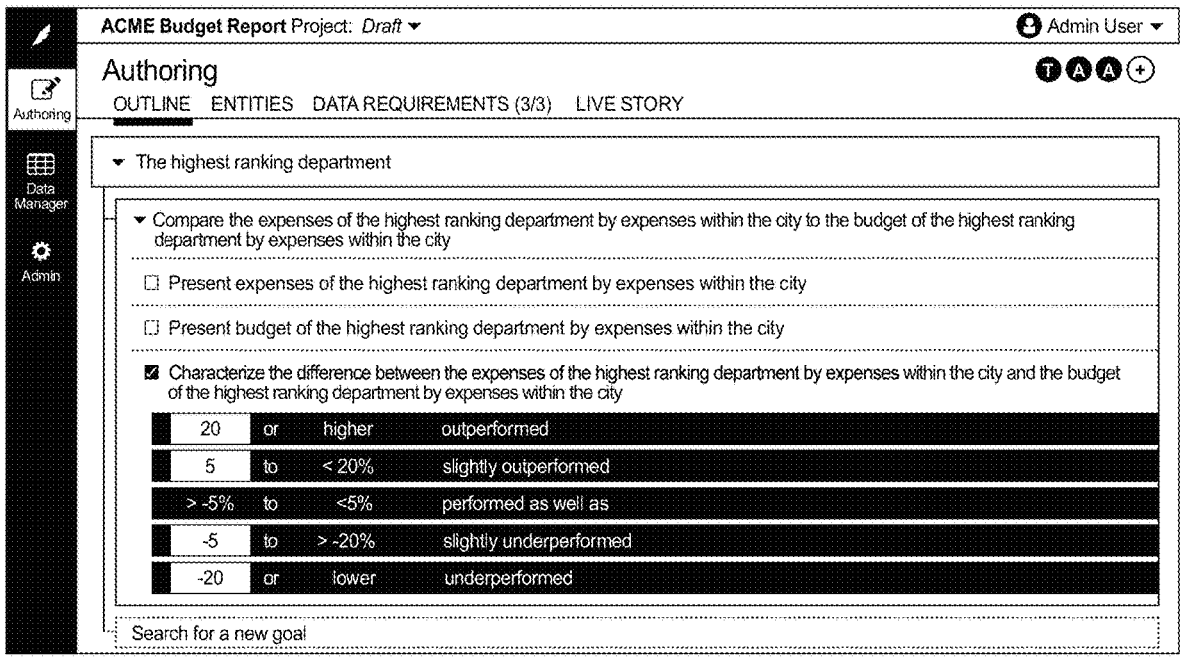

This allows you to restrict the window of analysis to a particular day, month, or year (see FIG. 202).

Create a new Timeframe by selecting one of those three options. Once you've done this, Quill also recognizes the "previous" and "next" instances of that Timeframe (see FIG. 203). In other words, if you create a day Timeframe, Quill will populate the list of known Timeframes with day, along with previous day and next day.

Once you have completed the steps to create an Entity type, Quill adds it to the list of Entity types available for use throughout the story. In other words, you can use it again in other parts of the Outline.

A5(i)(b)(1)(D): Characterizations

Characterizations are editorial judgments based on thresholds that determine the language used when certain conditions are met. Characterizations can be set on Entity types directly or when comparing Attributes on an Entity in a Communication Goal.

Refer to Characterizations in Ontology Management for more information on Entity Characterizations.

To set the characterizations on a comparative Communication Goal, expand the arrow to the left of the Communication Goal (see FIG. 204).

This exposes the list of available subgoals (see section below). At the bottom of this list is a goal to characterize the difference between the attributes. Check the box to expose the thresholds applied to the comparison (see FIG. 205).

Quill has default thresholds to determine the comparative language for each outcome. These thresholds can be changed by entering different values into the boxes. If a value is changed to be less than the upper bound or greater than the lower bound of a different outcome, Quill will adjust the values so that there is no overlap (see FIGS. 206 and 207).

There is also default language to correspond with each of the possible outcomes. This can also be changed to suit your particular needs and the tone of your story. Click on the green, underlined text to open a sidebar to the right where you can add additional expressions and set which expression you would like to be the primary expression (see FIG. 208).

If you have multiple expressions associated with the outcome (see FIG. 209), Quill will alternate between them at random to add Variability to the language. These additional expressions will be tied to the specific Communication Goal where you added them and will not appear for others. You can also opt into and out of particular expressions, as well as delete them using the x. However, you cannot opt out of whichever expression is set as the primary expression.

A5(i)(b)(2): Deleting a Communication Goal

Figure 210:
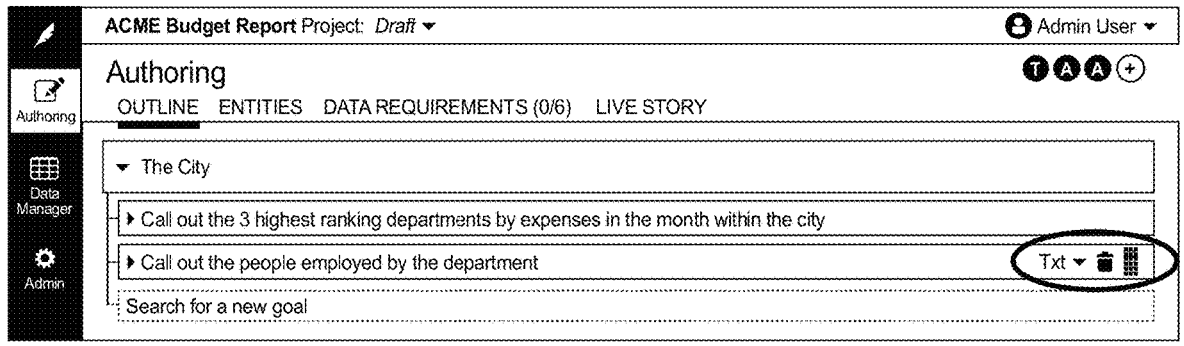

To delete a Communication Goal, hover your cursor over it to reveal a trash can icon (see FIG. 210). Click it to delete the Communication Goal.

A5(i)(b)(3): Moving a Communication Goal

Figure 211:
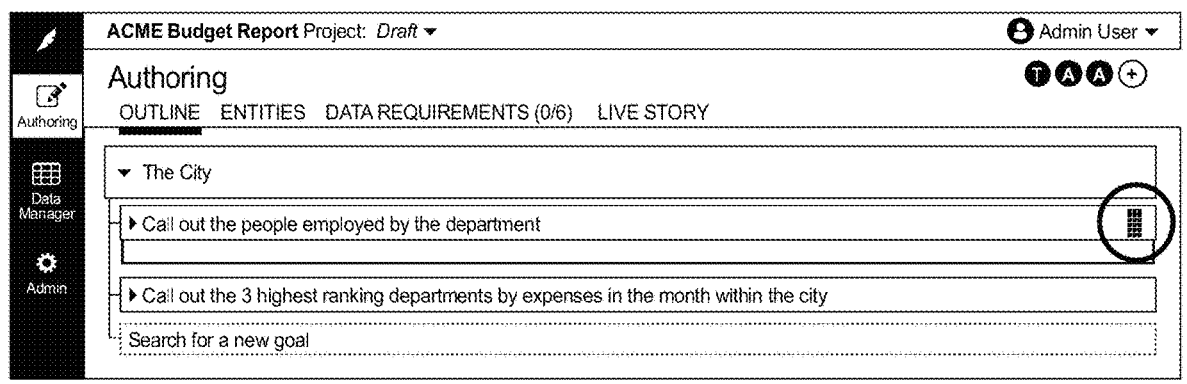

Moving a Communication Goal is done the same way as moving a Section. Hover your cursor over the Communication Goal to reveal the gripper icon (see FIG. 211).

Figure 212:
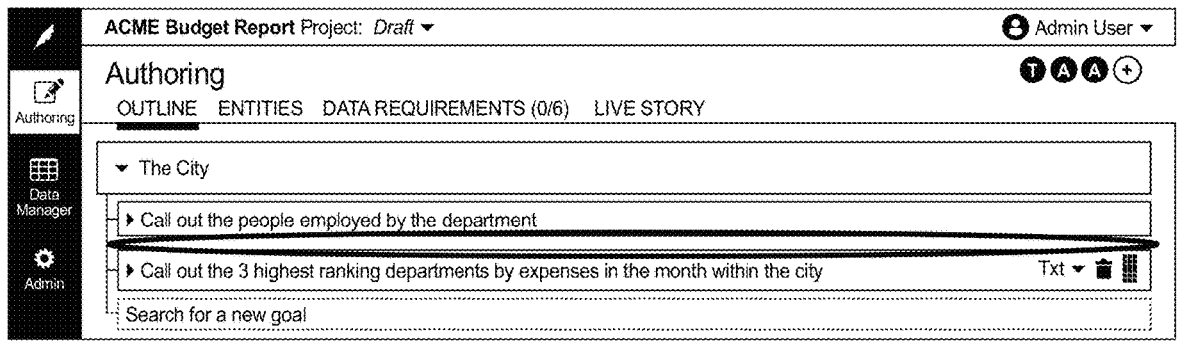

Click and move the Communication Goal within the Section or to another section (see FIG. 212). Be careful when you move Communication Goals to make sure there is space between them.

Communication Goals without space between them are Linked Goals, described below.

A5(i)(b)(4): Linked Goals

Figure 213:
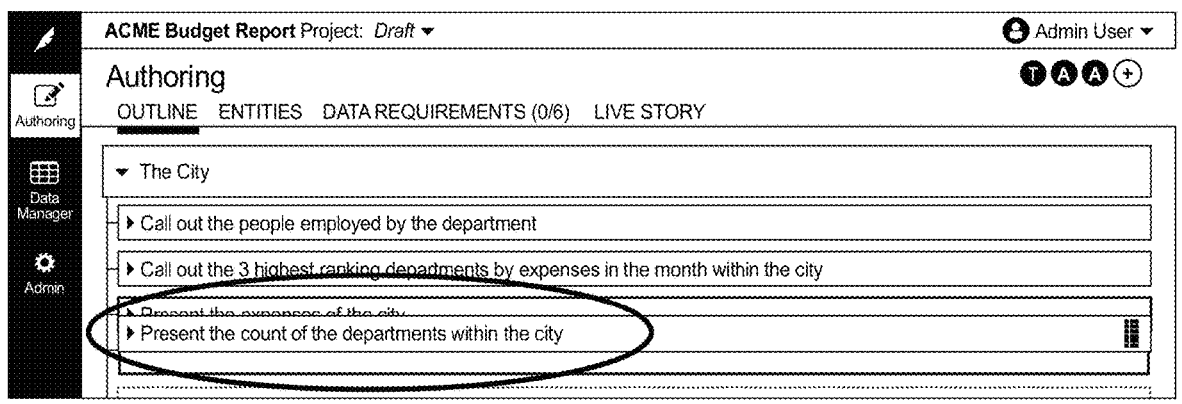

Quill supports linking Communication Goals. This allows the user to express ideas together. For example, you may wish to talk about the number of departments in a city along with the total budget for the city. Hover your cursor over the Communication Goal to reveal the gripper icon, click and drag it above the goal you wish to link (see FIG. 213). They will always be unlinked by revealing the gripper icon again by hovering, and moving the Communication Goal into an empty space on the Outline.

Figure 214:
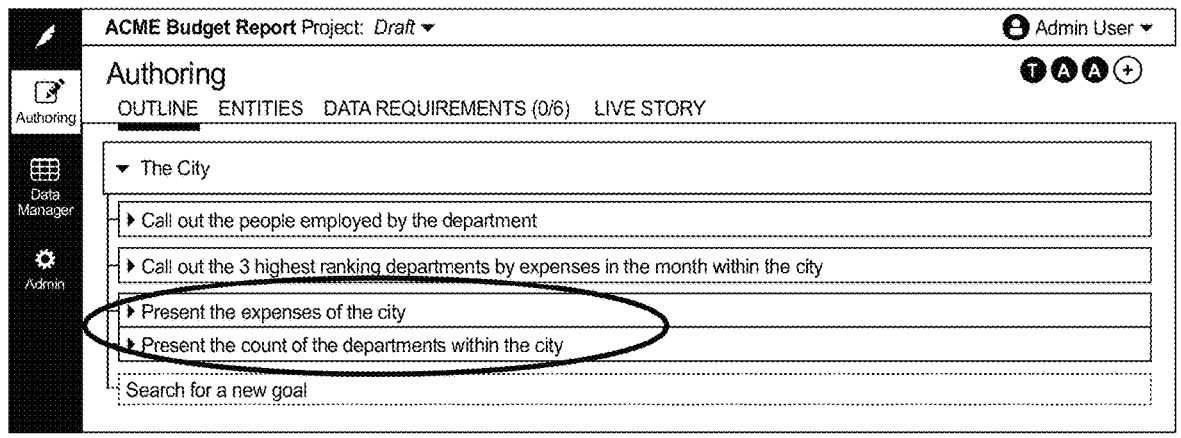

When you link the Communication Goal that expresses the number of departments and the Communication Goal that expresses the total budget for the city (see FIG. 214), Quill will attempt to express them together with smoother language such as combining them into one sentence with a conjunction.

A5(i)(b)(5): Related Goals (Subgoals)

Some goals support related goals, or subgoals. This allows you to include supporting language without having to create separate Communication Goals for each related idea. For example, if you have a Communication Goal comparing attributes on an entity—in this case, the budget and expenses of the highest ranking department by expenses within the city-you may also wish to present the values of those attributes. Expand the Communication Goal to expose those related goals and opt into them as you like (see FIG. 215).

A5(i)(b)(6): Styling Communication Goals

Figure 216:
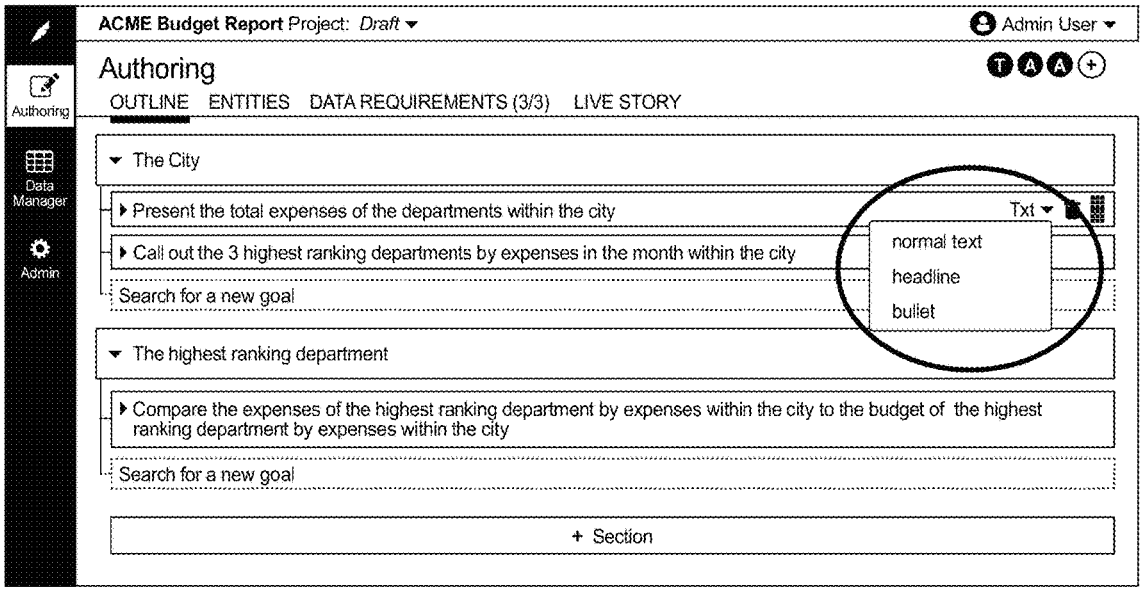

Quill allows for styling Communication Goals for better presentation in a story. Hover your cursor over a Communication Goal to reveal the "Txt" dropdown on the right side (see FIG. 216).

Figure 217:
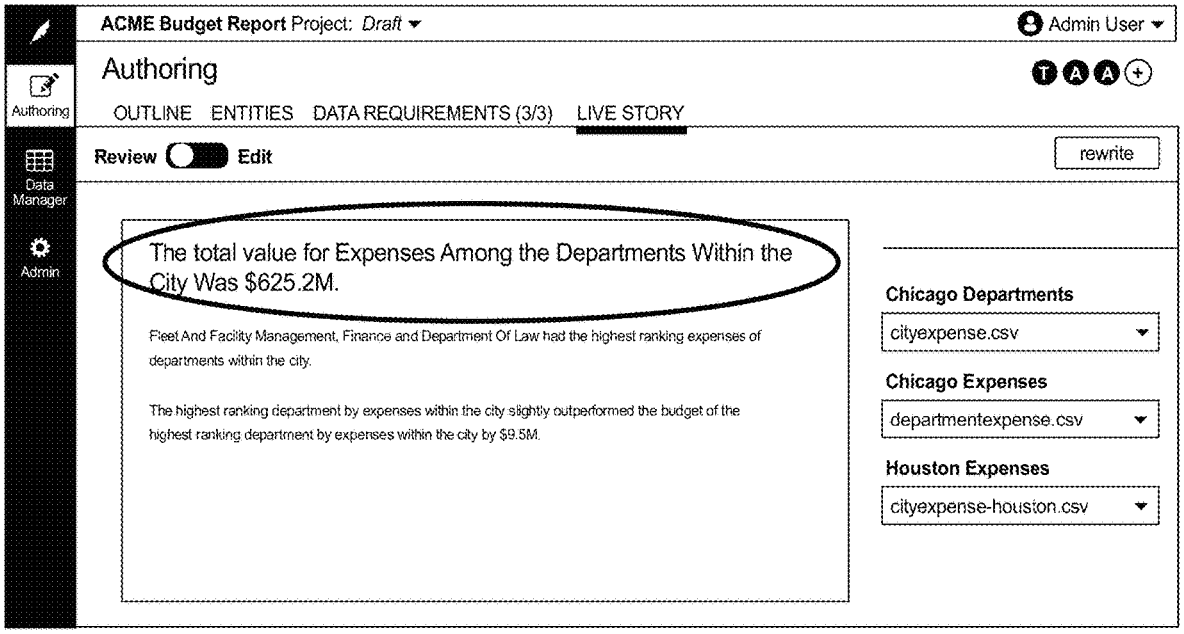
Figure 218:
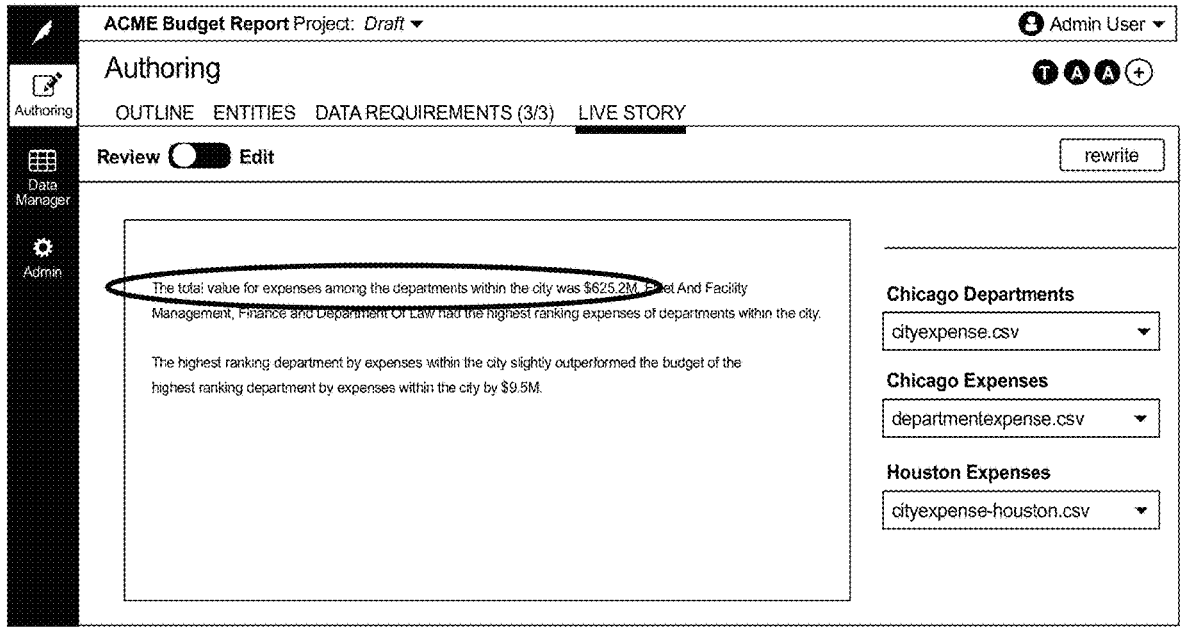
Figure 219:
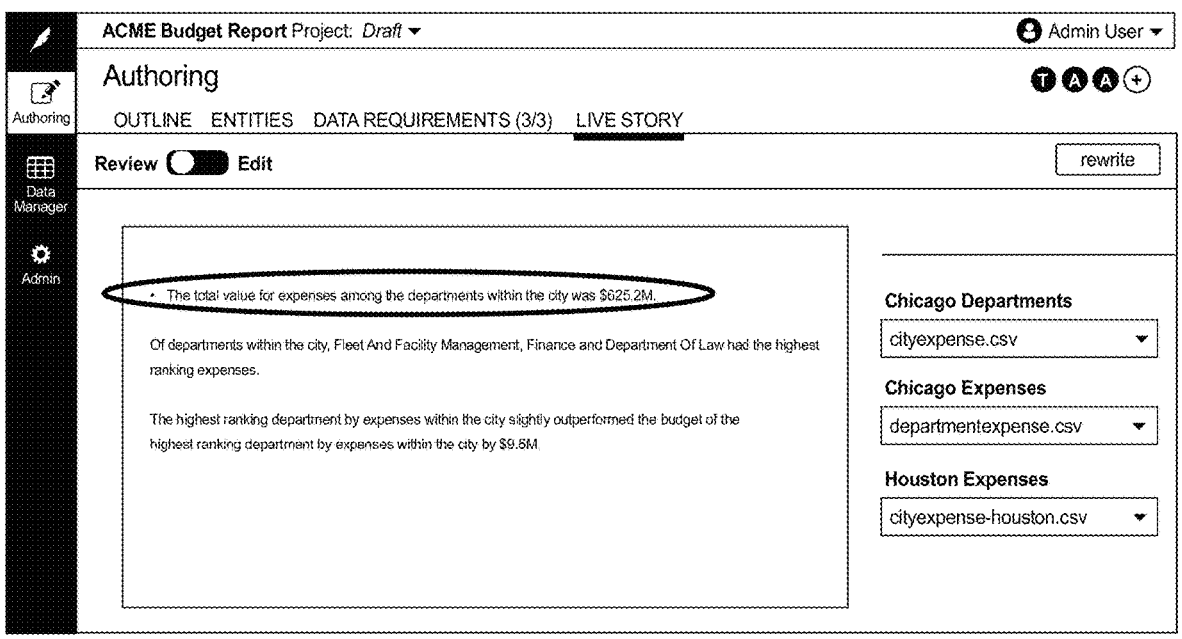

Here, you can choose whether the language expressed is styled as a headline (see FIG. 217), normal text (see FIG. 218), or bullets (see FIG. 219).

A5(i)(b)(7): Charts

Figure 220:
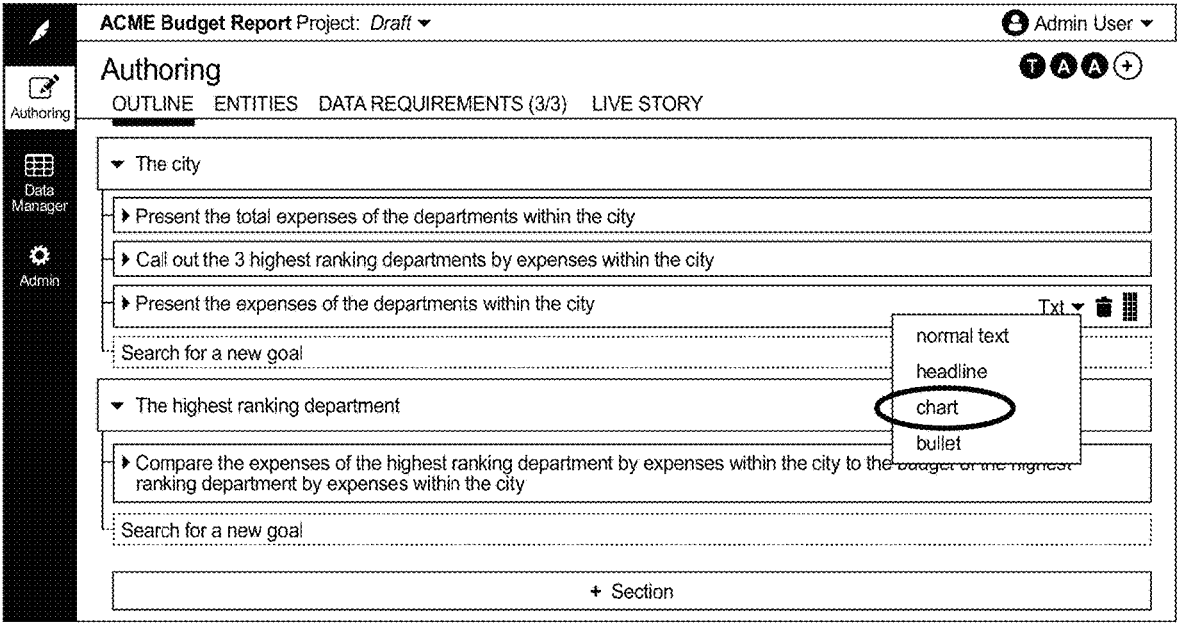

Charts are supported for two Communication Goals: Present the [attribute] of [a group] and Present the [attribute] of a [group of events]. For either of these goals, to get a chart, go to the Txt dropdown and select Chart (see FIG. 220).

This will render the Communication Goal as a chart.

Figures 221, 222:
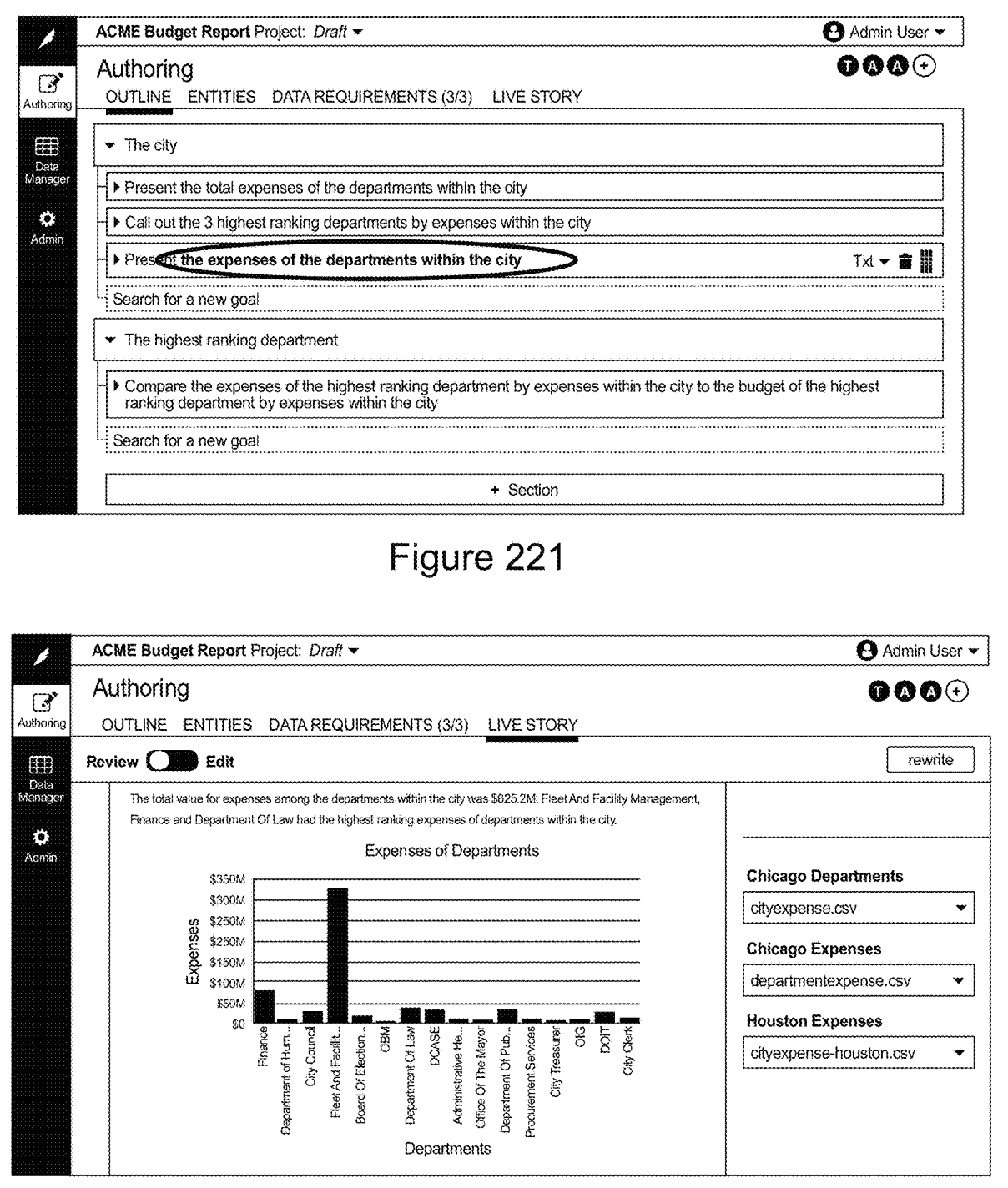

Present the [attribute] of [a group] (see FIG. 221) will result in a bar chart (see FIG. 222).

Figures 223, 224:
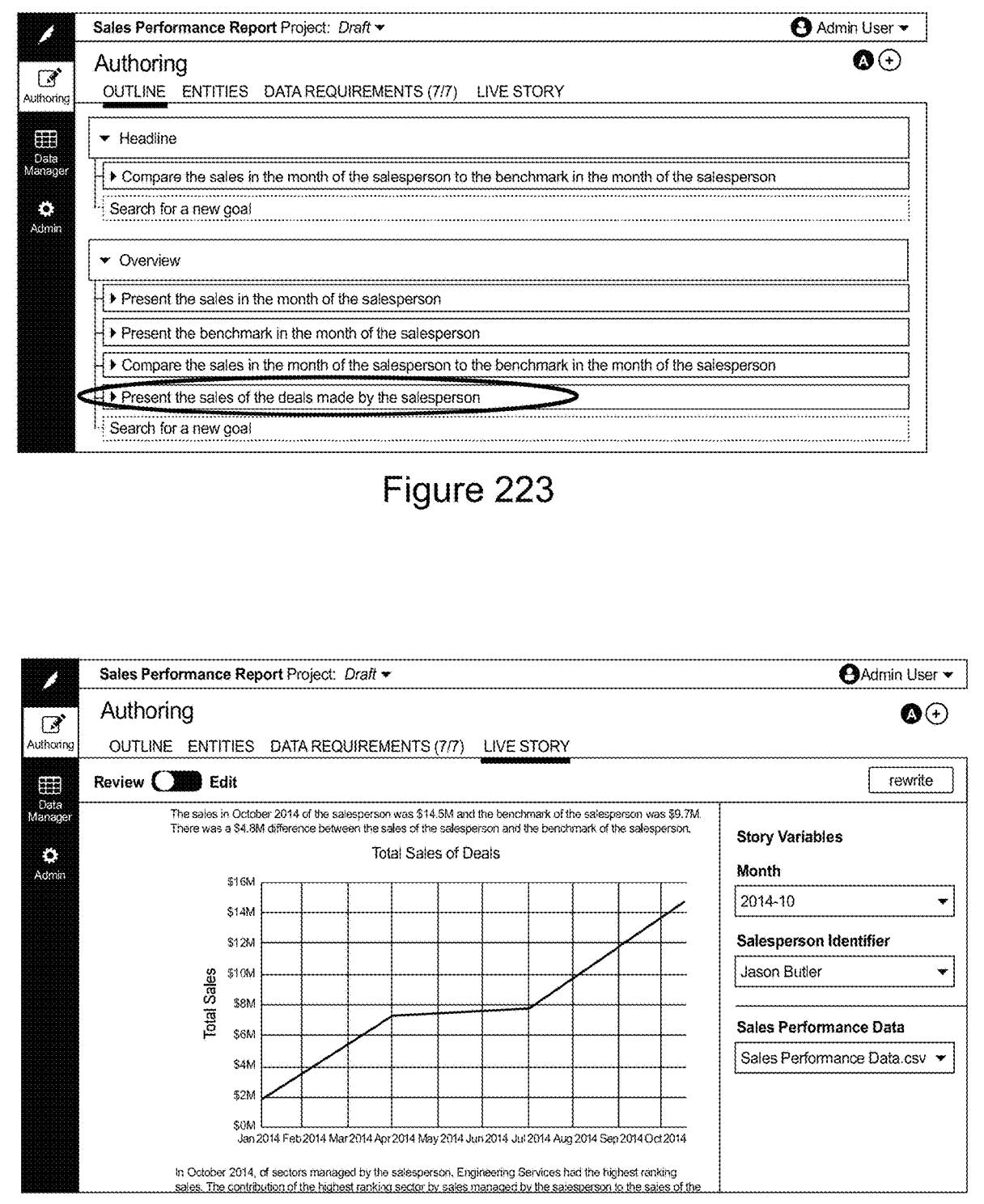

Present the [attribute] of [a group of events] (see FIG. 223) will result in a line chart (see FIG. 224).

A5(i)(c): Data Requirements

Once you have configured your story, Quill will ask where it can find the data to support the Entity types and Attributes you have specified in the Communication Goals. Go to the Data Requirements tab in Authoring to provide this information (see FIG. 225).

The Data Requirements will guide you through a series of questions to fill out the necessary parameters for Narrative Analytics and Communication Goals. For each question, select the data view where that data can be found and the appropriate column in the table.

A5(i)(c)(1): Tabular Data

Figures 226, 227:
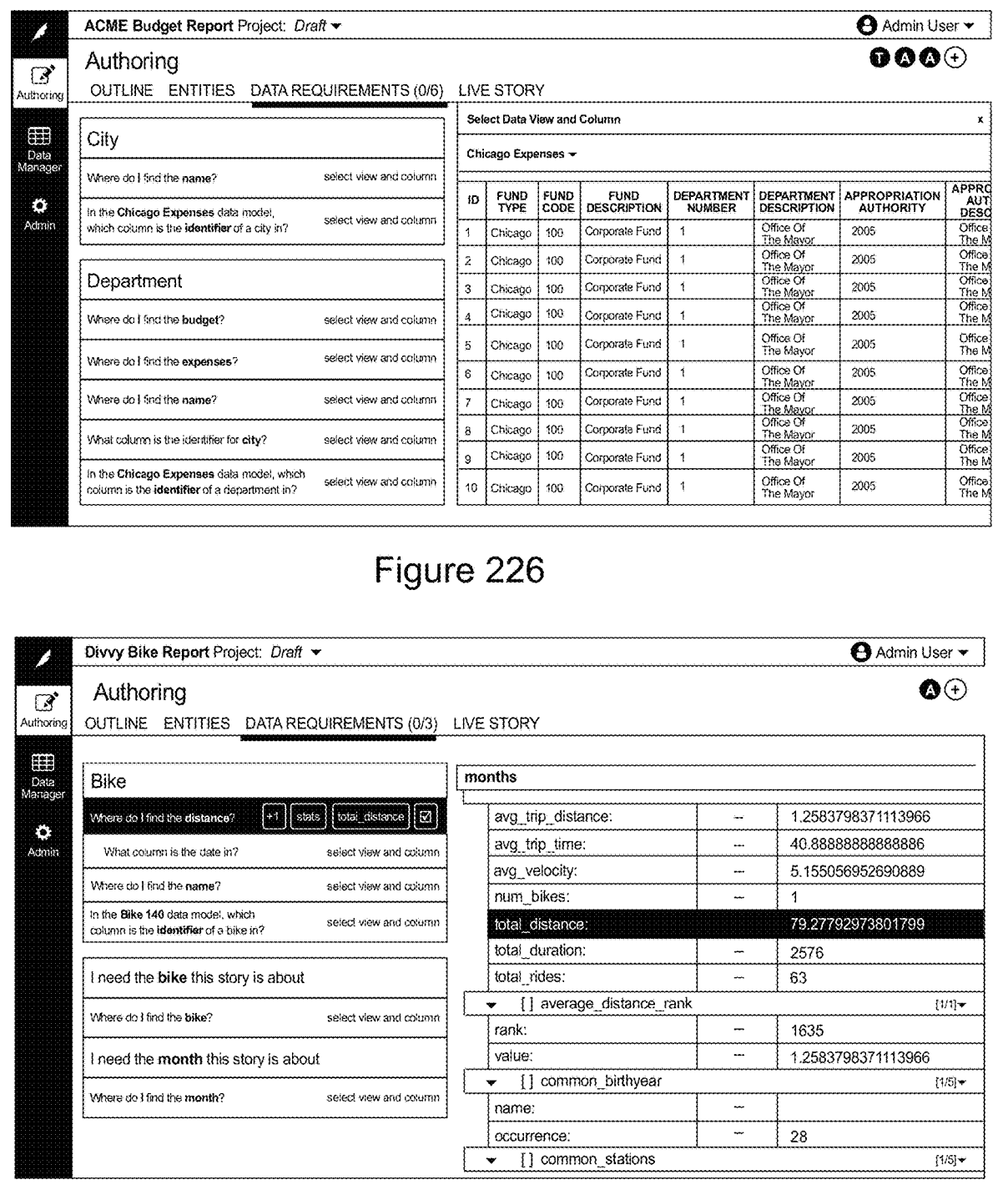

FIG. 226 shows an example where the data is tabular data.

A5(i)(c)(2): Document-Based Data

Figure 228:
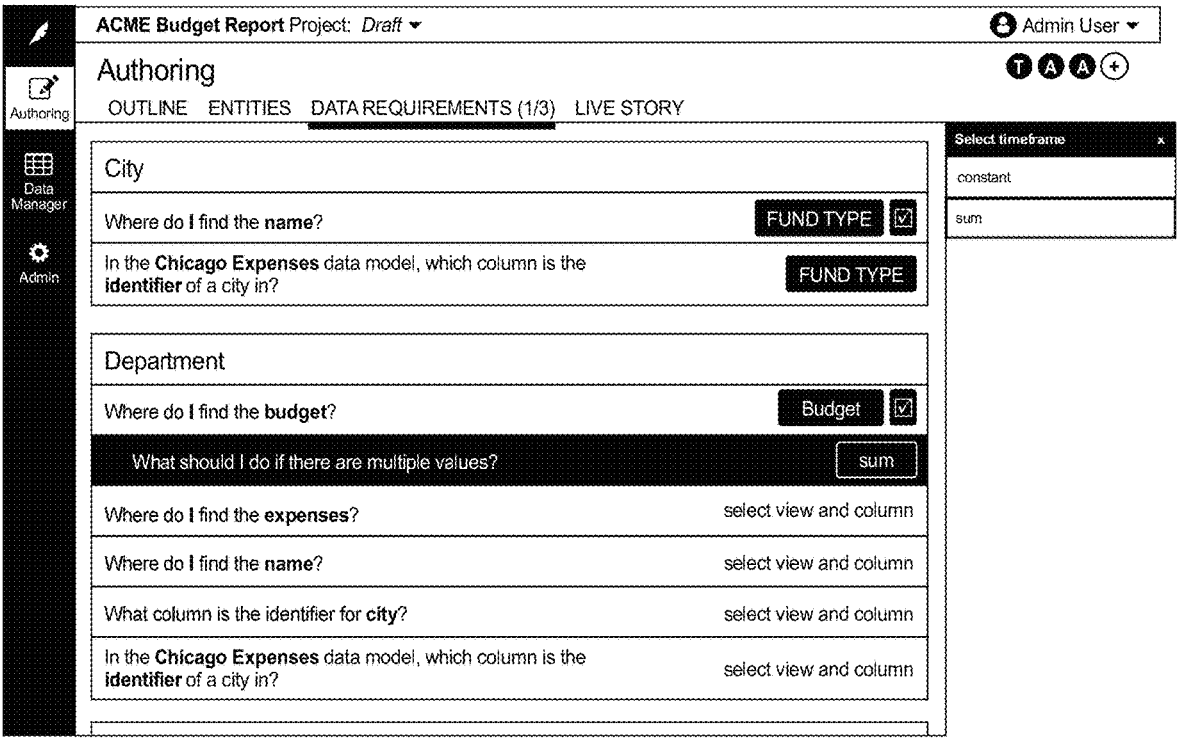
Figure 231:
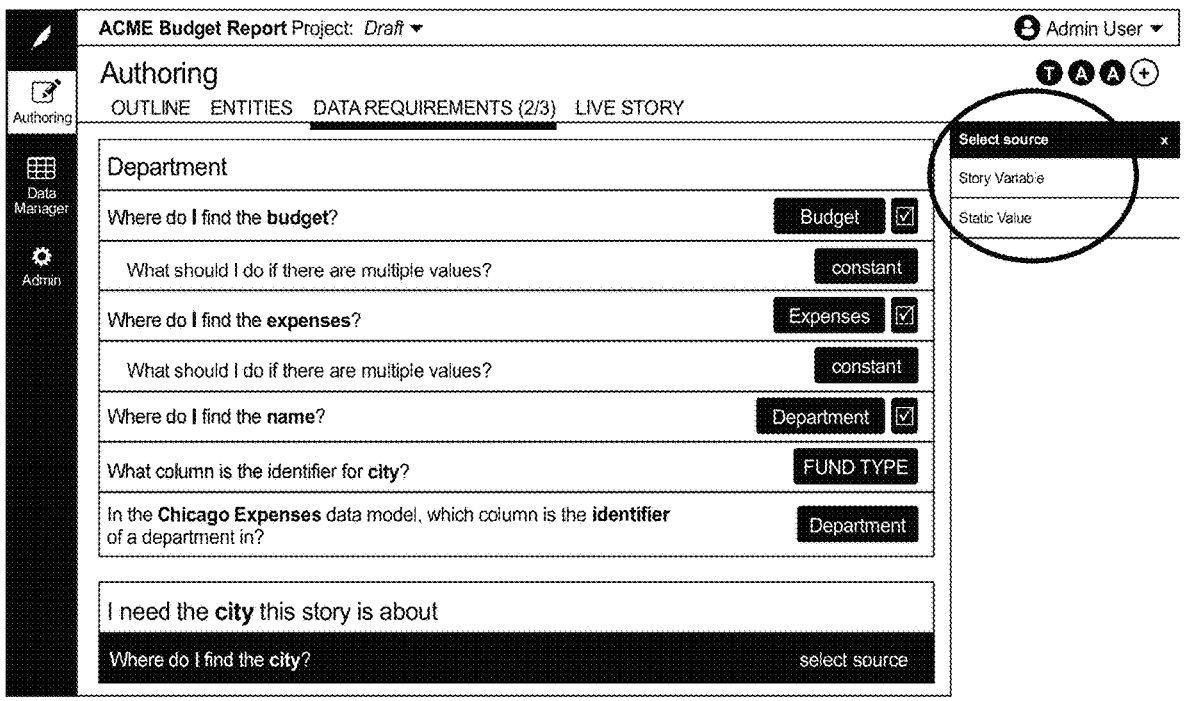
Figure 232:
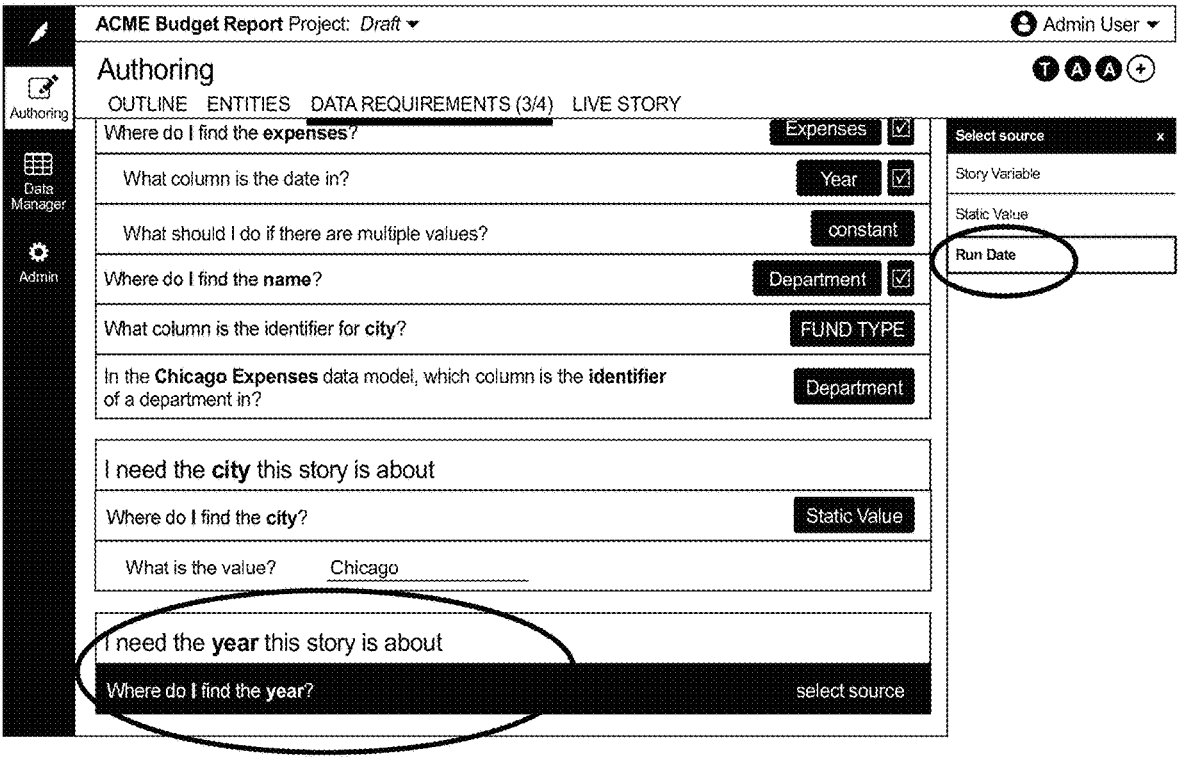

FIG. 227 shows an example where the data is document-based data.

Where the value supplied is numerical, Quill will provide analytic options for cases where there are multiple values (see FIG. 228). "Sum" sums values in a column like a Pivot Table in a spreadsheet. "Constant" is if the value does not change for a particular entity. For example, the quarter may always be Q4 in the data.

Figures 229, 230:
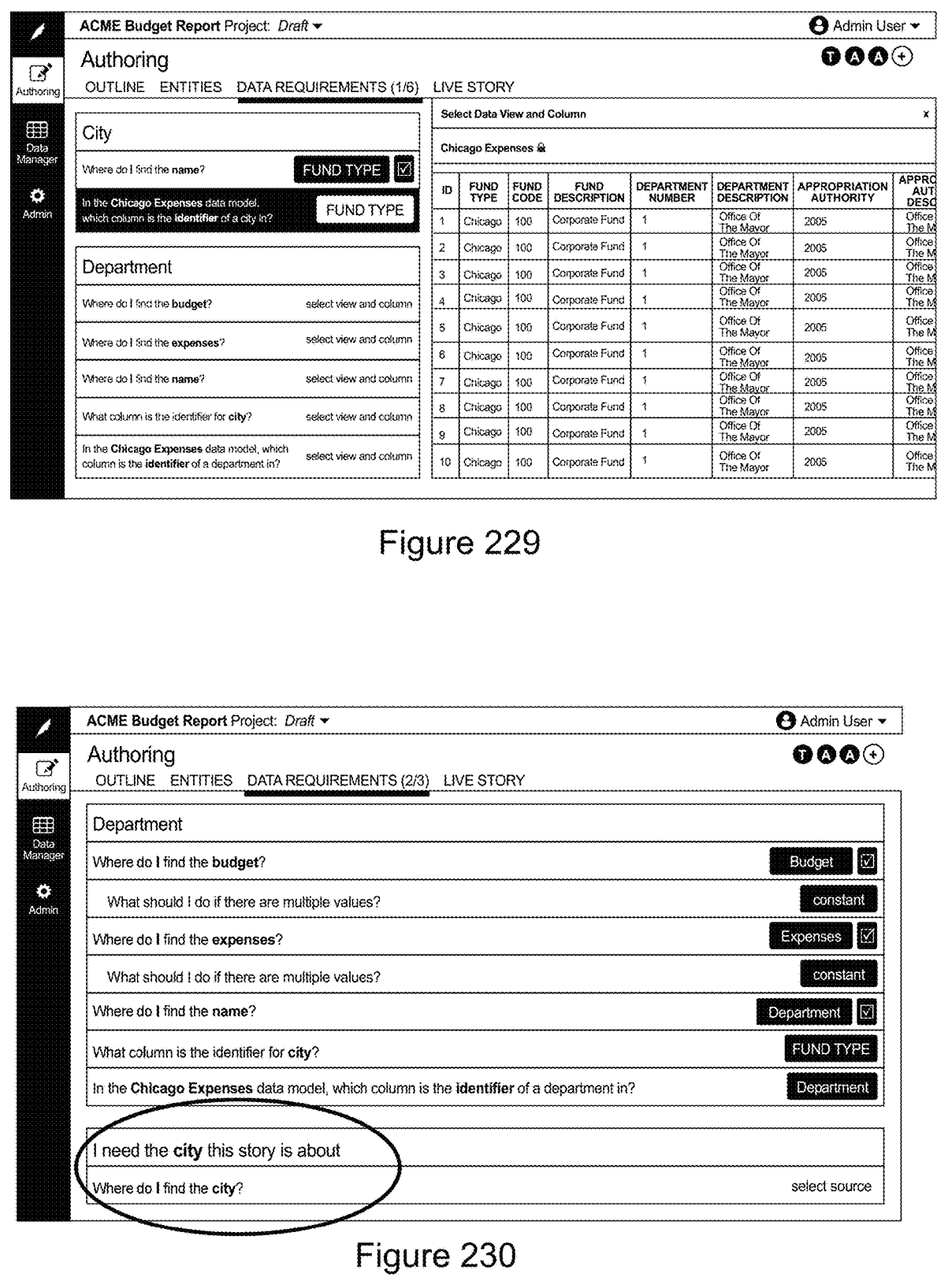

For each Entity type, Quill will ask for an identifier (see FIG. 229).

This is what Quill uses to join data views. An identifier has no validation options as it doesn't actually appear in the story. (Data Validation is discussed below.)

The final question in Data Requirements will be to identify the main Entity the story is about (see FIG. 230).

In the city budget example, Quill needs to know what city the story will be about. This can be set as a static value (e.g. Chicago) or as a Story Variable (see FIG. 231).

A Story Variable allows you to use a set of values to trigger stories. In other words, if your data contains city budget information for multiple cities, setting the city the story is about as a Story Variable will allow you to run multiple stories against the same dataset. The location of the value for the Story Variable is defined earlier in Data Requirements where Quill asks where to find the city.

If there is a Timeframe in the Headline of the story, Quill will need you to identify this in Data Requirements as well.

As with the entity, this can be a static value or a Story Variable. It can also be set as the run date (see FIG. 232), which will tell Quill to populate the value dynamically at the time the story is run. (See the Scheduling section for more information.)

A5(i)(d): Data Formatting

Quill allows you to set the format for certain data points to have in your data source so it can be mapped to your Outline. These formats are set based on the ontology (Entities, Attributes, etc.) being used in your Communication goals, with default styling applied to values. See the Miscellaneous section for specific styling information. As you configure the appropriate data formats present in your data view, validation rules can be applied if the types do not match for a particular story run. For example, if Quill is expecting the expenses of a city to be a currency and receives a string, the user is provided with various options of actions to take. These are specified in the Data Validation section below. To select the format of any date fields you may have, go to the Data Requirements tab in Authoring and click the checkbox icon next to a date (see FIG. 233) to pull out the sidebar (see FIG. 234).

Click on the date value to open a list of date format options and make your selection (see FIG. 235).

A5(i)(e): Data Validation

Quill supports basic data validation. This functionality can be accessed in Data Requirements. Once you specify the location of the information in the data, a checkbox appears next to it. Click this to open the data validation sidebar (see FIG. 236).

Figure 237:
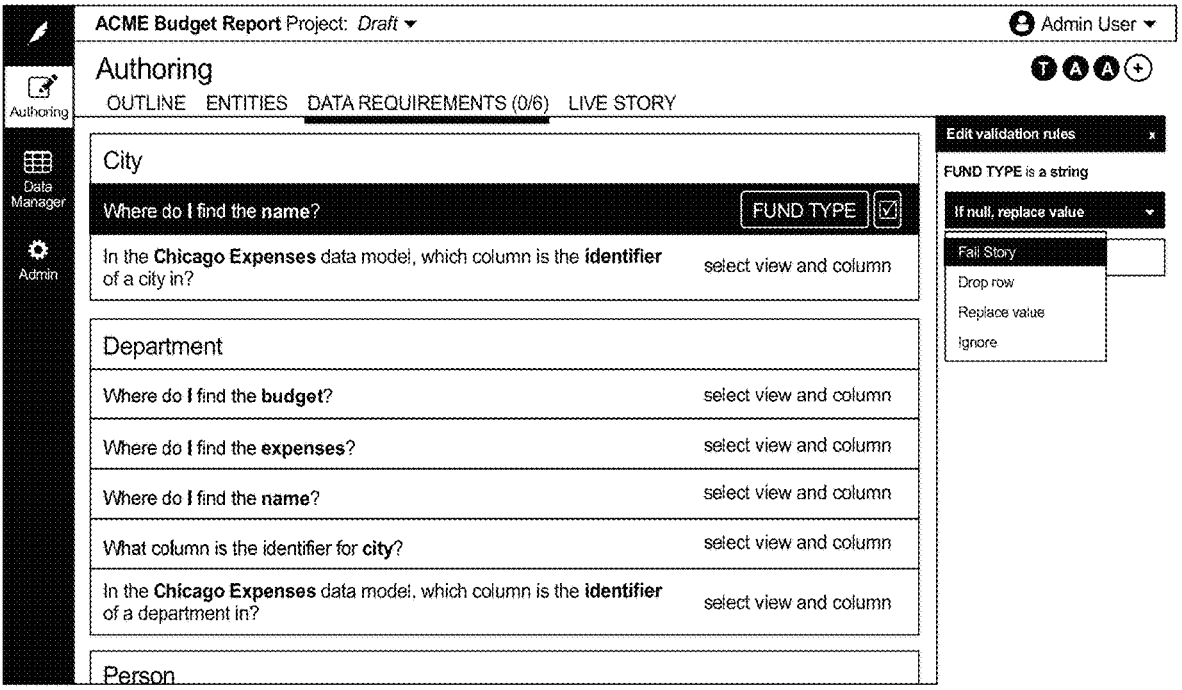
Figure 238:
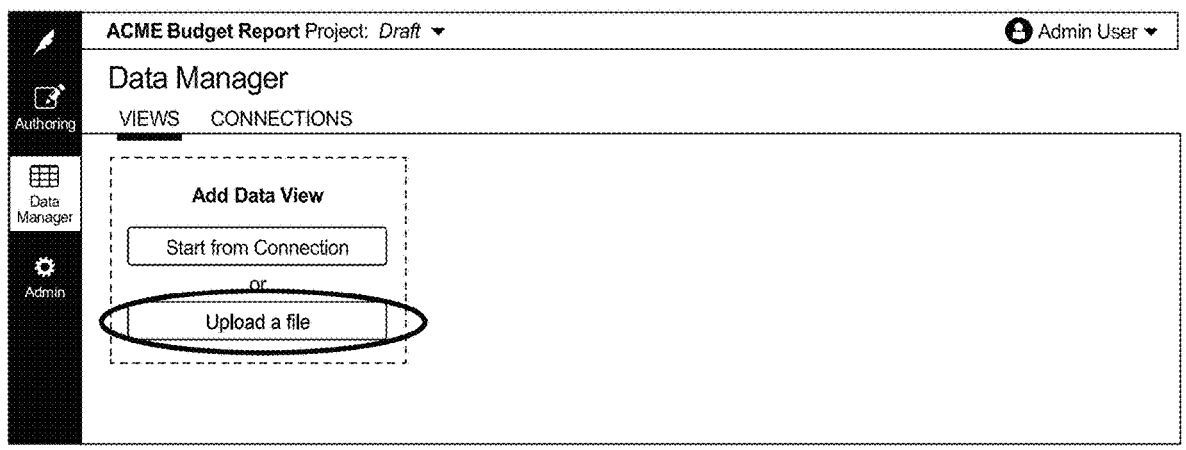

You will be presented with a number of options in a dropdown menu for what to do in the case of a null value (see FIG. 237).

You can tell Quill to fail the story, drop the row with the null value, replace the null value with a value you provide in the text box below, or ignore the null value.

A6: Data Management

Quill allows for self-service data management. It provides everything you need to upload files and connect to databases and API endpoints.

A6(i): Getting Data Into Quill

Quill supports data in tabular or document-based formats. Tabular data can be provided to Quill as CSV files or through table selections made against SQL connections (Postgr-eSQL, Mysql, and Microsoft SQL Server are supported). Document-based data can be provided by uploading a JSON file, creating cypher queries against Neo4j databases, a MongoDB connection, or through an HTTP API connection (which you can also set to elect to return a CSV).

A6(i)(a): Uploading a File

You can upload a CSV or JSON file directly to Quill in the Data Manager. In the Views tab, choose to Upload a file from the Add a Data View tile (see FIG. 238).

Figure 239:
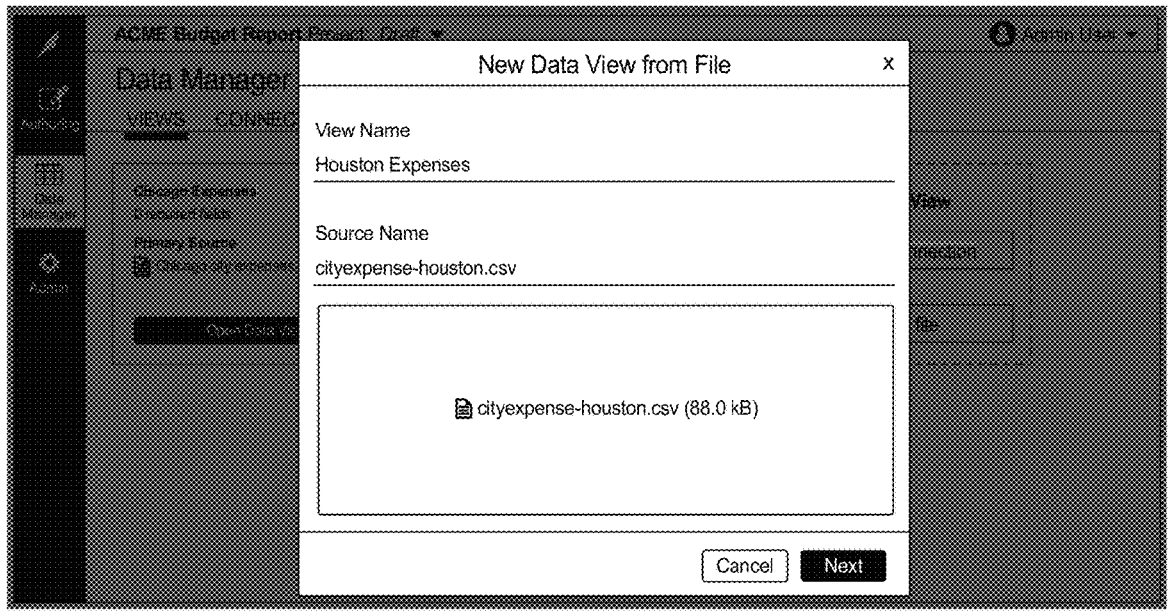
Figure 240:
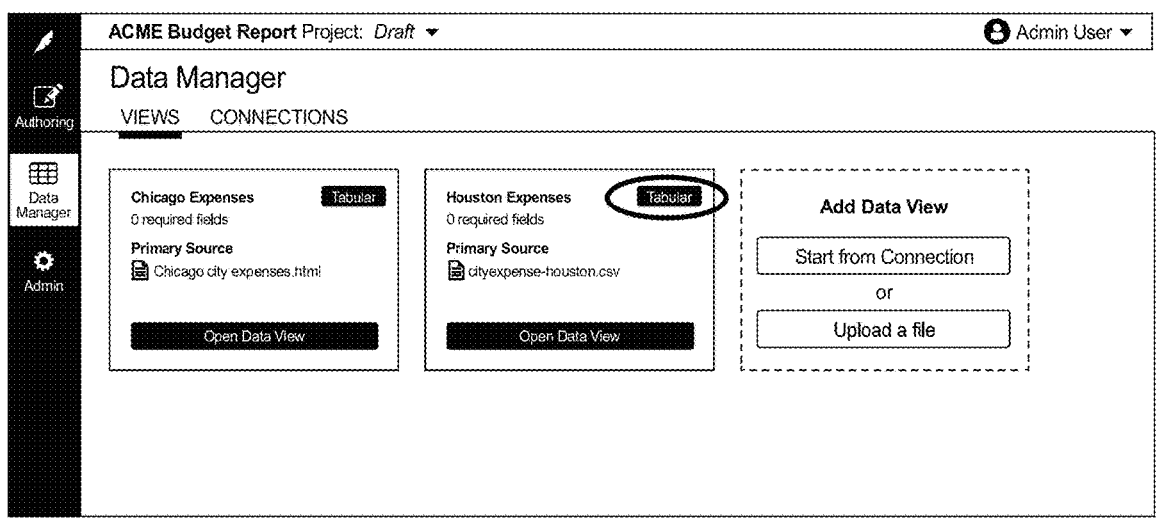
Figures 241, 242:
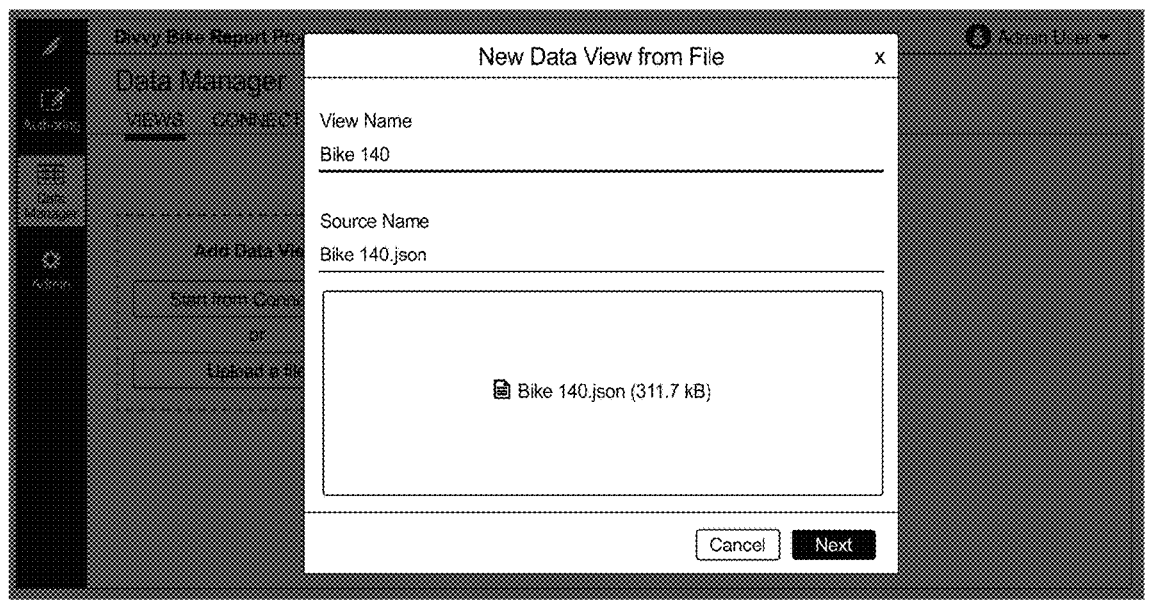
Figures 243, 244:
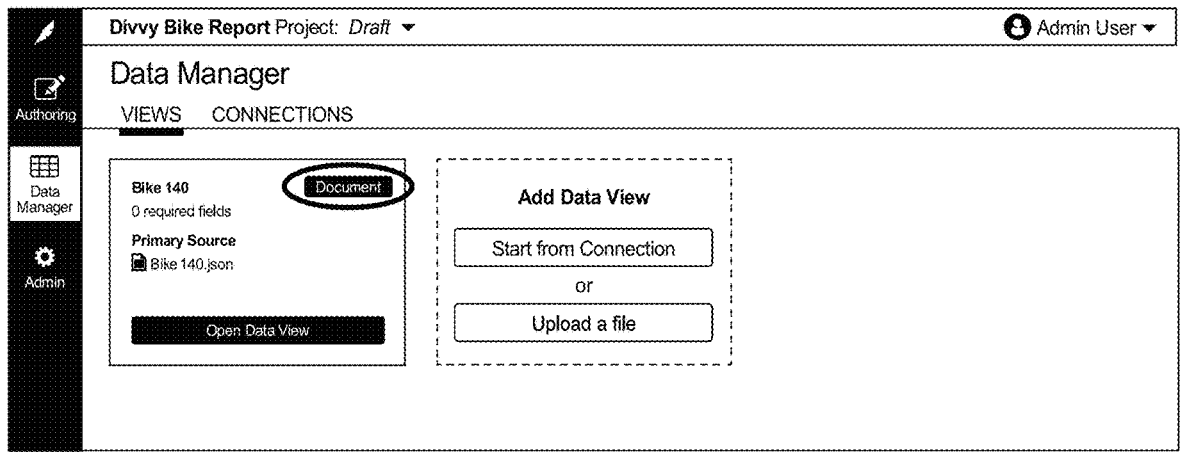

Provide the name of the view and upload the file. The amount of time it will take to upload a file depends on the size of the file for a maximum file size of 50 MB, and operating against a data base connection is recommended. This automatically populates the Source Name. FIG. 239 shows an example where a CSV file is uploaded. FIG. 242 shows an example where a JSON file is uploaded. You can edit the Source Name, which is helpful when file names are difficult to parse and for readability when selecting the file from the Live Story dropdown when previewing your story. Quill automatically detects whether the data is in tabular or document form and samples a view of the first few rows or lines of data. FIG. 240 shows an example of uploaded tabular data, and FIG. 241 shows a sample view of tabular data. FIG. 243 shows an example of uploaded document-based data, and FIG. 244 shows a sample view of document-based data.

Quill also supports uploading multiple data sources into one Data View. This functionality can be accessed in the Data View by clicking the three dots icon (see FIG. 245).

Figure 246:
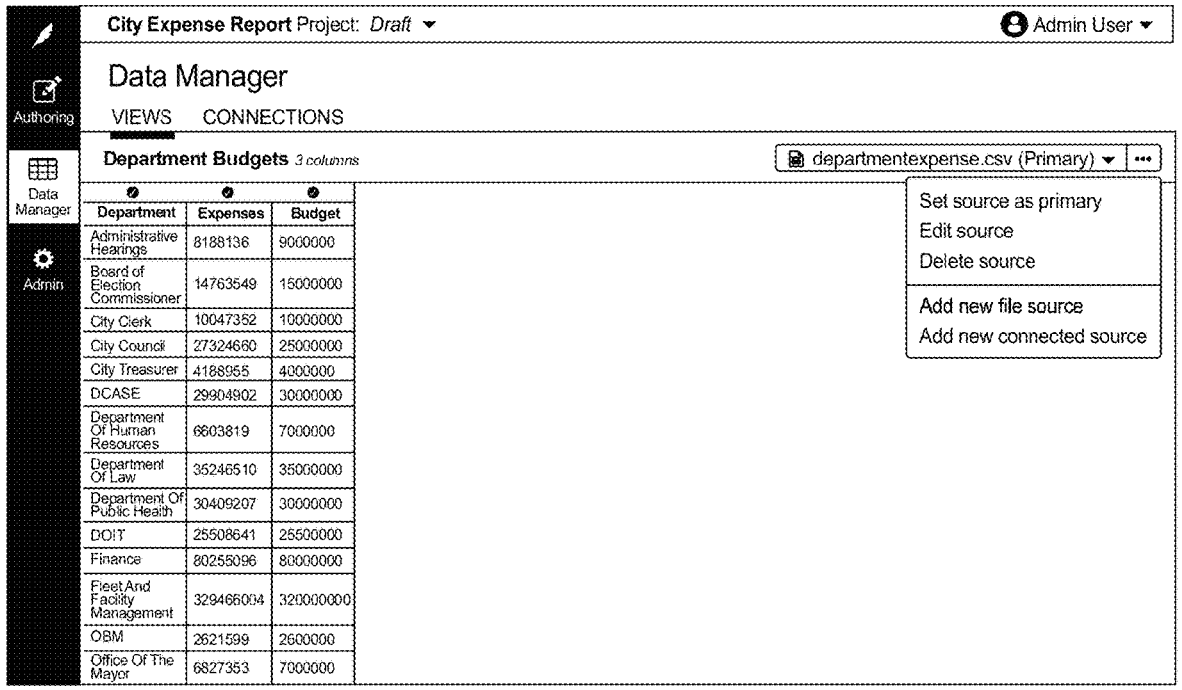
Figure 247:
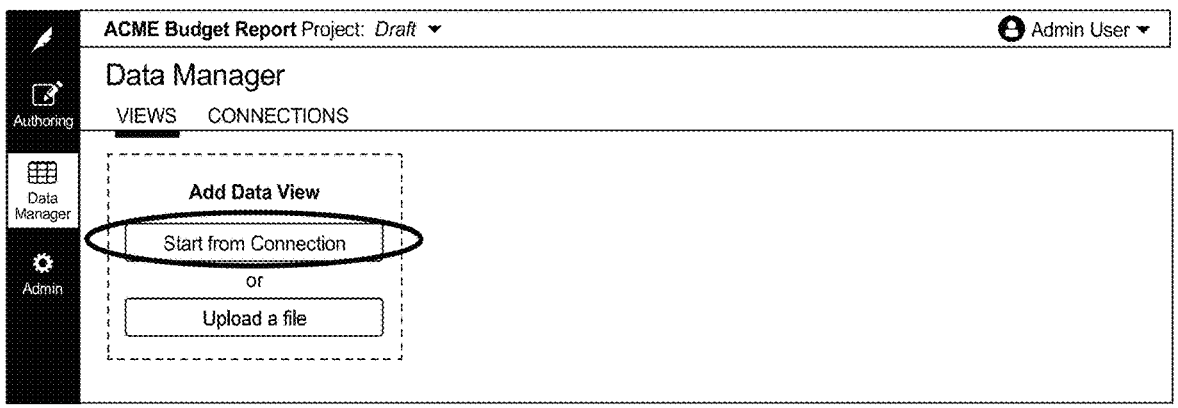
Figure 248:
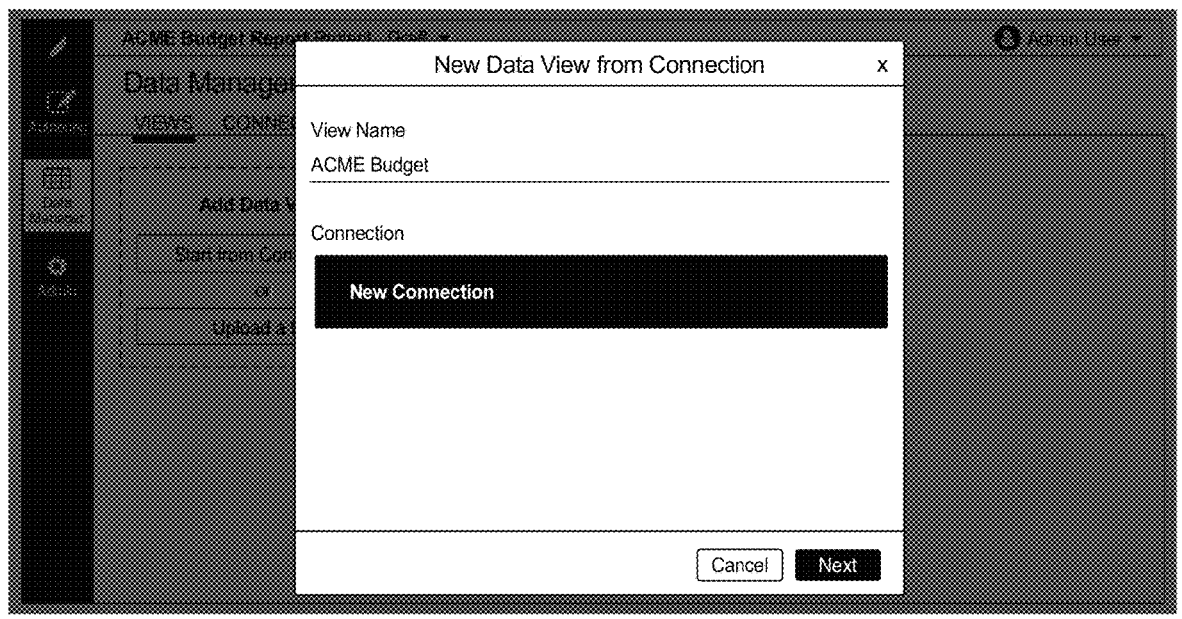
Figure 249:
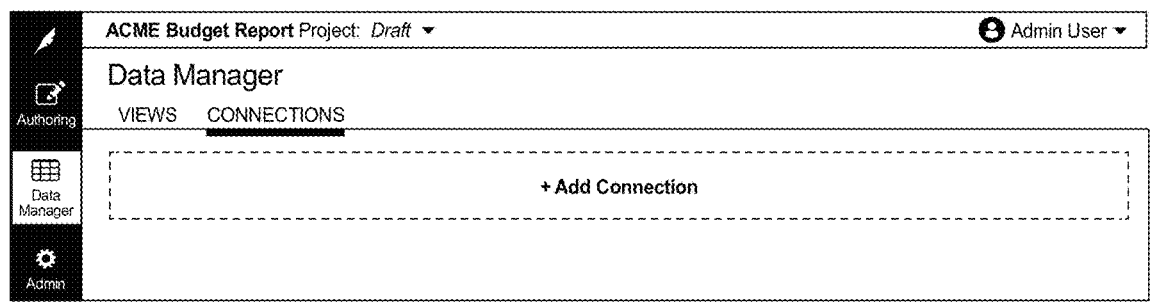

Here, you can upload additional files or add additional connections (see FIG. 246). If you have multiple data sources in a Data View, you can set a source as primary, edit, or delete it. New data files or tables can be added to an existing data view, but only tabular sources can be added to tabular views and document-based sources to document-based views. To make the newly uploaded source your primary dataset, click on the three dots icon and select it as primary. This makes it the file used during runtime story generation requests or Live Story previews.

A6(i)(b): Adding a Connection

You can also provide data to Quill by connecting to a SQL database, a cypher query against a Neo4j database, a MongoDB database, or an HTTP API endpoint. You can add a connection from the Data View tab by choosing Start from Connection from the Add a Data View tile (see FIGS. 247 and 248) or by choosing to Add a Connection from the Connections tab (see FIG. 249).

Figure 250:
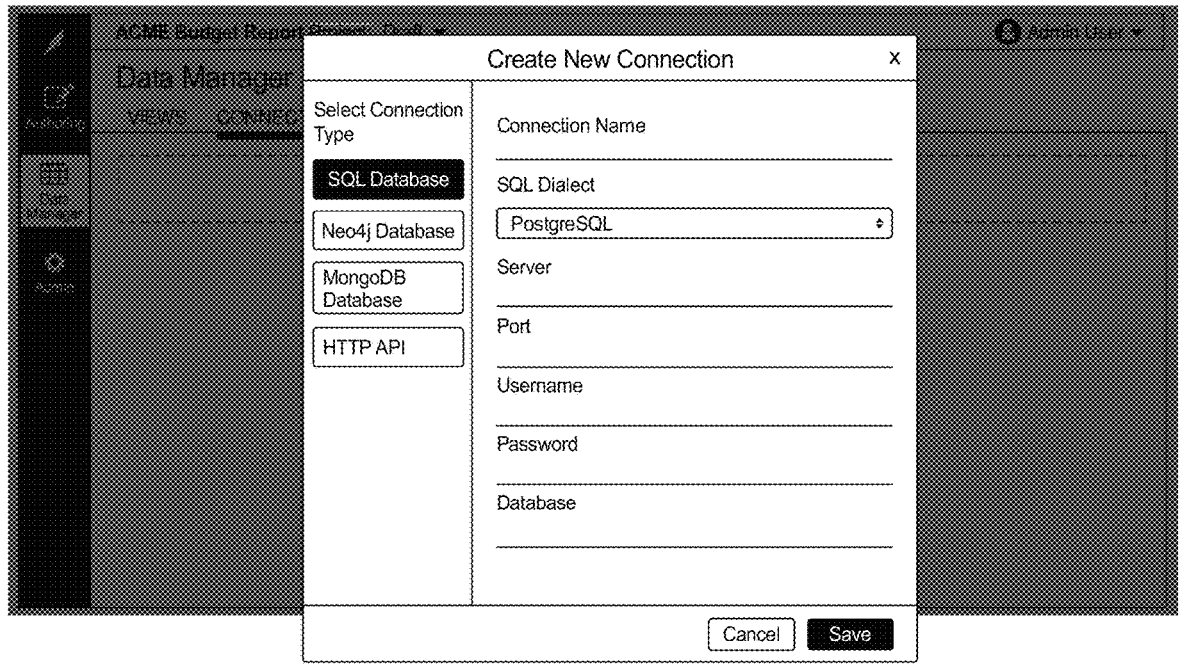
Figure 251:
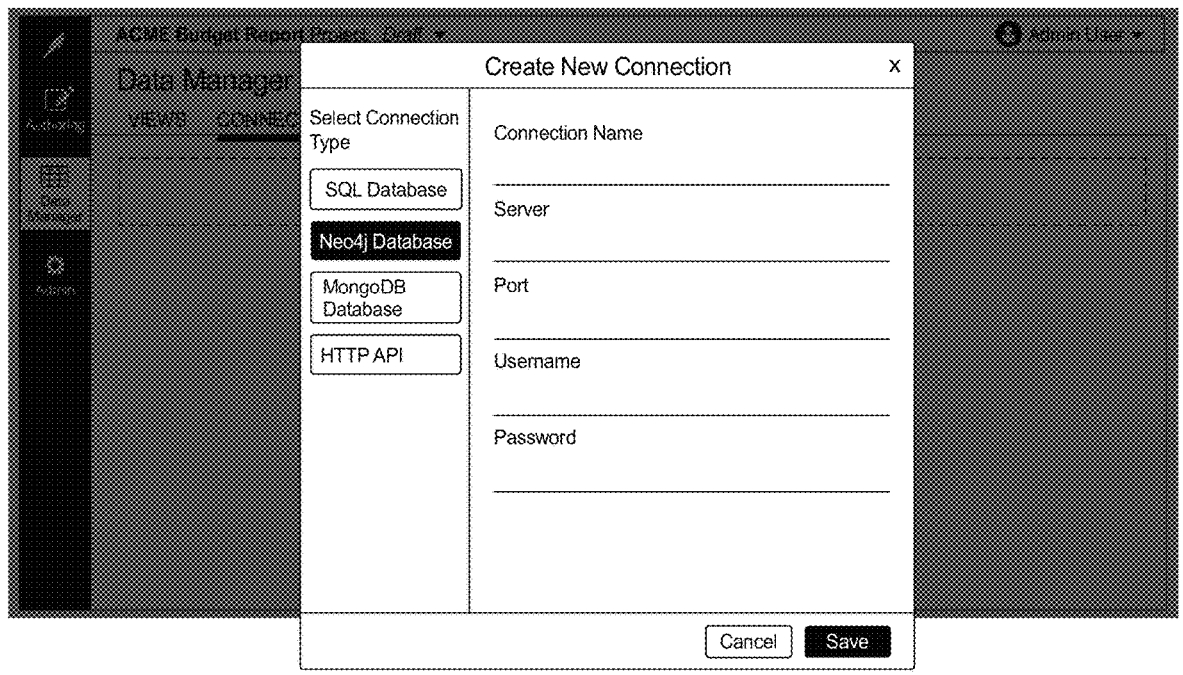
Figure 252:
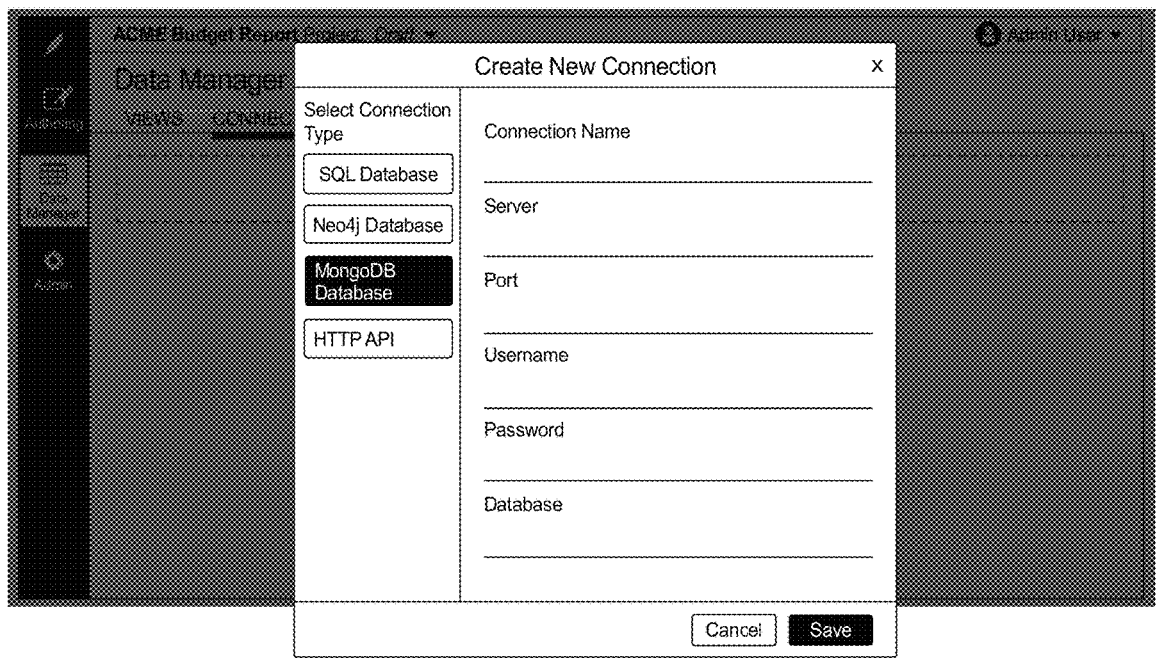
Figure 253:
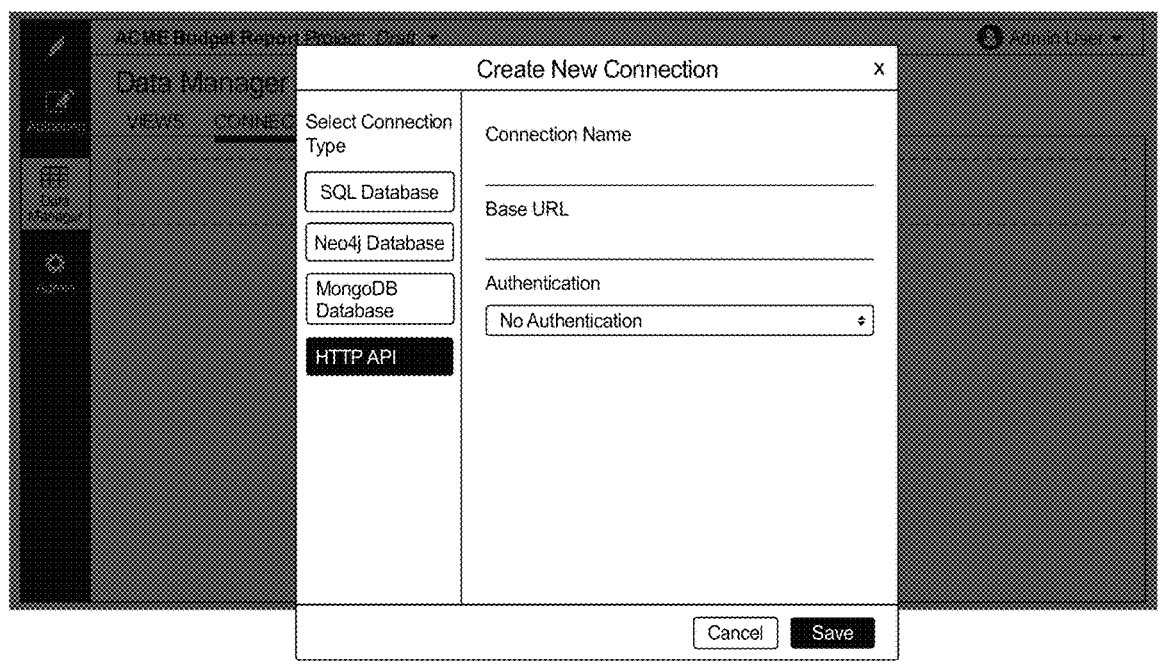
Figure 254:
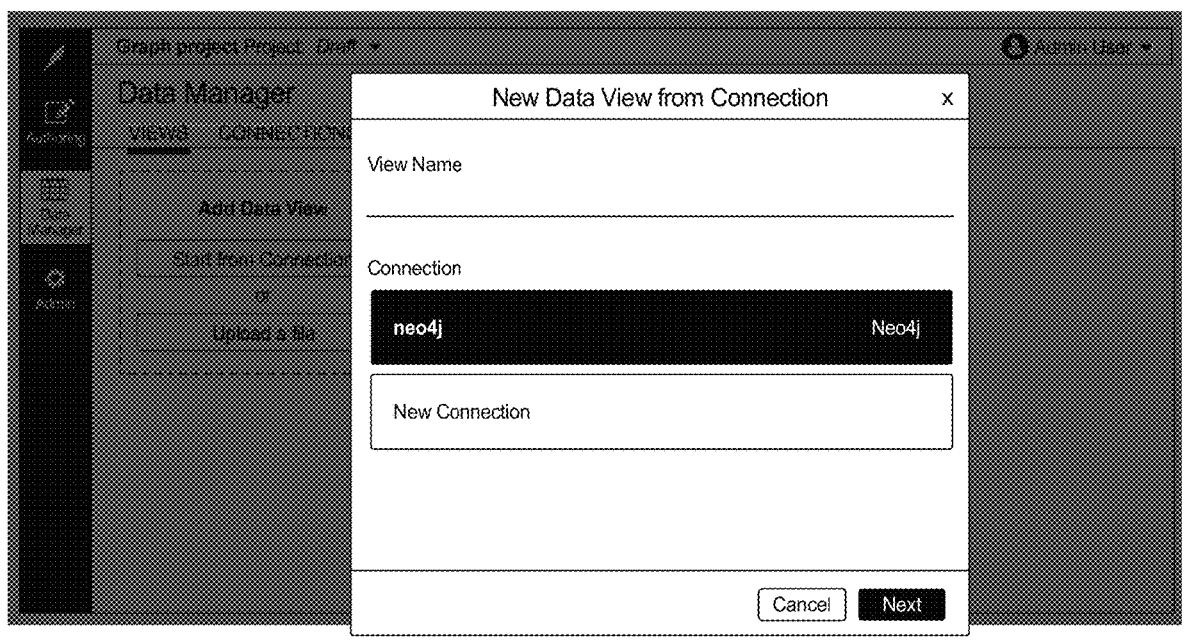
Figure 255:

Quill will ask for the appropriate information to set up each type of connection. FIG. 250 shows an example of credentials for a SQL database connection. FIG. 251 shows an example of credentials for a Neo4j database connection. FIG. 252 shows an example of credentials for a MongoDB database connection. FIG. 253 shows an example of credentials for an HTTP API connection.

The connection will be made, subject to network latency and the availability of the data source. Data Views from connections are made from the Views tab. Choose Start from a Connection and select the connection you created (see FIG. 254).

Quill will prompt you to specify the table to add the data source. For neo4j connections, you will have to put in a cypher query to transform the data into tabular form (see FIG. 255). From there, Data Requirements can be satisfied using the same experience as tabular and document-based views allowing for type validation rules to be set as needed.

A7: Reviewing Your Story

Once you have configured your story with Sections and Communication Goals, and satisfied the Data Requirements against a data source, you can review or edit its contents, understand the logic Quill used to arrive at the story, and monitor the status of stories you run.

A7(i): Live Story

Live Story is where you can see the narrative expression of the story you configured in the Outline (see FIG. 256).

If you have set up your story to be based on Story Variables (as opposed to a static value), you can toggle between them (see FIG. 257) and see how the narrative changes.

You can also switch between data sources (see FIG. 258).

Figures 259, 260:
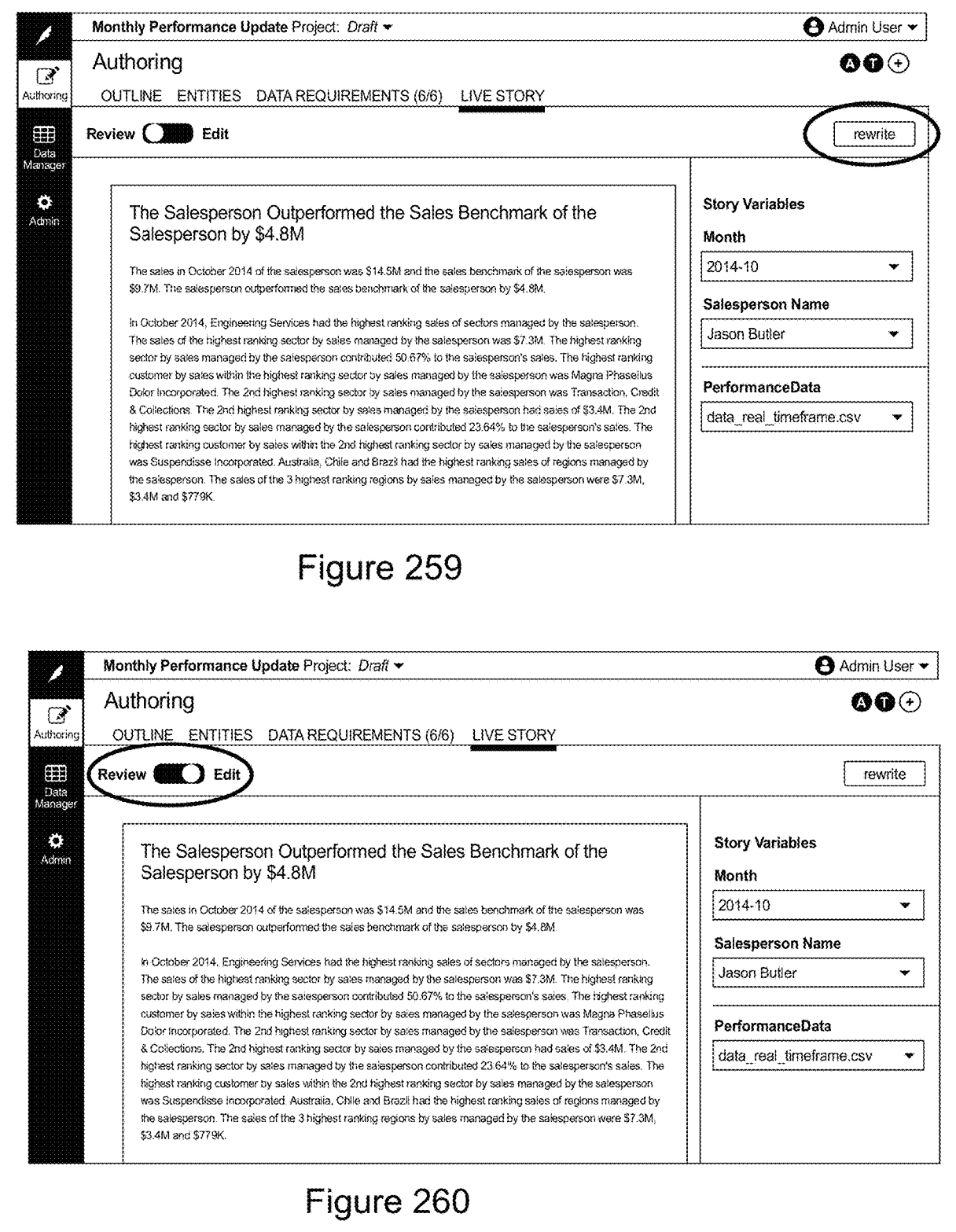

Click the "rewrite" button to generate a new narrative to see how any additional expressions you have added affect the Variability of the story (see FIG. 259).

Live Story has two modes: Edit and Review.

A7(i)(a): Edit Mode Edit mode allows you to make changes to the language in your story (see FIG. 260).

A7(i)(a)(1): Entity Expressions

You can add Entity expressions from Live Story (in addition to the Entities tab). If you click on any Entity (highlighted in blue under the cursor) (see FIG. 261), a sidebar will open on the right side (see FIG. 262).

You can add Entity expressions by typing in the area next to the plus sign. You can also opt into and out of particular expressions. If you have multiple expressions associated with the Entity, Quill will alternate between them at random to add Variability to the language. Click the rewrite button to see how your story changes. As described in the Ontology Management section, you can also click, hold, and drag an expression to the top of the list and opt out of the additional expressions to set it as primary.

A7(i)(a)(2): Characterization Expressions

You can edit the expressions in any Characterizations you have set on Compare Communication Goals from Edit mode in Live Story. As with Entity expressions, Characterization expressions will be highlighted in blue when you move the cursor over them (see FIG. 263).

Click on the expression to open a sidebar to the right where you can add additional expressions and set which expression you would like to be the primary expression (see FIG. 264).

Quill will alternate between them at random to add Variability to the language. These additional expressions will be tied to the specific Communication Goal where you added them and will not appear for others. You can also opt into and out of particular expressions, as well as delete them using the x. However, you cannot opt out of whichever expression is set as the primary expression. See Assessment Characterizations in Ontology Management for more detail.

A7(i)(a)(3): Language Guidance

You can add set Language Preferences, such as word order choice, to your story in the Edit mode of Live Story using Language Guidance. Hover over a section (sections correspond to Sections in the Outline) of the story to reveal a Quill icon on the right side (see FIG. 265).

Figures 265, 266:
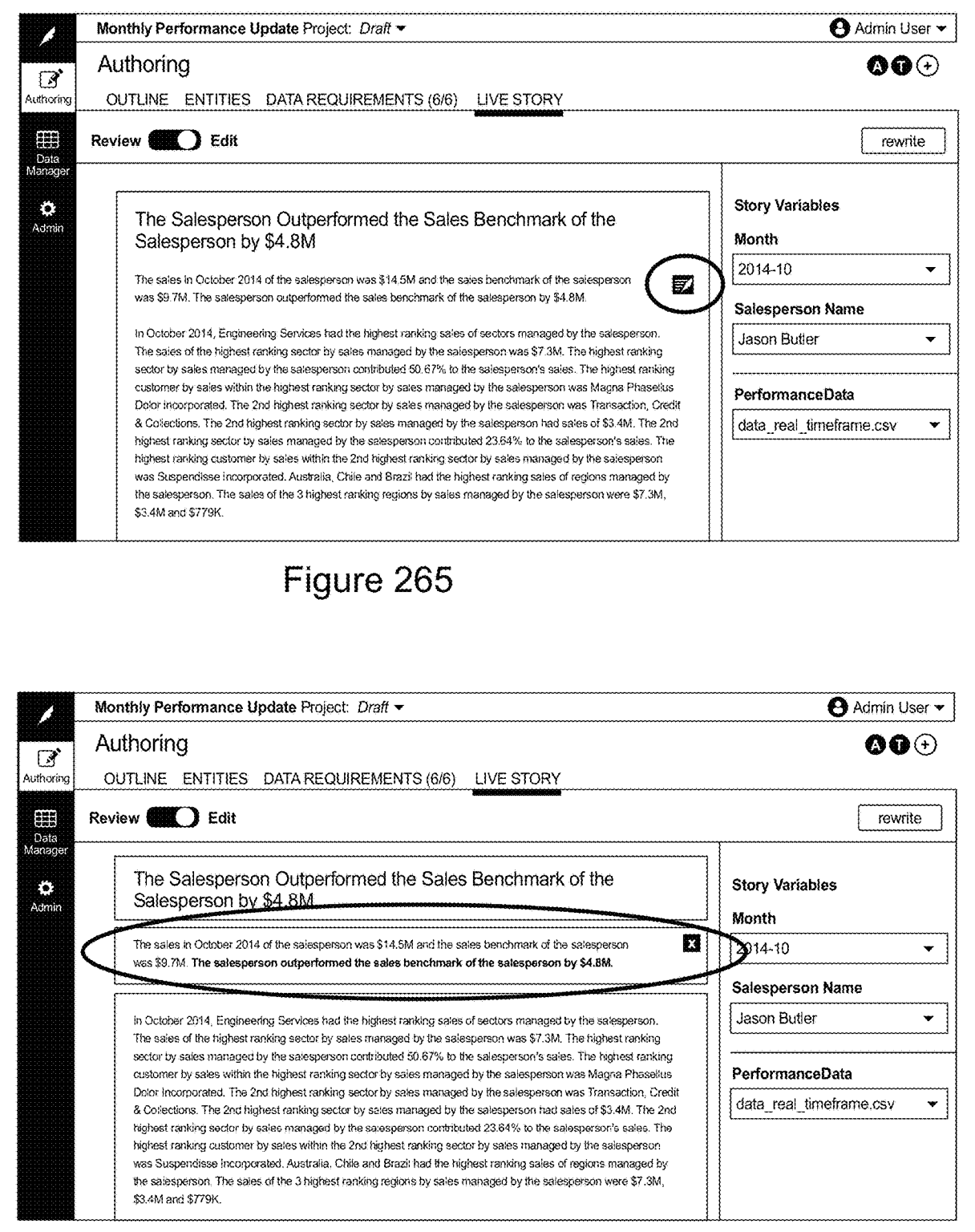

Click it to isolate the section from the rest of the story (see FIG. 266).

Figure 267:
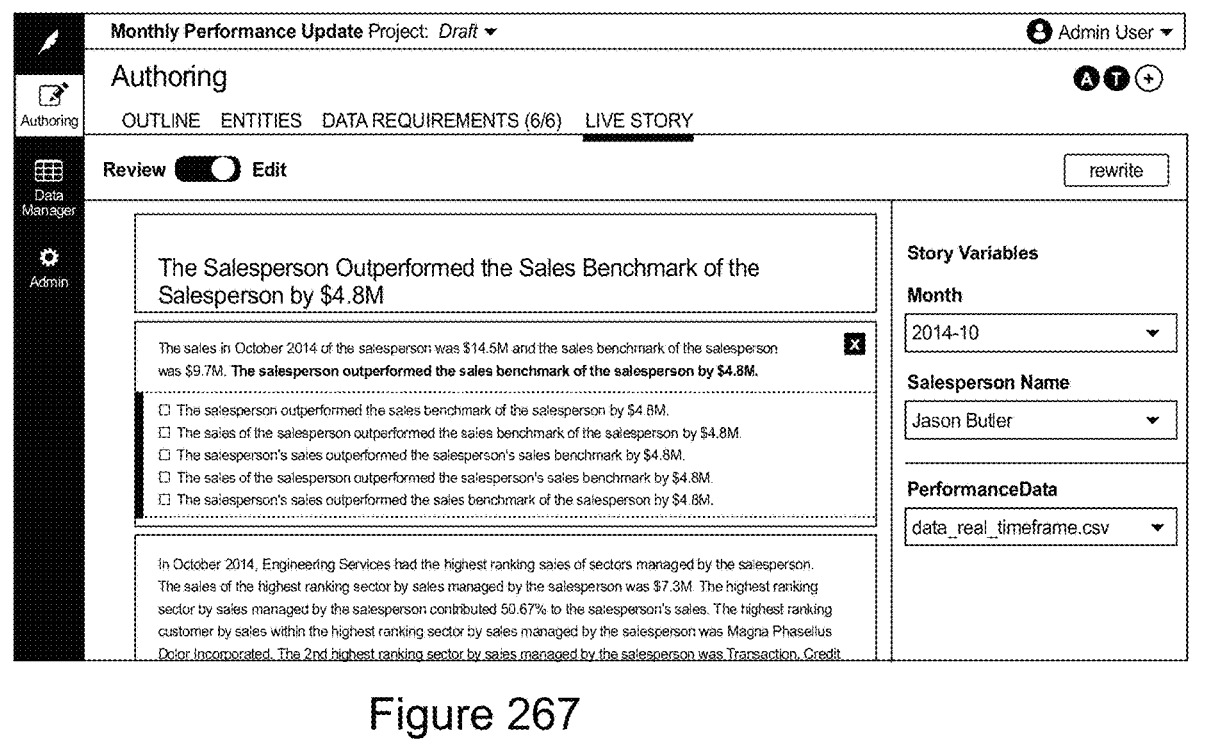

Click on a sentence to expose any additional expressions you can opt into (see FIG. 267).

Quill generates expressions using language patterns appropriate to the Communication Goal, so the number of additional expressions will vary and not all sentences will have additional expressions. Quill will alternate between them at random to give your story more language variation.

A7(i)(b): Review Mode

Project Reviewers have access to this aspect of Authoring. In review mode (see FIG. 268), you can read stories and switch datasets to see how they affect the story. You can also see if there are any errors in the story with Quill's logic trace (discussed below).

A7(ii): Logic Trace

Quill allows you to see the steps it takes to express Communication Goals as a story. If you click on any sentence in the story in Live Story in Review mode, Quill will show the underlying Communication Goal or Goals (see FIG. 269).

Figures 269, 270:
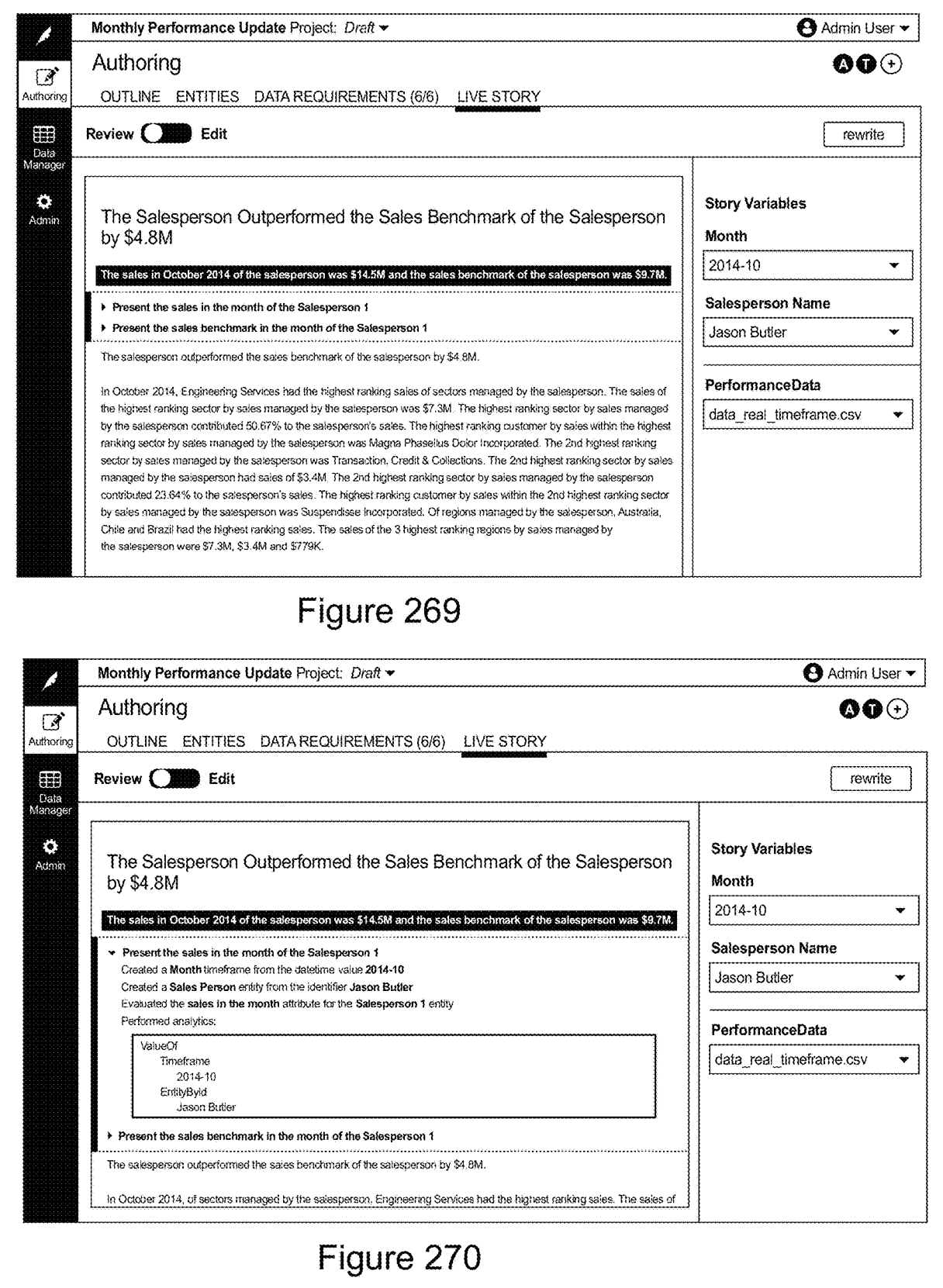

Expand the arrow on the left of the Goal to see the steps Quill took to retrieve data based on the Communication Goal and Data Requirements (see FIG. 270).

In this case, it created a Timeframe and an Entity Type. Then it "shows its work" of pulling the Attribute Value of "sales" constrained by the Timeframe of "month" and associated with the Entity Type "Salesperson 1."

Figure 271:
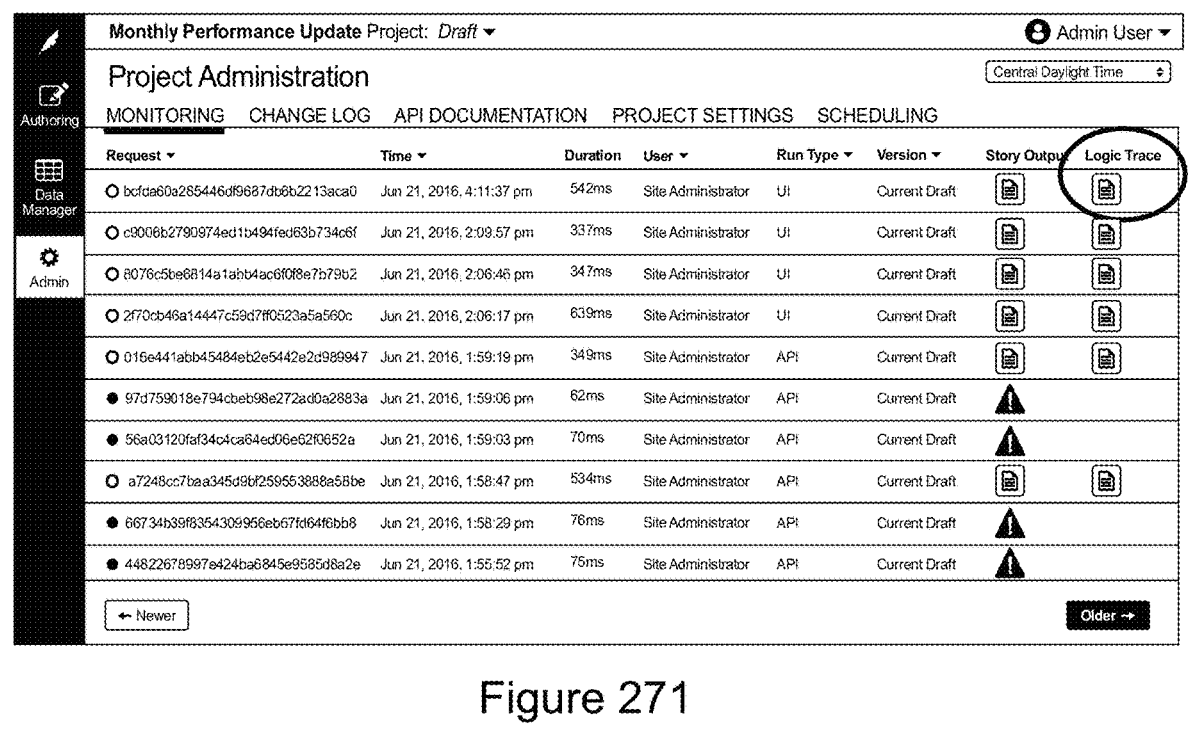

The Logic Trace can also be downloaded as a JSON file from the Monitoring tab in Admin (see FIG. 271).

A7(iii): Monitoring

You can monitor the status of any stories you run, whether they were written in Live Story or generated through API requests in the Monitoring tab in Admin. Here, you can see whether stories succeeded or failed, and filter for specific stories using the available filters below (see FIG. 272).

Use the Newer and Older buttons to scroll through the stories (see FIG. 273), and use the arrows on the column headers to set search criteria. You can filter by story status (see FIG. 274), when the story completed writing (see FIG. 275), the user who requested the story (see FIG. 276), a run type for the story (see FIG. 277), and a version for the story (see FIG. 278).

A8: Managing Story Versions

Quill supports creating and keeping track of changes to and versions of the stories you configure.

A8(i): Drafts and Publishing

Figure 279:
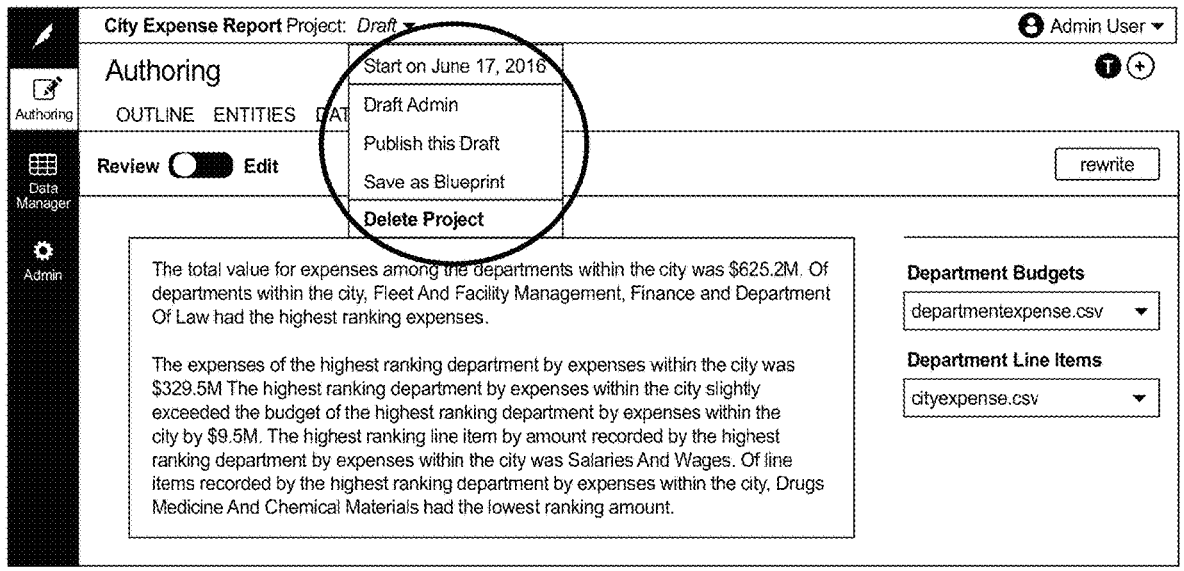

Once you have configured your story and are satisfied with its expression in Live Story, you can Publish the draft of your story (see FIG. 279).

Figure 280:
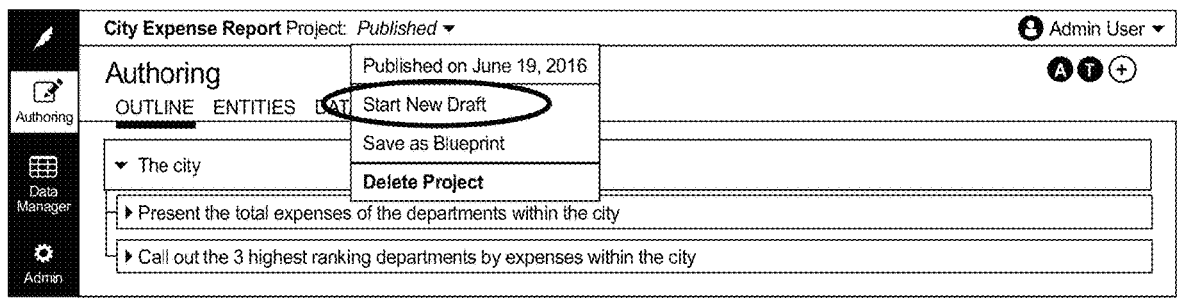

Once Published, your story will go live and that version will be the one that Quill uses when stories are requested through an API connection. After a draft has been Published, any changes you wish to make to the Project should be made after creating a new draft (see FIG. 280).

Figures 281, 282:
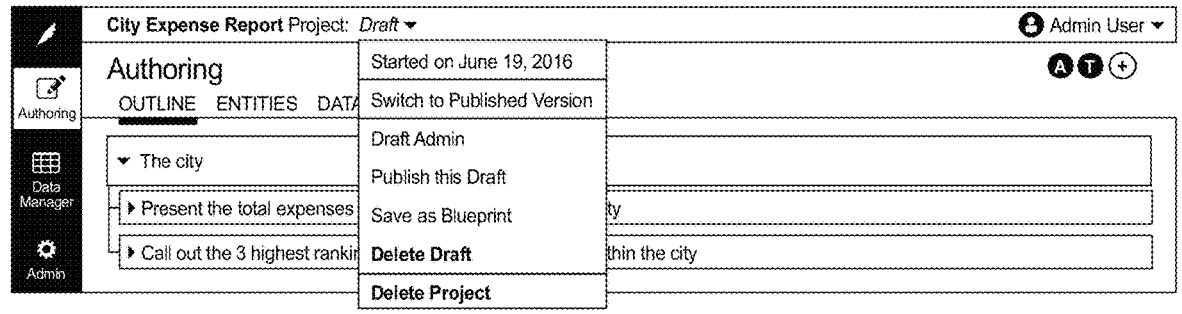

Once a new draft has been created, it can be deleted. You can also switch to the Published version if you want to abandon the changes you have made in the new draft. The drafts and publishing dropdown is also where you can save the Project as a blueprint to share with others in the Organization (see FIG. 281). This is discussed in Sharing.

Project Administrators are the only ones with draft creation and publishing privileges. While Editors may make changes to active drafts, they cannot publish them or create new ones. Reviewers only have access to review mode in Live Story and cannot create, make changes to, or publish drafts.

A8(ii): Change Log

Quill tracks configuration changes made within a Project. Anytime a user makes a change or adds a new element to a Project, it's noted in the Change Log. The Change Log can be accessed in the Admin section of Quill (see FIG. 282).

Here, you can see a list of all changes in the Project, the users that made the changes, the date and time the changes were made, and the version of the project the changes were made to. As with Monitoring, you can page through the list of changes by clicking on the Newer and Older buttons (see FIG. 283).

Figures 283, 284:
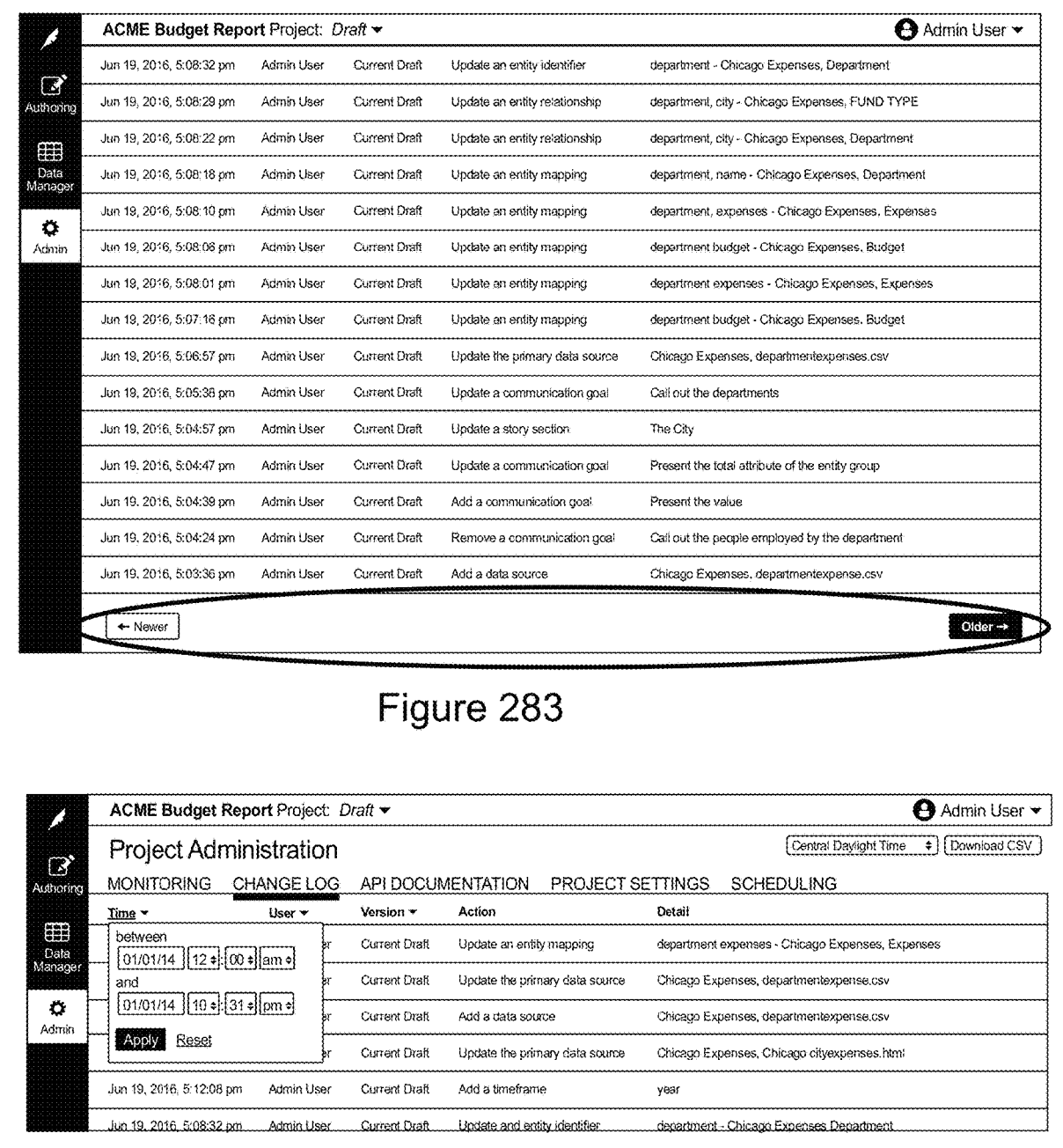
Figures 285, 286, 287:
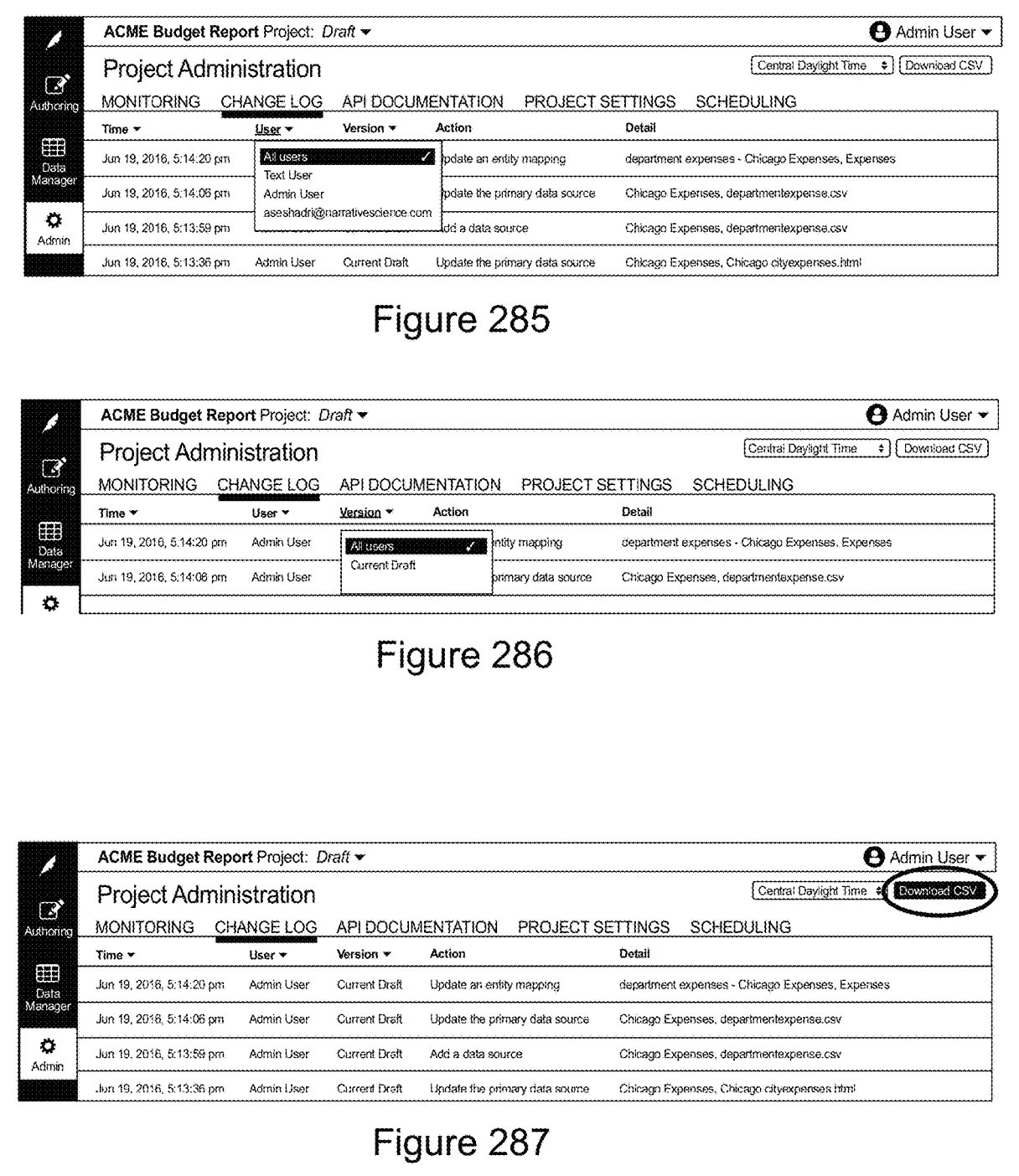

The Time, User, and Version information can be used to filter the list by using the drop-downs next to the column headers. FIG. 284 shows an example dropdown to filter by time. FIG. 285 shows an example dropdown to filter by user. FIG. 286 shows an example dropdown to filter by version.

You can also download the changes made as a CSV (see FIG. 287) in order to plot the Project activity or aggregate it for purposes of visualization or archiving.

A9: Writing Stories in Production

A9(i): API

Quill supports on-demand story generation by connecting to an API. The documentation can be accessed from Admin.

Figure 288:
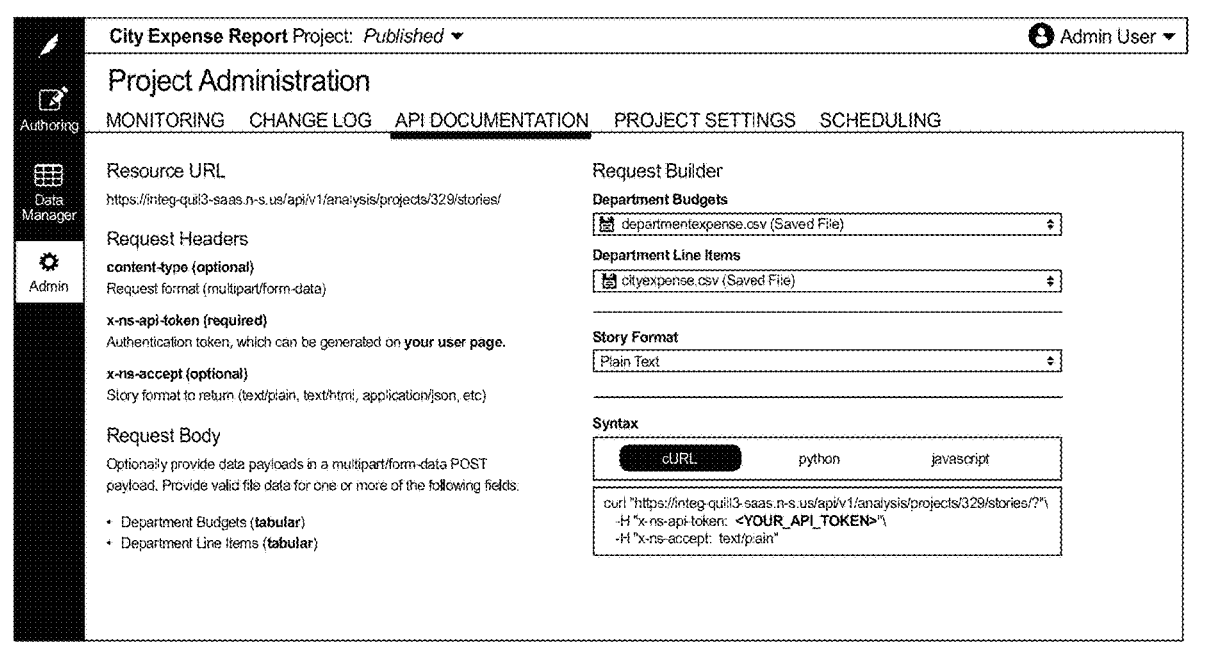

API request samples are available in the API Documentation tab of the Admin section of Authoring (see FIG. 288). These samples are based on the project Outline configuration and available data source connections. Parameters and output formatting can be set here so that stories can be requested to meet specific data requirements from an outside application.

Figure 289:
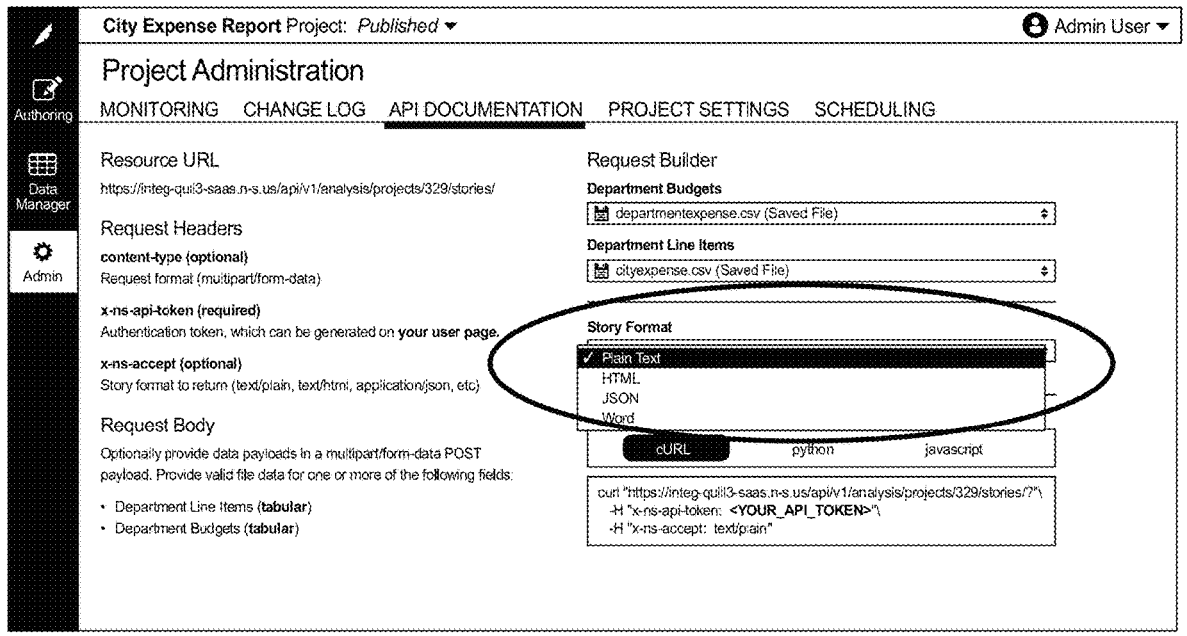

The Request Builder allows the user to select the dataset, set the format (Plain Text, HTML, JSON, or Word) of the output, and choose the syntax of the request sample (see FIG. 289).

Figure 290:
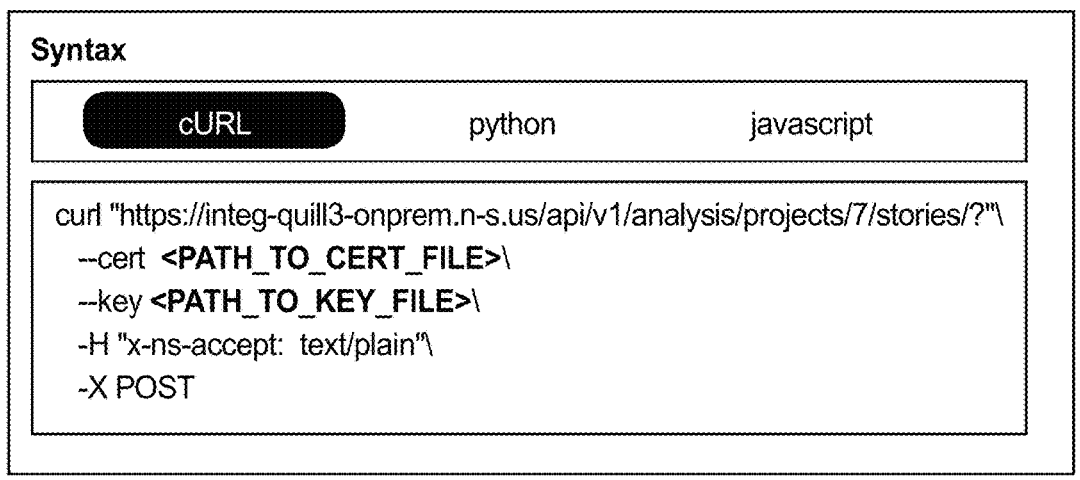

An external application can use the sample to post requests to the API to generate stories from Quill once the text in red has been replaced with its specific variables (see FIG. 290).

Each Quill user will be able to request a certificate and key from their system administrator.

A9(ii): Scheduling

Figures 291, 292:
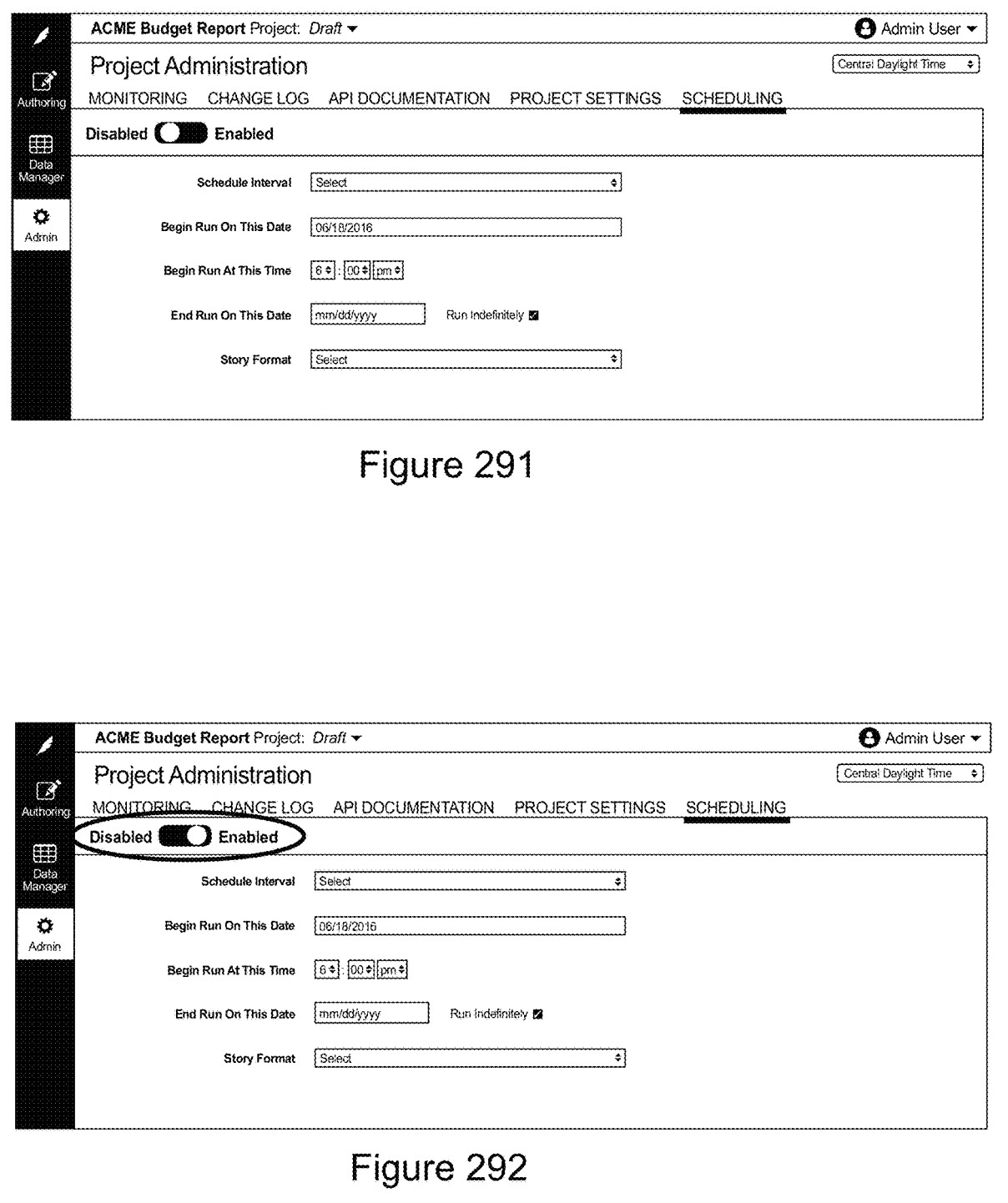

Stories can also be run on a schedule (see FIG. 291).

Figures 293, 294:
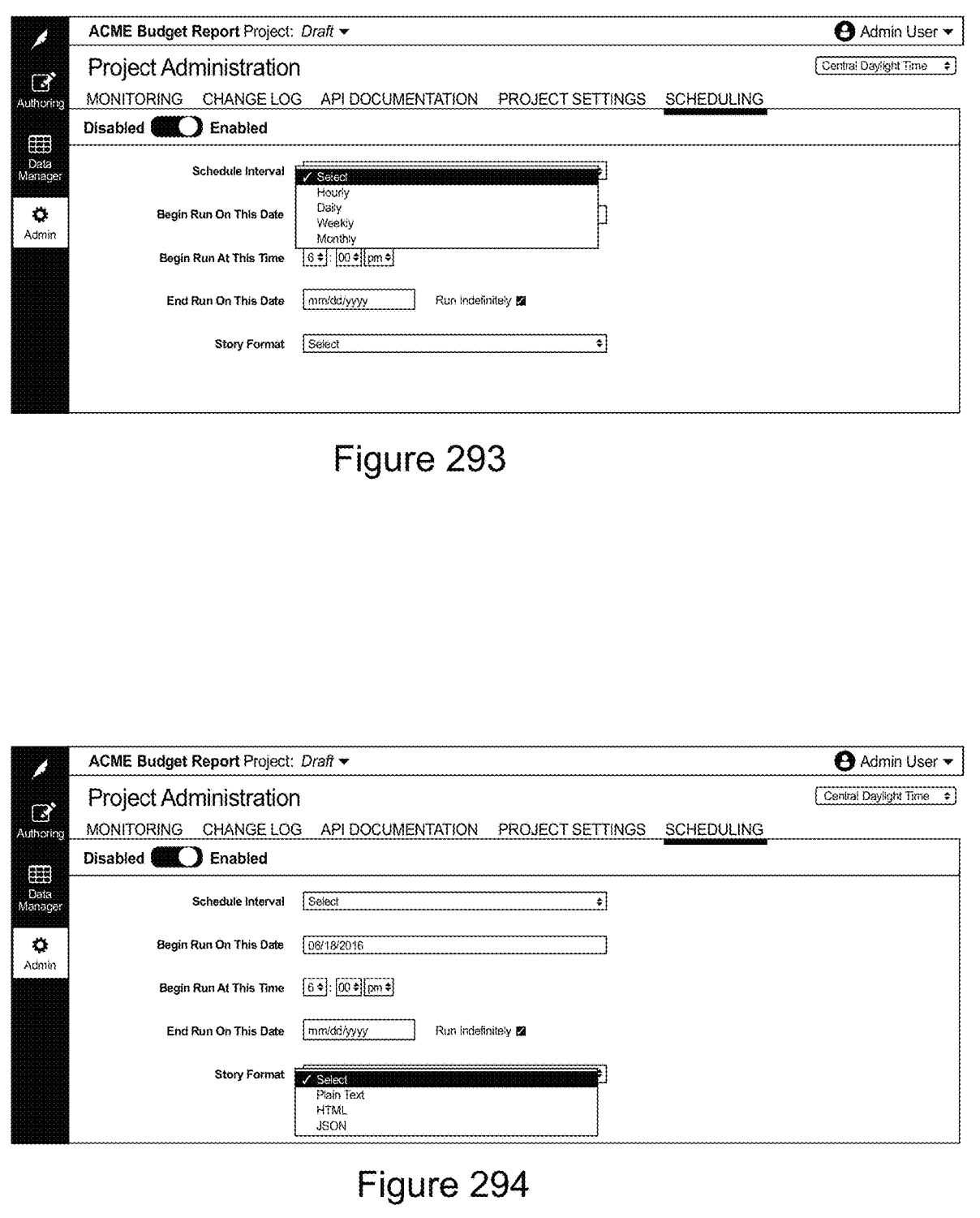

Once Scheduling is enabled (see FIG. 292), stories can be run at scheduled intervals (see FIG. 293) beginning at a specific date and time. The run can be ended at a specific time or continue indefinitely. Additionally, you can set the format of the story to Plain Text, HTML, or JSON (see FIG. 294), which can then be retrieved for viewing from the Monitoring page. Published Project schedules are un-editable at this time. To edit the schedule, create a new draft and update as needed.

A10: Sharing and Reuse

Figure 295:
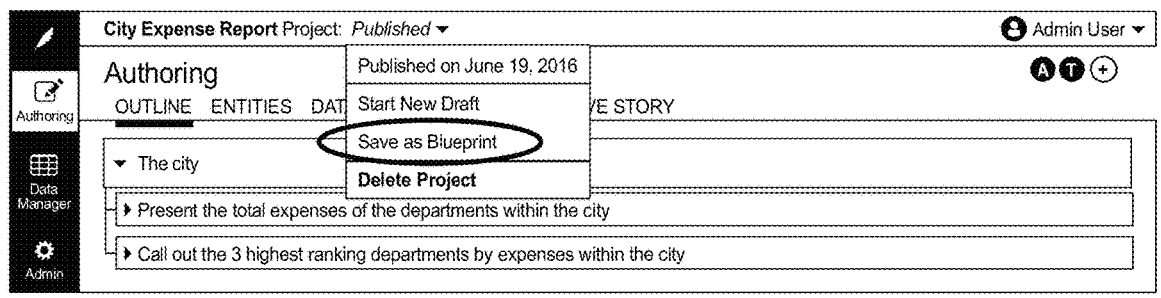

Projects can be shared with other users. The Draft drop-down menu includes an option to Save as Blueprint (see FIG. 295).

Figure 296:
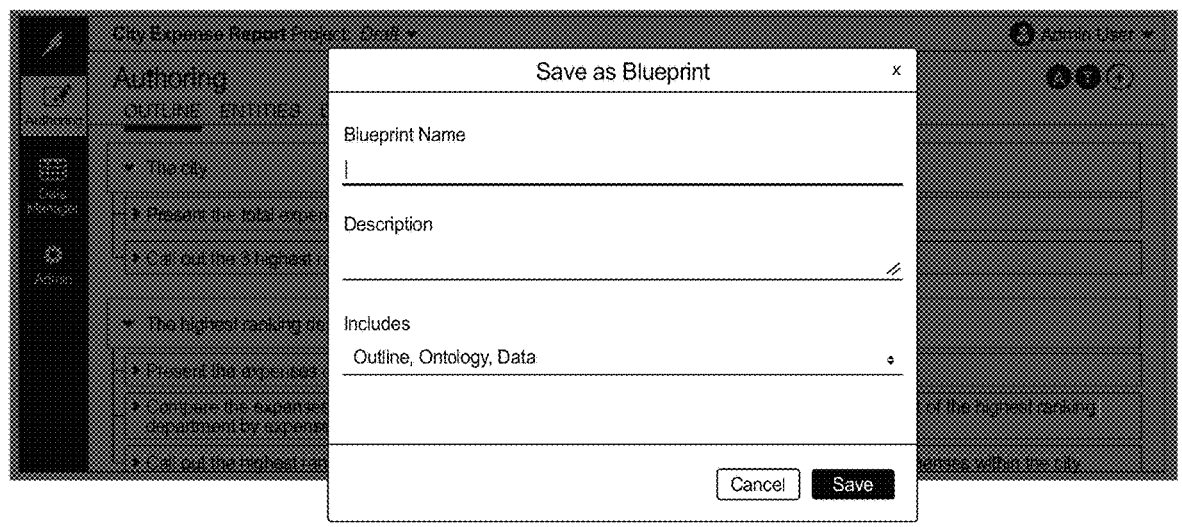

Here, you can give the shared version of the Project a name and description (see FIG. 296).

Figure 297:
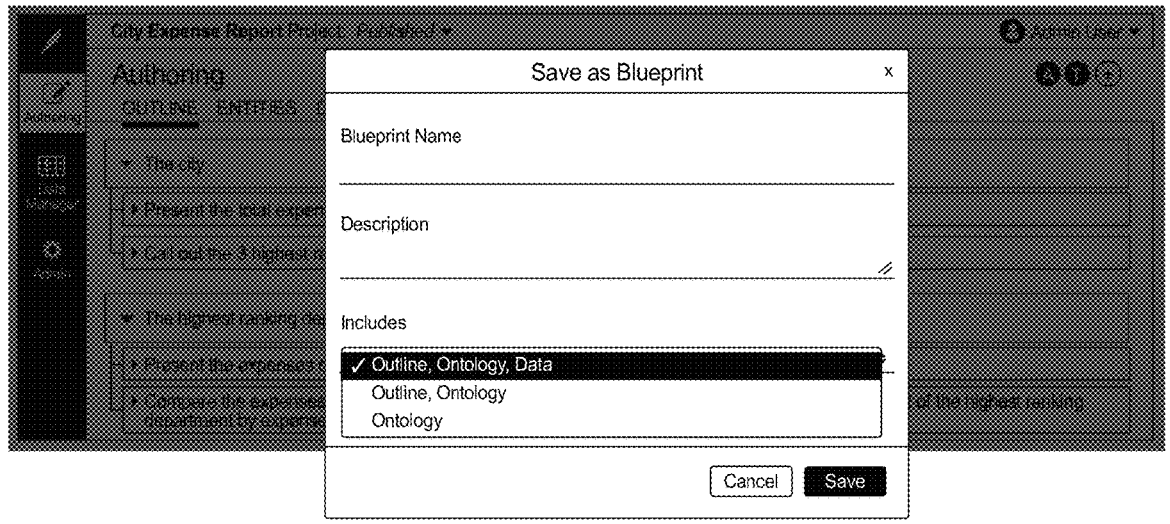

You can also specify how much of the Project you make available for sharing. You can include the Outline, Ontology (Entities), and Data Sources, the Outline and Ontology, or just the Outline (see FIG. 297).

Projects that have been saved as blueprints can be accessed when choosing a blueprint. Quill defaults to including all shared projects, but you can filter blueprints based on what elements they include (Outline, Ontology, Data Sources) (see FIG. 298).

A11: Terminology

The following provides a glossary for various terms used in connection with describing the example embodiment of Appendix A.

An Organization is a collection of Projects managed by an Administrator. Members of an Organization have access to those Projects within it that they have permissions for.

Outlines are collections of building blocks that define an overall Story.

Communication Goals provide a bridge between analysis of data and the production of concepts expressed as text.

Narrative Analytics generate the information needed by Communication Goals to generate stories.

Projects are where stories are configured. A Project includes Authoring, the Data Manager, and Admin.

Project Blueprints are templates comprised of an Outline, specific story sections, and collections of Communication Goals.

An Ontology is a collection of Entity Types and Attributes, along with their expressions, that powers how Quill expresses your story.

An Entity Type is any primary "object" which has particular Attributes. An example is that a Sales Person (entity) has Sales (attribute). Relationships provide context for entities within a story.

Every Entity Type has a Base Entity Type that identifies to Quill whether it is a Person, Place, Thing, or Event.

Computed Values are a way of reducing a list of values into a representative value. The currently available aggregations are count, maximum, mean, median, minimum, and total, and the currently available function is contribution.

Characterizations are editorial judgments based on thresholds that determine the language used in communication goals when certain conditions are met.

Expressions are the various words Quill uses to express a particular concept generated by the combination of executing Narrative Analytics and Story Elements.

A Timeframe is a unit of time used as a parameter to constrain the values included in the expression of a Communication Goal or story.

Variability is variation in the language of a story. Variability is provided through having multiple Entity and Characterization expressions as well as option into additional sentence expressions through Language Guidance.

Authoring includes the Outline, Data Requirements, and Live Story. This is where you configure Communication Goals, map Entity Types and Attributes to values in the data, and review generated stories.

Data Requirements are how a user tells Quill the method by which we will satisfy a Communication Goal's data requirements. These are what a Narrative Analytic and Communication Goal need to be able to express a concept. These are satisfied either directly by configuration of the data requirements or through the execution of Narrative Analytics.

A Story Variable is the focus of a story supplied at runtime as a value from a data source (as opposed to a static value).

A Draft is an editable version of the story in a Project. Project Administrators and Editors have the ability to make changes to Drafts. Project Administrators can publish Drafts and create new ones.

The Data Manager is the part of the Project where Data Views and Data Sources backing the story are managed. This is where files are uploaded and database connections are added.

A Data View is a used by Quill to map the Outline's information needs against Data Sources. A Project can be backed by multiple Data Views that are mapped using Identifiers in the schemas.

A Data Source is a file or table in a database used to support the Narrative Analytics and generation of a story.

Admin allows you to manage all aspects of story generation other than language and data. This is where Monitoring, the Change Log, API Documentation, Project Settings, and Scheduling are located.

A12: Communication Goal Families

The example embodiment of Appendix A supports three communication goal families: Present, Callout, and Compare.

Present

The Present goal family is used to express an attribute of a particular entity or group of entities.

Most Present goal statements have the form "Present the attribute (or computed value) of the specified entity/group." For example:
  Present the price of the car.
  Present the price of the highest ranked by reviews item.
  Present the average value of the deals made by the salesperson.

The two exceptions to this form are when the Count or Contribution computed values are used, in which case the statements look like this:
  Present the count of the group.
  E.g. Present the count of the franchises in the region.
  Present the attribute contribution of the entity to the parent entity.
  E.g. Present the point contribution of the player to the team.

Callout

The Callout goal family is used to identify the entity or group of entities that has some editorially-interesting position, role, or characteristics. E.g. the highest ranked salesperson, franchises with more than $1k in daily sales, players on the winning team, etc.

Every Callout goal statement has the same structure: "Callout the specified entity/group." For example:
  Callout the highest ranked by sales salesperson.
  Callout the franchises with more than 1,000 in daily sales.
  Callout the players on the winning team.

Compare

The Compare goal is used to compare the values of two attributes on the same entity. Every Compare goal has the same structure: Compare the first attribute of the specified entity to the second attribute. For example:
  Compare the sales of the salesperson to the benchmark.
  Compare the final value of the deal to the expected value.
  Compare the revenue of the business to the expenses.

A13: Miscellaneous

A13(i): Charts

Quill is able to express certain configured goals as Charts, such as Bar and Line. These have default styling and colors and are guided by the Communication Goal's Narrative Analytics. Charts are supported in each available output format.

A13(ii): Supported Document Structures

Generally, Quill supports documents that are homogenous (uniformly structured) with stable keys. Example permutations of supported structures are described below.

A13(ii)(a): Single Document

In this example, as long as all documents contain the same keys (in this case, "a", "b", and "c") Quill can use this data structure.

```
{
"a": 1,
"b": 2,
"c":3
}
```

A13(ii)(b): Nested Documents

Documents with other documents nested within them are supported, though the nested documents must be homogenous with stable keys across documents.

A first example is:

```
{
"a": {
  "aa": 1,
  "ab": 2
},
"b": {
  "ba": 3,
  "bb": 4
}
}
```

A second example is:

```
[
{
  "a": 1,
  "b": [
    {
      "ba": 11,
      "bb": 12
    },
    "ba": 20,
    "bb": 44
    }
  ]
}
]
```

A13(ii)(c): Unsupported Structures

The example embodiment of Appendix A does not support heterogeneous documents (non-uniform) or documents where values are used as keys.

```
{
"1/1/1900": "45",
"1/2/1900": "99",
"1/3/1900": "300"
}
```

A13(iii): Styling Rules

Oxford Commas

Quill does not use Oxford commas. So it writes like "Mary spoke with Tom, Dick and Harry" and not like "Mary spoke with Tom, Dick, and Harry."

Spaces Between Sentences

Quill puts one space between sentences.

Dates

Year: Datetimes that are just years are expressed numerically.
2016→"2016"
1900→"1900"

Month and Year: Datetimes that are just months and years have written out months and numeric years.
2016-03→"March 2016"
2015-11→"November 2015"

Day, Month, and Year: Datetimes that are full dates are written out months with numeric days and years.
2016-03-25→"Mar. 25, 2016"
2015-11-05→"Nov. 5, 2015"

Percents

Percents are rounded to two places, trailing zeros are removed, and a "%" is appended.
53.2593→"53.26%"
53.003→"53%"

Ordinals

Ordinals are written with numerical contractions.
1→"1st"
2→"2nd"
3→"3rd"
556→"556th"

Decimals

Decimals are written out with decimal parts and commas inserted.
1.1→"1.1"
1.9→"1.9"
123456789→"123,456,789"

Currencies

Currencies are currently assumed to be USD. In the future, they can be locale-specific (e.g. Euros). They're styled differently based on how big they are.
Less than One Thousand
Rounds to two decimal places. There are always two decimal places.
3→"$3.00"
399.9999→"$400.00"
Less than Ten Thousand
Rounds to an integer.
5000.123→"$5,000"
4171→"$4,171"
Less than One Million
Rounds to thousands with zero decimal places, appends a "K"
500,000→"500K"
123,456.789→"123K"
Less than One Billion
Rounds to millions with one decimal place if necessary, appends an "M"
500,000,000→"500M"
500,100,000.12→"500.1M"
Less than One Trillion
Rounds to billions with two decimal places if necessary, appends an "M"
500,000,000,000→"500B"
500,100,000,000.12→"500.1B"
500,130,000,000.12→"500.13B"

Supported Datetime Formats

The following datetime formats are supported in Quill.
01/31/15
01/31/2015
31 Jan. 2015
Jan. 31, 2015
Tuesday, Jan. 31, 2015
Tuesday, Jan. 31, 2015, 01:30 AM
2015-01-31T01:30:00-0600
20150131
2015-01-31 13:30:00
01-31-2015 01:30:45
31-01-2015 01:30:45
1/31/2015 1:30:45
01/31/2015 01:30:45 AM
31/01/2015 01:30:45
2015/01/31 01:30:45

A13(iv): Using Multiple Data Views

Users can satisfy their outline's data requirements using multiple data views. While it may often be more straightforward to create a de-normalized view in the source database, the following use cases are supported. These apply to both tabular and document-based data sources.

Single Entity Type, Attribute Lookup by Entity ID

Quill can return the Gender from Data View 2 associated with the Sales Person's ID in Data View 1 using the Sales Person ID.

| Data View 1 | |
|---|---|
| Sales Person ID | Sales Person Name |
| 123 | Aaron Young |
| 456 | Daisy Bailey |

| Data View 2 | |
|---|---|
| Sales Person ID | Gender |
| 123 | Male |
| 456 | Female |

Two Entity Types

Quill can match the Transactions in Data View 2 to the Sales People in Data View 1 by Sales Person ID.

| Data View 1 | |
|---|---|
| Sales Person ID | Sales Person Name |
| 123 | Aaron Young |
| 456 | Daisy Bailey |

| Data View 2 | | |
|---|---|---|
| Transaction ID | Amount | Sales Person ID |
| 777 | $100.00 | 123 |
| 888 | $70.00 | 456 |
| 999 | $20.00 | 123 |

A13(v): Permission Structure

| Quill Access | | | | |
|---|---|---|---|---|
| Role | Create Organizations | Create Users | API Token | Create Projects |
| Site Administrator | X | X | X | X |

-continued

| Quill Access | | | | |
|---|---|---|---|---|
| Role | Create Organizations | Create Users | API Token | Create Projects |
| Organization Administrator | | X | X | X |
| Organization Member | | | X | X |

| Project Access | | | | | |
|---|---|---|---|---|---|
| Role | Add Users | Edit Story | Live Story: Edit Mode | Create and Publish Drafts | Live Story: Review Mode |
| Administrator | X | X | X | X | X |
| Editor | | X | X | | X |
| Reviewer | | | | | X |

What is claimed is:

1. An apparatus for applying artificial intelligence to generate a narrative from structured data according to a narrative generation process, the structured data comprising a plurality of data values associated with a plurality of data parameters, the apparatus comprising:
a processor configured to (1) parameterize a conditional outcome framework based on an input and a plurality of the data parameters and (2) generate a narrative about the structured data in accordance with the parameterized conditional outcome framework;
wherein the input corresponds to at least one communication goal, wherein the at least one communication goal comprises of (1) a communication goal for explaining a value of a specified attribute with respect to an entity and/or (2) a communication goal for explaining a change in value of the specified attribute with respect to the entity;
wherein the conditional outcome framework conditionally specifies which of a plurality of ideas are to be expressed in narratives generated according to the narrative generation process; and
wherein the generated narrative comprises natural language narrative text that expresses at least one idea conditionally specified by the conditional outcome framework so that the narrative satisfies the at least one communication goal and explains the value and/or change in value of the specified attribute in terms of one or more drivers and/or influencers for the specified attribute.

2. The apparatus of claim 1 wherein the specified attribute is associated with a model that identifies the one or more drivers and/or influencers for the specified attribute, and wherein the processor is further configured to access the model to identify the one or more drivers and/or influencers to be included in the narrative that explains the value and/or change in value of the specified attribute in terms of its one or more drivers and/or influencers.

3. The apparatus of claim 1 wherein the processor is further configured to select a conditional outcome framework from among a plurality of conditional outcome frameworks based on the input.

4. The apparatus of claim 1 wherein the input corresponds to the communication goal for explaining a value of a specified attribute with respect to an entity.

5. The apparatus of claim 1 wherein the processor comprises a plurality of processors.

6. The apparatus of claim 1 wherein the processor is further configured to:
map a plurality of the data parameters to a plurality of conditions associated with the conditional outcome framework; and
test a plurality of the data values associated with the mapped data parameters against the conditions to identify the idea to be expressed in the narrative.

7. The apparatus of claim 6 wherein the processor is further configured to:
test the data values associated with the mapped data parameters against the conditions to identify a plurality of ideas to be expressed in the narrative.

8. The apparatus of claim 1 wherein the conditional outcome framework comprises a plurality of conditional outcome data structures, wherein each conditional outcome data structure is associated with at least one condition, wherein a plurality of the conditional outcome data structures are linked with a plurality of idea data structures, each idea data structure representing an idea to be expressed in a narrative;
wherein the processor is further configured to (1) determine which conditional outcome data structure is applicable to the structured data based on the conditions associated with the conditional outcome data structures, (2) select an idea data structure that is linked with the determined conditional outcome data structure, and (3) express the idea represented by the selected idea data structure in the natural language narrative text.

9. The apparatus of claim 8, wherein the conditional outcome framework comprises a plurality of the conditional outcome data structures arranged in a hierarchical relationship where at least one conditional outcome data structure is associated with a plurality of additional conditional outcome data structures.

10. The apparatus of claim 1 wherein the input is associated with a plurality of attribute structures, each attribute structure corresponding to an attribute of an entity and specifying a model for its corresponding attribute.

11. The apparatus of claim 10 wherein the conditional outcome framework comprises a plurality of conditional outcome data structures corresponding to different categorizations of attribute models to support an analysis of one or more drivers and/or influencers for the specified attribute.

12. The apparatus of claim 11 wherein the categorizations include a quantitative model and a qualitative model.

13. The apparatus of claim 12 wherein the quantitive model comprises a formula model type and/or an aggregation model type.

14. The apparatus of claim 12 wherein the qualitative model comprises an influencer model type.

15. The apparatus of claim 1 wherein the input corresponds to the communication goal for explaining a change in value of a specified attribute with respect to an entity.

16. The apparatus of claim 15 wherein the conditional outcome framework comprises a plurality of conditional outcome data structures corresponding to different categorizations of attribute models to support an analysis of one or more drivers and/or influencers for the specified attribute.

17. The apparatus of claim 16 wherein the conditional outcome framework is associated with narrative analytics that are configured to analyze changes in values for the specified attribute over a specified time frame.

18. The apparatus of claim 16 wherein the conditional outcome framework is associated with narrative analytics that are configured to analyze changes in values for the one or more drivers over a specified time frame.

19. A method of applying artificial intelligence to generate a narrative from structured data according to a narrative generation process, the structured data comprising a plurality of data values associated with a plurality of data parameters, the method comprising:
- parameterizing a conditional outcome framework based on an input and a plurality of the data parameters and
- generating a narrative about the structured data in accordance with the parameterized conditional outcome framework;
- wherein the parameterizing and generating steps are performed by one or more processors;
- wherein the input corresponds to at least one communication goal, wherein the at least one communication goal comprises of (1) a communication goal for explaining a value of a specified attribute with respect to an entity and/or (2) a communication goal for explaining a change in value of the specified attribute with respect to the entity;
- wherein the conditional outcome framework conditionally specifies which of a plurality of ideas are to be expressed in narratives generated according to the narrative generation process; and
- wherein the generated narrative comprises natural language narrative text that expresses at least one idea conditionally specified by the conditional outcome framework so that the narrative satisfies the at least one communication goal and explains the value and/or change in value of the specified attribute in terms of one or more drivers and/or influencers for the specified attribute.

20. A computer program product for applying artificial intelligence to generate a narrative from structured data according to a narrative generation process, the structured data comprising a plurality of data values associated with a plurality of data parameters, the computer program product comprising:
- code resident on a non-transitory computer-readable storage medium that is executable by one or more processors to a cause the one or more processors to:
  - parameterize a conditional outcome framework based on an input and a plurality of the data parameters and
  - generate a narrative about the structured data in accordance with the parameterized conditional outcome framework;
- wherein the input corresponds to at least one communication goal, wherein the at least one communication goal comprises of (1) a communication goal for explaining a value of a specified attribute with respect to an entity and/or (2) a communication goal for explaining a change in value of the specified attribute with respect to the entity;
- wherein the conditional outcome framework conditionally specifies which of a plurality of ideas are to be expressed in narratives generated according to the narrative generation process; and
- wherein the generated narrative comprises natural language narrative text that expresses at least one idea conditionally specified by the conditional outcome framework so that the narrative satisfies the at least one communication goal and explains the value and/or change in value of the specified attribute in terms of one or more drivers and/or influencers for the specified attribute.

* * * * *